US012602345B2

(12) United States Patent
Hyatt et al.

(10) Patent No.: US 12,602,345 B2
(45) Date of Patent: Apr. 14, 2026

(54) MULTI-PROTOCOL RETIMER ENABLING TRANSPARENT AND NON-TRANSPARENT BRIDGING FOR MEMORY FABRICS INCLUDING PCIe, CXL, OR UALink

(71) Applicant: UnifabriX Ltd., Haifa (IL)

(72) Inventors: Ronen Aharon Hyatt, Haifa (IL); Gaya Opal Hyatt, Haifa (IL); Ethan Sharon Hyatt, Haifa (IL)

(73) Assignee: UnifabriX Ltd., Haifa (IL)

( * ) Notice: Subject to any disclaimer, the term of this patent is extended or adjusted under 35 U.S.C. 154(b) by 0 days.

(21) Appl. No.: 19/371,994

(22) Filed: Oct. 28, 2025

(65) Prior Publication Data

US 2026/0056909 A1 Feb. 26, 2026

Related U.S. Application Data

(63) Continuation of application No. 19/017,420, filed on Jan. 11, 2025, which is a continuation-in-part of application No. 18/981,443, filed on Dec. 13, 2024.

(Continued)

(51) Int. Cl.
*G06F 13/42* (2006.01)

(52) U.S. Cl.
CPC .. *G06F 13/4221* (2013.01); *G06F 2213/0026* (2013.01)

(58) Field of Classification Search
None
See application file for complete search history.

(56) References Cited

U.S. PATENT DOCUMENTS 10,585,833 B1 * 3/2020 Lien .................... G06F 13/4022
11,106,616 B1 * 8/2021 Wu ...................... G06F 13/4221
(Continued)

OTHER PUBLICATIONS

WO2025117605A1 WIPO, International filing Nov. 26, 2024.*
(Continued)

*Primary Examiner* — Henry Tsai
*Assistant Examiner* — Christopher A Bartels
(74) *Attorney, Agent, or Firm* — Active Knowledge Ltd.

(57) ABSTRACT

Modern datacenters require flexible interconnect solutions that bridge diverse protocol domains while maintaining compatibility with existing infrastructure. Embodiments herein disclose semiconductor devices that implement protocol translations and physical address translations within IC packages conforming to the PCIe Retimer Supplemental Features and Standard BGA Footprint Specification. The devices comprise first and second interfaces communicating according to first and second protocols respectively, with an embedded computer that extracts physical addresses from messages received via the first interface, translates these addresses, and generates messages carrying the translated addresses for transmission via the second interface. This retimer-compatible form factor essentially enables drop-in deployment within existing PCIe and cabling infrastructures while providing protocol bridging and address translation capabilities. The standardized BGA layout provides high-speed differential signaling suitable for low-latency address translation, optionally supporting memory disaggregation, host-to-host memory sharing, accelerator integration, and protocol conversion between CXL, UALink, NVLink, and/ or PCIe domains, addressing interoperability challenges.

30 Claims, 131 Drawing Sheets

Related U.S. Application Data

(60) Provisional application No. 63/895,053, filed on Oct. 7, 2025, provisional application No. 63/874,393, filed on Sep. 2, 2025, provisional application No. 63/856,653, filed on Aug. 3, 2025, provisional application No. 63/826,342, filed on Jun. 18, 2025, provisional application No. 63/811,859, filed on May 25, 2025, provisional application No. 63/784,089, filed on Apr. 5, 2025, provisional application No. 63/752,940, filed on Feb. 3, 2025, provisional application No. 63/743,658, filed on Jan. 10, 2025, provisional application No. 63/734,031, filed on Dec. 13, 2024, provisional application No. 63/719,640, filed on Nov. 12, 2024, provisional application No. 63/701,554, filed on Sep. 30, 2024, provisional application No. 63/695,957, filed on Sep. 18, 2024, provisional application No. 63/678,045, filed on Jul. 31, 2024, provisional application No. 63/652,165, filed on May 27, 2024, provisional application No. 63/641,404, filed on May 1, 2024, provisional application No. 63/609,833, filed on Dec. 13, 2023.

(56) References Cited

U.S. PATENT DOCUMENTS

| | | | |
|---|---|---|---|
| 12,107,770 B2 | 10/2024 | Banerjee | |
| 12,360,925 B2 | 7/2025 | Hyatt | |
| 12,423,226 B2 | 9/2025 | Hyatt | |
| 2015/0347345 A1* | 12/2015 | Hellriegel | G06F 13/409 |
| | | | 710/301 |
| 2020/0322287 A1 | 10/2020 | Connor | |
| 2021/0050941 A1* | 2/2021 | Das Sharma | H04L 1/203 |
| 2022/0066976 A1* | 3/2022 | Thomas | H04L 49/40 |
| 2022/0100694 A1* | 3/2022 | Thomas | G06F 13/4221 |
| 2022/0342841 A1* | 10/2022 | Choudhary | G06F 13/4291 |
| 2022/0350771 A1* | 11/2022 | Ringe | G06F 13/4068 |
| 2022/0365750 A1* | 11/2022 | Bharambe | G06F 7/483 |
| 2023/0236995 A1 | 7/2023 | Jayaraman | |
| 2023/0385223 A1 | 11/2023 | Shah | |
| 2024/0231615 A1 | 7/2024 | Choi | |
| 2024/0281402 A1 | 8/2024 | Jung | |
| 2024/0378161 A1 | 11/2024 | Kwon | |
| 2025/0060908 A1 | 2/2025 | Siluvainathan | |
| 2026/0030193 A1* | 1/2026 | Jeong | G06F 13/4221 |

OTHER PUBLICATIONS

Ultra Accelerator Link Consortium Inc. (UALink)—UALink_200 Rev 1.0 Specification. Apr. 8, 2025. Ultra Accelerator Link Consortium, Inc.

Scale-Up Ethernet Framework Specification. Sep. 26, 2025. Broadcom Inc.

Compute Express Link (CXL) Specification Revision 3.2, Oct. 2, 2024. Compute Express Link Consortium, Inc.

Compute Express Link (CXL) Specification Revision 4.0, Aug. 13, 2025. Compute Express Link Consortium, Inc.

Fabric Manager for NVIDIA NVSwitch Systems, Release r560. Oct. 23, 2024. NVIDIA Corporation.

Ishii, A. and Wells, R., Aug. 2022. The NVLink-network switch: Nvidia's switch chip for high communication-bandwidth superpods. In 2022 IEEE Hot Chips 34 Symposium (HCS) (pp. 1-23). IEEE Computer Society.

Foley, D. and Danskin, J., 2017. Ultra-performance Pascal GPU and NVLink interconnect. IEEE Micro, 37(2), pp. 7-17.

Wei, Y., Huang, Y.C., Tang, H., Sankaran, N., Chadha, I., Dai, D., Oluwole, O., Balan, V. and Lee, E., Feb. 2023. 9.3 NVLink-C2C: A coherent off package chip-to-chip interconnect with 40Gbps/pin single-ended signaling. In 2023 IEEE International Solid-State Circuits Conference (ISSCC) (pp. 160-162). IEEE.

AMBA® CHI Chip-to-Chip (C2C) Architecture Specification. Document No. IHI0098. Feb. 2024. Arm Limited.

AMBA® CHI Architecture Specification. Document No. IHI0050. Mar. 2024. Arm Limited.

Intel® 64 and IA-32 Architectures Optimization Reference Manual: vol. 1. Document No. 248966-050US. Apr. 2024. Intel Corporation.

Guan, T., Guan, Y., Du, Z., Ma, J., Tian, B., Wang, Z., Ma, T., Liu, Z., Kong, Y., Xie, Y. and Gao, M., Aug. 20, 2025. MemTunnel: A CXL-Based Rack-Scale Host Memory Pooling Architecture for Cloud Service. IEEE Transactions on Parallel and Distributed Systems.

Kousha, P., Ramesh, B., Suresh, K.K., Chu, C.H., Jain, A., Sarkauskas, N., Subramoni, H. and Panda, D.K., Dec. 2019. Designing a profiling and visualization tool for scalable and in-depth analysis of high-performance GPU clusters. In 2019 IEEE 26th International Conference on High Performance Computing, Data, and Analytics (HiPC) (pp. 93-102). IEEE.

* cited by examiner

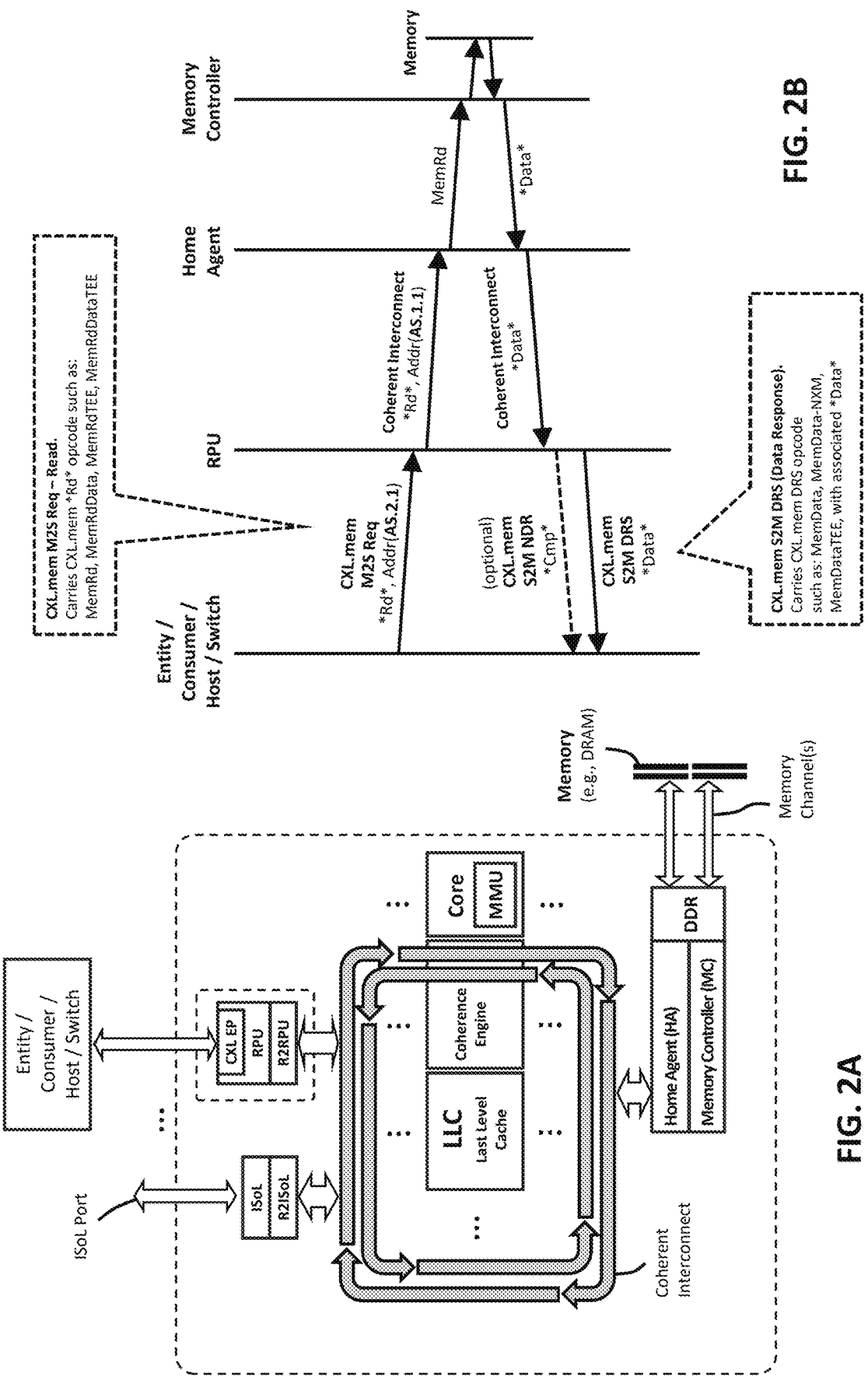

FIG. 22B

FIG. 22A e.g., CXL Device, CXL Switch,
Memory Pool, MxPU, Provider e.g., Discrete Component, IP, Chiplet e.g., Accelerator, GPU, CPU,
UALink Switch, Originator,
Consumer

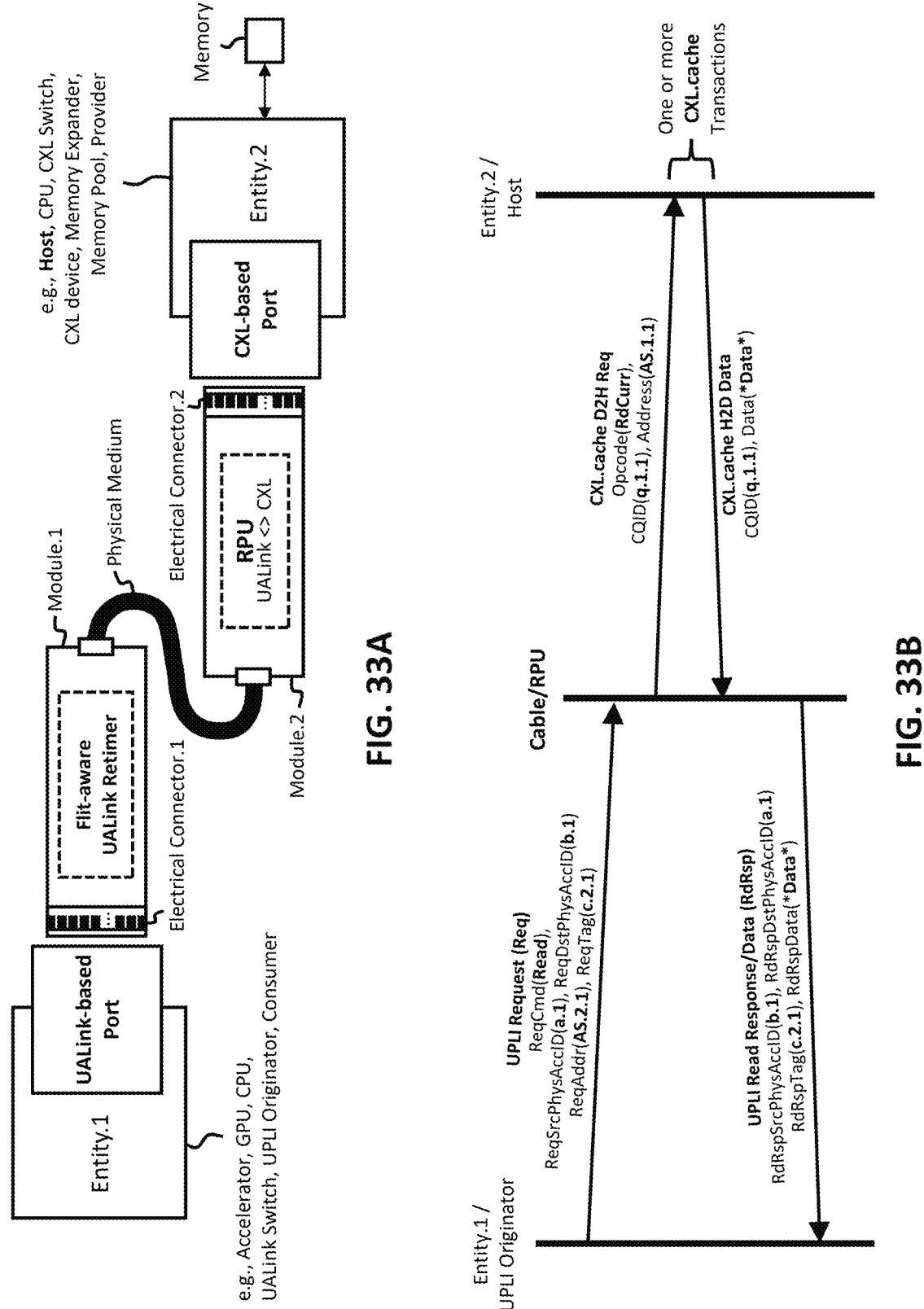

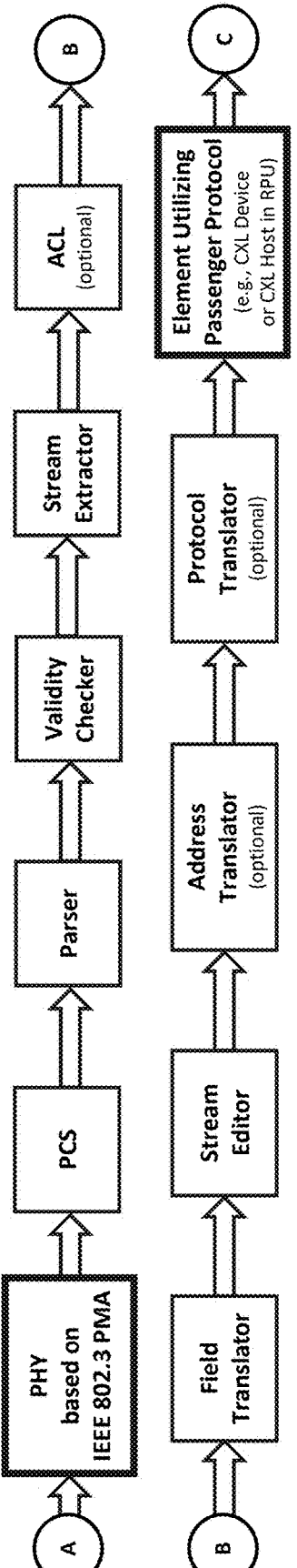

FIG. 58A

| Carrier Protocol PDU (e.g., Ethernet, Regular Format) | | | | | | |
|---|---|---|---|---|---|---|
| Carrier Protocol (Ethernet) Header | IP | UDP | Carrier Protocol Encapsulating Header | Passenger Protocol PDU (e.g., CXL.mem PDU) | Carrier Protocol Encapsulating Trailer | Pad (optional) | (Ethernet) FCS |

FIG. 58B

| Carrier Protocol PDU (e.g., Ethernet, Optimized Format) | | | | |
|---|---|---|---|---|
| Carrier Protocol (Ethernet) Optimized Header | Carrier Protocol Encapsulating Header | Passenger Protocol PDU (e.g., CXL.mem PDU) | Carrier Protocol Encapsulating Trailer | Pad (optional) | (Ethernet) FCS |

FIG. 58C

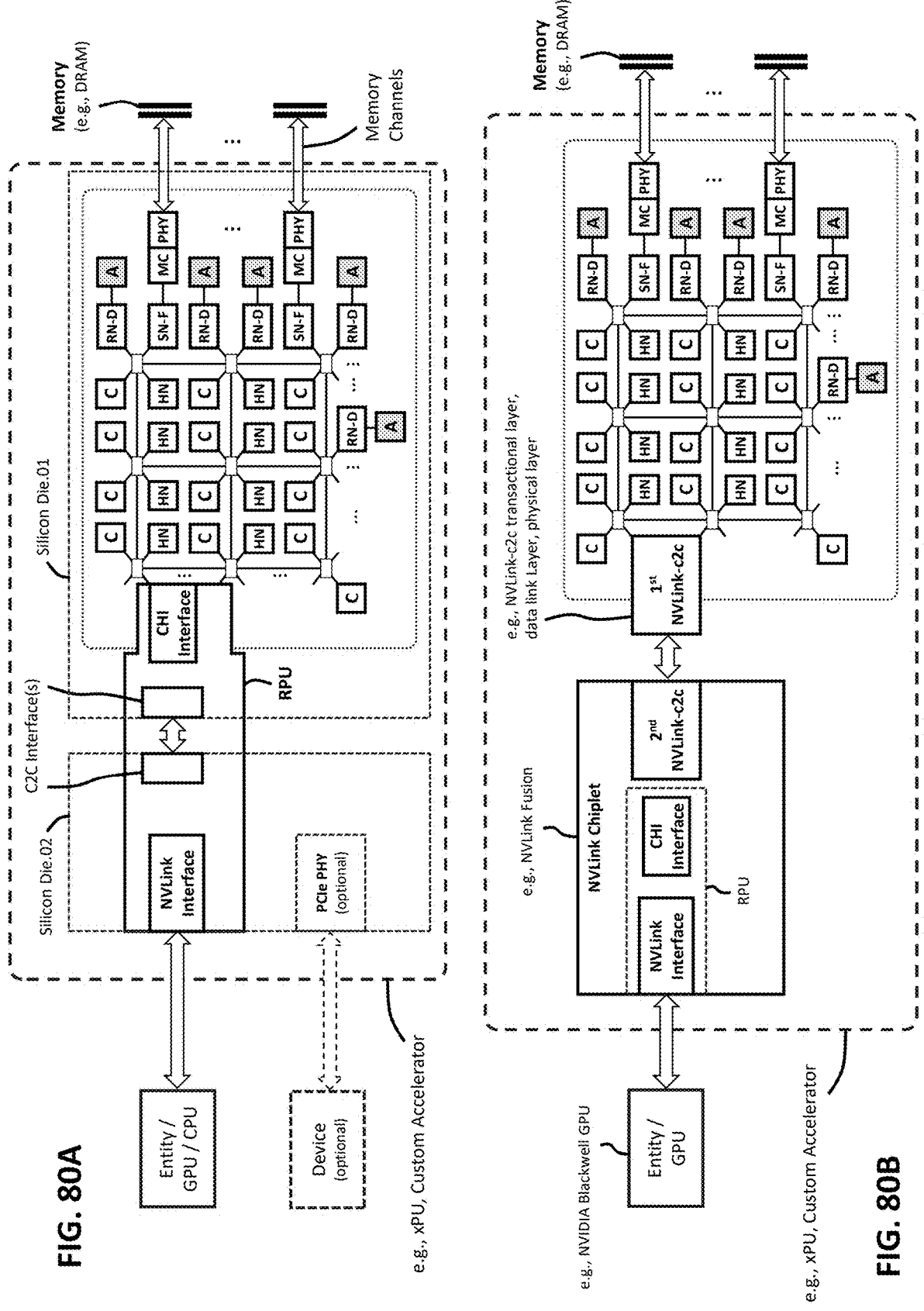

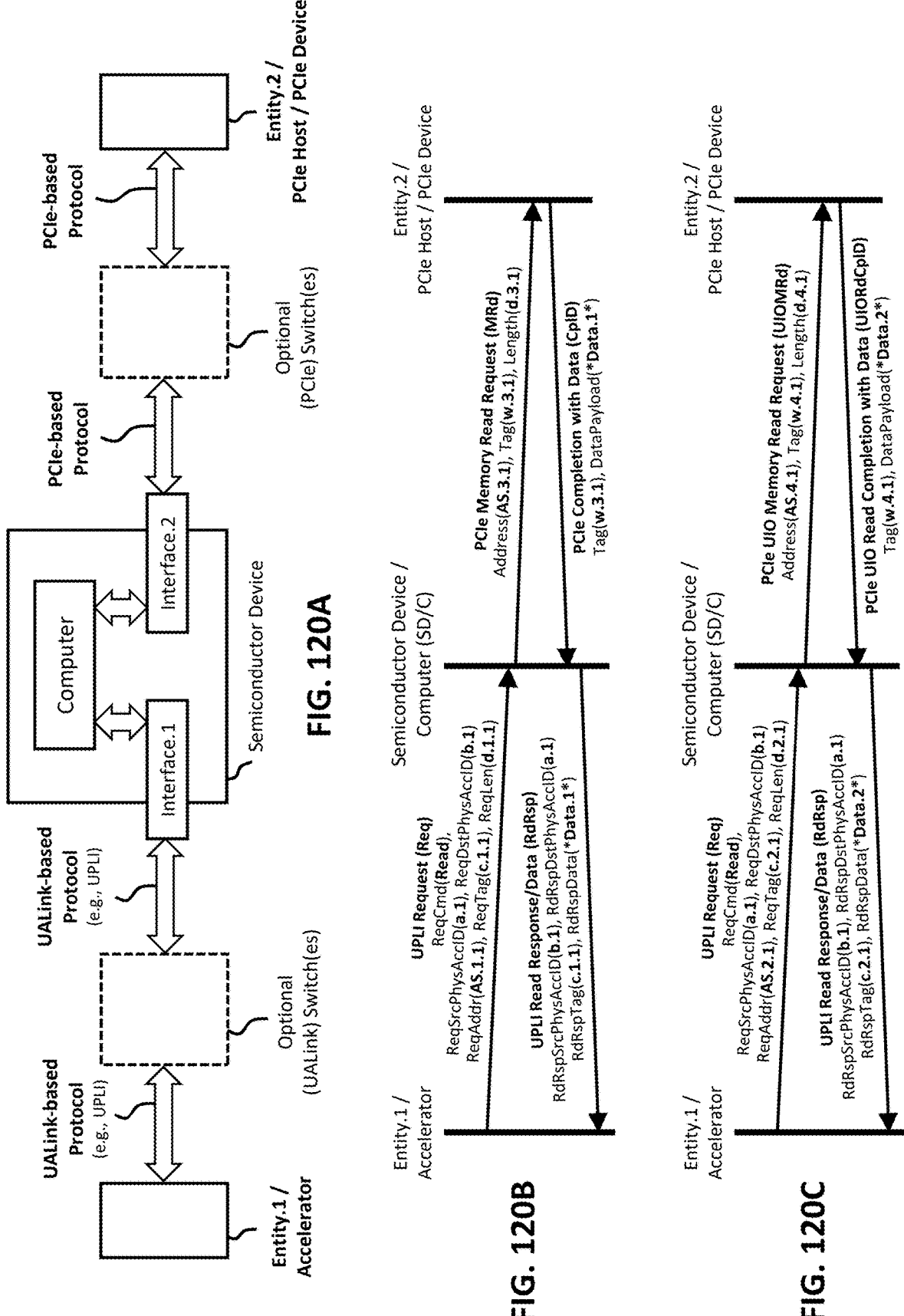

| DIMM Capacity | DRAM Component Density | Packaging Technology | Relative Manufacturing Complexity | Relative Manufacturing Yield | ~Unit Price $USD/GB (in 2024) | Normalized Unit Price |
|---|---|---|---|---|---|---|
| 64GB | 16Gb | SDP | Low | High | ~$3 | 1 |
| 128GB | 16Gb | DDP (Wire-Bond) | Medium | Medium | ~$4.5 | ~1.5 |
| 256GB | 16Gb | 3DS-4H (TSV) | Very High | Low | ~$15 | ~5 |

Mainstream DRAM as of 2024

Non-mainstream DRAM as of 2024

MULTI-PROTOCOL RETIMER ENABLING TRANSPARENT AND NON-TRANSPARENT BRIDGING FOR MEMORY FABRICS INCLUDING PCIe, CXL, OR UALink

CROSS-REFERENCE TO RELATED APPLICATIONS

This application claims priority to: U.S. Provisional Patent Application No. 63/895,053, filed Oct. 7, 2025; U.S. Provisional Patent Application No. 63/874,393, filed Sep. 2, 2025; U.S. Provisional Patent Application No. 63/856,653, filed Aug. 3, 2025; U.S. Provisional Patent Application No. 63/826,342, filed Jun. 18, 2025; U.S. Provisional Patent Application No. 63/811,859, filed May 25, 2025; U.S. Provisional Patent Application No. 63/784,089, filed Apr. 5, 2025; U.S. Provisional Patent Application No. 63/752,940, filed Feb. 3, 2025; U.S. Provisional Patent Application No. 63/743,658, filed Jan. 10, 2025; And U.S. Provisional Patent Application No. 63/734,031, filed Dec. 13, 2024. This application is also a Continuation of U.S. patent application Ser. No. 19/017,420, filed Jan. 11, 2025, which is a Continuation-In-Part of U.S. patent application Ser. No. 18/981,443, filed Dec. 13, 2024. U.S. patent application Ser. No. 19/017,420 claims priority to: U.S. Provisional Patent Application No. 63/719,640, filed 12 Nov. 2024; U.S. Provisional Patent Application No. 63/701,554, filed 30 Sep. 2024; U.S. Provisional Patent Application No. 63/695,957, filed 18 Sep. 2024; U.S. Provisional Patent Application No. 63/678,045, filed 31 Jul. 2024; U.S. Provisional Patent Application No. 63/652,165, filed 27 May 2024; and U.S. Provisional Patent Application No. 63/641,404, filed 1 May 2024. U.S. patent application Ser. No. 18/981,443 claims priority to U.S. Provisional Patent Application No. 63/609,833, filed 13 Dec. 2023.

BACKGROUND

Modern datacenters face unprecedented computational demands driven by generative AI (GenAI), Large Language Models (LLMs), and distributed machine learning workloads that require massive parallelization across heterogeneous computing resources. These evolving workloads, alongside High-Performance Computing (HPC) applications such as real-time analytics, genomics research, and climate modeling, demand flexible architectures that can efficiently share memory and computational resources across multiple processing elements. The convergence of AI training, inference at scale, and memory-intensive applications has created scenarios where traditional boundaries between compute domains limit system efficiency and scalability.

The proliferation of diverse interconnect technologies, including Compute Express Link (CXL), NVLink, PCIe, and Ultra Accelerator Link (UALink), enable high-bandwidth communication between processors, accelerators, and memory devices. Each protocol operates within its own addressing scheme and communication paradigm, with devices utilizing distinct physical address spaces for memory access and resource allocation. As datacenters adopt heterogeneous computing models combining CPUs, GPUs, and domain-specific accelerators, the need for interoperability between different interconnect protocols and address spaces becomes increasingly apparent.

Current interconnect solutions face limitations when attempting to bridge different protocol domains or translate between disparate physical address spaces. Devices operating under one protocol cannot directly access resources managed by another protocol, and the rigid coupling between specific form factors and their associated functionality restricts deployment flexibility, preventing organizations from leveraging existing infrastructure while adopting new interconnect technologies.

These challenges become particularly acute in memory disaggregation scenarios, multi-tenant cloud environments, and edge computing deployments where resources had better be dynamically allocated across different protocol domains. Solutions are needed that can perform protocol translation and address space mapping while maintaining compatibility with existing datacenter infrastructure and standard form factors.

SUMMARY

Some of the disclosed embodiments introduce novel solutions that leverage standardized retimer form factors to enable physical address translation and protocol interoperability in datacenter environments. These embodiments implement address translation capabilities within semiconductor devices that utilize the PCIe Retimer Supplemental Features and Standard BGA Footprint Specification, enabling protocol bridging and address space translation in a form factor designed for high-speed signal conditioning. By incorporating computational resources for address translation within retimer-compatible packages, the embodiments enable flexible deployment across existing PCIe infrastructure while providing protocol translation capabilities that extend beyond traditional retimer functionality. The embodiments support various interconnect protocols and address translation scenarios, optionally enabling memory sharing between hosts, protocol conversion for datacenter interconnects, memory expansion and pooling, and accelerator integration across heterogeneous computing environments.

The implementation within a PCIe Retimer BGA footprint provides physical compatibility with existing retimer infrastructure, allowing organizations to deploy protocol translation capabilities essentially without redesigning board layouts or modifying mechanical designs. The standardized high-speed signaling capabilities inherent to the retimer specification enable low-latency protocol translation suitable for memory-intensive workloads. The drop-in replacement capability allows datacenter operators to upgrade existing retimer deployments with intelligent protocol translation and address translation functionality, transforming a secondary signal conditioning infrastructure into intelligent protocol translation resources that enable cross-vendor and cross-architecture scaling of datacenter infrastructures.

In one embodiment, a semiconductor device comprises an integrated circuit (IC) package comprising high speed differential I/O balls positioned according to ball grid array layout defined by a PCIe Retimer Supplemental Features and Standard BGA Footprint Specification. The semiconductor device further comprises a first interface configured to communicate according to a first protocol, and a second interface configured to communicate according to a second protocol. Additionally, the semiconductor device comprises a computer configured to extract physical addresses carried in messages received from the first interface, translate the physical addresses, generate messages that carry the translated physical addresses, and send the messages via the second interface.

In another embodiment, a method of operating a semiconductor device comprises transmitting, according to a first protocol, via a first interface of an integrated circuit (IC)

package, wherein the IC package comprises high speed differential I/O balls positioned according to ball grid array layout defined by a PCIe Retimer Supplemental Features and Standard BGA Footprint Specification. The method further comprises transmitting, according to a second protocol, via a second interface of the IC package. Additionally, the method comprises extracting, by a computer located in the IC package, first physical addresses carried in first messages received from the first interface, translating, by the computer, the first physical addresses to second physical addresses, generating second messages that carry the second physical addresses, and sending the second messages via the second interface.

BRIEF DESCRIPTION OF THE DRAWINGS

FIG. 2A illustrates one embodiment of a system comprising a processor including a CXL EP configured to enable an external entity to access memory resources mapped to the processor coherent interconnect's address space;

FIG. 2B illustrates one embodiment of a TFD demonstrating translation from a CXL.mem M2S Request to an M2S Request utilized by a processor's coherent interconnect;

FIG. 22A illustrates one embodiment of a system comprising a processor comprising UALink and ISoL ports;

FIG. 22B illustrates one embodiment of a TFD demonstrating translating a UPLI Request to a request utilized by a processor's coherent interconnect;

FIG. 33A illustrates one embodiment of a system comprising a cable that translates between a UALink-based protocol and a CXL-based protocol;

FIG. 33B illustrates one embodiment of a TFD demonstrating translations performed by a cable between a UALink-based protocol and CXL.cache protocol;

FIG. 58A illustrates one embodiment of a processing pipeline for extracting passenger protocol messages from carrier protocol communications received over a PHY based on IEEE 802.3 PMA;

FIG. 58B illustrates one embodiment of a packet structure that may be suitable for L3 switching operations;

FIG. 58C illustrates one embodiment of a packet structure that may be suitable for L2 switching operations;

FIG. 63A illustrates one embodiment of encapsulating 256-byte CXL flits into UPLI WriteFull commands;

FIG. 63B illustrates one embodiment of a TFD depicting translations utilized for encapsulating or packing of a CXL.mem request message into a 256-byte CXL flit that is further encapsulated into a UPLI WriteFull command;

FIG. 64A illustrates one embodiment of a system that translates CXL flits to UPLI transaction layer messages;

FIG. 64B illustrates one embodiment of a TFD depicting tunneling of CXL flits over a UPLI protocol;

FIG. 65A illustrates one embodiment of utilizing a UPLI Write Message command for tunneling CXL flits;

FIG. 65B illustrates one embodiment of a TFD depicting utilizing a UPLI Write Message command for tunneling a CXL transaction;

FIG. 66A illustrates one embodiment of a system configured to enable CXL over UALink, such as via CXL tunneling over UALink;

FIG. 66B illustrates one embodiment of a TFD demonstrating CXL communications over UALink, such as CXL over UALink, or CXL tunneling over UALink;

FIG. 67A illustrates one embodiment of a system comprising a host having a first CXL port, a retimer, a bridge, and a device having a second CXL port;

FIG. 67B illustrates one embodiment of a TFD demonstrating CXL communications between a host and a device based on a PHY based on IEEE 802.3 PMA utilizing UALink flits;

FIG. 68A illustrates one embodiment of a system comprising a CXL host coupled to a CXL device over two bridges utilizing a UALink PHY;

FIG. 68B illustrates one embodiment of a TFD demonstrating a translation mechanism between CXL flits and UALink flits;

Figures 69A, 69B:
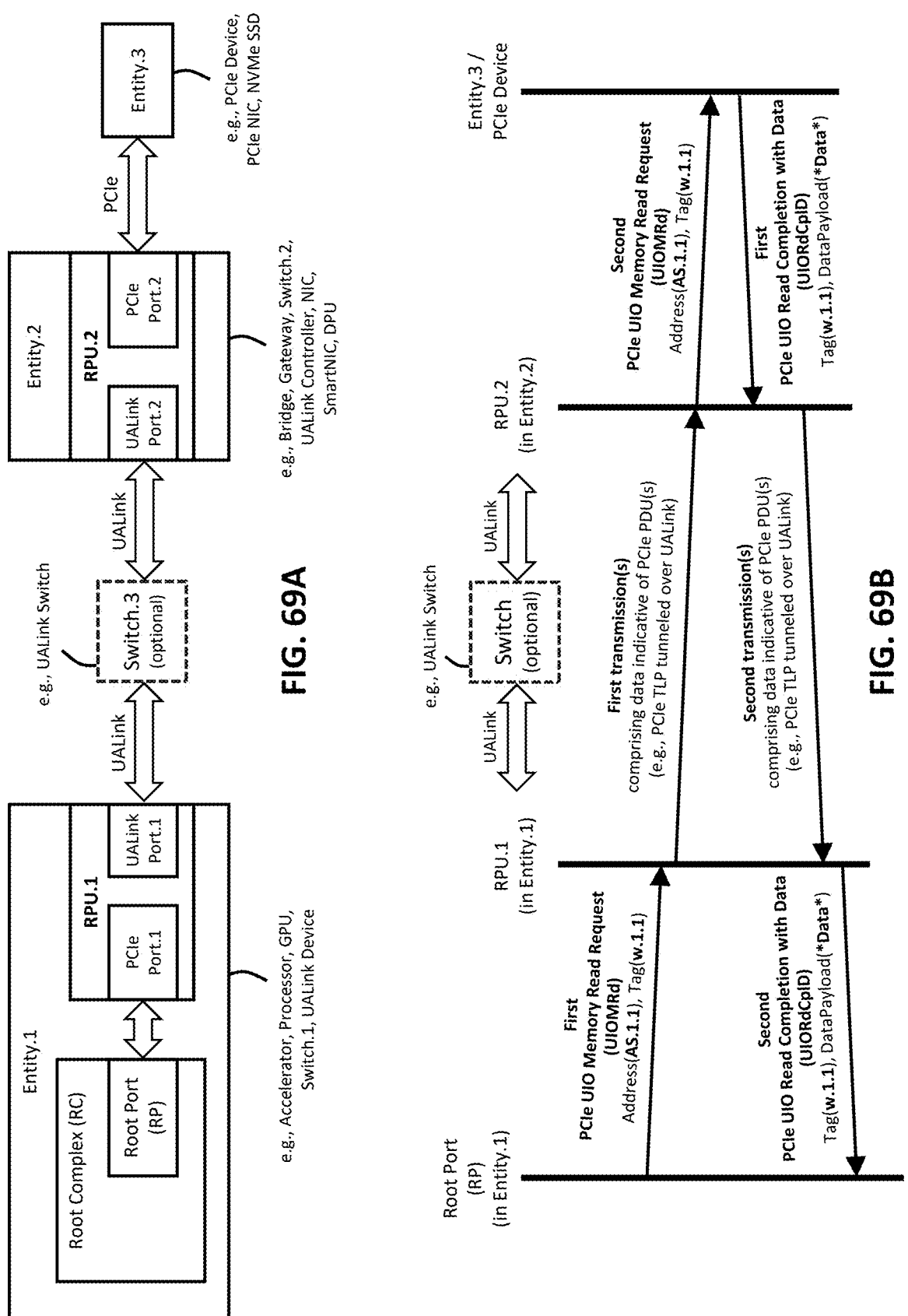
Figures 70A, 70B:
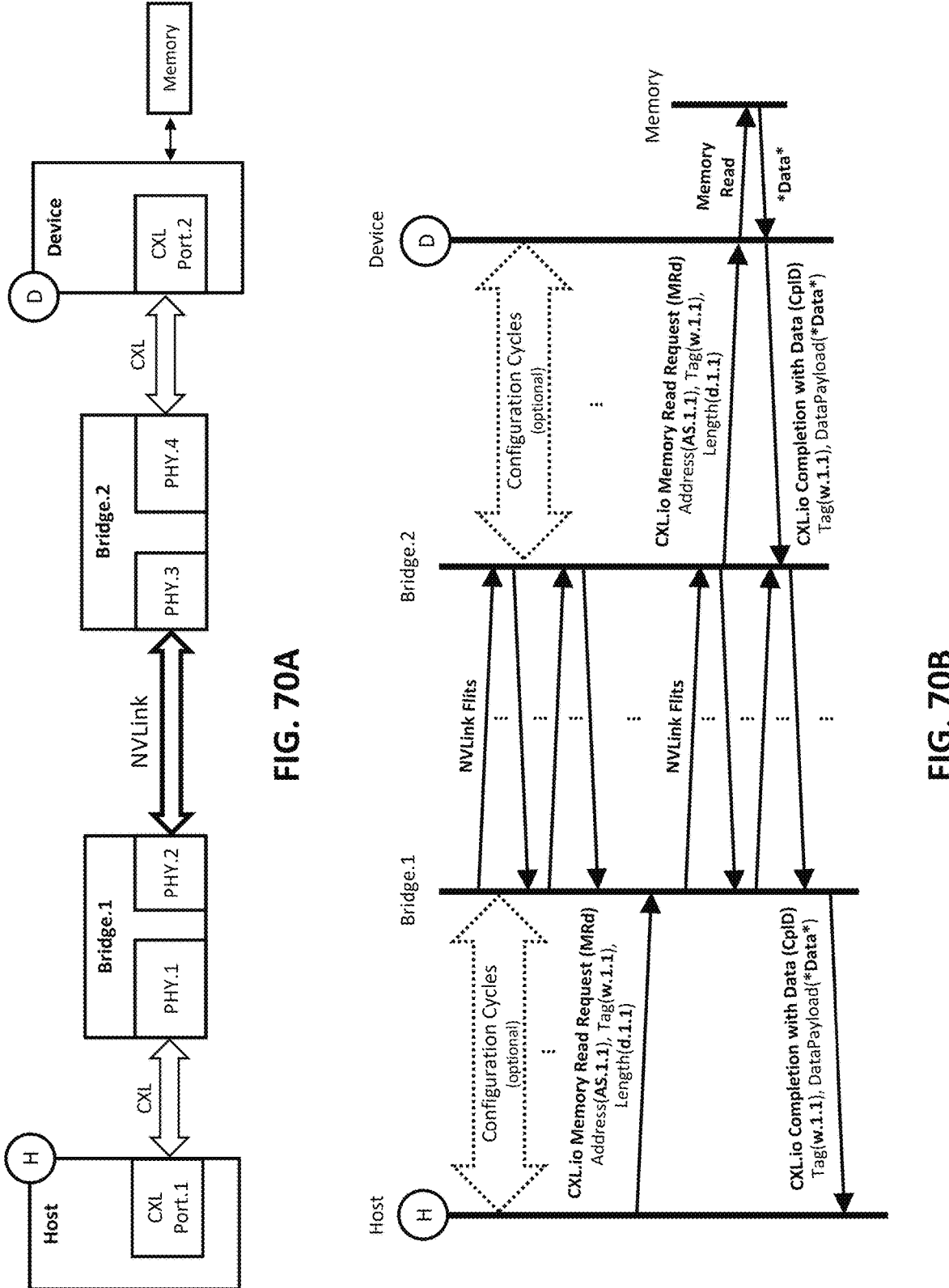
Figures 71A, 71B:
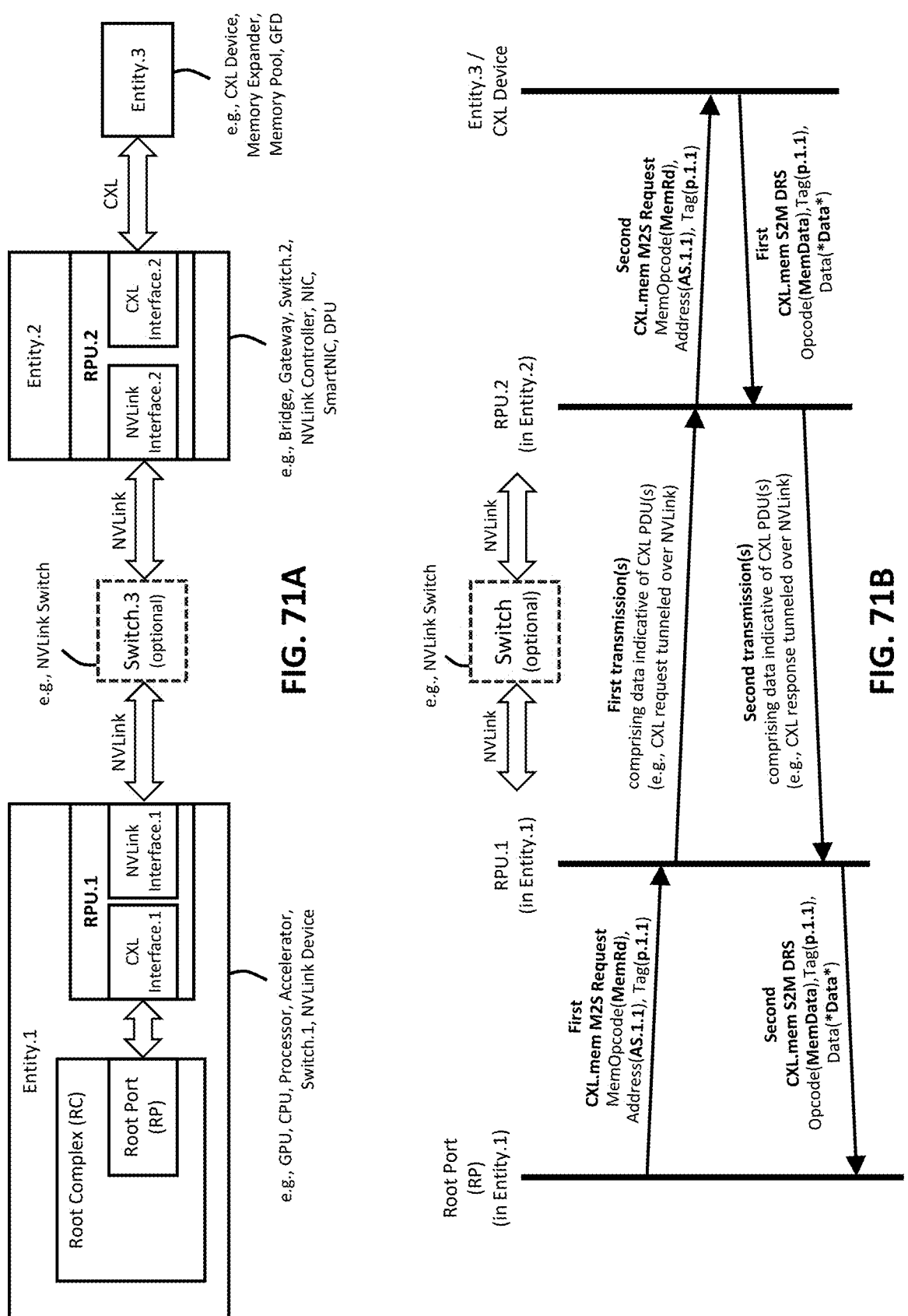
Figures 72A, 72B:
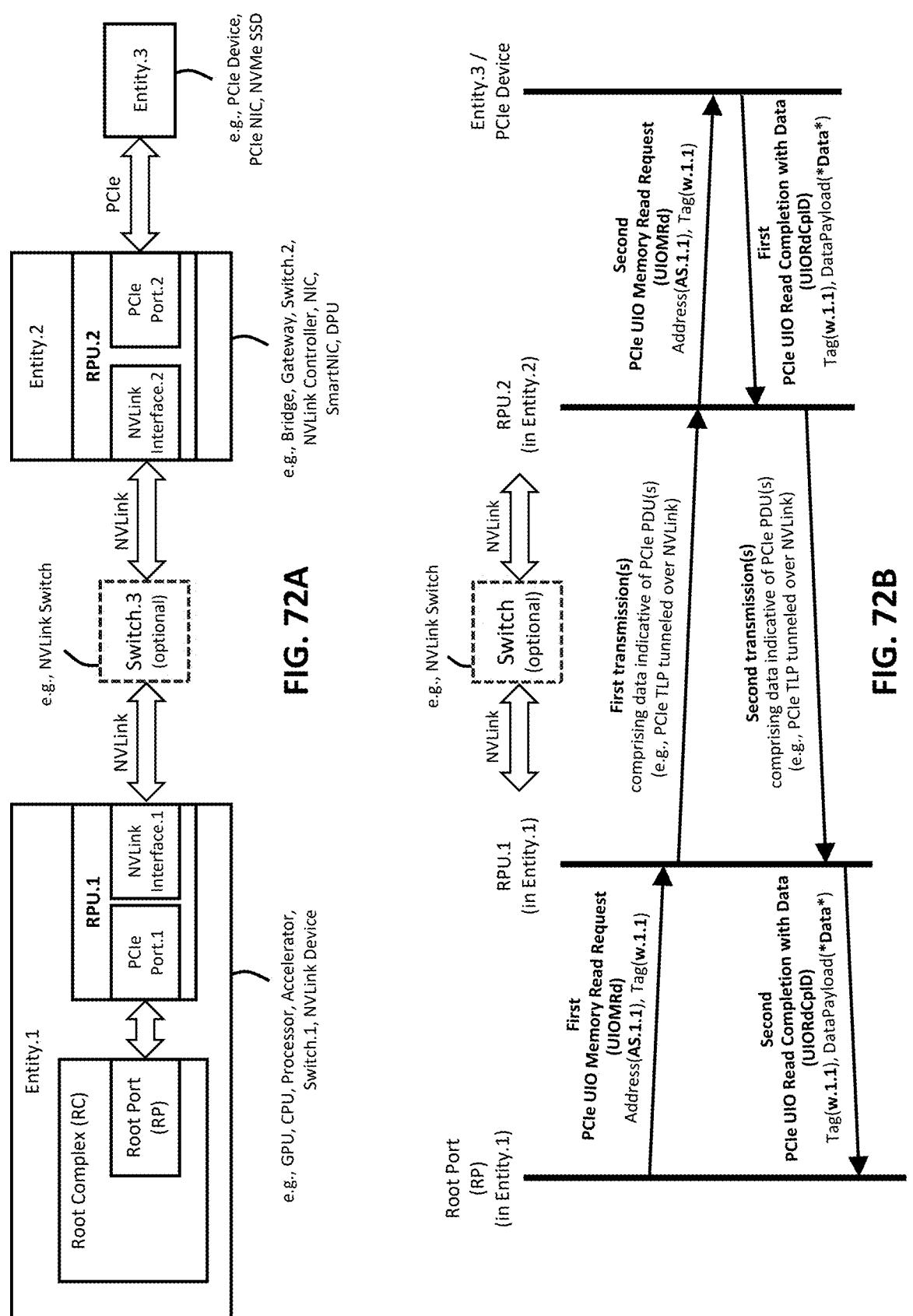
Figures 73A, 73B:
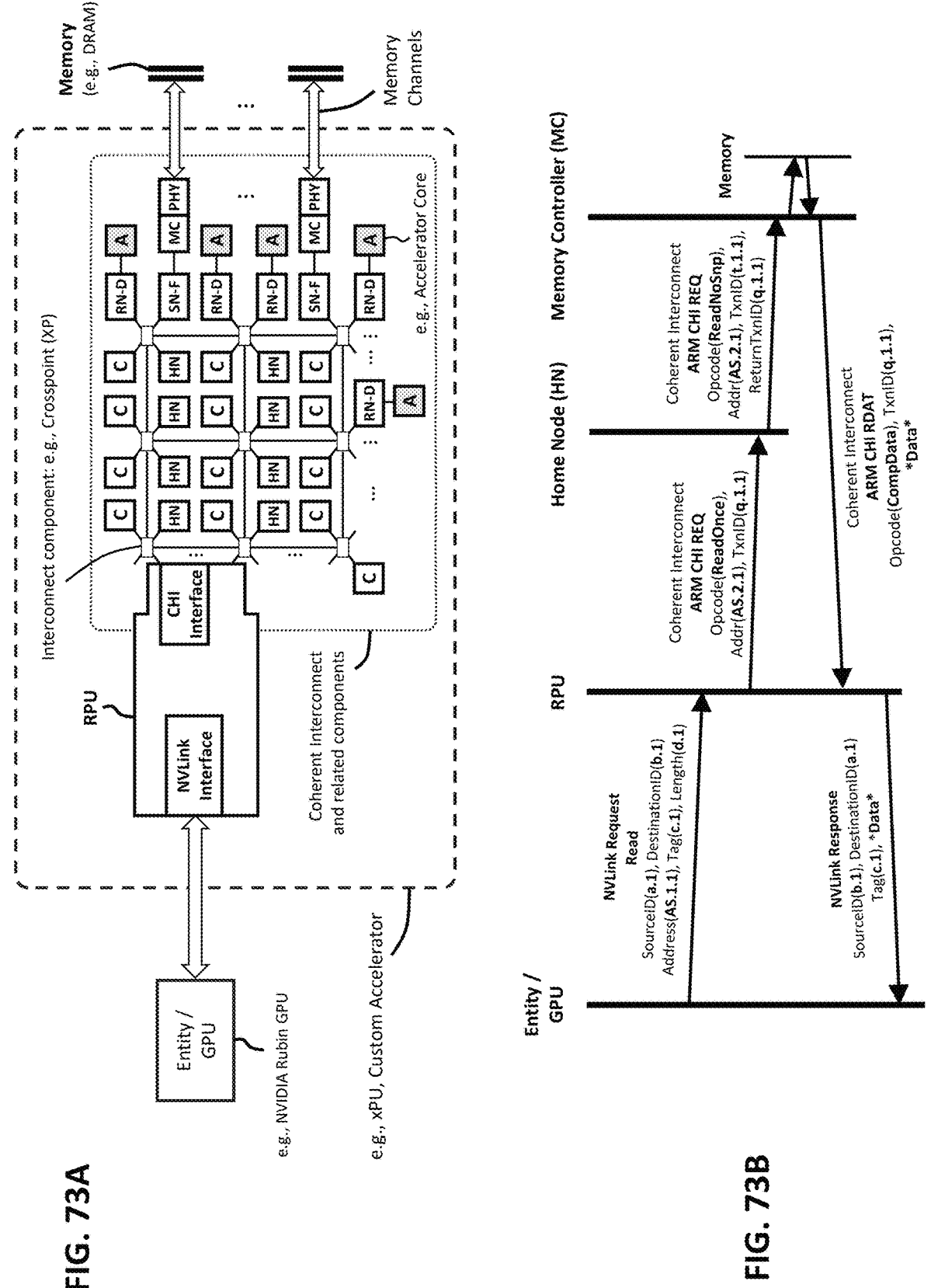
Figures 74A, 74B:
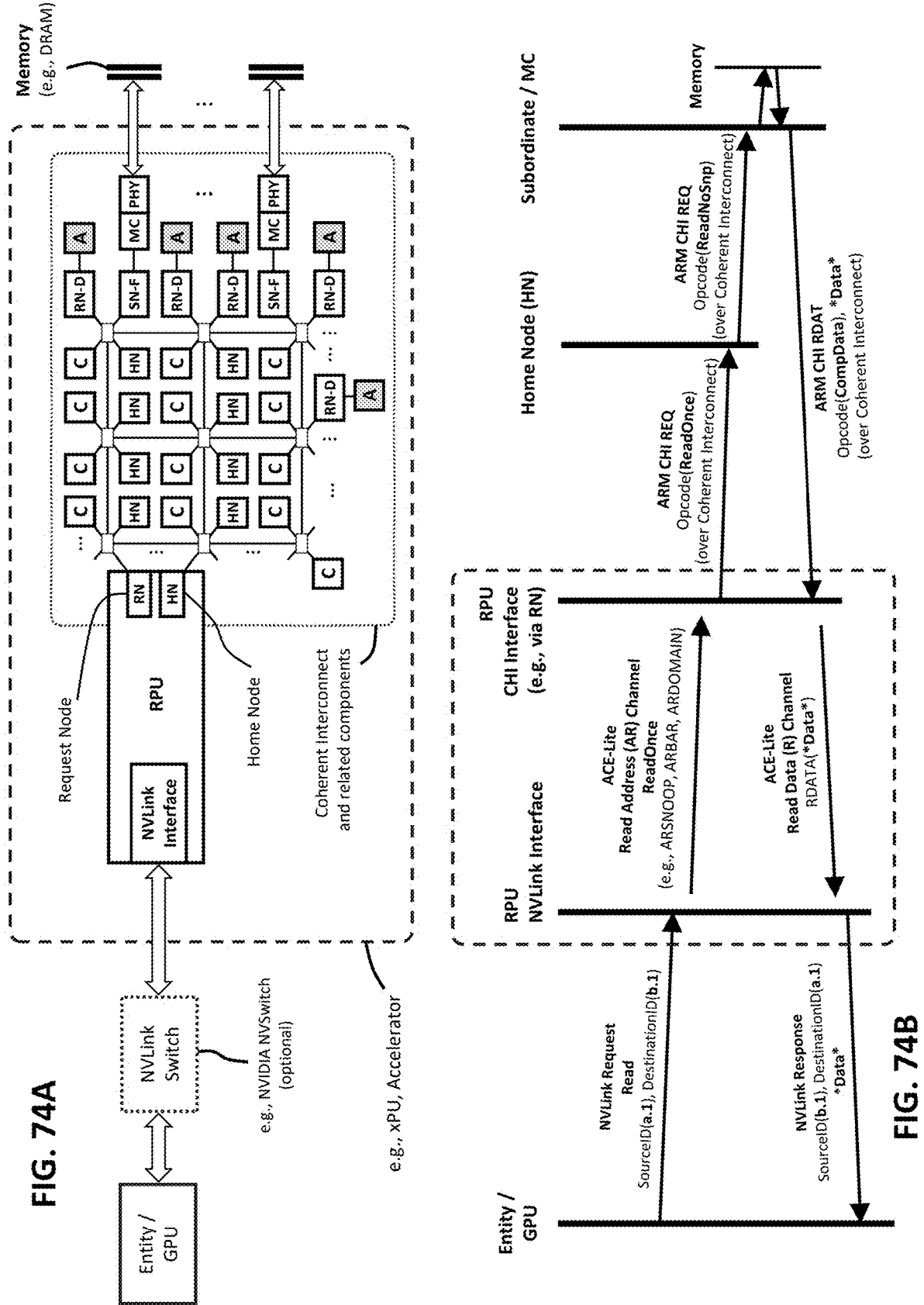
Figures 75A, 75B:
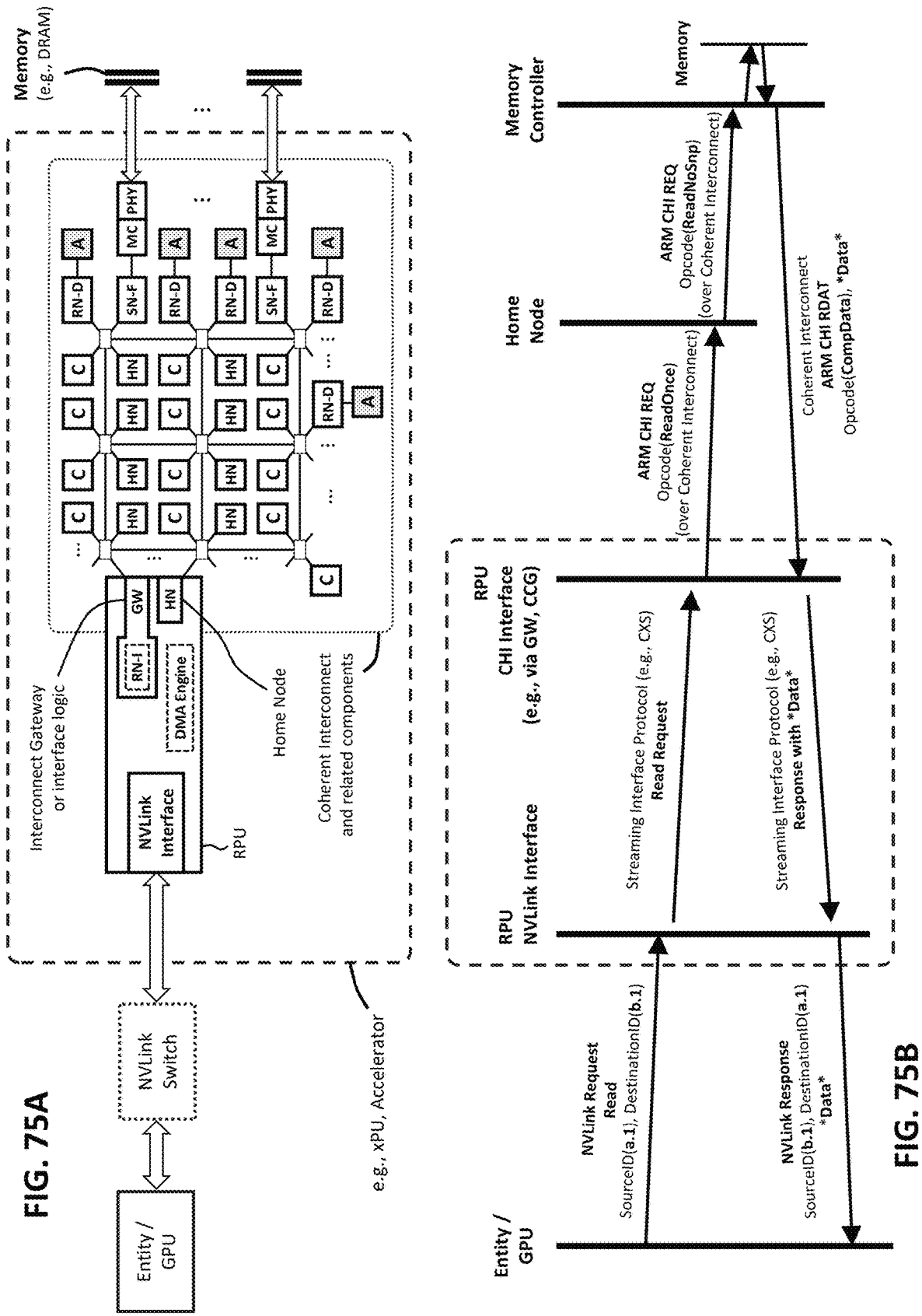
Figures 76A, 76B:
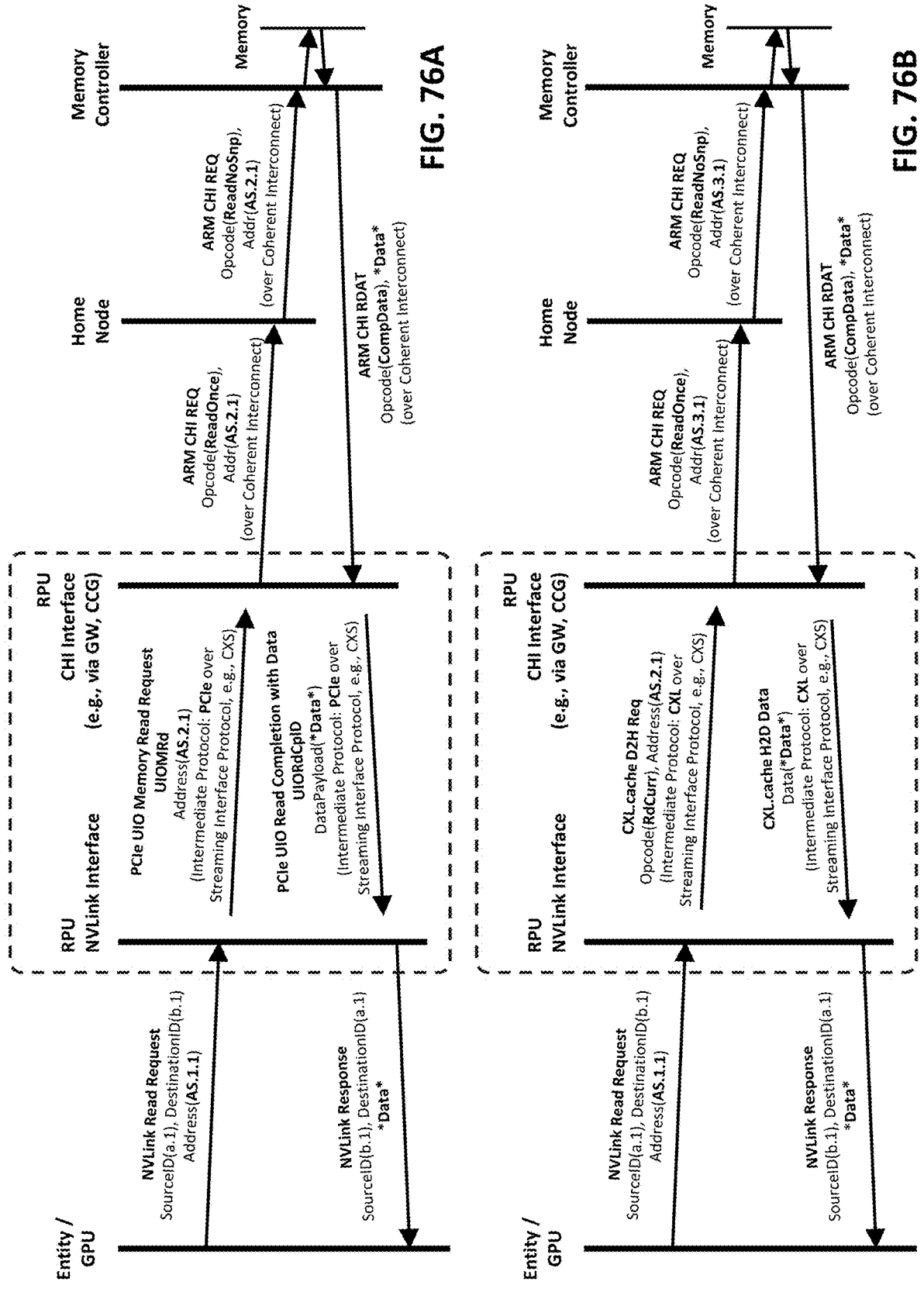
Figures 77A, 77B:
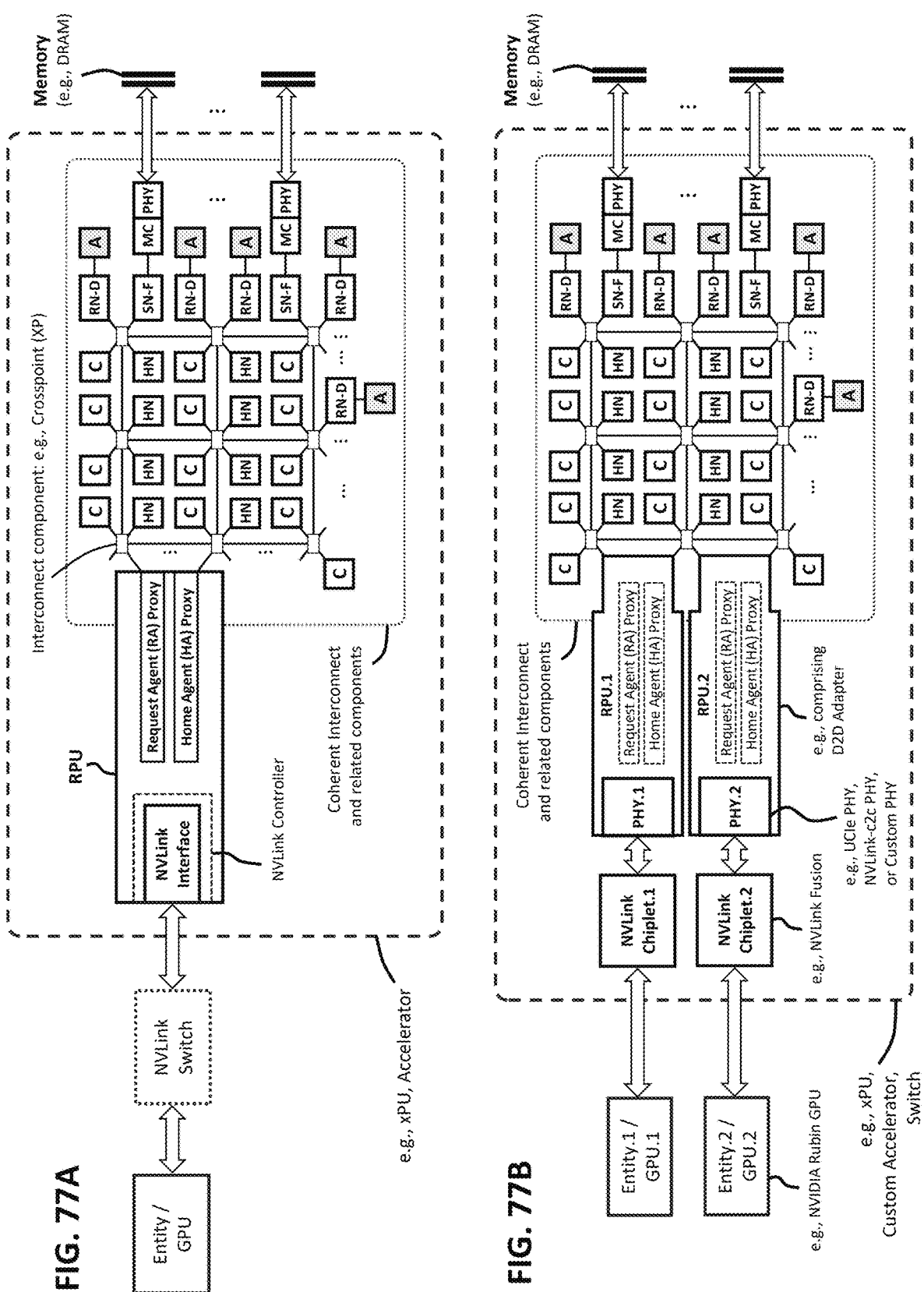
Figures 78A, 78B:
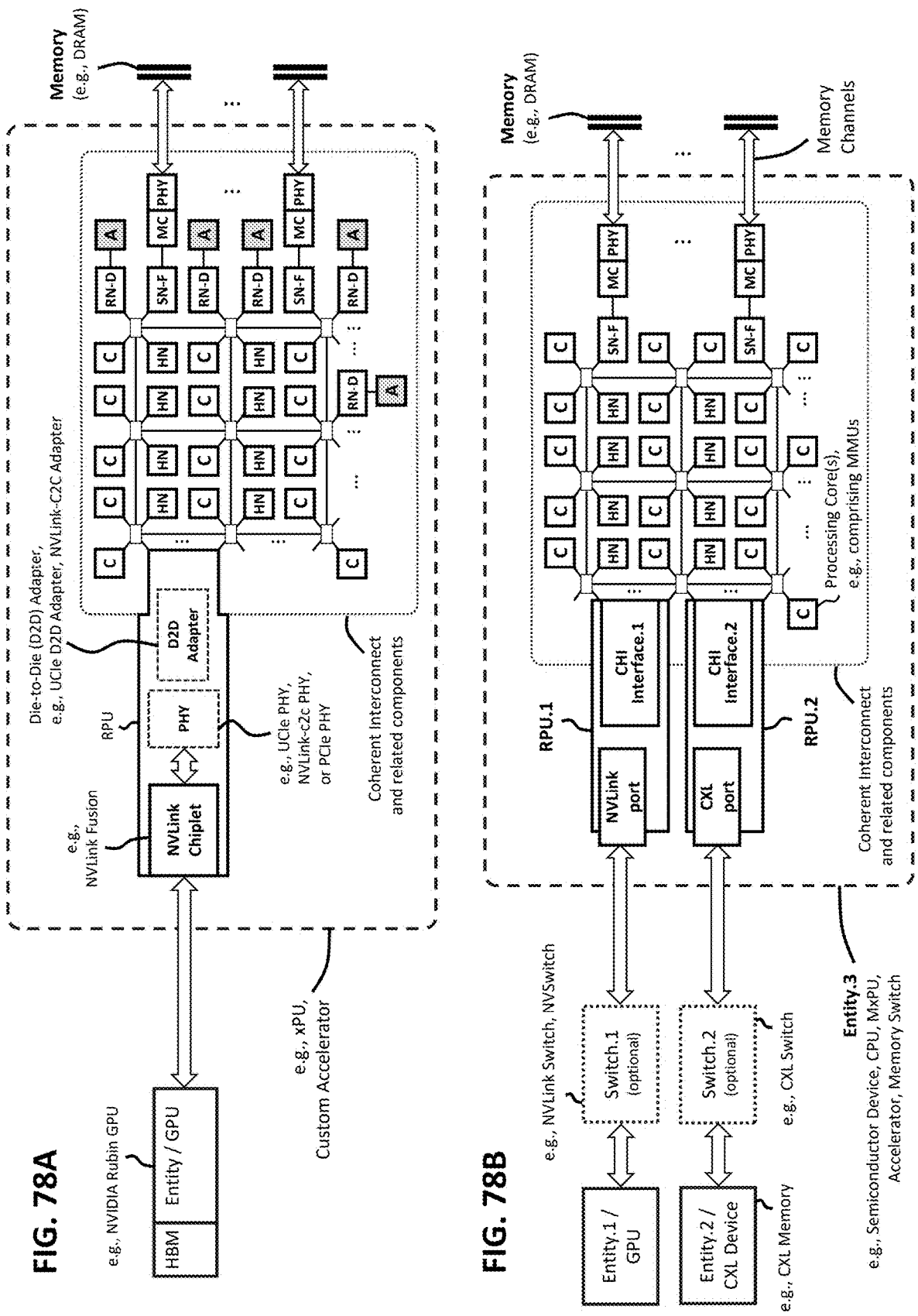
Figures 79A, 79B:
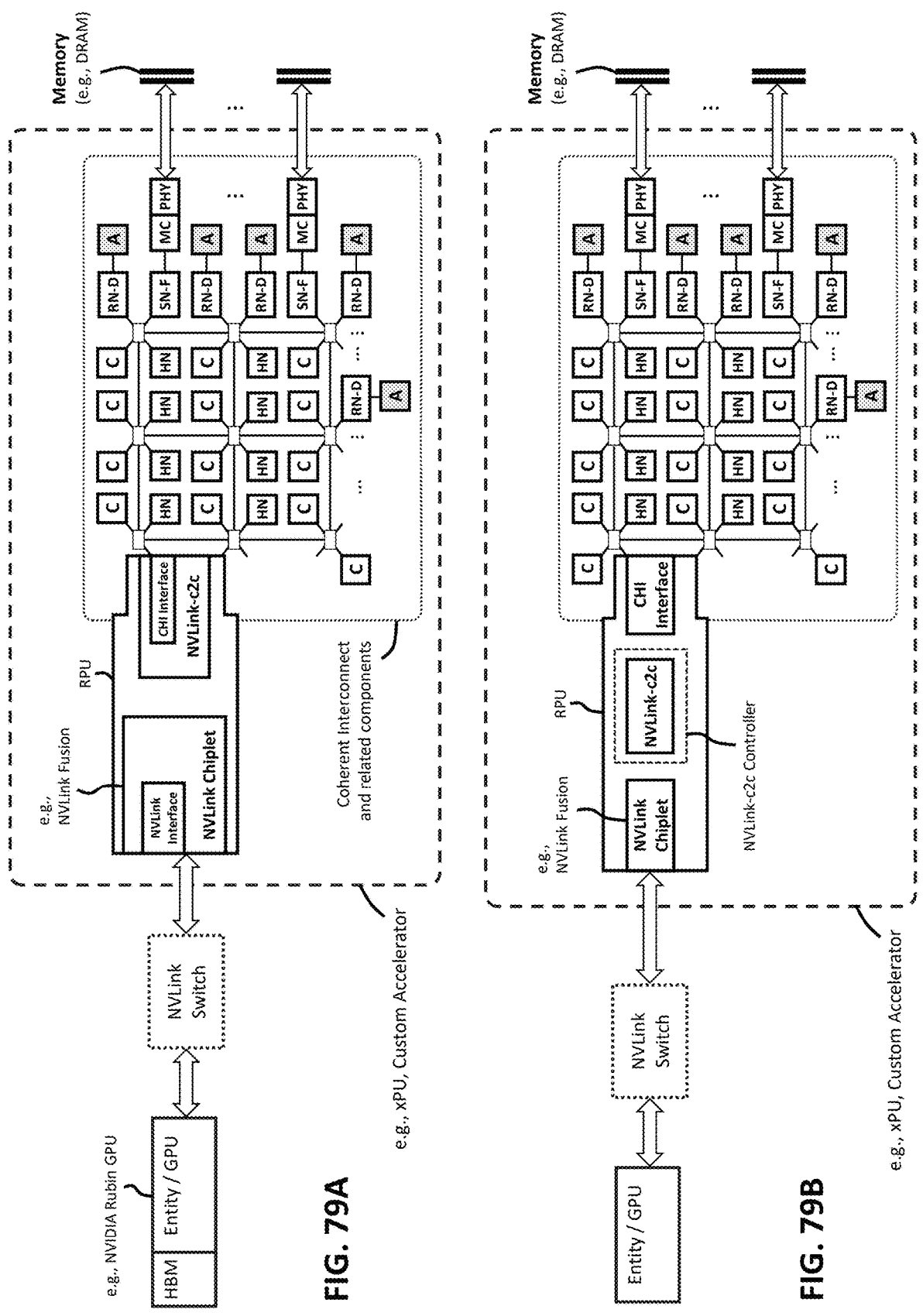
Figures 81A, 81B:
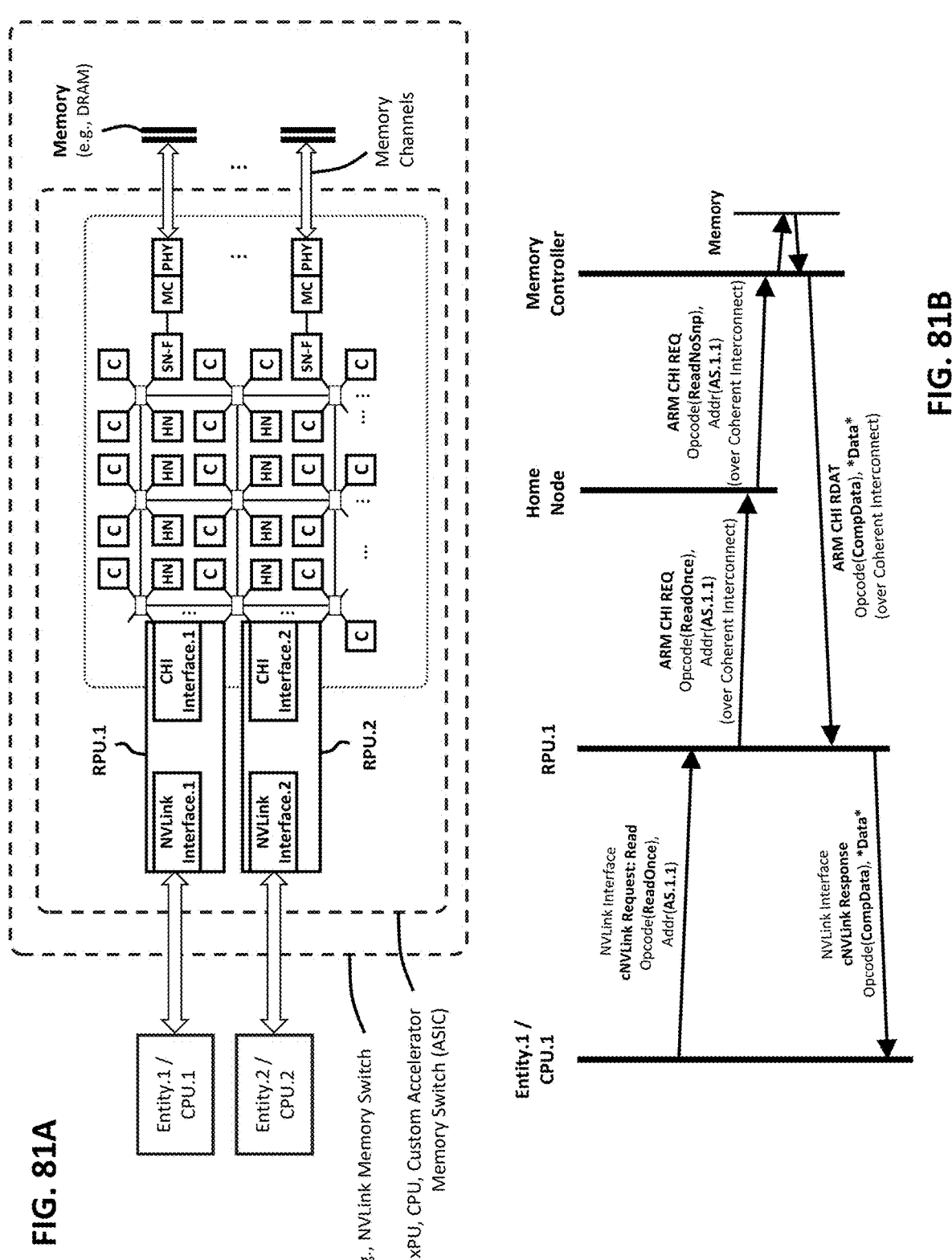
Figures 82A, 82B:
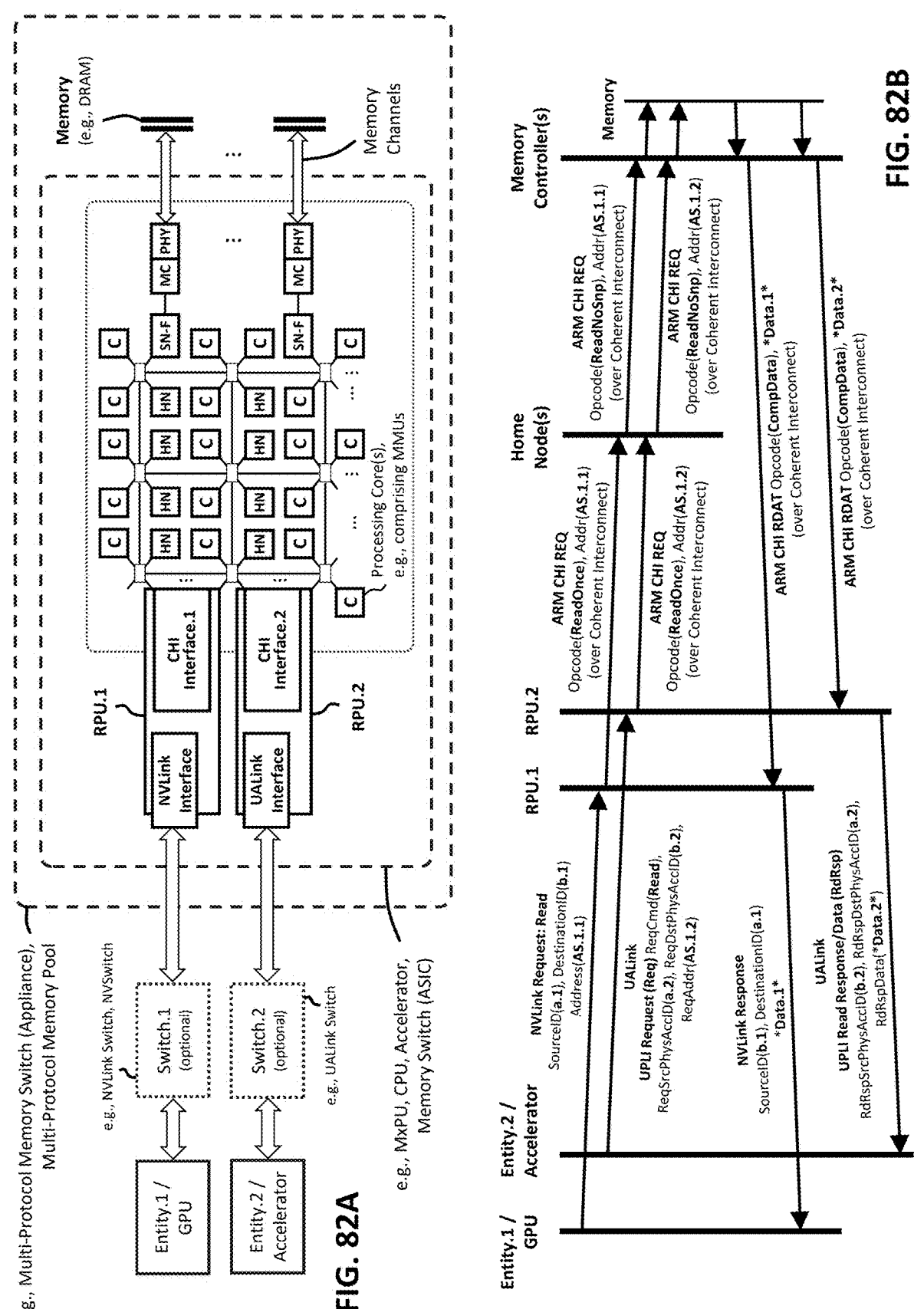
Figure 83:
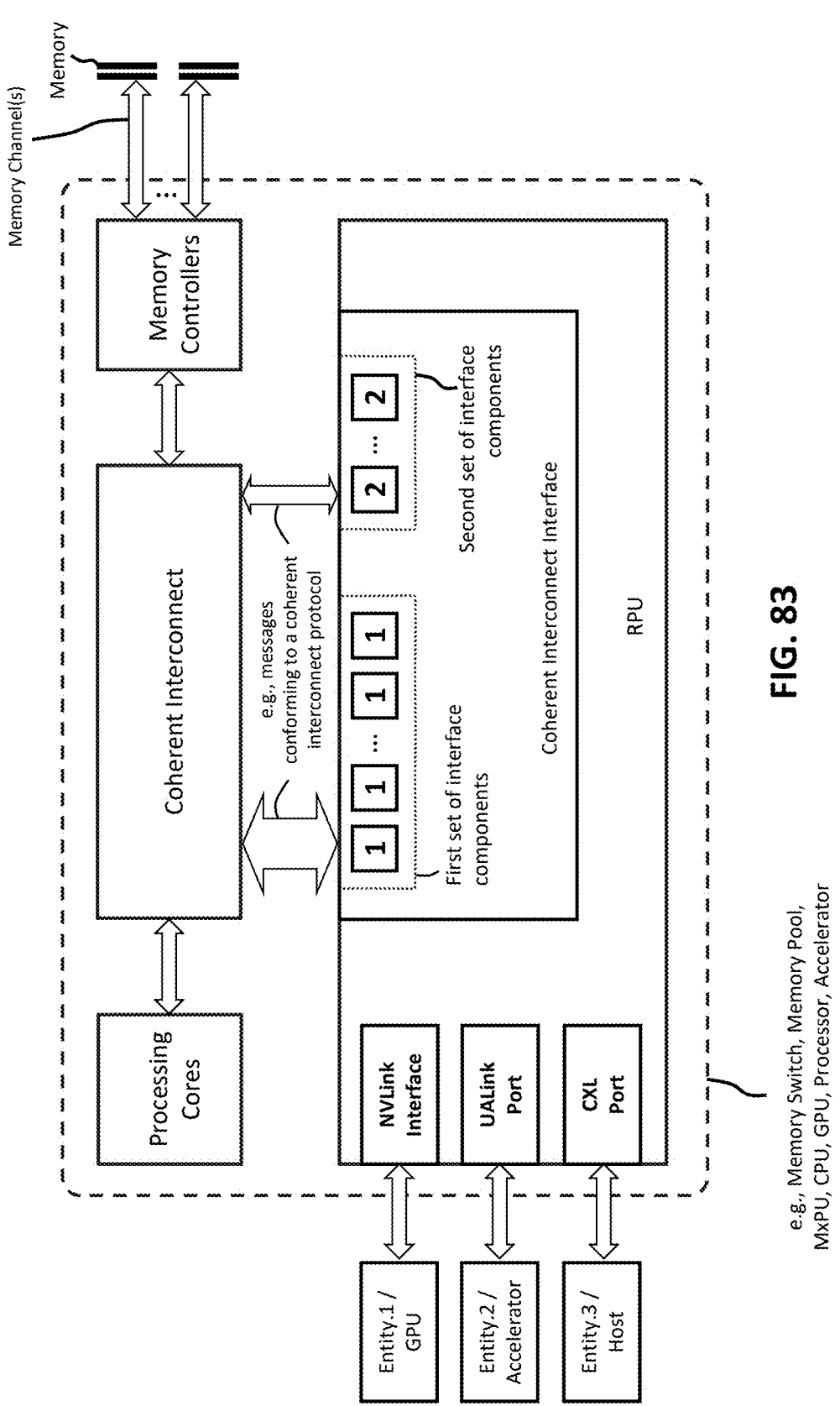
Figures 84A, 84B:
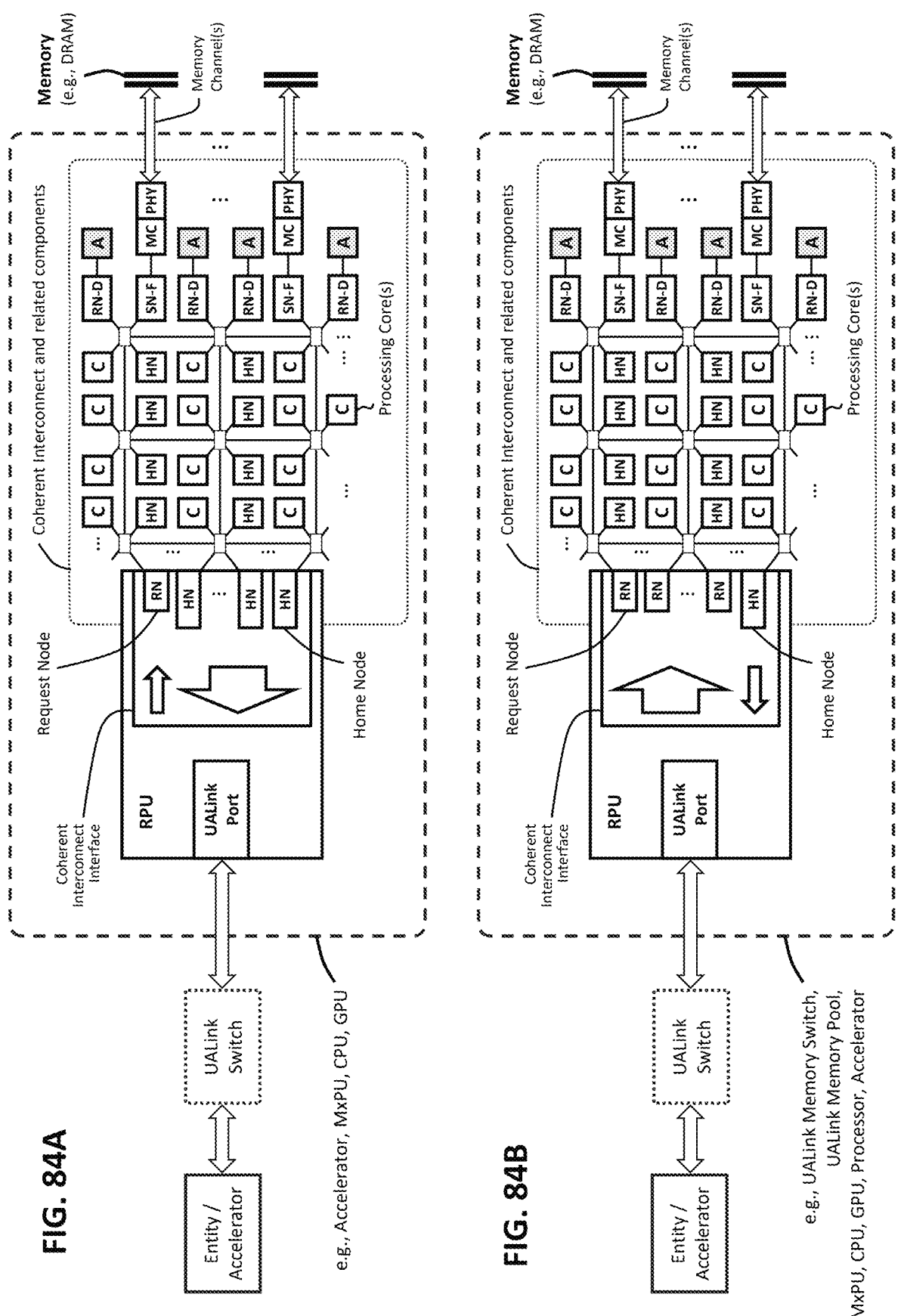
Figures 85A, 85B:
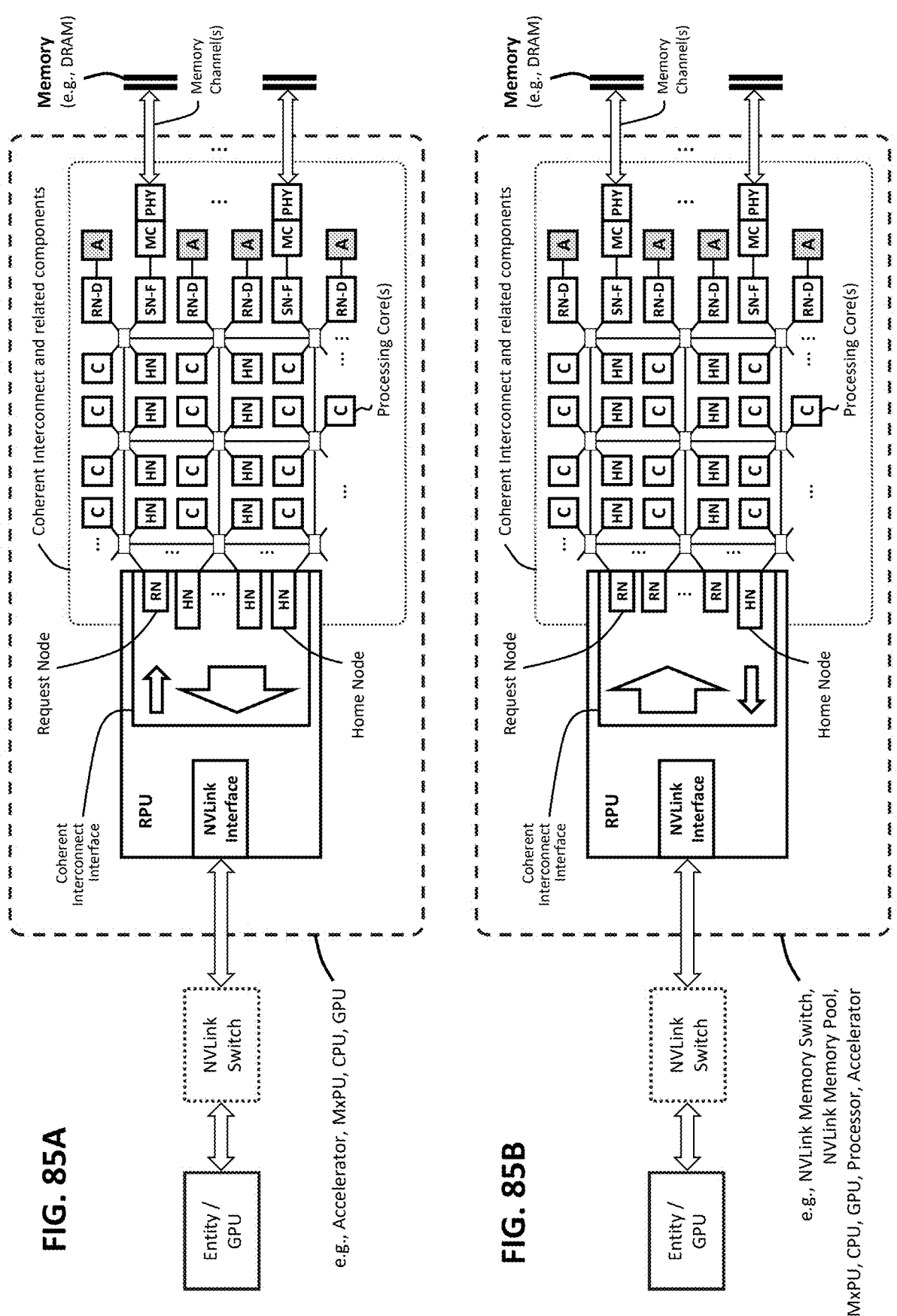
Figures 86A, 86B:
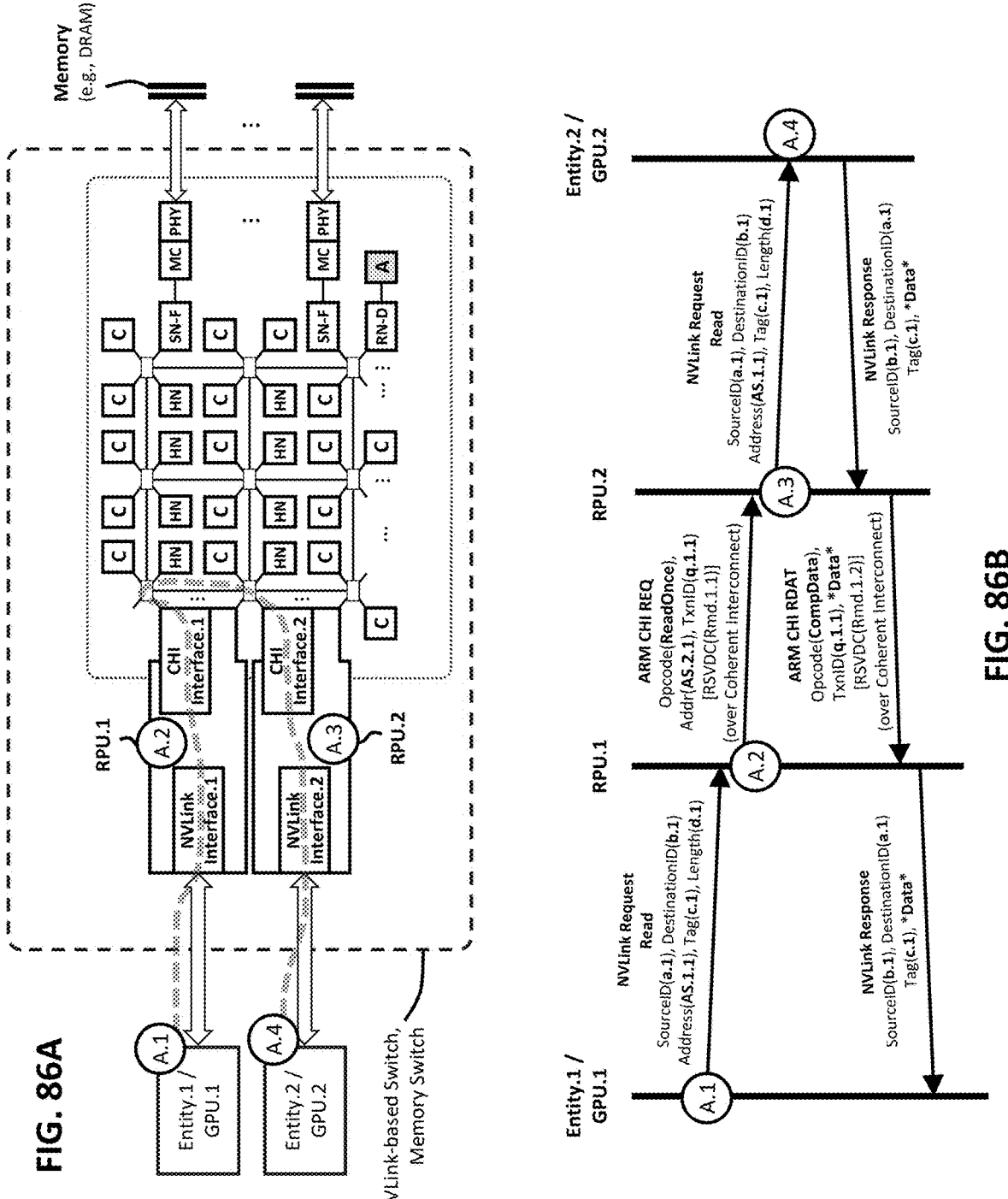
Figures 87A, 87B:
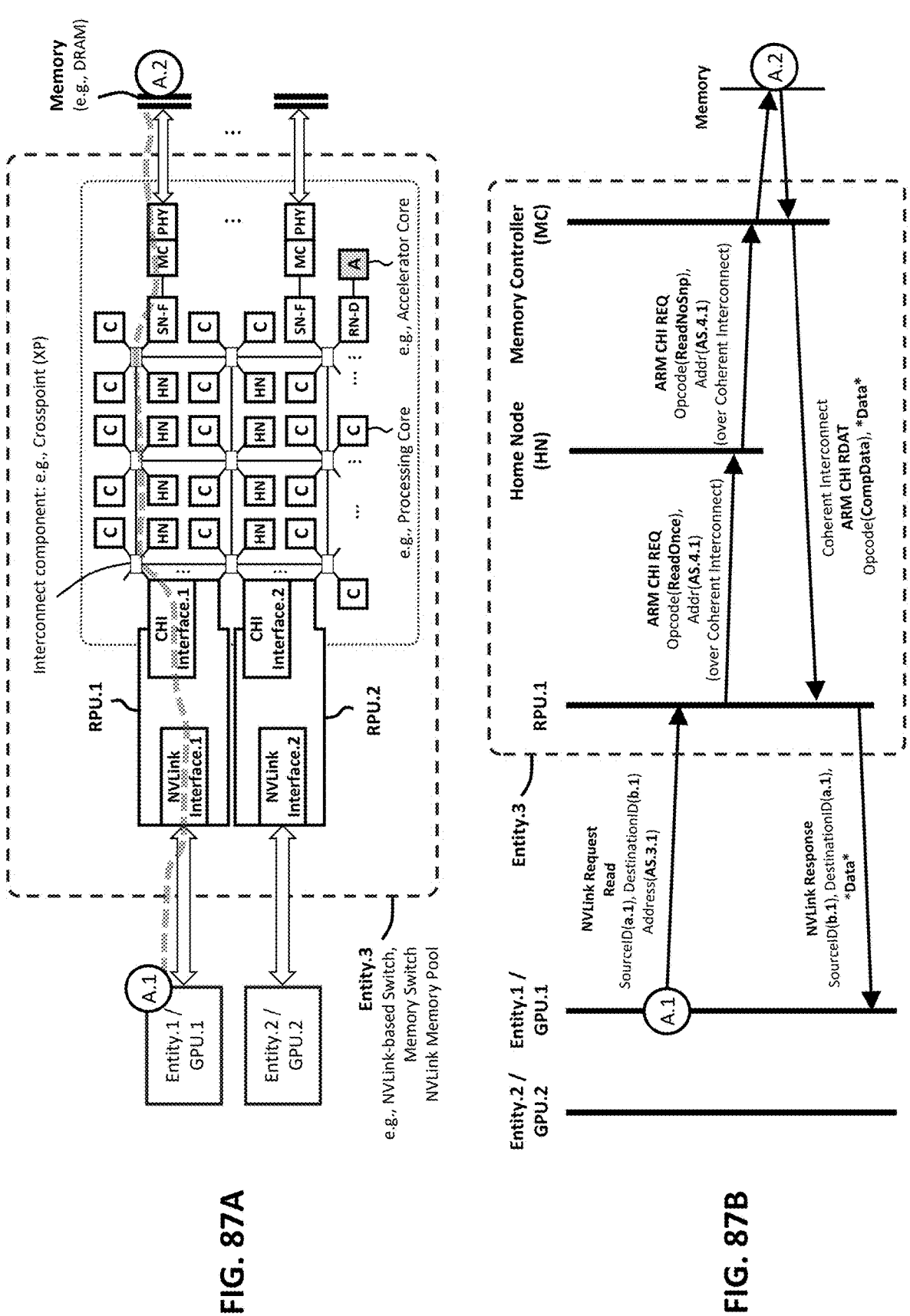
Figure 88:
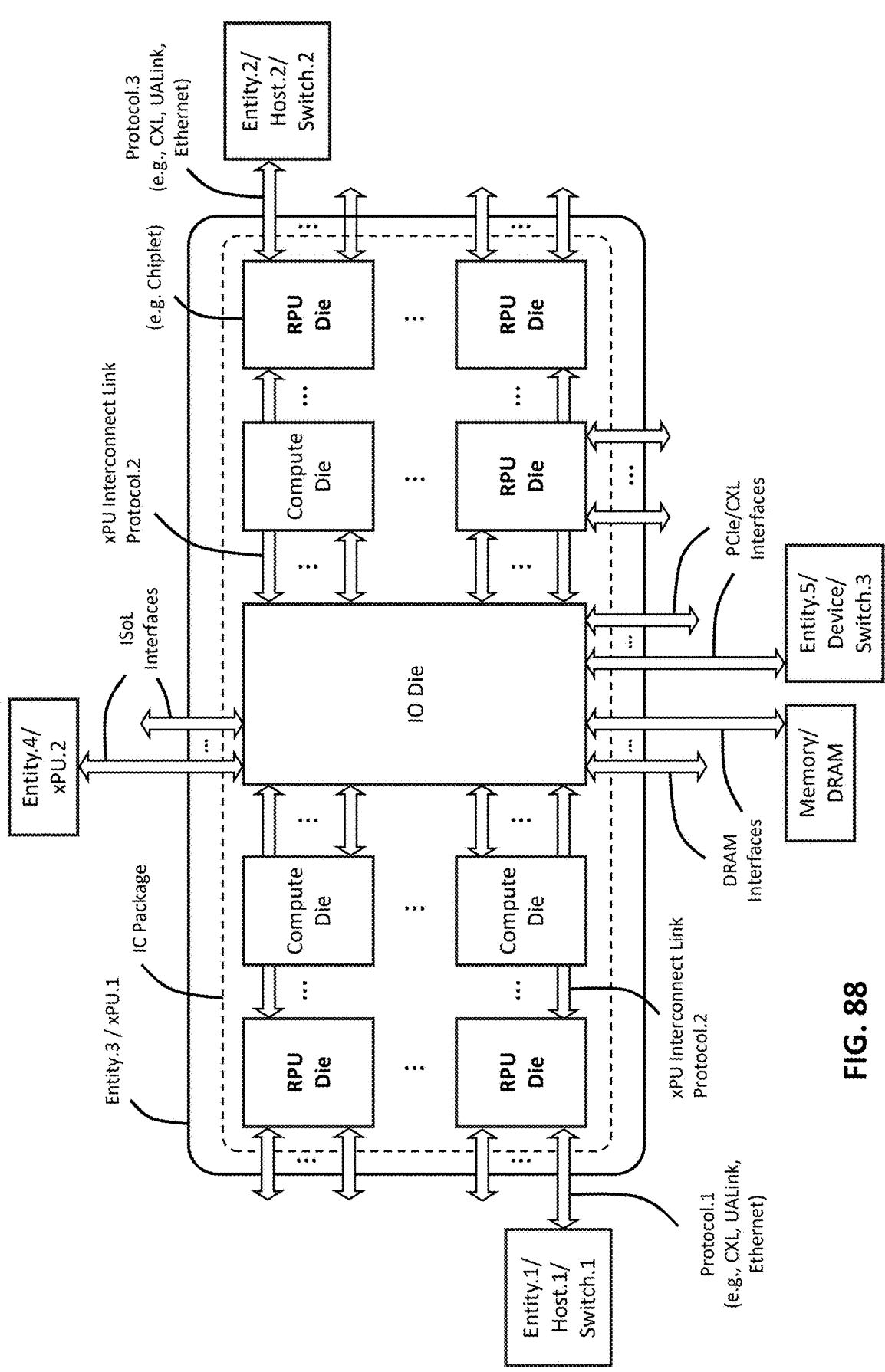
Figures 89A, 89B:
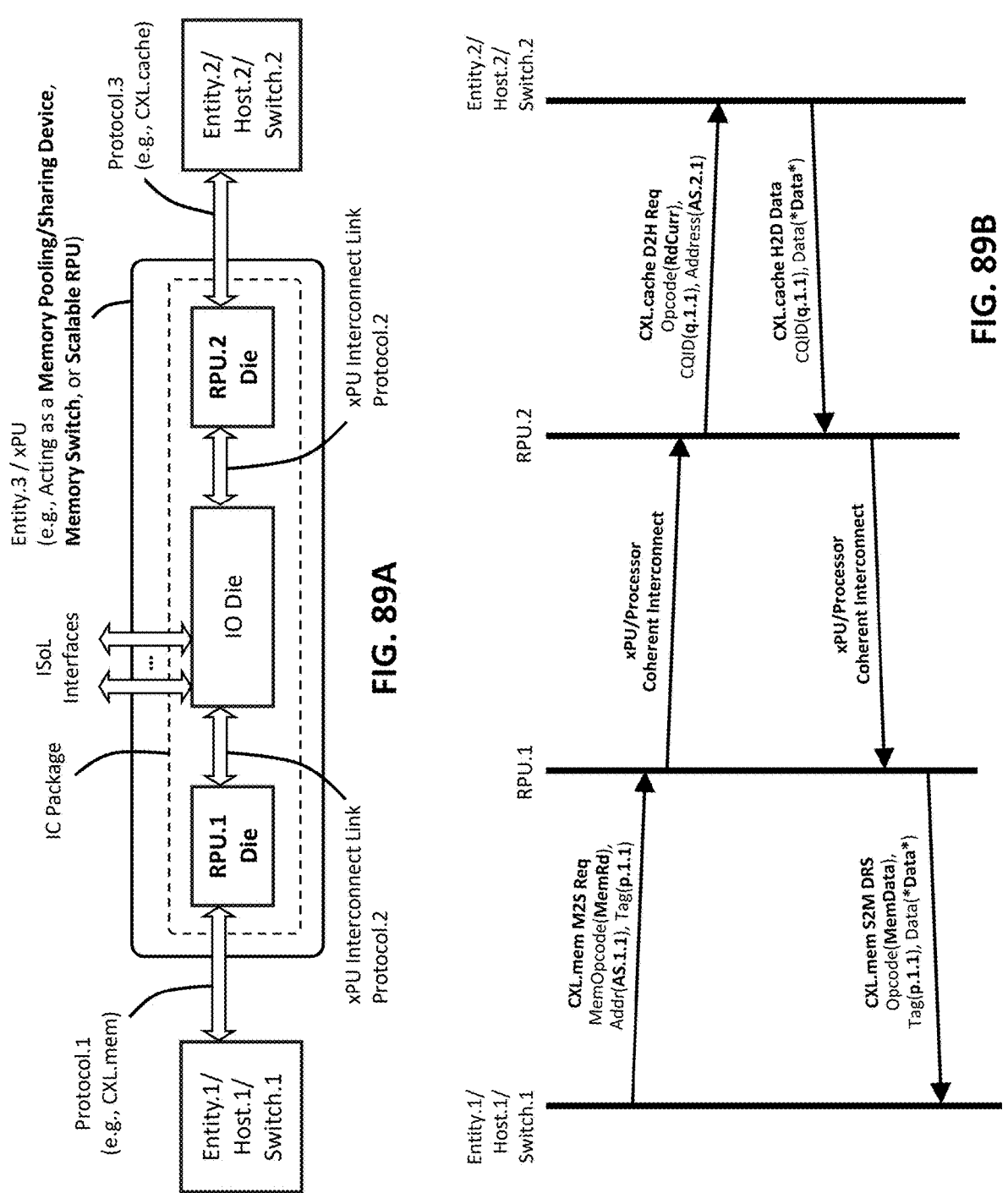
Figures 90A, 90B:
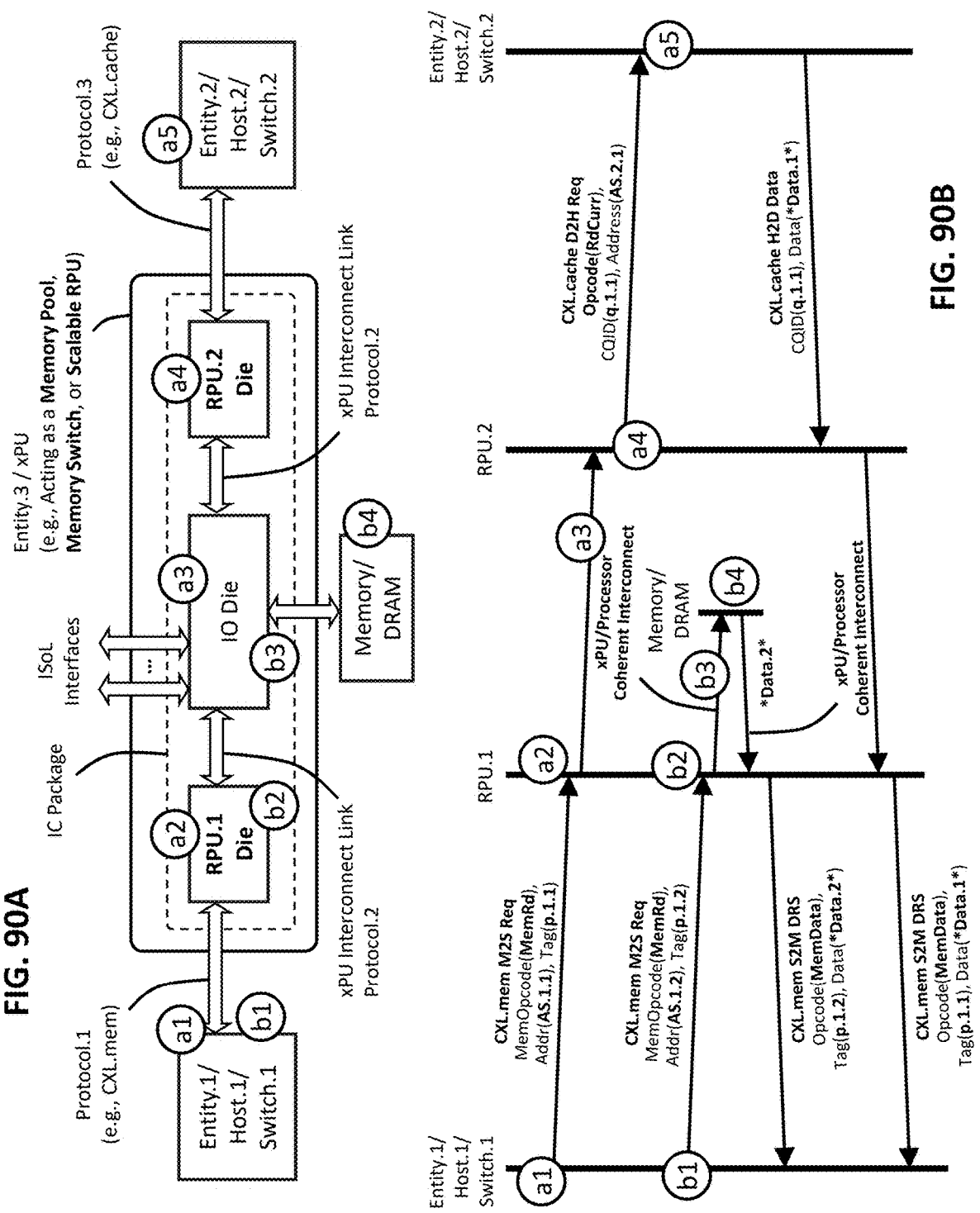
Figures 91A, 91B:
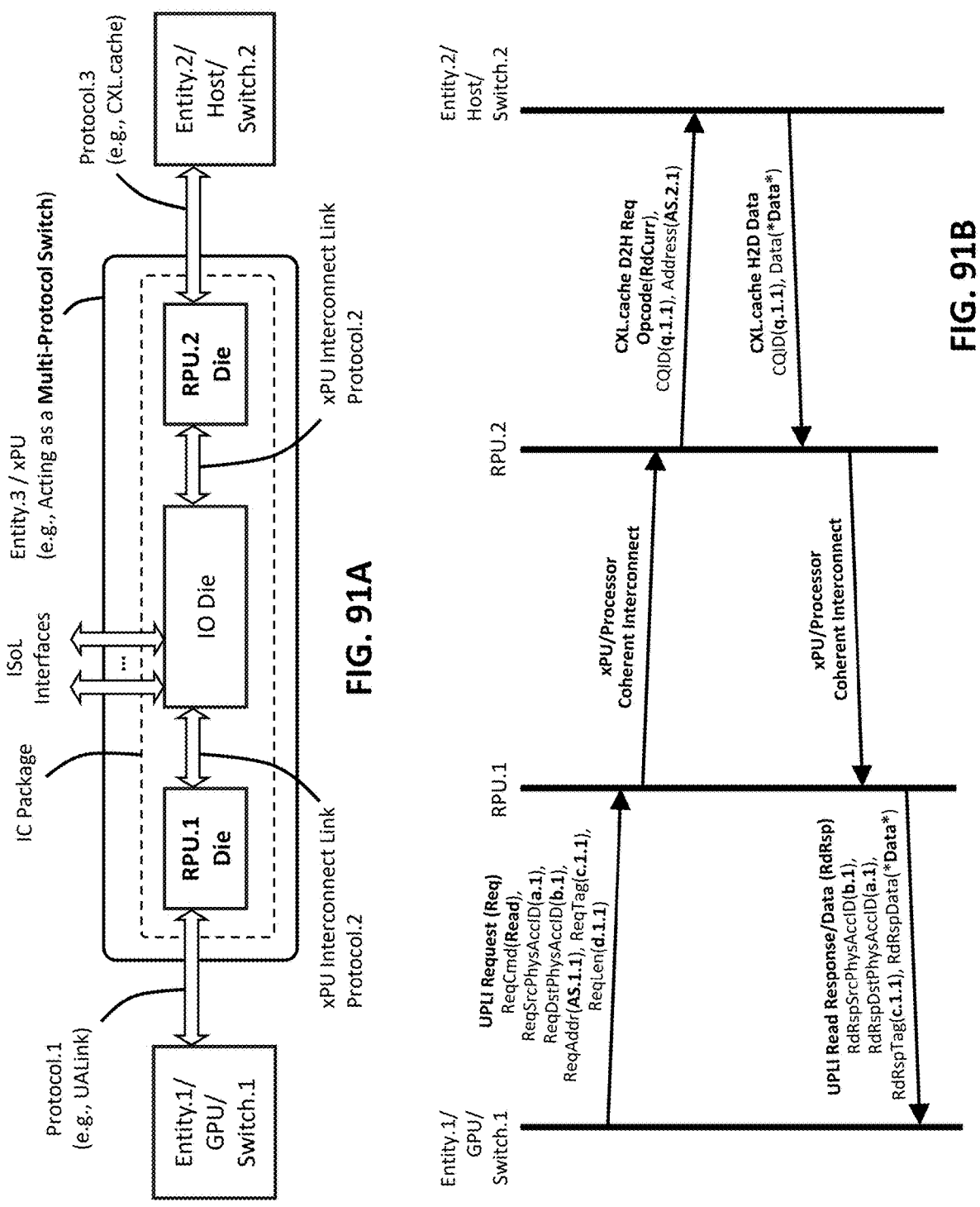
Figures 92A, 92B:
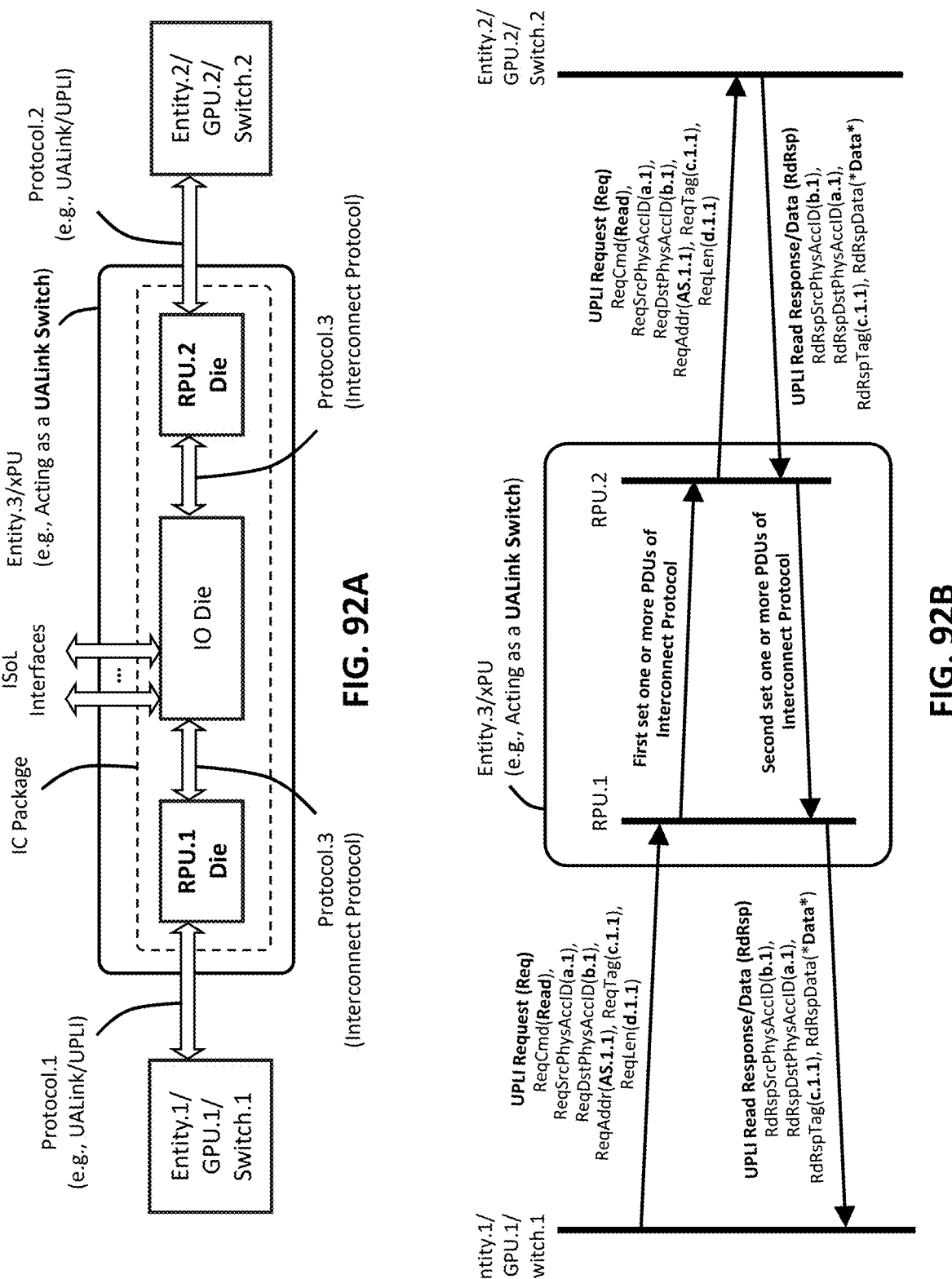
Figure 93:
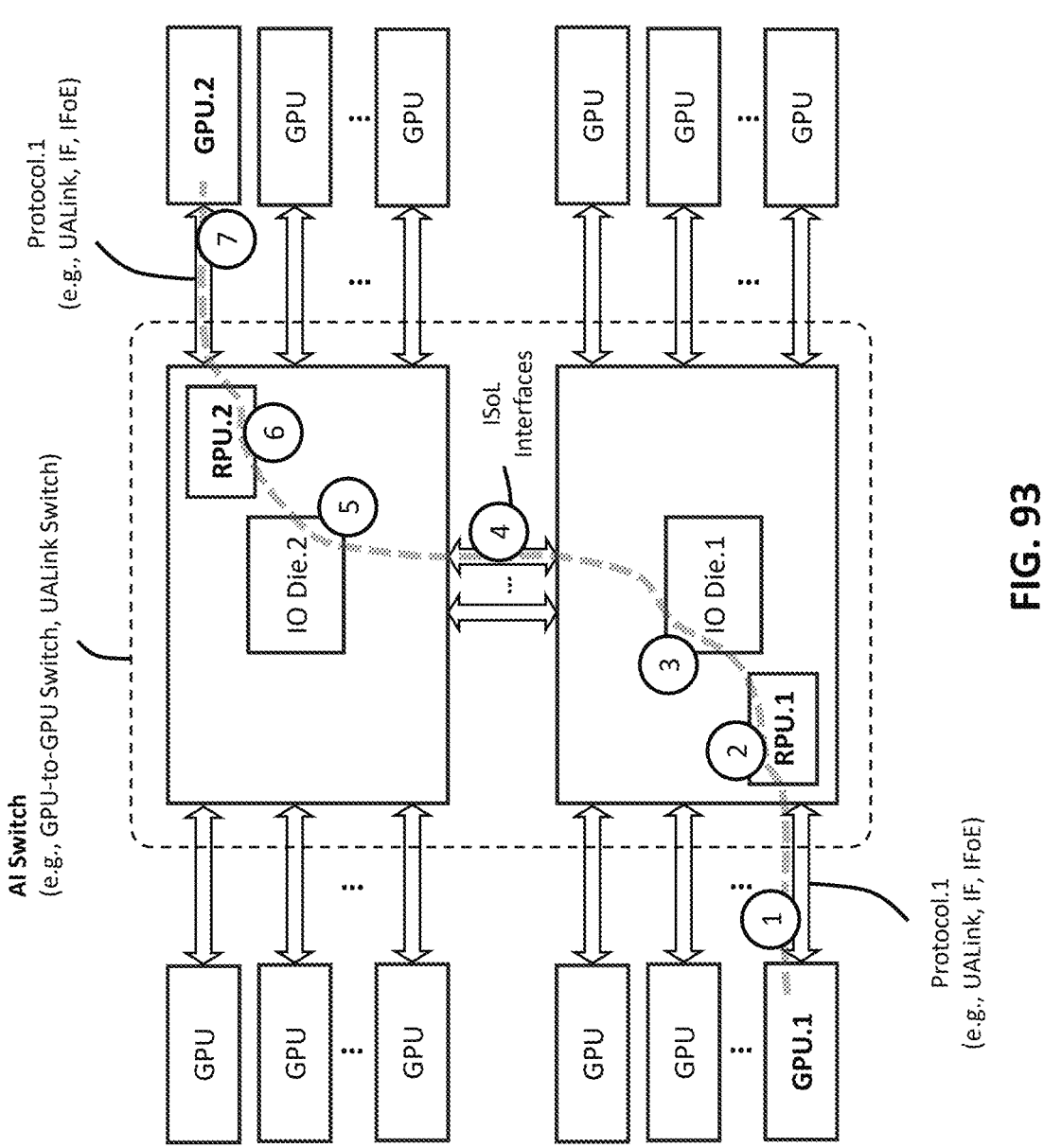
Figures 94A, 94B:
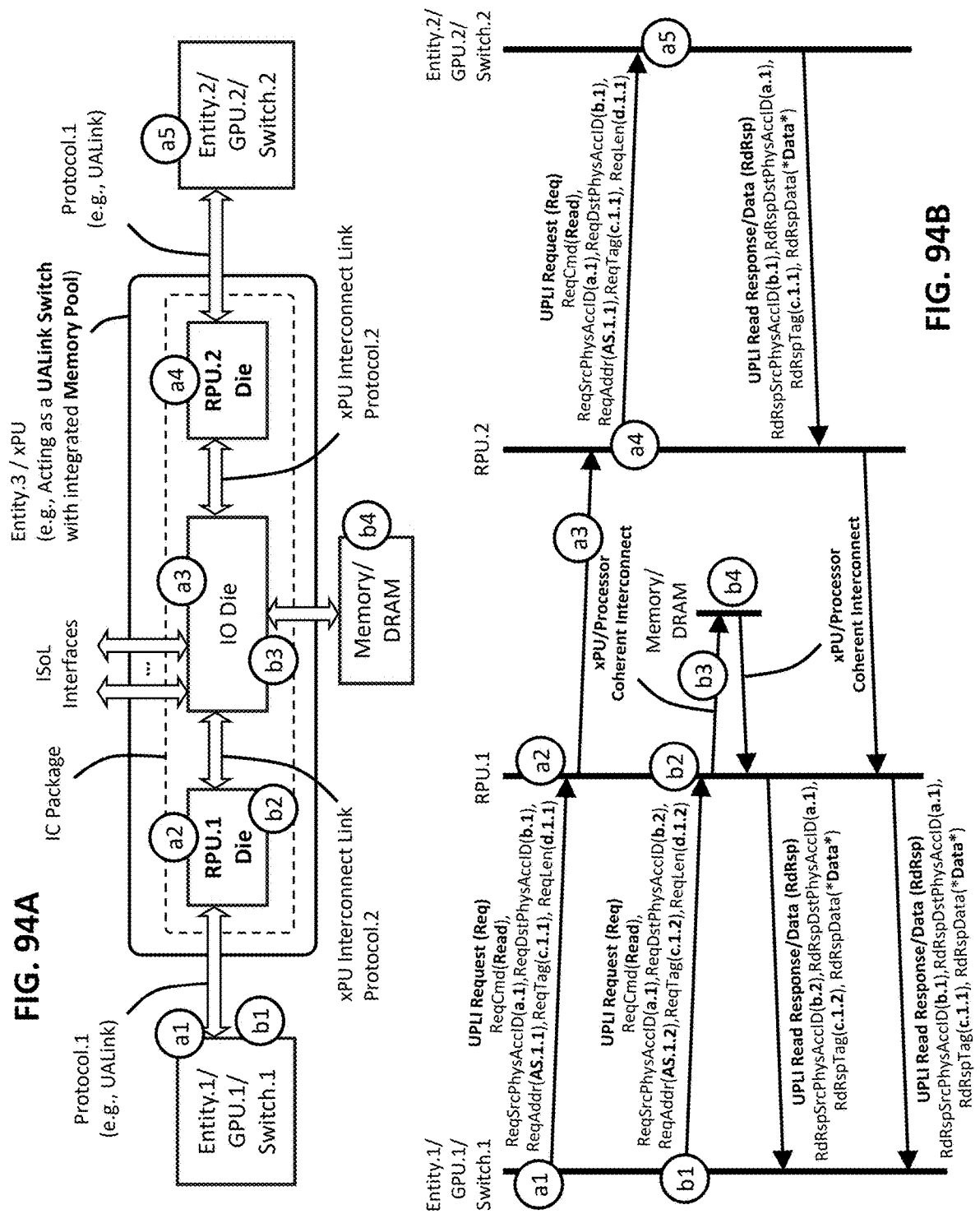
Figure 95:
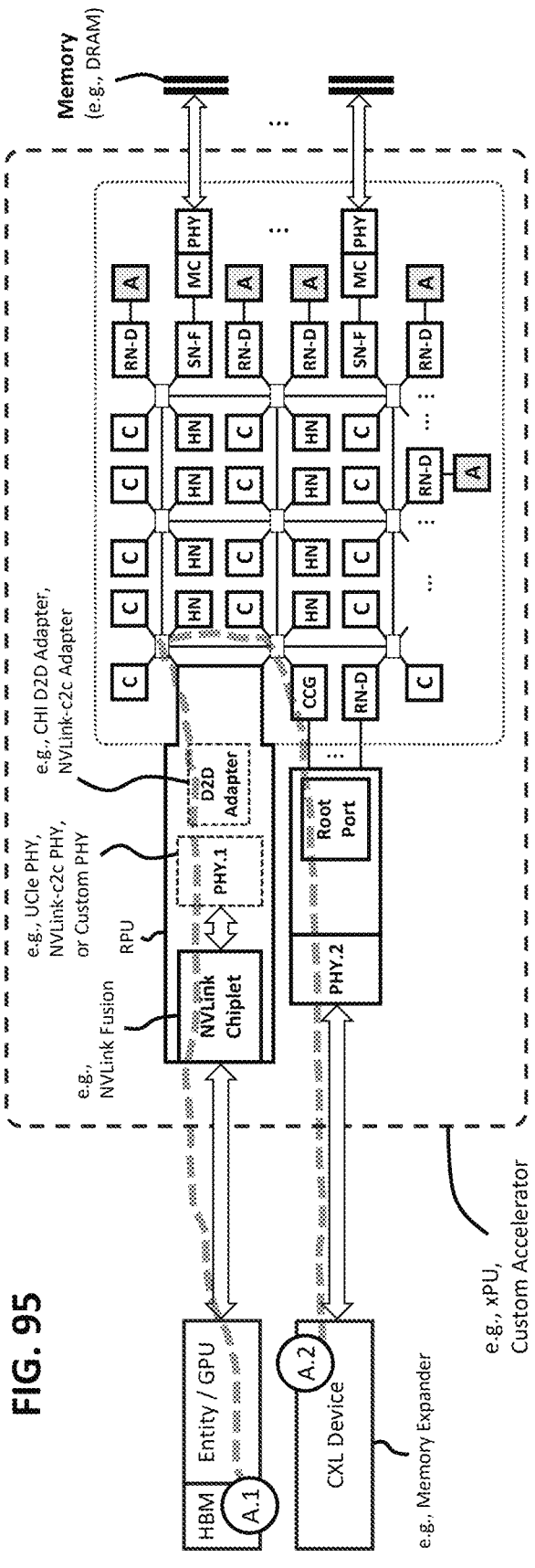
Figures 96A, 96B:
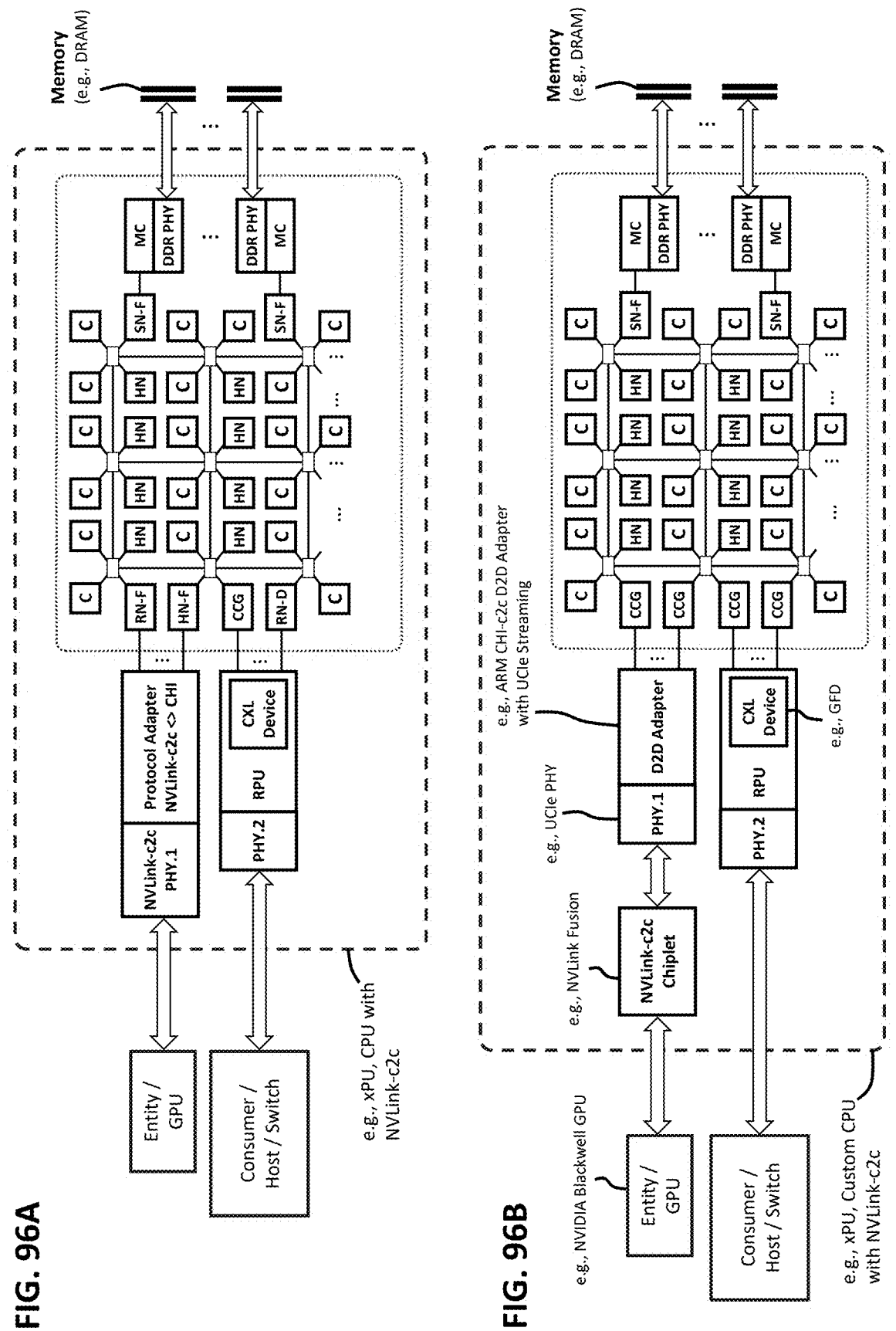
Figure 97:
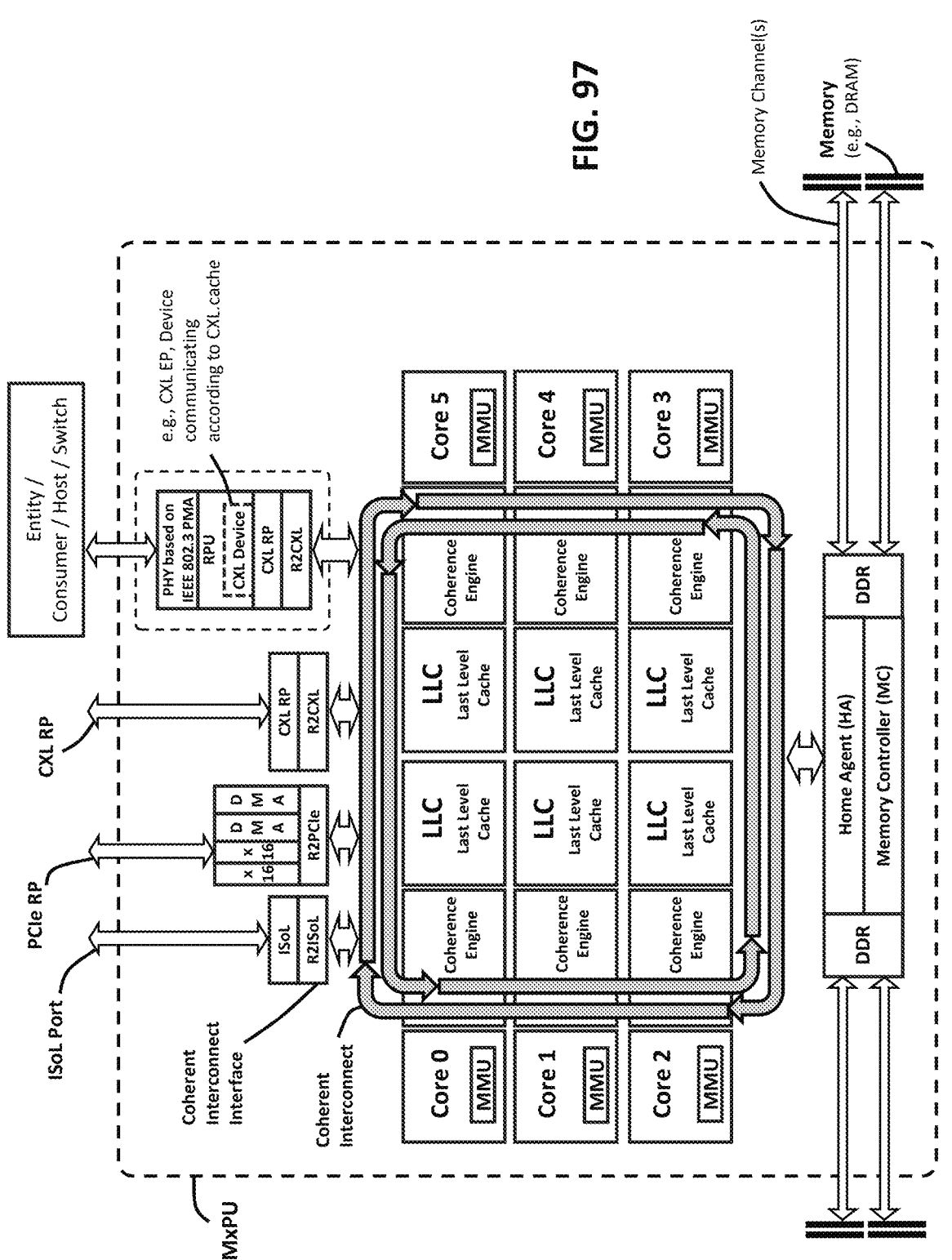
Figures 98A, 98B:
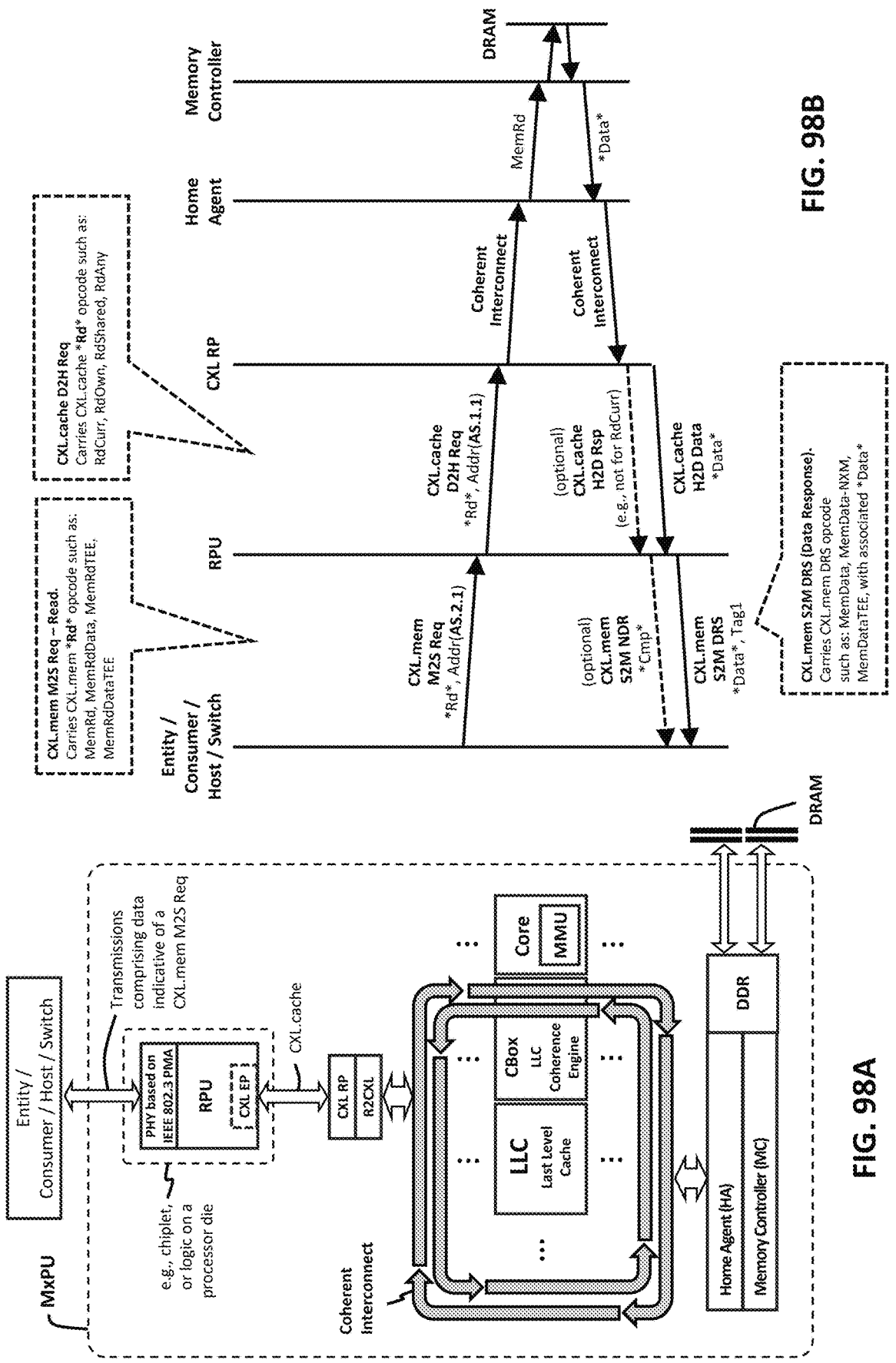
Figures 99A, 99B:
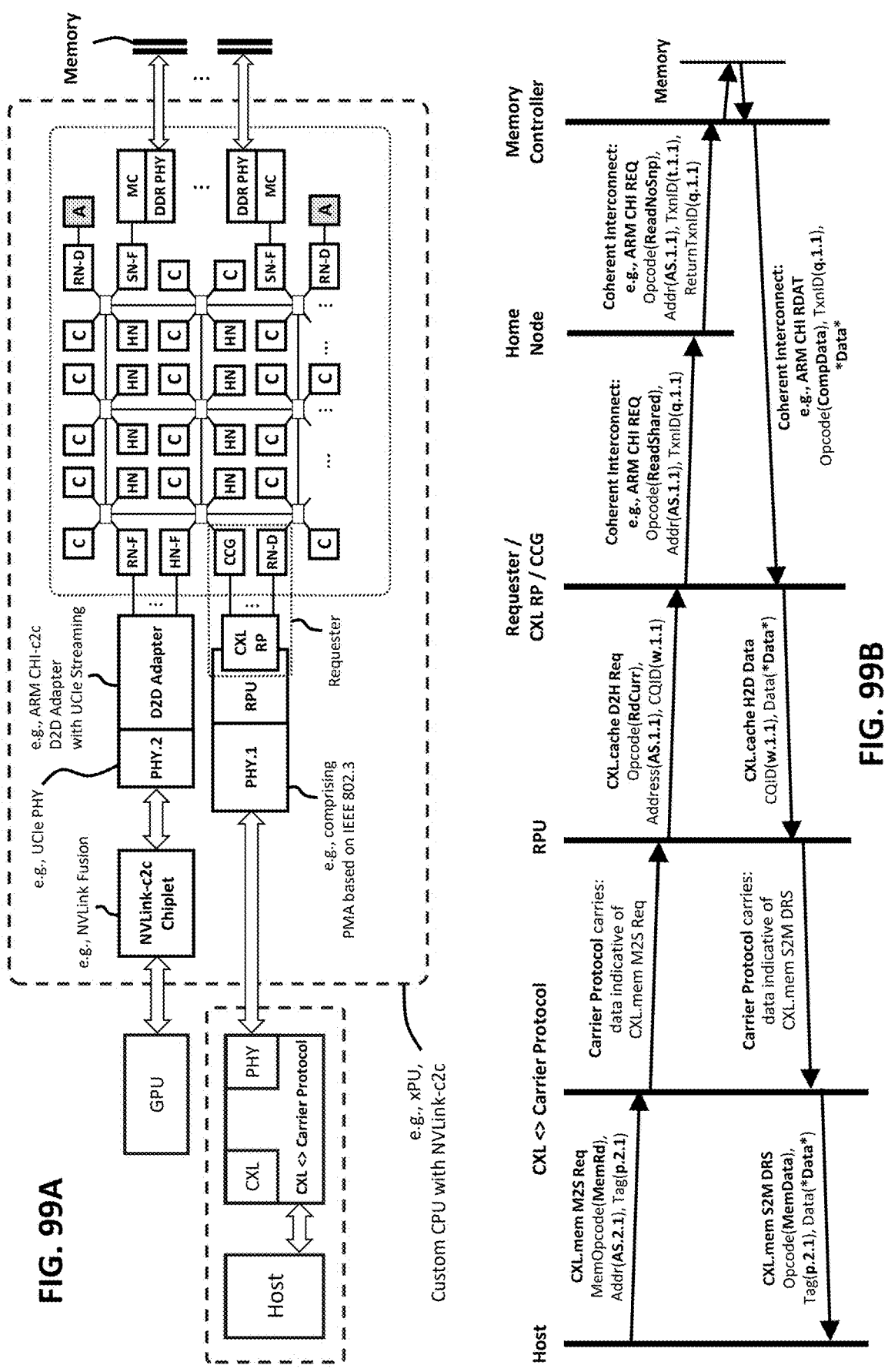
Figure 100:
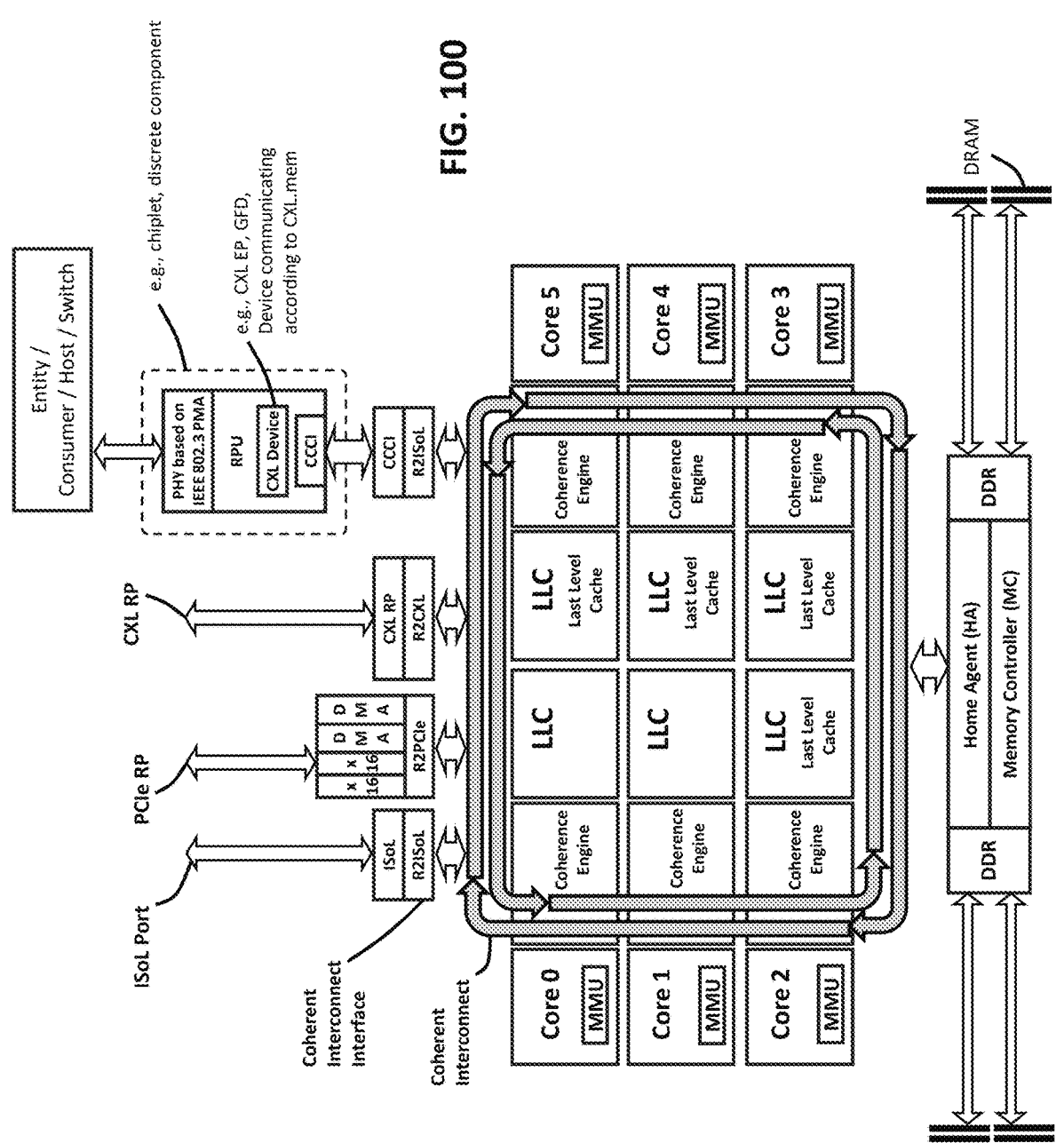
Figure 101:
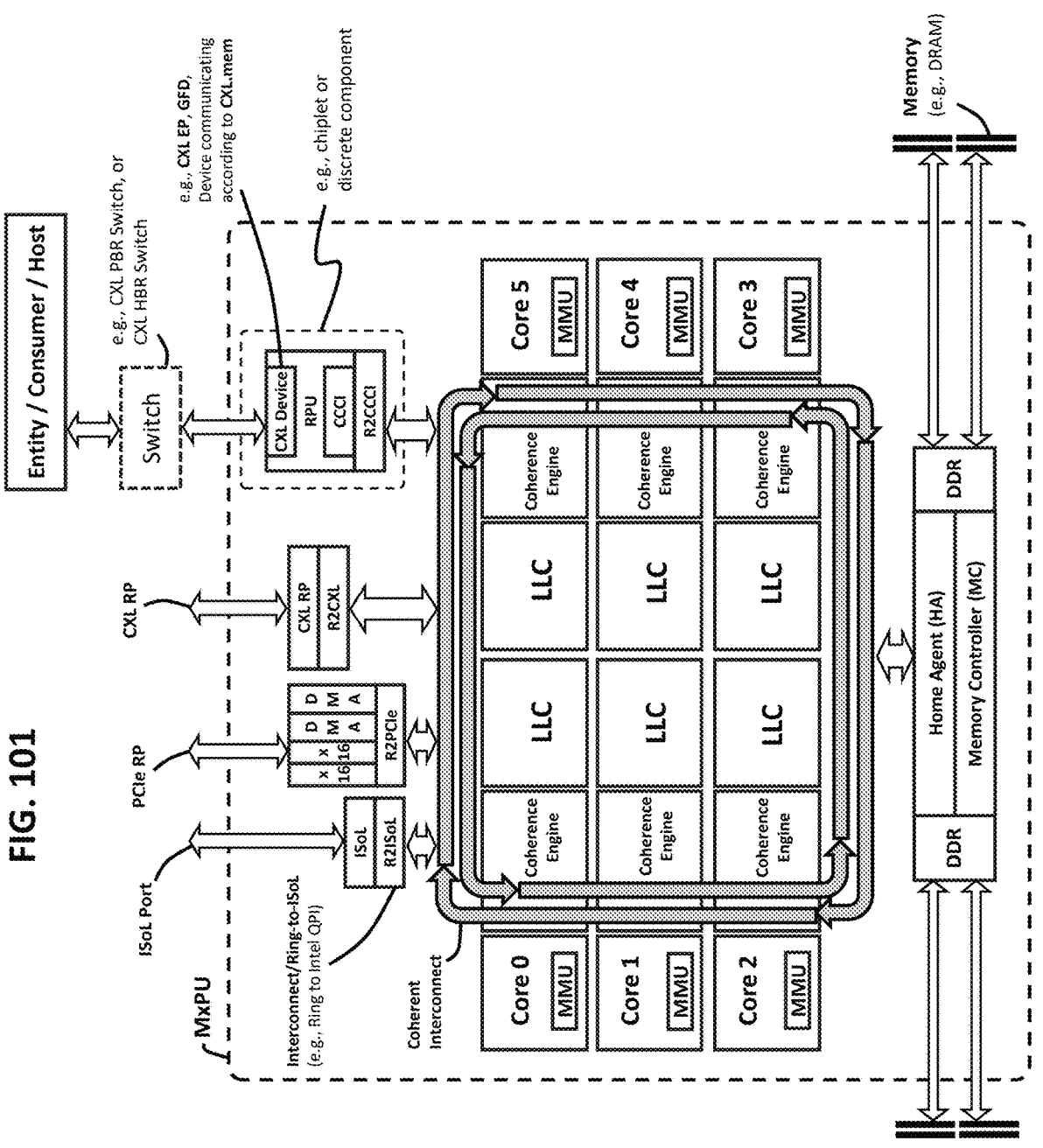
Figures 102A, 102B, 102C:
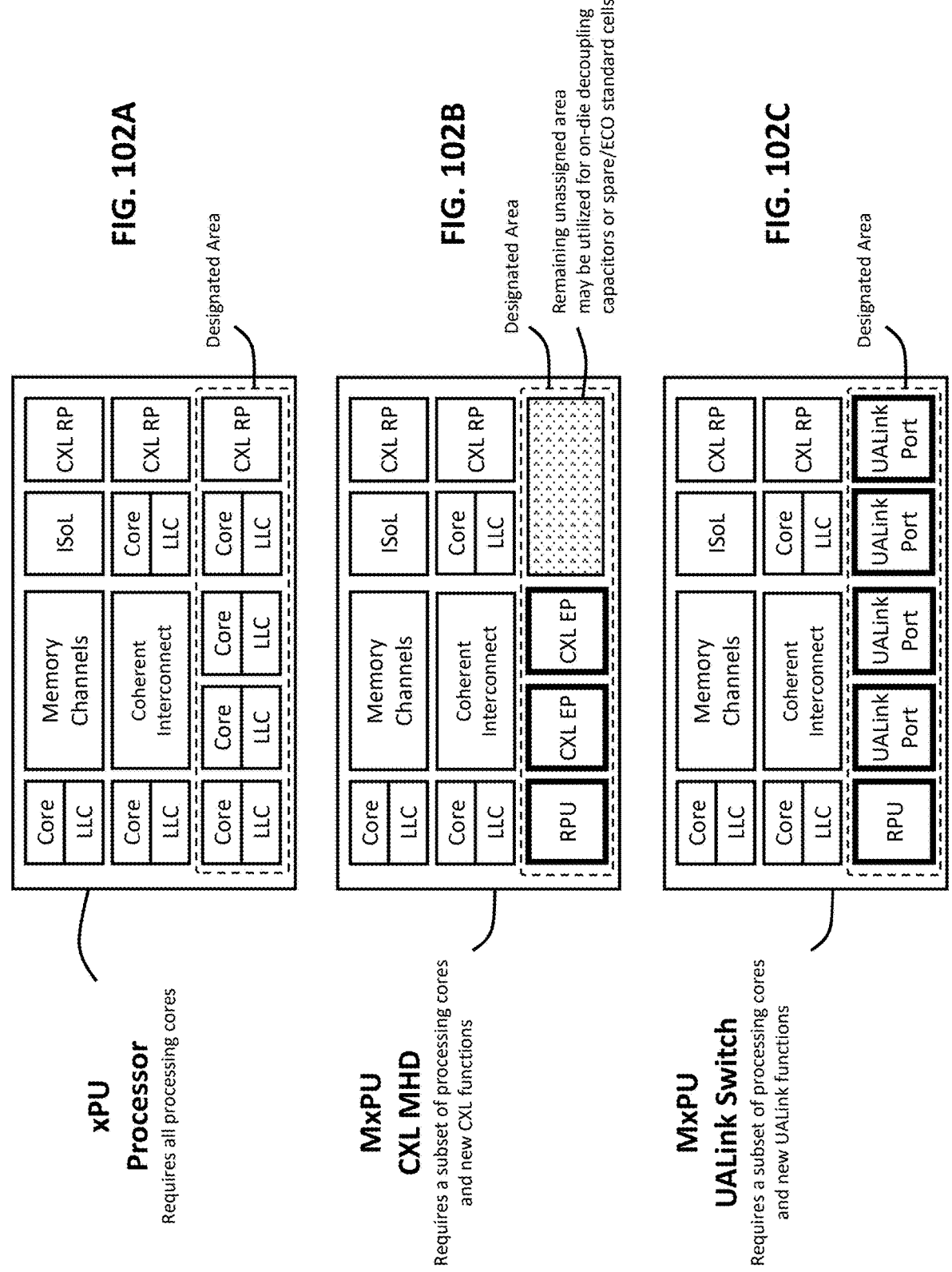
Figures 103A, 103B:
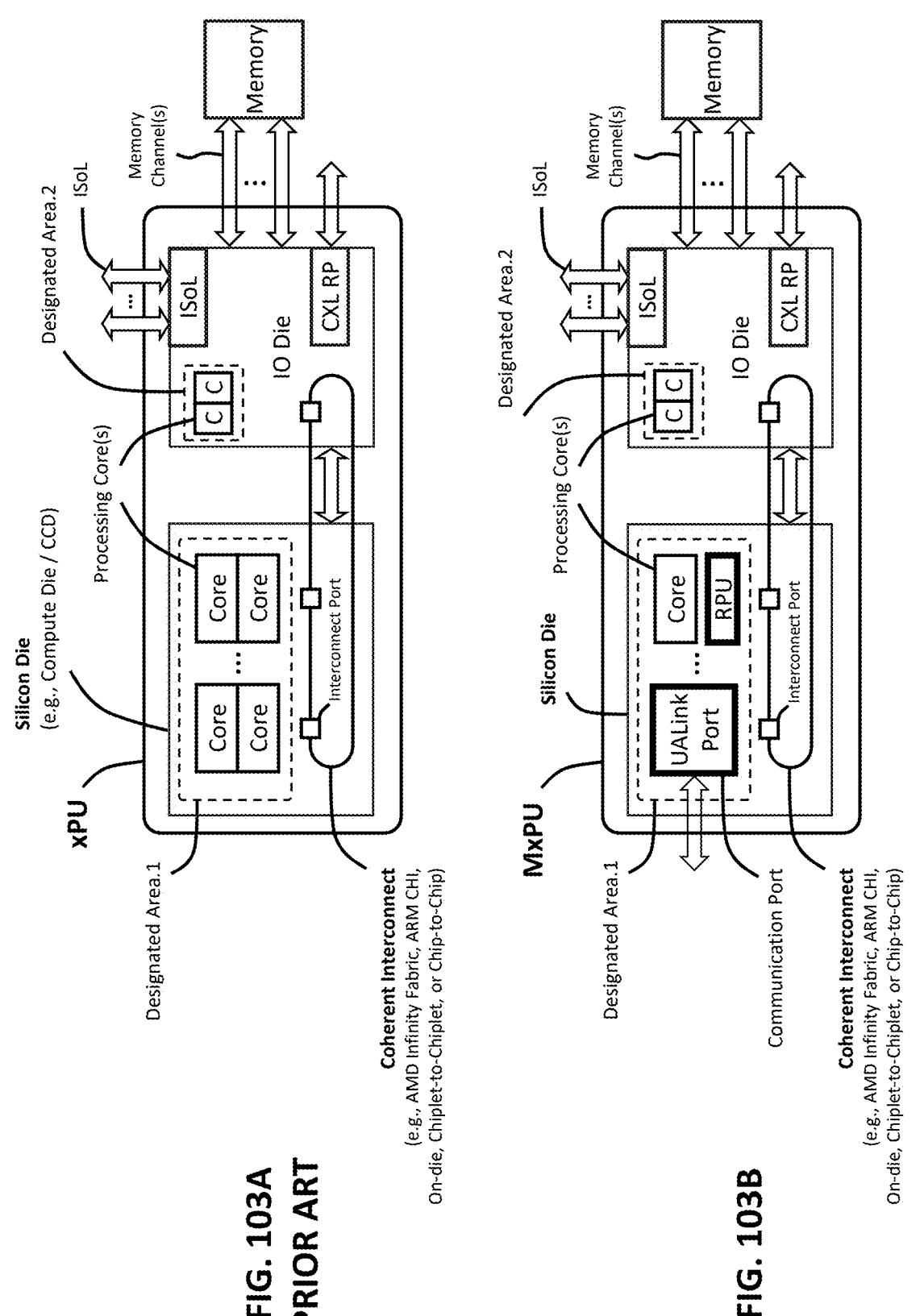
Figure 104:
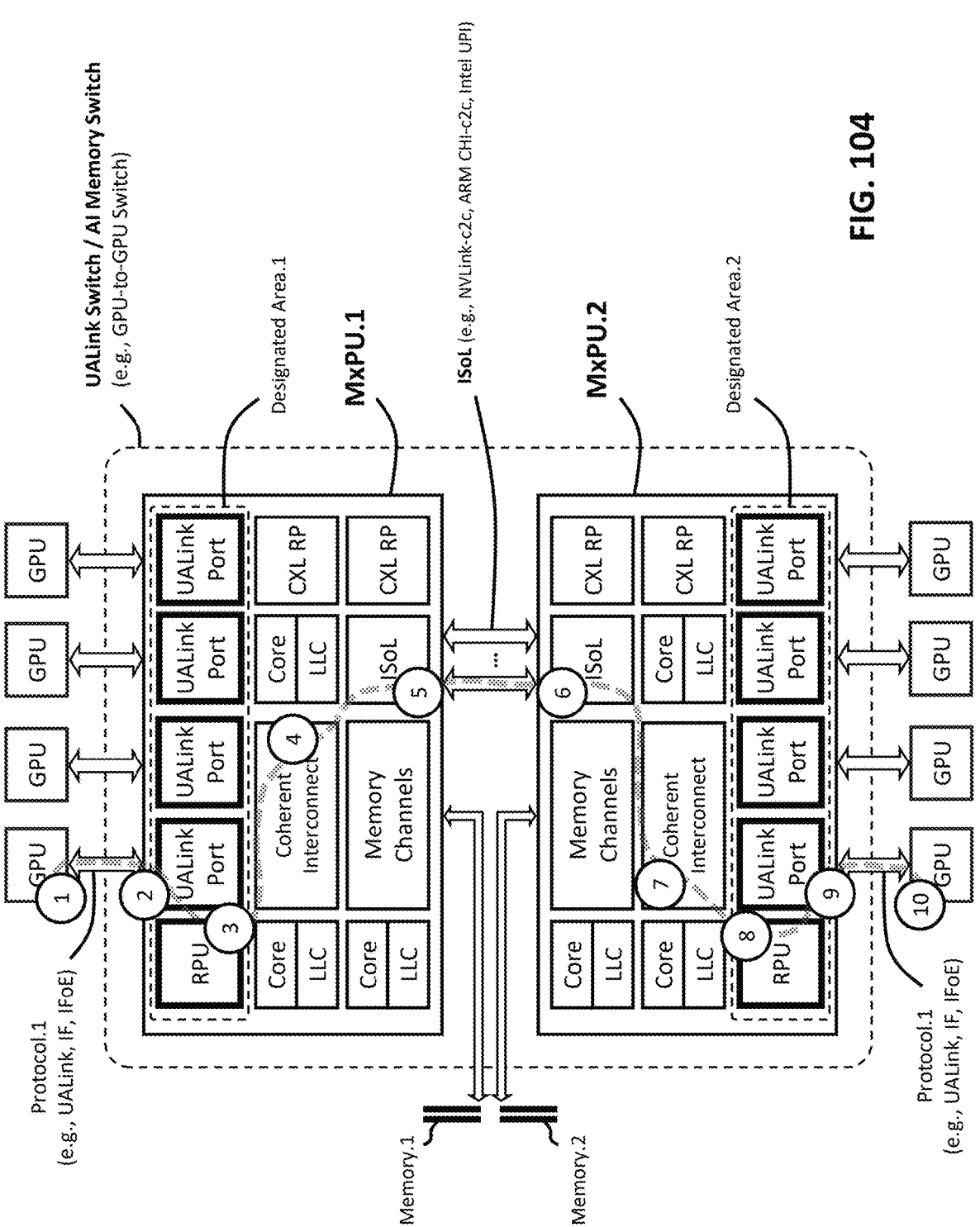
Figure 105:
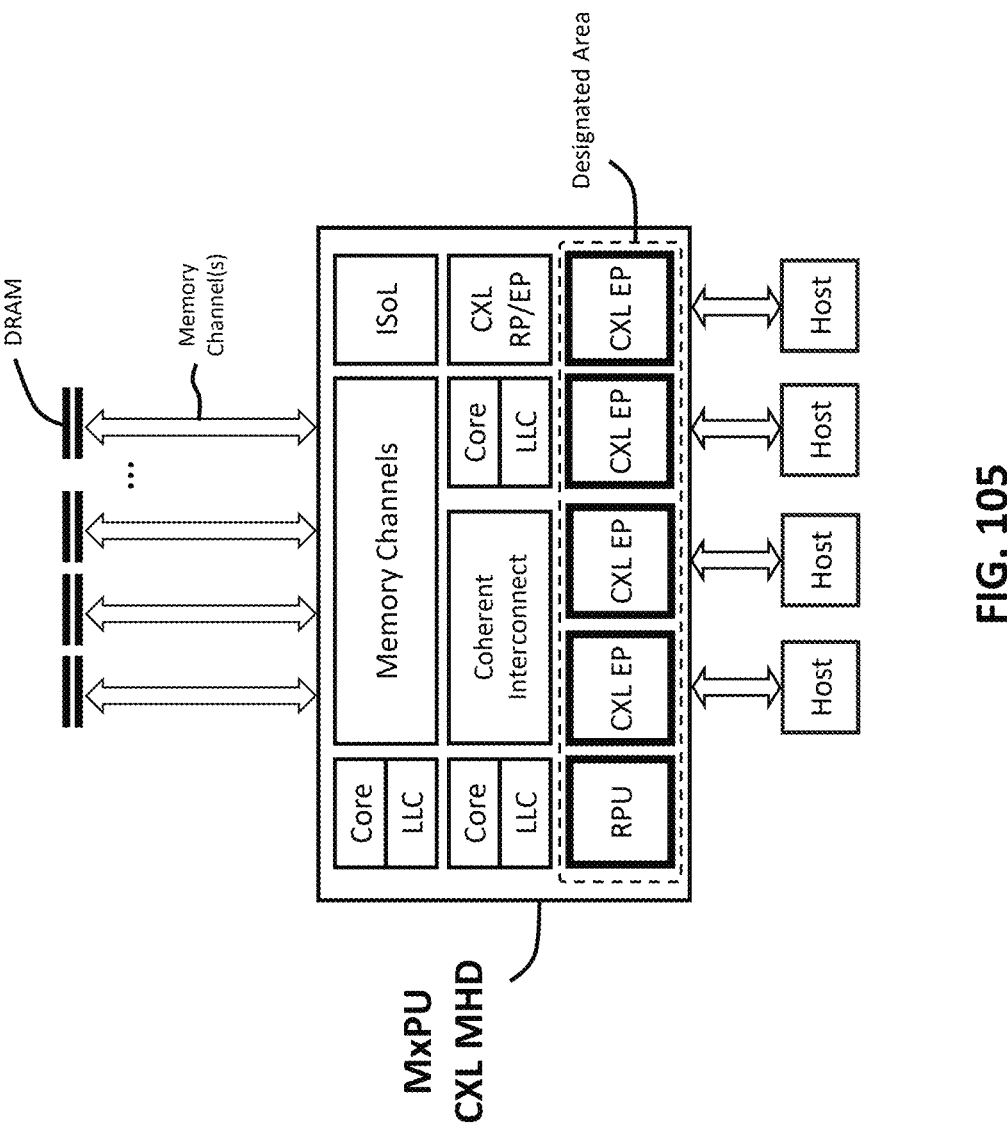
Figure 106:
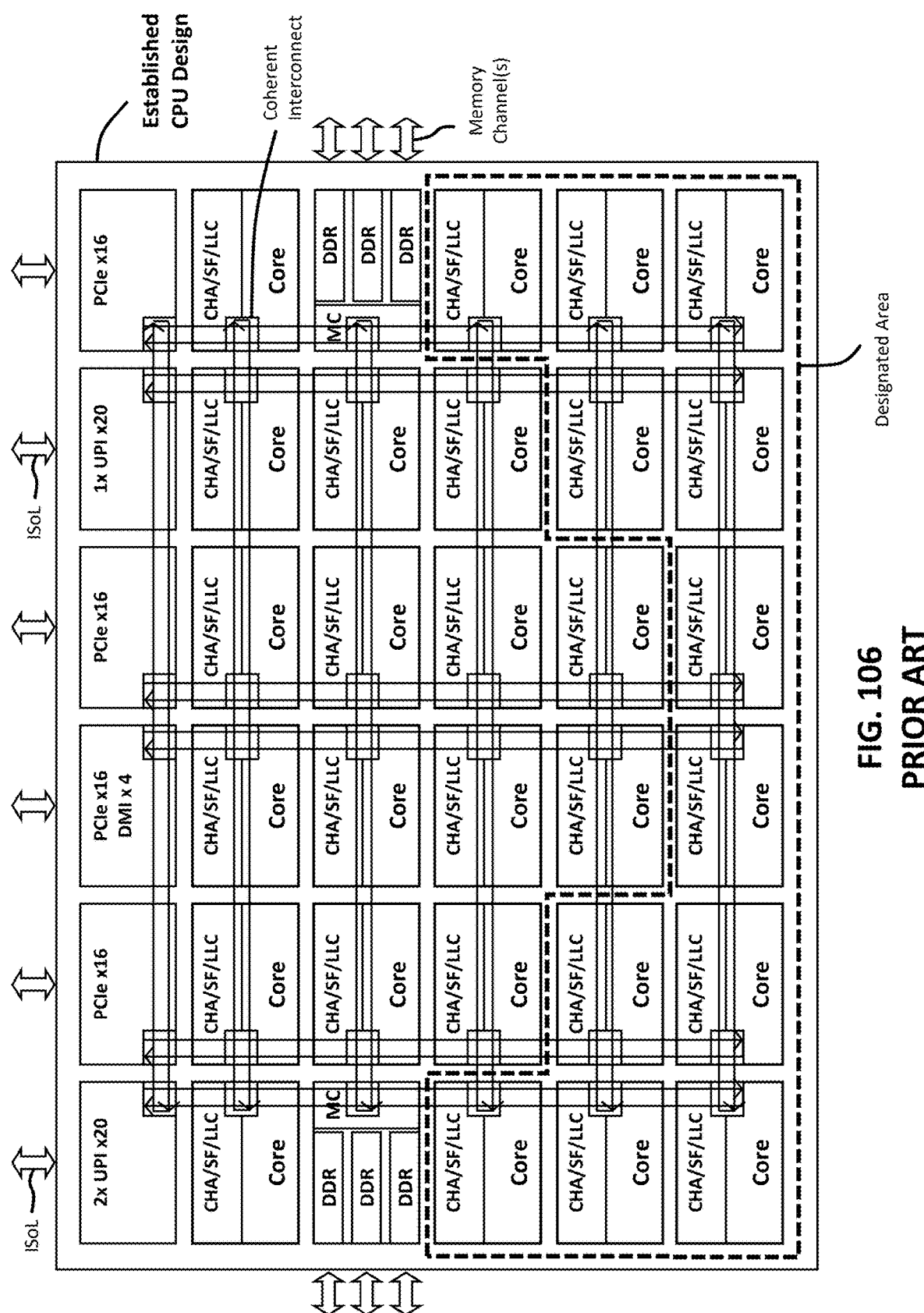
Figure 107:
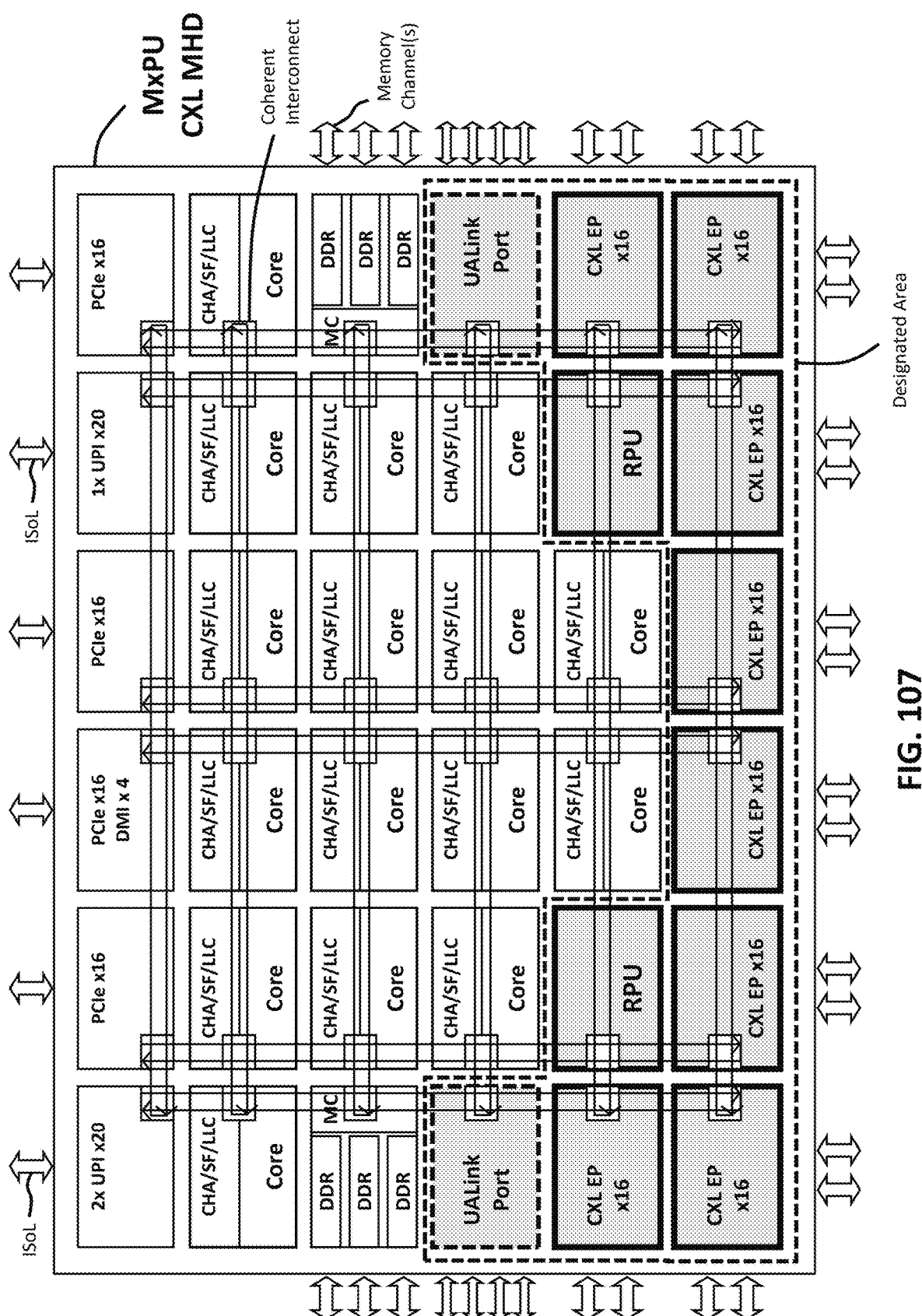
Figure 108:
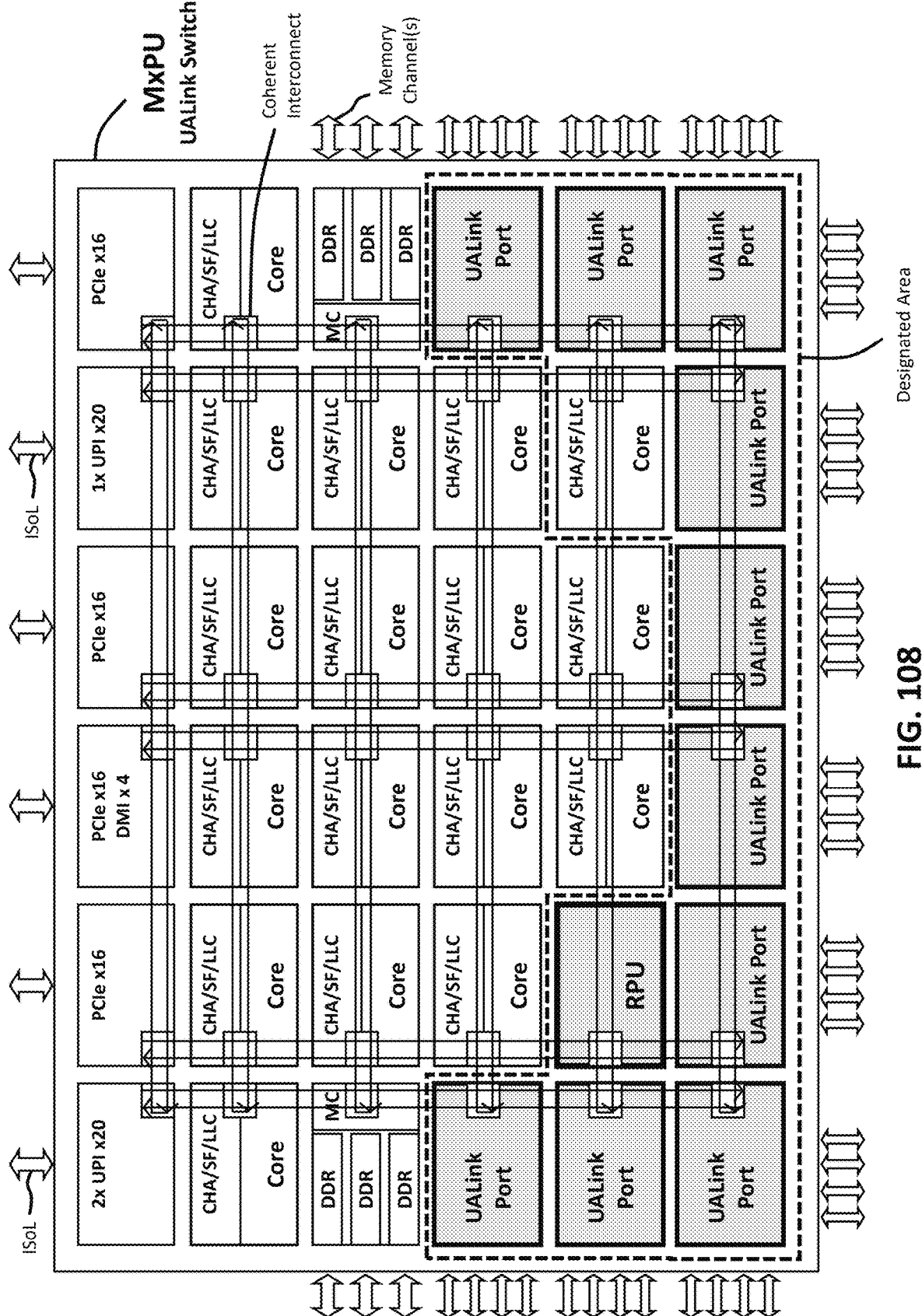
Figures 109A, 109B:
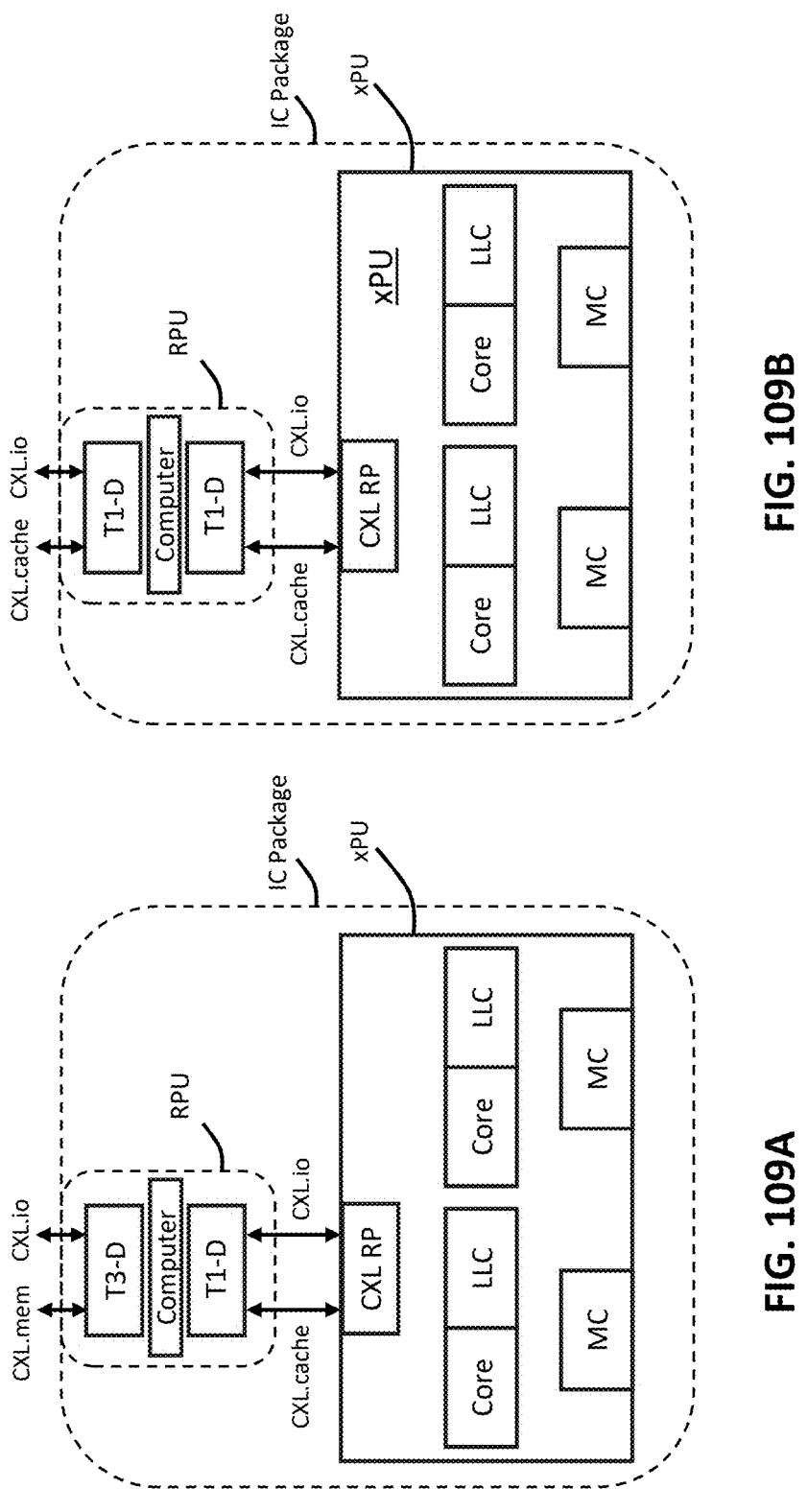
Figure 110:
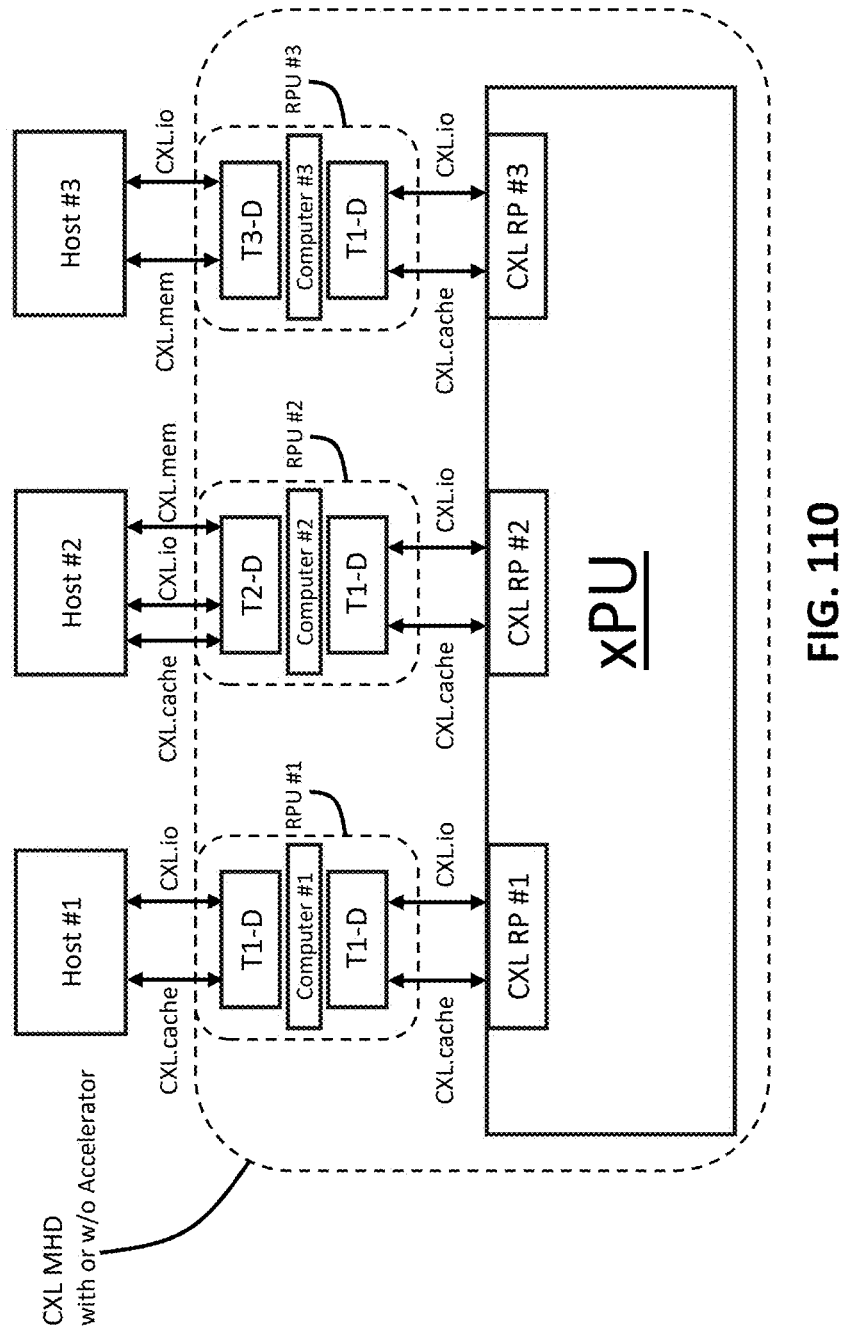
Figure 111:
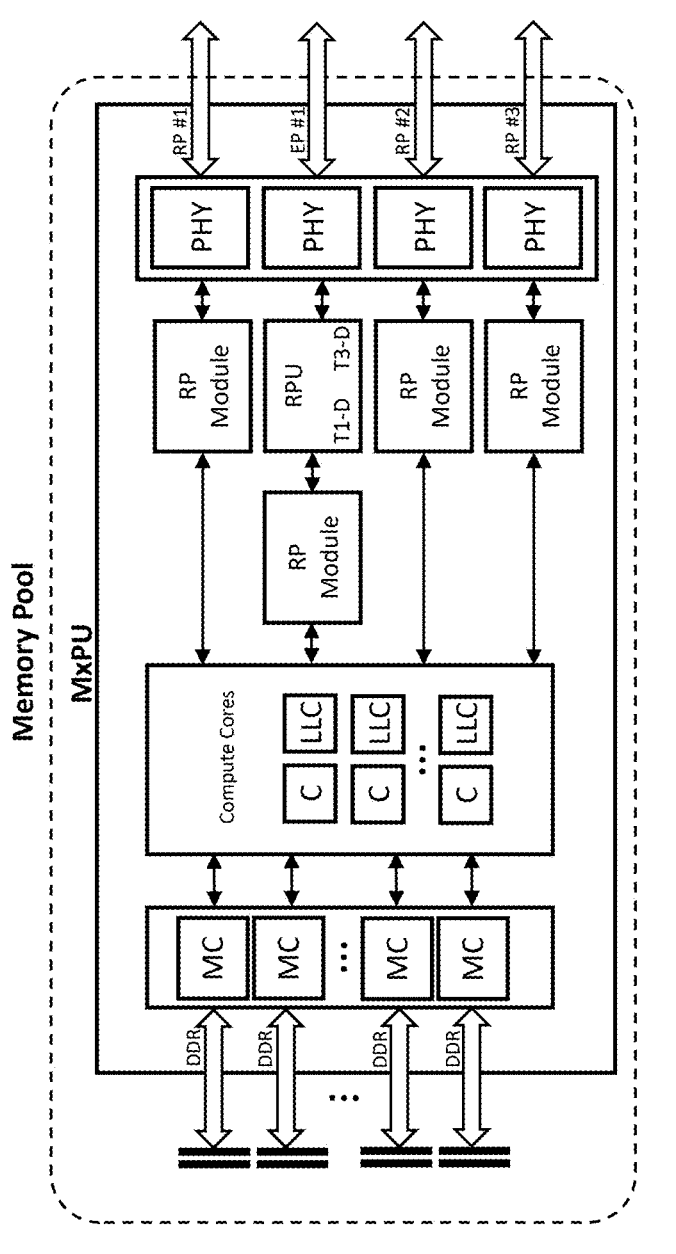
Figure 112:
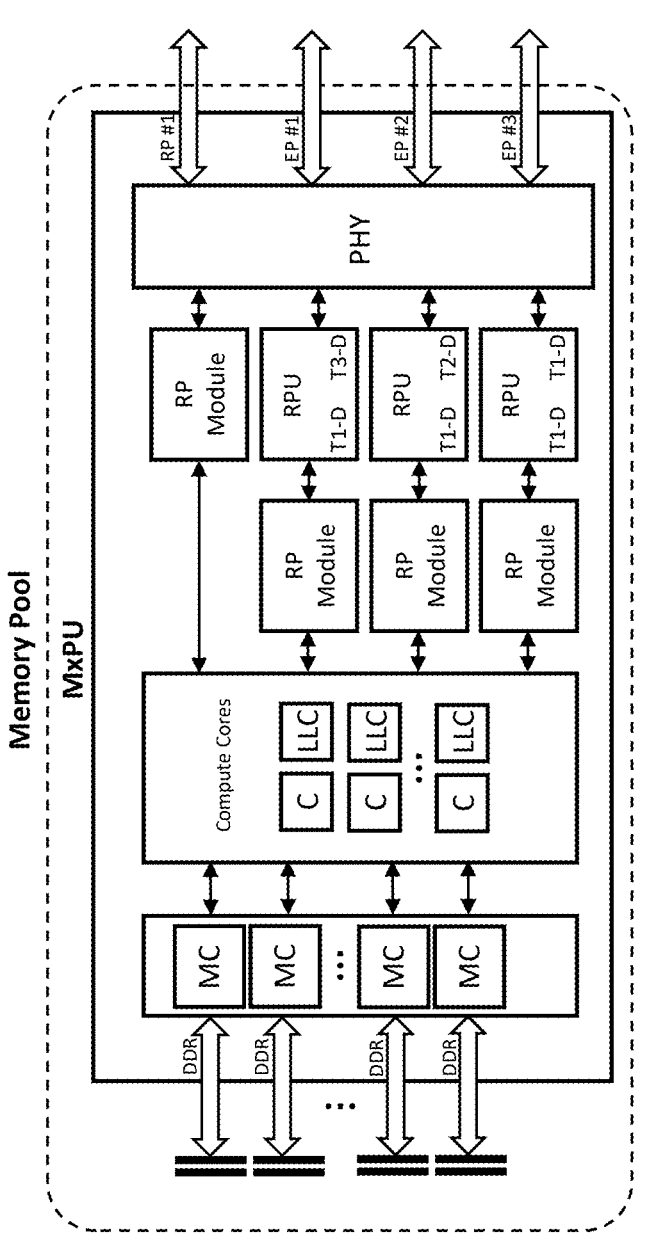
Figure 113:
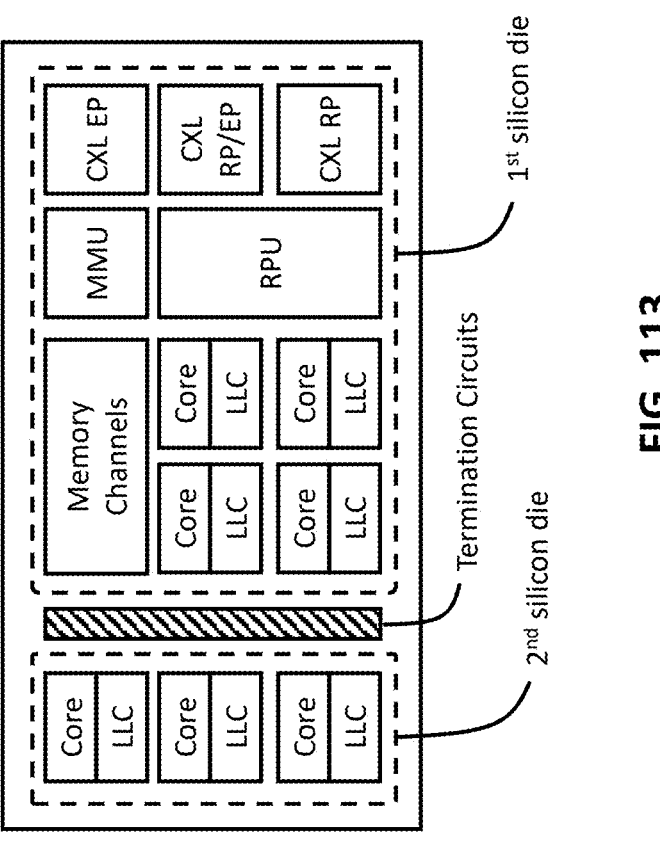
Figures 114A, 114B, 114C:
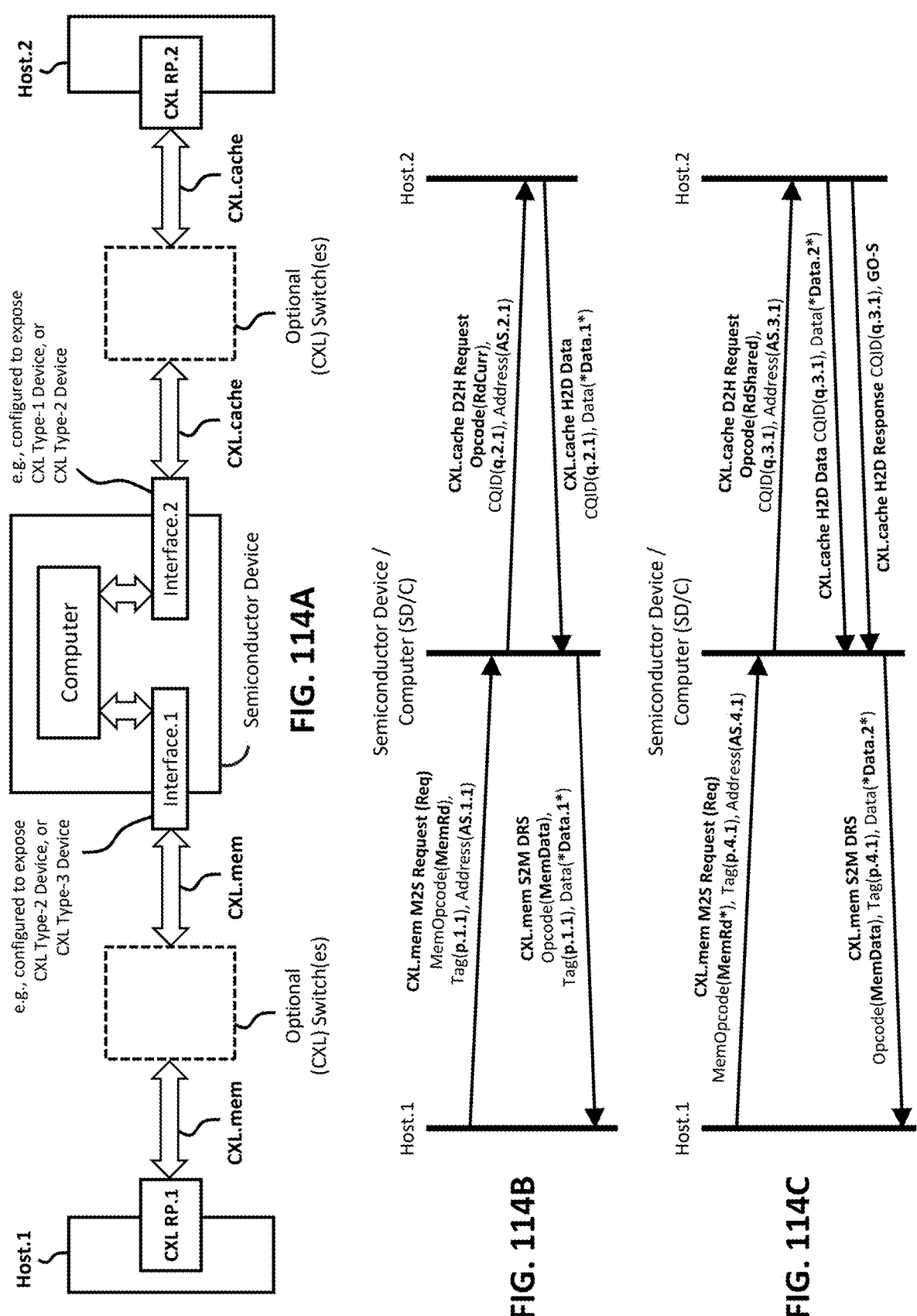
Figures 115A, 115B:
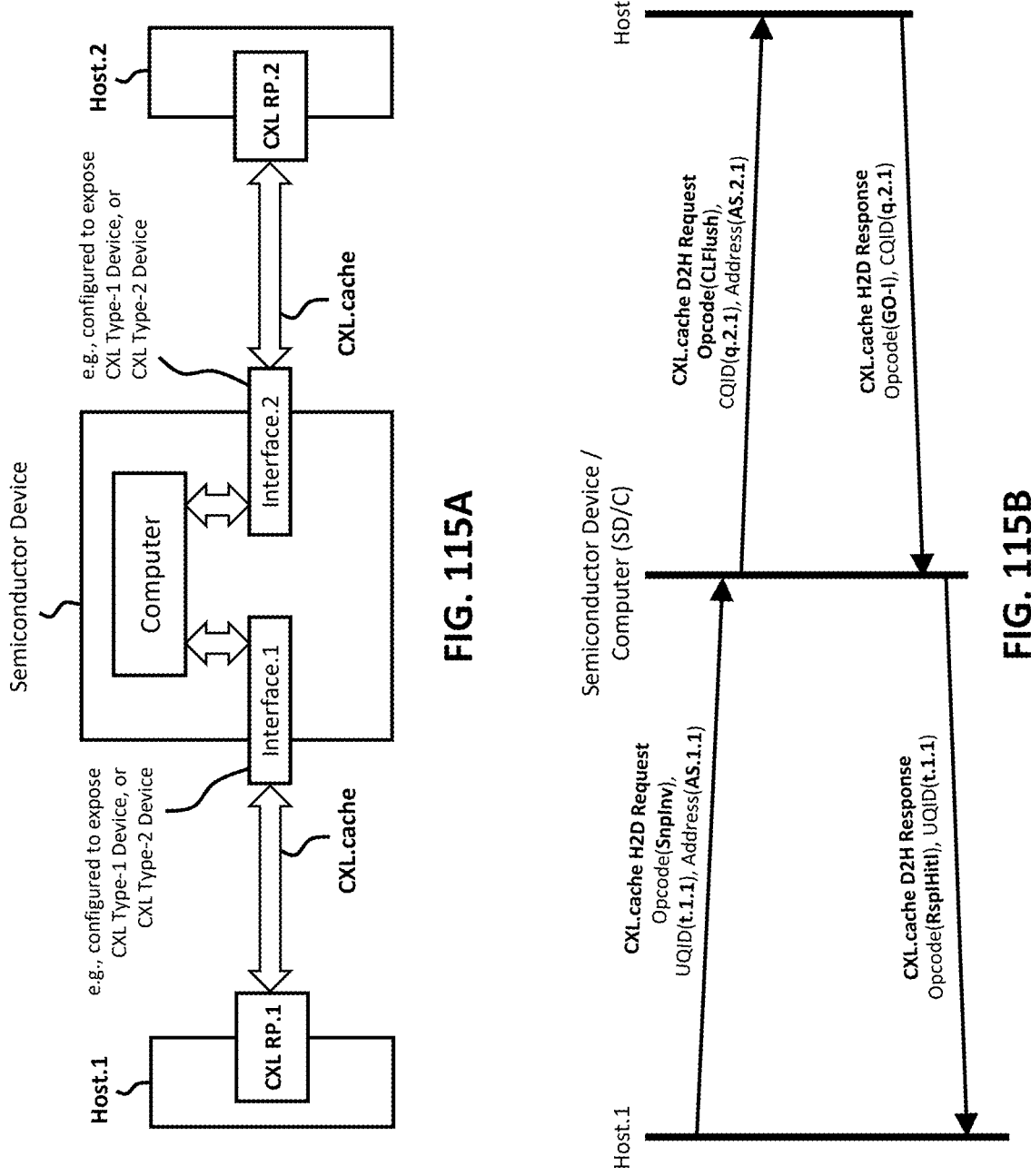
Figures 116A, 116B:
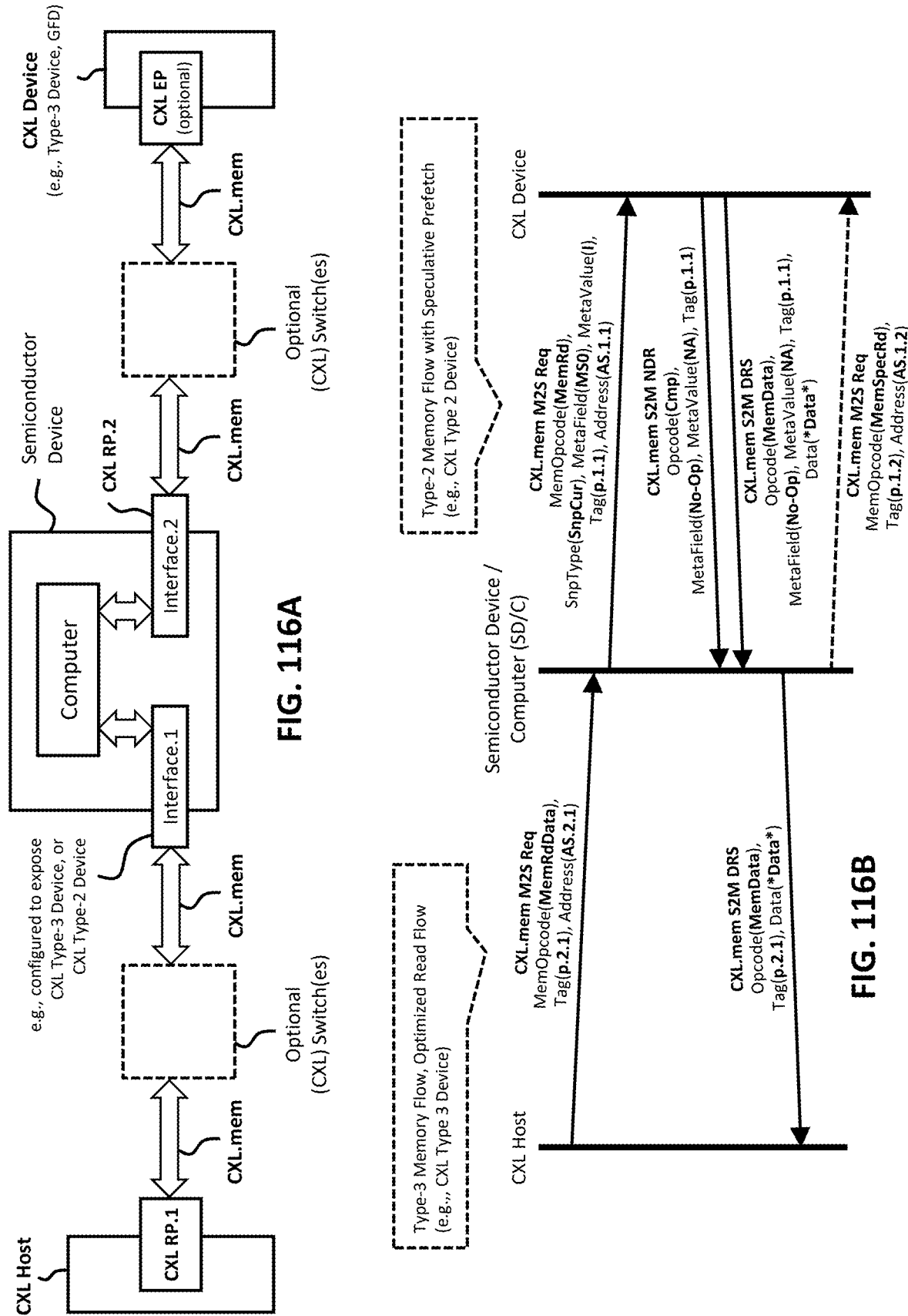
Figures 117A, 117B, 117C:
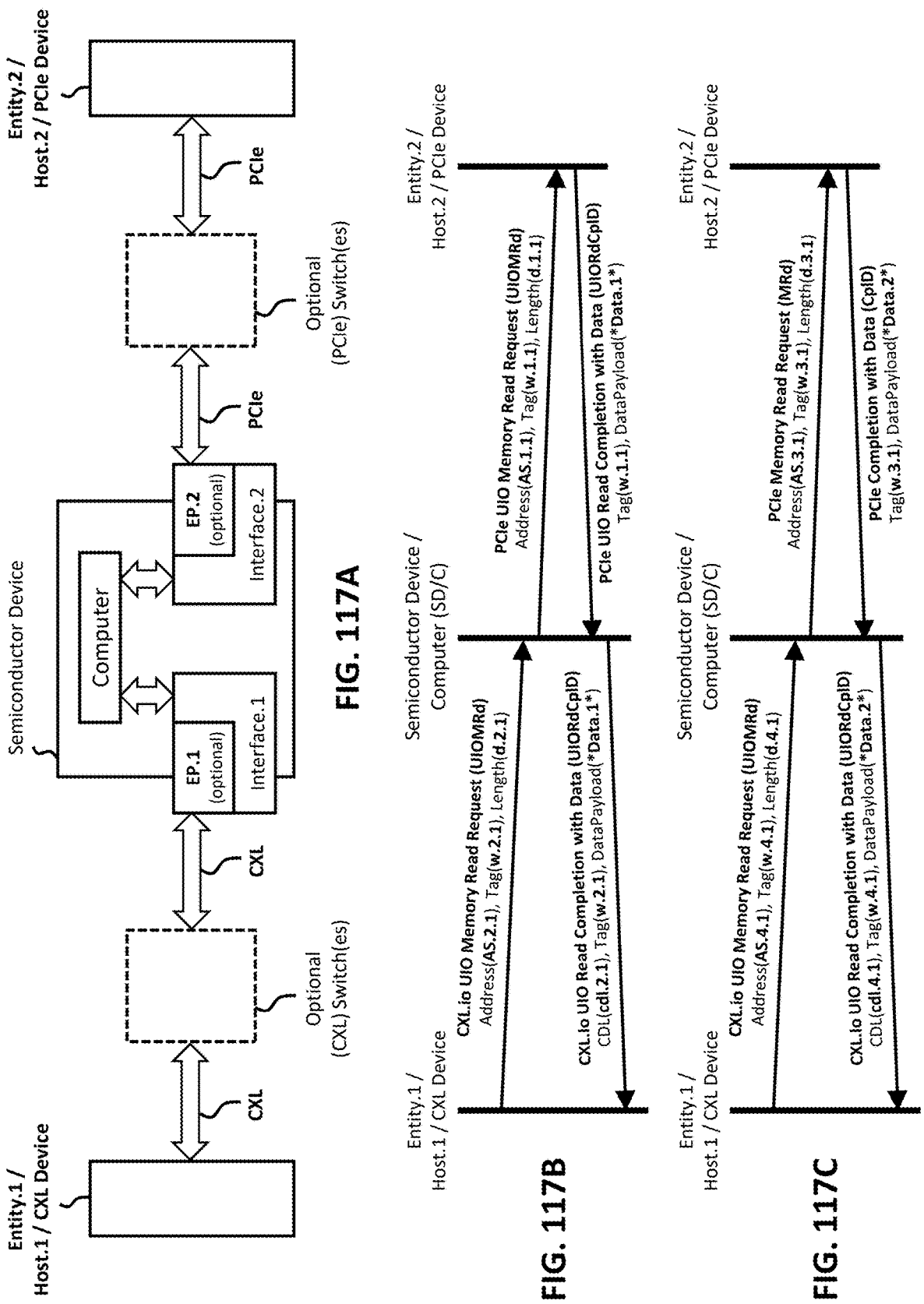
Figures 118A, 118B, 118C:
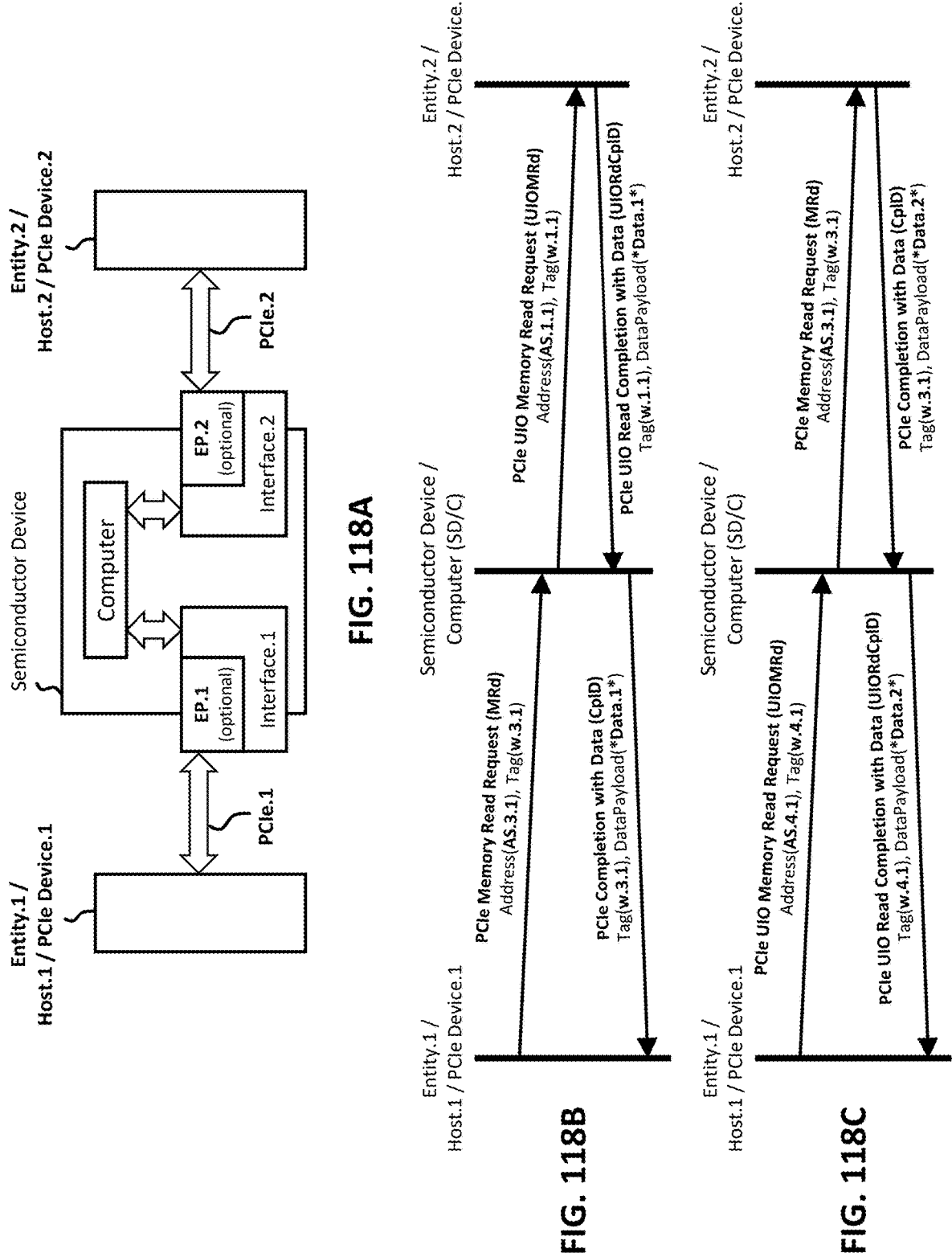
Figures 119A, 119B, 119C:
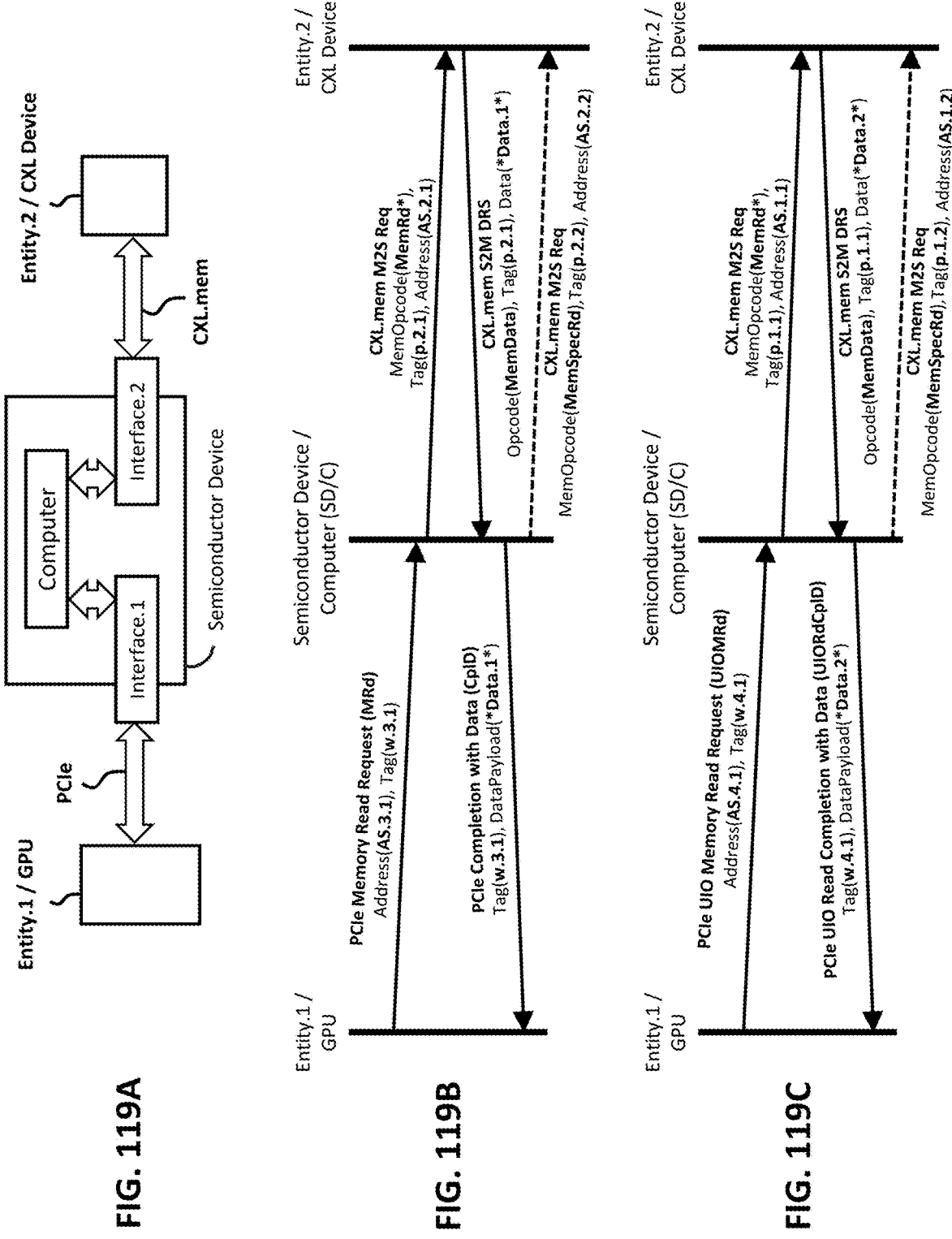
Figures 121A, 121B, 121C:
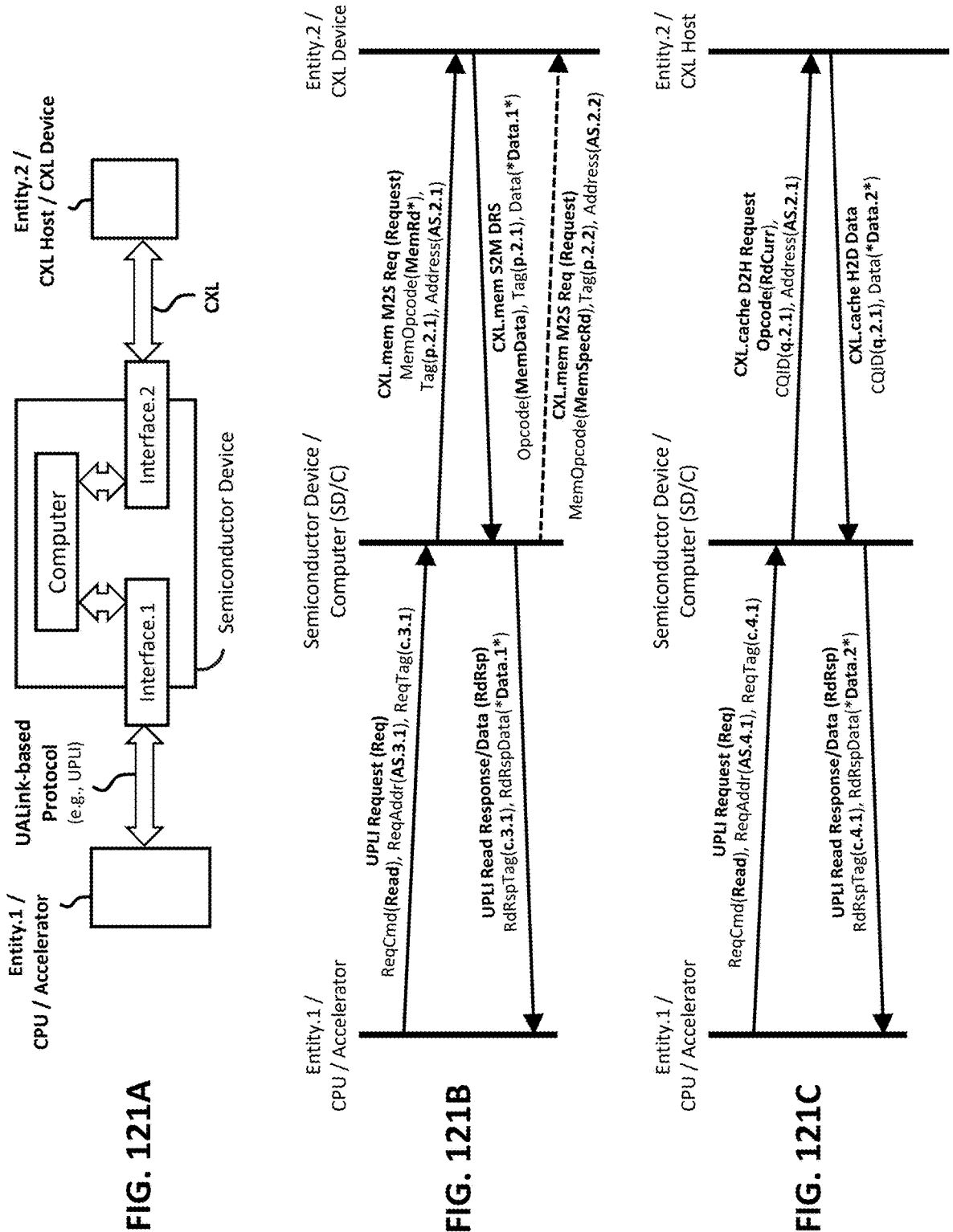
Figures 122A, 122B, 122C:
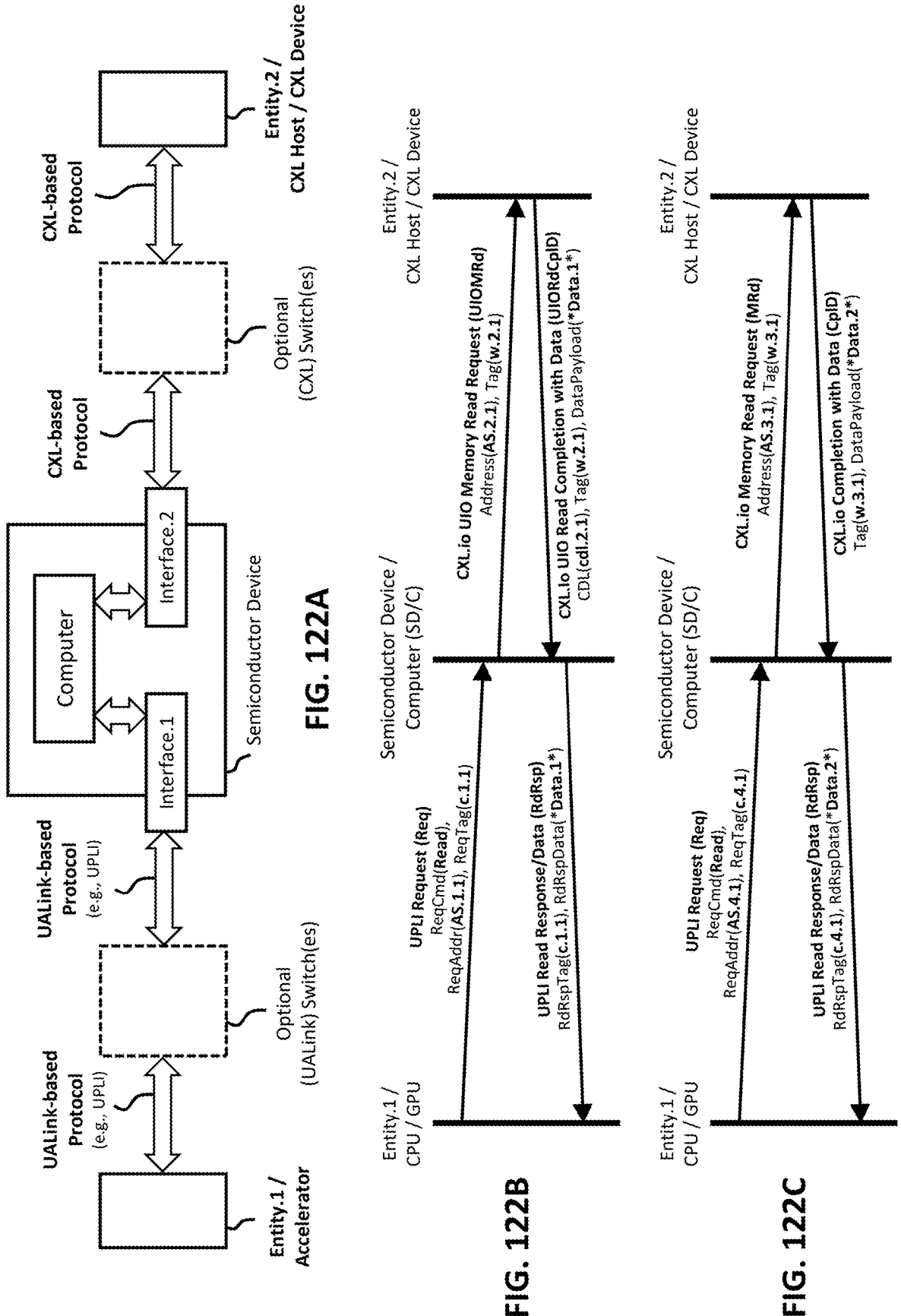
Figures 123A, 123B, 123C:
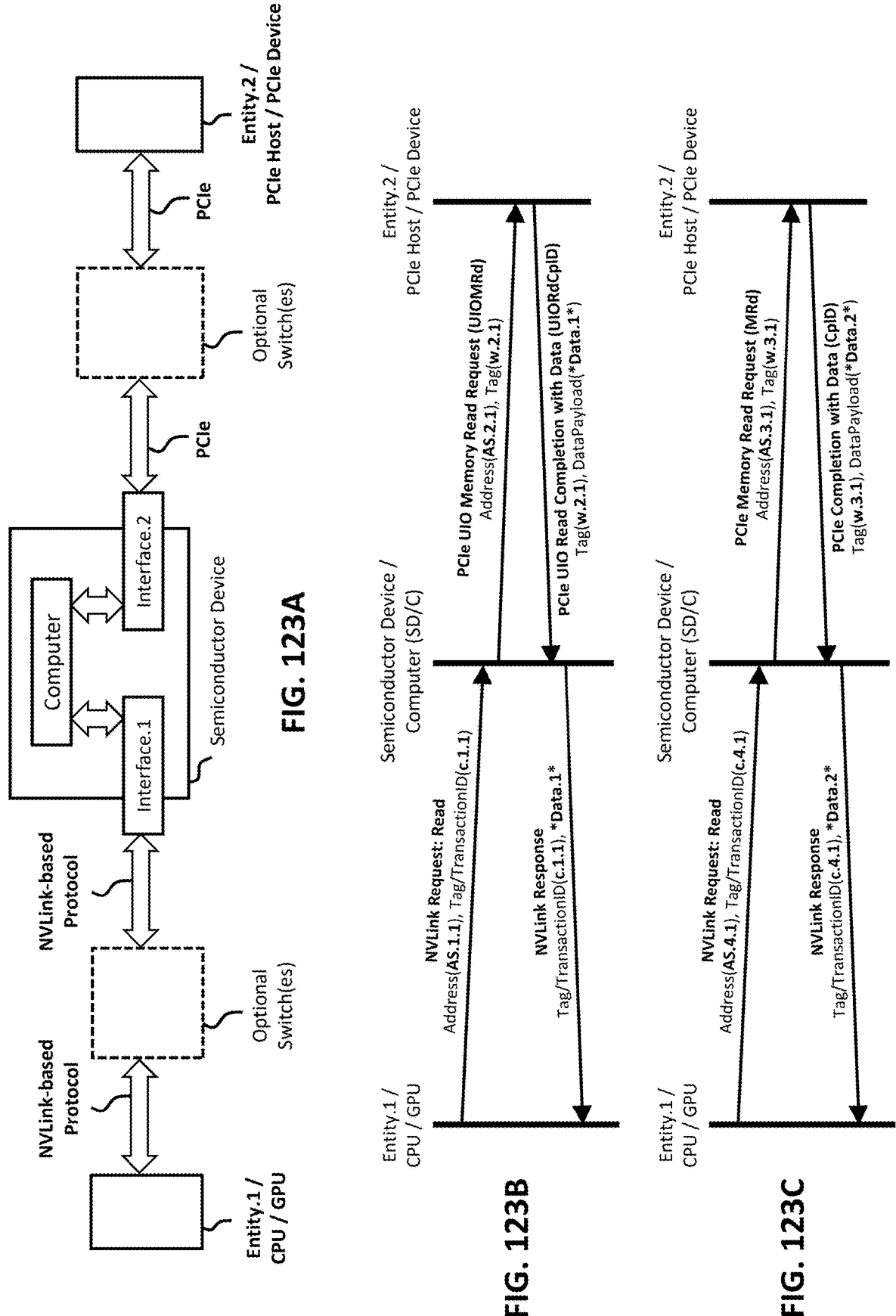
Figures 124A, 124B, 124C:
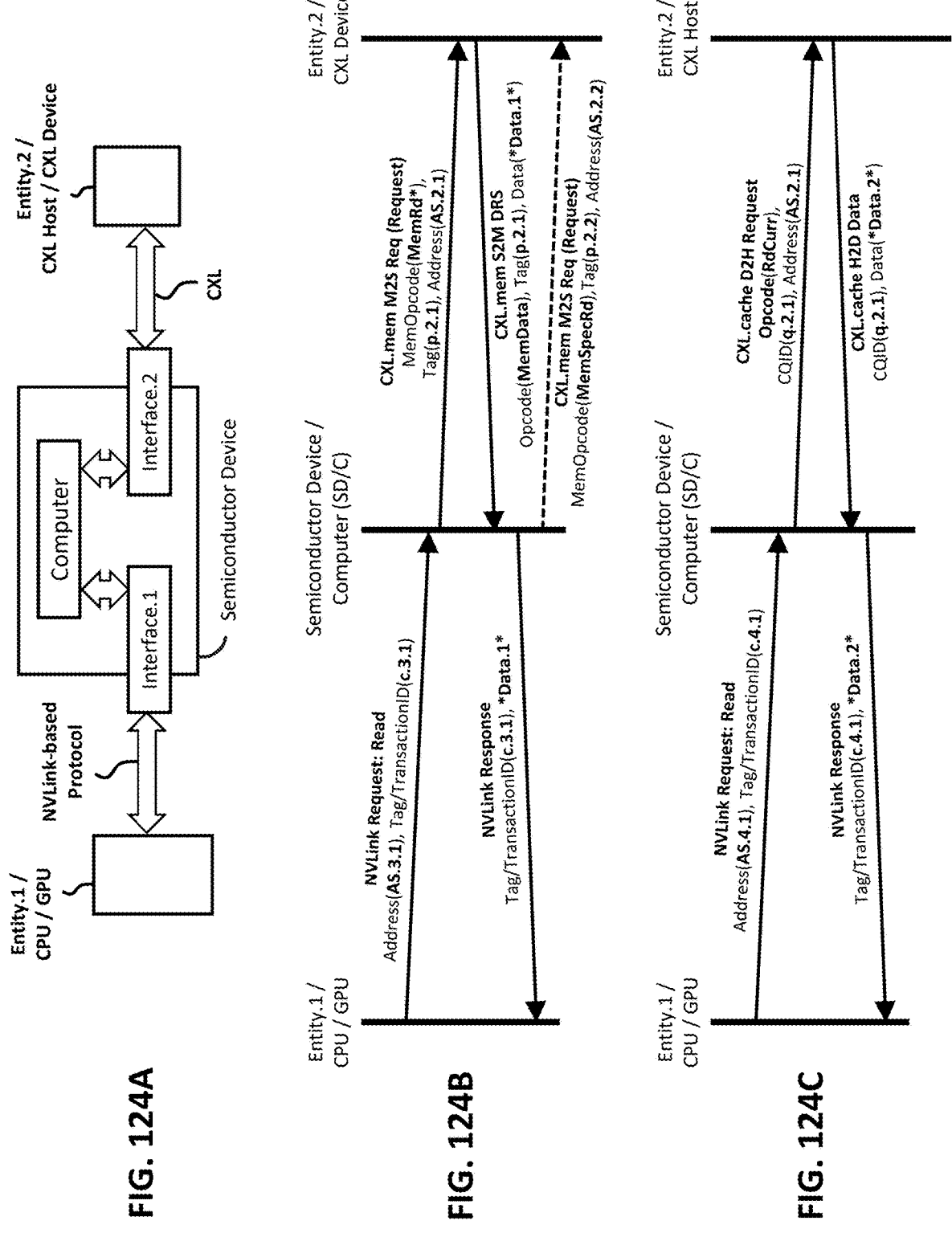
Figures 125A, 125B, 125C:
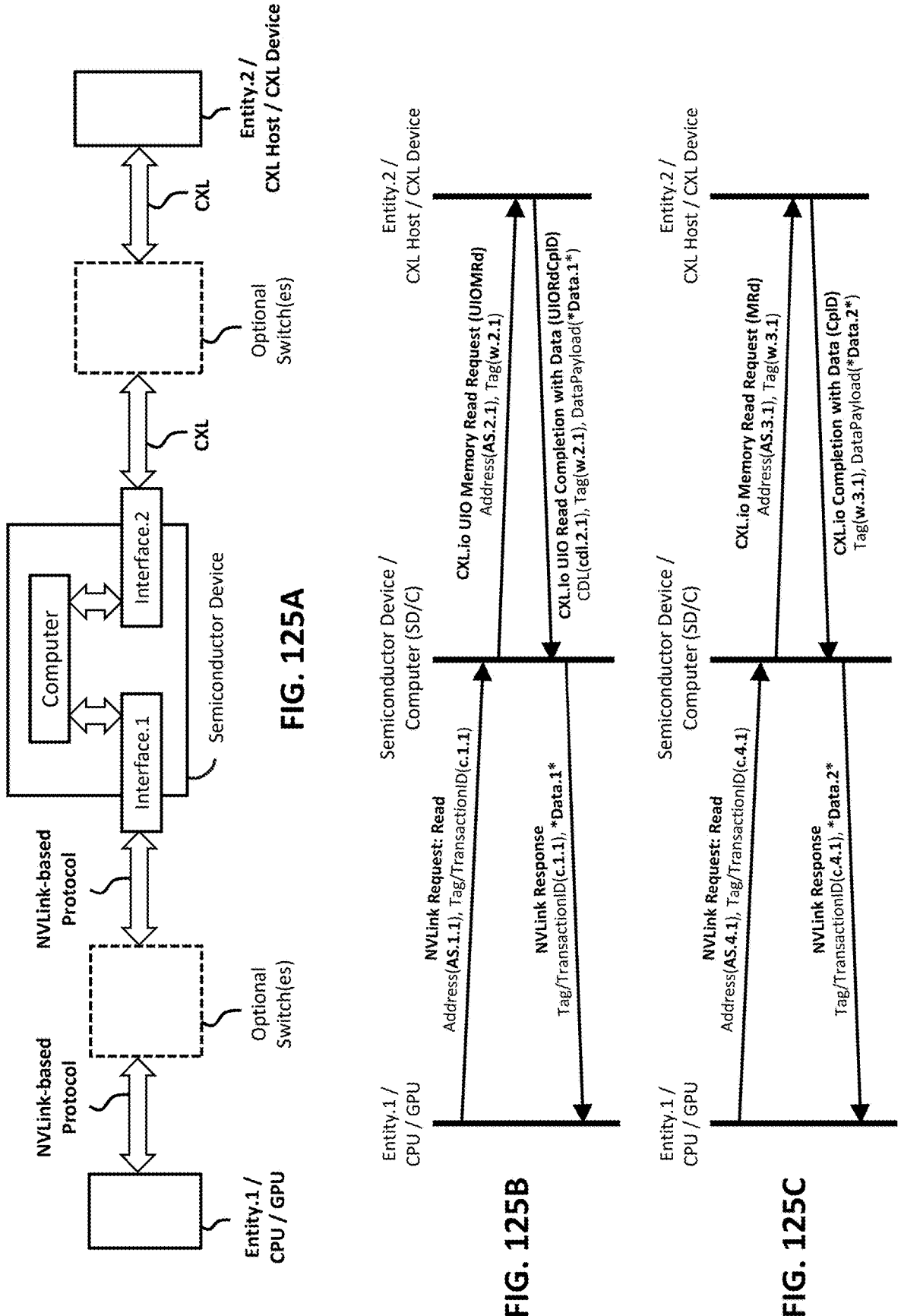
Figures 126A, 126B:
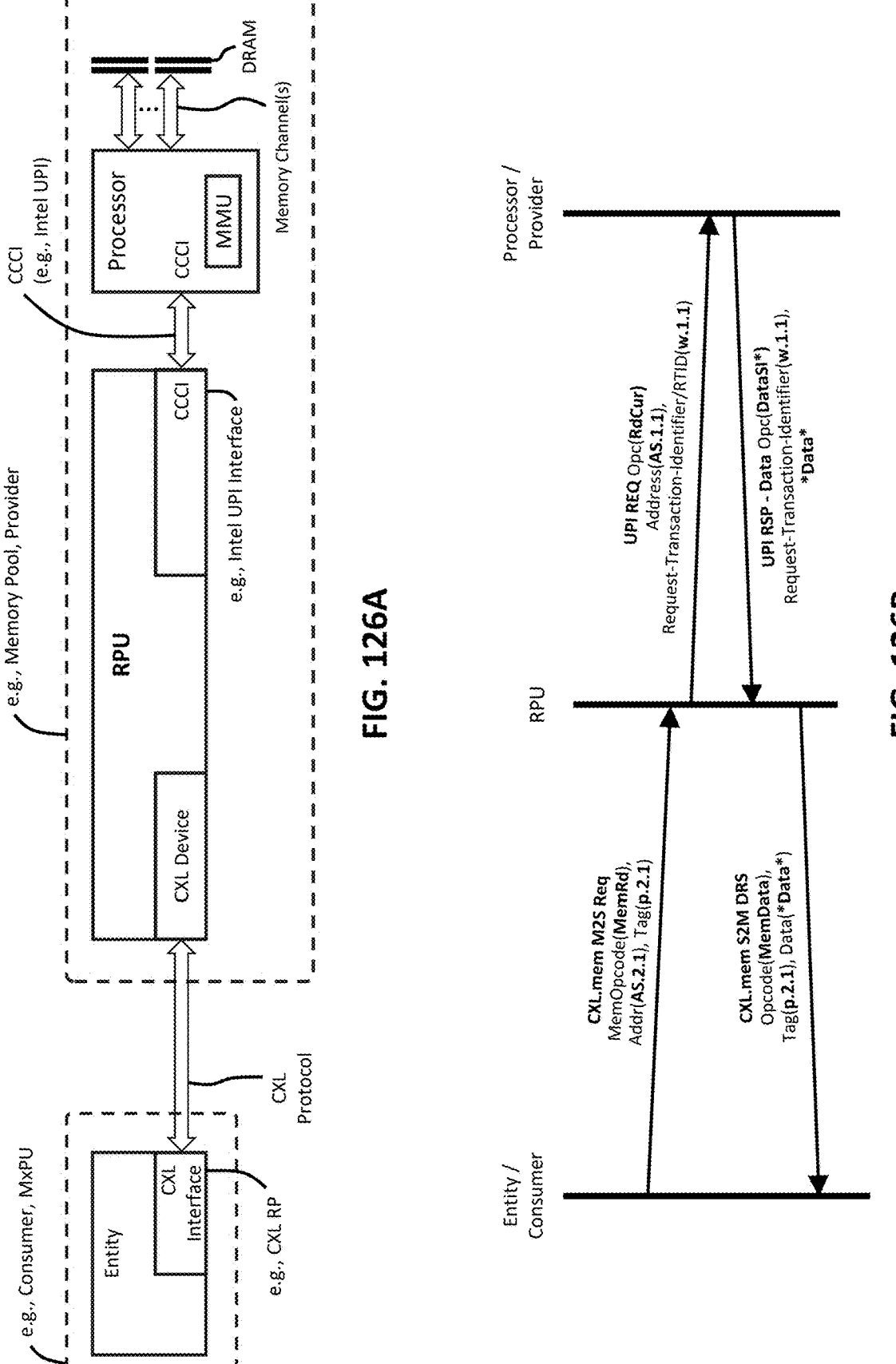
Figures 127A, 127B:
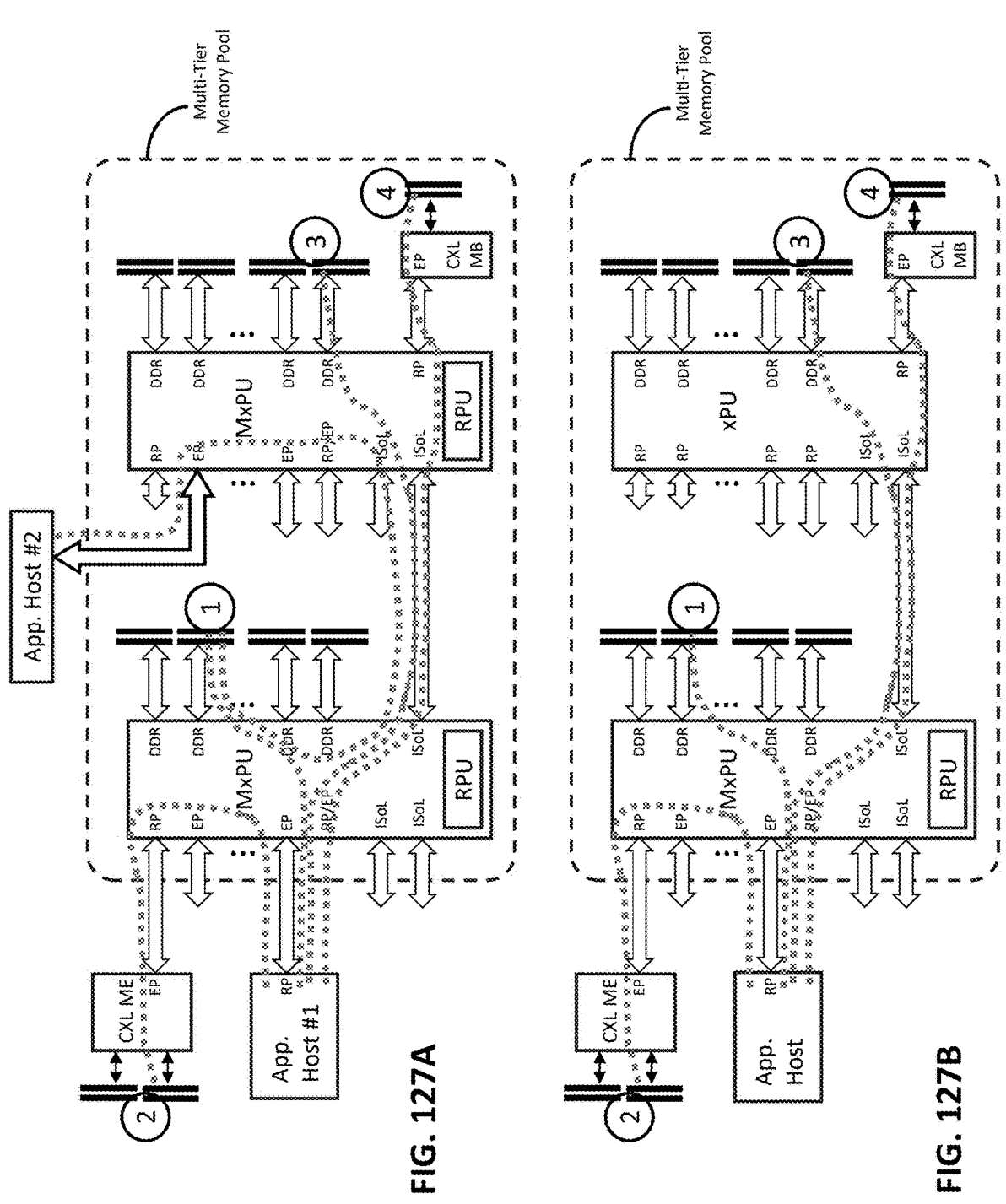
Figure 128:
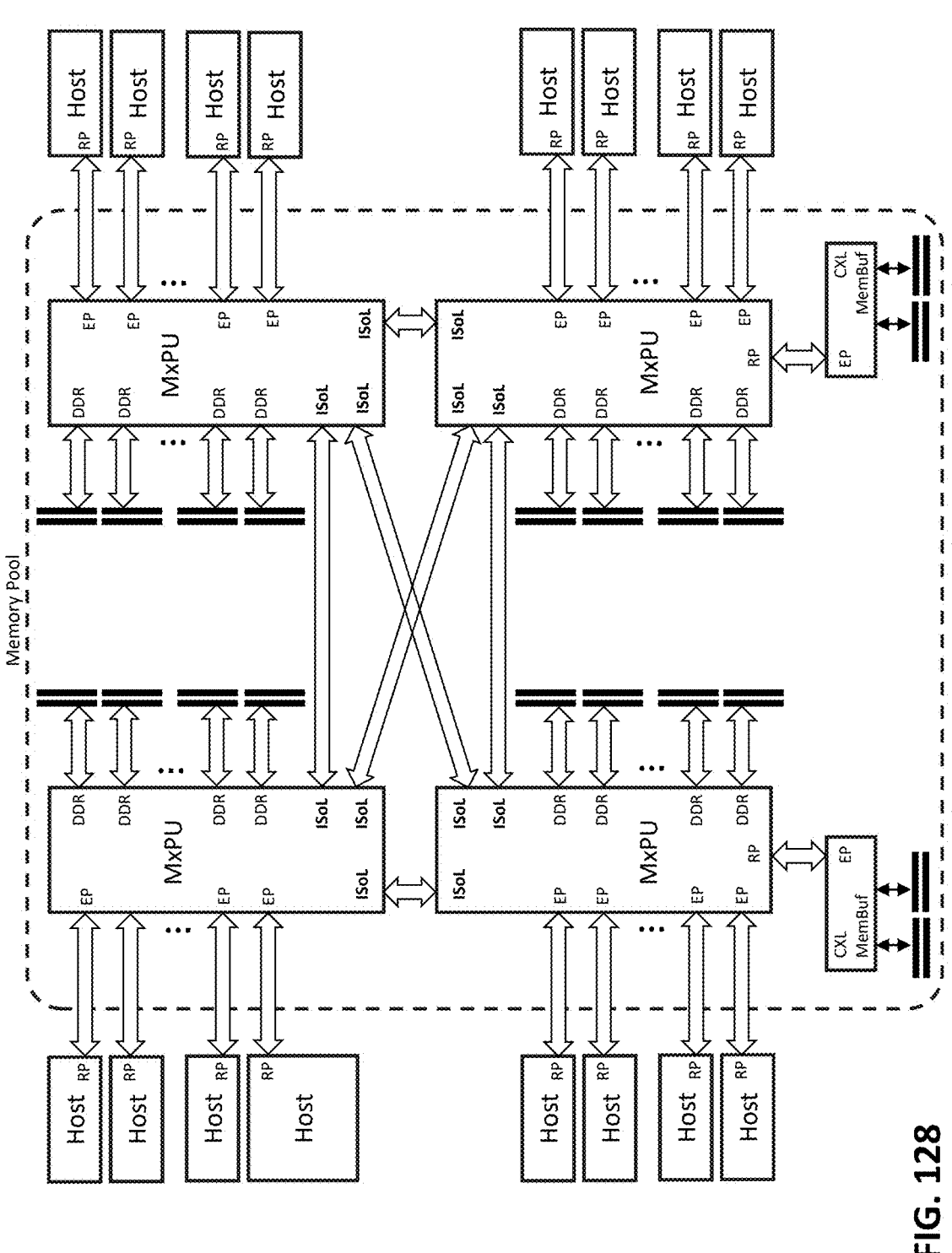
Figure 129:
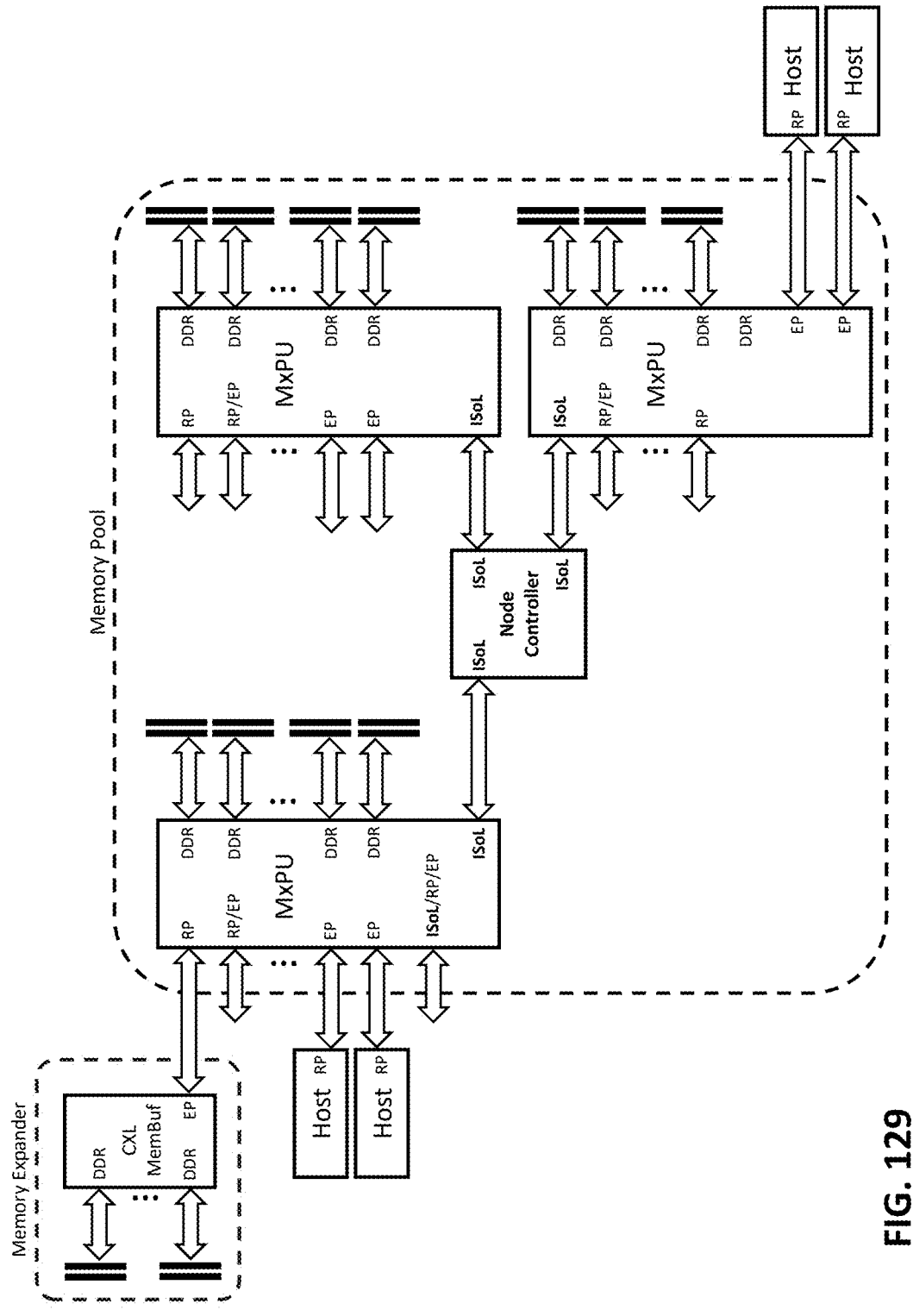
Figure 130:
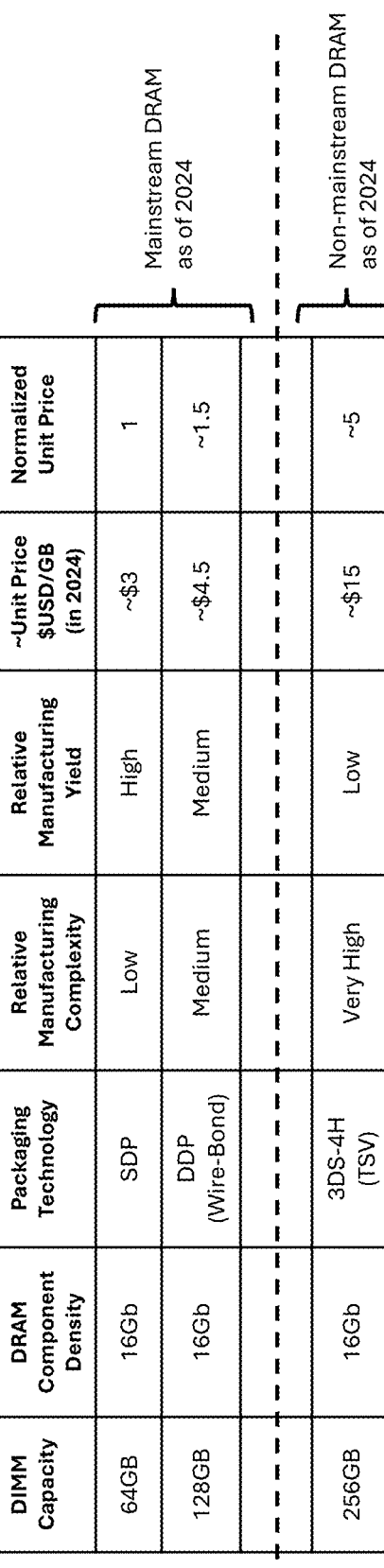
Figures 131A, 131B:
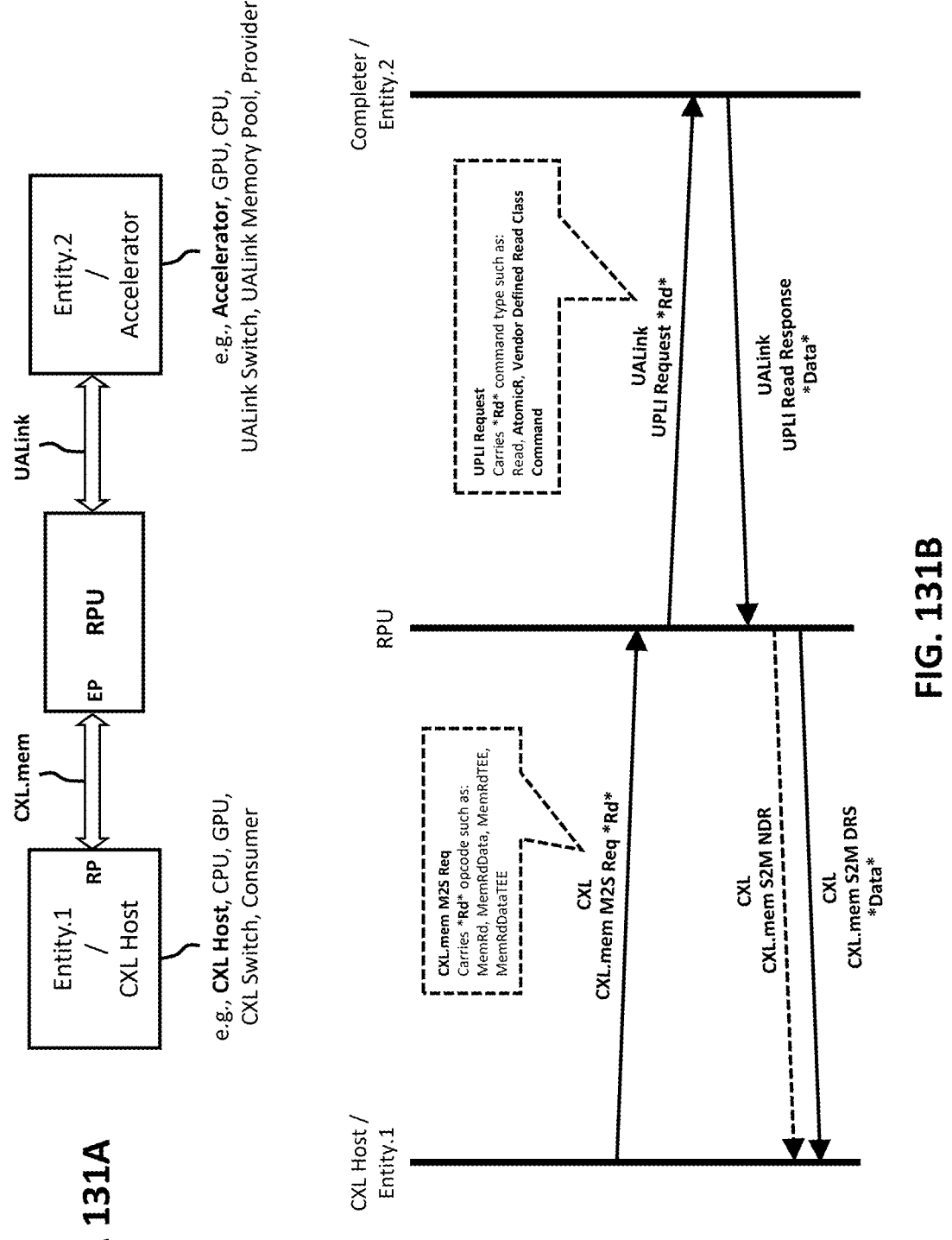

FIG. 69A illustrates one embodiment of a system configured to enable PCIe over UALink, such as via PCIe tunneling over UALink;

FIG. 69B illustrates one embodiment of a TFD demonstrating PCIe communications over UALink, such as PCIe over UALink, or PCIe tunneling over UALink;

FIG. 70A illustrates one embodiment of a system comprising a CXL host coupled to a CXL device over two bridges that utilize an NVLink PHY;

FIG. 70B illustrates one embodiment of a TFD depicting tunneling of CXL.io transactions between a host and a device through two bridges that utilize IEEE 802.3 and NVLink flits;

FIG. 71A illustrates one embodiment of a system configured to enable CXL over NVLink, such as via CXL tunneling over NVLink;

FIG. 71B illustrates one embodiment of a TFD demonstrating CXL communications over NVLink, such as CXL over NVLink, or CXL tunneling over NVLink;

FIG. 72A illustrates one embodiment of a system configured to enable PCIe over NVLink, such as via PCIe tunneling over NVLink;

FIG. 72B illustrates one embodiment of a TFD demonstrating PCIe UIO communications over NVLink, such as PCIe UIO over NVLink, or PCIe UIO tunneling over NVLink;

FIG. 73A illustrates one embodiment of a system that utilizes protocol translations between NVLink-based interfaces and a coherent interconnect based on a CHI protocol;

FIG. 73B illustrates one embodiment of a TFD showing the translation of an NVLink read transaction to a CHI ReadOnce transaction;

FIG. 74A illustrates one embodiment of a system that utilizes protocol translations between an NVLink-based interface and ARM CHI interconnect components;

FIG. 74B illustrates one embodiment of an RPU that translates between an NVLink protocol and a CHI protocol, utilizing an intermediate protocol based on ARM AMBA ACE-Lite;

FIG. 75A illustrates one embodiment of a system that utilizes protocol translations between an NVLink interface and CHI-based interconnect components;

FIG. 75B illustrates one embodiment of an RPU that translates between an NVLink protocol and a CHI protocol;

FIG. 76A illustrates one embodiment of a TFD showing translating an NVLink read request to a PCIe UIO read request to an ARM CHI ReadOnce request;

FIG. 76B illustrates one embodiment of a TFD showing translating an NVLink read request to a CXL.cache RdCurr request to an ARM CHI ReadOnce request;

FIG. 77A illustrates one embodiment of a system comprising an external entity coupled to an optional NVLink switch coupled to a processor comprising an RPU comprising an NVLink interface, a Request Agent (RA) Proxy, and a Home Agent (HA) Proxy;

FIG. 77B illustrates one embodiment of a system comprising a processor comprising NVLink chiplets (such as NVLink Fusion) to translate between NVLink and CHI;

FIG. 78A illustrates one embodiment of a system comprising an xPU comprising an RPU that translates between an NVLink protocol and a CHI protocol;

FIG. 78B illustrates one embodiment of a system comprising an entity including NVLink and CXL ports coupled to CHI interfaces that enable memory access via a processor's coherent interconnect;

FIG. 79A illustrates one embodiment of a system comprising a processor comprising an NVLink chiplet coupled via NVLink-C2C to the processor's coherent interconnect;

FIG. 79B illustrates one embodiment of a system comprising an xPU coupled to a GPU utilizing an RPU that translates between an NVLink protocol and a protocol based on ARM CHI;

FIG. 80A illustrates one embodiment of GPU/CPU coupled to an xPU comprising dies coupled by chip-to-chip interfaces;

FIG. 80B illustrates one embodiment of a custom accelerator comprising an NVLink Fusion chiplet;

FIG. 81A illustrates one embodiment of a system functioning as an NVLink memory switch appliance;

FIG. 81B illustrates one embodiment of a TFD showing translations between an NVLink protocol and a CHI protocol utilized by a coherent interconnect of an xPU;

FIG. 82A illustrates one embodiment of a system functioning as a multi-protocol memory switch appliance or a multi-protocol memory pool utilizing NVLink-based interfaces;

FIG. 82B illustrates one embodiment of a TFD depicting a multi-entity memory access scenario wherein separate NVLink and UALink transactions utilize the same coherent interconnect infrastructure for memory access;

FIG. 83 illustrates one embodiment of a system demonstrating asymmetric bandwidth configuration between an RPU (comprising NVLink, UALink, and/or CXL ports) and a coherent interconnect;

FIG. 84A illustrates one embodiment of a system optimized for accelerator applications utilizing UALink interfaces, wherein an RPU includes more home nodes (HN) than request nodes (RN);

FIG. 84B illustrates one embodiment of a system optimized for a memory pool or a memory switch applications utilizing UALink interfaces, wherein an RPU includes more request nodes (RN) than home nodes (HN);

FIG. 85A illustrates one embodiment of a system utilizing NVLink interfaces in an accelerator-optimized configuration;

FIG. 85B illustrates one embodiment of a system configured as an NVLink-based memory pool;

FIG. 86A illustrates one embodiment of a system that implements an NVLink-based switch, or an NVLink Memory Switch, utilizing an interconnect based on a CHI protocol;

FIG. 86B illustrates one embodiment of a TFD demonstrating NVLink switching operation between entities through a switch interconnect;

FIG. 87A illustrates one embodiment of a memory switch configured to provide memory to its coupled entities;

FIG. 87B illustrates one embodiment of a TFD demonstrating NVLink requests from entities to access memory;

FIG. 88 illustrates one embodiment of a system comprising an IC package comprising an input/output (IO) die coupled to compute dies and RPU dies;

FIG. 89A illustrates one embodiment of a system comprising a memory switch comprising an IC package with an IO die coupled to RPU dies;

FIG. 89B illustrates one embodiment of a TFD demonstrating protocol translations between CXL.mem and CXL-.cache relevant to a memory switch;

FIG. 90A illustrates one embodiment of a system comprising a memory switch or a Memory Pool;

FIG. 90B illustrates one embodiment of a TFD demonstrating protocol translations between CXL.mem and CXL-.cache relevant to a memory pool;

FIG. 91A illustrates one embodiment of a system comprising an xPU-based multi-protocol switch;

FIG. 91B illustrates one embodiment of a TFD demonstrating protocol and address translations between UALink and CXL.cache;

FIG. 92A illustrates one embodiment of a system comprising an xPU-based UALink switch;

FIG. 92B illustrates one embodiment of a TFD demonstrating translations that enable a processor to operate as a UALink switch or a UALink-based switch;

FIG. 93 illustrates one embodiment of a scalable GPU interconnect utilizing an xPU-based AI switch;

FIG. 94A illustrates one embodiment of a system comprising an xPU-based UALink switch and memory pool;

FIG. 94B illustrates one embodiment of a TFD demonstrating two UALink transactions through an xPU-based UALink switch and memory pool;

FIG. 95 illustrates one embodiment of a heterogeneous computing system comprising an NVLink chiplet coupled to an accelerator based on ARM mesh architecture;

FIG. 96A illustrates one embodiment of a system comprising a processor comprising an NVLink-C2C interface;

FIG. 96B illustrates one embodiment of a system comprising a CPU comprising an NVLink-C2C chiplet, such as NVLink Fusion;

FIG. 97 illustrates one embodiment of a system comprising a processor comprising a CXL device that exposes HDM regions and communicates over a PHY based on IEEE 802.3 PMA;

FIG. 98A illustrates one embodiment of a system comprising a processor that translates data indicative of a CXL.mem to CXL.cache;

FIG. 98B illustrates one embodiment of a TFD demonstrating protocol translations between CXL.mem and CXL-.cache protocols;

FIG. 99A illustrates one embodiment of a system featuring dual NVLink and CXL protocol support;

FIG. 99B illustrates one embodiment of a TFD demonstrating protocol translations from CXL.mem M2S MemRd to CXL.cache D2H RdCurr to ARM CHI ReadShared;

FIG. 100 illustrates one embodiment of a system wherein CXL runs over a PHY based on IEEE 802.3 PMA;

FIG. 101 illustrates one embodiment of a system demonstrating direct conversion from a CXL device to a Cache-Coherent Chip-to-Chip Interconnect (CCCI) protocol protocol;

FIG. 102A illustrates one embodiment of a silicon device functioning as an established xPU design before modification;

FIG. 102B illustrates one embodiment of a silicon device functioning as a CXL MHD;

FIG. 102C illustrates one embodiment of a silicon device functioning as a UALink Switch;

FIG. 103A illustrates a prior art AMD xPU architecture that includes an I/O die, a Compute Die, and a coherent interconnect;

FIG. 103B illustrates one embodiment of a CPU with a designated area modified by a reduced number of processing cores and an added UALink port;

FIG. 104 illustrates one embodiment of a memory switch or AI switch implementation utilizing two IC packages, or two processors with designated areas for building a switch;

FIG. 105 illustrates one embodiment of a Multi-Headed Device (MHD) implementation based on a designated area within a processor;

FIG. 106 illustrates a prior art Intel x86 CPU design with a designated area marked within the processor architecture;

FIG. 107 illustrates one embodiment wherein processing cores in a designated area are removed and replaced with a mix of CXL endpoint ports and RPUs;

FIG. 108 illustrates one embodiment of a CPU with UALink ports;

FIG. 109A illustrates a first embodiment for transforming a CPU design to a CXL memory device;

FIG. 109B illustrates one embodiment of an RPU that translates between CXL Type 1 Device interfaces;

FIG. 110 illustrates one embodiment of building a CXL MHD Memory Pool based on an xPU comprising CXL RPs;

FIG. 111 illustrates a second embodiment for transforming an xPU design to a CXL memory device;

FIG. 112 illustrates one embodiment of a processor comprising RPUs that translate between different combinations of CXL device types;

FIG. 113 illustrates one embodiment of a processor comprising termination circuits implemented at interfaces between silicon die areas;

FIG. 114A illustrates one embodiment of a system comprising a semiconductor device configured to translate between CXL.mem semantics and CXL.cache semantics;

FIG. 114B illustrates one embodiment of a TFD demonstrating translations between CXL.mem M2S MemRd Request and CXL.cache D2H RdCurr Request;

FIG. 114C illustrates one embodiment of a TFD demonstrating translations between CXL.mem M2S MemRd Request and CXL.cache D2H RdShared Request;

FIG. 115A illustrates one embodiment of a system comprising a semiconductor device configured to translate between first and second CXL.cache semantics;

FIG. 115B illustrates one embodiment of a TFD demonstrating translations between CXL.cache H2D SnpInv Request and CXL.cache D2H CLFlush Request;

FIG. 116A illustrates one embodiment of a system comprising a semiconductor device configured to translate between first and second CXL.mem semantics;

FIG. 116B illustrates one embodiment of a TFD demonstrating translations between CXL.mem M2S MemRdData Request and CXL.mem M2S MemRd Request, with optional speculative memory reads;

FIG. 117A illustrates one embodiment of a system comprising a semiconductor device configured to translate between a CXL-based protocol and a PCIe-based protocol;

FIG. 117B illustrates one embodiment of a TFD demonstrating translations between a CXL.io UIO Memory Read Request (UIOMRd) and a PCIe UIO Memory Read Request (UIOMRd);

FIG. 117C illustrates one embodiment of a TFD demonstrating translations between a CXL.io UIO Memory Read Request (UIOMRd) and a PCIe Memory Read Request (MRd);

FIG. 118A illustrates one embodiment of a system comprising a semiconductor device configured to translate between first and second PCIe-based protocols;

FIG. 118B illustrates one embodiment of a TFD demonstrating translations between a PCIe Memory Read Request (MRd) and a PCIe UIO Memory Read Request (UIOMRd);

FIG. 118C illustrates one embodiment of a TFD demonstrating translations between a PCIe UIO Memory Read Request (UIOMRd) and a PCIe Memory Read Request (MRd);

FIG. 119A illustrates one embodiment of a semiconductor device configured to translate between PCIe protocol and CXL.mem protocol;

FIG. 119B illustrates one embodiment of a TFD demonstrating translations between PCIe TLPs and CXL.mem messages;

FIG. 119C illustrates one embodiment of a TFD demonstrating translations between PCIe UIO TLPs and CXL.mem messages;

FIG. 120A illustrates one embodiment of a system comprising a semiconductor device configured to translate between a UALink-based protocol and a PCIe-based protocol;

FIG. 120B illustrates one embodiment of a TFD demonstrating translations between a UPLI Request ReqCmd (Read) and a PCIe Memory Read Request (MRd);

FIG. 120C illustrates one embodiment of a TFD demonstrating translations between a UPLI Request ReqCmd (Read) and a PCIe UIO Memory Read Request (UIOMRd);

FIG. 121A illustrates one embodiment of system comprising a semiconductor device configured to translate between a UALink-based protocol and a CXL protocol;

FIG. 121B illustrates one embodiment of a TFD demonstrating translations between a UPLI request and a CXL.mem request, with an optional speculative memory read;

FIG. 121C illustrates one embodiment of a TFD demonstrating translations between a UPLI request and a CXL.cache request;

FIG. 122A illustrates one embodiment of a system comprising a semiconductor device configured to translate between a UALink-based protocol and a CXL-based protocol;

FIG. 122B illustrates one embodiment of a TFD demonstrating translations between a UPLI Request ReqCmd (Read) and a CXL.io UIO Memory Read Request (UIOMRd);

FIG. 122C illustrates one embodiment of a TFD demonstrating translations between a UPLI Request ReqCmd (Read) and a CXL.io Memory Read Request (MRd);

FIG. 123A illustrates one embodiment of a system comprising a semiconductor device configured to translate between an NVLink-based protocol and a PCIe-based protocol;

FIG. 123B illustrates one embodiment of a TFD demonstrating translations between an NVLink read request and a PCIe UIO Memory Read Request (UIOMRd);

FIG. 123C illustrates one embodiment of a TFD demonstrating translations between an NVLink read request and as PCIe Memory Read Request (MRd);

FIG. 124A illustrates one embodiment of a system comprising a semiconductor device configured to translates between an NVLink-based protocol and a CXL protocol;

FIG. 124B illustrates one embodiment of a TFD demonstrating translations between NVLink-based requests and CXL.mem requests;

FIG. 124C illustrates one embodiment of a TFD demonstrating translations between NVLink-based requests and CXL.cache requests;

FIG. 125A illustrates one embodiment of a system comprising a semiconductor device configured to translate between an NVLink-based protocol and a CXL-based protocol;

FIG. 125B illustrates one embodiment of a TFD demonstrating translations between NVLink-based read requests and CXL.io UIO TLPs;

FIG. 125C illustrates one embodiment of a TFD demonstrating translations between NVLink-based read requests and CXL.io MRd TLPs;

FIG. 126A illustrates one embodiment of a system that couples between CXL protocol on one side and CCCI protocol on the other side;

FIG. 126B illustrates one embodiment of a TFD showing the translation of a CXL.mem protocol transaction to a UPI protocol transaction;

FIG. 127A illustrates one embodiment of a multi-tier memory pool;

FIG. 127B illustrates one embodiment of a multi-tier memory pool;

FIG. 128 illustrates one embodiment of a high-fanout large-scale multi-tier memory pool;

FIG. 129 illustrates one embodiment of utilizing a node controller to connect processors of a memory pool;

FIG. 130 is an example of mainstream and non-mainstream DRAM component costs as of 2024; and FIG. 131A and FIG. 131B illustrates one embodiment of a system and its corresponding TFD of translating between CXL.mem and UALink UPLI.

DETAILED DESCRIPTION

The term "Compute Express Link" (CXL) refers to currently available and/or future versions, variations and/or equivalents of the open standard as defined by the CXL Consortium. CXL Specification Revisions 1.1, 2.0, 3.0, 3.1, and 3.2 are herein incorporated by reference in their entirety.

The term "PCI Express" (PCIe) refers to current and future versions, variations, and equivalents of the standard as defined by PCI-SIG (Peripheral Component Interconnect Special Interest Group). PCI Express Base Specification Revisions 5.0, 6.0, 6.1, and 6.2 are herein incorporated by reference in their entirety.

The term "Universal Chiplet Interconnect Express" (UCIe) refers to currently available and/or future versions, variations and/or equivalents of the open standard as defined by the UCIe Consortium. UCIe Specification Revisions 1.0, 1.1, 2.0, and 3.0 are herein incorporated by reference in their entirety.

The term "Ultra Accelerator Link" (UALink) refers to currently available and/or future versions, variations and/or equivalents of the UALink Specification as defined by the Ultra Accelerator Link Consortium, Inc. UALink_200 Rev 1.0 Specification and its subsequent revisions are herein incorporated by reference in their entirety.

The term "CXL device" refers to an electronic component that identifies itself as CXL-capable through a standardized device identification mechanism, such as the presence of Device Vendor Specific Extended Capability (DVSEC). A CXL device may incorporate capabilities for coherent caching functionality, memory functionality, and/or accelerator functionality. CXL devices may be designed as Single Logical Devices (SLDs), Multi-Logical Devices (MLDs), Multi-Headed Devices (MH-devices), Dynamic Capacity Devices (DCDs), Global Fabric Attached Memory Devices (GFDs), or devices supporting other CXL-related features defined or to be defined in current or future CXL specification revisions. A CXL device may present one or more logical interfaces over one or more physical ports, may support dynamic partitioning of resources, and may include capabilities for connecting to one or more hosts, through various topologies including direct attachment, CXL switches, CXL fabric infrastructure, and/or other CXL-compatible intermediary components. A CXL device may maintain its identity as a CXL device regardless of its operational state, including during initialization, enumeration, or when operating in fallback modes such as PCIe.

The term "host" refers to a computing entity or system comprising one or more CPUs that share a common Host Physical Address (HPA) space, wherein the CPUs may be physically located in CPU sockets or soldered directly to a printed circuit board (PCB), and wherein the CPU sockets within the host may be designated as sub-domains of the host. Examples of hosts include, but are not limited to, a blade host in a blade server system, a host implemented on an add-in card, a standalone server, an embedded computing system, a bare metal server in a data center, a node in a high-performance computing (HPC) cluster, a compute sled in a hyperscale rack system, or a server node in a cloud provider's data center.

Additionally or alternatively to the general definition of a host provided above, in the specific context of CXL, the terms "host" or "CXL host" refer to a computing entity or system that includes a Root Complex and resides at the root of a CXL topology. A host may include a CPU and expose one or more Root Ports. A host may advertise its CXL support via a mechanism defined in the CXL specification, and may incorporate capabilities for CXL interfaces and protocols (for example, CXL.io, CXL.cache, CXL.mem, and/or future CXL protocols). The host may possibly include capabilities for connecting to CXL devices through various topologies, including, for example, direct attachment, CXL switches, CXL retimers, CXL redrivers, CXL fabric infrastructure, RPUs, MxPUs, or current or future CXL-compatible intermediary components or infrastructure. Various types of computing entities may possibly be designed as hosts including, for example, CPU-based or GPU-based cards, chips, or servers, processors, embedded controllers with root capabilities, accelerators configured with root capabilities, and other computing components with root capabilities. The host may act as a master in CXL transactions and may include capabilities for single-domain or multi-domain operation, memory pooling or sharing, host-side security features, and possibly support additional features or functionalities, standardized or proprietary, to be defined by future revisions of the CXL specification or possibly implemented by the host beyond those specified in the CXL specification.

In the context of CXL, the term "application host" refers to a host that executes workloads or applications that utilize one or more CXL protocols to support its computational tasks, which may include accessing memory, maintaining cache coherency, offloading computations, or other operations over one or more CXL links.

The term "Resource Provisioning Unit" (RPU) refers to a logical processing module comprising or coupled to at least two interfaces/ports. Depending on the context, the RPU may perform or participate in translations, conversions, tunneling, encapsulation, mapping and/or terminations of protocols, messages, packets, flits, physical layer transfer units (such as phits), transactions, commands, requests, responses, and/or specific fields thereof, such as translations of addresses, opcodes, and/or tags. The RPU may be implemented in various hardware, firmware, and/or software configurations, such as an ASIC, an FPGA, a logical and/or physical module inside a CPU/GPU/MxPU, a hardware accelerator, a host, a device, a controller, a switch, a memory pool, and/or a network node. The RPU may be implemented as a single module and/or a single computer (which covers anything having a processor, memory, and a communication interface), and/or as a distributed computation entity running on a combination of computing machines, such as ASICs, FPGAs, hosts, servers, network devices, CPUs, GPUs, accelerators, fabric managers, and/or switches. Unless the context indicates otherwise, descriptions of the RPU as comprising its interfaces/ports (which may optionally include channels, links, lanes, endpoints, root ports, pathways, buses, or connections), descriptions of the RPU as being coupled to such elements, and descriptions of such elements as being part of or separate from the RPU, may be used herein interchangeably. Furthermore, references to the RPU performing operations may encompass both direct implementation by the RPU and indirect implementation through components coupled to or associated with the RPU, unless specifically distinguished by the context.

In a first non-limiting example, the operations performed by the RPU may support and/or enable one or more of the following non-limiting examples: configurations, reconfigurations, management of resources (such as pooled resources, disaggregated resources, or combinations thereof), allocation of fabric resources, memory pooling, memory disaggregation, memory sharing (which may optionally include hardware coherency), multi-tenant isolation, performance isolation, dynamic capacity provisioning, Quality-of-Service (QoS) mechanisms, access control (e.g., ACL) monitoring and/or enforcement, security filtering, access pattern tracking and/or logging (such as collection of spatiotemporal access patterns for creation of heat maps, detection of intrusion attempts, or discovery of rogue entities), traffic management (such as rate-limiting, policing, or shaping, optionally applied to subsets of the traffic such as to protocol-layer messages or to link-layer credits), software-defined match-actions, prefetching operations, transaction tracking and management, bidirectional access capabilities, protocol bridging between heterogeneous domains, transaction ordering, and/or maintenance of translation contexts for multiple entities. In a second non-limiting example, the RPU may translate between protocol data units (PDUs), such as between messages conforming to the same protocol (e.g., translating between messages conforming to first and second CXL.mem protocols with different address spaces, or translating between messages conforming to first and second CXL.mem protocols utilizing type-3 and type-2 flows, respectively), translate between transaction layer packets (TLPs) conforming to the same protocol (such as translating between TLPs conforming to first and second PCIe protocols utilizing UIO and non-UIO TLP types, respectively), translate between messages conforming to different revisions of the same protocol (such as translating between CXL.mem messages conforming to CXL 1.1 and CXL.mem messages conforming to CXL 3.2), translate between messages conforming to related protocols (such as between CXL.mem and CXL.cache, or between PCIe and CXL.io), or translate between messages conforming to different protocols (such as between two or more of: CXL, PCIe, UCIe, NVLink, UALink, CHI, ISoL, CCIX, or other interconnect protocols). The RPU may maintain separate translation contexts, tables, or state information for different entities accessing resources concurrently.

The term "memory pool" refers to a system, an apparatus, a device, and/or a logically or physically distinct collection of resources that may incorporate, manage, or otherwise control memory capacity (such as volatile memory (e.g., DRAM) and/or non-volatile memory), and that may provide the capability to provision, allocate, deallocate, expose, share, map, and/or otherwise make available portions or aspects of its memory capacity for use, access, sharing, allocation, and/or consumption by one or more entities external to the memory pool. Such entities may include, but are not limited to, hosts, servers, processors, accelerators, computing devices, virtual machines, containers, processes, applications, services, operating systems, hypervisors, or other memory pools. Memory pool encompasses relevant implementation, embodiment, configuration, and/or arrangement that performs functions related to memory resource aggregation, management, provisioning, and/or sharing, irrespective of its commercial designation (including, but not limited to, memory systems, memory allocators, memory servers, memory nodes, memory complexes, memory domains, memory fabrics, DRAM pools, CXL-attached memory pools, memory clusters, pooled memory, shared memory, disaggregated memory, composable memory, and/or software-defined memory), physical form factor, architectural design, interconnection method, communication protocol(s), adherence to industry standards, technological generation, and/or implementation methodology.

A memory pool may also be capable of running workloads, applications, and/or computational tasks, thereby functioning as both a memory entity and a compute entity. Furthermore, a memory pool may be implemented as a logical entity that borrows, aggregates, or otherwise utilizes memory resources from other entities (such as hosts, devices, or other memory pools), rather than solely relying on dedicated physical memory resources under its direct control. Additionally, in some embodiments, a memory pool may be configured to function as a compute entity, without necessarily providing memory resources for external consumption.

Usually, hypervisor allocates memory to virtual machines (VMs), and assigns address spaces to the VMs (at the hypervisor's level). The operating system of a VM allocates memory to the processes run by the VM, and assigns processes their own address spaces (at the VM's level). A process may have threads that share the same virtual addresses.

The term "Non-Volatile Memory Express" (NVMe) refers to current and future variations, extensions, and equivalents of the logical-device interface specification for accessing non-volatile storage media in computing systems. This definition encompasses NVMe over Fabrics (NVMe-oF) and subsequent adaptations of the NVMe protocol for networked or distributed storage environments. NVMe embodiments may span a range of performance levels and cost structures, including but not limited to: software-based solutions (such as NVMe over TCP or NVMe over CXL), partially hardware-accelerated embodiments (which may incorporate specialized processing on network interface controllers or other components), and smart front-end units or fully hardware-based solutions designed to achieve up to maximum data throughput and minimal latency. This definition is intended to cover current and future NVMe-based technologies that facilitate high-performance, low-latency access to non-volatile storage, regardless of the specific underlying hardware architecture or network topology.

The terms "Provider" and "Consumer" are used to describe entities in a resource allocation and utilization framework, encompassing a wide range of scenarios and embodiments, and should be interpreted according to the context of specific embodiments and/or claims. The Provider-Consumer relationship is not limited to a specific type of resource and may include physical and/or logical resources, with possibilities for shared, partitioned, exclusive, or other mode of use. The term "Provider" may refer to an entity, a system, a component, a process, an application, service, a virtual machine, a container, or other logical or physical entity that makes available, offers, allocates, and/or grants access to one or more resources; these resources may include, but are not limited to, one or more of memory resources, storage resources, computational resources, network resources, and/or other type of shareable asset or capability; the act of "providing" may involve direct allocation, virtualization, pooling, partitioning, and/or other mechanism by which resources are made accessible or usable by other entities. The term "Consumer" may refer to an entity, a system, a component, a process, an application, a service, a virtual machine, a container, or other logical or physical entity that utilizes, accesses, receives, and/or otherwise consumes the resources made available by a Provider; the act of "consuming" may involve direct usage, indirect access, temporary or permanent allocation, sharing resources with other Consumers, retaining exclusive access to the resources, and/or other form of resource utilization or interaction. An entity may function as a Provider, a Consumer, or both simultaneously or at different times, depending on the context and requirements of the specific embodiment or claim. The Provider-Consumer relationship is context-dependent, without implying specific implementation details, protocols, technologies, or limitations as these definitions are intended to be technology-agnostic and applicable across various technological domains. Additionally, the granularity and nature of what constitutes a "resource" in this relationship are flexible, ranging from fine-grained computational units to large-scale system capabilities.

The term "Multi-Headed Device" (MHD) refers to a CXL Type 3 device equipped with multiple CXL ports, with ports being designated as "heads". For example, CXL Specification Revision 3.1 defines two types of MHD, which include (i) Multi-Headed Single Logical Device (MH-SLD) that exposes multiple Logical Devices (LDs) with dedicated links, and (ii) Multi-Headed Multi-Logical Device (MH-MLD) that contains multiple links supporting either MLD or SLD operation (optionally configurable), wherein at least one link supports MLD operation.

The term "DRAM" refers to present, future, and conceptual forms, implementations, variations, architectures, and functional equivalents of dynamic random access memory and related or analogous memory technologies, encompassing but not limited to: (1) any memory technology, regardless of its underlying physical mechanism, material composition, fabrication method, or operational principles, that serves a functionally similar or analogous purpose in computing, electronic, quantum, optical, or hybrid system as working memory, main memory, system memory, cache memory, buffer memory, or similar functions; (2) technologies characterized by a combination of features typically associated with DRAM such as high speed, random access, volatile or non-volatile storage, refresh requirements or refresh-free operation, and single or multi-level cell storage; (3) variations, generations, and derivatives of conventional DRAM architectures including but not limited to asynchronous and synchronous DRAM (SDRAM, including SDR, DDR, GDDR, LPDDR, and future generations), registered and buffered DRAM, 3D-stacked DRAM (including High-Bandwidth Memory (HBM) and Hybrid Memory Cube (HMC)), DRAM utilizing Through-Silicon Vias (TSVs), multi-channel DRAM, and embedded DRAM (eDRAM); (4) emerging and future memory technologies like FeRAM, Carbon Nanotube RAM, MRAM (including STT-MRAM, SOT-MRAM, and future variants), PCRAM, ReRAM, Universal Memory, and any other memory technology that competes with, complements, or replaces traditional DRAM; and (5) memory technology deployed in applications such as computing systems, servers, hardware accelerators (GPUs, TPUs, FPGAs, ASICs), networking equipment, storage devices, embedded systems, quantum computers, and consumer electronics, irrespective of specific generation, interface protocol, manufacturing process, physical organization, or architectural design.

The term "mainstream DRAM module" refers to a PCB comprising mainstream DRAM components. The term "mainstream DRAM component" refers to a memory component that exhibits an average normalized unit price per gigabyte that does not exceed three times the average unit price per gigabyte of the lowest-cost DRAM component technology in volume production for the specific industrial computing application field (such as DRAM for data center computing, DRAM for high-performance computing (HPC), or DRAM for AI systems), and demonstrates a manufacturing yield that enables sustained high-volume production relative to manufacturing processes for that specific industrial computing application field at the time of making the comparison. The manufacturing yield of a mainstream DRAM component at any given time may be measured relative to prevalent DRAM manufacturing technologies for that specific application field at that time. For example, as of 2024, single-die package (SDP) DRAM components and dual-die package (DDP) DRAM components are usually considered mainstream DRAM components, wherein SDP DRAM components exhibit a normalized unit price of 1 and a high manufacturing yield, and DDP DRAM components exhibit a normalized unit price of about 1.5 and a medium manufacturing yield. In contrast, 3D Stack DRAM components are not considered mainstream DRAM components as of 2024, as they exhibit a normalized unit price of about 5 and a low manufacturing yield compared to SDP DRAM components and DDP DRAM components.

The term "connected" in the context of phrases such as "memory channels connected to memory", "memory interfaces connected to DRAM", or "High Bandwidth Memory (HBM) connected to a GPU die" refers to a direct or indirect physical or electrical connection that allows for the transmission of data or signals between the connected elements, while preserving at least the main characteristics of the original format and content of the data or signals being transmitted, and may involve passive components (such as silicon interposers) or active components (such as retimers). In this specific context, the term "connected" does not encompass connections that involve transformations such as protocol translation, modulation change, modifications to error correction schemes, protocol termination, serialization-deserialization, and/or clock domain crossing.

"Coupled", on the other hand, is a broader term referring to direct or indirect cooperation and/or interaction, such as direct or indirect physical contact, electrical connection, and/or software and/or hardware interface. The connection between two coupled elements may (or may not) involve one or more of passive components, active components, protocol translation, modulation change, modifications to error correction schemes, alteration of packet headers or payloads, protocol termination, encoding-decoding, serialization-deserialization, clock domain crossing, signal conversion, and/or any other modification to the data or signals being transmitted.

The terms "xPU", "CPU/GPU", and "CPU or GPU" refer to: (i) CPU or GPU, individually; or (ii) a combination of a CPU and GPU within a single integrated circuit (IC) package, including but not limited to configurations such as a System on a Chip (SoC), Integrated CPU-GPU, Integrated Processor, or Accelerated Processing Unit (APU).

The terms "semiconductor device" and "Modified CPU or GPU" (MxPU) refer to at least one semiconductor chip housed within an IC package, bare die packaging, or other suitable packaging. The semiconductor chip is a piece of semiconducting material containing one or more integrated circuits (ICs), which may include various types of electronic components such as transistors, diodes, resistors, capacitors, and/or interconnects. Examples of semiconductor devices/MxPUs include, but are not limited to, Central Processing Units (CPUs), Graphics Processing Units (GPUs), Integrated CPU-GPU, Domain-Specific Accelerators (DSAs), Field-Programmable Gate Arrays (FPGAs), System-on-Chips (SoCs), Application-Specific Integrated Circuits (ASICs), dies or chiplets with appropriate logic, memory devices, controllers, possible combinations thereof, and other appropriate types of integrated circuits. The term "die" includes chiplets and other forms of semiconductor dies.

The term "inter-socket link" (ISoL) refers to any current or future high-speed communication link, interconnect, and/or architecture that facilitates data transfer between processors, such as CPUs, GPUs, accelerators, and/or DSAs. Non-limiting examples of technologies embodying ISoL principles include Intel's Coherent Processor Interconnect Protocol (ICPIP) for scalable multiprocessors with a shared physical address space (which refers to protocols such as QuickPath Interconnect (QPI), Ultra Path Interconnect (UPI), KTI, UXI, and future Intel's Coherent Processor Interconnect Protocols); External Global Memory Interconnect (xGMI), which is AMD's high-bandwidth coherent external link that connects processors or GPUs into a shared global-memory domain; Infinity Fabric (IF), which is AMD's scalable interconnect architecture that may connect AMD CPUs to CPUs, GPUs to GPUs, or CPUs to GPUs, providing cache coherency across heterogeneous processor types; Coherent Hub Interface chip-to-chip (CHI C2C), which is ARM's interconnect specification that maintains cache coherency across multiple chips in ARM-based architectures; NVLink chip-to-chip (NVLink-C2C), which is NVIDIA's interconnect technology that provides chip-to-chip communication with cache coherency support; NVLink, which is NVIDIA's interconnect technology for GPUs, CPUs, and accelerators, that may connect GPUs to GPUs, GPUs to CPUs, or accelerators to CPUs; Ultra Accelerator Link (UALink); or Scale Up Ethernet (SUE), which was introduced by Broadcom and contributed to the Open Compute Project (OCP), including SUE-based Protocol Data Unit (PDU) such as SUE PDU, SUE Lite PDU, or PDUs based on future revisions of SUE. Each of these technologies, and others developed in the future, implements specific port, interface, and protocol designs for inter-processor communication. These interconnects support various processor arrangements including those soldered to PCBs, installed in motherboard sockets, or integrated as separate dies within chiplet-based designs. The interconnect architectures may encompass direct inter-processor links, switched fabric designs, node controller-based topologies, optical interconnects, and/or heterogeneous computing interconnects linking different processor types (e.g., CPUs, GPUs, DSAs, FPGAs, and/or AI accelerators). The interface points for these technologies may be collectively referred to as "ISoL ports", though they may have technology-specific designations such as "UPI port" or "UPI link" for Intel processors, "IF link" or "xGMI link" for AMD processors, "NVLink port", "NVLink link", or "NVLink interface" for NVIDIA GPUs, or "UALink port", "UPLI interface", or "UPLI interface port" for UALink embodiments.

A Cache-Coherent Chip-to-Chip Interconnect (CCCI) refers to a subset of ISoL that enables communication between processors while maintaining cache coherency across chips. CCCI may connect various types of processors including CPUs to CPUs, GPUs to GPUs, or CPUs to GPUs, and implement cache coherency protocols that allow processors to share data while maintaining a consistent view of memory across coupled devices. CCCI may implement various cache coherency protocols such as MESI (Modified, Exclusive, Shared, Invalid), MOESI (Modified, Owned, Exclusive, Shared, Invalid), or proprietary coherency schemes. The cache coherency support provided by CCCI may enable the processors to efficiently share data, maintain memory consistency, and coordinate access to shared resources without requiring software-based synchronization mechanisms. The CCCI may support features such as snoop filters, directory-based coherency, or broadcast-based coherency depending on the specific embodiment and scalability requirements of the system architecture. Examples of ISoL technologies that function as CCCI include Intel's UPI and QPI, AMD's xGMI and Infinity Fabric, ARM's CHI C2C, and NVIDIA's NVLink-C2C, all of which provide cache coherency mechanisms as part of their interconnect protocols.

In the context of a processor, the term "coherent interconnect" refers to the communication infrastructure (such as ring, mesh, or crossbar) within a semiconductor device (such as a CPU, GPU, or MxPU), which enables data transfer between various components and modules in the semiconductor device, such as cores, caches, memory controllers, and/or other modules within a CPU/GPU/MxPU. The coherent interconnect is intended to encompass current and future coherent interconnect architectures, including but not limited to: point-to-point interconnects with dedicated communication channels; shared bus architectures using a common set of wires or shared medium; mesh interconnects; hierarchical bus structures with multiple levels of buses; crossbar interconnects providing a switched matrix for simultaneous communication; Network-on-Chip (NoC) architectures employing packet-based communication and routing protocols; hybrid interconnects combining different topologies; and/or advanced hybrid interconnects such as hierarchical NoCs or configurable interconnect fabrics.

The term "Physical Layer" or "PHY" refers to hardware and protocol responsible for transmission and reception of signals, typically in the context of data communication wherein raw data bits are converted to physical signal representations, and vice versa, to be sent and received over a target medium such as copper twin-axial (Twinax) cabling, fiber optics, PCB traces for chip-to-chip (C2C) communication, or a silicon interposer for die-to-die (D2D) connectivity. The physical layer (PHY) is typically associated with the lower layer, or layer 1, of the Open System Interconnection (OSI) reference model, and may include, but is not limited to, sub-layers such as a Physical Coding Sublayer (PCS), a Physical Medium Attachment (PMA), sometimes referred to as "Analog Front-End" (AFE), and a Physical Medium Dependent (PMD). Examples of physical layers may include the Flex Bus Physical Layer as specified in the various CXL specifications, the collection of physical layers defined by the IEEE 802.3 Working Group, sometimes collectively referred to as "802.3 PHY", "Ethernet PHY", or "IEEE 802.3 PMA" when referring to sub-layers of the PHY, such as a PMA. Other PHYs may include UALink physical layers, such as UALink 200 Rev 1.0 that is based on IEEE 802.3dj (D1.4), NVIDIA NVLink physical layers, Ultra Ethernet Transport (UET) physical layers, or any other appropriate current or future communication technologies. A physical layer may transport, convey, carry, or otherwise communicate higher layers associated with different protocols, such as CXL over a physical layer based on IEEE 802.3 PMA, either through direct support, or by encapsulating, embedding, incorporating, integrating, and/or adapting the protocol data unit (PDU) into the native data formats, structures, and/or transmission protocols supported by the physical layer. Such adaptation may require protocol-specific amendments to the physical layer specification. For example, in UALink, a UALink_200 physical layer may be based on an IEEE 802.3dj (D1.4) physical layer with optional support for 1-way and 2-way FEC code word interleaving modes, in addition to the 4-way interleaving specified in IEEE 802.3dj (D1.4), as described in IEEE 802.3dj (D1.4) Clause 176.1.4 (PMA functions).

As used herein, the terms "CXL.mem" and "CXL.mem protocol" may be used interchangeably, and the terms "CXL.cache" and "CXL.cache protocol" may be used interchangeably. CXL Specification Revision 3.1, herein incorporated by reference in its entirety, exhibits variability in its use of terms such as message, transaction, command, opcode, request, and response in contexts that are not always strictly differentiated. For example, terms like "MemRd message", "MemRd Command", and "MemRd opcode" can be considered valid designations and may be used to refer to similar or related concepts. Similarly, as a second example, the terms "CXL.mem message", "CXL.mem transaction", "CXL.mem request", and "CXL.mem response" are also acceptable and may be used in overlapping contexts. Therefore, for the sake of simplicity and depending on the context, this specification may use terms such as "message" and "transaction" broadly, potentially encompassing concepts that may be more specifically referred to as commands, opcodes, requests, or responses in certain contexts. Additionally, for the sake of simplicity and depending on the context, references to CXL.mem messages and CXL.cache messages may also encompass CXL.mem transactions and CXL.cache transactions, and vice versa, because CXL transactions utilize messages.

Furthermore, CXL Specifications occasionally describe CXL.cache and CXL.mem using various terms such as protocols, channels, interfaces, and transactional interfaces. For simplicity, these terms may be used interchangeably in this specification, depending on the context, to refer to the general concept of CXL communications and interactions. The nuanced differences between terms such as message, command, and opcode, or the nuanced differences between terms such as protocol, channel, and interface, can be found in the relevant CXL Specification Revision if necessary for a particular context.

Moreover, the term "CXL opcode" refers to an opcode, a command, or a TLP type associated with a protocol based on CXL. Examples of CXL opcodes include CXL.mem MemRd opcodes, CXL.cache RdShared opcodes, CXL.io MRd TLP types, or CXL.cache ItoMWr commands.

The term "CXL fabric" refers to a variety of configurations enabling high-speed communication and/or resource sharing among various components in a CXL environment/ecosystem, such as processors, memory expanders, accelerators, storage devices, and other peripherals. These configurations may include one or more of (i) point-to-point configurations, wherein a host, such as a CPU, is coupled to a CXL device (e.g., a CXL memory expander, an accelerator, or other peripherals) without necessitating a switch, (ii) switched fabric configurations that utilize one or more CXL switches enabling connectivity between hosts and devices, (iii) any other configurations and/or topology adhering to protocols based on CXL for scalable interconnectivity, such as daisy-chained devices, tree, mesh, or star configurations, and/or (iv) hybrid configurations that combine CXL links/protocol with other current or future communication links/protocols such as PCIe, UCIe, Ethernet, NVLink, UET, or other emerging interconnect technologies.

The term "Configuration Space" in the context of CXL encompasses several layers. Fundamentally, CXL devices utilize the PCIe Configuration Space (up to 4 KB per function) for core PCIe functions, such as device discovery, capability identification, and basic configuration, including a 256-byte PCI-compatible region to maintain backward compatibility. Furthermore, CXL defines extended configuration mechanisms, such as through PCIe Designated Vendor-Specific Extended Capabilities (DVSECs), and/or targeting a unique Capability ID optionally via PCIe configuration read/write transactions. These CXL DVSECs encompass registers controlling features like CXL.io, CXL.cache, CXL.mem, power management, RAS, and hot-plug, providing access to CXL-specific functionality. Additionally, some CXL components, such as switches and memory devices, may utilize Memory Mapped I/O (MMIO) registers for configuration-related purposes like memory mapping and dynamic capacity management. CXL devices may utilize certain PCIe Configuration Space registers differently than standard PCIe devices, and some CXL devices may not implement the full PCIe Configuration Space, as detailed in the respective sections of the CXL specification, which allows for CXL-specific behaviors and optimizations while building upon the established PCIe framework.

Unless specifically limited by context, references to "translation" between protocols, may encompass various implementation mechanisms for converting, carrying, or adapting data between different protocol domains. Such translation implementations may include direct field mapping wherein protocol fields are converted from source to destination formats, tunneling wherein protocol data units of a passenger protocol are carried within protocol data units of a carrier protocol optionally with minimal modification, encapsulation wherein protocol data units are wrapped with additional headers or trailers of another protocol, protocol bridging wherein state machines or transaction contexts are maintained to convert between different protocol semantics, format adaptation wherein data unit sizes or field arrangements are modified, segmentation and reassembly wherein larger protocol data units are divided into smaller units or vice versa, or hybrid approaches combining multiple translation mechanisms.

In the context of RPUs and/or protocol translations, references to "first" and "second" protocols may denote either distinct protocol types, which are different protocols with differing opcodes and functionalities (such as CXL.mem vs. CXL.cache, PCIe vs. NVLink, or UALink vs. SUE), or different instantiations of the same protocol type operating in separate domains or with distinct configurations (such as a first CXL.mem utilizing a first physical address space vs. a second CXL.mem utilizing a second physical address space).

The term "NVLink transaction" refers to a communication exchanged over an NVLink interface. An NVLink transaction may encompass different levels of protocol abstraction. At a logical level, an NVLink transaction may represent an operation or request type, such as a memory read, a memory write, an atomic operation, or a control message. At a physical level, the transaction may be implemented through transmission of one or more NVLink packets, flits, or other protocol data units (PDUs). The term NVLink transaction may refer to an individual packet carrying a request or response, or may alternatively refer to a sequence of packets that together implement a complete operation. For example, an NVLink read transaction may include a read request packet sent from an initiator to a target, followed by a response packet carrying the requested data from the target back to the initiator. NVLink transactions may carry physical addresses, transaction identifiers, data payloads, control information, or combinations thereof.

The term "NVLink protocol" refers to a protocol utilized by a GPU, a CPU, or an accelerator to send requests to another GPU, CPU, or accelerator, over an NVLink interconnect. Unless stated otherwise, translating between an NVLink protocol and another protocol, such as translating between an NVLink protocol and a CXL protocol, refers to converting NVLink-related PDUs, such as NVLink requests and NVLink responses, to corresponding PDUs of the other protocol, such as to CXL.io requests and completions, or to CXL.mem requests and responses, and vice versa, optionally including field translations between the NVLink domain and the other protocol domain, such as tags, error indications, and/or addresses.

In the context of ARM's Coherent Hub Interface (CHI) protocol embodiments, the terms "CHI messages", "CHI-based messages", "CHI packets", and "CHI flits" may be used herein interchangeably, unless a particular context specifies otherwise. The CHI protocol or CHI-based protocol may define various flit and packet formats for different message types. When referring to CHI communications, either term may be used to describe the protocol-level transactions without implying limitations on the specific embodiment or format of the CHI protocol communications. Similarly, when referring to network-level communications or link-level communications, messages, packets, and flits may be used interchangeably without implying limitations on the specific embodiment or format of the CHI communications.

For example, according to the ARM AMBA CHI Architecture Specification, Document number IH10050, version G, issued March 2024, the CHI architecture functionality is grouped into three layers: Protocol, Network, and Link. At the Protocol layer, the communication granularity is defined as a Transaction, wherein a transaction carries out a single operation that typically either reads from memory or writes to memory. A Message is a protocol layer term that defines the granule-of-exchange between two components, with examples including Request, Data response, and Snoop request, wherein a single Data response message can be made up of a number of packets. At the Network layer, the communication granularity is defined as a Packet, which is the granule-of-transfer over the interconnect between endpoints, wherein a message could be made up of one or more packets containing routing information such as destination ID and source ID allowing for different routing over the interconnect. At the Link layer, the communication granularity is defined as a Flit (FLow control unIT), which is the smallest flow control unit, wherein a packet can be made up of one or more flits, and the flits of a given packet follow the same path through the interconnect. The ARM specification version G further notes that for CHI, the packets include a single flit, which may contribute to the interchangeable use of these terms in CHI protocol implementations.

Optionally, the terms Coherent Hub Interface (CHI) and NVLink as used herein are intended to encompass presently available and future versions, variations, revisions, derivatives, compatible subsets, supersets, and equivalent implementations of these de facto industry interconnect standards. With respect to CHI, the scope may include, without limitation, AMBA 5 CHI Issue A, Issue B, Issue C, Issue D, Issue E, Issue F, Issue G, and subsequent Issues or architectural extensions published or adopted by Arm or by other entities that may extend CHI. Similarly, NVLink herein may encompass previous and current NVIDIA NVLink generations and future developments, including but not limited to NVLink Lx, 2.x, 3.x, 4.x, 5.x, and later versions, as well as NVLink-C2C (chip-to-chip, memory-coherent), cNVLink (coherent NVLink), NVLink used with NVSwitch/NVLink Switch fabrics, and other NVLink-related implementations that provide a high-bandwidth, low-latency, scalable interconnect between GPUs, between GPUs and CPUs, and/or between CPUs.

In the context of coherent interconnect, the term interconnect component may refer to various types of devices, blocks, or functional entities that participate in, terminate, bridge, gate, aggregate, or otherwise interface with a coherent or non-coherent fabric, including router modules, CHI node types, gateways, or bridges. For example, information regarding representative interconnect components within Arm Neoverse/CoreLink CMN families is available in Arm documentation and related technical materials. Non-limiting examples of possible interconnect component classifications related to ARM architecture include: Router module, such as Crosspoint (XP) router blocks; Request Node, such as Fully-coherent Request Node (RN-F), I/O-coherent Request Node (RN-I), or I/O-coherent Request Node with Distributed Virtual Memory support (RN-D); Home Node, such as Fully-coherent Home Node (HN-F), or I/O-coherent Home Node (HN-I); Gateway, such as CXL Gateway (CCG) blocks used with Coherent Mesh Link (CML) or external CXL 3.x attachment, or CCIX Gateway (CXG) bridging between CHI and CXS interfaces; and Bridge, such as AMBA 5 CHI to ACE5-Lite bridge (SBSX), AMBA Domain Bridge (ADB) bridging AMBA interfaces across domains, CHI Domain Bridge (CDB) bridging CHI domains, or CXS Domain Bridge (CXSDB).

The term "Coherent Interconnect Interface" refers to an interface that enables communication between a coherent interconnect and other components or protocols by converting between at least a subset of their respective protocol data units (PDUs). The conversion may involve translating between different protocols (such as converting between a coherent interconnect protocol and PCIe, UCIe, CXL, or ISoL protocols), or adapting between different formats of the same or similar protocol (such as converting between packets and flits, implementing different credit mechanisms, or packetizing messages for transport over different physical media), wherein such conversion may include one or more of mapping available fields, synthesizing required fields that have no direct equivalent, or omitting fields that are unsupported by the target protocol. In this context, PDU encompasses the protocol-specific information, which may include opcodes, identifiers, tags, addresses, and/or payload data. In certain embodiments, a Coherent Interconnect Interface may also function as an interconnect component when it participates in the coherent fabric as a node. For example, an RN-F that couples a processing core to a CHI coherent interconnect may serve both as a Coherent Interconnect Interface (converting between the core's interface and CHI protocol) and as an interconnect component (participating as a Request Node in the CHI fabric).

Optionally, the interpretation herein of ARM-related acronyms and component designations may vary to accommodate evolving or context-dependent meanings reflected in ARM's technical documentation and specifications. ARM's technical literature uses in some cases certain acronyms with varying scope or meaning depending on the specific architecture generation, implementation context, or documentation version. For example, gateway components such as CCG, CML, and CXG may be referenced interchangeably or with overlapping functionality in certain ARM documentation contexts. Similarly, other ARM component acronyms may exhibit semantic flexibility across different documentation sources, architectural revisions, or implementation scenarios. This specification's references to ARM interconnect components are intended to encompass the broadest reasonable interpretation of such acronyms as they may be understood by those skilled in the art based on ARM's documentation at the time of implementation, recognizing that ARM may refine, expand, or modify the scope of these designations in future architectural specifications or technical references.

The Coherent Hub Interface (CHI) protocol employs a role-based node classification system that defines the responsibilities and capabilities of different components within the interconnect architecture. Request Nodes (RN) generate protocol transactions, including reads and writes, to the interconnect and are categorized into three types based on their coherency capabilities. Fully Coherent Request Nodes (RN-F) include a hardware-coherent cache and are permitted to generate transactions defined by the protocol while supporting snoop transactions. I/O-Coherent Request Nodes with Distributed Virtual Memory (DVM) support (RN-D) do not include a hardware-coherent cache but receive DVM transactions and generate a subset of transactions defined by the protocol. I/O-Coherent Request Nodes (RN-I) similarly do not include a hardware-coherent cache and do not receive DVM transactions, generating a subset of transactions defined by the protocol without requiring snoop functionality. Home Nodes (HN) are located within the interconnect and receive protocol transactions from Request Nodes, with Fully Coherent Home Nodes (HN-F) including a Point of Coherence (PoC) that manages coherency by snooping the required RN-Fs, consolidating the snoop responses for a transaction, and sending a single response to the requesting Request Node. HN-F nodes are expected to be the Point of Serialization (PoS) that manages order between memory requests and may include a directory or snoop filter to reduce redundant snoops, with some embodiments optionally including an integrated interconnect cache, or a Last-Level Cache (LLC), such as slices of a System-Level Cache (SLC), distributed across the grid. Non-coherent Home Nodes (HN-I) process a limited subset of request types defined by the protocol, do not include a PoC, and are not capable of processing a snoopable request, though they must respond with a protocol compliant message upon receipt of such requests. HN-I nodes are expected to be the PoS that manages order between IO requests targeting the IO subsystem. Subordinate Nodes (SN) receive requests from Home Nodes, complete the required action, and return responses, with Subordinate Nodes (SN-F) being used for normal memory and capable of processing non-snoopable read, write, and atomic requests, including exclusive variants of them, and Cache Maintenance Operation (CMO) requests.

ARM-based processor architectures utilize component naming conventions that may vary across different processor implementations, wherein the same component name may refer to different functional blocks or configurations depending on the specific ARM-based processor design. Within ARM coherent mesh architectures, crosspoints (XP) function as routing nodes that direct traffic between different components of the system. These crosspoints may operate similarly to routers within the mesh interconnect, examining identifiers within the protocol messages to determine appropriate routing paths. The crosspoints may receive traffic from multiple sources simultaneously and possess the capability to route packets both horizontally and vertically within the mesh structure, effectively managing the flow of coherent and non-coherent transactions throughout the system. The internal interconnect structure provides the communication backbone to which various nodes and functional blocks are mapped, with nodes optionally maintaining registers that may be accessed through memory-mapped I/O (MMIO) operations, such as via ARM's Advanced Microcontroller Bus Architecture (AMBA) Advanced Peripheral Bus (APB). These registers may contain configuration information and operational parameters that allow system firmware, system software, or diagnostic tools to infer the presence and configuration of specific nodes and blocks within the processor architecture.

Global Fabric-Attached Memory (G-FAM) Devices, referred to as GFDs, represent a specialized category of CXL devices designed to provide memory resources that may be accessed by hosts or peers from multiple domains within a CXL fabric. According to CXL Specification revision 3.2, GFDs implement Host-managed Device Memory (HDM) space that may be accessed using CXL.mem protocol by hosts and peers from different domains, and may also support access via CXL.io Unordered I/O (UIO) transactions by peer devices from multiple domains. GFDs are distinguished by their lack of PCIe configuration space, departing from traditional PCIe device models in favor of alternative configuration mechanisms. Configuration and management of GFDs may be accomplished utilizing Global Memory Access Endpoints (GAEs) implemented in Edge Upstream Switch Ports (USPs) or utilizing out-of-band mechanisms that operate in parallel to the CXL fabric data path. In some embodiments, GFDs may support only CXL.mem transactions, simplifying their design by eliminating the need for CXL.io transaction processing and allowing, in some embodiments based on ARM architectures, external requests to be serviced through protocol gateways such as CCGs that are typically optimized for CXL.mem or CXL.cache traffic handling. This CXL.mem-only configuration may be advantageous in memory pooling applications wherein the primary requirement is memory access, coherent or non-coherent, rather than I/O functionality. The multi-domain access capability of GFDs enables memory sharing and pooling architectures wherein multiple (possibly independent) hosts may access portions of the GFD's memory resources according to fabric-level access control and allocation policies.

Systems integrating CXL with ARM CHI interconnects may utilize specialized interfaces and gateways to manage the translation and routing of different protocol types according to their coherency requirements. The CXL/CCIX Gateway (CCG) serves as a bridge component that internally incorporates Request Node (RN) functionality, Home Node (HN) functionality, and link interface logic, effectively managing the conversion between protocols based on CXL and protocols based on CHI. The CCG may be coupled to the CHI interconnect through a CXS interface, which provides an optimized pathway for coherent transactions. The CXS interface, which includes revisions such as CXS.B, operates as a bridge protocol that is less complex to implement than a full CHI protocol while maintaining the necessary coherency for CXL.mem and CXL.cache transactions. The separation of CXL protocol types reflects their different coherency requirements, with CXL.mem and CXL.cache being routed through the CCG via the CXS interface due to their coherent nature, while CXL.io transactions may be routed through alternative paths. For CXL.io transactions, which are non-coherent, the architecture may utilize ARM's AXI interface coupled to RN-D or HN-I nodes within the CHI interconnect. The AXI interface provides functionality similar to PCIe for handling I/O transactions, making it well-suited for CXL.io communications that share characteristics with traditional PCIe I/O operations. This separation allows the CCG to focus on coherency management for memory and cache transactions while delegating non-coherent I/O transactions to interfaces optimized for such traffic. The nodes that handle CXL.io traffic, such as RN-D and HN-I nodes, are not required to maintain hardware-coherent caches, aligning with the non-coherent nature of CXL.io transactions and simplifying the implementation of I/O paths within the system. In one example, the CXL.mem and CXL.cache protocols may be routed through a CXS interface to CCG nodes that convert them to a CHI protocol (such as CHIe), leveraging the CCG's coherency management capabilities; in parallel, the CXL.io protocol may be routed through an AXI interface to RN-D and HN-I nodes that also convert to CHI protocol, taking advantage of AXI's similarity to PCIe for non-coherent I/O transactions; these parallel routes may allow different paths to be optimized for their specific protocol characteristics.

Transaction flows within CHI-based systems with CXL integration follow defined sequences that optimize for both performance and protocol compliance. One example of a CHI transaction may begin with a Requester, which may be a CCG block coupled to CXL Device logic or a CXL Device coupled to a mesh crosspoint, issuing an allocating read request to a Home Node (HN). The initial request may utilize various opcodes including ReadClean, ReadNot-SharedDirty, ReadShared, ReadUnique, ReadPreferUnique, or MakeReadUnique, each serving specific coherency and data access requirements. The Home Node processes these transactions and may employ different response mechanisms based on system configuration and optimization goals. One optimization technique involves the use of combined responses from subordinate nodes, wherein the Home Node sends a downstream read request, such as ReadNoSnp, to a Subordinate node like a Memory Controller. The Subordinate node may then return a combined response along with the requested data directly to the original Requester using a CompData opcode, bypassing the need for the data to flow back through the Home Node. This CompData mechanism reduces message count and may decrease transaction latency by eliminating one hop in the data return path. The selection between different response mechanisms may be made by the Home Node based on factors including current system load, transaction type, and design complexity considerations. Some embodiments may utilize CCG blocks for coupling RPUs and CXL Devices to mesh interconnects such as ARM CMN-700, providing a standardized interface for CXL integration. Alternative embodiments may employ RPUs that expose CHI interfaces capable of connecting to XP crosspoints within the mesh, wherein these RPUs may perform address translations as part of the transaction processing flow.

Optionally, phrases of the form "data indicative of memory access requests with physical addresses" may encompass various transmission formats that convey memory access intent. Some transmission formats may include explicit memory access requests with complete physical addresses embedded within the protocol messages. Alternatively, the data indicative of memory access requests with physical addresses may utilize encoding schemes wherein the complete physical address is not transmitted with every request. For example, protocols such as UALink and NVLink may employ address caching mechanisms, shortened address representations, or delta encoding techniques that reduce the overhead associated with transmitting full physical addresses in each transaction. These techniques may involve the use of transaction identifiers that reference previously established address contexts, compressed address formats that omit redundant portions of addresses within a known range, or implicit addressing schemes wherein addresses are derived from other protocol fields or maintained state information. The RPU may reconstruct or derive the complete physical addresses from these representations to perform the necessary translations.

Optionally, phrases of the form "physical addresses associated with the transmissions" may refer to various addressing schemes utilized in the communication protocols. The transmissions may contain explicit physical addresses in their complete form, optionally within the protocol headers or payload fields. Alternatively, the physical addresses associated with the transmissions may be represented by indirect or compressed addressing mechanisms. In protocols such as UALink and NVLink, the physical addresses may be partially encoded, referenced utilizing lookup tables, or derived from a combination of base addresses and offsets maintained by the communication endpoints. The RPU may implement address reconstruction logic that processes these various addressing representations to determine the actual physical addresses required for memory access operations. The translation mechanisms may handle both direct address mapping wherein complete addresses are available and indirect address resolution wherein addresses are constructed from multiple protocol fields or maintained context information.

In embodiments where a protocol translator may be configured to not perform address translations between a first protocol domain and a second protocol domain, possibly in embodiments where the first protocol and the second protocol may be associated with the same physical address space, the protocol translator may utilize the address in the transaction associated with the first protocol for generating the address in the transaction associated with the second protocol, possibly copying the address value as is between the protocols, or adjusting for address width differences between the protocols by trimming or padding address bits. For example, when translating between a CXL-based protocol and an ISoL protocol such as UPI, wherein both protocols utilize the same physical address space, an address such as (AS.1.1) in a CXL.mem request may be utilized to generate the corresponding address (AS.2.1) in a UPI request. Similarly, when translating between CHI-based protocols and PCIe protocols that share the same physical address space, or between NVLink protocols and CHI protocols in certain configurations, the protocol translator may perform comparable address formatting operations without changing the underlying memory location being referenced. Hence, notations in the form of (AS.1.1) and (AS.2.1) used in the drawings may refer to the same memory address represented in different protocols, such as the address (AS.1.1)=00-00-CA-FE in a protocol that utilizes 32-bit address fields, which corresponds to the address (AS.2.1)=00-00-00-00-00-00-CA-FE in a protocol that utilizes 64-bit address fields.

Depending on the context and implementation, the terms "UALink requests", "UALink UPLI requests", and "UPLI requests" may be used herein interchangeably. The interchangeable use of these terms reflects that UPLI constitutes the protocol layer of UALink communications, and unless a particular context requires distinction between the physical layer aspects and the protocol layer aspects, these terms may refer to the same underlying communication transactions within the UALink ecosystem.

Protocol translation and bridging mechanisms can enable interoperability between different communication standards while conforming to performance and coherency requirements. The IEEE 802.3 Physical Medium Attachment (PMA) layer provides a standardized physical interface that may be utilized by various protocols for data transmission, offering a well-established foundation for high-speed communication. This PMA layer and its variants may serve as the physical transport for one or more protocols such as Ethernet, UALink, NVLink, Scale Up Ethernet (SUE), and/or other high-performance interconnect technologies. The distinction between coherent and non-coherent protocols impacts system architecture decisions, with coherent protocols requiring mechanisms to maintain data consistency across caching agents while non-coherent protocols may operate with simpler point-to-point semantics.

The terms "CHI interface" and "CHI port", terms "CHI-based interface" and "CHI-based port", the terms "NVLink interface" and "NVLink port", and the terms "NVLink-based interface" and "NVLink-based port" may be used herein interchangeably unless a particular context specifies otherwise.

When referring to fields, operations, or operation types associated with communication protocols, the terms "opcode", "command", "TLP type", "request", "request type", "transaction", and "transaction type" may be used herein interchangeably unless a particular context specifies otherwise. This interchangeable usage may apply to data indicative of operation types (such as a field or a set of fields) within messages, packets (such as TLPs), flits, phits, frames, protocol data units (PDUs), or other protocol data structures, as well as to descriptions of protocol operations, requests, transactions, or communications across different communication protocols. For example, a "CXL.cache DirtyEvict opcode", a "CXL.cache DirtyEvict command", and a "CXL-.cache DirtyEvict request" may refer to the same operation where a device communicates with a host, such as via a D2H Request message, asking the host to evict a full 64-byte modified cacheline from the device. Likewise, an "ARM CHI ReadOnce opcode", an "ARM CHI ReadOnce command", an "ARM CHI ReadOnce request", and an "ARM CHI ReadOnce transaction" may refer to the same operation that specifies a read within the CHI protocol framework, whether referring to the actual field within a CHI message or to the operation itself. Similarly, a "UPLI read command", a "UPLI read opcode", a "UPLI read request", and a "UPLI read transaction" may refer to the same operation, field or set of fields within a UPLI message that indicates a read within the UPLI protocol framework.

Asterisks (*) may be utilized as wildcard notations within the context of a specific embodiment and/or example, such as for representing a subset of relevant operations within a broader set of operations that may be indicated by opcodes, TLP types, commands, requests, request types, transaction, or transaction types, collectively referred to in this specific paragraph as "operation types". The subset of relevant operations may include operation types that are relevant to the revisions or standards being discussed, encompassing both existing operation types and potential future operation types that may be introduced in subsequent versions of the applicable interconnect standards, including CXL, UALink, SUE, PCIe, UCIe, ARM CHI, ARM AXI, or protocol implementations based on NVLink technology, provided they are applicable and relevant to the embodiment in question. For example, the wildcard operation type ReadOnce* may represent a subset of relevant requests or transactions within the ARM CHI specifications, which may include, but is not limited to: ReadOnce, ReadOnceCleanInvalid, and ReadOnceMakeInvalid. Similarly, the wildcard operation type MemRd* may represent a subset of relevant opcodes within the CXL standard, which may include, but is not limited to: MemRd, MemRdData, MemRdFwd, MemRdTEE, MemRdDataTEE, or other opcodes that may be introduced in future CXL standard revisions, provided they are relevant to the specific embodiment under consideration. Likewise, the wildcard operation type *Rd* may represent an even broader subset of relevant operations across different protocols or different standards, which may encompass, but is not limited to: (1) ReadNoSnp, ReadOnce, ReadClean, ReadShared, ReadUnique and MakeReadUnique commands in ARM CHI; (2) UIOMRd and MRd TLP types in CXL.io; (3) RdCurr, RdOwn, RdShared, RdAny, and RdOwnNoData opcodes in CXL.cache; (4) MemRd, MemRdData, MemRdFwd, MemRdTEE, MemRdDataTEE, MemSpecRd, or MemSpecRdTEE opcodes in CXL.mem; (5) read commands in UALink UPLI protocol; (6) memory read TLP types in PCIe; (7) read-class operations in SUE; or (8) read request types in NVLink-based protocol implementations, provided these operation types are applicable to the specific embodiment being described. The notation *Rd* when included in an NVLink-based request may represent an applicable read-class operation, such as a read request type, a read command, or a read opcode, that is supported by the NVLink-based request associated with the NVLink-based protocol. Similarly, the notation *Rd* when included in a CXL-based request may represent an applicable read-class operation supported by the CXL-based request associated with the CXL-based protocol. It is noted that the wildcard notation does not extend to operation types that are irrelevant to the embodiment in question, even if such operation types exist within the broader specifications of the respective standards.

The wildcard form "*Data*" may be utilized for denoting essentially the same underlying information ("the Data") irrespective of its representation or state (at rest, in transit, or in use). *Data* may encompass functionally equivalent forms, transformations and reverse-transformations of "the Data", such as encoding/decoding, packetization/framing, encapsulation, serialization, mapping, scrambling, compression, encryption, segmentation/reassembly, distribution/replication, or splitting/merging, represented in any suitable structure, manner, form, or format that may be carried by or interoperate with the applicable interconnect standard specifications, such as CXL, UALink, SUE, PCIe, UCIe, ARM CHI, ARM AXI, or NVLink-based protocol implementations. Encryption of the Data may include but is not limited to: CXL Integrity and Data Encryption (CXL IDE), UALink encryption mechanisms, SUE security features, PCIe Data Object Exchange (DOE) encryption, or when using different encryption keys on different interconnect links or channels. Moreover, *Data* may further encompass any equivalent representations of "the Data", such as when carried in protocol data units (PDUs) that may be associated with the same protocol or associated with different protocols, wherein PDUs may refer to: (1) messages, such as CXL-.cache H2D Data messages; (2) requests, such as CXL.mem M2S Request with Data (RwD), or NVLink write request with data; (3) responses, such as CXL.mem S2M Data Response (DRS); (4) completions, such as PCIe Completion with Data (CpID), or PCIe UIO Read Completion with Data (UIORdCpID); or (5) beats, such as UALink UPLI Data Beats carrying Read Response Data.

*Data* may also denote PDUs having collectively essentially the same payload, such as when splitting a 64B cacheline received over a single CXL.mem S2M DRS message into 2×32B smaller transfers carried in two CXL-.cache H2D Data messages, or when an RPU may split a UPLI read request for a large block of data (e.g., 256B) into multiple smaller requests, such as when the RPU translates between the UPLI request and a request associated with another protocol, such as CXL.mem, that may respond with no more than 64B per each request. Additionally, *Data* is intended to cover all forms of data transmissions and references to data defined in the applicable interconnect standard specifications, such as in the case of CXL.mem S2M DRS wherein the opcode MemData is followed by "the Data" itself, CXL.cache H2D Data transfer wherein the CXL Specification refers to "the Data" as "Data", UALink UPLI protocol data payloads, SUE protocol data units, PCIe TLP payloads, or NVLink-based protocol data transmissions. Moreover, *Data* may also encompass any metadata associated with the primary data payload, and may also include trimmed variants of "the Data" such as when responding to a 64B read from a CPU that uses 128B cachelines.

Depending on the context, each line, arrow, label, and/or box illustrated in the figures may represent one or more lines, arrows, labels, and/or boxes. For example, *Rd* M2S request in CXL, *Rd* read command in UALink UPLI protocol, *Rd* read transaction in SUE, *Rd* memory read TLP in PCIe, or *Rd* read request in an NVLink-based protocol may encompass one or more *Rd* or data messages (which are relevant to the specific embodiment and applicable standard), even though each may be represented by a single arrow. Additionally, optional messages, such as *Cmp* S2M NDR message in CXL, completion messages in UALink, acknowledgment messages in SUE, completion TLPs in PCIe, or response messages in NVLink-based protocols, may be explicitly depicted or implicitly included within the mandatory messages or their equivalents in the respective standards.

It is specifically noted that the transaction flow diagrams (TFDs) presented herein are schematic representations, which means that the number, order, timings, dimensions, and other properties of the information illustrated in the TFDs are non-limiting examples. Every modification, variation, or alternative allowed by a current or future Specification mentioned in the TFD (such as CXL, UALink, SUE, PCIe, UCIe, CHI, AXI, etc.) that is relevant to a diagram, is also intended to be included within the scope of said diagrams. Furthermore, the scope of these diagrams extends to encompass implementations that may deviate from the strict specifications mentioned in the TFDs due to factors such as hardware bugs, relaxed designs, or implementation-specific optimizations.

Throughout this disclosure, including embodiments and examples described herein, terms such as send/sending, receive/receiving, communication/communicating, or exchange/exchanging when used to describe a computer and/or other elements involved in data, message, packet, or other information exchanges, may refer to any direct or indirect operation(s) that facilitate information transfer to/from the computer and/or the other elements. When a computer is said to send information, it is not required to directly transmit the information; similarly, when the computer is said to receive information, it is not required to directly obtain the information. Instead, the computer may initiate, cause, make available, control, direct, participate in, or otherwise facilitate such transfer. The information transfer may occur directly or indirectly utilizing one or more intermediary components, and may include routing, forwarding, or other suitable data transfer mechanisms over any suitable communication path and/or connection.

In a similar manner, when a Port/Endpoint/Interface is said to send/receive/exchange/communicate information to/from/with another entity (which may be for example a host, device, switch, port, interface, RPU, or retimer), it is not required to directly send/receive/exchange information with the other entity. Instead, the port/interface may communicate through a suitable intermediate medium, component, or entity that facilitates transfer of the information. Such communication may involve one or more intermediary components, protocols, or mechanisms that encrypt, process, convert, buffer, route, or otherwise handle the information between the port/interface and the other entity.

Additionally, the terms "port" and "interface" may be used herein interchangeably unless the context requires distinction between them. Depending on the context, the term "port" may refer to physical or logical interface, connection point, access point, or termination point that is configured to support communication with or within components, devices, or systems in a network or computing architecture. A port may include, be included in, or be coupled to various interface types and may support one or more communication protocols. Still depending on the context, the term port may refer to various specialized port types including but not limited to switch ports (e.g., a UALink port may refer to a UALink switch port), downstream ports, upstream ports, root ports, endpoint ports, device ports, mesh ports, fabric ports, or ISoL ports. Depending on the implementation and context, a port may be integrated within a device, may comprise a device interface, or may function as a standalone entity.

Sentences in the form of "a port/interface configured to communicate with a host/device" are to be interpreted as "a port/interface configured to support communication with a host/device", which refer to direct coupling between the port/interface and the host/device, or to indirect coupling between the port/interface and the host/device, such as via one or more switches, retimers, and/or redrivers.

Various embodiments described herein involve interconnected computers. The term "computer" refers to any device, integrated circuit (IC), or system that includes at least a processor or processing element, memory to store instructions or data, and a communication interface. This definition encompasses a wide range of embodiments, including but not limited to: traditional computers (such as desktop PCs, laptops, servers, and hosts), mobile devices (like smartphones, tablets, and wearable devices), embedded systems (including microcontrollers and single-board computers), specialized computing elements (such as GPUs, FPGAs, ASICs, and DSPs), System-on-Chip (SoC) or System-on-Module (SoM) designs, network nodes or elements, and any IC or chip incorporating processing capabilities, memory, and a communication interface. The computer may be implemented in various forms, such as a processor with its associated memory and a communication interface, a controller of any type comprising a processor, memory, and a communication interface, an IC having processing capabilities with some form of memory and a communication interface, a computer-on-a-chip, or any other computing element capable of executing a set of computer instructions and interfacing for data exchange. Furthermore, references to a "computer" or a "processor" include any collection of one or more computers and/or processors (which may be located on different printed circuit boards and/or at different locations) that individually or jointly execute one or more sets of computer instructions, meaning that the singular term "computer" is intended to imply one or more computers, which jointly perform the functions attributed to "the computer". Key components of a computer, as defined here, include: (1) a processor or processing element, which can be of any type, including but not limited to, CPU, GPU, embedded controller, accelerator, single-core or multi-core microprocessors, digital signal processor (DSP), application-specific integrated circuit (ASIC), field-programmable gate array (FPGA), or any combination thereof; (2) memory, which may include any form of volatile or non-volatile, removable or non-removable storage media, such as RAM, ROM, DDR, embedded memory, flash memory, hard drives, solid-state drives, or any other suitable form of data storage; and (3) a communication interface, which refers to any mechanism that allows the processor to send and/or receive data, signals, or instructions; examples of possible communication interfaces include memory interfaces, accelerator interfaces, specialized data transfer interfaces, buses, interconnects, external network interfaces, internal interfaces (including internal proprietary interfaces), or any other arrangement facilitating component-level and/or system-level data exchange. Optional additional components of the computer may include a computer-readable medium for storing programs, data, or instructions; a user interface for interaction with users, if applicable; network interface cards (NICs) for network connectivity; storage devices for persistent data storage; co-processors or accelerators (e.g., GPUs, FPGAs) for specialized workloads; memory modules (e.g., DIMMs) for expanding system memory; a baseband management controller (BMC) for remote management and monitoring; and various peripherals such as expansion cards, and/or electrical/optical input/output devices.

It is noted that the computer in an apparatus comprising CXL interfaces/ports may be implemented as part of one or more of the CXL interfaces/ports or as a separate component in addition to the CXL interfaces/ports. In various embodiments, the term "computer" may encompass any computing elements that may be integrated within one or more CXL interfaces/ports or implemented as one or more separate components in addition to the CXL interfaces/ports. Whether the computer functionality is integrated into one or more of the CXL interfaces/ports or implemented externally as one or more distinct components, it is understood that relevant operations attributed to the computer may also be performed by one or more of the CXL interfaces/ports, and conversely, relevant operations attributed to one or more of the CXL interfaces/ports may be performed by the computer. This includes relevant processing operations described in this specification in relation to the computer, RPU, MxPU, xPU, switch, or the CXL interfaces/ports. Accordingly, the description does not limit the scope of the embodiments to any specific configuration of the computer relative to the CXL interfaces/ports, and embodiments may utilize any combination of integrated or separate computing functionalities.

In one embodiment, a system, comprises: a processor comprising a coherent interconnect; the processor is coupled to at least 64 GB of memory and is configured to utilize physical addresses within a Host Physical Address (HPA) space to access the memory, and to execute an operating system (OS) that utilizes a virtual address space; a memory management unit (MMU) configured to enable access to the memory based on mapping addresses within the virtual address space to physical addresses within the HPA space; a resource provisioning unit (RPU) comprising a Compute Express Link (CXL) device configured to communicate with an entity according to a protocol based on CXL; and wherein the RPU is further coupled to the coherent interconnect and configured to perform host-to-host physical address translations, whereby the host-to-host physical address translations enable the entity to access the memory via the CXL device.

Optionally, the OS may utilize the MMU for virtual to physical address mapping to access the memory, wherein the MU translates OS-level virtual addresses to physical addresses within the HPA space. Processes, applications and user programs executing under the control of the OS may utilize the MMU to access the memory utilizing virtual addresses while the MMU enforces memory protection and isolation between different processes or applications. Device drivers operating within the OS kernel space may utilize the MMU for accessing memory-mapped device registers and for managing DMA buffers. When the processor supports virtualization, hypervisors may utilize the MMU to manage memory mappings for virtual machines (VMs), wherein hypervisors and/or guest OSs may further utilize the MMU to manage memory mappings for processes within the VMs, optionally supporting nested virtualization that may include multiple levels of address translations. In some embodiments, an MMU may translate from addresses within a physical address space, such as a Guest Physical Address (GPA) space, to addresses within another physical address space, such as an HPA space. Infrastructure code or firmware running on hidden cores may utilize the MU for accessing memory regions allocated for infrastructure tasks such as memory telemetry collection or memory pool management operations. And hardware components such as DMA engines within the system may utilize the MMU or IOMMU functionality to perform address translations when moving data between different memory regions.

Optionally, the processor, MMU, and RPU may be implemented as a semiconductor device that combines processing capabilities with memory pooling functionality. The processor may be a multi-core processor based on x86, ARM, RISC-V, or other instruction set architectures, and may include various levels of cache hierarchy. The HPA space utilized by the processor is the physical address space the processor utilizes to access the memory. The RPU may be implemented as dedicated hardware logic, firmware running on dedicated cores, or a combination thereof, and may maintain translation tables or use programmable mappings to convert between different HPA spaces used by external entities and the local HPA space of the processor.

Optionally, the messages received by the RPU, such as the messages conforming to the CXL protocol, may include additional messages that do not carry HPA, and such messages may be processed by the RPU without performing host-to-host physical address translations. Additionally or alternatively, the RPU may further process additional messages that carry virtual addresses instead of host physical addresses, and the messages carrying host physical addresses may coexist with other types of messages that may be processed differently by the RPU, such that the description of messages carrying host physical addresses does not limit the presence or processing of other types of messages that may be communicated with the entity and through the processor. Furthermore, the RPU may apply different processing methods to different types of messages according to their content and/or requirements, which may include forwarding messages without modification, modifying message contents without performing address translations, or performing other types of translations or modifications that may differ from the above described host-to-host physical address translations.

Optionally, the entity may utilize a second HPA space, and the host-to-host physical address translations may translate physical addresses within the second HPA space to physical addresses within the HPA space. Optionally, the second HPA space utilized by the entity may have a different size, layout, or addressing scheme compared to the HPA space utilized by the processor. The host-to-host physical address translations may include offset calculations, range remapping, or lookup table operations to convert addresses between the two HPA spaces. The RPU may support configurable translation windows that define which portions of the entity's HPA space are mapped to the processor's HPA space, and may implement protection mechanisms to prevent unauthorized access to memory regions outside the allocated ranges.

The system may further comprise a CXL Root Port configured to communicate with a CXL memory expander that utilizes a Device Physical Address (DPA) space; and wherein at least one of the operating system, system firmware, or the memory expander may be configured to map between physical addresses within the HPA space and physical addresses within the DPA space, which enable the entity to utilize the memory and/or the CXL memory expander. Optionally, the CXL memory expander may be a Type 3 CXL device that provides additional memory capacity to the system. The DPA space of the memory expander represents the device-local physical addresses used internally by the expander. The OS or system firmware may maintain mapping tables that associate HPA ranges with DPA ranges of the memory expander, enabling transparent access to the expanded memory. Additionally or alternatively, HPA to DPA mapping may further be maintained by the memory expander, such as via internal firmware, software, or hardware of the expander.

The RPU may further comprise a second CXL device configured to communicate with a second entity utilizing a second protocol based on CXL, whereby the second entity utilizes a third HPA space; and wherein the RPU may be further configured to translate physical addresses within the third HPA space to physical addresses within the HPA space, which enable the second entity to utilize the CXL memory expander. Optionally, the system may support multiple entities accessing the CXL memory expander utilizing coordinated address translations. Different entities may have their own portions of the memory expander's capacity utilizing separate HDM regions or virtual CXL devices exposed by the RPU. Additionally or alternatively, the memory expander may expose multiple HDM regions, or may expose multiple logical devices (LDs), which may be mapped via RPU translations to multiple entities. The RPU may maintain separate translation contexts for separate entities, ensuring that memory accesses from different entities are properly isolated while still allowing shared access to designated memory regions when configured for multi-entity sharing. The system may implement Quality-of-Service (QoS) mechanisms to fairly allocate memory expander bandwidth among multiple entities.

In some implementations, the RPU may further comprise a second CXL device configured to communicate with a second entity utilizing a second protocol based on CXL, whereby the second entity utilizes a third HPA space, and the RPU may be further configured to translate physical addresses within the third HPA space to physical addresses within the HPA space, which enable the second entity to utilize the memory. Optionally, when supporting multiple entities accessing the memory (e.g., DRAM), the system may implement memory partitioning schemes to allocate specific memory regions to different entities. The RPU may enforce access controls to enable entities to access only their respective allocated memory regions. The system may support dynamic reallocation of memory between entities based on workload demands or administrative policies, and may implement memory tiering and migration capabilities to move data between different entities' allocated regions such as when workload access patterns change or reconfiguration occurs.

The entity may comprise a host coupled to the processor via at least one of a CXL root port or a CXL switch, and the second protocol based on CXL may be different from the protocol based on CXL. Optionally, supporting different CXL protocols for different entities may enable heterogeneous system configurations wherein entities with varying capabilities can utilize or share the memory pool. For example, one entity may use CXL.mem for simple memory expansion while another entity uses CXL.cache for cache-coherent shared memory. The RPU may maintain protocol-specific state machines and translation logic for different supported protocol combinations, enabling interoperability between entities using different CXL protocol subsets.

In certain aspects, the processor may comprise a Modified CPU or GPU (MxPU), the memory may comprise dynamic random-access memory (DRAM), and the RPU may enable the entity to utilize more than 250 GB of the DRAM. Optionally, the MxPU may be derived from an established CPU or GPU design with modifications to support CXL device functionality and host-to-host address translations.

The large DRAM capacity (more than 250 GB) may be achieved through multiple memory channels supporting high-capacity DRAM modules. The MxPU may implement memory compression, deduplication, or other techniques to effectively increase the usable memory capacity exposed to entities beyond the physical DRAM capacity.

The memory may comprise dynamic random-access memory (DRAM) that is coupled via memory channels to the processor, and the CXL device may comprise a Global Fabric-Attached Memory (G-FAM) Device (GFD). Optionally, the memory channels may include multiple channels transmitting in parallel to increase memory bandwidth and reduce latency. The memory channels may support one or more DRAM modules, such as DIMMs or RDIMMs, and may implement various memory technologies including DDR4, DDR5, LPDDR4, LPDDR5, or future memory standards. The memory channels may include memory controllers integrated within the processor or implemented as separate components within the system, and may support features such as ECC, memory interleaving, and channel bonding for improved performance and reliability.

The protocol based on CXL may utilize CXL.mem semantics, and the CXL device may expose at least one Host-managed Device Memory (HDM) address region to the entity. Optionally, when operating according to CXL.mem semantics, the CXL device (such as CXL EP) may expose one or more HDM regions that appear as memory-mapped regions to the coupled entity. The HDM regions may be configured with specific address ranges, access permissions, and memory attributes through HDM decoders. The entity may access these HDM regions using standard memory load/store operations, which are translated by the entity's CXL root port into CXL.mem transactions. The system may support multiple HDM regions with different characteristics, such as volatile memory regions backed by the memory and persistent memory regions backed by storage-class memory.

Furthermore, the protocol based on CXL may utilize CXL.io semantics, and the host-to-host physical address translation may translate from physical addresses carried in CXL.io UIOMRd Transaction Layer Packets (TLPs) received from the entity to physical addresses within the HPA space. Optionally, when operating according to CXL.io semantics, the system may process various types of TLPs including memory read/write TLPs, configuration TLPs, and message TLPs. The UIOMRd TLPs may carry physical addresses within the entity's physical address space that require translation to the local HPA space. The RPU may intercept these TLPs, extract the physical addresses, perform the necessary translations, and generate corresponding transactions in the local HPA space. The system may also support other CXL.io transaction types such as UIOMWr for memory writes and may implement flow control and credit management according to CXL specifications.

The processor may comprise multiple cores, from which at least one is a hidden core; and wherein the RPU may be further configured to utilize the hidden core for internal tasks, wherein the internal tasks comprise at least one of internal firmware processing, CXL Fabric Manager (FM) API processing, processing in memory (PIM), near-memory processing, or housekeeping tasks. Optionally, the RPU is configured to utilize at least one hidden core for internal tasks, which may include processing internal firmware, handling CXL Fabric Manager (FM) API processing, processing in memory (PIM), near-memory processing, and/or performing housekeeping tasks. By dedicating hidden cores to these specific functions, the processor may improve its performance and enable efficient operation without overburdening non-hidden cores that may be allocated to running user workloads. Additionally, utilizing the hidden core(s) for the RPU tasks can allow a CPU vendor to differentiate the processor from other CPUs while maintaining compatibility with existing/established designs, applications, and software code base that was developed for established CPUs.

The hidden core may be isolated from user access and visibility, providing user-infrastructure isolation. Optionally, the processor's hidden core(s) are isolated from user access and visibility, providing user-infrastructure isolation. This isolation ensures that the user cannot affect the execution of code on the hidden cores, enhancing the security and reliability of the system. By separating the visible user-controlled cores from the hidden vendor-controlled cores, the processor can effectively protect critical infrastructure functions from undesired interference or tampering by potentially malicious user code.

Additionally, the processor may comprise multiple cores, from which at least one is hidden and is utilized for collection of memory telemetry. Optionally, at least one of the processor's hidden core(s) is utilized for collection of memory telemetry. By running memory telemetry on the hidden core(s), the system can effectively monitor and manage memory resources, such as memory resources in a memory pool, without burdening the user-accessible cores, which allows for efficient resource utilization and prevents memory management tasks from interfering with user code execution.

The processor may comprise multiple cores, from which at least one is a hidden core utilized for secure key storage and management for encrypting and decrypting data transmitted according to the protocol based on CXL, leveraging user-infrastructure isolation provided by the hidden core. Optionally, at least one of the processor's hidden core(s) is utilized for secure key storage and management, specifically for encrypting and decrypting data transmitted according to the protocol based on CXL. By leveraging the user-infrastructure isolation provided by the hidden core(s), the system prevents sensitive cryptographic keys used for securing data transmitted according to the protocol based on CXL from being accessible to user code. This isolation enhances the security of the data transmitted between the processor and the entity, protecting it from potential compromise by malicious user code. The hidden core(s) may perform the cryptographic operations on the data themselves, improving confidentiality, integrity, and/or replay protection. Alternatively, the hidden core(s) may utilize hardware-accelerated cryptographic engine(s) for performing at least part of the cryptographic operations on the data, while the hidden core(s) remain responsible for the management of the secure keys and for controlling the processing flows of the data. In this approach, the cryptographic accelerator may handle the data processing while the hidden core(s) handle the control, following a Control/Data Plane separation. Furthermore, the infrastructure code running on the hidden core(s) may participate in enabling support for confidential computing over memory exposed/provisioned by the RPU via the CXL device of the system.

The system may further comprise a hardware-accelerated cryptographic engine, wherein the hidden core may be configured to utilize the hardware-accelerated cryptographic engine for performing at least part of the cryptographic operations on the data transmitted according to the protocol based on CXL. Optionally, the system includes one or more hardware-accelerated cryptographic engines that can be utilized by the hidden core(s) for performing at least part of the cryptographic operations on the data transmitted according to the protocol based on CXL. The hidden core(s) are responsible for managing the secure keys and controlling the processing flows of the data, while the cryptographic engine(s) handle the actual data processing. This approach features control/data plane separation, wherein the hidden core(s) act as the control plane, and the cryptographic engines serve as the data plane. By offloading the computationally intensive cryptographic operations to dedicated hardware accelerators, the system may achieve higher performance and efficiency in securing the data transmitted according to the protocol based on CXL.

The hidden core may enable support for confidential computing over memory exposed by the RPU via the CXL device; whereby confidential computing performs computation within a secure isolated environment to protect data in use. Optionally, the hidden core(s) of the processor enable support for confidential computing over memory exposed/provisioned by the RPU via the CXL device. Confidential computing is a security paradigm that aims to protect data in use by performing computation within a secure, isolated environment, such as a Trusted Execution Environment (TEE). In Confidential computing, data remains encrypted and confidential even during processing, protecting sensitive information from unauthorized access, modification, or disclosure. This may be achieved utilizing a combination of hardware-based security features, such as encrypted memory regions and secure enclaves, and optional software-based mechanisms that enforce access controls and data isolation. By enabling computation on encrypted data without exposing the plaintext contents, confidential computing provides a higher level of security and privacy compared to traditional computing models that only protect data at rest and in transit. The infrastructure code running on the hidden core(s) participates in setting up and managing the secure environment required for confidential computing, including provisioning encrypted memory regions, managing encryption keys, and keeping sensitive data protected from unauthorized access. By leveraging the user-infrastructure isolation provided by the hidden core(s), the system can create a trusted execution environment for confidential computing, enabling secure processing of sensitive data within the memory exposed by the RPU utilizing the protocol based on CXL.

The processor may comprise multiple cores, from which at least one core is a hidden core; and wherein the RPU may be further configured to utilize the hidden core for error handling and/or correction tasks within a memory pool comprising the memory, enhancing data integrity and reliability. Optionally, the error handling and correction tasks performed by hidden cores may include detecting and correcting single-bit and multi-bit errors, managing spare memory regions for replacing faulty memory locations, and maintaining error logs for system analysis. The hidden cores may implement scrubbing routines (e.g., patrol scrub) that periodically read and correct memory contents to prevent error accumulation. The system may support various error correction codes and advanced ECC schemes suitable for large-scale memory pools.

The error handling and/or correction tasks may further comprise predictive failure analysis (PFA) operations, configured to predict and handle imminent failure of memory components within the memory pool, thereby preempting potential data loss and system downtime. Optionally, the error handling and correction tasks executed by the hidden core(s) of the processor include predictive failure analysis operations designed to anticipate and address imminent failures of memory components within the memory pool. By implementing the PFA, the system may proactively identify potential faults before they manifest into actual failures, enabling timely interventions that mitigate the risk of data loss and system downtime. The PFA may not only enhance the reliability and data integrity of the memory system but also improve overall system resilience in high-performance computing architectures.

In some implementations, the memory may comprise dynamic random-access memory (DRAM), and the processor may comprise multiple cores, from which at least one core is a hidden core; and wherein the RPU may be further configured to utilize the hidden core for controlling or managing memory access scheduling within a memory pool comprising the DRAM, to improve memory utilization and throughput. Optionally, memory access scheduling controlled or managed by hidden cores, such as via utilizing a hardware-based memory controller or a memory access scheduler managed by hidden cores, may optimize memory bandwidth utilization by reordering memory requests based on factors such as request priority, memory bank availability, and access patterns. The hidden cores may implement and apply sophisticated scheduling algorithms that consider Quality-of-Service (QoS) requirements, minimize memory access conflicts, and maximize row buffer hit rates. The scheduling may also account for thermal constraints and power management goals while maintaining fair access for the memory pool clients.

The processor may comprise multiple cores, from which at least one core is a hidden core; and wherein the RPU may be further configured to utilize the hidden core for managing security protocols within a memory pool comprising the memory, including data encryption and/or access controls. Optionally, security protocol management by hidden cores may include encryption algorithms for data at rest and in transit, managing security keys and certificates, and enforcing access control policies. The hidden cores may support various security standards such as CXL Integrity and Data Encryption (IDE) for protecting data transmitted over CXL links. The memory pool may include secure enclaves or trusted execution environments to protect sensitive data and cryptographic operations from unauthorized access.

The processor may comprise multiple cores, from which at least one core is a hidden core; and wherein the RPU may be further configured to utilize the hidden core for configuration management tasks within a memory pool comprising the memory, including dynamic allocation and deallocation of memory resources. In further embodiments, one or more of the hidden cores of the processor may be utilized for advanced infrastructure management tasks within a memory pool based on the processor and the memory. These tasks may include one or more of: (i) error handling and correction, which enhances data integrity and reliability by promptly addressing memory errors, (ii) memory access scheduling, which improve the allocation and utilization of memory resources based on current demand and operational priorities, (iii) security management, which secures the memory pool by implementing robust encryption and access controls to safeguard data, and/or (iv) configuration management, which dynamically adjusts memory settings to adapt to varying workload requirements. One or more of these tasks may be employed to maintain the overall efficiency, security, and/or performance of the system, particularly in environments requiring high-speed, high-integrity memory operations, thereby enhancing the system's capabilities and distinguishing it from architectures based on conventional CPU/GPU (where CPU/GPU refers to CPU and/or GPU).

The processor may comprise multiple cores, from which at least one core is a hidden core; and wherein the RPU may be further configured to utilize the hidden core for memory tiering tasks. Optionally, memory tiering tasks performed by hidden cores may include classifying memory regions into different performance tiers based on their underlying technology characteristics. The hidden cores may monitor access patterns to different memory regions, such as via utilizing hardware-based telemetry collectors and analyzers, and dynamically adjust tier assignments to optimize overall system performance. The system may support various memory technologies and/or speeds in different tiers, such as high-bandwidth DRAM (e.g., MRDIMMs) in tier 1, standard DRAM (e.g., RDIMMs) in tier 2, and persistent memory or storage-class memory (SCM) in lower tiers.

The memory tiering tasks may further comprise migration of data between memory tiers based on hotness level of the data, thereby increasing performance of memory accesses from the entity to hot data. Optionally, the hidden core(s) of the processor may enable support for memory tiering, wherein memory regions or subsets of memory regions exposed to entities, may be mapped to memory resources based on parameters such as the hotness of the data in these memory regions, e.g., the frequency at which the data is used. In one embodiment, the hidden core(s) may utilize memory telemetry to map hot data to higher-performance memory tiers, whereas colder data may be mapped to slower memory such as Flash memory coupled to the processor. In other embodiments, the hidden core(s) may utilize memory mapping based on priority or Service-Level Agreement (SLA) associated with the data, e.g., in cases wherein the system is configured to prioritize particular workloads, virtual machines, users, or tenants, that utilize the data. Yet in other embodiments, the hidden core(s) may migrate data between memory tiers, such as migrating hot data from a lower-performance memory tier to a higher-performance memory tier.

The system may further comprise a direct Memory Access (DMA) engine, wherein the hidden core may be configured to utilize the DMA engine for migrating data between memory tiers. Optionally, the hidden core(s) of the processor may utilize a DMA engine for data migration between memory tiers, offloading the data movement task from the hidden core(s) to a dedicated engine, thereby providing faster migration of data and freeing the hidden core(s) to perform additional tasks.

In various embodiments, hidden cores are isolated from the user's access and visibility, while visible cores are available for user utilization. This isolation may be achieved utilizing different techniques, such as utilizing Type 1 hypervisors, Type 2 hypervisors, hardware partitioning, software partitioning, asymmetric multiprocessing (AMP), firmware configuration, CPU microcode updates, custom CPUs, security extensions, and/or a combination thereof.

In a first example, a Type 1 hypervisor may be utilized to create hidden and visible cores. A Type 1 hypervisor, such as VMware ESXi or Microsoft Hyper-V, runs on the hardware and manages virtual machines (VMs). The hypervisor can allocate specific processing cores to VMs using techniques such as CPU affinity or core pinning. For instance, certain cores may be designated as hidden and assigned to a VM that is not accessible or visible to the user. These hidden cores may run system management tasks or specialized applications such as CXL memory management or memory pool operations, while the visible cores are allocated to user-accessible VMs running general-purpose operating systems (GPOS). The hypervisor prevents the user from direct access to the hidden cores, maintaining isolation.

In a second example, a Type 2 hypervisor may be utilized to achieve similar isolation. A Type 2 hypervisor, such as VMware Workstation or Oracle VirtualBox, runs on a host OS and supports guest OSes, wherein the host OS manages the visible cores accessible to the user. The Type 2 hypervisor can then create additional VMs using hidden cores, which run separate OSes or specialized tasks. The overhead of the Type 2 hypervisor is higher compared to a Type 1 hypervisor, but it may provide additional flexibility in managing user-visible and hidden cores.

In a third example, hardware partitioning, also known as hardware-assisted virtualization in some systems, may be utilized to divide processing cores to isolated partitions at the hardware level, wherein the isolated partitions run different operating systems. It may be used in various scenarios wherein isolation between partitions is required, including high-reliability and safety-critical systems. For instance, one partition with hidden cores may run an RTOS or embedded OS for critical system functions, while another partition with visible cores runs a GPOS for user applications. Hardware partitioning enables isolation, as the partitions are managed by the hardware, preventing user access to the hidden cores.

In a fourth example, software partitioning, such as the Jailhouse hypervisor, may be utilized to create isolated partitions while offering lower overhead compared to full virtualization. This approach allocates specific cores to different partitions, wherein hidden cores may run dedicated tasks or specialized applications. For example, Jailhouse can configure certain cores to run an RTOS or bare-metal applications, isolating them from user access; and visible cores can run a GPOS that is available for user applications.

In a fifth example, Asymmetric Multiprocessing (AMP) may be utilized to run different OSes on different cores without a hypervisor. In this configuration, certain cores may run an RTOS or embedded OS, while other cores may run a GPOS. Communication between the operating systems may be achieved utilizing shared memory or inter-process communication mechanisms. For instance, Linux may run on the visible cores for user applications, while an RTOS may run on the hidden cores for real-time tasks. AMP provides a straightforward method to isolate hidden cores from user access while leveraging the specific strengths of different operating systems.

In a sixth example, firmware configuration may be utilized to achieve hidden and visible cores. By accessing the Basic Input/Output System (BIOS) or the Unified Extensible Firmware Interface (UEFI) settings, certain CPU cores can be disabled, making them invisible to the OS. While this method can prevent the OS from utilizing the disabled cores, it is noted that depending on the embodiment, these cores may still be accessible utilizing other means, such as hardware debugging interfaces, and these changes may not be persistent (e.g., rebooting the system could reset the BIOS/UEFI settings, making the hidden cores visible again). Therefore, depending on the specific requirements, additional measures may be necessary to provide complete isolation of the hidden cores.

In a seventh example, CPU microcode updates provided by the hardware vendor may be employed. These updates can include specific instructions to disable or hide cores at the microcode level, preventing their detection or usage by the operating system. This method provides a secure way to manage core visibility, as the updates are controlled by the CPU manufacturer.

In an eighth example, custom CPU designed by hardware vendors can be utilized, which include technologies and mechanisms that enable core partitioning and management of core visibility. For example, Intel's Resource Director Technology (RDT) allows for the partitioning of CPU resources, while ARM's Big.LITTLE architecture enables heterogeneous multi-processing, wherein different types of cores can be used for different purposes. These vendor-specific embodiments provide control over core allocation and maintain certain cores hidden from the user.

In a ninth example, security extensions such as Intel's Trusted Execution Technology (TXT) or ARM's TrustZone may be used. These technologies create secure execution environments that isolate specific cores for security-sensitive operations. The hidden cores may only be accessible within the secure environment, protecting them from user interference and enabling secure execution of critical tasks.

In one embodiment, a method, comprises: accessing memory coupled to a processor utilizing physical addresses within a Host Physical Address (HPA) space; wherein the processor comprises a coherent interconnect; mapping addresses within a virtual address space to physical addresses within the HPA space; whereby the addresses within the virtual address space are utilized by an operating system (OS) of an apparatus comprising the processor; communicating, by a Compute Express Link (CXL) device of a resource provisioning unit (RPU), with an entity coupled to the apparatus according to a protocol based on CXL; wherein the RPU is coupled to the coherent interconnect; and performing, by the RPU, host-to-host physical address translations which enable the entity to access the memory via the CXL device.

Optionally, the entity may comprise a second host that utilizes a second HPA space, and the host-to-host physical address translations may be translating physical addresses within the second HPA space to physical addresses within the HPA space. The method may further comprise communicating, via a CXL Root Port, with a CXL memory expander that utilizes a Device Physical Address (DPA) space; and wherein at least one of the operating system or system firmware may be mapping between physical addresses within the HPA space and physical addresses within the DPA space, whereby the mapping enables the second host to utilize the memory and/or the CXL memory expander.

In one embodiment, an apparatus, comprises: a processor comprising a coherent interconnect; the processor is coupled to at least 64 GB of memory and is configured to utilize physical addresses within a first Host Physical Address (HPA) space to access the memory, and to execute an operating system (OS) that utilizes a virtual address space; a memory management unit (MMU) configured to enable access to the memory, based on mapping addresses within the virtual address space to physical addresses within the first HPA space; a resource provisioning unit (RPU), coupled to a Compute Express Link (CXL) device configured to exchange messages conforming to a protocol based on CXL which utilizes a second HPA space; and wherein the RPU is further coupled to the coherent interconnect and configured to translate physical addresses within the second HPA space to physical addresses within the first HPA space.

In one embodiment, a system designed to function as a Multi-Headed Device (MHD), comprises: a processor comprising a coherent interconnect; the processor is coupled to at least 32 GB of dynamic random-access memory (DRAM), and is configured to utilize physical addresses within a Host Physical Address (HPA) space to access the DRAM, and to execute an operating system (OS) that utilizes a virtual address space; a memory management unit (MMU) configured to enable access to the DRAM, based on mapping addresses within the virtual address space to physical addresses within the HPA space; first and second Compute Express Link (CXL) Endpoints configured to communicate with hosts coupled to the system according to a protocol based on CXL; and a resource provisioning unit (RPU) configured to perform host-to-host physical address translations which enable the hosts to access the DRAM utilizing messages conforming to the protocol based on CXL. The CXL Specification revision 3.2 defines a Multi-Headed Device (MHD) in section 2.5 as a Type 3 device with multiple CXL ports, referred to as heads. The CXL specification currently defines two types of MHDs that are distinguished by how they present themselves on each head: (i) a MH-SLD, which presents Single Logical Devices (SLDs) on the heads, and has a 1:1 mapping between heads and LDs, and (ii) a MH-MLD, which may present Multi-Logical Devices (MLDs) on any of their heads, wherein a head in a Multi-Headed Device has at least one and no more than 16 Logical Devices mapped.

Optionally, the DRAM may be coupled via at least four memory channels to the processor; wherein the DRAM may have a memory capacity exceeding 128 GB, 256 GB, 512 GB, or 1 TB; and wherein the DRAM may comprise mainstream DRAM modules exhibiting an average unit price per gigabyte that does not exceed three times an average unit price per gigabyte of a lowest-cost DRAM module technology in volume production for servers in data centers.

In one embodiment, an apparatus, comprises: an integrated circuit (IC) package comprising processing cores coupled to a resource provisioning unit (RPU) utilizing an interconnect protocol; wherein the RPU is configured to communicate with an entity external to the IC package according to a first protocol based on Compute Express Link (CXL), wherein the first protocol utilizes physical addresses within a first physical address space; wherein the RPU is further configured to translate between the first protocol and the interconnect protocol, wherein the interconnect protocol utilizes physical addresses within a second physical address space; and a root port (RP) configured to communicate with a CXL device according to a second protocol based on CXL, wherein the second protocol utilizes physical addresses associated with the second physical address space.

Optionally, the first protocol comprises CXL.mem protocol, and the second protocol comprises CXL.mem protocol. In some implementations, the first protocol comprises CXL.mem protocol, and the second protocol comprises CXL.io protocol. Alternatively, the first protocol comprises CXL.mem protocol, and the second protocol comprises CXL.cache protocol. The interconnect protocol may comprise a coherent interconnect protocol. Furthermore, the RPU may be further configured to translate the physical addresses within the first physical address space to the physical addresses within the second physical address space. The apparatus may further comprise memory channels, and wherein the memory channels are coupled to more than 64 GB of memory external to the IC package. The CXL device may be configured to return data via a response path utilizing the second protocol, the interconnect protocol, and the first protocol.

In one embodiment, a processor inside an integrated circuit (IC) package, comprises: first and second ports configured to communicate according to first and second protocols based on Compute Express Link (CXL); wherein the first and second protocols are configured to utilize physical addresses within first and second non-identical physical address spaces, respectively; and processing cores, located inside the IC package, configured to utilize physical addresses associated with the second physical address space.

Optionally, the processor may further comprise memory channels coupled to the processing cores, wherein the memory channels are coupled to more than 64 GB of memory external to the processor. In some implementations, the processor functions as a switch comprising switch ports. The first protocol may comprise CXL.mem protocol, and the second protocol may comprise CXL.mem protocol. Alternatively, the first protocol comprises CXL.mem protocol, and the second protocol comprises CXL.io protocol. In another aspect, the first protocol comprises CXL.mem protocol, and the second protocol comprises CXL.cache protocol. The processor may further comprise a resource provisioning unit (RPU) configured to translate the physical addresses within the first physical address space to the physical addresses within the second physical address space. Furthermore, the first port may be configured to communicate with a first entity, and wherein the first entity comprises a host, an accelerator, an xPU, a switch, or a consumer; and wherein the second port is configured to communicate with a second entity, and wherein the second entity comprises a CXL memory, a CXL device, a switch, or a provider. The second port may also be configured to receive data from a device coupled to the second port, and wherein the processor is configured to return the data via a response path utilizing the second protocol and the first protocol.

Figures 6A, 6B:
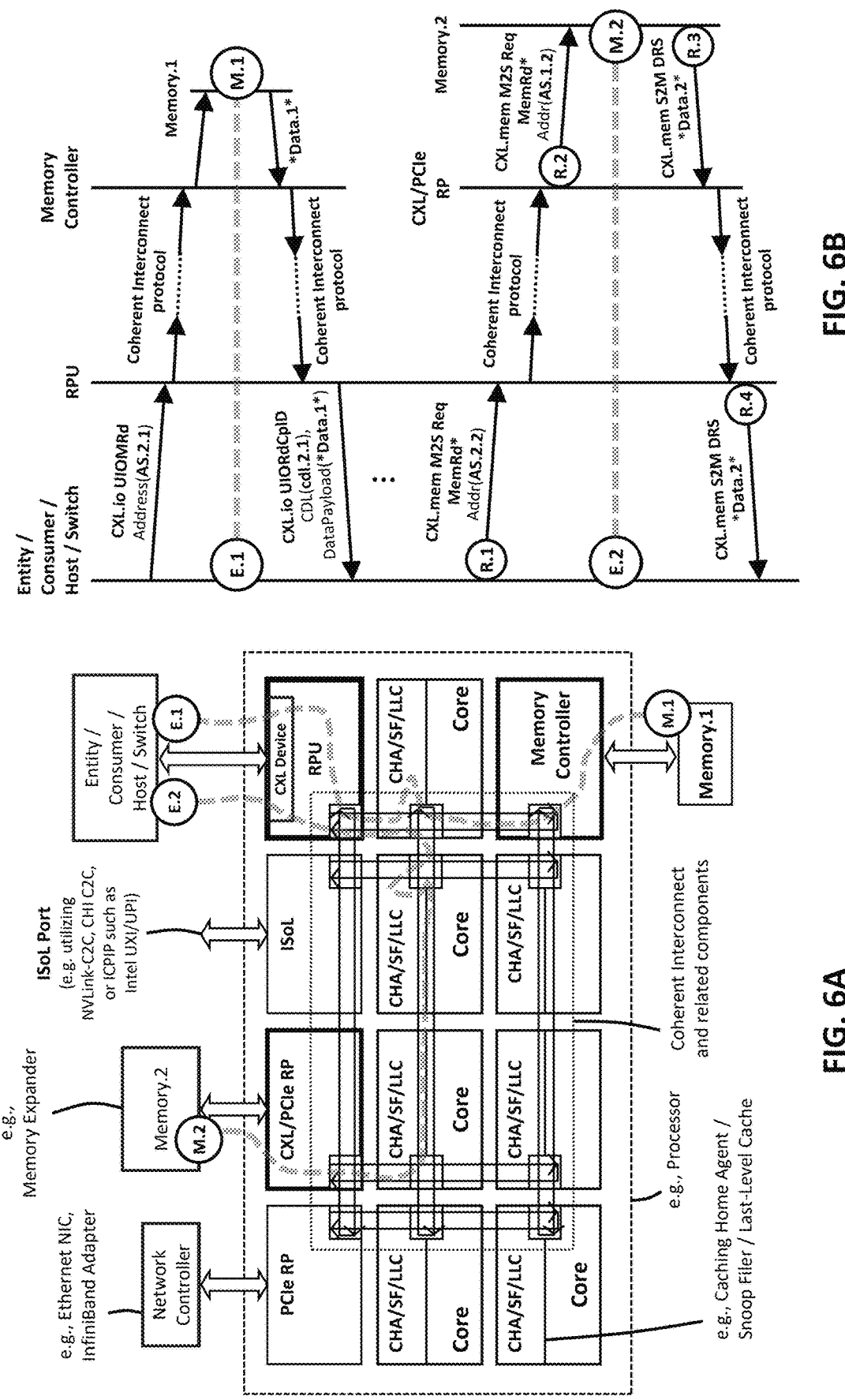
FIG. 6A illustrates one embodiment of a system capable of enabling an external entity to access memory resources mapped to an address space of a processor's coherent interconnect.
FIG. 6B illustrates one embodiment of a transaction flow diagram (TFD) demonstrating RPU translations of a CXL.io UIOMRd memory read request and a CXL.mem M2S Request.

FIG. 6A illustrates one embodiment of a system comprising a processor including a coherent interconnect, capable of enabling an external entity to access memory resources mapped to an address space utilized by the coherent interconnect, such as via one or more of the two illustrated paths denoted as (E.1)-(M.1) and (E.2)-(M.2). The processor may include processing cores, caching/home agent (CHA), snoop filter (SF), and last-level cache (LLC), optionally implemented as distributed slices coupled to the coherent interconnect. The processor may further include a PCIe RP that may be coupled to a Network Controller, such as an Ethernet NIC or an InfiniBand Adapter, a CXL/PCIe RP, a memory controller that may be coupled to a first memory (Memory.1), such as DRAM, and an ISoL port, such as a port utilizing NVIDIA NVLink-C2C, ARM CHI C2C, or Intel Coherent Processor Interconnect Protocol (ICPIP), e.g., Intel UPI, or Intel UXI. The processor may be coupled to a second memory (Memory.2), such as a CXL memory expander, and may further include an RPU that may expose a CXL device, such as a Global Fabric-Attached Memory (G-FAM) Device (GFD), or a Type-3/2/1 CXL device. The CXL device may expose an Endpoint (EP), and may communicate with an entity, such as a host, according to at least one protocol based on CXL, such as CXL.mem, CXL.cache, and/or CXL.io, wherein the RPU may perform host-to-host address translations to enable the entity to access the first memory, such as via the path (E.1)-(M.1), and/or access the second memory, such as via the path (E.2)-(M.2). The illustrated RPU may be coupled to the coherent interconnect, and may translate between the at least one protocol based on CXL and a protocol utilized by the coherent interconnect. The processor may be implemented as an IP block embedded into a silicon design, such as a switch or an accelerator. In other embodiments, the processor may be implemented as a monolithic die, as chiplets within an IC package, or as components on a board, and may utilize a mesh-based coherent interconnect, or in other embodiments, may utilize a ring, a crossbar, a Network on Chip (NoC) or other types of coherent interconnects.

FIG. 6B illustrates one embodiment of a transaction flow diagram (TFD) demonstrating two CXL requests issued by an entity, such as a host. The first CXL request comprises a CXL.io UIOMRd memory read request, and the second CXL request comprises a CXL.mem M2S Request. The two CXL requests are processed by an RPU and forwarded, possibly using a protocol utilized by a coherent interconnect, to different memories mapped to the coherent interconnect's address space. The paths from the RPU to the different memories may optionally traverse other components, such as CHA/SF/LLC slices, memory controllers, or in other embodiments a home agent or a home node, optionally for resolving coherency. The RPU may perform host-to-host physical address translations, such as from (AS.2.2) to (AS.1.2) to enable the entity to access the processor's memories. The processor may have multiple memory resources, such as first memory (Memory.1), which may be a DRAM coupled to a memory controller of the processor, and/or second memory (Memory.2), which may be a CXL memory expander coupled to a CXL/PCIe RP of the processor. The RPU may further perform additional translations, such as protocol translations from a protocol based on CXL, such as CXL.io, CXL.cache, or CXL.mem, to a protocol utilized by the coherent interconnect, and may send the optionally translated request to the coherent interconnect, requesting a read from memory. In some embodiments, the requested data may be provided by a processor cache, such as by an LLC, instead of by the memory. The data may then return via the coherent interconnect to the RPU, wherein the RPU may provide the requested data to the entity via CXL.io UIORdCplD read completion with data, or via CXL.mem S2M Data Response (DRS), depending on the CXL protocol utilized by the CXL request.

The TFD illustrates two exemplary transactions between the entity and the RPU, corresponding to two distinct memory read paths denoted as (E.1)-(M.1) and (E.2)-(M.2), carrying different CXL protocols, and different physical addresses mapped to different memory resources. The first exemplary transaction comprises CXL.io UIOMRd memory read request with physical address (AS.2.1), which the RPU translates and forwards via the coherent interconnect protocol and via the memory controller to the first memory (Memory.1), resulting in the retrieval of *Data.1*, that is sent to the entity via the coherent interconnect protocol and via the RPU using CXL.io UIORdCplD read completion with data. Alternatively, the first exemplary transaction comprises CXL.io MRd memory read request, wherein the data is sent to the entity via the coherent interconnect protocol and via the RPU using CXL.io CplD completion with data. The second exemplary transaction comprises a CXL.mem M2S Request, denoted as (R.1), with physical address (AS.2.2), which the RPU may translate to physical address (AS.1.2) and forward to the second memory (Memory.2), via the coherent interconnect protocol and via the CXL/PCIe RP, utilizing a second CXL.mem M2S Request, denoted as (R.2). *Data.2* is retrieved from the second memory (Memory.2) via a first CXL.mem S2M DRS, denoted as (R.3), and sent to the RPU via the coherent interconnect protocol. The RPU may then forward *Data.2* to the entity via a second CXL.mem S2M DRS, denoted as (R.4). The physical addresses (AS.2.1) and (AS.2.2) may belong to different memory regions within the coherent interconnect's address space, enabling the entity to access multiple memory resources based on the RPU's translation capabilities.

Figures 7A, 7B:
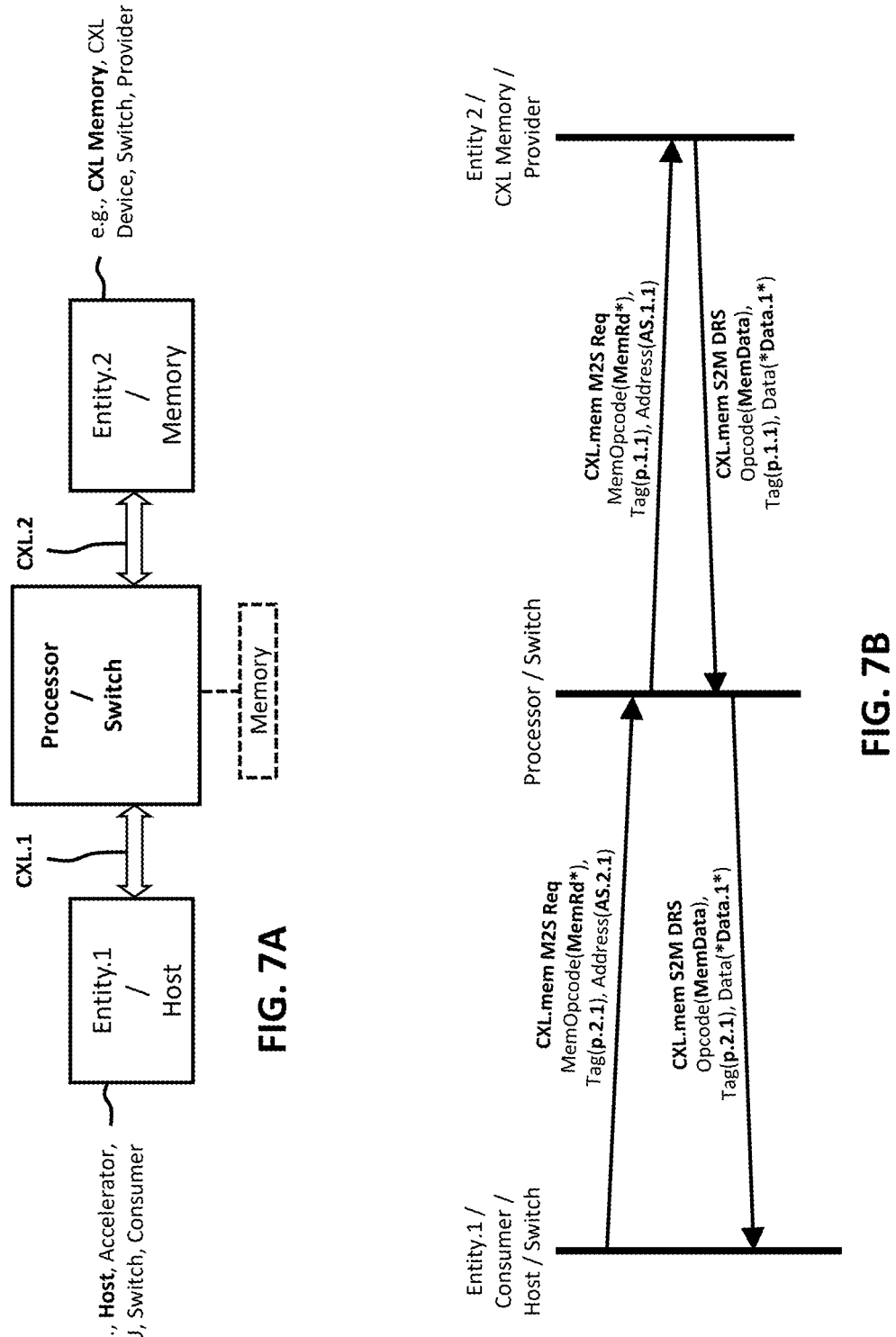
FIG. 7A illustrates one embodiment of a system comprising a processor/switch configured to enable external entities to access resources coupled to the processor.
FIG. 7B illustrates one embodiment of a TFD demonstrating translations performed by a processor between first and second CXL.mem protocols utilizing MemRd.

FIG. 7A illustrates one embodiment of a system comprising a processor or a switch, which may be coupled to memory, wherein the processor may enable external entities to access resources coupled to the processor. The processor is coupled to a first entity (Entity.1), which may be a host, an accelerator, an xPU, or a second switch, wherein the processor may communicate with the first entity according to a first CXL protocol. The processor is further coupled to a second entity (Entity.2), which may be a CXL memory, a CXL device, or a third switch, wherein the processor may communicate with the second entity according to a second CXL protocol.

In some embodiments, the first and second CXL protocols may be associated with a first and second physical address spaces, respectively, wherein the processor may perform address translations between addresses within the first and second physical address spaces, respectively. In other embodiments, the first and second CXL protocols may be associated with the same physical address space, wherein the processor may perform address translations between addresses within the same physical address spaces.

The processor may perform further translations, such as opcode, command, or TLP translations, e.g., translating between opcodes in request messages of the first CXL protocol, to opcodes in request messages of the second CXL protocol. The processor may further perform other translations, such as field translations between messages of the first and second CXL protocols, such as tag translations, traffic class (TC) translations, or cross-field translations such as Tag-CQID translations. In some embodiments, the processor may perform translations between protocols belonging to different CXL protocol revisions, such as translating between first CXL protocol transactions conforming to CXL 1.1, which may be utilized by the first entity, and second CXL protocol transactions conforming to CXL 2.0, which may be utilized by the second entity.

FIG. 7B illustrates one embodiment of a TFD demonstrating translations performed by a processor, or by a switch, between a first CXL.mem protocol utilized for communicating with a first entity (Entity.1), such as a host, and a second CXL.mem protocol utilized for communicating with a second entity (Entity.2), such as a CXL device or CXL memory. The first entity may initiate a first CXL.mem transaction that includes a first CXL.mem M2S Request comprising MemOpcode(MemRd*), Tag(p.2.1), and Address(AS.2.1). The processor may translate the first CXL.mem transaction to a second CXL.mem transaction that includes a second CXL.mem M2S Request comprising MemOpcode(MemRd*), Tag(p.1.1), and Address(AS.1.1), and may send the second CXL.mem M2S Request to the second entity. Upon receiving a response from the second entity, that may include a first CXL.mem S2M DRS comprising Opcode(MemData), Tag(p.1.1), and Data(*Data.1*), the processor may translate the first CXL.mem S2M DRS to a second CXL.mem S2M DRS comprising Opcode(MemData), Tag(p.2.1), and Data(*Data.1*).

The processor may perform further translations, such as opcode translations, e.g., translating between MemRd opcodes in request messages of the first CXL.mem protocol, and MemRdTEE opcodes in request messages of the second CXL.mem protocol, enabling CXL memory accesses with the Trusted Execution Environment (TEE) attribute. The processor may further perform other translations, such as field translations between messages of the first and second CXL.mem protocols, such as tag translations and traffic class (TC) translations.

In some embodiments, the processor may act as a protocol endpoint and terminate the first CXL.mem transaction. The processor may issue the second CXL.mem transaction, optionally acting as an independent protocol initiator, such as a CXL host, and may utilize translated fields from the first CXL.mem transaction for constructing the second CXL.mem transaction. In other embodiments, the processor may be configured to maintain end-to-end transaction contexts of the CXL.mem protocol between the first entity and the second entity, without terminating the CXL.mem transactions, such as by preserving transaction-related identification fields such as Tags, and optionally translating other fields such as address field.

Figures 1A, 1B:
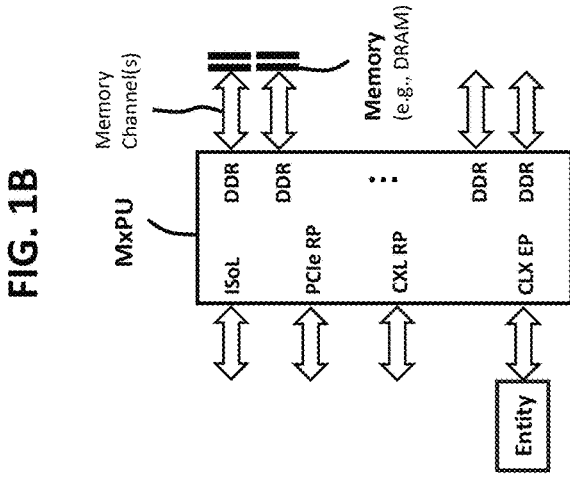
FIG. 1A and FIG. 1B illustrate embodiments of a system comprising a Modified CPU or GPU (MxPU) with an EP or a GFD.

FIG. 1A illustrates one embodiment of a system comprising a processor (such as an MxPU that may be derived from an established processor design) comprising processing cores and last level cache (LLC). The MxPU may include a CXL Device, such as a CXL EP, a Global Fabric Attached Memory Device (GFD), or another type of device communicating according to a CXL protocol, such as CXL.mem. The MxPU may further include an ISoL port such as ARM CHI C2C, Intel QPI, or Intel UPI, a PCIe Root Port (PCIe RP), a CXL Root Port (CXL RP), and may be coupled to memory, such as DRAM, optionally via a memory controller and memory channels. The CXL device may communicate with an entity, such as a host, optionally via a switch, according to a CXL protocol, such as CXL.mem, wherein an RPU may perform host-to-host address translations that may enable the entity to access the memory. The illustrated RPU may be coupled to an on-chip ring-based coherent interconnect via a coherent interconnect interface, such as the illustrated Ring-to-RPU (R2RPU), which may be referred to as a bridge node in ARM-based embodiments, or as an interface logic in Intel-based embodiments. Alternatively, the RPU may be coupled to the coherent interconnect essentially directly. Similarly, the illustrated ISoL port may be coupled to the coherent interconnect via a coherent interconnect interface, such as a Ring-to-ISoL (R2ISoL), which may be an ARM CHI over ring topology Interconnect to ARM CHI C2C ISoL, or Intel IDI over ring interconnect to Intel UPI or QPI ISoL. The PCIe Root Port (RP) may be coupled to the on-chip ring interconnect via a coherent interconnect interface, such as a Ring-to-PCIe (R2PCIe), and the CXL RP may be coupled to the ring interconnect via a coherent interconnect interface such as a Ring-to-CXL (R2CXL). The MxPU may be implemented as a monolithic die, as chiplets within an IC package, such as by utilizing separate compute die(s) and I/O die(s), or as components on a board, and may utilize a coherent interconnect, such as a ring-based or a mesh-based coherent interconnect. In other embodiments, the MxPU may utilize a mesh, a crossbar, or other types of interconnects.

FIG. 1B illustrates one embodiment of a Modified CPU or GPU (MxPU) that may be derived from an established processor design. The MxPU may include external interfaces such as a CXL EP, CXL RP, PCIe RP, ISoL, and DDR. The CXL EP may be coupled to an entity, optionally via a switch, and may communicate with the entity according to a protocol based on CXL, such as CXL.mem.

FIG. 2A illustrates one embodiment of a system comprising a processor including a coherent interconnect, enabling an external entity to access memory resources mapped to the coherent interconnect's address space. Optionally, the processor is an MxPU derived from an established processor design that may include processing cores, a coherent interconnect (such as a ring-based or a mesh-based coherent interconnect), and LLC. The MxPU may further include an ISoL port such as ARM CHI C2C, Intel UPI, or Intel UXI, and a memory controller optionally coupled via memory channels to memory, such as DRAM. The MxPU may include a CXL device, such as a Type-3 CXL device or a Type-2 CXL device, that may expose a CXL EP, and may communicate with an entity such as a host according to a protocol based on CXL, such as CXL.mem, wherein an RPU may perform host-to-host address translations to enable the entity to access the memory. The illustrated RPU may be coupled to the coherent interconnect via a Ring-to-RPU (R2RPU) logic. Alternatively, the RPU may be coupled to the coherent interconnect essentially directly. Similarly, the illustrated ISoL port is coupled to the coherent interconnect via a Ring-to-ISoL (R2ISoL) logic. The MxPU may be implemented as a monolithic die, as chiplets within an IC package, such as by utilizing separate compute die(s) and I/O die(s), or as components on a board, and may utilize a ring-based coherent interconnect, or in other embodiments, may utilize a mesh, crossbar, or other types of interconnects.

FIG. 2B illustrates one embodiment of a transaction flow diagram (TFD) demonstrating a CXL.mem read request (M2S Request *Rd*) received from an entity, such as a host or a switch, wherein an RPU may translate a physical address (AS.2.1) from a second host physical address space, carried in the M2S Request, to a physical address (AS.1.1) from a first HPA space, utilized by the coherent interconnect. The RPU may perform further translations, such as protocol translations from CXL.mem to a protocol utilized by the coherent interconnect, and may further send the optionally translated request to a home agent (also known as home node), and/or to a memory controller, requesting the read of physical address (AS.1.1). In some embodiments, the requested data may be provided by a processor cache, such as by an LLC, instead of by the memory. The data may then return over the coherent interconnect to the RPU, wherein the RPU provides CXL.mem Data Response (DRS) and optionally CXL.mem Non-Data Response (NDR) to the requesting entity.

Figure 3B:
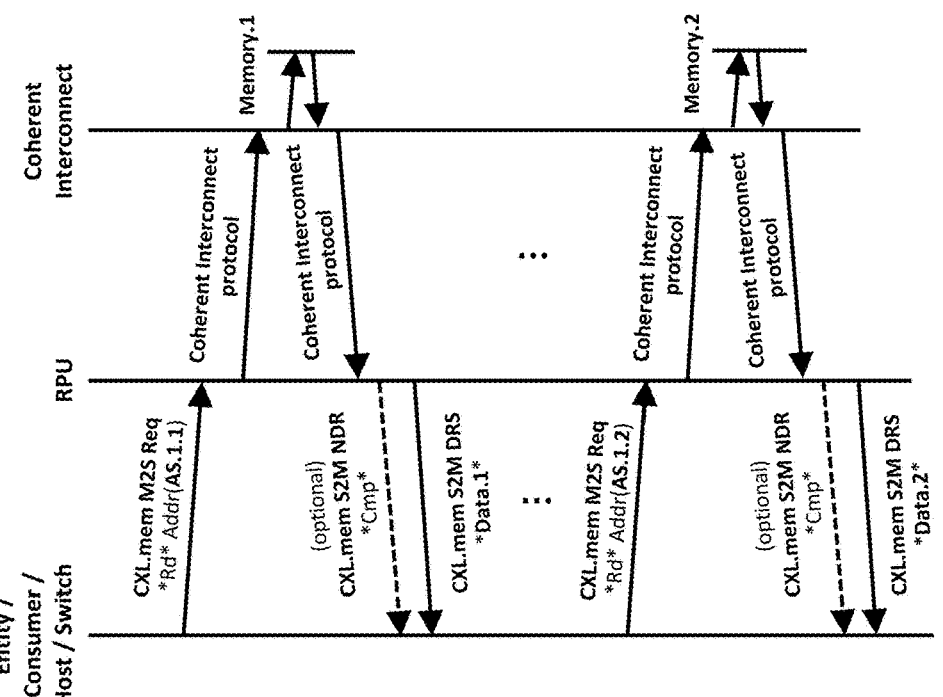
FIG. 3B illustrates one embodiment of a TFD demonstrating two CXL.mem requests mapped to an address space of a processor's coherent interconnect.
Figure 3A:
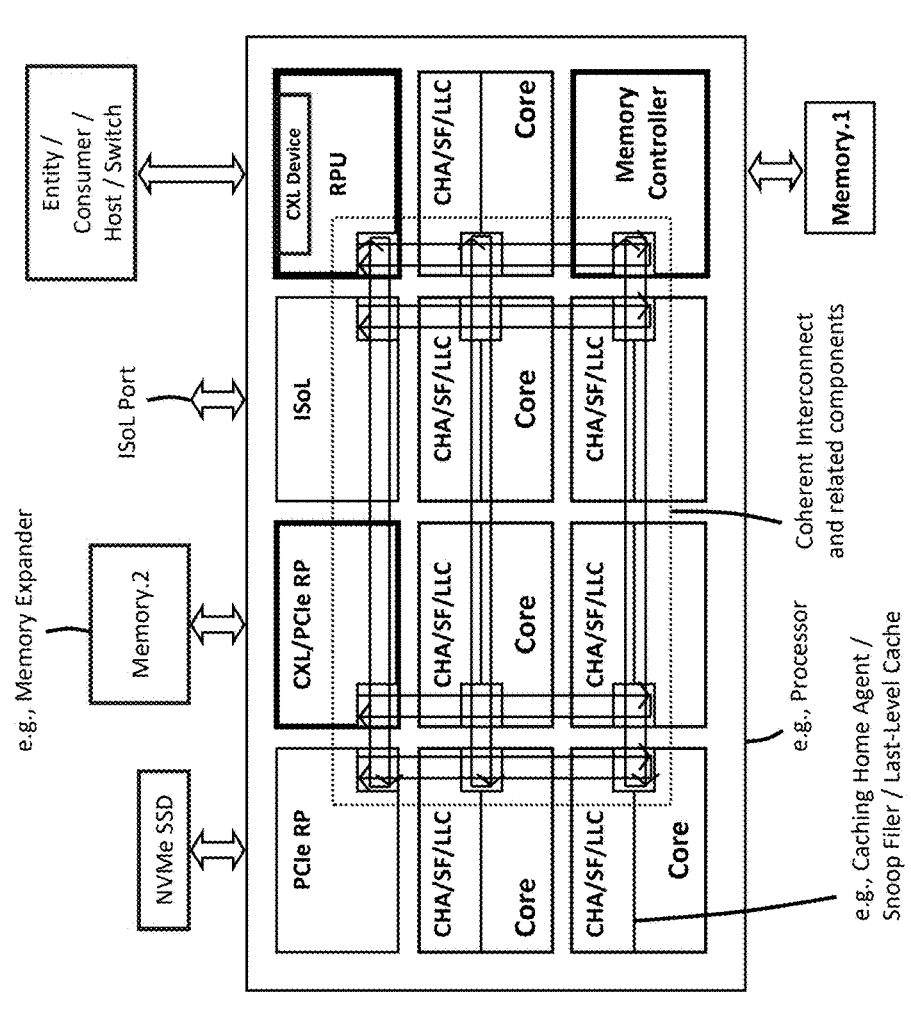
FIG. 3A illustrates one embodiment of a system comprising a processor including a CXL device configured to enable an external entity to access memory resources mapped to the processor coherent interconnect's address space.

FIG. 3A illustrates one embodiment of a system comprising a processor including a coherent interconnect, capable of enabling an external entity to access memory resources mapped to an address space utilized by the coherent interconnect. Optionally, the processor is an MxPU derived from an established processor design that may include processing cores, caching/home agent (CHA), snoop filter (SF), and last-level cache (LLC), optionally implemented as slices distributed across tiles on the coherent interconnect mesh. The processor may further include a PCIe Root Port (RP) that may be coupled to an NVMe SSD, a CXL/PCIe RP, a memory controller that may be coupled to a first memory (Memory.1), such as DRAM, and an ISoL port, such as a port utilizing ARM CHI C2C, NVLink-C2C, or Intel Coherent Processor Interconnect Protocol (ICPIP), such as Intel UPI or Intel UXI. The processor may be coupled to a second memory (Memory.2), such as a CXL memory expander, and may further include an RPU that may expose a CXL device, such as a Global Fabric-Attached Memory (G-FAM) Device (GFD), a Type-3 CXL device, or a Type-2 CXL device. The CXL device may expose an Endpoint (EP), and may communicate with an entity, such as a host, according to at least one protocol based on CXL, such as CXL.mem and/or CXL.io, wherein the RPU may perform host-to-host address translations to enable the entity to access the first memory and/or the second memory. The illustrated RPU may be coupled to the coherent interconnect, and may translate between the at least one protocol based on CXL and a protocol utilized by the coherent interconnect. The processor may be implemented as a monolithic die, as chiplets within an IC package, such as by utilizing separate compute die(s) and I/O die(s), or as components on a board, and may utilize a mesh-based coherent interconnect, or in other embodiments, may utilize a ring, a crossbar, or other types of coherent interconnects.

FIG. 3B illustrates one embodiment of a transaction flow diagram (TFD) demonstrating two CXL requests, such as CXL.mem M2S Requests, received from an entity and forwarded to different memories mapped to a coherent interconnect's address space. An RPU may perform host-to-host physical address translations to enable the entity to access the processor's memories. The processor may have multiple memory resources, such as DRAM coupled to a memory controller of the processor, and/or memory expanders that may be coupled to CXL RPs of the processor. The paths from the RPU to the different memories may traverse other components, such as CHA/SF/LLC slices, memory controllers, or in other embodiments, a home agent or a home node, optionally for resolving coherency. The RPU may further perform additional translations, such as protocol translations from a protocol based on CXL, such as CXL.mem or CXL.io, to a protocol utilized by the coherent interconnect, and may send the optionally translated request to the coherent interconnect, requesting a read from memory. In some embodiments, the requested data may be provided by a processor cache, such as by an LLC, instead of by the memory. The data may then return over the coherent interconnect to the RPU, wherein the RPU provides CXL.mem Data Response (DRS) and optionally CXL.mem Non-Data Response (NDR) to the requesting entity. The TFD illustrates two exemplary transactions carrying different physical addresses mapped to different memory resources. The first exemplary transaction comprises a CXL.mem M2S Request with physical address (AS.1.1), which the RPU translates and forwards via the coherent interconnect protocol to Memory.1, resulting in the retrieval of *Data.1* that is returned to the entity with the first CXL.mem S2M DRS. The second exemplary transaction comprises a CXL.mem M2S Request with physical address (AS.1.2), which the RPU translates and forwards via the coherent interconnect protocol to Memory.2, resulting in the retrieval of *Data.2* that is returned to the entity with the second CXL.mem S2M DRS. The physical addresses (AS.1.1) and (AS.1.2) may belong to different memory regions within the coherent interconnect's address space, enabling the entity to access multiple memory resources based on the RPU's translation capabilities.

Figures 4A, 4B:
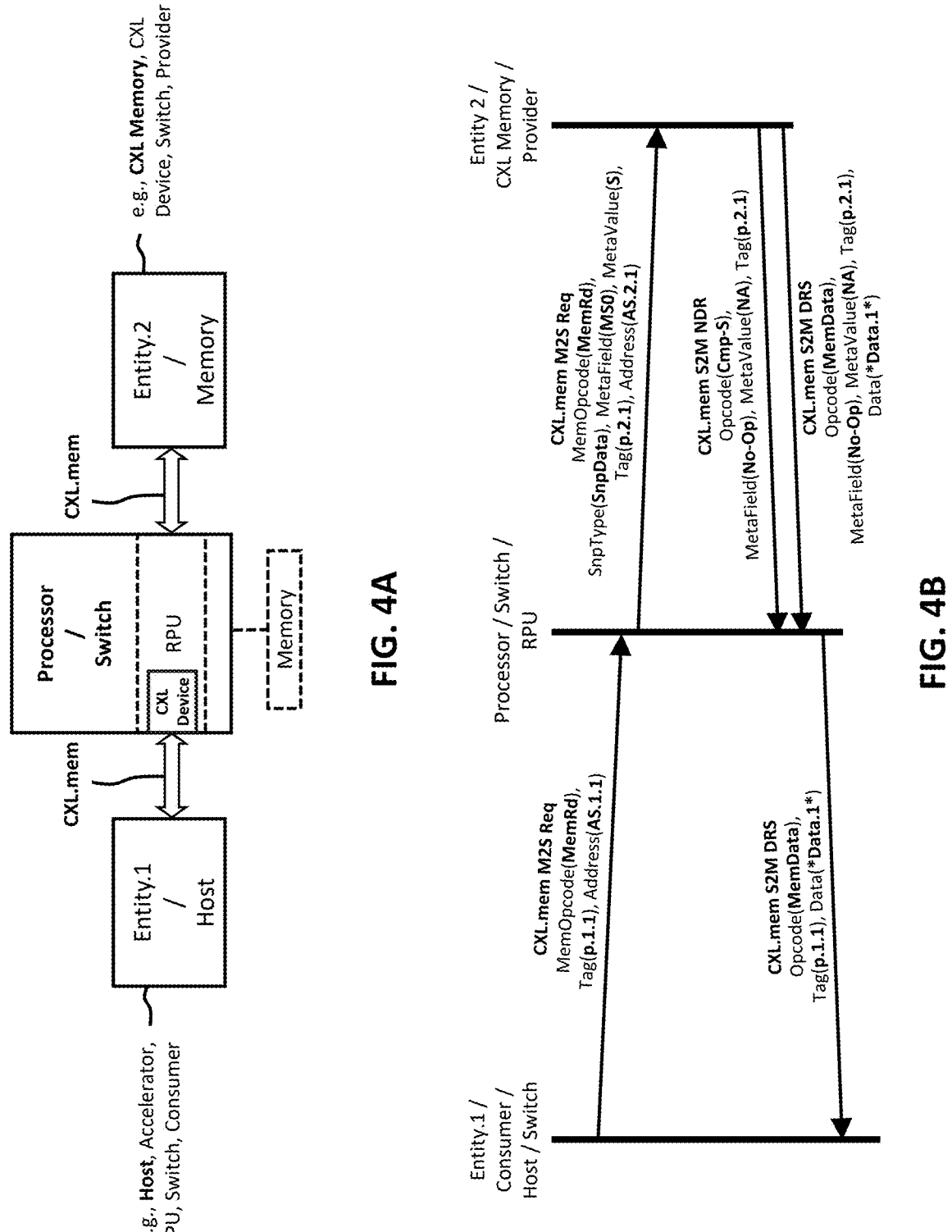
FIG. 4A illustrates one embodiment of a system comprising a processor/switch with a CXL device configured to enable external entities to access resources coupled to the processor.
FIG. 4B illustrates one embodiment of a TFD demonstrating translations between first and second CXL.mem transactions that include MemRd* opcodes.

FIG. 4A illustrates one embodiment of a system comprising a processor or a switch, which may include or may be coupled to memory, and may further include an RPU with a CXL device, such as a Global Fabric-Attached Memory (G-FAM) Device (GFD), or a Type-3/2/1 CXL device, enabling external entities to access resources coupled to the processor via the CXL device. The processor is coupled to a first entity (Entity.1), which may be a host, an accelerator, an xPU, or a second switch, wherein the processor may communicate with the first entity according to a first CXL.mem protocol. The processor is further coupled to a second entity (Entity.2), which may be a CXL memory, a CXL device, or a third switch, wherein the processor may communicate with the second entity according to a second CXL.mem protocol. In some embodiments, the first and second CXL.mem protocols may be associated with a first and second physical address spaces, respectively, wherein the RPU may perform address translations between addresses within the first and second physical address spaces, respectively. In other embodiments, the first and second CXL.mem protocols may be associated with the same physical address space, wherein the RPU may perform address translations between addresses within the same physical address spaces.

The RPU may perform further translations, such as opcode translations, e.g., translating between MemRd opcodes in request messages of the first CXL.mem protocol, to MemRdTEE opcodes in request messages of the second CXL.mem protocol, enabling CXL memory accesses with the Trusted Execution Environment (TEE) attribute. The RPU may further perform other translations, such as field translations between messages of the first and second CXL.mem protocols, such as tag translations and traffic class (TC) translations. In some embodiments, the RPU may perform translations between protocols belonging to different CXL protocol revisions, such as translating between CXL.mem transactions conforming to CXL 1.1, which may be utilized by the first entity, and CXL.mem transactions conforming to CXL 2.0, which may be utilized by the second entity. In still some embodiments, the RPU may translate between CXL.mem type-3 memory flows and CXL.mem type-2 memory flows, such as CXL.mem transactions that may include CXL.mem S2M NDR responses.

FIG. 4B illustrates one embodiment of a TFD demonstrating translations performed by a processor, a switch, or by an RPU, between a first CXL.mem protocol utilized for communicating with a first entity (Entity.1), such as a host, and a second CXL.mem protocol utilized for communicating with a second entity (Entity.2), such as a CXL device or CXL memory. The first entity may initiate a first CXL.mem transaction that includes a first CXL.mem M2S Request comprising MemOpcode(MemRd*), Tag(p.1.1), and Address(AS.1.1). The RPU may translate the first CXL.mem transaction to a second CXL.mem transaction that includes a second CXL.mem M2S Request comprising MemOpcode (MemRd), SnpType(SnpData), MetaField(MSO), MetaValue(S), Tag(p.2.1), and Address(AS.2.1), wherein the RPU may send the second CXL.mem M2S Request to the second entity. The second entity may respond to the second CXL.mem M2S Request with a CXL.mem S2M NDR comprising Opcode(Cmp-S), MetaField(No-Op), MetaValue(NA), and Tag(p.2.1), and may further respond with a first CXL.mem S2M DRS comprising Opcode(MemData), MetaField(No-Op), MetaValue(NA), Tag(p.2.1), and Data (*Data.1*), wherein the RPU may translate the first CXL.mem S2M DRS to a second CXL.mem S2M DRS comprising Opcode(MemData), Tag(p.1.1), and Data (*Data.1*).

The RPU may perform further translations, such as opcode translations, e.g., translating between MemRd opcodes in request messages of the first CXL.mem protocol, and MemRdTEE opcodes in request messages of the second CXL.mem protocol, enabling CXL memory accesses with the Trusted Execution Environment (TEE) attribute. The RPU may further perform other translations, such as field translations between messages of the first and second CXL.mem protocols, such as tag translations and traffic class (TC) translations. In some embodiments, the RPU may translate between CXL.mem type-3 memory flows and CXL.mem type-2 memory flows, such as CXL.mem transactions that may include CXL.mem S2M NDR responses. In some embodiments, the RPU may act as a protocol endpoint and terminate the first CXL.mem transaction. The RPU may issue the second CXL.mem transaction, optionally acting as an independent protocol initiator, such as a CXL host, and may utilize translated fields from the first CXL.mem transaction for constructing the second CXL.mem transaction. In other embodiments, the RPU may be configured to maintain end-to-end transaction contexts of the CXL.mem protocol between the first entity and the second entity, without terminating the CXL.mem transactions, such as by preserving transaction-related identification fields such as Tags, and optionally translating other fields such as address field.

Figures 5A, 5B:
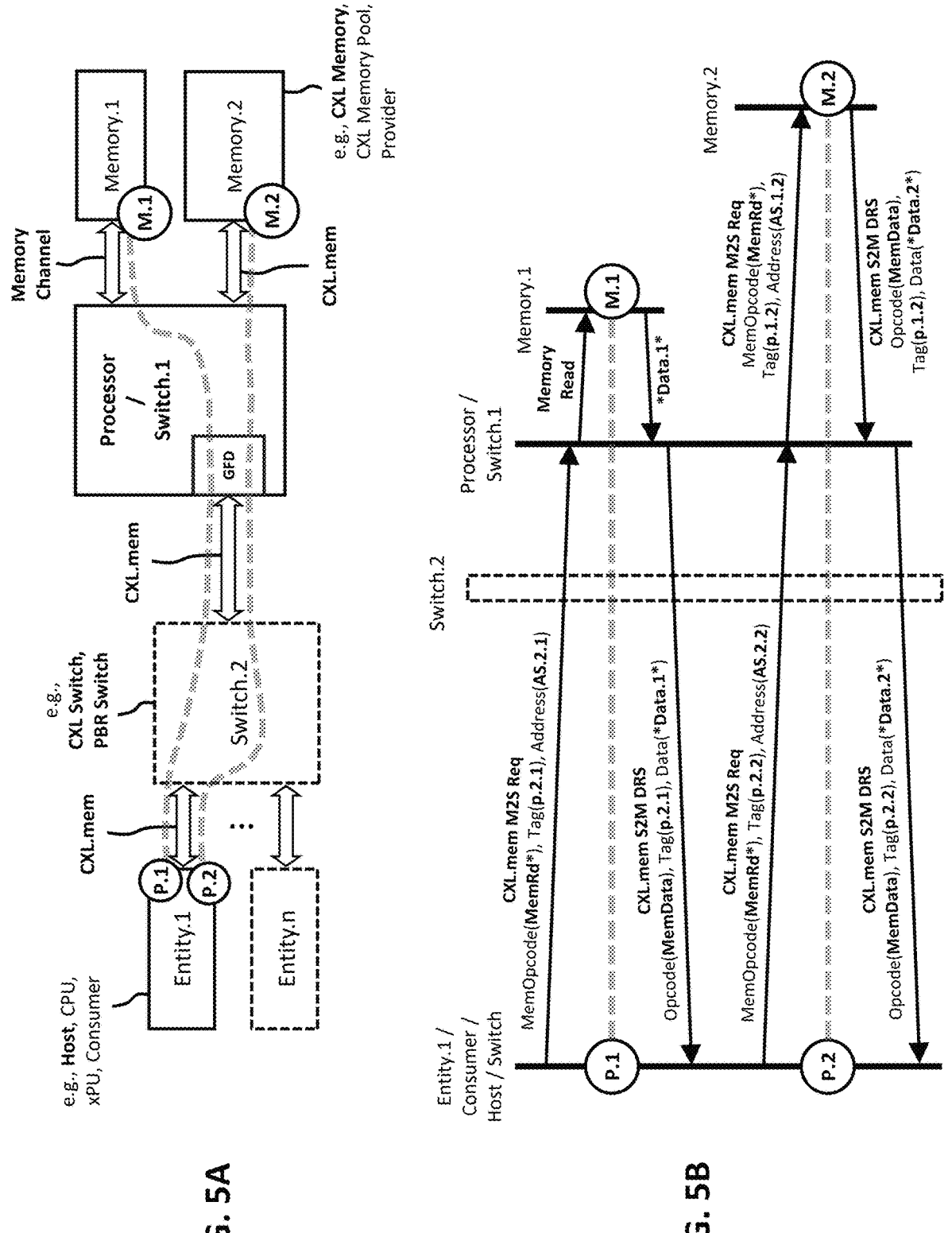
FIG. 5A illustrates one embodiment of a system comprising a processor configured to communicate with multiple hosts according to CXL.mem.
FIG. 5B illustrates one embodiment of a TFD demonstrating two CXL.mem transactions directed to different memories coupled to a processor.

FIG. 5A illustrates one embodiment of a system comprising a processor or a first switch (Switch.1), which may be coupled to a first memory (Memory.1), such as DRAM, via a memory channel, and may be further coupled to a second memory (Memory.2), such as CXL memory, a CXL memory pool, or a CXL-based provider. The processor may include a Global Fabric-Attached Memory (G-FAM) Device (GFD), which may be coupled to one or more entities, such as first entity (Entity.1), optionally via a second switch (Switch.2), such as a CXL switch or a PBR switch, enabling the one or more entities to access, via the GFD, resources coupled to the processor, such as via one or more of the two illustrated paths denoted as (P.1)-(M.1) and (P.2)-(M.2). In some embodiments, the number of entities, denoted by the parameter n of (Entity.n) may exceed 16. The processor may communicate with the first entity, which may be a host, a CPU, an xPU, or a consumer, according to a first CXL-based protocol, such as a first CXL.mem protocol. The processor may communicate with the second memory, according to a second CXL-based protocol, such as a second CXL.mem protocol.

In some embodiments, the first and second CXL.mem protocols may be associated with first and second physical address spaces, respectively, such as first and second Host Physical Address (HPA) spaces, wherein the processor may perform address translations between addresses within the first and second physical address spaces, respectively. In other embodiments, the first and second CXL.mem protocols may be associated with the same physical address space, wherein the processor may perform address translations between addresses within the same physical address spaces. The processor may perform further translations, such as opcode translations, e.g., translating between MemRd opcodes in request messages of the first CXL.mem protocol, to MemRdTEE opcodes in request messages of the second CXL.mem protocol, enabling CXL memory accesses with the Trusted Execution Environment (TEE) attribute. The processor may further perform other translations, such as field translations between messages of the first and second CXL.mem protocols, such as traffic class (TC) translations and tag translations. The processor may maintain tracking between tags of the first CXL.mem protocol and tags of the second CXL.mem protocol, such as in order to associate responses with their corresponding requests. In some embodiments, the processor may perform translations between protocols belonging to different CXL protocol revisions, such as translating between CXL.mem transactions conforming to CXL 1.1, which may be utilized by the first entity, and CXL.mem transactions conforming to CXL 2.0, which may be utilized by the second memory.

FIG. 5B illustrates one embodiment of a TFD demonstrating two CXL.mem transactions between a first entity (Entity.1), such as a host, and a processor, or a first switch (Switch.1), corresponding to two distinct memory read paths denoted as (P.1)-(M.1) and (P.2)-(M.2), carrying different physical addresses mapped to different memory resources. The drawing further illustrates translations performed by the processor (or by Switch.1), between a first CXL.mem protocol utilized for communicating with the first entity, and a second CXL.mem protocol utilized for communicating with a second memory (Memory.2), such as a CXL memory, wherein the communication between the processor and the first entity may be performed via a Global Fabric-Attached Memory (G-FAM) Device (GFD) and optionally via a second switch (Switch.2).

The first CXL.mem transaction received by the processor from the first entity includes a first CXL.mem M2S Request comprising MemOpcode(MemRd*), Tag(p.2.1), and Address(AS.2.1), which the processor may translate and forward, optionally via an internal interconnect of the processor, via a memory controller, and via a memory channel, to a first memory (Memory.1), resulting in the retrieval of *Data.1*, that the processor sends to the first entity via a first CXL.mem S2M DRS comprising Opcode(MemData), Tag (p.2.1), and Data(*Data.1*).

The second CXL.mem transaction received by the processor from the first entity includes a second CXL.mem M2S Request comprising MemOpcode(MemRd*), Tag (p.2.2), and Address(AS.2.2), which the processor may translate to a third CXL.mem transaction that may include a third CXL.mem M2S Request comprising MemOpcode (MemRd*), Tag(p.1.2), and Address(AS.1.2), wherein the processor may send the third CXL.mem M2S Request to the second memory. Upon receiving a response from the second memory, that may include a second CXL.mem S2M DRS comprising Opcode(MemData), Tag(p.1.2), and Data (*Data.2*), the processor may translate the second CXL.mem S2M DRS to a third CXL.mem S2M DRS comprising Opcode(MemData), Tag(p.2.2), and Data (*Data.2*). The processor may perform further translations, such as opcode translations, e.g., translating between MemRd opcodes in request messages of the first CXL.mem protocol, and MemRdTEE opcodes in request messages of the second CXL.mem protocol, enabling CXL memory accesses with the Trusted Execution Environment (TEE) attribute. The processor may further perform other translations, such as field translations between messages of the first and second CXL.mem protocols, such as tag translations and traffic class (TC) translations.

In some embodiments, the processor may act as a protocol endpoint and terminate the CXL.mem transaction received from the first entity. The processor may issue CXL.mem transaction to the second memory, optionally acting as an independent protocol initiator, such as a CXL host, and may utilize translated fields from the CXL.mem transaction received from the first entity for constructing the CXL.mem transaction sent to the second memory. In other embodiments, the processor may be configured to maintain end-to-end transaction contexts of the CXL.mem protocol between the first entity and the second memory, without terminating the CXL.mem transactions, such as by preserving transaction-related identification fields such as Tags, and optionally translating other fields such as address field.

Figures 8A, 8B:
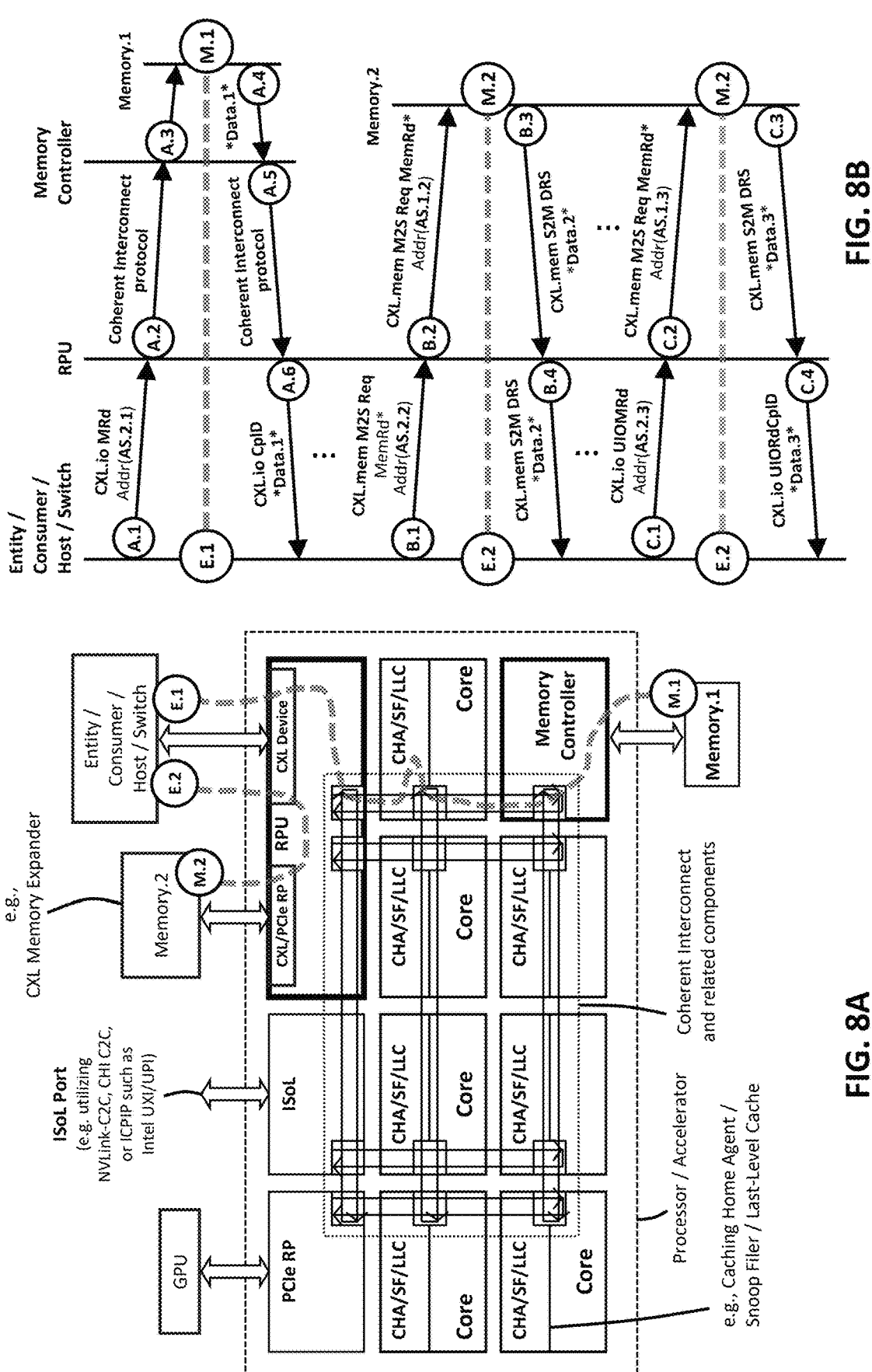
FIG. 8A illustrates one embodiment of a system comprising a processor comprising a CXL device and a CXL RP.
FIG. 8B illustrates one embodiment of a TFD demonstrating translating CXL.io MRd request, CXL.mem M2S Request, and CXL.io UIOMRd request.

FIG. 8A illustrates one embodiment of a system comprising a processor including a coherent interconnect, capable of enabling an external entity to access memory resources mapped to an address space utilized by the coherent interconnect, such as via one or more of the two illustrated paths (E.1)-(M.1) and (E.2)-(M.2). The processor may include processing cores, CHA, SF, and LLC, optionally implemented as distributed slices or tiles coupled to the coherent interconnect. The processor may further include a PCIe RP that may be coupled to a GPU, a memory controller that may be coupled to a first memory (Memory.1), such as DRAM, and an ISoL port, such as a port utilizing NVIDIA NVLink-C2C, ARM CHI C2C, or ICPIP, such as Intel UPI or Intel UXI. The processor may further comprise an RPU, that may include a CXL device and a CXL/PCIe RP, wherein the CXL device may include a Global Fabric-Attached Memory (G-FAM) Device (GFD), or a Type-3/2/1 CXL device, and wherein the CXL/PCIe RP may be coupled to a second memory (Memory.2), such as a CXL memory expander. The CXL device may expose an Endpoint (EP), and may communicate with an entity, such as a host or another device (e.g., via Peer-to-Peer/P2P), according to at least one protocol based on CXL, such as CXL.mem, CXL.cache, and/or CXL.io, wherein the RPU may perform host-to-host address translations to enable the entity to access the first memory, such as via the path (E.1)-(M.1), and/or access the second memory, such as via the path (E.2)-(M.2). The illustrated RPU may be coupled to the coherent interconnect, and may translate between the at least one protocol based on CXL and a protocol utilized by the coherent interconnect.

FIG. 8B illustrates one embodiment of a TFD demonstrating three CXL requests, such as CXL.io MRd memory read request, denoted as (A.1), CXL.mem M2S Request, denoted as (B.1), and CXL.io UIOMRd memory read request, denoted as (C.1), received from an entity, processed and forwarded by an RPU, possibly using a protocol utilized by a coherent interconnect, to different memories mapped to the coherent interconnect's address space. In some embodiments, the paths from the RPU to the different memories may traverse other components, such as CHA/SF/LLC, optionally for resolving coherency. The RPU may perform host-to-host physical address translations, such as when translating physical addresses from (AS.2.2) to (AS.1.2), or from (AS.2.3) to (AS.1.3), in order to enable the entity to access the processor's memories. The processor may have multiple memory resources, such as DRAM, denoted as (Memory.1), which may be coupled to a memory controller of the processor, and/or a CXL memory expander, denoted as (Memory.2), which may be coupled to a CXL/PCIe RP of the RPU. The RPU may further perform additional translations, such as protocol translations from a protocol based on CXL, such as CXL.io, CXL.cache, or CXL.mem, to a protocol utilized by the coherent interconnect, and may send the optionally translated request to the coherent interconnect, requesting a read from memory. Additionally or alternatively, the RPU may perform protocol translations from a first protocol based on CXL to a second protocol based on CXL, such as from first CXL.mem to second CXL.mem, as illustrated on the path (B.1)-(B.2), or from CXL.io to third CXL.mem, as illustrated on the path (C.1)-(C.2). In some embodiments, the requested data may be provided by a processor cache, such as by an LLC, instead of by the memory. The data may then return from the memory to the RPU, wherein the RPU provides the requested data to the requesting entity such as via CXL.io CplD completion with data, via CXL.mem S2M Data Response (DRS), or via CXL.io UIORdCplD read completion with data, depending on the CXL protocol utilized by the CXL request.

The TFD illustrates three exemplary transactions between the entity and the RPU, carrying different CXL protocols, and different physical addresses mapped to different memory resources. The first exemplary transaction corresponds to the memory read path denoted as (E.1)-(M.1), which includes CXL.io MRd memory read request, denoted as (A.1), carrying physical address (AS.2.1), which the RPU may translate to a read request conforming to a protocol utilized by the coherent interconnect. The RPU sends the translated request, denoted as (A.2), via the coherent interconnect, to a memory controller, that may convert the translated request to a memory access request, denoted as (A.3), and send it to the first memory (Memory.1), resulting in the retrieval from memory of *Data. 1*, denoted as (A.4), which is then then sent to the RPU via the coherent interconnect protocol, denoted as (A.5), and from the RPU to the entity via CXL.io CplD completion with data, denoted as (A.6).

The second exemplary transaction corresponds to the memory read path denoted as (E.2)-(M.2), which includes a first CXL.mem M2S Request, denoted as (B.1), carrying physical address (AS.2.2), which the RPU may translate to a second CXL.mem M2S Request, denoted as (B.2), carrying physical address (AS.1.2), and send the translated request to the second memory (Memory.2), resulting in the retrieval of *Data.2* that is sent to the RPU via a first CXL.mem S2M DRS, denoted as (B.3), and from the RPU to the entity via a second CXL.mem S2M DRS, denoted as (B.4).

The third exemplary transaction corresponds to the memory read path denoted as (E.2)-(M.2), which includes a CXL.io UIOMRd memory read request, denoted as (C.1), carrying physical address (AS.2.3), which the RPU may translate to a third CXL.mem M2S Request, denoted as (C.2), carrying physical address (AS.1.3), and send the translated request to the second memory (Memory.2), resulting in the retrieval of *Data.3* that is sent to the RPU via a third CXL.mem S2M DRS, denoted as (C.3), and from the RPU to the entity via CXL.io UIORdCplD read completion with data, denoted as (C.4). It is noted that the physical addresses (AS.2.1), (AS.2.2), and (AS.2.2) may belong to different memory regions within the coherent interconnect's address space, enabling the entity to access multiple memory resources based on the RPU's translation capabilities.

Figures 9A, 9B:
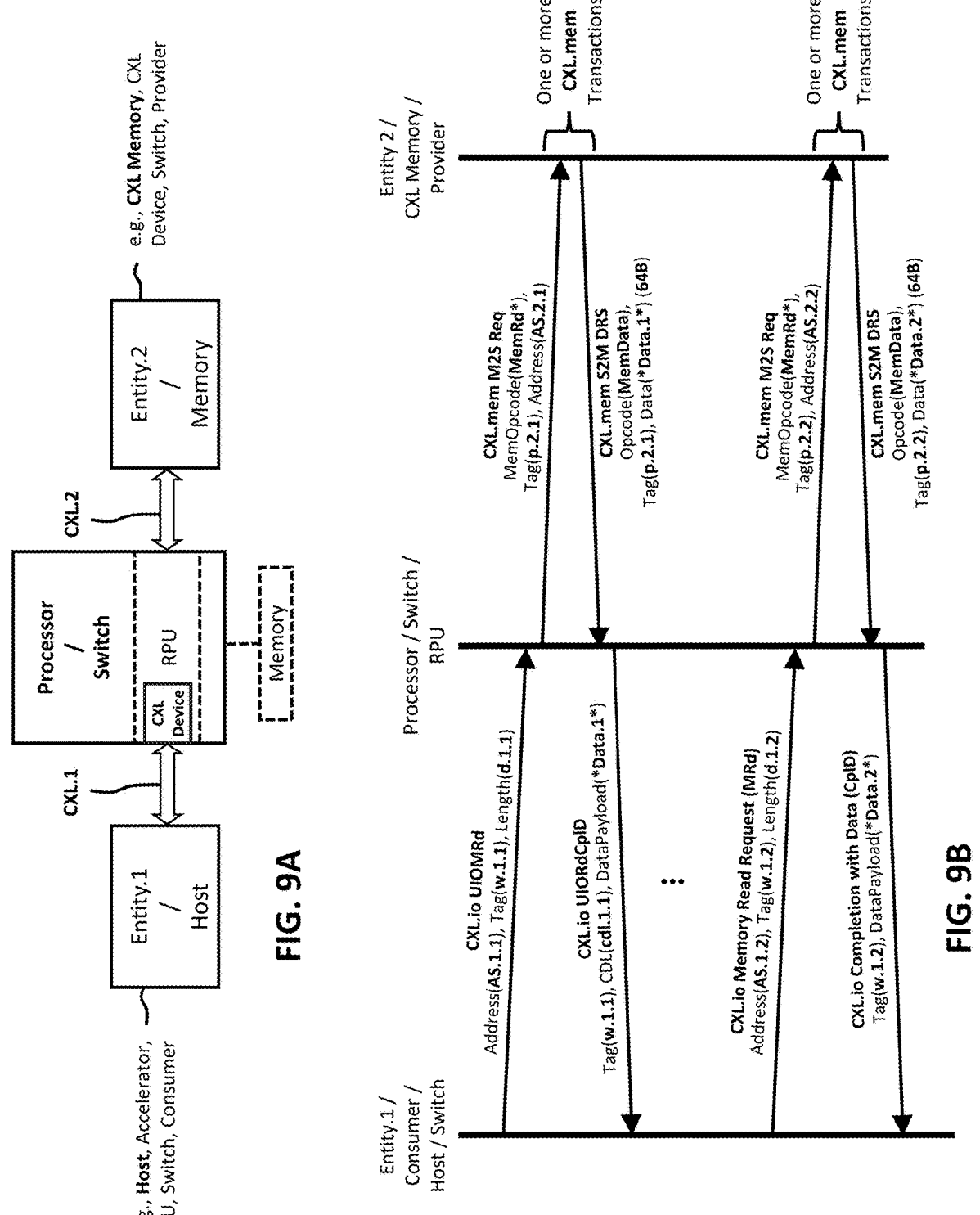
FIG. 9A illustrates one embodiment of a system comprising a processor enabling a host to access CXL memory coupled to the processor.
FIG. 9B illustrates one embodiment of a TFD demonstrating a first translation between CXL.io UIOMRd and CXL.mem, and a second translation between CXL.io MRd and CXL.mem.

FIG. 9A illustrates one embodiment of a system comprising a processor or a switch, which may include memory, and may further include an RPU that includes a CXL device, such as a Global Fabric-Attached Memory (G-FAM) Device (GFD), or a Type-3/2/1 CXL device, enabling external entities to access resources coupled to the processor via the CXL device. The processor is coupled to a first entity (Entity.1), which may be a host, an accelerator, an xPU, or a second switch, wherein the processor may communicate with the first entity according to a first CXL protocol, such as CXL.io. The processor is further coupled to a second entity (Entity.2), which may be a CXL memory, a CXL device, or a third switch, wherein the processor may communicate with the second entity according to a second CXL protocol, such as CXL.mem.

In some embodiments, the first and second CXL protocols may be associated with a first and second physical address spaces, respectively, wherein the RPU may perform address translations between addresses within the first and second physical address spaces, respectively. In other embodiments, the first and second CXL protocols may be associated with the same physical address space, wherein the RPU may perform address translations between addresses within the same physical address spaces. The RPU may perform further translations, such as opcode, command, or TLP translations, e.g., translating between UIOMRd TLPs in request messages of the first CXL protocol, such as CXL.io, and MemRd* opcodes in request messages of the second CXL protocol, such as CXL.mem. The RPU may further perform other translations, such as field translations between messages of the first and second CXL protocols, such as tag translations. In some embodiments, the RPU may perform translations between protocols belonging to different CXL protocol revisions, such as translating between CXL.io transactions conforming to CXL 1.1, which may be utilized by the first entity, and CXL.mem transactions conforming to CXL 2.0, which may be utilized by the second entity.

FIG. 9B illustrates one embodiment of a TFD demonstrating translations, such as protocol translations, performed by a processor, a switch, or by an RPU, between CXL.io utilized for communicating with a first entity (Entity.1), such as a host, and CXL.mem utilized for communicating with a second entity (Entity.2), such as a CXL device or a CXL memory. The first entity may initiate a first CXL.io transaction that includes UIOMRd memory read request comprising Address(AS.1.1), Tag(w.1.1), and Length(d.1.1). The RPU may translate the first CXL.io transaction to one or more CXL.mem transactions, depending on the length of the requested data payload indicated by the UIOMRd request. In one embodiment, when the requested data payload is 64 Bytes or less, the RPU may translate the first CXL.io transaction to a CXL.mem transaction that may include a first CXL.mem M2S Request comprising MemOpcode(MemRd*), Tag(p.2.1), and Address(AS.2.1), and may send the first CXL.mem M2S Request to the second entity. Upon receiving a response from the second entity, that may include a first CXL.mem S2M DRS comprising Opcode(MemData), Tag(p.2.1), and Data(*Data.1*), the RPU may translate the first CXL.mem S2M DRS to a CXL.io UIORdCplD read completion with data comprising Tag(w.1.1), CDL(cdl.1.1), and DataPayload (*Data.1*), where the CDL field may denote a CXL Dev-Load (CDL) field in UIO completions, and may be populated with information related to Quality-of-Service (QoS), such as QoS telemetry value or values.

The first entity may further initiate a second CXL.io transaction that includes memory read request (MRd) comprising Address(AS.1.2), Tag(w.1.2), and Length(d.1.2). The RPU may translate the second CXL.io transaction to one or more CXL.mem transactions, depending on the length of the requested data payload indicated by the MRd request. In one embodiment, when the requested data payload is 64 Bytes or less, the RPU may translate the second CXL.io transaction to a second CXL.mem transaction that may include a second CXL.mem M2S Request comprising MemOpcode (MemRd*), Tag(p.2.2), and Address(AS.2.2), and may send the second CXL.mem M2S Request to the second entity. Upon receiving a response from the second entity, that may include a second CXL.mem S2M DRS comprising Opcode (MemData), Tag(p.2.2), and Data(*Data.2*), the RPU may translate the second CXL.mem S2M DRS to a CXL.io CplD completion with data comprising Tag(w.1.2) and DataPayload(*Data.2*).

The RPU may perform further translations, such as opcode, command, or TLP translations, e.g., translating between UIOMRd TLPs in request messages of CXL.io, to MemRd* opcodes in request messages of CXL.mem. The RPU may further perform other translations, such as field translations between messages of CXL.io and CXL.mem, such as tag translations. In some embodiments, the RPU may perform translations between protocols belonging to different CXL protocol revisions, such as translating between CXL.io transactions conforming to CXL 1.1, which may be utilized by the first entity, and CXL.mem transactions conforming to CXL 2.0, which may be utilized by the second entity. In some embodiments, the RPU may act as a protocol endpoint and terminate the CXL.io transactions. The RPU may issue CXL.mem transactions, optionally acting as an independent protocol initiator, such as a CXL host, and may utilize translated fields from the CXL.io transactions for constructing the CXL.mem transactions.

Figures 10A, 10B:
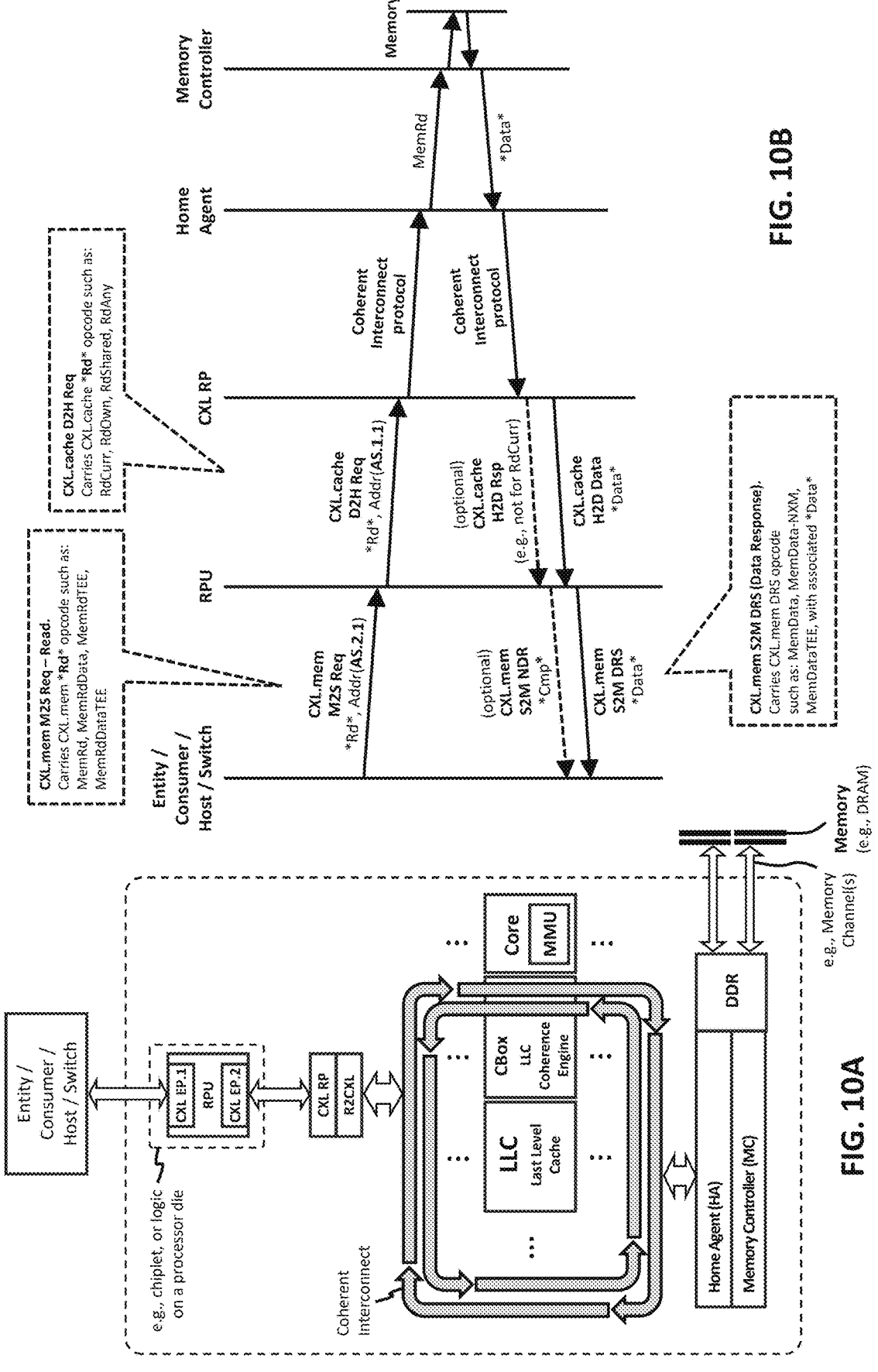
FIG. 10A illustrates one embodiment of a system comprising a processor comprising a CXL endpoint.
FIG. 10B illustrates one embodiment of a TFD demonstrating translations between CXL.mem and CXL.cache messages.

FIG. 10A illustrates one embodiment of a system comprising a processor, including a coherent interconnect, capable of enabling an external entity to access memory resources mapped to the coherent interconnect's address space. Optionally, the processor is an MxPU derived from an established processor design that may include coherent interconnect (such as a ring-based or a mesh-based coherent interconnect), processing cores, LLC, a CXL RP, and a memory controller optionally coupled via memory channels to memory, such as DRAM. The CXL RP may be coupled to the coherent interconnect via a Ring-to-CXL (R2CXL) logic. An RPU, which may be included in the MxPU, performs host-to-host address translations that may enable an entity such as a host to access the memory. The MxPU may expose to the entity, optionally via the RPU, a first CXL device, such as a Type-3 CXL device or a Type-2 CXL device, utilizing a first CXL Endpoint (CXL EP.1). The first CXL device may communicate with the entity according to a protocol based on CXL, such as CXL.mem. The MxPU may further expose, optionally via the RPU and the CXL RP, a second CXL device such as a Type-1 CXL device or a Type-2 CXL device, utilizing a second CXL Endpoint (CXL EP.2). In some embodiments, the RPU and its CXL devices may be implemented in a chiplet inside an IC package of a processor, such as inside an IC package of an MxPU, whereas in other embodiments, the RPU and its CXL devices may be implemented as functional blocks on the same die with the CXL RP, or split between multiple processor dies or chiplets. Alternatively, the RPU may be implemented as a discrete component coupled to a processor component.

FIG. 10B illustrates one embodiment of a TFD demonstrating a CXL.mem read request (M2S Request *Rd*) received from an entity, such as a host or a switch, wherein the RPU may perform protocol translations between CXL.mem and CXL.cache, and may further translate a physical address (AS.2.1) from a second host physical address space, carried in the CXL.mem M2S Request, to a physical address (AS.1.1) from a first HPA space, carried in a CXL.cache D2H Request, wherein the first HPA space is utilized by the processor and/or by the coherent interconnect. The RPU may perform further translations, such as opcode translations and tag to CQID translations. The CXL.cache request, carrying the translated address (AS.1.1), is sent to the CXL RP for further processing and fetching of the requested data, such as from the LLC over the on-chip ring-based coherent interconnect, or from the DRAM via the memory controller. The data may then return over the coherent interconnect to the RPU, via the CXL RP, wherein the RPU may perform further protocol translations between CXL.cache and CXL.mem and provide CXL.mem Data Response (DRS) and optionally CXL.mem Non-Data Response (NDR) to the requesting entity.

Figures 11A, 11B:
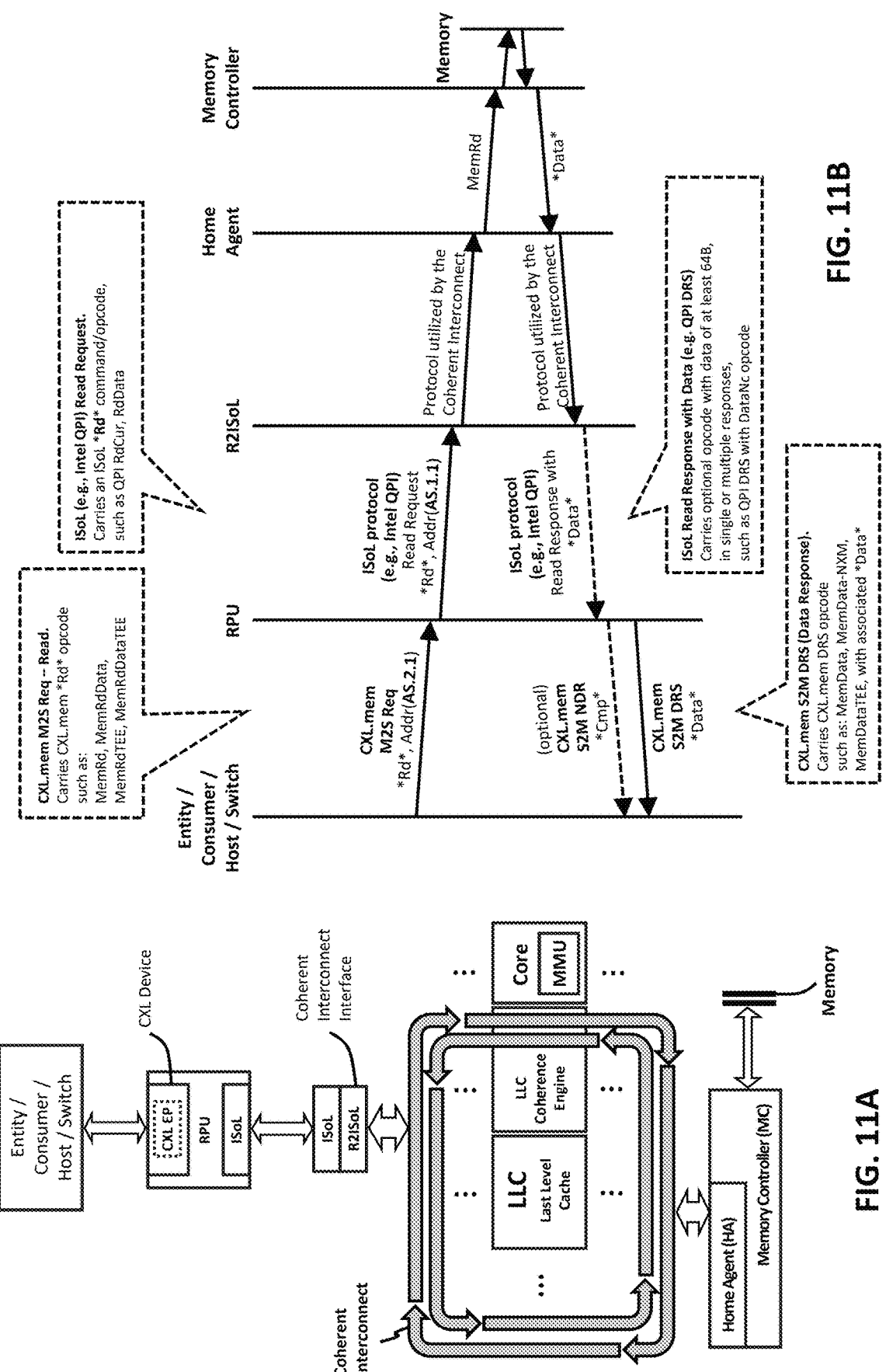
FIG. 11A illustrates one embodiment of a system comprising a processor comprising a CXL EP coupled to the processor's coherent interconnect via an ISoL interface.
FIG. 11B illustrates one embodiment of a TFD demonstrating a translating a CXL.mem M2S Read Request to an ISoL protocol request.

FIG. 11A illustrates one embodiment of a system comprising a processor, including a coherent interconnect, capable of enabling an external entity to access memory resources mapped to the coherent interconnect's address space. Optionally, the processor is an MxPU derived from an established processor design that may include an RPU that may include, or be coupled to, a CXL device, such as a GFD, a CXL Type-3 device, or a CXL Type-2 device. The CXL device may comprise a CXL EP, wherein the RPU may be implemented as a chiplet, a logic on the processor die, a discrete component coupled to the processor, or other implementations. The processor may further include processing cores with MMUs, LLC, and LLC Coherence Engine (such as CBox) coupled via an on-chip coherent interconnect that may utilize a ring topology as one example. The processor may further include a Home Agent (HA) and Memory Controller (MC) coupled to memory, such as DRAM, optionally via memory channels. The RPU may be coupled to the coherent interconnect via an ISoL interface, such as Intel QPI, Intel UPI, or CHI C2C, and via a coherent interconnect interface, such as Ring-to-ISoL (R2ISoL) logic. The CXL device, which may reside within the RPU, may communicate with an entity, such as a host, according to a protocol based on CXL, such as CXL.mem, wherein the RPU performs host-to-host address translations between the host's HPA space and the processor's HPA space to enable the host to access the memory and other resources accessible via the coherent interconnect. Alternatively, the figure may illustrate one embodiment of a two-socket (2S) or a two-processor (2P) system that may function as a memory switch or a memory pool, wherein the RPU may be embedded in the first processor coupled to the entity, and further coupled to a second processor via an ISoL interface, whereas the RPU enables the entity to access memory of the second processor, via the first processor and the ISoL interface.

FIG. 11B illustrates one embodiment of a TFD demonstrating a CXL.mem M2S Read Request received from an entity, such as a host or a switch. The request carries a CXL.mem read opcode such as MemRd, MemRdData, MemRdTEE, or MemRdDataTEE, along with a physical address (AS.2.1) from a second host physical address space utilized by the entity. The RPU translates the physical address (AS.2.1) to a physical address (AS.1.1) from a first HPA space utilized by the processor and/or the coherent interconnect. The RPU may also perform protocol translations, converting the CXL.mem request to an ISoL protocol request (such as Intel QPI read request) including a read command/opcode such as QPI RdCur or RdData. The translated request is sent via the coherent interconnect to fetch the requested data, which may be retrieved from the LLC or from DRAM. The requested data returns to the RPU via the coherent interconnect and the ISoL interface using the ISoL protocol. The RPU then provides responses to the requesting entity including: CXL.mem S2M DRS carrying CXL.mem DRS opcodes such as MemData, MemData-NXM, or MemDataTEE with associated data, and optionally CXL.mem S2M NDR with a completion status. The ISoL read response may carry optional opcodes with data of at least 64B, in single or multiple responses, such as QPI DRS with DataNc opcode.

Figures 12A, 12B:
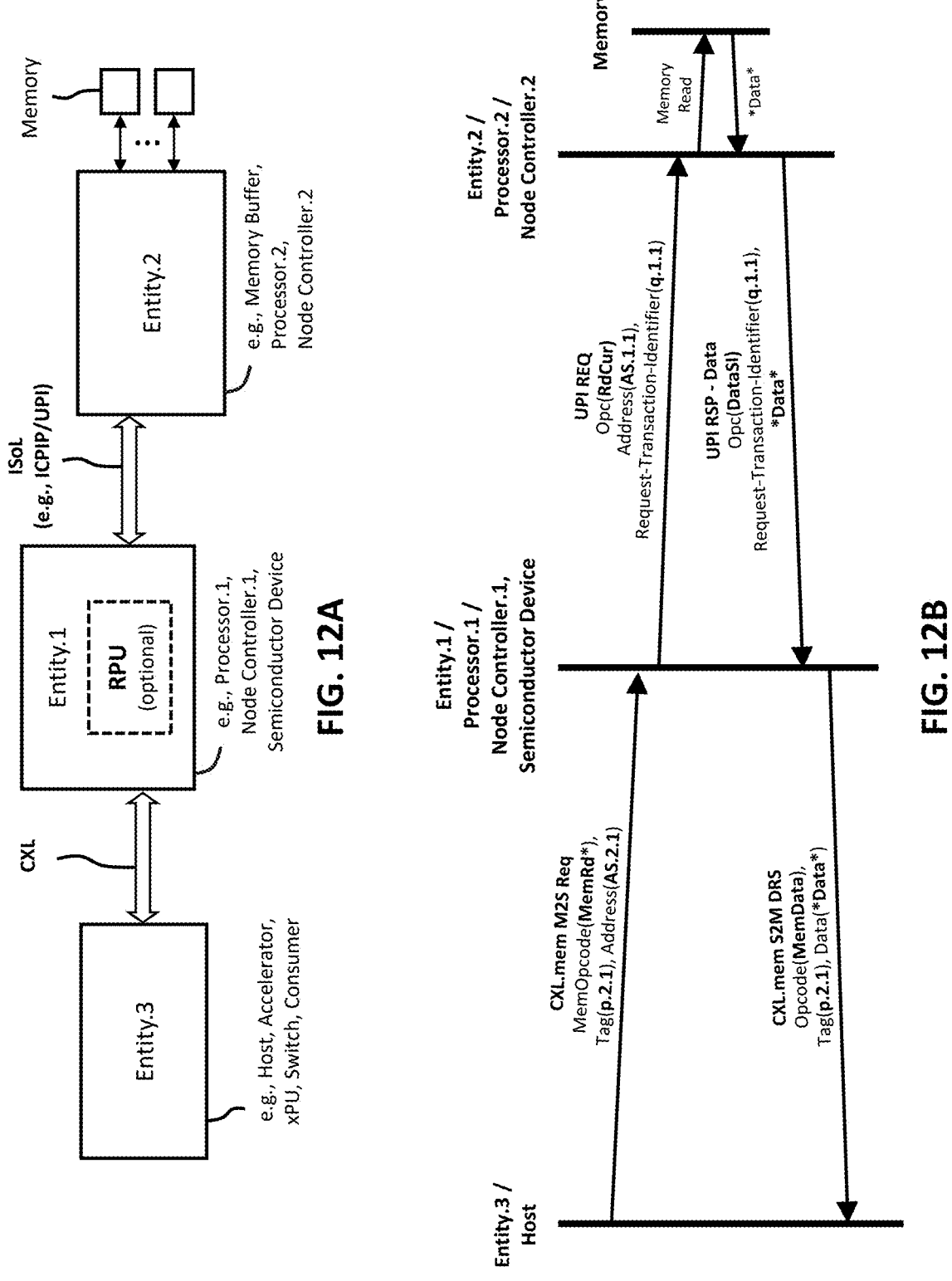
FIG. 12A illustrates one embodiment of a system comprising an entity, such as a processor or a node controller, configured to translate between a CXL-based protocol and an ISoL protocol, such as ARM CHI C2C, a protocol utilizing an NVIDIA NVLink-C2C interconnect, or an Intel Coherent Processor Interconnect Protocol (ICPIP), such as Intel UPI, or Intel UXI.
FIG. 12B illustrates one embodiment of a TFD demonstrating translations between CXL.mem and Intel UPI.

FIG. 12A illustrates one embodiment of a system comprising a first entity (Entity.1), such as a first processor (Processor.1), a first node controller (Node Controller.1), or a semiconductor device, that may include an RPU. The first entity may be coupled to a third entity (Entity.3), which may be a host, an accelerator, an xPU, a switch (e.g., a CXL switch), or a resource consumer, wherein the first entity may communicate with the third entity according to a CXL-based protocol, such as at least one of CXL.mem, CXL.io, or CXL.cache. The first entity may be further coupled to a second entity (Entity.2), which may be a second processor (Processor.2), a memory buffer, or a second node controller (Node Controller.2), wherein the second entity may be coupled to a memory, and wherein the first entity may communicate with the second entity according to an ISoL protocol, such as ARM CHI C2C, a protocol utilizing an NVIDIA NVLink-C2C interconnect, or an Intel Coherent Processor Interconnect Protocol (ICPIP), such as Intel UPI, or Intel UXI. The first node controller (Node Controller.1)

and the second node controller (Node Controller.2) may each include an ICPIP node controller, such as a UPI node controller (UNC), or an external node controller (e.g., XNC). The first entity, optionally via the RPU, may translate between the CXL-based protocol, such as CXL.mem, and the ISoL protocol, such as ICPIP (e.g., Intel UPI or UXI), enabling the third entity to access resources coupled to the first entity, such as the memory that may be coupled to the second entity.

In some embodiments, the CXL-based protocol, such as CXL.mem, may be associated with a first address space, such as a first Host Physical Address (HPA) space, and the ISoL protocol, such as ICPIP, may be associated with a second address space, such as a System Physical Address (SPA) space or a second Host Physical Address (HPA) space; wherein the first entity, optionally via the RPU, may perform address translations between addresses within the first and second address spaces, respectively, such as between addresses within the first HPA space and addresses within the SPA space or within the second HPA space. In other embodiments, the CXL-based protocol, such as CXL.mem, and the ISoL protocol, such as ICPIP, may be associated with the same physical address space, such as with the same HPA space, the same SPA space, or with a global address space, a partitioned global address space (PGAS), a pod address space, a virtual pod address space, or a fabric address space; wherein the first entity, optionally via the RPU, may perform address translations between addresses within the same address spaces.

The first entity (Entity.1), optionally via the RPU, may perform further translations, such as opcode, command, or TLP translations, e.g., translating between commands or opcodes in request messages of the CXL-based protocol (e.g. CXL.mem M2S Req MemRd) to opcodes in request messages of the ISoL Protocol (e.g., Intel UPI RdCur). The first entity, optionally via the RPU, may further perform other translations, such as field translations between messages of the CXL-based protocol and protocol data units (PDUs) of the ISoL Protocol, such as tag translations, traffic class (TC) translations, or cross-field translations, wherein the first entity, optionally via the RPU, may maintain tracking between tags of the CXL-based protocol domain and tags of the ISoL protocol domain, such as in order to associate responses with their corresponding requests.

FIG. 12B illustrates one embodiment of a TFD demonstrating translations between a CXL-based protocol, such as CXL.mem, an ISoL protocol, such as ICPIP (e.g., Intel UPI or UXI). The translations may be performed by a first entity (Entity.1), such as a first processor (Processor.1), a first node controller (Node Controller.1), or a semiconductor device, optionally via an RPU. The CXL-based protocol may be utilized for communicating with a third entity (Entity.3), such as a host, and the ISoL protocol may be utilized for communicating with a second entity (Entity.2), such as a second processor (Processor.2), or a second node controller (Node Controller.2).

The second entity may be coupled to a memory, such as DRAM, which may be mapped to a physical address space (PAS) utilized by the first entity. The third entity may initiate a CXL transaction that may include a CXL.mem M2S Req comprising MemOpcode(MemRd*), Tag(p.2.1), and Address(AS.2.1). The first entity, optionally via the RPU, may translate the CXL transaction to an ISoL (e.g., ICPIP) transaction, such as an Intel UPI transaction that may include a UPI request (REQ message class) comprising Opc(RdCur), Address(AS.1.1), and Request-Transaction-Identifier(q.1.1), wherein the Request-Transaction-Identifier (e.g., RTID) may denote a tag, a transaction tag, a transaction identifier, or another field or set of fields carried in UPI transactions which may serve for associating responses with their corresponding requests.

The first entity (Entity.1) may send the UPI request (REQ) to the second entity. Upon receiving a response from the second entity, that may include a UPI data response ("RSP-Data" message class, which may also be denoted by "RSP4-Data") comprising Opc(DataSI), Request-Transaction-Identifier(q.1.1), and *Data*, the first entity, optionally via the RPU, may translate the UPI response (RSP-Data) to a CXL.mem S2M DRS comprising Opcode(MemData), Tag (p.2.1), and Data(*Data*).

In some embodiments, the requested data may be provided by a processor cache instead of by the memory, such as where the requested data may be provided by an LLC that may be included in the first entity, or by an LLC that may be included in the second entity. In other embodiments, the first entity, optionally via the RPU, may translate the CXL transaction to an ICPIP transaction, such as an Intel UPI transaction, that may include message classes such as REQ, SNP, WB, RSP (such as RSP2 or RSP4), NCB, or NCS, that may include commands, operations, or opcodes (e.g., Opc), such as RdCode, RdCur, RdData, RdInv, RdInvOwn, Snp-Code, SnpCur, SnpData, SnpInv, WbMtoS, WcWr, WcWrPtl, DataE, DataSI, or DataM_CmpO. The first entity, optionally via the RPU, may perform further translations, such as opcode, command, or TLP translations, e.g., translating between commands in request messages of the CXL-based protocol (e.g. CXL.mem MemRdTEE) to opcodes in request messages of the ISoL Protocol (e.g., Intel UPI RdData). The first entity, optionally via the RPU, may further perform other translations, such as field translations between messages of the CXL-based protocol and protocol data units (PDUs) of the ISoL Protocol (e.g., Intel UPI), such as tag translations, traffic class (TC) translations, or cross-field translations, wherein the first entity, optionally via the RPU, may maintain tracking between tags in the CXL-based protocol domain and tags in the ISoL protocol domain, such as in order to associate responses with their corresponding requests, within the same protocol domain and/or between different protocol domains.

Figures 13A, 13B:
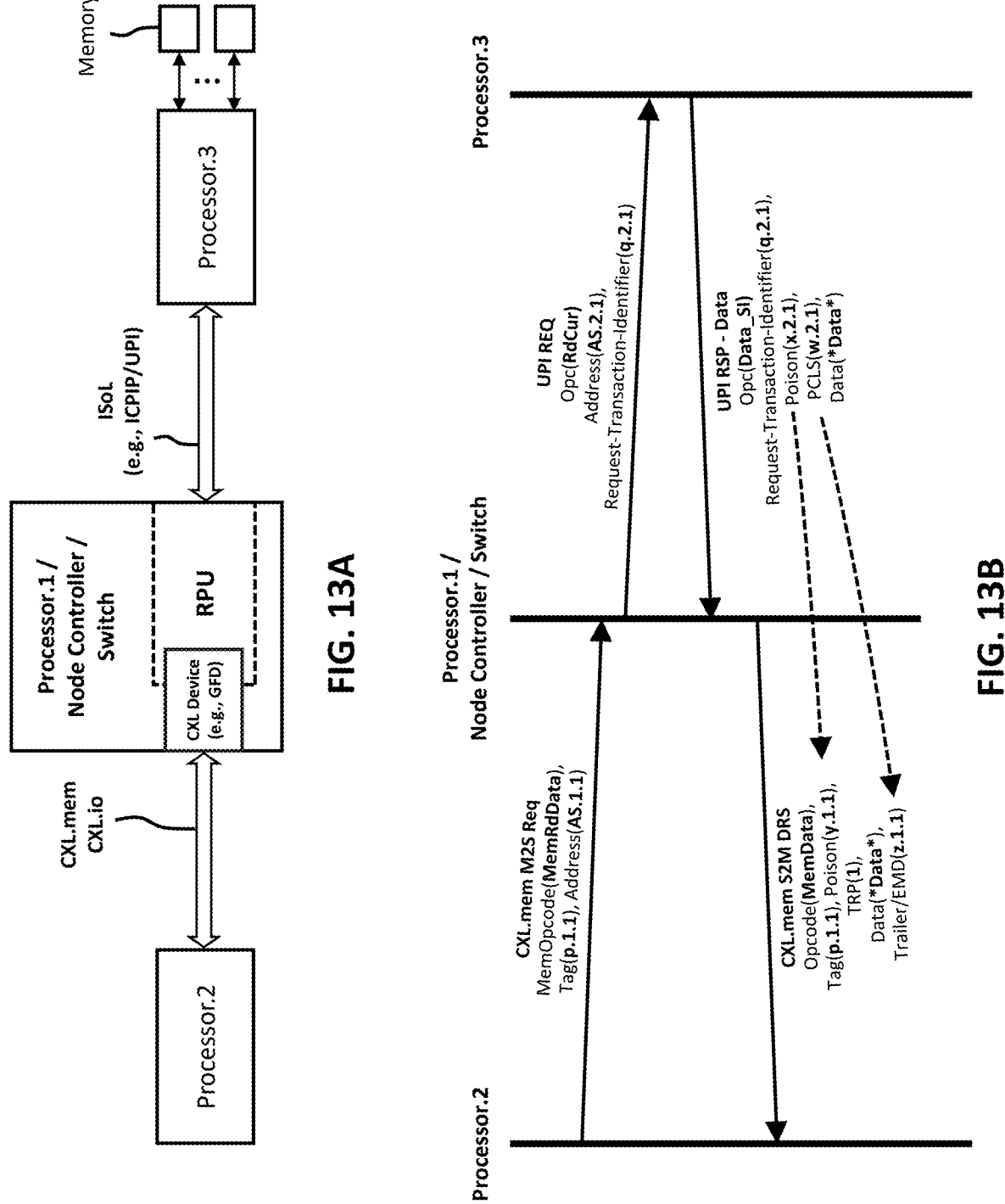
FIG. 13A illustrates one embodiment of a system comprising a processor, a node controller, or a switch, which includes a CXL device, configured to translate between CXL-based protocol and an ISoL protocol.
FIG. 13B illustrates one embodiment of a TFD demonstrating translations between CXL.mem and UPI, including translating error and data corruption indications, such as poison.

FIG. 13A illustrates one embodiment of a system comprising a first processor (Processor.1), a node controller, or a switch, that may include an RPU and a CXL device, such as a Global Fabric-Attached Memory (G-FAM) Device (GFD), wherein the CXL device may be included in or coupled to the RPU. The first processor may be coupled to a second processor (Processor.2), wherein the first processor may communicate with the second processor, via the CXL device, according to a CXL-based protocol, such as at least one of CXL.mem, CXL.io, or CXL.cache. The first processor may be further coupled to a third processor (Processor.3) that may be coupled to memory, and wherein the first processor may communicate with the third processor according to an ISoL protocol, such as NVIDIA NVLink-C2C, ARM CHI C2C, or Intel Coherent Processor Interconnect Protocol (ICPIP), such as Intel UPI, or Intel UXI. The first processor, optionally via the RPU, may translate between the CXL-based protocol, such as CXL.mem or CXL.io, and the ISoL protocol, such as ICPIP (e.g., Intel UPI or UXI), enabling the second processor to access, via the CXL device, resources coupled to the third processor, such as the memory.

In some embodiments, the CXL-based protocol, may be associated with a first address space, such as a first Host Physical Address (HPA) space, and the ISoL protocol, such as ICPIP, may be associated with a second address space, such as a System Physical Address (SPA) space or a second Host Physical Address (HPA) space; wherein the first processor, optionally via the RPU, may perform address translations between addresses within the first and second address spaces, respectively, such as between addresses within the first HPA space and addresses within the SPA space or within the second HPA space. In other embodiments, the CXL-based protocol and the ISoL protocol may be associated with the same physical address space, such as with the same HPA space; wherein the first processor, optionally via the RPU, may perform address translations between addresses within the same address spaces. The first processor, optionally via the RPU, may perform further translations, such as opcode translations, command translations, TLP translations, or field translations between messages of the CXL-based protocol and protocol data units (PDUs) of the ISoL Protocol, such as tag translations, traffic class (TC) translations, or cross-field translations, wherein the first processor, optionally via the RPU, may maintain tracking between tags of the CXL-based protocol domain and tags of the ISoL protocol domain, such as in order to associate responses with their corresponding requests.

FIG. 13B illustrates one embodiment of a TFD demonstrating translations between CXL.mem and UPI. The illustrated translations are performed by a first processor (Processor.1), a node controller, or a switch, optionally via an RPU, between a CXL-based protocol, such as CXL.io and/or CXL.mem, utilized for communicating with a second processor (Processor.2), and an ISoL protocol, such as ICPIP (e.g., Intel UPI or UXI), utilized for communicating with a third processor (Processor.3) that may be coupled to memory, such as DRAM, which may be mapped to a physical address space (PAS) utilized by the first processor. The first processor may utilize translations, such as protocol translations, to convey indications, metadata, and other information, which may be related to the transaction, such as error and data corruption indications, such as poison, status indications, or directory information such as PCLS (e.g., Prior Cache Line State), which may be used to gather performance statistics. The second processor may initiate a CXL transaction that may include a CXL.mem M2S Req comprising MemOpcode(MemRdData), Tag(p.1.1), and Address(AS.1.1). The first processor, optionally via the RPU, may translate the CXL transaction to an ISoL (e.g., ICPIP) transaction, such as an Intel UPI transaction that may include UPI REQ comprising Opc(RdCur), Address (AS.2.1), and Request-Transaction-Identifier RTID(q.2.1), wherein the first processor may send the UPI REQ to the third processor.

Upon receiving a response from the third processor, that may include a UPI RSP-Data comprising Opc(Data_SI), Request-Transaction-Identifier (RTID) (q.2.1), Poison (x.2.1), PCLS(w.2.1) and Data(*Data*), the first processor, optionally via the RPU, may translate the UPI RSP-Data to a CXL.mem S2M DRS comprising Opcode(MemData), Tag(p.1.1), Poison(y.1.1), TRP(1), Data(*Data*), and Trailer/EMD(z.1.1), whereas TRP(1) indicates Trailer Present, i.e., indicating that a trailer is included in the message, wherein the first processor, optionally via the RPU, may utilize the CXL.mem S2M DRS trailer for conveying status information such as the PCLS, optionally as EMD (Extended Metadata) information. Other revisions of the CXL specifications may utilize a Byte-Enables Present (BEP) field instead of the Trailer Present (TRP) field. The first processor, optionally via the RPU, may perform further translations, such as translations of error indications, such as poison, from the ISoL (e.g., ICPIP/UPI) protocol domain, to the CXL-based protocol domain, wherein poison (e.g., a bit in the protocol message or PDU) may indicate that the data contains an error, and may be logged, ignored, or silently discarded, possibly causing Silent Data Corruption (SDC). The first processor, optionally via the RPU, may further perform other translations, such as field translations between messages of the CXL-based protocol and protocol data units (PDUs) of the ISoL Protocol (e.g., Intel UPI), such as tag translations, traffic class (TC) translations, or cross-field translations.

Figures 14A, 14B:
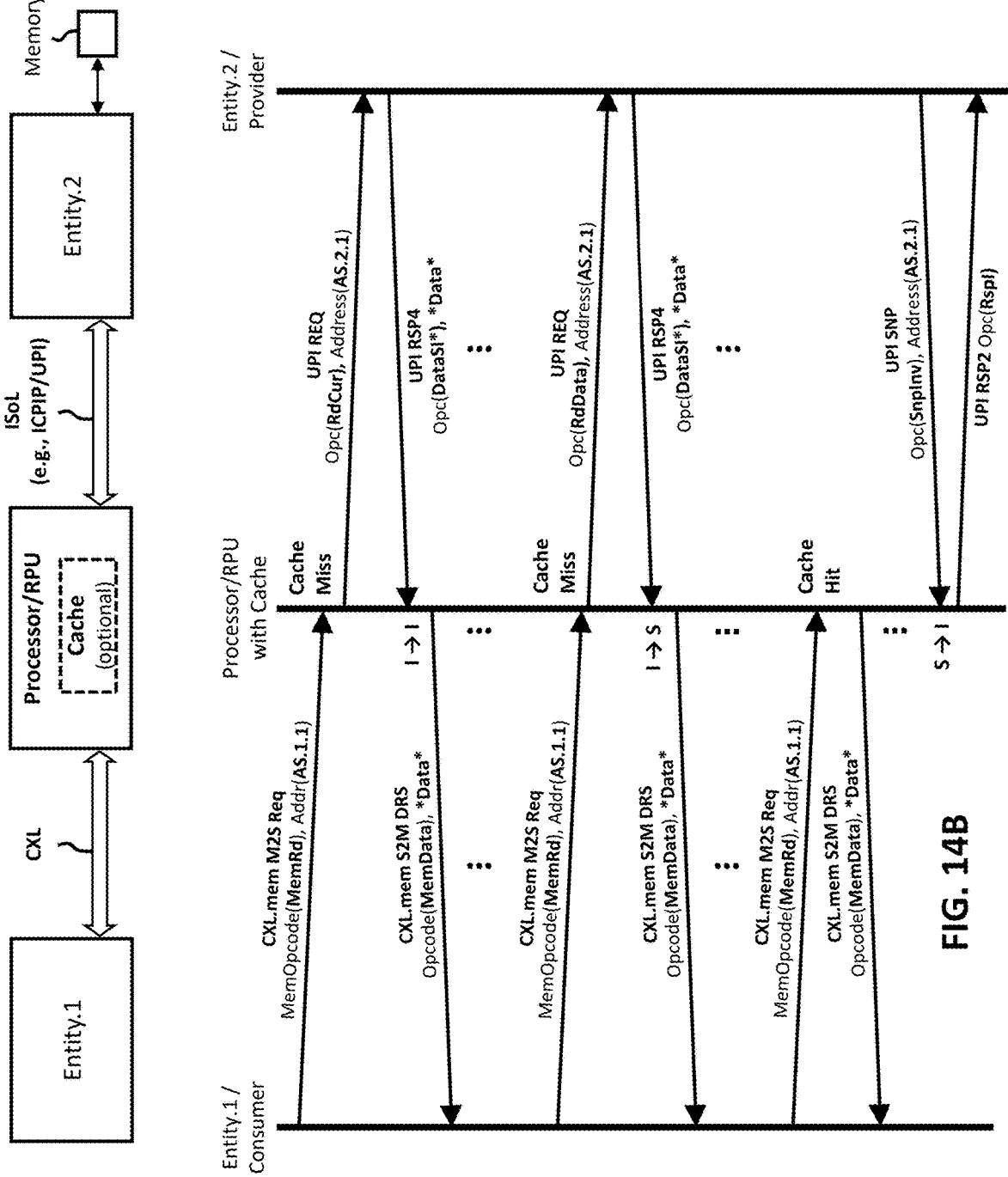
FIG. 14A illustrates one embodiment of a system comprising a processor or an RPU, configured to translate between a CXL-based protocol and an ISoL protocol.
FIG. 14B illustrates one embodiment of a TFD demonstrating translations between CXL.mem messages and ISoL messages.

FIG. 14A illustrates one embodiment of a system comprising a processor or an RPU, denoted as Processor/RPU, which may include a cache. The Processor/RPU may be coupled to a first entity (Entity.1), which may be a host, a second processor, a CXL Switch, or a resource consumer, wherein the Processor/RPU may communicate with the first entity according to a CXL-based protocol, such as at least one of CXL.mem, CXL.io, or CXL.cache. The Processor/RPU may be further coupled to a second entity (Entity.2), which may be a third processor, a node controller, or a memory buffer, wherein the second entity may be coupled to a memory, and wherein the Processor/RPU may communicate with the second entity according to an ISoL protocol, such as NVIDIA NVLink-C2C, ARM CHI C2C, or Intel Coherent Processor Interconnect Protocol (ICPIP), such as Intel UPI, or Intel UXI. The Processor/RPU may translate between the CXL-based protocol, such as at least one of CXL.io, CXL.mem, or CXL.cache, and the ISoL protocol, such as ICPIP (e.g., Intel UPI or UXI), enabling the first entity to access resources coupled to the second entity, such as the memory. The Processor/RPU may cache data retrieved from the second entity and may respond to CXL requests received from the first entity with data from the cache, instead of issuing read requests to the second entity. Additionally or alternatively, the Processor/RPU may prefetch data from the second entity into the cache. The Processor/RPU may perform further translations between the CXL-based protocol domain and the ISoL protocol domain, such as protocol translations, opcode translations, command translations, TLP translations, and field translations between messages of the CXL-based protocol and protocol data units (PDUs) of the ISoL Protocol, such as tag translations, traffic class (TC) translations, or cross-field translations, wherein the Processor/RPU may maintain tracking between tags of the CXL-based protocol domain and tags of the ISoL protocol domain, such as in order to associate responses with their corresponding requests.

FIG. 14B illustrates one embodiment of a TFD demonstrating translations performed by a processor or an RPU, denoted as Processor/RPU, that may include a cache, between a CXL-based protocol, such as at least one of CXL.io, CXL.mem, or CXL.cache, utilized for communicating with a first entity (Entity.1), and an ISoL protocol, such as ICPIP (e.g., Intel UPI or Intel UXI), utilized for communicating with a second entity (Entity.2) that may be coupled to memory, such as DRAM, wherein the memory may be mapped to a physical address space (PAS) utilized by the Processor/RPU. The Processor/RPU may perform translations between the CXL-based protocol domain and the ISoL protocol domain, such as protocol translations between the CXL-based protocol and the ISoL protocol, such as translations between CXL.mem and Intel UPI/UXI.

The TFD illustrates three exemplary transactions between the first entity and the Processor/RPU. The first exemplary transaction may include CXL.mem M2S Req comprising MemOpcode(MemRd) and Address(AS.1.1), wherein the Processor/RPU may translate the request address (AS.1.1) to a translated address (AS.2.1) and may look up the data associated with the address and/or with the translated address in the cache before issuing a UPI request to the second entity. The lookup of the data may result in a cache miss, wherein the Processor/RPU may translate the CXL.mem M2S Req to UPI REQ comprising Opc(RdCur) and Address(AS.2.1), wherein the Processor/RPU may send the UPI REQ to the second entity. Upon receiving a response from the second entity, which may include UPI RSP4 comprising Opc(DataSI*) and *Data*, the Processor/RPU may translate the UPI RSP4 to a CXL.mem S2M DRS comprising Opcode(MemData) and *Data*, without storing the data retrieved from the second entity in the cache, denoted in the drawing by "I-to-I", indicating that the cache state associated with the cacheline address remains invalid.

The second exemplary transaction may include CXL.mem M2S Req comprising MemOpcode(MemRd) and Address(AS.1.1), referencing the same address as the first exemplary transaction, wherein the Processor/RPU may translate the request address (AS.1.1) to a translated address (AS.2.1) and may look up the data associated with the address and/or with the translated address in the cache before issuing a UPI request to the second entity. The lookup of the data may result in a cache miss, wherein the Processor/RPU may translate the CXL.mem M2S Req to UPI REQ comprising Opc(RdData) and Address(AS.2.1), wherein the Processor/RPU may send the UPI REQ to the second entity. Upon receiving a response from the second entity, which may include UPI RSP4 comprising Opc(DataSI*) and *Data*, the Processor/RPU may translate the UPI RSP4 to a CXL.mem S2M DRS comprising Opcode(MemData) and *Data*, and may store the data retrieved from the second entity in the cache, denoted in the drawing by "I-to-S", indicating that the cache state associated with the cacheline address transitioned from invalid to shared, possibly indicating that the cacheline data is shared between the Processor/RPU and the second entity.

The third exemplary transaction may include CXL.mem M2S Req comprising MemOpcode(MemRd) and Address (AS.1.1), referencing the same address as the first and the second transaction, wherein the Processor/RPU may translate the request address (AS.1.1) to a translated address (AS.2.1) and may look up the data associated with the address and/or with the translated address in the cache before issuing a UPI request to the second entity. The lookup of the data may result in a cache hit, wherein the Processor/RPU may respond to the request from the first entity with CXL.mem S2M DRS comprising Opcode(MemData) and *Data* from the cache, without sending a translated UPI REQ to the second entity. Following the third transaction, the second entity may invalidate the cacheline address (AS.2.1) associated with the UPI domain, which may be stored in the Processor/RPU cache. The second entity may send to the Processor/RPU a UPI SNP comprising Opc (SnpInv) and Address(AS.2.1), wherein the Processor/RPU may respond to the UPI SNP by sending to the second entity a UPI RSP (e.g., UPI RSP2) comprising Opc(RspI), indicating that the Processor/RPU invalidated the associated cacheline address from the cache, denoted in the drawing by "S-to-I", indicating that the cache state associated with the cacheline address transitioned from shared to invalid.

The Processor/RPU may perform further translations, such as address translations, opcode translations, command translations, TLP translations, or field translations between messages of the CXL-based protocol and protocol data units (PDUs) of the ISoL Protocol, such as tag translations, traffic class (TC) translations, or cross-field translations, wherein the Processor/RPU may maintain tracking between tags of the CXL-based protocol domain and tags of the ISoL protocol domain, such as in order to associate responses with their corresponding requests. In some embodiments, the Processor/RPU may be configured to perform cache lookups before performing translations related to the CXL request received from the first entity, or may be configured to perform cache lookups after performing some or all of the translations related to the CXL request received from the first entity. In still some embodiments, the Processor/RPU may be further configured to organize the cache and perform cache lookups according to addresses associated with the CXL-based protocol domain (e.g., CXL.mem domain). Additionally or alternatively, the Processor/RPU may be further configured to organize the cache and perform cache lookups according to translated addresses associated with the ISoL protocol domain (e.g., UPI domain).

Figure 15B:
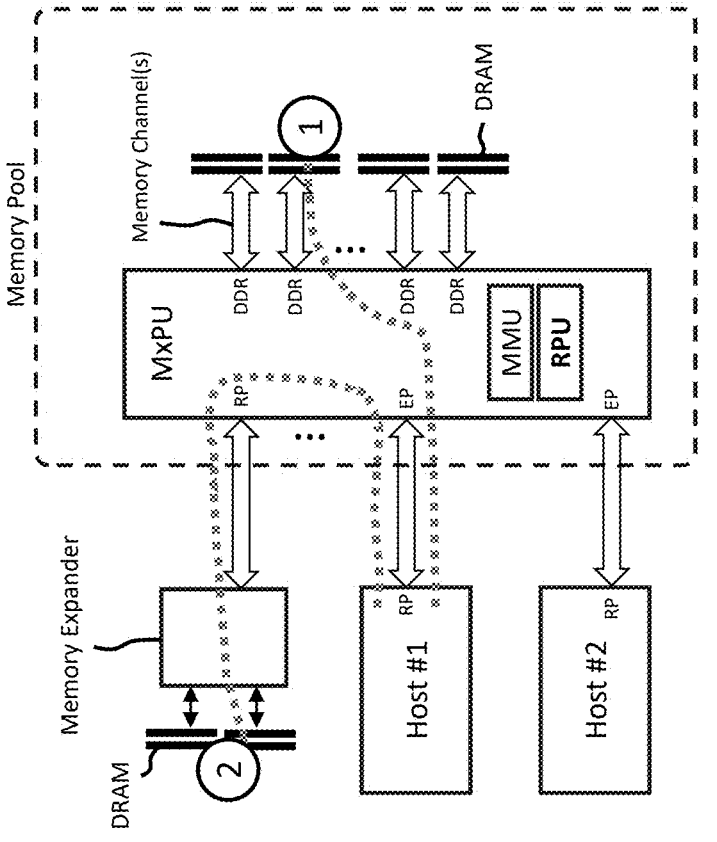
FIG. 15B illustrates one embodiment of a system comprising a memory pool coupled to hosts and to a memory expander.
Figure 15A:
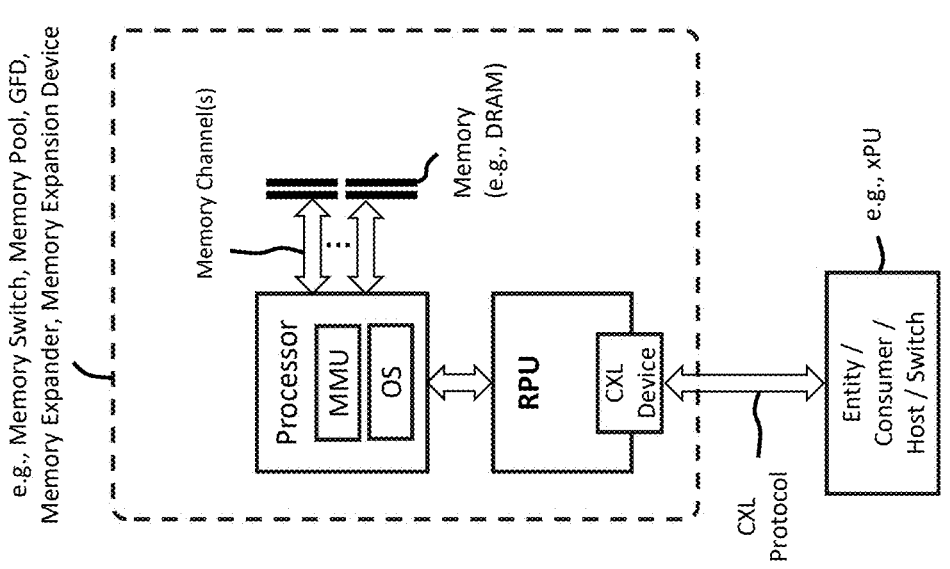
FIG. 15A illustrates one embodiment of a system comprising a memory switch, a memory pool, or a Global Fabric Attached Memory Device.

FIG. 15A illustrates one embodiment of a system comprising a memory switch, a memory pool, a Global Fabric Attached Memory (GFAM) Device (GFD), a memory expander (ME), or a memory expansion device, which comprise a processor, memory (such as DRAM), and an RPU coupled to an entity such as a host. The processor may include processing cores and cache hierarchies that utilize a first HPA space for accessing system resources. The memory may be coupled to the processor via memory channels, such as DDR4 or DDR5 channels, providing high-bandwidth memory access. The RPU may include, or be coupled to, a CXL device (such as a CXL EP), and may be integrated within the same semiconductor device as the processor or implemented as a separate component. The RPU may perform host-to-host physical address translations between the entity's HPA space and the processor's HPA space. The entity may be coupled to the memory pool via the CXL device that supports one or more CXL protocols, enabling the entity to access the memory based on the address translations performed by the RPU.

FIG. 15B illustrates one embodiment of a system comprising a memory pool coupled to hosts and to a memory expander, wherein the memory pool is based on a processor (such as an MxPU) comprising an RPU and CXL devices. The memory pool may include memory tiers, such as a first memory tier (denoted as "1") comprising DRAM coupled via memory channels to the MxPU, and a second memory tier (denoted as "2") comprising DRAM associated with the memory expander. The MxPU may include a CXL RP for coupling to the memory expander, enabling the memory pool to extend its capacity beyond the directly attached DRAM. Multiple hosts may be coupled to the memory pool via separate CXL devices (such as CXL EPs) within the MxPU, wherein the hosts utilize their respective HPA spaces. The RPU within the MxPU may perform different host-to-host physical address translations for the different coupled hosts, enabling concurrent access to both memory tiers while maintaining isolation between different hosts' physical address spaces.

Figures 16A, 16B:
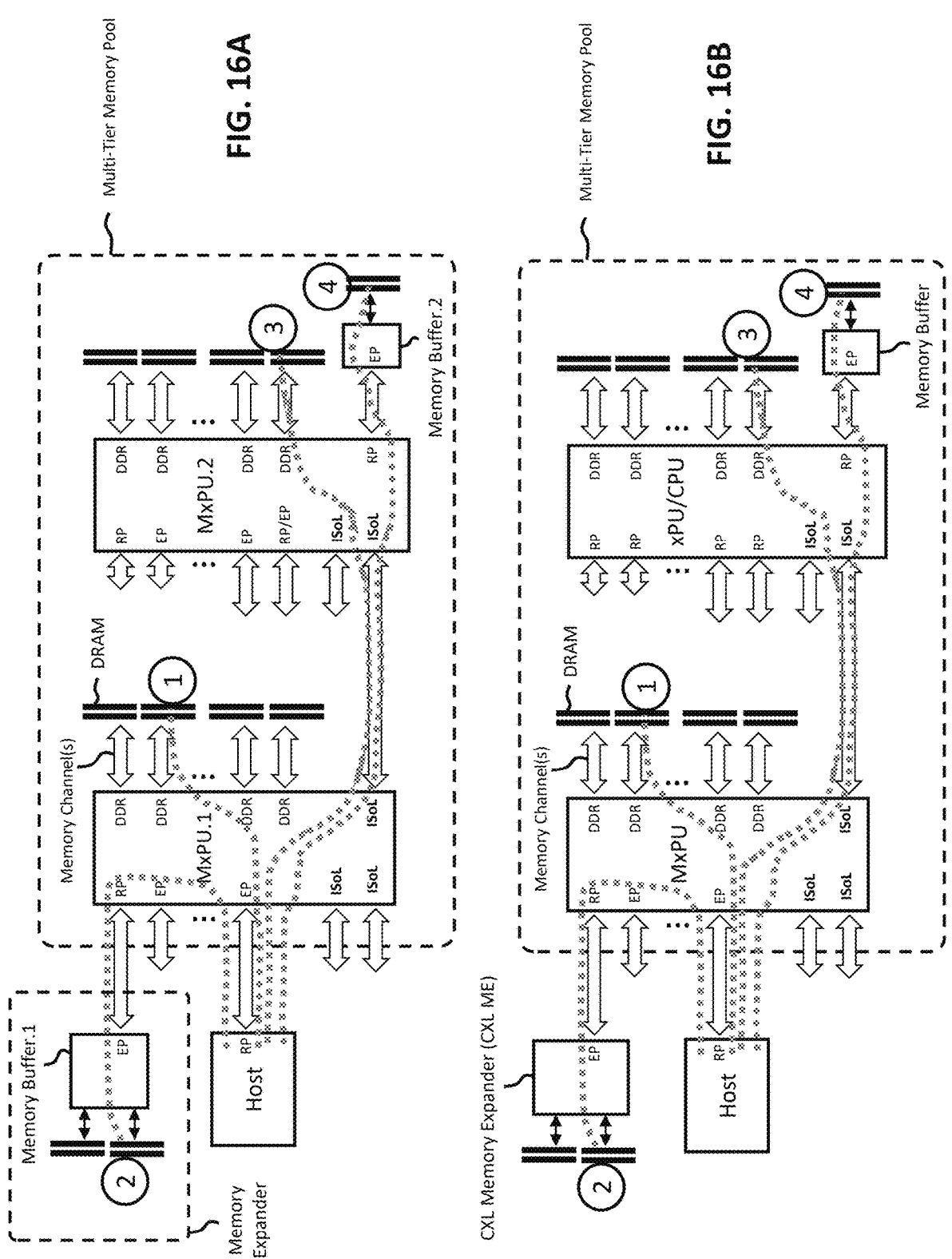
FIG. 16A illustrates one embodiment of a system comprising a memory pool comprising two or more MxPUs.
FIG. 16B illustrates one embodiment of a system comprising a memory pool comprising at least one MxPU and at least one xPU or CPU.

FIG. 16A illustrates one embodiment of a system comprising a memory pool comprising two or more MxPUs. The memory pool may utilize a chipset-based architecture wherein a collection of electronic components such as MxPUs, xPUs, CPUs, and memory buffers, works together on a platform for realizing a memory pool functionality. The memory pool may include memory tiers, such as a first memory tier (denoted as "1") comprising DRAM coupled via memory channels to the first MxPU, a second memory tier (denoted as "2") comprising DRAM associated with the memory expander coupled to the first MxPU, a third memory tier (denoted as "3") comprising DRAM coupled via memory channels to the second MxPU, and a fourth memory tier (denoted as "4") coupled to the memory buffer that is coupled to the second MxPU. The MxPUs may be interconnected via an ISoL, such as UPI, UXI, Infinity Fabric, or CHI C2C, enabling coherent communication between the MxPUs. Each MxPU may include its own RPU for performing host-to-host physical address translations and CXL devices (such as CXL EPs) for coupling to external hosts, allowing at least some of the external hosts to access the distributed memory resources across memory tiers. The memory buffers may provide additional memory capacity and may include buffer control logic for managing data flow between different memory tiers.

FIG. 16B illustrates one embodiment of a system comprising a memory pool comprising at least one MxPU and at least one xPU or CPU. The memory pool may utilize a chipset-based architecture. The memory pool may include memory tiers, such as a first memory tier (denoted as "1") comprising DRAM coupled to the MxPU, a second memory tier (denoted as "2") comprising DRAM associated with the memory expander coupled to the MxPU, a third memory tier (denoted as "3") comprising DRAM coupled to the xPU/ CPU, and a fourth memory tier (denoted as "4") coupled to the memory buffer. The MxPU may include CXL devices (such as CXL EPs) and serve as the primary interface for external hosts to access the memory pool via protocols based on CXL, while the xPU/CPU may provide additional processing capabilities and memory resources. The RPU within the MxPU may coordinate address translations to enable external hosts to access memory resources across the tiers, including memory attached to the xPU/CPU. This embodiment may optimize cost and performance by combining specialized MxPUs for memory pooling with standard xPUs/CPUs for processing tasks and additional memory capacity.

Figure 17B:
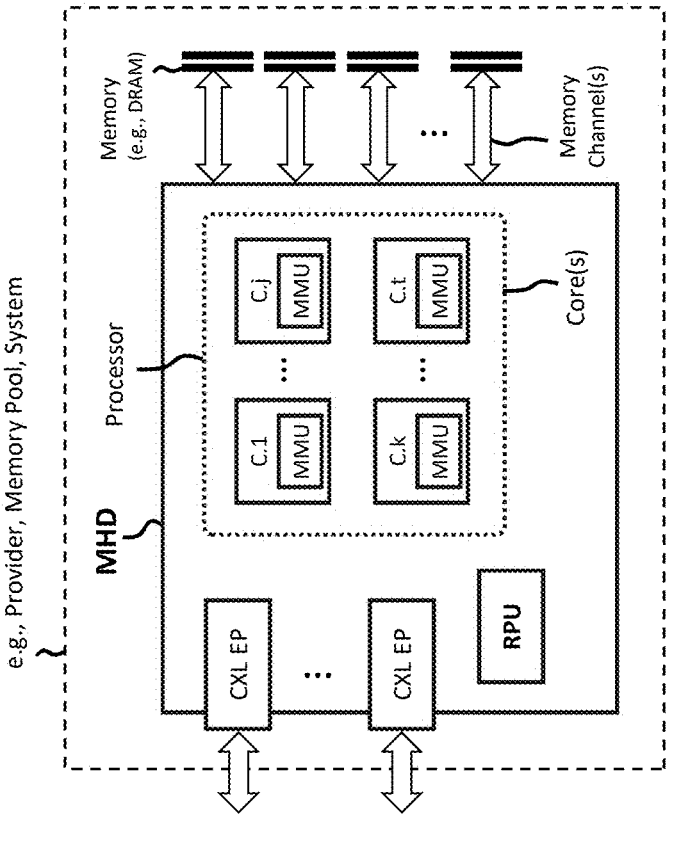
FIG. 17B illustrates one embodiment of a system comprising a memory pool comprising a CXL Multi Headed Device (MHD) comprising a processor coupled to DRAM.
Figure 17A:
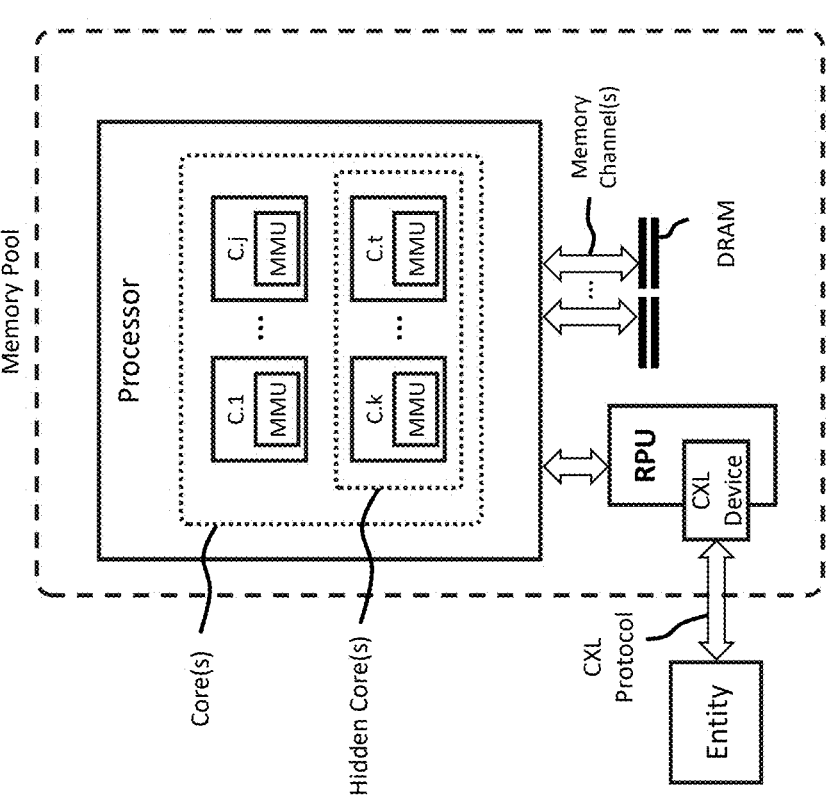
FIG. 17A illustrates one embodiment of a system comprising a memory pool comprising a processor, DRAM, and an RPU performing host-to-host physical address translations.

FIG. 17A illustrates one embodiment of a system comprising a memory pool comprising a processor, DRAM, and an RPU. The RPU may include or be coupled to a CXL device. The RPU performs host-to-host physical address translations that enable an entity, external to the memory pool, to access the DRAM coupled to the processor. The processor may include multiple cores, wherein some of the cores may be hidden from the user and may serve for executing infrastructure tasks related to operations, administration and management (OAM) of the memory pool.

FIG. 17B illustrates one embodiment of a system comprising a memory pool comprising a CXL Multi Headed Device (MHD), such as Multi-Headed Single Logical Device (MH-SLD) or Multi-Headed Multi-Logical Device (MH-MLD), comprising a processor coupled to DRAM. The processor includes one or more processing cores wherein each processing core may include an MMU. The MHD further comprises CXL endpoints, wherein at least some of the endpoints may be associated with logical devices such as SLDs or MLDs, and an RPU configured to perform host-to-host physical address translations that enable entities external to the MHD to access the DRAM. Optionally, some of the illustrated blocks may be omitted, combined, or implemented as discrete chiplets, IP blocks, or firmware-assisted logic. The number and type of cores is implementation-dependent and may include general-purpose CPUs, vector engines, AI accelerators, or heterogeneous combinations thereof. In alternative or additional embodiments, one or more cores execute processing-in-memory (PIM) operations, for example, reductions, searches, or machine-learning kernels, directly against data resident in the DRAM, thereby reducing link bandwidth consumption. By virtue of the address-translation logic in the RPU, the MHD can expose the DRAM as a shared or partitionable pool that is concurrently accessible by entities via the CXL endpoints, which enables memory pooling, memory sharing, multi-tenant isolation, and/or dynamic capacity provisioning within a CXL-based system.

Figure 18:
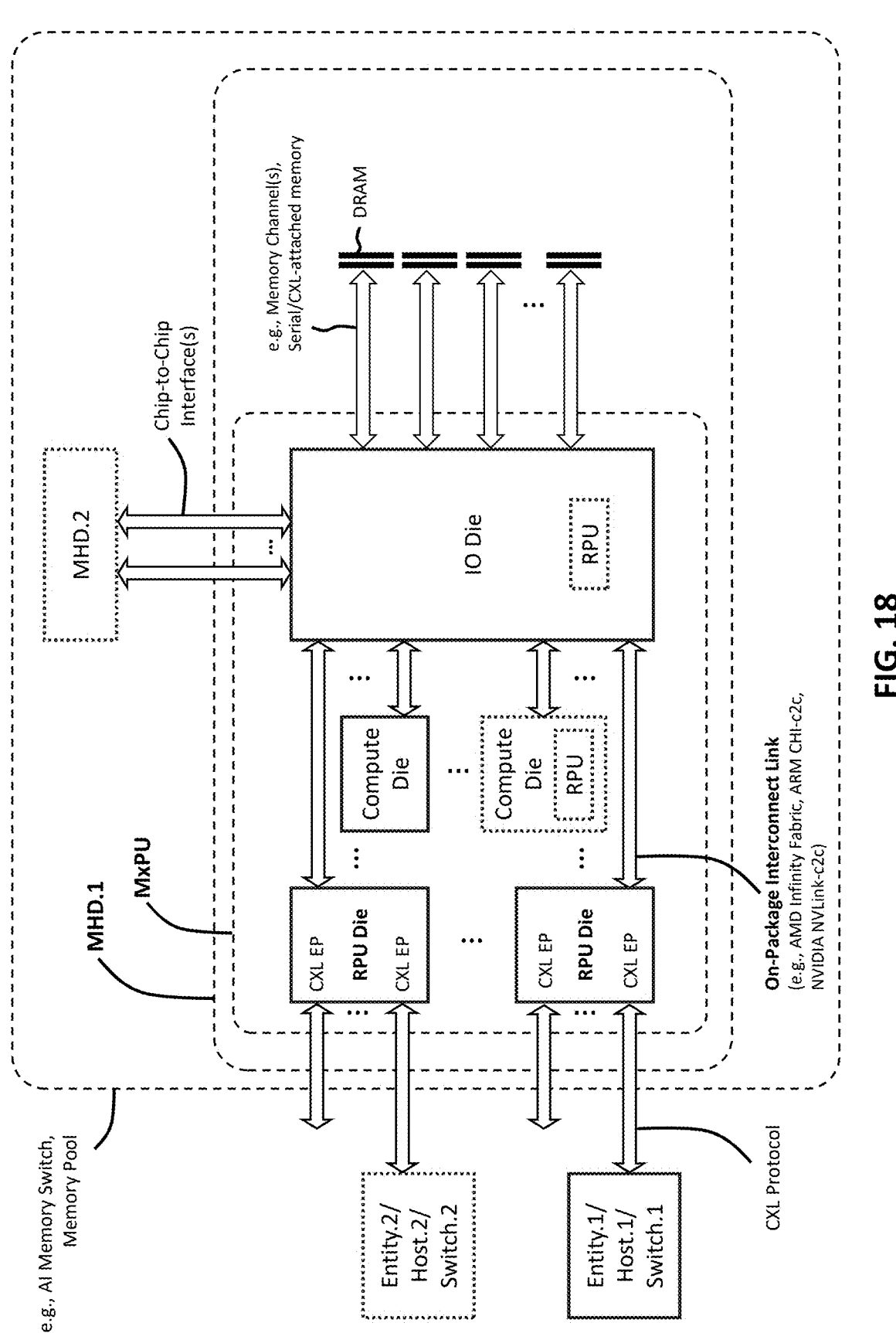
FIG. 18 illustrates one embodiment of a system comprising an AI memory switch or a memory pool, comprising a CXL Multi Headed Device (MHD)

FIG. 18 illustrates one embodiment of a system comprising an AI memory switch or a memory pool, comprising a CXL Multi Headed Device (MHD) coupled to two external entities. The memory pool may include additional MHDs coupled to additional entities. The memory pool may utilize a chipset-based architecture wherein a collection of electronic components such as MxPUs, xPUs, CPUs, and memory buffers, works together on a platform for realizing a memory pool functionality. The MHD comprises an MxPU coupled to DRAM, wherein the DRAM may be internal to the MHD, such as mounted on a PCB alongside the MxPU, possibly within an MHD enclosure, or the DRAM may be external to the MHD, such as in pluggable memory modules (e.g., EDSFF). The MxPU may be derived from an established processor design, such as a CPU design that utilizes a combination of at least one compute die and at least one I/O die that may communicate with each other utilizing an on-package interconnect such as AMD Infinity Fabric, ARM CHI C2C, or NVIDIA NVLink-C2C. An RPU, optionally implemented in a separate die/chiplet, or embedded into an I/O die and/or into a compute die, performs host-to-host physical address translations that enable entities coupled to the memory pool via the CXL Endpoints to access the DRAM coupled to the MxPU. The MxPU may include one or multiple chip-to-chip interfaces, such as ISoL, that may provide interconnection of multiple MxPU instances in various topologies to create a larger logical MHD, a distributed MHD, or a memory pool that may serve additional external entities and provide larger memory capacities. The chip-to-chip interface may utilize the same communication protocol utilized by the on-package interconnect links, such as AMD Infinity Fabric, ARM CHI C2C, or NVIDIA NVLink-C2C. Processing cores in the MxPU, optionally hidden cores utilized for infrastructure tasks, may provide Processing In Memory (PIM) services to data residing in the DRAM.

Figures 19A, 19B:
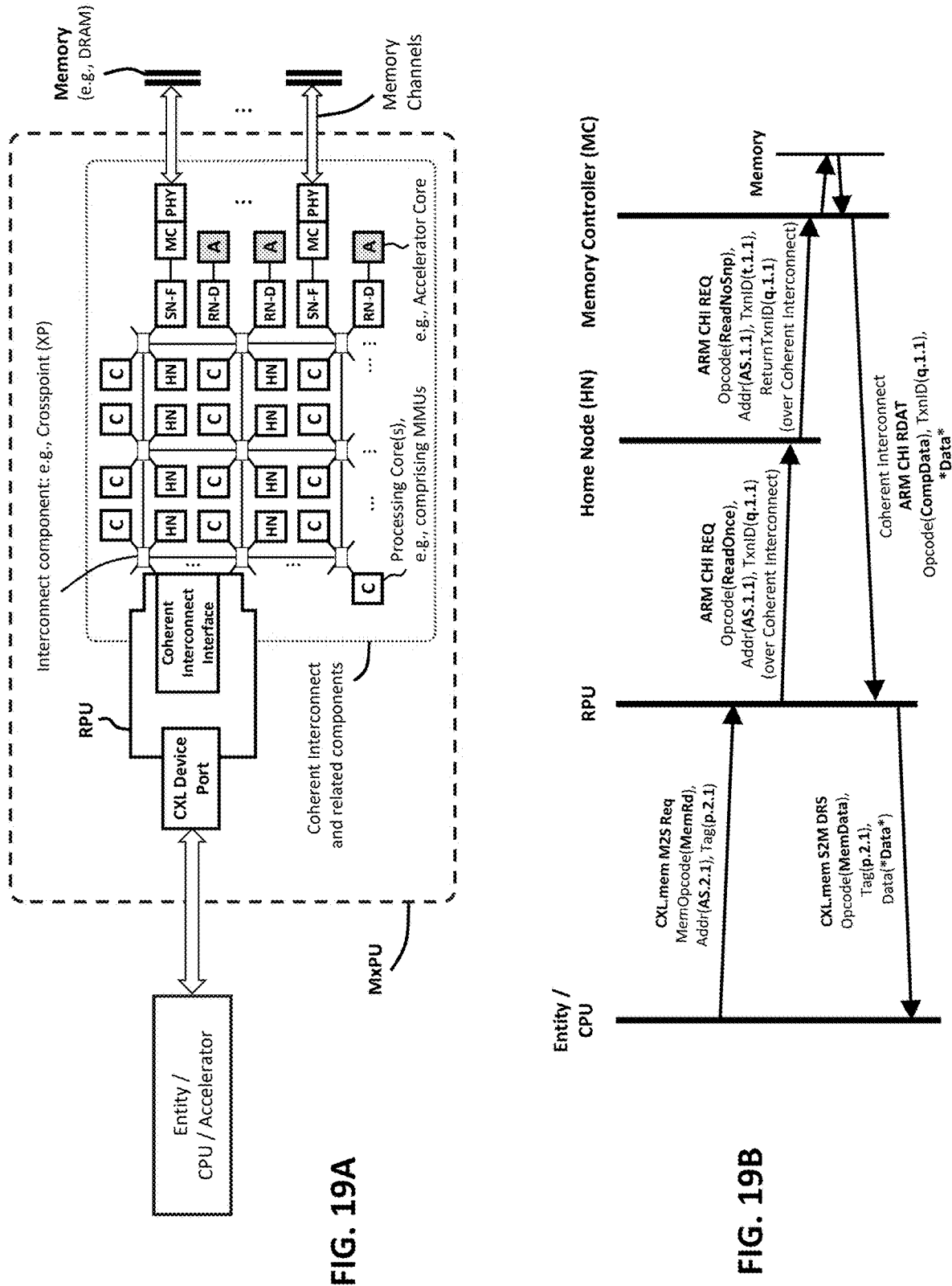
FIG. 19A illustrates one embodiment of a system enabling an entity to access DRAM and other resources via a CXL device port and a coherent interconnect interface.
FIG. 19B illustrates one embodiment of a TFD showing address translations between CXL.mem M2S Req MemRd and ARM CHI REQ ReadOnce.

FIG. 19A illustrates one embodiment of a system where an entity, such as a CPU or accelerator, communicates via a CXL device port that is coupled to or included in an RPU. The RPU may further include a Coherent Interconnect Interface that may utilize a protocol based on ARM CHI. The Coherent Interconnect Interface couples the RPU to an interconnect component, such as a crosspoint (XP), within a coherent interconnect. The Coherent Interconnect Interface performs the necessary protocol conversions between a CXL-based protocol domain and a coherent interconnect protocol domain, such as between CXL.mem and ARM CHI, enabling the entity to access the memory (such as DRAM) and other resources coupled to the coherent interconnect. The coherent interconnect may be implemented as a mesh topology connecting various components including processing cores, home nodes (HN), memory controllers (MC), and accelerator cores.

FIG. 19B illustrates one embodiment of a TFD showing address translations between CXL.mem and ARM CHI. An entity, such as a CPU, initiates a CXL.mem M2S Request, such as M2S Req with a physical address (AS.2.1), MemRd opcode, Addr(AS.2.1), and Tag(p.2.1). The RPU translates the M2S Req to a CHI request, such as ARM CHI REQ carrying a ReadOnce opcode, a translated physical address (AS.1.1), and TxnID(q.1.1). The transaction flows through the coherent interconnect to a home node (HN), which may process the request and send the processed request to a memory controller (MC). The HN may translate the received ARM CHI REQ to an ARM CHI REQ carrying ReadNoSnp Opcode, Addr(AS.1.1), TxnID(t.1.1), and ReturnTxnID (q.1.1). The memory controller retrieves the data from the memory (such as DRAM) and sends the data to the RPU, such as via ARM CHI RDAT, through the coherent interconnect. For example, the memory controller may utilize ARM CHI RDAT with CompData opcode and TxnID(q.1.1) for sending the data. The wildcard notation *Data* indicates that the data may be encoded, encrypted, or otherwise processed as needed for the transmission. Alternatively, the response and read data paths may be implemented according to other designs, such as wherein the MC may send the data to the HN that sends it to the RPU, or the HN sends a response to the RPU while the MC sends the data to the RPU. The RPU then translates the ARM CHI response back to the CXL.mem domain for delivery to the requesting entity. For example, the RPU may translate the ARM CHI RDAT to CXL.mem S2M DRS comprising the MemData opcode, Tag(p.2.1), and the *Data*.

Figures 20A, 20B:
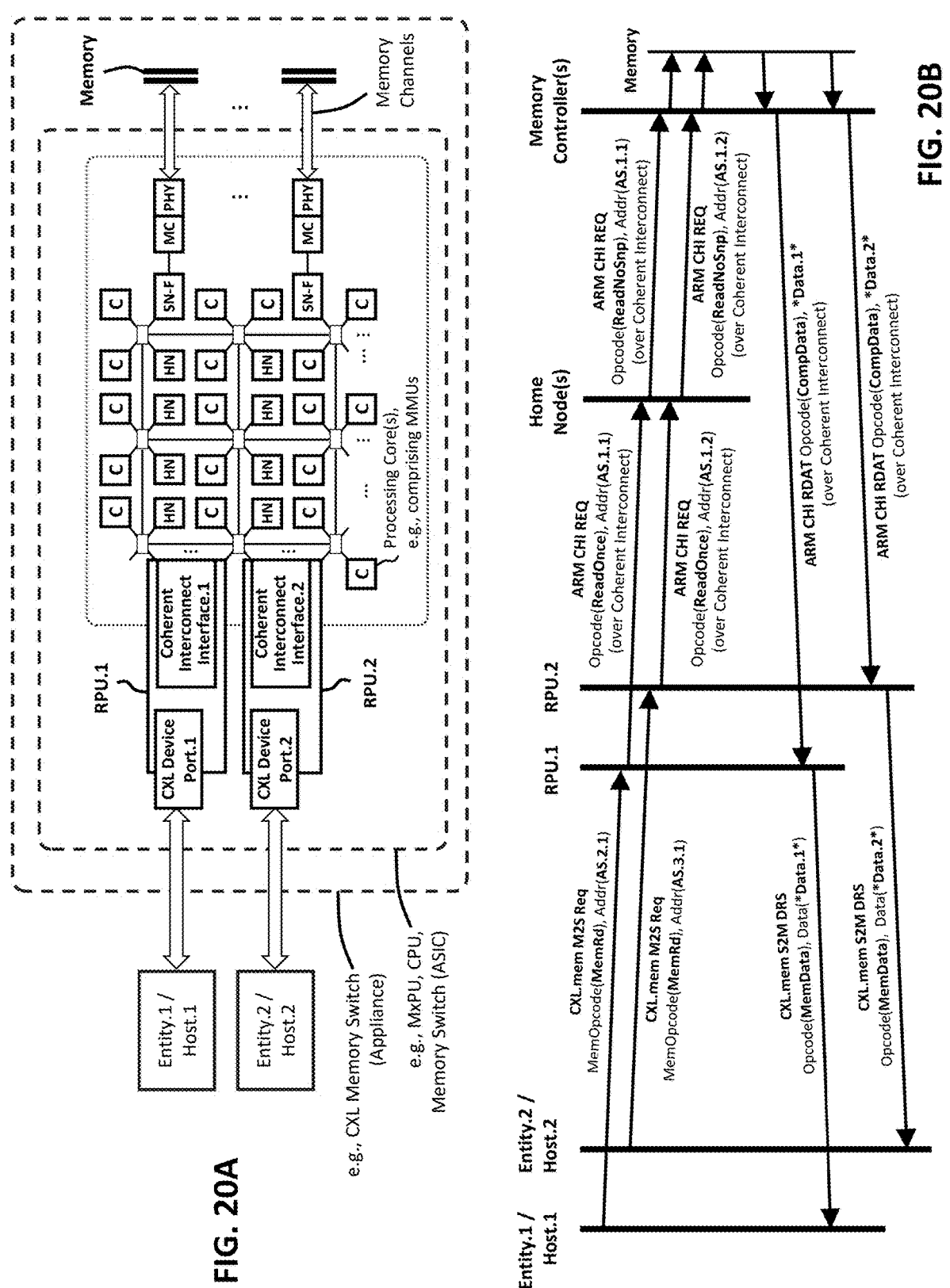
FIG. 20A illustrates one embodiment of a system comprising a CXL memory switch appliance comprising a CPU having processing cores and memory controllers.
FIG. 20B illustrates one embodiment of a TFD depicting a multi-host memory access scenario wherein two entities access memory through a shared coherent interconnect infrastructure.

FIG. 20A illustrates one embodiment of a system comprising a CXL memory switch appliance comprising an MxPU, CPU, or a memory switch ASIC, which is coupled to first and second entities denoted as Entity.1/Host.1 and Entity.2/Host.2. The MxPU includes processing cores and memory controllers coupled to a coherent interconnect that in one example utilizes a CHI-based protocol. The MxPU utilizes protocol translations, performed by the RPUs, between CXL-based ports and the MxPU's coherent interconnect. The first RPU (RPU.1) may enable Entity.1/Host.1 to access, via the first CXL device port and the MxPU's coherent interconnect, resources mapped to a physical address space of the MxPU's coherent interconnect, such as memory (e.g., DRAM) resources of the MxPU. Correspondingly, the second RPU (RPU.2) may enable Entity.2/Host.2 to access, via the second CXL device port and the MxPU's coherent interconnect, resources mapped to the physical address space of the MxPU's coherent interconnect, such as the memory resources of the MxPU.

FIG. 20B illustrates one embodiment of a TFD depicting a multi-host memory access scenario wherein two entities access memory through a shared coherent interconnect infrastructure. Entity.1/Host.1 initiates a CXL.mem M2S Request with MemOpcode(MemRd) and Addr(AS.2.1) from a second physical address space, which RPU.1 translates to ARM CHI REQ carrying Opcode(ReadOnce) and Addr (AS.1.1) from the coherent interconnect's first physical address space. Concurrently or sequentially, Entity.2/Host.2 may initiate a CXL.mem M2S Request with MemOpcode (MemRd) and Addr(AS.3.1) from a third physical address space, which RPU.2 translates to ARM CHI REQ carrying Opcode(ReadOnce) and Addr(AS.1.2) from the coherent interconnect's first physical address space. Both transactions flow through the coherent interconnect to one or more home nodes, which send respective ARM CHI REQ messages to one or more memory controllers, for example with Opcode (ReadNoSnp) and the addresses Addr(AS.1.1) and Addr (AS.1.2), respectively. The memory controller(s) retrieve the requested data from memory and send ARM CHI RDAT messages with Opcode(CompData) carrying *Data.1* and *Data.2*, representing the data retrieved from the addresses AS.1.1 and AS.1.2, respectively. RPU.1 translates the first response to CXL.mem S2M DRS with Opcode(MemData)

and Data(*Data.1*) and sends it to Entity.1/Host.1. RPU.2 translates the second response to CXL.mem S2M DRS with Opcode(MemData) and Data(*Data.2*) and sends it to Entity.2/Host.2. The embodiment demonstrates how hosts may share access to the same memory resources based on RPUs that perform physical address translations. Additionally or alternatively, the embodiment may be viewed as two separate transactions that utilize the same processor's coherent interconnect to access the memory, wherein the entities maintain their respective physical address space that are translated to the physical address space of the coherent interconnect.

Depending on system characteristics, such as implementation choices and platform configurations, different physical addresses, such as (AS.1.1) and (AS.1.2), within a physical address space utilized by the coherent interconnect, may be typically partitioned, such as via hashing or interleaving schemes, across a set of home nodes. Such partitioning is typically performed in order to reduce bottleneck effects in the system and spread the load of transaction processing across home nodes of the coherent interconnect, and may result in mapping the different physical addresses, such as (AS.1.1) and (AS.1.2), to the same home node, or to different home nodes. Similarly, different physical addresses may be associated with one memory controller, or with different memory controllers, such as according to a separate mapping scheme, which may be different from the mapping scheme utilized for selecting a home node for processing the request. Alternatively, other embodiments may co-locate the home node function with a specific memory controller, utilizing a unified mapping scheme that selects both a home node and a memory controller.

In one embodiment, an apparatus, comprises: a processor comprising a coherent interconnect, the coherent interconnect couples processing cores to memory controllers that are coupled to memory channels capable of supporting more than 64 GB of memory; wherein the processor is configured to utilize physical addresses within a physical address space (PAS) to access the memory, and to execute an operating system (OS) that utilizes a virtual address space; a memory management unit (MMU) configured to enable the OS to access the memory, based on mapping addresses within the virtual address space to physical addresses within the PAS; a resource provisioning unit (RPU) comprising an Ultra Accelerator Link-based port (UALink-based port) configured to communicate with an entity coupled to the apparatus according to a UALink-based protocol; and wherein the RPU is further coupled to the coherent interconnect and configured to translate physical addresses associated with the UALink-based protocol to physical addresses within the PAS; whereby the physical address translations enable the entity to access the memory via the UALink-based port, the coherent interconnect, and the memory controllers. Optionally, the address translations between the physical addresses may enable isolation between different address domains while allowing controlled access to system resources. The translation mechanism may support various mapping schemes including offset-based translation, page-table-based translation, or range-based translation. The RPU may include translation lookaside buffers (TLBs) or other caching mechanisms to optimize translation performance for frequently accessed address ranges.

Optionally, the UALink-based protocol may comprise UALink Protocol Level Interface (UPLI), the physical addresses associated with the UPLI protocol may comprise network physical addresses (NPAs), and the physical addresses within the PAS1 may be system physical addresses (SPAs) or host physical addresses (HPAs). Optionally, embodiments may utilize a global or a flat addressing model, wherein a single address space may include addresses that may be utilized for accessing memory within a system domain, and may also include addresses associated with the UPLI protocol that may be utilized for accessing memory in different system domains, wherein physical address translations may be performed between physical addresses within that single address space. Alternatively, embodiments may utilize multiple physical address spaces, such as NPA space (wherein NPAs may be utilized for accessing memory in different system domains) and SPA space (wherein SPAs may be utilized for accessing memory within a system domain), wherein physical address translations may be performed from NPAs to SPAs. In some embodiments, the NPAs may represent addresses within a global or a flat UALink fabric address space that may span multiple nodes or devices, or may represent addresses within a destination UALink Accelerator referenced by a destination identifier in the UPLI protocol. SPAs or HPAs (an implementation choice) may represent the local memory addressing scheme utilized by the processor or by the system node (SN). The translation from NPAs to SPAs/HPAs may include routing information extraction, node identifier processing, and/or address offset calculations to map fabric-side addresses to local memory locations.

The RPU may be further configured to, in addition to the physical address translations, translate between first fields belonging to first message formats of the UALink-based protocol, and second fields belonging to second message formats of a protocol utilized by the coherent interconnect.

In some implementations, the protocol utilized by the coherent interconnect may be based on Coherent Hub Interface (CHI) protocol (CHI-based protocol), and the RPU may be further configured to translate read requests corresponding to the UALink-based protocol to requests corresponding to the CHI-based protocol carrying ReadOnce opcodes for non-cacheable data access or ReadShared opcodes for cacheable data access. Optionally, the selection between ReadOnce and ReadShared opcodes may be determined by cache allocation hints, memory region attributes, or explicit indicators in the UPLI request. The RPU may additionally translate UPLI write requests to other CHI write opcodes based on write granularity and coherency requirements. The translation may preserve transaction ordering semantics by utilizing CHI's ordering rules and potentially implementing additional ordering enforcement mechanisms when UALink ordering requirements exceed those provided by CHI.

The protocol utilized by the coherent interconnect may be based on an Intel Coherent Processor Interconnect Protocol (ICPIP-based protocol) for scalable multiprocessors with a shared physical address space, and wherein the RPU may be further configured to translate read requests corresponding to the UALink-based protocol to requests corresponding to the ICPIP-based protocol carrying RdCur opcodes, and maintain coherency state information for physical addresses within the PAS that are associated with the coherent caches. Optionally, when the coherent interconnect is based on UPI protocol, the coherency state information maintained by the RPU may include caching states or similar cache coherency states. Examples of ICPIP include Intel's QPI, UPI, KTI, UXI, and future Intel's Coherent Processor Interconnect Protocols. The translation to ICPIP RdCur opcodes, such as UPI RdCur opcodes, may be accompanied by snoop responses handling when the requested data exists in other processor caches. The RPU may include state tracking mechanisms to optimize subsequent accesses to the same cache lines.

In certain aspects, the protocol utilized by the coherent interconnect may be based on Infinity Fabric protocol (IF-based protocol), and wherein the RPU may be further configured to translate write requests corresponding to the UALink-based protocol to write commands corresponding to the IF-based protocol while preserving write ordering semantics required by the entity. Optionally, the preservation of write ordering semantics may include tracking write dependencies and enforcing completion ordering as specified by the UALink memory model. The RPU may translate UPLI write requests that include Byte Enables (which indicate partial writes) to appropriate Infinity Fabric write command types while maintaining producer-consumer ordering relationships. For example, the UPLI 64-bit byte enable field (OrigDataByteEn), which allows for individual bytes within a data beat to written or not in a write transfer, may be translated by the RPU to the appropriate Infinity Fabric write command type.

The RPU may be further configured to translate a request corresponding to the UALink-based protocol to at least one message corresponding to the protocol utilized by the coherent interconnect; wherein the at least one message causes prefetch to a cache of the processor. Optionally, the RPU may translate UPLI requests, such as UPLI prefetch hints that may be carried in vendor-defined commands, to messages of a protocol utilized by the coherent interconnect that effectively prefetch data into a cache of the processor, such as LLC Prefetch RFO (LlcPrefRFO), LLC Prefetch Code (LlcPrefCode), or LLC Prefetch Data (LlcPrefData) opcodes of a protocol based on Intra-Die Interconnect (IDI), which is the protocol used by some Intel processor cores.

Furthermore, the RPU may be further configured to: translate tags associated with transactions corresponding to the UALink-based protocol to tags utilized by the coherent interconnect, and maintain a mapping between the tags associated with the transactions and the tags utilized by the coherent interconnect. Optionally, the tag translation mechanism may accommodate different tag formats and sizes between the UPLI and coherent interconnect domains. Tags may be used to identify a transaction, such as when supporting outstanding requests in-flight through the RPU, or may be used to convey properties associated with messages or transactions, such as trace tags used for debugging and performance measurements, or authorization tags used for security. Tags may be referenced by different names in different embodiments, such as by the name Transaction Identifier (TxnID) in some ARM CHI implementations. The mapping between UPLI tags and coherent interconnect tags may include using on-silicon SRAM, content-addressable memory (CAM) or Ternary Content-Addressable Memory (TCAM) structures, hash tables, or indexed arrays. The RPU may handle tag exhaustion scenarios by including flow control mechanisms that prevent new transactions when available tags are depleted.

The RPU may be further configured to: maintain a tag allocation table to track outstanding transactions from the entity, allocate coherent interconnect tags from a pool of available tags upon receiving requests conforming to the UALink-based protocol, and release the tags upon completion of corresponding transactions. Optionally, the tag allocation table may be sized to support the maximum number of outstanding transactions allowed by the UALink specification or by configured limits. The tag pool management may implement various allocation techniques including round-robin, least-recently-used, or priority-based allocation. The RPU may monitor tag utilization to detect potential bottlenecks and may include tag recycling mechanisms to handle long-latency transactions efficiently.

In some implementations, the entity may be configured to access the memory via read and write requests conforming to the UALink-based protocol, wherein the read and write requests are translated by the RPU; and the processing cores may be configured to access entity-attached resources by issuing coherent interconnect requests that the RPU is further configured to translate to protocol transactions conforming to the UALink-based protocol, wherein the protocol transactions target the entity. Optionally, the bidirectional access capability may enable various computing paradigms including memory pooling, memory sharing, resource disaggregation, and heterogeneous computing. When processing cores access entity-attached resources, such as High-Bandwidth Memory (HBM) resources, the RPU may handle different memory attributes, caching policies, and ordering requirements between the two domains. The translation of coherent interconnect requests to transactions conforming to the UALink-based protocol may include protocol-specific adaptations to maintain correctness across domain boundaries.

The entity may comprise entity-attached memory, and wherein the RPU may be further configured to map a portion of the entity-attached memory into the PAS, enabling the processing cores to access the entity-attached memory utilizing load and store operations. Optionally, the mapping of entity-attached memory into PAS may include establishing memory windows with specific attributes such as cacheability, write-combining behavior, and/or access permissions. The RPU may support dynamic remapping of entity-attached memory regions based on workload requirements or system configuration changes. The load and store operations from processing cores may be subject to memory ordering rules enforced by both the coherent interconnect and the UPLI protocol.

The RPU may be further configured to enforce access control by comparing the physical addresses associated with the UALink-based protocol against a set of predetermined allowed address ranges for the entity, and blocking transactions that fall outside the predetermined allowed address ranges. Optionally, the predetermined allowed address ranges may be configured by privileged software, firmware, or hardware configuration registers. The RPU may support multiple security contexts with different predetermined allowed address ranges for different entities or different operational modes. The blocking of unauthorized transactions may generate error responses, security exceptions, or logging events for system monitoring and debugging purposes.

Additionally, the RPU may be further configured to apply security filtering based on examination of transaction attributes associated with the UALink-based protocol, which include requester identification and access permissions, and selectively allowing or denying transactions based on preconfigured security policies. Optionally, the security filtering may examine additional UPLI transaction attributes, such as vendor-defined commands or fields, virtual channel identifiers, traffic classes, or custom security tokens. The preconfigured security policies may be stored in secure storage within the RPU or loaded from trusted system firmware during initialization. The RPU may support dynamic policy updates under appropriate authentication and authorization mechanisms.

The RPU may be further configured to: detect sequential access patterns in requests corresponding to the UALink-based protocol which are received from the entity, and issue prefetch requests that are routed via the coherent interconnect and the memory controllers to retrieve data in advance of anticipated entity requests. Optionally, the prefetch mechanism may utilize various pattern detection algorithms including stride detection, stream detection, or machine learning-based prediction. The RPU may maintain prefetch buffers to store prefetched data and may implement prefetch throttling to prevent memory bandwidth saturation. The prefetch requests may be marked with lower priority than demand requests to minimize interference with the explicit memory accesses.

The memory may comprise dynamic random-access memory (DRAM), and the entity may comprise a graphics processing unit (GPU) or a central processing unit (CPU) configured to utilize the UALink-based port for accessing the memory; and wherein the RPU may enable the entity to access the DRAM with cache-line granularity. An entity, such as a GPU or a CPU, may utilize the UALink port for high-bandwidth memory access to memory resources attached to the processor. Optionally, the cache-line granularity access may align with standard cache line sizes such as 64 bytes, 128 bytes, or 256 bytes, enabling efficient data transfers between the entity and the DRAM. The RPU may support memory consistency maintenance, which includes coordination between the entity's memory model and the processor's memory model, with the RPU translating between different consistency requirements. The high-bandwidth memory access may be optimized utilizing features such as memory interleaving, bank-aware scheduling, or quality-of-service mechanisms that prioritize latency-sensitive or bandwidth-intensive access patterns from the GPU or CPU entity.

The RPU may be further configured to coalesce coherent interconnect transactions targeting contiguous or nearby addresses into fewer requests corresponding to the UALink-based protocol; whereby the coalescing reduces transaction overhead and improves memory bandwidth utilization. Optionally, the request coalescing may consider factors including address proximity, request types, and timing windows when determining which requests to combine. The RPU may include write combining buffers for write requests and may support read coalescing for sequential read patterns.

In certain aspects, the RPU may be further configured to utilize an intermediate protocol selected from Peripheral Component Interconnect Express (PCIe) or Compute Express Link (CXL) when translating between the UALink-based protocol and a protocol utilized by the coherent interconnect.

In one embodiment, an apparatus, comprises: a processor comprising a coherent interconnect, the coherent interconnect couples processing cores to memory controllers that are coupled to memory channels capable of supporting more than 64 GB of memory; wherein the processor is configured to utilize physical addresses within a first physical address space (PAS1) to access the memory, and to execute an operating system (OS) that utilizes a virtual address space; a memory management unit (MMIU) configured to enable the OS to access the memory, based on mapping addresses within the virtual address space to physical addresses within the PAS1; first and second resource provisioning units (RPUs) comprising first and second respective Ultra Accelerator Link-based ports (UALink-based ports) configured to communicate, according to a UALink-based protocol, with first and second respective entities coupled to the apparatus, whereby the first and second entities utilize second and third respective physical address spaces (PAS2, PAS3); and wherein the first and second RPUs are further coupled to coherent interconnect; wherein the PAS1, the PAS2, and the PAS3 are different; and whereby the apparatus is capable of enabling the first and second entities to access portions of the memory via the first and second UALink-based ports, the coherent interconnect, and the memory controllers.

Optionally, the first RPU may be configured to translate physical addresses within the PAS2 to physical addresses within the PAS1, and wherein the second RPU may be configured to translate physical addresses within the PAS3 to physical addresses within the PAS1; whereby the first and second RPUs enable the first and second entities to access the memory. The UALink-based protocol may comprise UALink Protocol Level Interface (UPLI); and in addition to the physical address translations, the first and second RPUs may be further configured to translate between first fields belonging to first message formats of the UPLI protocol, and second fields belonging to second message formats of a protocol utilized by the coherent interconnect. In such cases, the protocol utilized by the coherent interconnect may be based on Coherent Hub Interface (CHI) protocol (CHI-based protocol), and at least one of the first and second RPUs may be further configured to translate the UPLI protocol read requests to CHI-based protocol requests carrying ReadOnce opcodes for non-cacheable data access or ReadShared opcodes for cacheable data access. Alternatively, the protocol utilized by the coherent interconnect may be based on Intel's Coherent Processor Interconnect Protocol (ICPIP-based protocol) for scalable multiprocessors with a shared physical address space, and at least one of the first and second RPUs may be further configured to translate read requests corresponding to the UPLI protocol to requests corresponding to the ICPIP-based protocol carrying opcodes based on RdCur. In another alternative, the protocol utilized by the coherent interconnect may be based on Infinity Fabric protocol (IF-based protocol), and wherein at least one of the first and second RPUs may be further configured to translate write requests corresponding to the UPLI protocol to write commands corresponding to the IF-based protocol while preserving write ordering semantics required by the respective entity. Furthermore, at least one of the first and second RPUs may be further configured to translate tags associated with transactions corresponding to the UALink-based protocol to tags utilized by the coherent interconnect, maintain a mapping between the tags associated with transactions and the tags utilized by the coherent interconnect, and translate response tags from the coherent interconnect domain back to the UALink-based protocol domain. The first RPU may maintain a first translation table for mapping addresses within the PAS2 to addresses within the PAS1, and the second RPU may maintain a second translation table for mapping addresses within the PAS3 to addresses within the PAS1, wherein the first and second translation tables are different and provide isolation between memory accesses from the first and second entities. For example, the first RPU may be configured to translate addresses within the PAS2 to a first subset of addresses within the PAS1, and the second RPU may be configured to translate addresses within the PAS3 to a second subset of addresses within the PAS1, wherein the first and second subsets are non-overlapping. In other implementations, the first RPU may be configured to translate at least some addresses within the PAS2 to a shared subset of addresses within the PAS1, and the second RPU may be configured to translate at least some addresses within the PAS3 to the same shared subset of addresses within the PAS1, enabling the first and second entities to access shared memory regions. Additionally, the PAS2 may have a different size than the PAS3, and wherein the PAS2 and the PAS3 may have different sizes than the PAS1; and wherein the first and second RPUs may be further configured to dynamically modify the address translations between the PAS2 and the PAS1, and between the PAS3 and the PAS1, based on memory allocation requests or reconfiguration commands.

In one embodiment, a method, comprises: operating a processor comprising a coherent interconnect that couples processing cores to memory controllers, wherein the memory controllers communicate with memory channels coupled to more than 64 GB of memory; utilizing, by the processor, physical addresses within a physical address space (PAS) to access the memory; executing, by the processor, an operating system (OS) that utilizes a virtual address space; mapping addresses within the virtual address space to physical addresses within the PAS, which enables the OS to access the memory; communicating according to a protocol based on Ultra Accelerator Link (UALink-based protocol) with an entity via a UALink-based port; and performing physical address translations from physical addresses associated with the UALink-based protocol to physical addresses within the PAS; whereby the physical address translations enable the entity to access the memory via the UALink-based port, the coherent interconnect, and the memory controllers.

Optionally, the coherent interconnect may utilize a protocol based on CHI protocol (CHI-based protocol), and wherein, in addition to performing the physical address translations, the method may further comprise: (a) translating between (i) a first field belonging to a first message format of the UALink-based protocol and (ii) a second field belonging to a second message format of the CHI-based protocol, and (b) translating UALink-based protocol read requests to CHI-based protocol requests carrying ReadOnce opcodes for non-cacheable data access or ReadShared opcodes for cacheable data access.

Figures 21A, 21B:
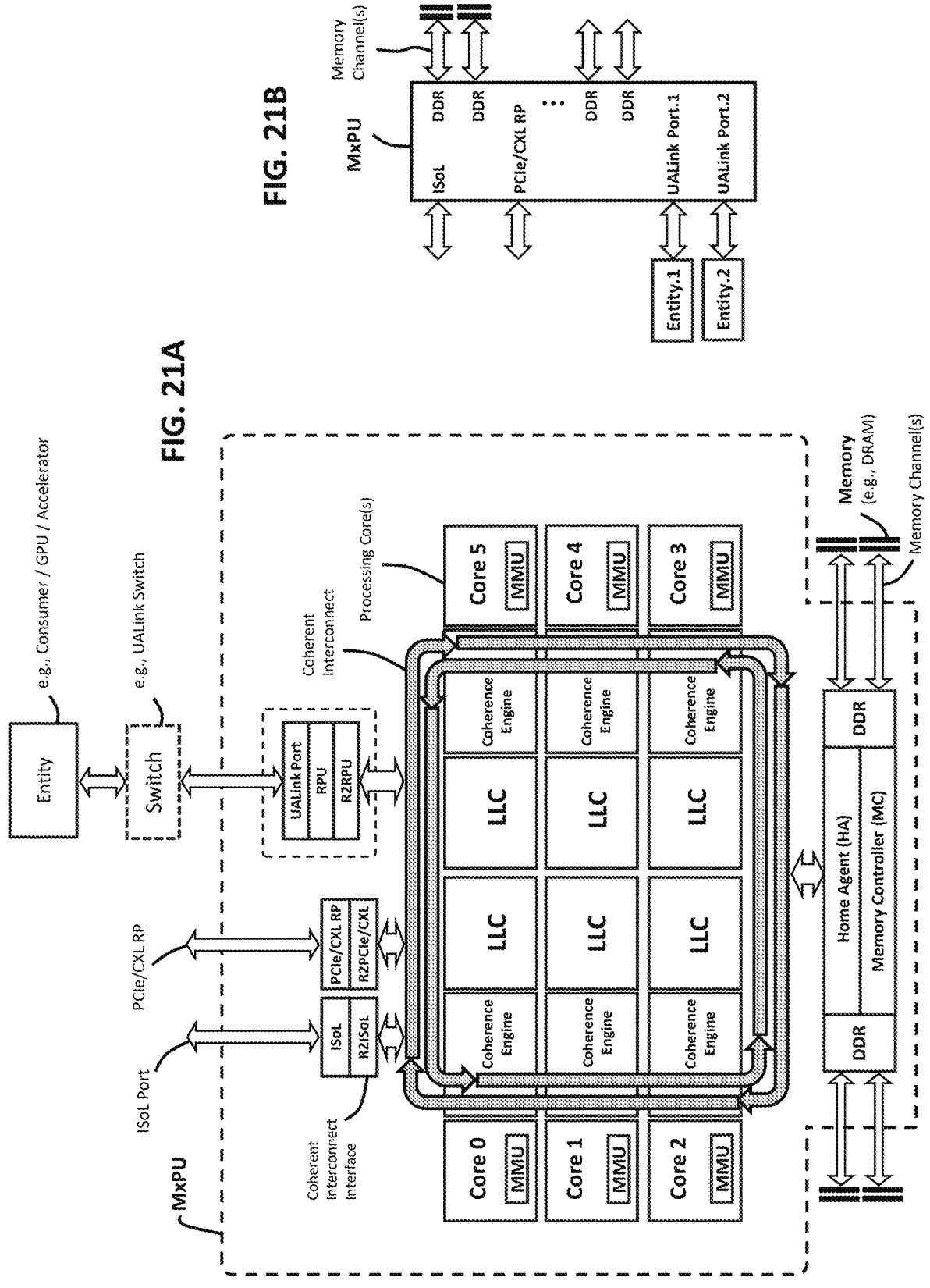
FIG. 21A illustrates one embodiment of a system comprising a processor comprising a UALink port.
FIG. 21B illustrates one embodiment of a system comprising a processor comprising UALink ports and DDR channels.

FIG. 21A illustrates one embodiment of a system comprising a processor (such as an MxPU that may be derived from an established processor design) comprising processing cores, last level cache (LLC), and a coherent interconnect utilizing a topology structure of a ring. Alternatively, the coherent interconnect may utilize other topology structures such as a mesh, a crossbar, or a custom topology. The MxPU may include a UALink port, an ISoL port such as AMD Infinity Fabric, ARM CHI C2C, NVIDIA NVLink-C2C, or Intel UPI. The MxPU may further include a PCIe/CXL Root Port (PCIe/CXL RP), and may be coupled to memory, such as DRAM, optionally via a memory controller and memory channels. The UALink port may communicate with an entity, such as a GPU or a CPU, optionally via a switch, according to a UPLI protocol, wherein an RPU may perform physical address translations that may enable the entity to access the memory via the UALink port. The illustrated RPU is coupled to the on-chip ring interconnect via a coherent interconnect interface, such as a Ring-to-RPU (R2RPU). Alternatively, the RPU may be coupled to the on-chip ring interconnect essentially directly. Similarly, the illustrated ISoL port is coupled to the on-chip ring interconnect via a coherent interconnect interface, such as a Ring-to-ISoL (R2ISoL), and the PCIe/CXL Root Port (RP) is coupled to the on-chip ring interconnect via a coherent interconnect interface, such as a Ring-to-PCIe/CXL (R2PCIe/CXL). The MxPU may be implemented as a monolithic die, as chiplets within an IC package, such as by utilizing separate compute die(s) and I/O die(s), or as components on a board.

FIG. 21B illustrates one embodiment of a system comprising a processor (such as an MxPU) comprising UALink ports, DDR channels, at least one optional PCIe/CXL RP, and at least one optional ISoL. The UALink ports may not share the same physical address space, may be coupled to entities, optionally via a switch, and may communicate with the entities according to UPLI protocols.

Figures 22A, 22B:
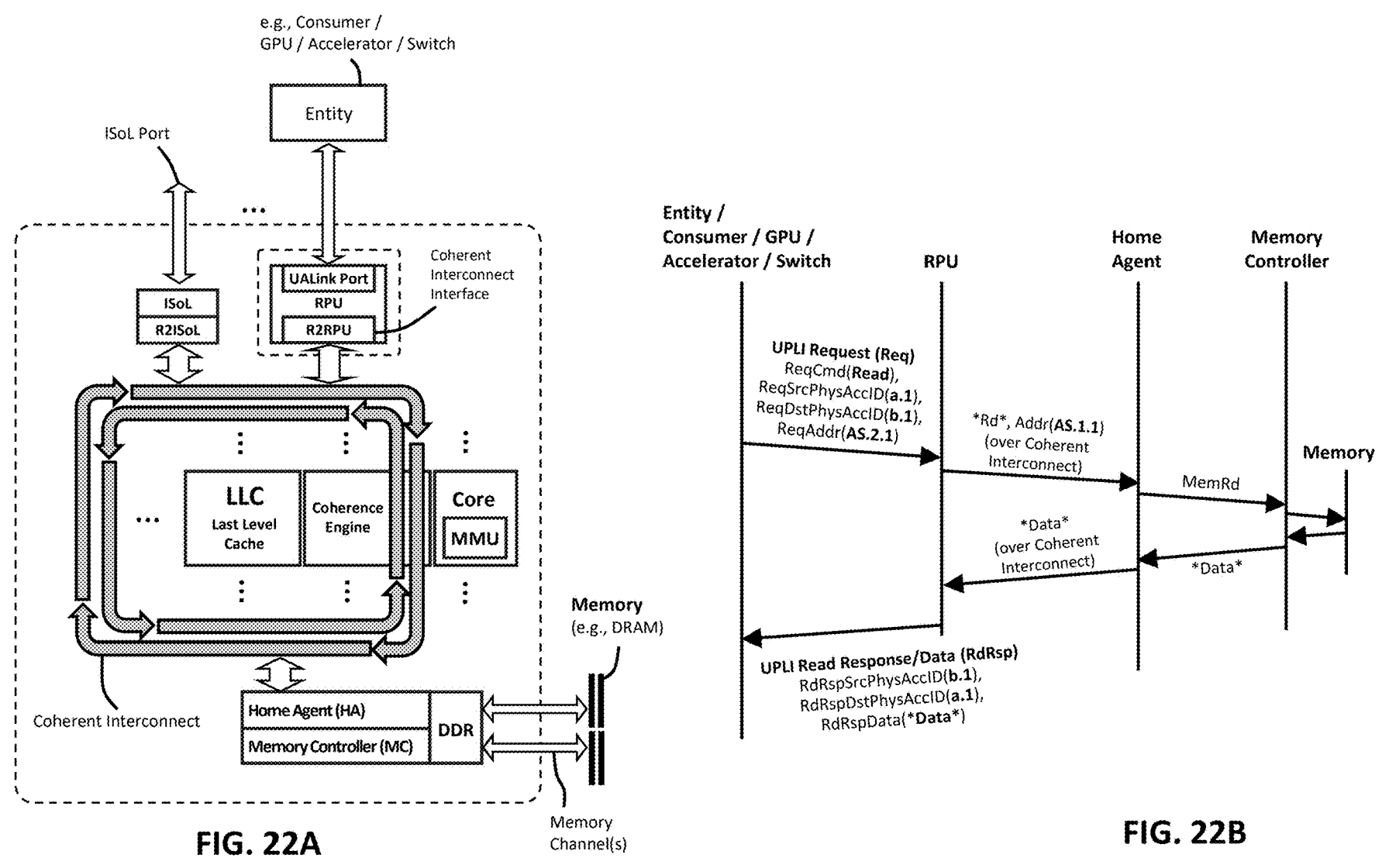

FIG. 22A illustrates one embodiment of a system comprising a processor (such as an MxPU that may be derived from an established processor design) comprising processing cores, caches, and a coherent interconnect utilizing a topology structure of a ring. Alternatively, the coherent interconnect may utilize other topology structures such as a mesh, a crossbar, or a custom topology. The processor may further include an ISoL port such as ARM CHI C2C, Intel UPI, or Intel UXI, and a memory controller optionally coupled via memory channels to memory, such as DRAM. The processor may include a UALink port that may communicate with an entity such as a GPU or accelerator, according to a UPLI protocol, wherein an RPU may perform physical address translations to enable the entity to access the memory. The illustrated RPU is coupled to the coherent interconnect via a Ring-to-RPU (R2RPU) coherent interconnect interface. Alternatively, the RPU may be coupled to the on-chip ring interconnect essentially directly. Similarly, the illustrated ISoL port is coupled to the on-chip ring interconnect via a Ring-to-ISoL (R2ISoL) coherent interconnect interface. The processor may be implemented as a monolithic die, as chiplets within an IC package, such as by utilizing separate compute die(s) and I/O die(s), or as components on a board.

FIG. 22B illustrates one embodiment of a TFD demonstrating a UPLI Request (Req) received from an entity, such as a GPU or an accelerator, wherein the RPU may translate a physical address (AS.2.1) carried in the UPLI Request, to a physical address (AS.1.1) utilized for accessing the memory. The RPU may perform further translations, such as protocol translations from UPLI to a protocol utilized by the processor's coherent interconnect, and may further send the optionally translated request to a home agent (also known as home node), and/or to a memory controller, requesting the read of address (AS.1.1). In some embodiments, the requested data may be provided by a processor cache, such as by an LLC, instead of being provided by the memory. The data may then return over the processor's coherent interconnect to the RPU, wherein the RPU provides UPLI Read Response/Data (RdRsp) to the requesting entity.

Figures 23A, 23B:
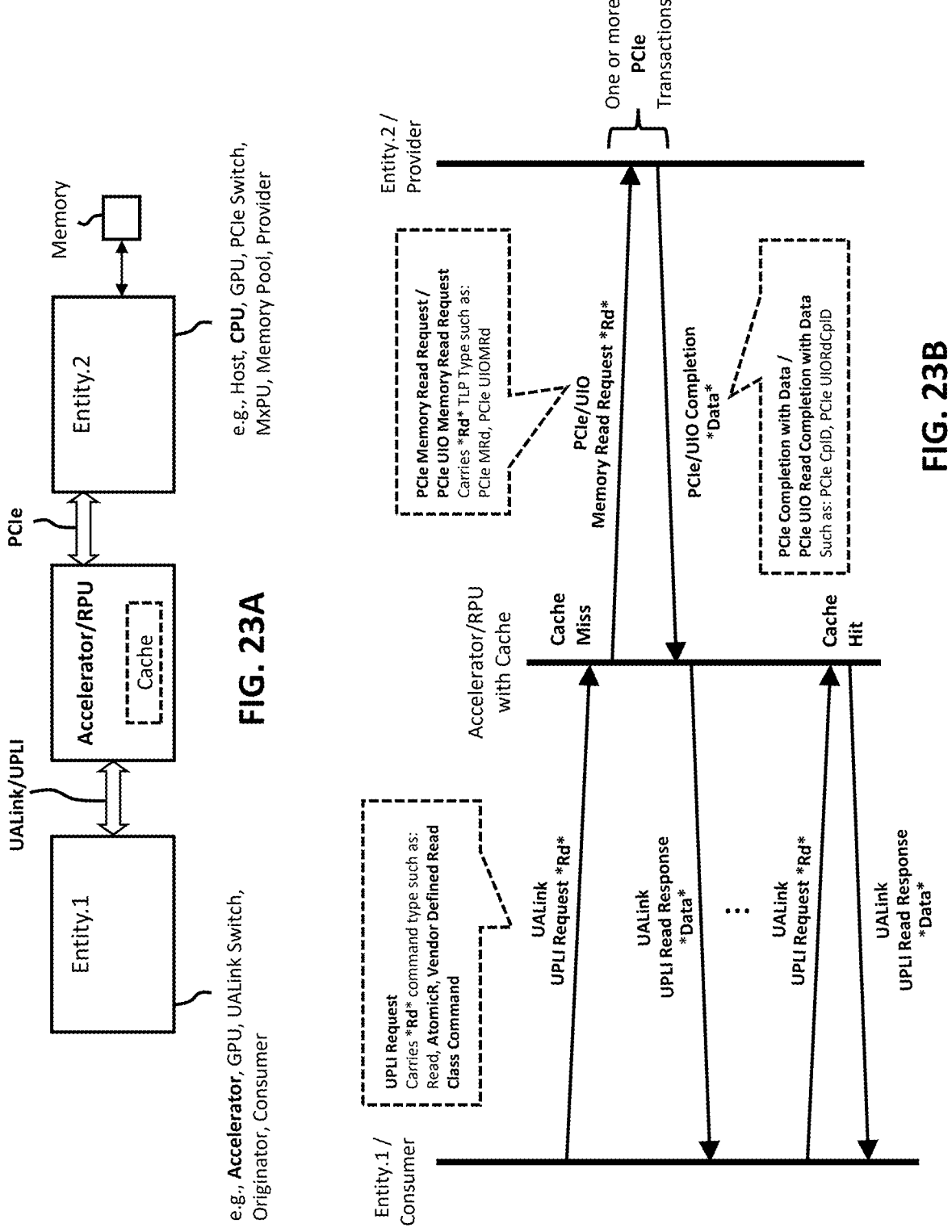
FIG. 23A illustrates one embodiment of a system comprising an accelerator or an RPU configured to translate between a UALink-based protocol and a PCIe-based protocol.
FIG. 23B illustrates one embodiment of a TFD demonstrating translations between a UALink-based protocol and a PCIe-based protocol.

FIG. 23A illustrates one embodiment of a system comprising an accelerator or an RPU, denoted as Accelerator/RPU, which may include a cache, wherein the Accelerator/RPU may translate between a UALink-based protocol, such as UPLI, and a PCIe-based protocol, such as a PCIe protocol. The Accelerator/RPU may be coupled to a first entity (Entity.1), which may be an accelerator, a GPU, a first processor, a UALink Switch, a UALink-based originator, or a resource consumer, wherein the Accelerator/RPU may communicate with the first entity according to a UALink-based protocol, such as UPLI. The Accelerator/RPU may be further coupled to a second entity (Entity.2), which may be a host, a CPU, a GPU, a second processor, a PCIe switch, a memory pool, or a resource provider, wherein the second entity may be coupled to a memory, and wherein the Accelerator/RPU may communicate with the second entity according to a PCIe-based protocol. The Accelerator/RPU may translate between the UALink-based protocol, such as UPLI, and the PCIe-based protocol, enabling the first entity to access resources coupled to the second entity, such as the memory.

The Accelerator/RPU may cache data retrieved from the second entity and may respond to UPLI requests received from the first entity with data from the cache, instead of issuing read requests to the second entity. Additionally or alternatively, the Accelerator/RPU may prefetch data from the second entity into the cache. The Accelerator/RPU may perform further translations between the UALink-based protocol domain and the PCIe-based protocol domain, such as protocol translations, e.g., UALink to PCIe or UPLI to PCIe protocol translations. The Accelerator/RPU may further perform opcode translations, command translations, TLP translations, and field translations between messages of the UALink-based protocol and protocol data units (PDUs) of the PCIe-based Protocol, such as tag translations, traffic class (TC) translations, or cross-field translations, wherein the Accelerator/RPU may maintain tracking between tags of the UALink-based protocol domain and tags of the PCIe-based protocol domain, such as in order to associate responses with their corresponding requests.

FIG. 23B illustrates one embodiment of a TFD demonstrating translations performed by an accelerator or by an RPU, denoted as Accelerator/RPU, that may include a cache, between a UALink-based protocol, such as UPLI, utilized for communicating with a first entity (Entity.1), and a PCIe-based protocol, utilized for communicating with a second entity (Entity.2) that may be coupled to memory, such as DRAM, wherein the memory may be mapped to a physical address space (PAS) utilized by the Accelerator/RPU. The Accelerator/RPU may perform translations between the UALink-based protocol domain and the PCIe-based protocol domain, such as protocol translations between the UALink-based protocol and the PCIe-based protocol, e.g., translations between UALink and PCIe, or between UPLI and PCIe.

The TFD illustrates two exemplary transactions between the first entity and the Accelerator/RPU. The first exemplary transaction may include a UPLI Request that may carry a *Rd* command type, such as Read, AtomicR, or a Vendor Defined Read Class Command, wherein the Accelerator/RPU may look up the data associated with the request address in the cache before issuing a PCIe request to the second entity. The lookup of the data may result in a cache miss, wherein the Accelerator/RPU may translate the UALink UPLI Request (Req) to a PCIe Memory Read Request or a PCIe UIO Memory Read Request that may carry a *Rd* TLP Type such as PCIe MRd or PCIe UIOMRd, wherein the Accelerator/RPU may send the PCIe/UIO memory read request to the second entity. Upon receiving a response from the second entity, which may include a PCIe Completion with Data or a PCIe UIO Read Completion with Data such as PCIe CplD or PCIe UIORdCplD, the Accelerator/RPU may translate the PCIe/UIO completion comprising *Data* (e.g., CplD TLP or UIORdCplD TLP) to a UPLI Read Response comprising *Data*, wherein the Accelerator/RPU may store the data retrieved from the second entity in the cache.

The second exemplary transaction may similarly include a UPLI Request that may carry a *Rd* command type, such as Read, AtomicR, or a Vendor Defined Read Class Command, wherein the Accelerator/RPU may look up the data associated with the request address in the cache before issuing a PCIe request to the second entity. The lookup of the data may result in a cache hit, wherein the Accelerator/RPU may respond to the request from the first entity with a UPLI Read Response comprising *Data*, without sending a translated PCIe/UIO memory read request to the second entity.

The Accelerator/RPU may further perform opcode translations, command translations, TLP translations, and field translations between messages of the UALink-based protocol and protocol data units (PDUs) of the PCIe-based Protocol, such as tag translations, traffic class (TC) translations, or cross-field translations, wherein the Accelerator/RPU may maintain tracking between tags of the UALink-based protocol domain and tags of the PCIe-based protocol domain, such as in order to associate responses with their corresponding requests. In some embodiments, the Accelerator/RPU may issue more than one PCIe transaction in response to receiving a UPLI request from the first entity, such as when splitting a UPLI read request for a large block of data to multiple smaller PCIe/UIO memory read requests, or when prefetching data from the second entity.

Figures 24A, 24B:
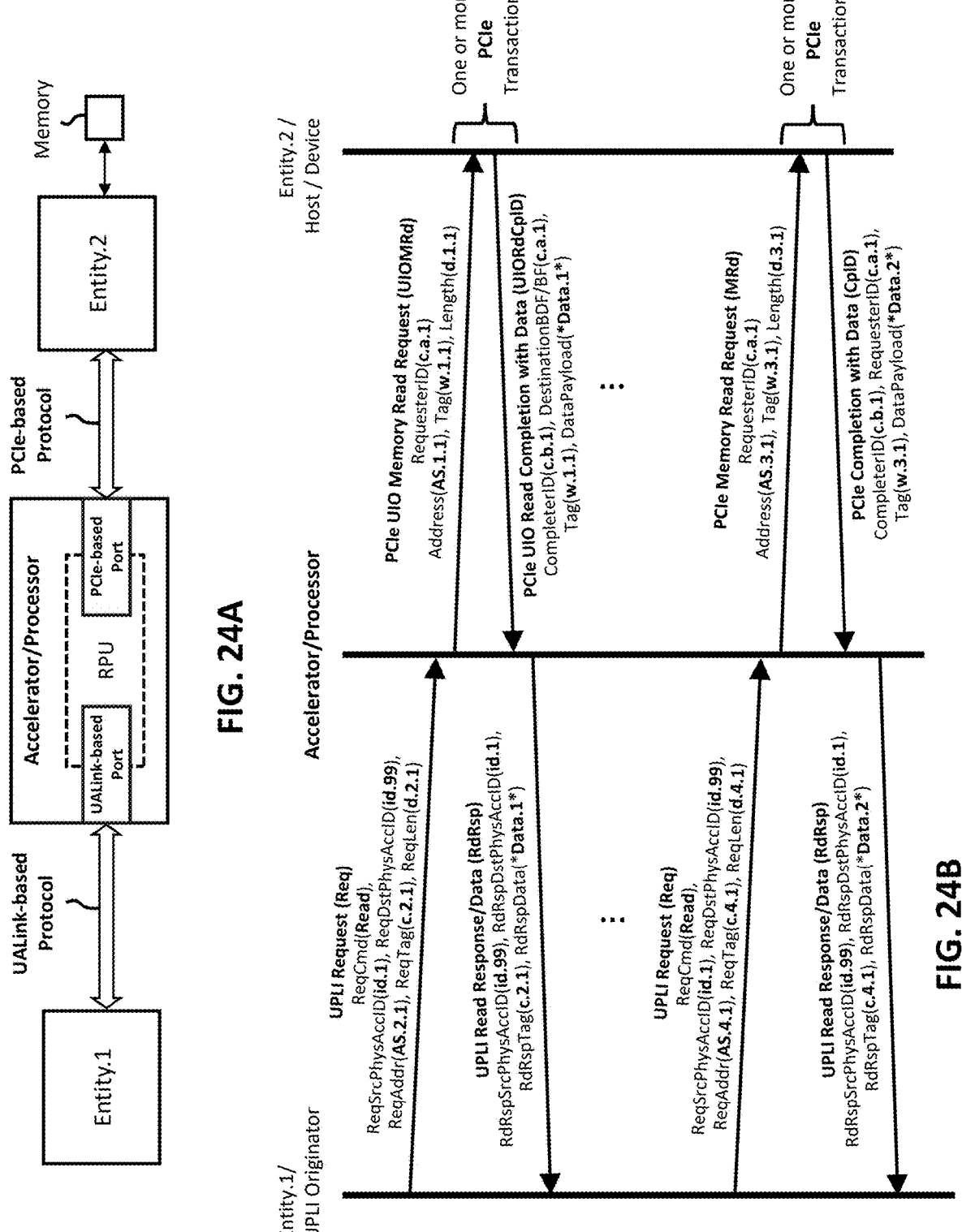
FIG. 24A illustrates one embodiment of a system comprising an accelerator or a processor that translates between a UALink-based port and a PCIe-based port.
FIG. 24B illustrates one embodiment of a TFD demonstrating translations between a UALink-based protocol and PCIe-based protocols.

FIG. 24A illustrates one embodiment of a system comprising an accelerator or a processor, denoted as Accelerator/Processor, which may include an RPU, and may further include a UALink-based port and a PCIe-based port, optionally coupled to or included in the RPU. The Accelerator/Processor may translate between a UALink-based protocol, such as UPLI, and a PCIe-based protocol. The Accelerator/Processor may be coupled, via the UALink-based port, to a first entity (Entity.1), which may be an accelerator, a GPU, a second processor, a UALink Switch, a UALink-based originator, or a resource consumer, wherein the Accelerator/Processor may communicate with the first entity according to a UALink-based protocol, such as UPLI. The Accelerator/Processor may be further coupled, via the PCIe-based port, to a second entity (Entity.2), which may be a host, a CPU, a GPU, a third processor, a PCIe switch, a PCIe device, a memory pool, or a resource provider, wherein the second entity may be coupled to a memory, and wherein the Accelerator/Processor may communicate with the second entity according to a PCIe-based protocol. The Accelerator/Processor may translate between the UALink-based protocol domain and the PCIe-based protocol domain, such as between UALink to PCIe or between UPLI to PCIe, enabling the first entity to access resources coupled to the second entity, such as the memory. The Accelerator/Processor may further perform opcode translations, command translations, TLP translations, and field translations between messages of the UALink-based protocol and protocol data units (PDUs) of the PCIe-based Protocol, such as tag translations, traffic class (TC) translations, or cross-field translations, wherein the Accelerator/Processor may maintain tracking between tags of the UALink-based protocol domain and tags of the PCIe-based protocol domain, such as in order to associate responses with their corresponding requests.

FIG. 24B illustrates one embodiment of a TFD demonstrating translations performed by an accelerator or by a processor, denoted as Accelerator/Processor, between a UALink-based protocol, such as UPLI, utilized for communicating with a first entity (Entity.1), and a PCIe-based protocol, utilized for communicating with a second entity (Entity.2) that may be coupled to memory, such as DRAM, wherein the memory may be mapped to a physical address space (PAS) utilized by the Accelerator/Processor. The Accelerator/Processor may include an RPU, and may perform translations between the UALink-based protocol domain and the PCIe-based protocol domain, such as protocol translations between the UALink-based protocol and the PCIe-based protocol, such as translations between UALink and PCIe, or between UPLI and PCIe.

The TFD illustrates two exemplary transactions between the first entity and the Accelerator/Processor. The first exemplary transaction may include a first UPLI Request (Req) comprising Request Command (e.g. ReqCmd(Read)), Request Source Physical Accelerator ID (e.g., ReqSrcPhysAccID(id.1)), Request Destination Physical Accelerator ID (e.g., ReqDstPhysAccID(id.99)), Request Address (e.g., ReqAddr(AS.2.1)), Request Tag (e.g., ReqTag(c.2.1)), and Request Length (e.g., ReqLen(d.2.1)). The Accelerator/Processor may translate the first UALink UPLI Request (Req) to a PCIe UIO Memory Read Request (UIOMRd), such as UIOMRd TLP, comprising RequesterID(c.a.1), Address (AS.1.1), Tag(w.1.1), and Length(d.1.1), wherein the Accelerator/Processor may send the PCIe UIO Memory Read Request (UIOMRd) to the second entity. Upon receiving a first response from the second entity, which may include a PCIe UIO Read Completion with Data (UIORdCpID), such as UIORdCpID TLP, comprising CompleterID(c.b.1), DestinationBDF/BF(c.a.1), Tag(w.1.1), and DataPayload (*Data.1*), the Accelerator/Processor may translate the PCIe UIO Read Completion with Data (UIORdCpID) to a first UPLI Read Response/Data (RdRsp) comprising Read Response Source Physical Accelerator ID (e.g., RdRspSrcPhysAccID(id.99)), Read Response Destination Physical Accelerator ID (e.g., RdRspDstPhysAccID(id.1)), Read Response Transaction Tag (e.g., RdRspTag(c.2.1)), and Read Response Data (e.g., RdRspData(*Data.1*)).

The second exemplary transaction may include a second UPLI Request (Req) comprising Request Command (e.g. ReqCmd(Read)), Request Source Physical Accelerator ID (e.g., ReqSrcPhysAccID(id.1)), Request Destination Physical Accelerator ID (e.g., ReqDstPhysAccID(id.99)), Request Address (e.g., ReqAddr(AS.4.1)), Request Tag (e.g., ReqTag(c.4.1)), and Request Length (e.g., ReqLen(d.4.1)). The Accelerator/Processor may translate the second UALink UPLI Request (Req) to a PCIe Memory Read Request (MRd), such as MRd TLP, comprising RequesterID(c.a.1), Address(AS.3.1), Tag(w.3.1), and Length(d.3.1), wherein the Accelerator/Processor may send the PCIe Memory Read Request (MRd) to the second entity. Upon receiving a second response from the second entity, which may include a PCIe Completion with Data (CpID), such as CpID TLP, comprising CompleterID(c.b.1), RequesterID(c.a.1), Tag (w.3.1), and DataPayload(*Data.2*), the Accelerator/Processor may translate the PCIe Completion with Data (CpID) to a second UPLI Read Response/Data (RdRsp) comprising Read Response Source Physical Accelerator ID (e.g., RdRspSrcPhysAccID(id.99)), Read Response Destination Physical Accelerator ID (e.g., RdRspDstPhysAccID(id.1)), Read Response Transaction Tag (e.g., RdRspTag(c.4.1)), and Read Response Data (e.g., RdRspData(*Data.2*)).

In one embodiment, one or more fields of the PCIe transactions such as RequesterID, CompleterID, and DestinationBDF/BF, may be set during enumeration or initialization phases of the Accelerator/Processor, or during enumeration or initialization phases of peer components coupled to the Accelerator/Processor, that may affect the PCIe topology and IDs assigned to PCIe components in the system. Additionally or alternatively, at least some of the fields in the PCIe transactions such as RequesterID, CompleterID, and DestinationBDF/BF, may be preconfigured, such as in a security-hardened system, e.g., in order to reduce the attack surface of the system.

The Accelerator/Processor may further perform address translations, opcode translations, command translations, TLP translations, and field translations between messages of the UALink-based protocol and protocol data units (PDUs)

of the PCIe-based Protocol, such as tag translations, traffic class (TC) translations, or cross-field translations, wherein the Accelerator/Processor may maintain tracking between tags of the UALink-based protocol domain and tags of the PCIe-based protocol domain, such as in order to associate responses with their corresponding requests. In some embodiments, the Accelerator/Processor may issue more than one PCIe transaction in response to receiving a UPLI request from the first entity, such as when splitting a UPLI read request for a large block of data to multiple smaller PCIe memory read requests, or when prefetching data from the second entity.

Figure 25B:
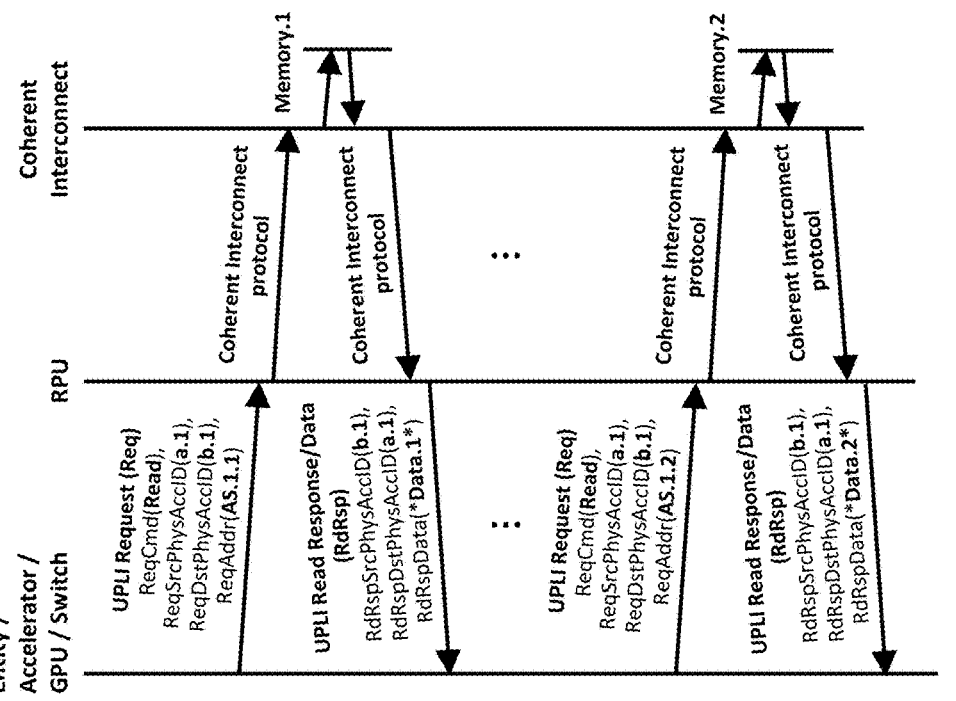
FIG. 25B illustrates one embodiment of a TFD demonstrating two UPLI requests forwarded to different memories mapped to a processor's coherent interconnect address space.
Figure 25A:
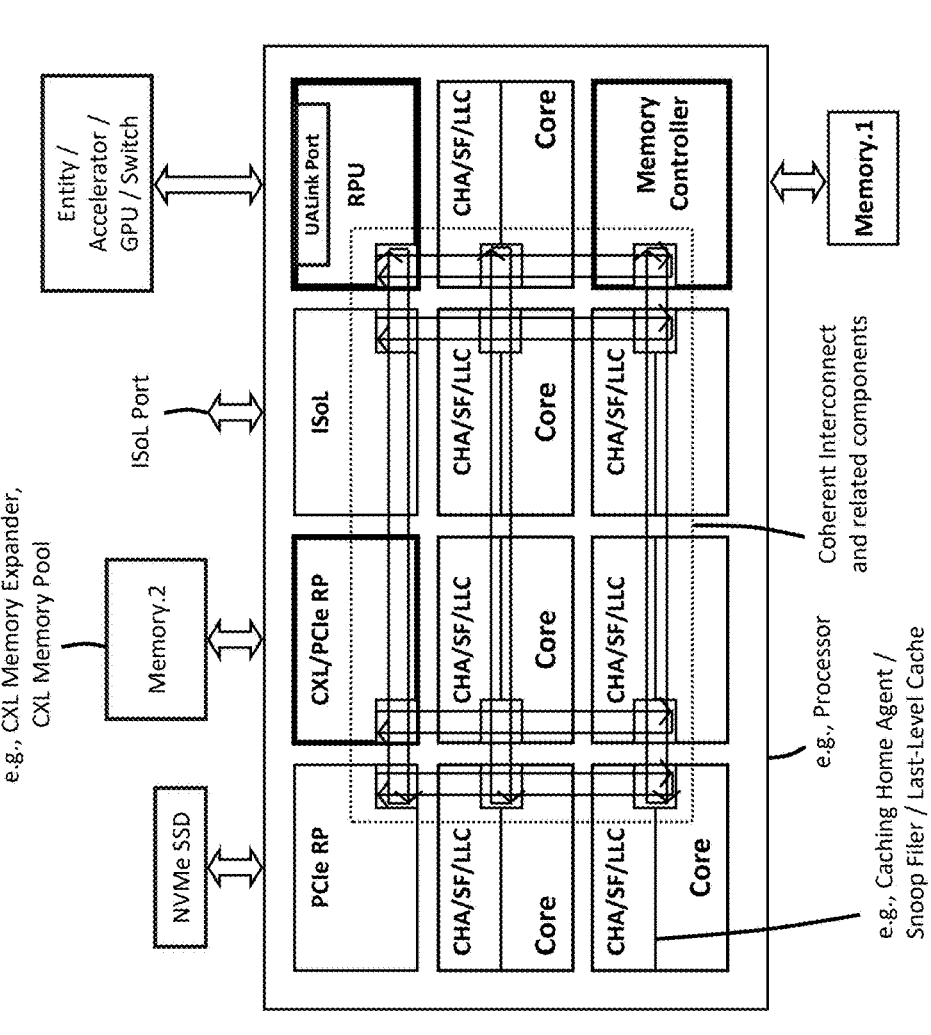
FIG. 25A illustrates one embodiment of a system comprising a processor comprising a UALink port coupled to the processor's coherent interconnect.

FIG. 25A illustrates one embodiment of a system comprising a processor including a coherent interconnect, capable of enabling an external entity to access memory resources mapped to an address space utilized by the coherent interconnect. Optionally, the processor is an MxPU derived from an established processor design that may include processing cores, caching/home agent (CHA), snoop filter (SF), and LLC, optionally implemented as slices distributed across tiles on the coherent interconnect mesh. The processor may further include a memory controller that may be coupled to a first memory (Memory.1), such as DRAM, a PCIe RP that may be coupled to an NVMe SSD, a CXL/PCIe RP that may be coupled to a second memory (Memory.2), such as a CXL memory expander or a CXL memory pool, and an ISoL port, such as a port utilizing NVIDIA NVLink-C2C, ARM CHI C2C, or Intel Coherent Processor Interconnect Protocol (ICPIP), such as Intel UPI or Intel UXI. The processor may further include an RPU that includes or coupled to a UALink port that may communicate with an entity, such as an accelerator, according to a UALink-based protocol, such as UPLI, wherein the RPU may perform physical address translations to enable the entity to access the first memory and/or the second memory. The illustrated RPU may be coupled to the coherent interconnect, and may translate between the UALink-based protocol and a protocol utilized by the coherent interconnect. The processor may be implemented as a monolithic die, as chiplets within an IC package, such as by utilizing separate compute die(s) and I/O die(s), or as components on a board, and may utilize a mesh-based coherent interconnect, or in other embodiments, may utilize a ring, a crossbar, or other types of coherent interconnects.

FIG. 25B illustrates one embodiment of a transaction flow diagram (TFD) demonstrating two UPLI requests, such as UPLI read requests, received from an entity and forwarded to different memories mapped to a coherent interconnect's address space. The RPU may perform physical address translations, such as from Network Physical Address (NPA) to Host Physical Address (HPA), to enable the entity to access the processor's memories. The processor may have multiple memory resources, such as first memory (Memory.1), which may be DRAM coupled to a memory controller of the processor, and/or second memory (Memory.2) that may be memory expanders that may be coupled to CXL RPs of the processor. The RPU may further perform additional translations, such as protocol translations from a UALink-based protocol, such as UPLI, to a protocol utilized by the coherent interconnect, and may send the optionally translated request to the coherent interconnect, requesting a read from memory. In some embodiments, the requested data may be provided by a processor cache, such as by an LLC, instead of by the memory. The data may then return over the coherent interconnect to the RPU, wherein the RPU provides UPLI read response/data (RdRsp) to the requesting entity. The TFD illustrates two exemplary transactions carrying different physical addresses mapped to different memory resources. The first exemplary transaction includes a UPLI Request (Req) with physical address (AS.1.1), which may be an NPA, which the RPU translates and forwards via the coherent interconnect protocol to the first memory, resulting in the retrieval of *Data.1* that is returned to the entity with the first UPLI Read Response/Data (RdRsp). The second exemplary transaction includes a UPLI Request (Req) with physical address (AS.1.2), which may be an NPA, which the RPU translates and forwards via the coherent interconnect protocol to the second memory, resulting in the retrieval of *Data.2* that is returned to the entity with the second UPLI Read Response/Data (RdRsp). The physical addresses (AS.1.1) and (AS.1.2) may belong to different memory regions within an NPA address space exposed via the UALink port, enabling the entity to access memory resources based on the RPU's translation capabilities.

Figures 26A, 26B:
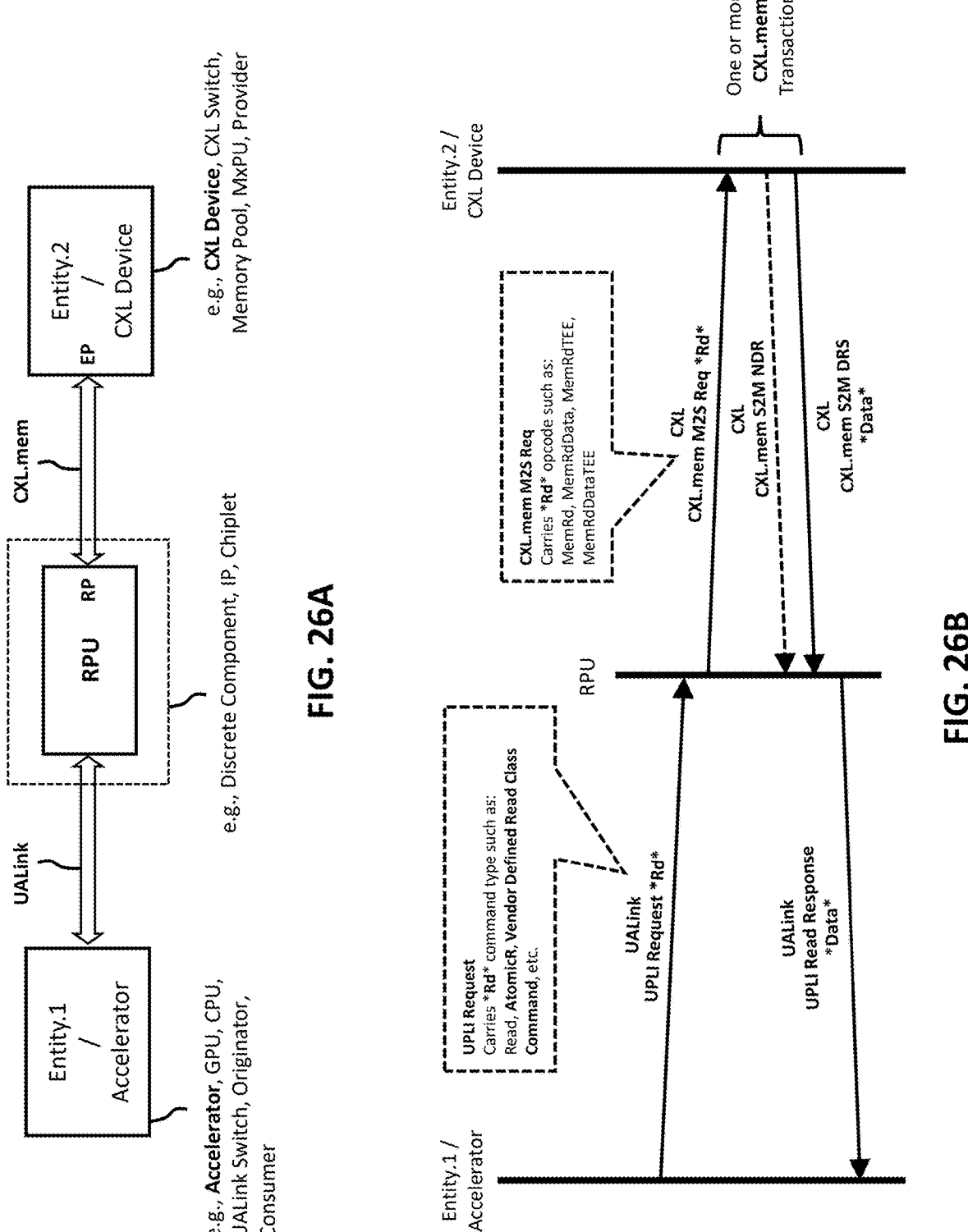
FIG. 26A illustrates one embodiment of a system comprising an apparatus that translates between a UALink-based protocol and a CXL.mem protocol.
FIG. 26B illustrates one embodiment of a TFD demonstrating translating between a UALink-based protocol and CXL.mem.

FIG. 26A illustrates one embodiment of a system comprising an apparatus, such as an RPU, which may translate between a UALink-based protocol (such as UPLI) and a CXL-based protocol (such as CXL.mem). Additionally or alternatively, the RPU may perform protocol translations between UPLI and CXL.io, and/or between UPLI and CXL.cache. In some embodiments, the RPU may be implemented as a discrete component, such as on a PCB, coupled to other components such as CPUs, GPUs, accelerators, switches, or CXL devices. In other embodiments, the RPU may be embedded in another silicon design, such as an IP within a processor, or may be implemented as a chiplet within an IC package.

FIG. 26B illustrates one embodiment of a TFD demonstrating an apparatus, such as an RPU, that may perform a protocol translation between a UALink-based protocol, such as UPLI, and a CXL-based protocol, such as CXL.mem. Additionally or alternatively, the RPU may perform protocol translations between UPLI and CXL.io, and/or between UPLI and CXL.cache. The RPU may receive from a first entity (Entity.1), such as an accelerator, a UALink UPLI transaction comprising a UPLI Request that may carry a *Rd* command type, translate the UPLI transaction to a CXL.mem transaction comprising a CXL.mem M2S Request that may carry a *Rd* opcode, and send the translated transaction to a second entity (Entity.2), such as a CXL device. The asterisks in the UPLI Request *Rd* command type indicate that this could represent any suitable superset combination of read commands, operations, or opcodes, supported by the UPLI protocol, such as Read, AtomicR, or Vendor Defined Read Class Command, etc. The asterisks in the translated CXL.mem M2S Request *Rd* opcode indicate that this could represent any suitable superset combination of read opcodes, commands, or operations, supported by the CXL.mem protocol, such as MemRd, MemRdData, MemRdTEE, MemRdDataTEE, etc. The RPU may further translate between other fields of the UPLI transaction and fields of the CXL.mem transaction, such as between address fields, tag fields, QoS-related fields, or identification (ID) fields that may serve to route the UPLI Request to its target.

In some embodiments, the RPU may translate a single UPLI transaction to more than one CXL.mem transactions, such as when the UPLI request may comprise a request length field, such as ReaLen, that may carry values representing a read of up to 256 Bytes of data, wherein the RPU may translate such UPLI requests to multiple CXL.mem M2S Requests, that each may carry 64 Bytes of data that may represent a cacheline. The RPU may further translate between CXL.mem responses, such as CXL.mem S2M NDR and/or CXL.mem S2M DRS, and UPLI responses, such as UPLI Read Response, and may forward read data carried in CXL.mem DRS messages into the UPLI Read Response. In some embodiments, the RPU may accumulate data from one or more CXL.mem DRS messages before sending the data via the UPLI Read Response.

Figures 27A, 27B:
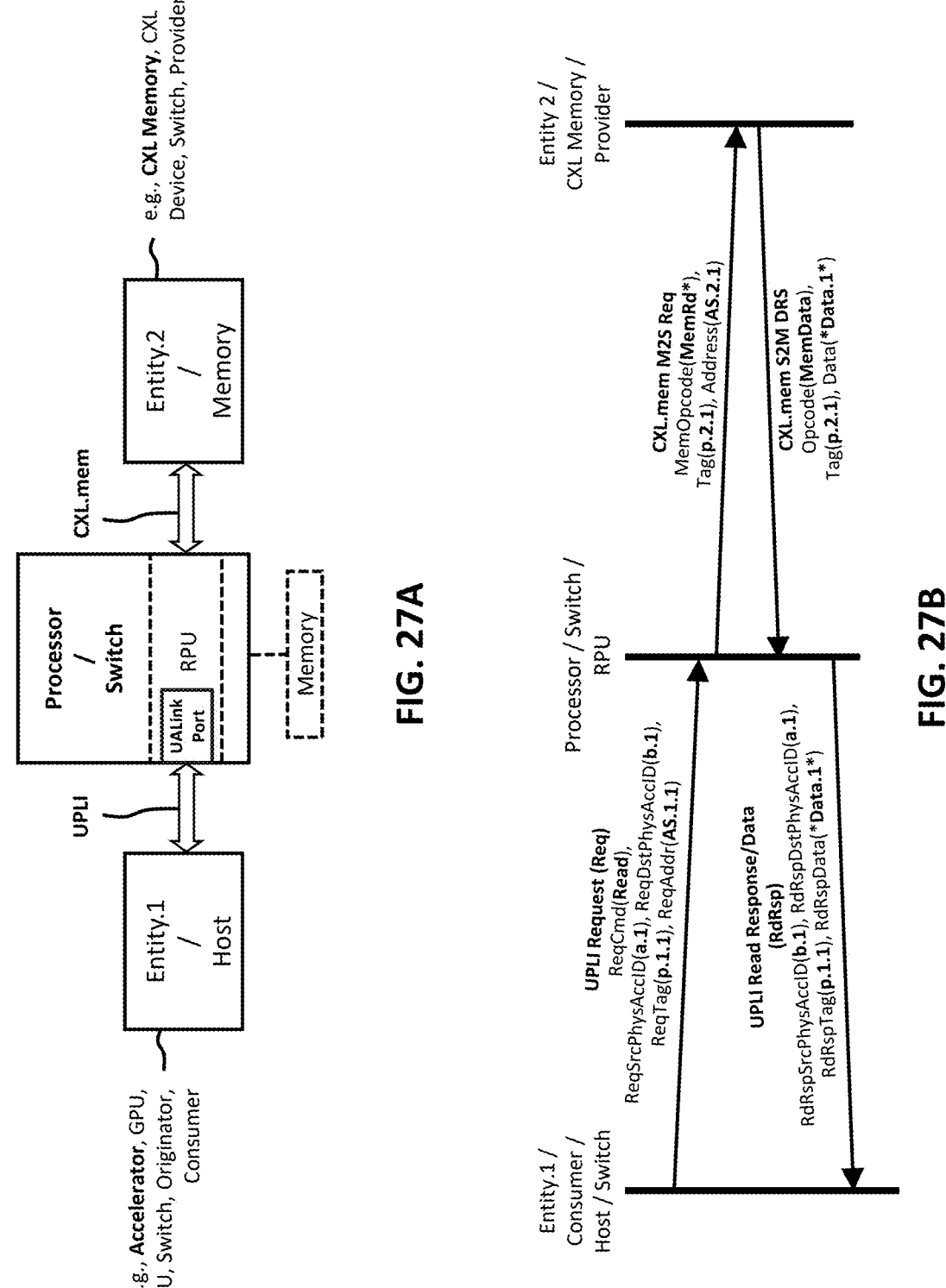
FIG. 27A illustrates one embodiment of a system comprising a processor that translates between UPLI and CXL.mem.
FIG. 27B illustrates one embodiment of a TFD demonstrating translations between a UPLI protocol and a CXL.mem protocol.

FIG. 27A illustrates one embodiment of a system comprising a processor or a switch, which may include memory, and may further include an RPU that includes a UALink port, enabling external entities to access resources coupled to the processor via the UALink port. The processor is coupled to a first entity (Entity.1), which may be an accelerator, a GPU, a CPU, a second switch, or an originator, wherein the processor may communicate with the first entity according to a UPLI protocol. The processor is further coupled to a second entity (Entity.2), which may be a CXL memory, a CXL device, or a third switch, wherein the processor may communicate with the second entity according to a CXL.mem protocol. In some embodiments, the UPLI protocol may be associated with a first physical address space, such as an NPA space, and the CXL.mem protocol may be associated with a second physical address spaces, such as an HPA space; wherein the RPU may perform address translations between addresses within the first and second physical address spaces, respectively, such as between addresses within the NPA space and addresses within the HPA space. In other embodiments, the UPLI protocol and the CXL.mem protocol may be associated with the same physical address space, such as a global address space; wherein the RPU may perform address translations between addresses within the same physical address spaces. Optionally, the RPU may perform further translations, such as opcode or command translations, e.g., translating between Read commands in UPLI request messages and MemRd opcodes in CXL.mem request messages. The RPU may further perform other translations, such as field translations between messages of the UPLI protocol and messages of the CXL.mem protocol, such as translations of tags and translations of error indications, such as poison.

FIG. 27B illustrates one embodiment of a TFD demonstrating translations performed by a processor, a switch, or by an RPU, between a UPLI protocol utilized for communicating with a first entity (Entity.1), such as an accelerator, a GPU, a CPU, a second switch, or an originator, and a CXL.mem protocol utilized for communicating with a second entity (Entity.2), such as a CXL device or CXL memory. The first entity may initiate a UPLI transaction that may include a UPLI Request (Req) comprising Request Command (e.g., ReqCmd(Read)), Request Source Physical Accelerator ID (e.g., ReqSrcPhysAccID(a.1)), Request Destination Physical Accelerator ID (e.g., ReqDstPhysAccID (b.1)), Request Tag (e.g., ReqTag(p.1.1)), and Request Address (e.g., ReqAddr(AS.1.1)). The RPU may translate the UPLI transaction to a CXL.mem transaction that includes a CXL.mem M2S Request comprising MemOpcode(MemRd*), Tag(p.2.1), and Address(AS.2.1), and may send the CXL.mem M2S Request to the second entity.

Upon receiving a response from the second entity, that may include a CXL.mem S2M DRS comprising Opcode (MemData), Tag(p.2.1), and Data(*Data.1*), the RPU may translate the CXL.mem S2M DRS to a UPLI Read Response/Data (RdRsp) comprising Read Response Source Physical Accelerator ID (e.g., RdRspSrcPhysAccID(b.1)), Read Response Destination Physical Accelerator ID (e.g., RdRspDstPhysAccID(a.1)), Read Response Transaction Tag (e.g., RdRspTag(p.1.1)), and Read Response Data (e.g., RdRspData(*Data.1*)). The RPU may perform further translations, such as opcode or command translations, e.g., translating between Read commands in UPLI request messages and MemRd opcodes in CXL.mem request messages. The RPU may further perform other translations, such as field translations between messages of the UPLI protocol and messages of the CXL.mem protocol, such as translations of tags and translations of error indications, such as poison. In some embodiments, the RPU may act as an endpoint, or may act as a completer device, and may terminate the UPLI transactions. The RPU may issue the CXL.mem transactions, optionally acting as an independent protocol initiator, such as a CXL host, and may utilize translated fields from the UPLI transaction for constructing the CXL.mem transaction.

Figures 28A, 28B:
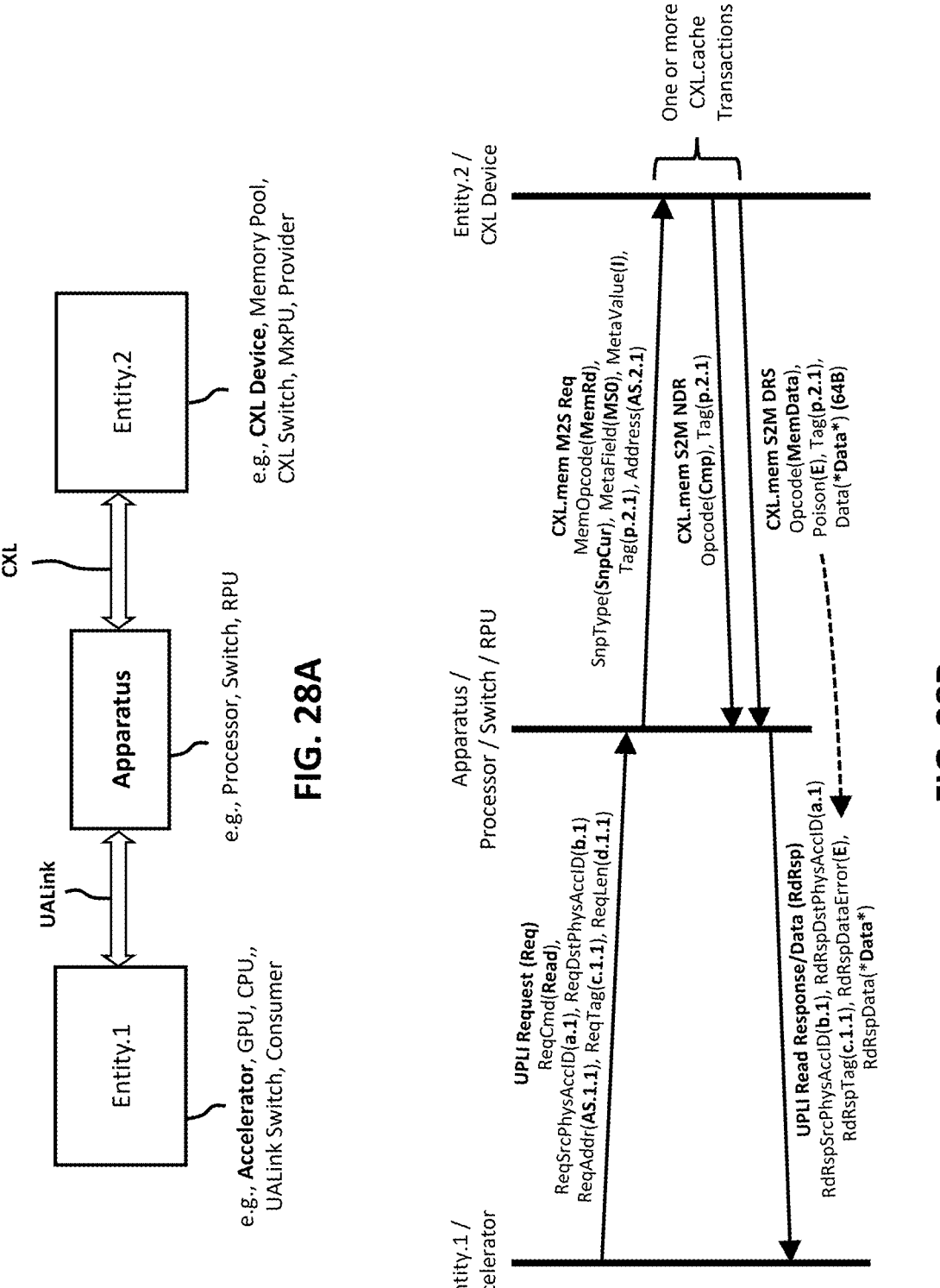
FIG. 28A illustrates one embodiment of a system comprising an apparatus that enables UALink-based entities to access CXL-based resources coupled to the apparatus.
FIG. 28B illustrates one embodiment of a TFD demonstrating intent-based translation between UPLI and CXL.mem.

FIG. 28A illustrates one embodiment of a system comprising an apparatus (such as a processor, a switch, or an RPU) that enables external entities to access resources coupled to the apparatus, such as CXL devices or CXL memory. The apparatus is coupled to a first entity (Entity.1), which may be an accelerator, a GPU, a CPU, a UALink switch, or a consumer, wherein the apparatus may communicate with the first entity according to a UALink-based protocol, such as a UPLI. The apparatus is further coupled to a second entity (Entity.2), which may be a CXL device, CXL memory, CXL-based memory pool, a CXL switch, an MxPU, or a provider, wherein the apparatus may communicate with the second entity according to a CXL-based protocol, such as CXL.mem. In some embodiments, the UALink-based protocol, such as UPLI, may be associated with a first address space, such as an NPA space, and the CXL-based protocol, such as CXL.mem, may be associated with a second address space, such as an HPA space; wherein the apparatus may perform address translations between addresses within the first and second address spaces, respectively, such as between addresses within the NPA space and addresses within the HPA space. In other embodiments, the UALink-based protocol, such as UPLI, and the CXL-based protocol, such as CXL.mem, may be associated with the same physical address space, such as a global address space; wherein the apparatus may perform address translations between addresses within the same address spaces. The apparatus may perform further translations, such as opcode or command translations, e.g., translating between Read commands in UPLI request messages and MemRd opcodes in CXL.mem request messages. The apparatus may further perform other translations, such as field translations between messages of the UPLI protocol and messages of the CXL.mem protocol, such as translations of tags and translations of error indications, such as poison.

FIG. 28B illustrates one embodiment of a TFD demonstrating an apparatus, such as a processor, a switch, or an RPU, that may perform a protocol translation between a UALink-based protocol, such as UPLI, and a CXL-based protocol, such as CXL.mem. Additionally or alternatively, the RPU may perform protocol translations between UPLI and CXL.io, and/or between UPLI and CXL.cache. The apparatus may provide intent-based translation between protocols, such as between UPLI and CXL.mem, identifying the intent of a received transaction, and generation a translated transaction that may convey a corresponding intent, or convey an intent based on a predefined, predetermined, configurable, rule-based, or dynamic mapping between intentions. The apparatus may receive from a first entity (Entity.1), such as an accelerator, a UALink UPLI transaction that may include a UPLI Request comprising Request Command (e.g., ReqCmd(Read)), Request Source Physical Accelerator ID (e.g., ReqSrcPhysAccID(a.1)), Request Destination Physical Accelerator ID (e.g., ReqDstPhysAccID (b.1)), Request Address (e.g., ReqAddr(AS.1.1)), Request Tag (e.g., ReqTag(c.1.1)), and Request Length (e.g., ReqLen (d.1.1)). The received UPLI transaction may indicate an intent to perform an I/O-coherent read, e.g., a request for the most recent copy of the data, corresponding to an I/O coherency model that may be typical for UALink.

The apparatus may translate the UPLI transaction to a CXL.mem transaction, that may include a CXL.mem M2S Request comprising Memory Operation (e.g., MemOpcode (MemRd)), Snoop Type (e.g., SnpType(SnpCur)), Metadata Field (e.g., MetaField(MSO)), Metadata Value (e.g., Meta-Value(I)(, Tag(p.2.1), and Address(AS.2.1). This translation from UPLI to CXL.mem may indicate an intent to perform an I/O-coherent read, via a CXL.mem request for a non-cacheable but current value of the data, wherein the data may be represented as 64B cachelines that correspond to the Request Length (e.g., ReqLen(d.1.1)) in the UPLI Request. The apparatus may further translate between other fields of the UPLI transaction and fields of the CXL.mem transaction, such as between address fields, tag fields, QoS-related fields, or identification (ID) fields that may serve to route the UPLI Request to its destination.

In some embodiments, the apparatus may translate a single UPLI transaction to more than one CXL.mem transaction, such as when the UPLI request comprises a request length field (e.g., ReqLen), which may carry values indicating a read of more than 64 Bytes of data, wherein the RPU may translate such UPLI requests to multiple CXL.mem M2S Requests, that each may carry up to 64 Bytes of data, possibly representing a 64 Byte cacheline. The apparatus may further translate between CXL.mem responses, such as CXL.mem S2M NDR and/or CXL.mem S2M DRS, and UPLI responses, such as UPLI Read Responses, and may forward read data carried in CXL.mem DRS messages via UPLI Read Responses.

In some embodiments, the apparatus may receive a response from the second entity (Entity.2), which may include a CXL.mem S2M NDR comprising Opcode(Cmp) and Tag(p.2.1), and may further include a CXL.mem S2M DRS comprising Opcode(MemData), Poison(E), Tag(p.2.1), and Data(*Data*). The apparatus may translate the CXL.mem S2M DRS to a UPLI Read Response/Data (RdRsp) comprising Read Response Source Physical Accelerator ID (e.g., RdRspSrcPhysAccID(b.1)), Read Response Destination Physical Accelerator ID (e.g., RdRspDstPhys-AccID(a.1)), Read Response Transaction Tag (e.g., RdR-spTag(c.1.1)), Read Response Data Error (e.g., RdRspDataError(E)), and Read Response Data (e.g., RdRspData (*Data*)). This translation demonstrates that the apparatus may propagate error responses from the CXL domain to the UALink/UPLI domain, such as by translating error indications carried in CXL.mem S2M DRS messages, such as poison, to error indications carried in UPLI Read Response/Data (RdRsp) messages, such as Read Response Data Error (e.g. RdRspDataError). Additionally, the apparatus may accumulate data from one or more CXL.mem DRS messages before sending the data via the UPLI Read Response.

Figure 29B:
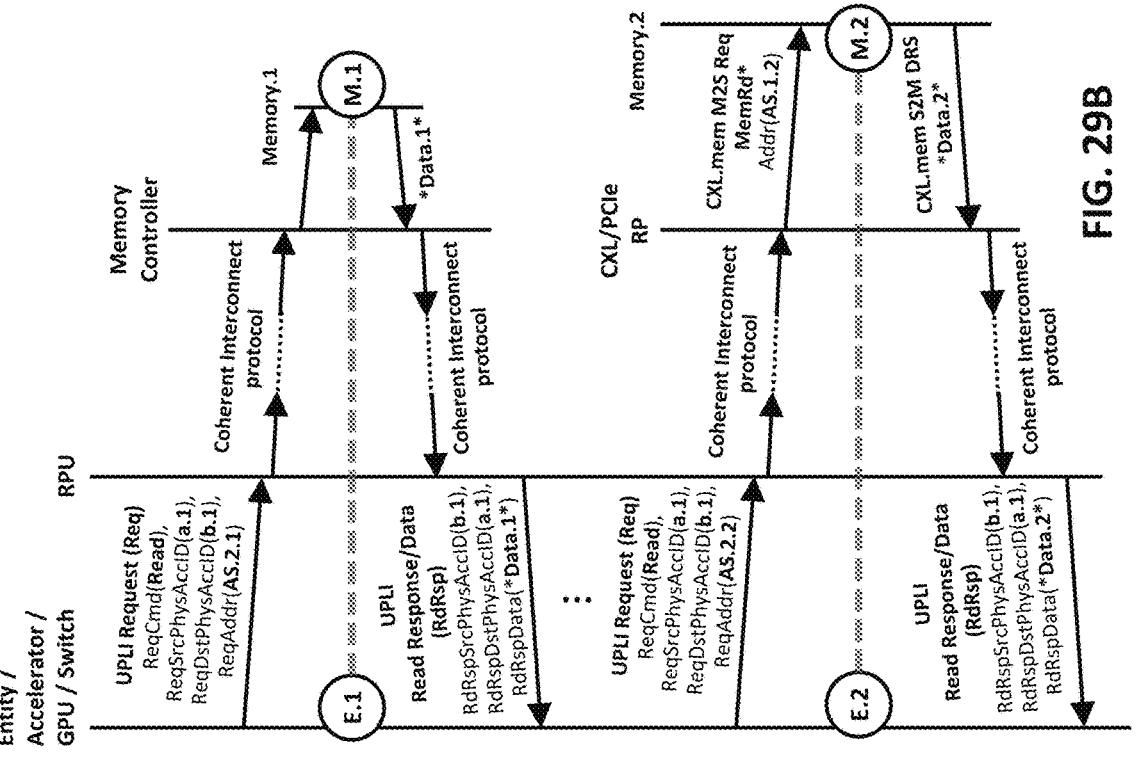
FIG. 29B illustrates one embodiment of a TFD demonstrating two UPLI requests forwarded to different memories mapped to an address space utilized by a processor's coherent interconnect.
Figure 29A:
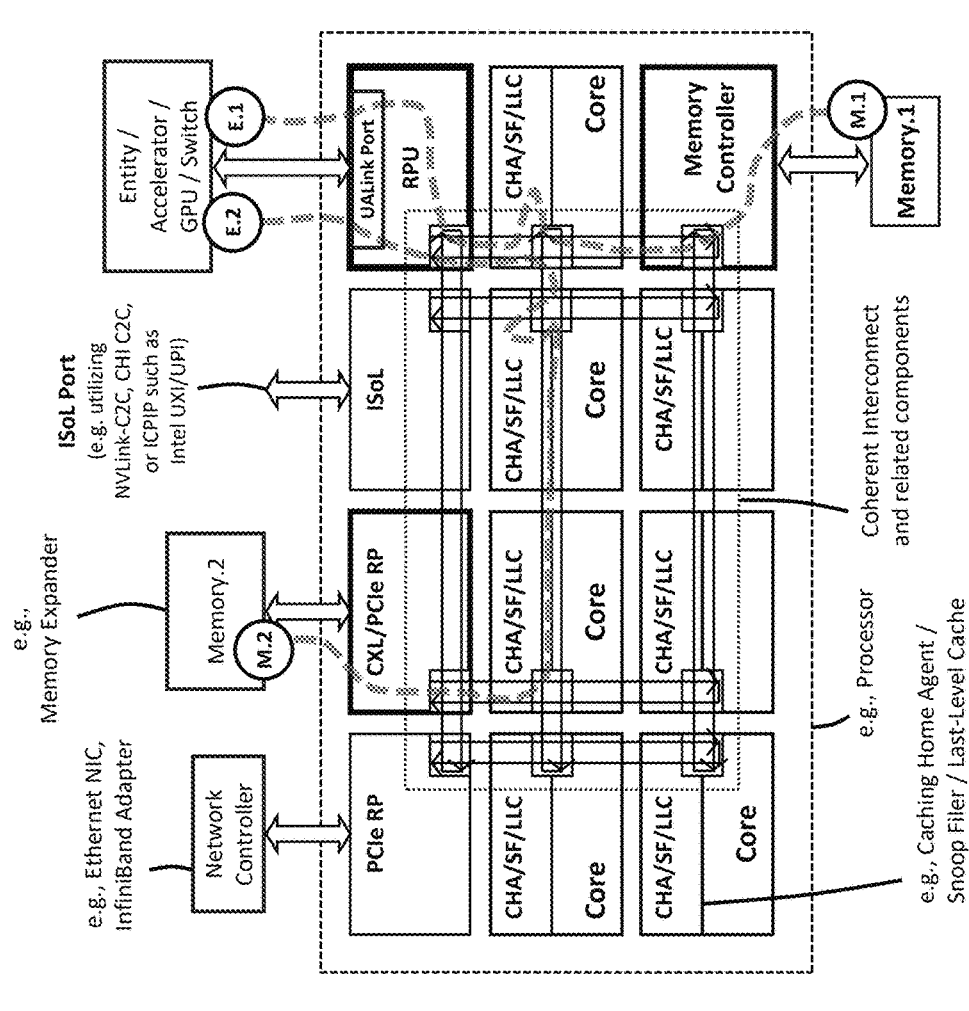
FIG. 29A illustrates one embodiment of a system comprising a processor comprising a UALink port enabling external entities to access memory resources mapped to an address space of the processor's coherent interconnect.

FIG. 29A illustrates one embodiment of a system comprising a processor, including a coherent interconnect, capable of enabling an external entity, such as GPU or accelerator, to access memory resources mapped to an address space utilized by the coherent interconnect, such as via one or more of the two illustrated paths denoted as (E.1)-(M.1) and (E.2)-(M.2). The processor may include processing cores, caching/home agent (CHA), snoop filter (SF), and LLC, optionally implemented as distributed slices coupled to the coherent interconnect. The processor may further include a PCIe RP that may be coupled to a Network Controller, such as an Ethernet NIC or an InfiniBand Adapter, a CXL/PCIe RP, a memory controller that may be coupled to a first memory (Memory.1), such as DRAM, and an ISoL port, such as a port utilizing NVIDIA NVLink-C2C, ARM CHI C2C, or Intel Coherent Processor Interconnect Protocol (ICPIP), e.g., Intel UPI, or Intel UXI. The processor may be coupled to a second memory (Memory.2), such as a CXL memory expander, and may further include an RPU that includes or coupled to a UALink port that may communicate with the entity according to a UALink-based protocol, such as UPLI, wherein the RPU may perform physical address translations to enable the entity to access the first memory, such as via the path (E.1)-(M.1), and/or access the second memory, such as via the path (E.2)-(M.2). The illustrated RPU may be coupled to the coherent interconnect, and may translate between the UALink-based protocol and a protocol utilized by the coherent interconnect. The processor may be implemented as an IP block embedded into a silicon design, such as a switch or an accelerator. In other embodiments, the processor may be implemented as a monolithic die, as chiplets within an IC package, or as components on aboard, and may utilize a mesh-based coherent interconnect, or in other embodiments, may utilize a ring, a crossbar, a Network on Chip (NoC) or other types of coherent interconnects.

FIG. 29B illustrates one embodiment of a TFD demonstrating two UPLI requests, such as UPLI read requests, received from an entity, such as a GPU or accelerator, processed by an RPU and forwarded, possibly using a protocol utilized by a coherent interconnect, to different memories mapped to an address space utilized by the coherent interconnect. The paths from the RPU to the different memories may optionally traverse other components, such as CHA/SF/LLC slices, memory controllers, or in other embodiments a home agent or a home node, optionally for resolving coherency. The RPU may perform physical address translations, such as from Network Physical Addresses (NPAs) to Host Physical Addresses (HPAs), to enable the entity to access the processor's memories. The processor may have multiple memory resources, such as first memory (Memory.1), which may be a DRAM coupled to a memory controller of the processor, and/or second memory (Memory.2), which may be a CXL memory expander coupled to a CXL/PCIe RP of the processor. The RPU may further perform additional translations, such as protocol translations from a UALink-based protocol, such as UPLI, to a protocol utilized by the coherent interconnect, and may send the optionally translated request to the coherent interconnect, requesting a read from memory. In some embodiments, the requested data may be provided by a processor cache, such as by an LLC, instead of by the memory. The data may then return over the coherent interconnect to the RPU, wherein the RPU provides UPLI read response/data (RdRsp) to the requesting entity.

The TFD illustrates two exemplary transactions between the entity and the RPU, corresponding to two distinct memory read paths denoted as (E.1)-(M.1) and (E.2)-(M.2), carrying different physical addresses mapped to different memory resources. The first exemplary transaction includes a first UPLI Request (Req) with physical address (AS.2.1), which may be an NPA, which the RPU translates and forwards via the coherent interconnect protocol and via the memory controller to the first memory (Memory.1), resulting in the retrieval of *Data.1*, that is sent to the entity via the coherent interconnect protocol and via the RPU with the first UPLI Read Response/Data (RdRsp). The second exemplary transaction includes a second UPLI Request (Req) with physical address (AS.2.2), which may be an NPA, which the RPU may translate to physical address (AS.1.2) and forward to the second memory (Memory.2), via the coherent interconnect protocol and via the CXL/PCIe RP, utilizing a CXL.mem M2S Request. *Data.2* is retrieved from the second memory via a CXL.mem S2M DRS, and sent to the RPU via the coherent interconnect protocol. The RPU may then send *Data.2* to the entity via the second UPLI Read Response/Data (RdRsp). It is noted that the physical addresses (AS.2.1) and (AS.2.2) may belong to different memory regions within an NPA address space exposed via the UALink port, enabling the entity to access memory resources based on the RPU's translation capabilities.

Figures 30A, 30B:
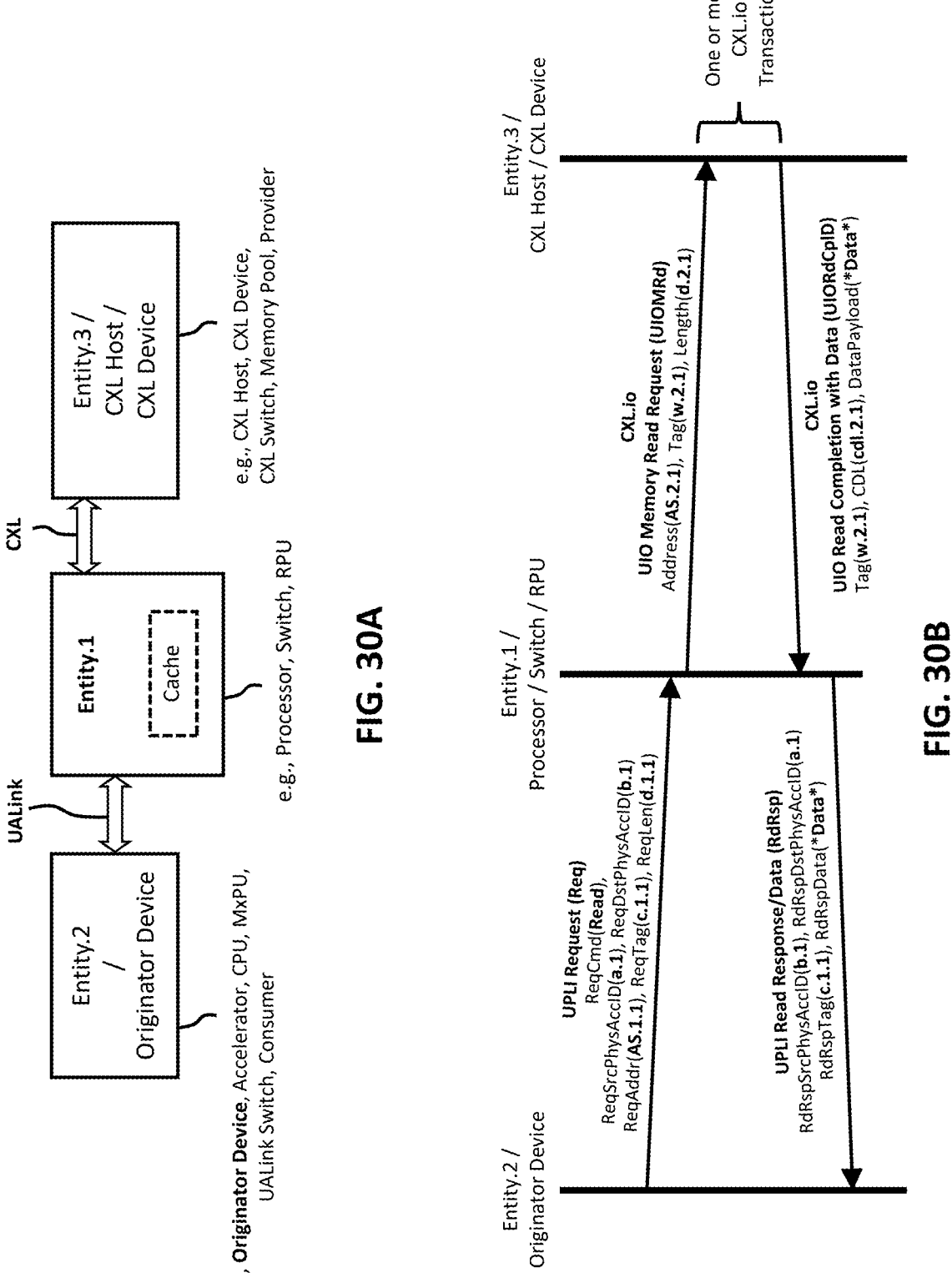
FIG. 30A illustrates one embodiment of a system comprising an entity that enables UALink-based resource consumers to access CXL-based resources coupled to the entity.
FIG. 30B illustrates one embodiment of a TFD demonstrating protocol translations between a UALink UPLI Read Request and CXL.io UIO Memory Read Request (UIOMRd)

FIG. 30A illustrates one embodiment of a system comprising a first entity (Entity.1), such as a processor, a switch, or an RPU, optionally comprising a cache, which enables UALink-based resource consumers to access resources coupled to the first entity, such as CXL hosts, CXL devices, or CXL memory. The first entity is coupled to a second entity (Entity.2), which may be a UALink-based originator device, an accelerator, a GPU, a CPU, an MxPU, a UALink switch, or a consumer, wherein the first entity may communicate with the second entity according to a UALink-based protocol, such as a UPLI. The first entity is further coupled to a third entity (Entity.3), which may be a CXL host, a CXL device, a CXL switch, a CXL-based memory pool, CXL memory, or a provider, wherein the first entity may communicate with the third entity according to a CXL-based protocol, such as at least one of CXL.io, CXL.mem, or CXL.cache. In some embodiments, the UALink-based protocol, such as UPLI, may be associated with a first address space, such as an NPA space, and the CXL-based protocol, such as CXL.io, may be associated with a second address space, such as a System Physical Address (SPA) space or a Host Physical Address (HPA) space; wherein the first entity may perform address translations between addresses within the first and second address spaces, respectively, such as between addresses within the NPA space and addresses within the SPA space or the HPA space.

In other embodiments, the UALink-based protocol, such as UPLI, and the CXL-based protocol, such as CXL.io, may be associated with the same physical address space, such as a global address space, a pod address space, or a fabric address space; wherein the first entity may perform address translations between addresses within the same address spaces. The first entity may perform further translations, such as opcode, command, or TLP translations, e.g., translating between Read commands in UPLI request messages and MRd/UIOMRd TLPs in CXL.io request messages. The first entity may further perform other translations, such as field translations between messages of the UPLI protocol and messages of the CXL protocol, such as translations of tags and translations of error indications, such as data corruption indications or poison.

FIG. 30B illustrates one embodiment of a TFD demonstrating a first entity (Entity.1), such as a processor, a switch, or an RPU, that may perform protocol translations between a UALink-based protocol, such as UPLI, and a CXL-based protocol, such as CXL.io. Additionally or alternatively, the first entity, may perform protocol translations between UPLI and CXL.mem, and/or between UPLI and CXL.cache. The first entity may receive from a second entity (Entity.2), which may be a UALink-based originator device, an accelerator, a GPU, a CPU, an MxPU, a UALink switch, or a consumer, a UALink UPLI transaction that may include a UPLI Request comprising Request Command (e.g. ReqCmd (Read)), Request Source Physical Accelerator ID (e.g., ReqSrcPhysAccID(a.1)), Request Destination Physical Accelerator ID (e.g., ReqDstPhysAccID(b.1)), Request Address (e.g., ReqAddr(AS.1.1)), Request Tag (e.g., ReqTag(c.1.1)), and Request Length (e.g., ReqLen(d.1.1)). The first entity may translate the UPLI transaction to a CXL.io transaction that may include CXL.io Memory Read Request (MRd) or CXL.io UIO Memory Read Request (UIOMRd) comprising Address(AS.2.1), Tag(w.2.1), and Length(d.2.1). Alternatively or additionally, the first entity may translate the UPLI transaction to a PCIe transaction that may include a PCIe MRd TLP or a PCIe UIOMRd TLP.

The first entity may further translate between other fields of the UPLI transaction and fields of the CXL.io transaction, such as between address fields, tag fields, QoS-related fields, or identification (ID) fields that may serve to route the UPLI Request to its destination. In some embodiments, the first entity may translate a single UPLI transaction to more than one CXL.io transaction, such as in order to split a large data read request (e.g., splitting a large 256B UPLI read request to multiple 64B smaller CXL.io read requests), or in order to prefetch data, optionally into a cache that may be included in or coupled to the first entity.

The first entity (Entity.1) may further translate between CXL.io responses or completions, such as CXL.io Completion with Data (CpID) or CXL.io UIO Read Completion with Data (UIORdCpID), and UPLI responses, such as UPLI Read Responses, and may forward data carried in CXL.io completions into UPLI Read Responses. Alternatively or additionally, the first entity may further translate between PCIe responses or completions, such as a PCIe CpID TLP or a PCIe UIORdCpID TLP, and UPLI responses, such as UPLI Read Responses, and may forward data carried in PCIe completions into UPLI Read Responses. In some embodiments, upon receiving a response from the second entity, that may include a CXL.io UIO Read Completion with Data (UIORdCpID) comprising Tag(w.2.1), CDL (cdl.2.1), and DataPayload(*Data*), the first entity may translate the CXL.io UIO Read Completion with Data (UIORdCpID) to a UPLI Read Response/Data (RdRsp) comprising Read Response Source Physical Accelerator ID (e.g., RdRspSrcPhysAccID(b.1)), Read Response Destination Physical Accelerator ID (e.g., RdRspDstPhysAccID (a.1)), Read Response Transaction Tag (e.g., RdRspTag (c.1.1)), and Read Response Data (e.g., RdRspData (*Data*)).

The CDL field that may be included in the CXL.io UIO Read Completion with Data (UIORdCpID) may denote a CXL DevLoad (CDL) field, and may be populated with information related to Quality-of-Service (QoS), such as QoS telemetry value or values. The first entity may be configured to translate information carried in the CDL field and send it via one or more fields of the UPLI Read Response/Data (RdRsp), such as vendor-defined fields, custom fields, or reserved fields.

In some embodiments, the first entity (Entity.1) may accumulate data from one or more CXL.io TLPs, such as CpID TLPs or UIORdCpID TLPs, before sending the data via the UPLI Read Response. Optionally, the first entity may propagate error responses from the CXL domain to the UALink/UPLI domain, such as by translating error indications carried in CXL.io TLPs, such as poison, to error indications carried in UPLI Read Response/Data (RdRsp) messages, such as Read Response Data Error (e.g., RdRsp- DataError). In some embodiments, the CXL protocol may support error forwarding (that may also be known as data poisoning), via indications such as an Error Poisoned (EP) bit in TLPs, or additionally, in some embodiments, through the use of Physical Layer Logical Block mechanisms.

Figures 31A, 31B:
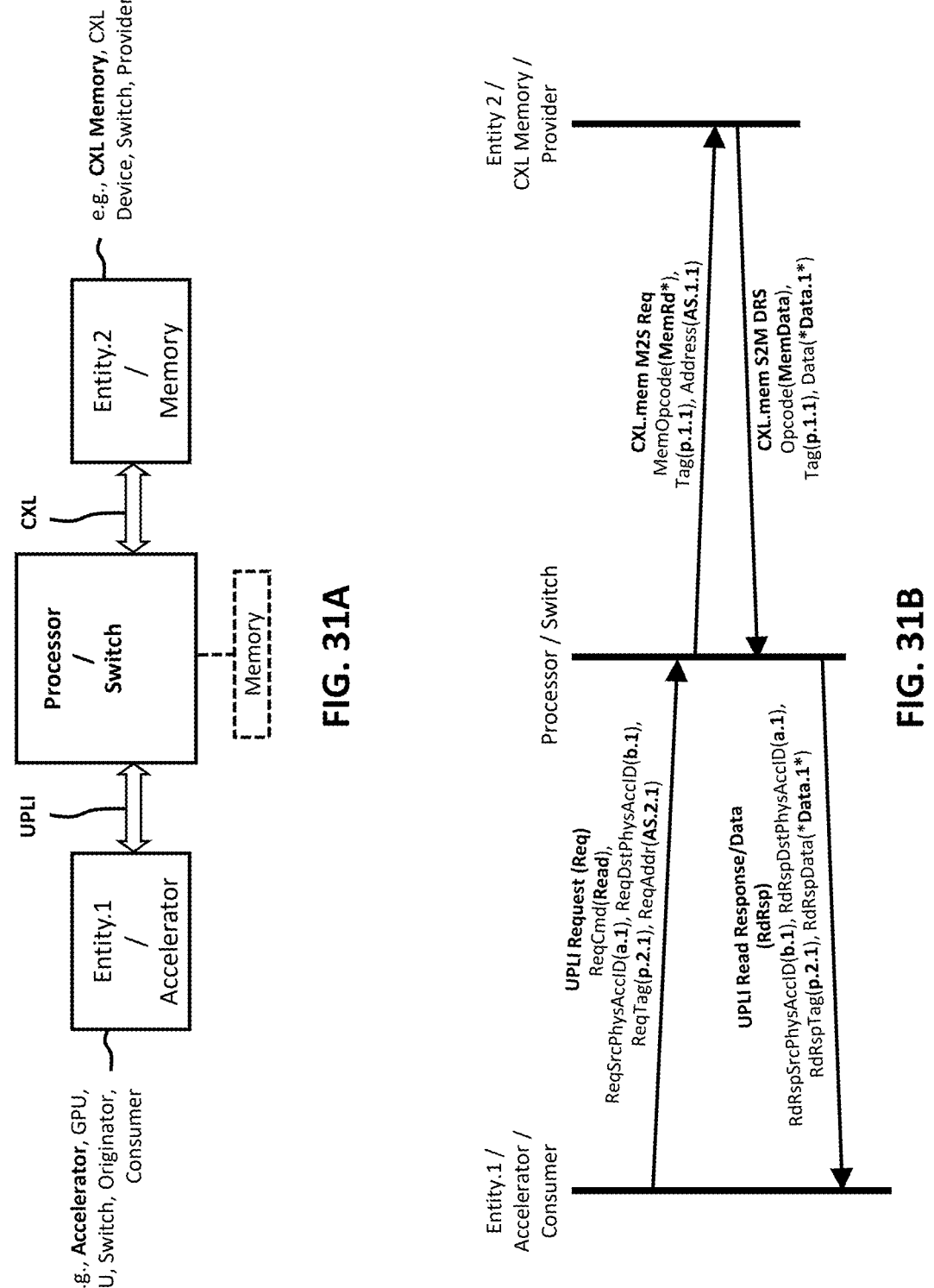
FIG. 31A illustrates one embodiment of a system comprising a processor or a switch that translates between a UALink-based protocol and a CXL-based protocol.
FIG. 31B illustrates one embodiment of a TFD demonstrating translations between a UPLI Request and a CXL.mem M2S Req MemRd.

FIG. 31A illustrates one embodiment of a system comprising a processor or a switch, which may be coupled to memory, wherein the processor may enable external entities to access resources coupled to the processor. The processor is coupled to a first entity (Entity.1), which may be an accelerator, a GPU, a CPU, a second switch, an originator, or a consumer, wherein the processor may communicate with the first entity according to a UALink-based protocol, such as UPLI. The processor is further coupled to a second entity (Entity.2), which may be a CXL memory, a CXL device, a third switch, or a provider, wherein the processor may communicate with the second entity according to a CXL-based protocol, such as at least one of CXL.mem, CXL.io, or CXL.cache.

In some embodiments, the UALink-based protocol, such as UPLI, may be associated with a first address space, such as an NPA space, and the CXL-based protocol, such as CXL.mem, may be associated with a second address space, such as a System Physical Address (SPA) space or a Host Physical Address (HPA) space; wherein the processor may perform address translations between addresses within the first and second address spaces, respectively, such as between addresses within the NPA space and addresses within the SPA space or the HPA space. In other embodiments, the UALink-based protocol, such as UPLI, and the CXL-based protocol, such as CXL.mem, may be associated with the same physical address space, such as with a global address space, a partitioned global address space (PGAS), a pod address space, a virtual pod address space, or a fabric address space; wherein the processor may perform address translations between addresses within the same address spaces. The processor may perform further translations, such as opcode, command, or TLP translations, e.g., translating between commands in request messages of the UALink-based protocol (e.g. UPLI vendor-defined read command) to opcodes in request messages of the CXL-based protocol (e.g., CXL.mem MemRd). The processor may further perform other translations, such as field translations between messages of the UALink-based protocol and the CXL-based protocol, such as tag translations, traffic class (TC) translations, or cross-field translations such as between CXL.mem Tag and UPLI ReqTag, and/or between UPLI RdRspTag and CXL.mem Tag, wherein the processor may maintain tracking between tags in the UPLI domain and tags in the CXL domain, such as in order to associate responses with their corresponding requests.

FIG. 31B illustrates one embodiment of a TFD demonstrating translations performed by a processor, or by a switch, between a UALink-based protocol, such as UPLI, utilized for communicating with a first entity (Entity.1), such as an accelerator, and a CXL-based protocol, such as CXL.mem, utilized for communicating with a second entity (Entity.2), such as a CXL device, a CXL memory, or a CXL switch. The first entity may initiate a UPLI transaction that may include a UPLI Request (Req) comprising Request Command (e.g., ReqCmd(Read)), Request Source Physical Accelerator ID (e.g., ReqSrcPhysAccID(a.1)), Request Destination Physical Accelerator ID (e.g., (ReqDstPhysAccID (b.1)), Request Tag (e.g., ReqTag(p.2.1)), and Request Address (e.g., ReqAddr(AS.2.1)). The processor may translate the UPLI transaction to a CXL.mem transaction that may include a CXL.mem M2S Request comprising MemOpcode(MemRd*), Tag(p.1.1), and Address(AS.1.1), and may send the CXL.mem M2S Request to the second entity. Upon receiving a response from the second entity, that may include a CXL.mem S2M DRS comprising Opcode(Mem-Data), Tag(p.1.1), and Data(*Data.1*), the processor may translate the CXL.mem S2M DRS to a UPLI Read Response/Data (RdRsp) comprising Read Response Source Physical Accelerator ID (e.g., RdRspSrcPhysAccID(b.1)), Read Response Destination Physical Accelerator ID (e.g., RdRspDstPhysAccID(a.1)), Read Response Transaction Tag (e.g., RdRspTag(p.2.1)), and Read Response Data (e.g., RdRspData(*Data.1*)). The processor may perform further translations, such as opcode or command translations, e.g., translating between vendor-defined read commands in UPLI request messages and MemRd opcodes in CXL.mem request messages. The processor may further perform other translations, such as field translations between messages of the UPLI protocol and messages of the CXL.mem protocol, such as translations of tags and translations of error indications, such as poison.

Figures 32A, 32B:
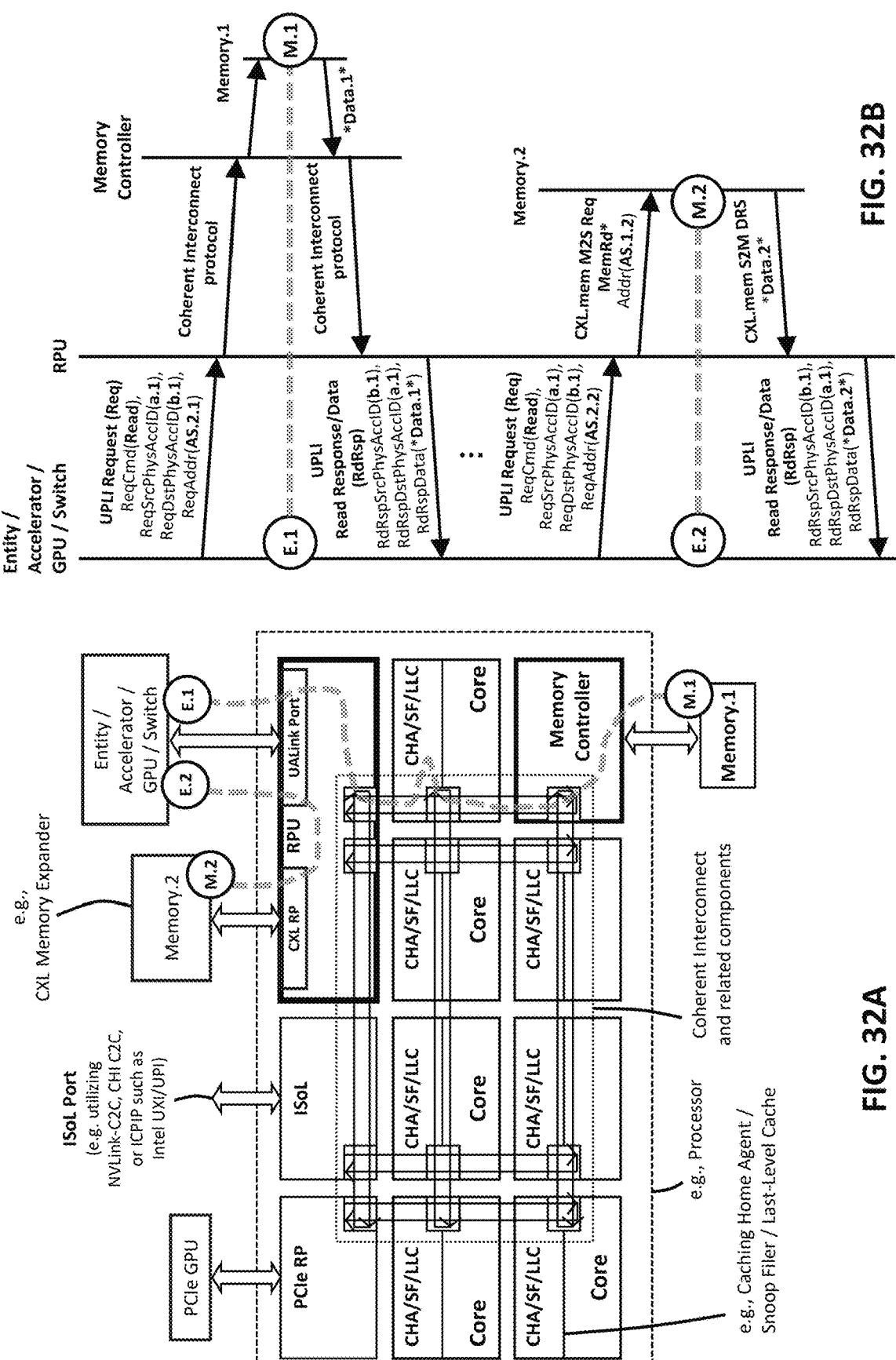
FIG. 32A illustrates one embodiment of a system comprising a processor comprising a coherent interconnect, a UALink port, and a CXL RP.
FIG. 32B illustrates one embodiment of a TFD demonstrating translating two UPLI requests to a coherent interconnect request and to a CXL.mem request.

FIG. 32A illustrates one embodiment of a system comprising a processor, including a coherent interconnect, capable of enabling an external entity, such as a GPU or an accelerator, to access memory resources mapped to an address space utilized by the coherent interconnect, such as via one or more of the two illustrated paths denoted as (E.1)-(M.1) and (E.2)-(M.2). The processor may include processing cores, caching/home agent (CHA), snoop filter (SF), and LLC, optionally implemented as distributed slices coupled to the coherent interconnect. The processor may further include a PCIe RP that may be coupled to a PCIe GPU, a memory controller that may be coupled to a first memory (Memory.1), such as DRAM, and an ISoL port, such as a port utilizing NVIDIA NVLink-C2C, ARM CHI C2C, or Intel Coherent Processor Interconnect Protocol (ICPIP), e.g., Intel UPI, or Intel UXI. The processor may include an RPU that includes or coupled to a UALink port that may communicate with the entity according to a UALink-based protocol, such as UPLI, wherein the RPU further includes a CXL RP coupled to a second memory (Memory.2), such as a CXL memory expander. The RPU may perform physical address translations to enable the entity to access the first memory, such as via the path (E.1)-(M.1), and/or access the second memory, such as via the path (E.2)-(M.2). The illustrated RPU may be coupled to the coherent interconnect, and may translate between the UALink-based protocol and a protocol utilized by the coherent interconnect. The processor may utilize a mesh-based coherent interconnect, or in other embodiments, may utilize a ring, a crossbar, a Network on Chip (NoC) or other types of coherent interconnects.

FIG. 32B illustrates one embodiment of a TFD demonstrating two UPLI requests, such as UPLI read requests, received from an entity, such as a GPU or an accelerator, processed by an RPU and forwarded, possibly using a protocol utilized by a coherent interconnect of a processor, to different memories mapped to an address space utilized by the coherent interconnect. The paths from the RPU to the different memories may optionally traverse other components, such as CHA/SF/LLC slices, memory controllers, or in other embodiments a home agent or a home node, optionally for resolving coherency. The RPU may perform physical address translations, such as from Network Physical Addresses (NPAs) to Host Physical Addresses (HPAs), or from NPAs to System Physical Addresses (SPAs), to enable the entity to access memory resources of the processor. The processor may have multiple memory resources, such as first memory (Memory.1), which may be a DRAM coupled to a memory controller of the processor, and/or second memory (Memory.2), which may be a CXL memory expander coupled to a CXL RP of the processor, wherein the CXL RP may be included in the RPU. The RPU may further perform additional translations, such as protocol translations, between a UALink-based protocol, such as UPLI, and a protocol utilized by the coherent interconnect, wherein the RPU may send the optionally translated UPLI requests to the coherent interconnect, requesting reads from memory, such as from the first memory or from the second memory. The RPU may perform additional protocol translations between the UALink-based protocol, such as UPLI, and a CXL-based protocol, such as at least one of CXL.mem, CXL.io, or CXL.cache, wherein the RPU may send the optionally translated UPLI requests to the second memory via the CXL RP. In some embodiments, the requested data may be provided by a cache of the processor, such as by an LLC, instead of by the memory. The data may then return over the coherent interconnect to the RPU, wherein the RPU provides UPLI read response/data (RdRsp) to the requesting entity.

The TFD illustrates two exemplary transactions between the entity and the RPU, corresponding to two distinct memory read paths denoted as (E.1)-(M.1) and (E.2)-(M.2), carrying different physical addresses mapped to different memory resources. The first exemplary transaction corresponds to the memory read path denoted as (E.1)-(M.1), and may include a first UPLI Request (Req) with physical address (AS.2.1), which may be an NPA, which the RPU may translate and forward via the coherent interconnect protocol and via the memory controller to the first memory, resulting in the retrieval of *Data.1*, that is sent to the entity via the coherent interconnect protocol and via the RPU with the first UPLI Read Response/Data (RdRsp). The second exemplary transaction corresponds to the memory read path denoted as (E.2)-(M.2), and may include a second UPLI Request (Req) with physical address (AS.2.2), which may be an NPA. The RPU may translate the second UPLI request to a CXL.mem M2S Request comprising MemRd* opcode and Address(AS.1.2), wherein the RPU may send the translated request to the second memory via the CXL RP. *Data.2* is retrieved from the second memory via a CXL.mem S2M DRS, and sent to the RPU via the CXL RP, wherein the RPU may send *Data.2* to the entity via the second UPLI Read Response/Data (RdRsp).

FIG. 33A illustrates one embodiment of a system comprising a cable, such as an active cable, referred to as Cable/RPU, which may perform translations between a UALink-based protocol, such as UPLI, and a CXL-based protocol, such as at least one of CXL.io, CXL.mem, or CXL.cache. The Cable/RPU enables a first entity (Entity.1), which may be an accelerator, a GPU, a CPU, a UALink switch, a UPLI originator, or a resource consumer, to access, via a UALink-based port, via the Cable/RPU, and via a CXL-based port, resources, such as memory, coupled to a second entity (Entity.2), which may be a host, a CPU, a CXL switch, a CXL device, a memory expander, a memory pool, or a resource provider. The Cable/RPU, which may include an RPU, may communicate with the first entity according to a UALink-based protocol, such as a UPLI, and may communicate with the second entity according to a CXL-based protocol, such as at least one of CXL.io, CXL.mem, or CXL.cache. In some embodiments, the UALink-based protocol, such as UPLI, may be associated with a first address space, such as an NPA space, and the CXL-based protocol, such as CXL.mem, may be associated with a second address space, such as a System Physical Address (SPA) space or a Host Physical Address (HPA) space; wherein the Cable/RPU may perform address translations between addresses within the first and second address spaces, respectively, such as between addresses within the NPA space and addresses within the SPA space or the HPA space.

In other embodiments, the UALink-based protocol, such as UPLI, and the CXL-based protocol, such as CXL.mem, may be associated with the same physical address space, such as a global address space, a pod address space, or a fabric address space; wherein the Cable/RPU may perform address translations between addresses within the same address spaces. The Cable/RPU may perform further translations, such as opcode, command, or TLP translations, e.g., translating between Read commands in UPLI request messages and read opcodes in CXL.cache D2H request messages. The Cable/RPU may further perform other translations, such as field translations between messages of the UALink-based protocol and messages of the CXL-based protocol, such as translations of tags and translations of error indications, such as data corruption indications or poison.

In some embodiments, the Cable/RPU, such as an OSFP copper cable, an OSFP-XD copper cable, an OSFP Active Optical Cable (AOC), or an OSFP-XD AOC cable, may further include a first module (Module.1), which may include a flit-aware UALink retimer, a PAM4 retimer, or a retimer PHY, and may further include a second module (Module.2), which may include the RPU, optionally included in a discrete component compatible with a retimer form-factor. The Cable/RPU may conform to a standard specification, an industry standard, an implementation agreement (IA), or a multi-source agreement (MSA), such as Octal Small Form Factor Pluggable Module (OSFP), Octal Small Form Factor eXtra Dense Pluggable Module (OSFP-XD), Quad Small Form-Factor Pluggable (QSFP), Quad Small Form-Factor Pluggable Double Density (QSFP-DD), a SNIA SFF standard (such as SFF-8665), an Optical Internetworking Forum (OIF) implementation agreement, or an Institute of Electrical and Electronics Engineers (IEEE) standard. The Cable/RPU may further include a physical medium that may include a copper wire or an optical fiber. In some embodiments, the Cable/RPU may be coupled to the UALink-based port via a first electrical connector (Electrical Connector.1) and may be further coupled to the CXL-based port via a second electrical connector (Electrical Connector.2), whereas in other embodiments, the Cable/RPU may be coupled to the UALink-based port and/or the CXL-based port via optical connectors.

FIG. 33B illustrates one embodiment of a TFD demonstrating translations performed by a cable, denoted as Cable/RPU, between a UALink-based protocol, such as UPLI, utilized for communicating with a first entity (Entity.1), such as an accelerator or a UPLI originator, and a CXL-based protocol, such as CXL.cache, utilized for communicating with a second entity (Entity.2), such as a CXL host. The first entity may initiate a UPLI transaction that may include a UPLI Request (Req) comprising Request Command (e.g., ReqCmd(Read)), Request Source Physical Accelerator ID (e.g., ReqSrcPhysAccID(a.1)), Request Destination Physical Accelerator ID (e.g., (ReqDstPhysAccID(b.1)), Request Address (e.g., ReqAddr(AS.2.1)), and Request Tag (e.g., ReqTag(c.2.1)). The Cable/RPU, which may include an RPU, may translate the UPLI transaction to a CXL.cache transaction that may include a CXL.cache D2H Req comprising Opcode(RdCurr), CQID(q.1.1), and Address (AS.1.1), wherein the Cable/RPU may send the CXL.cache D2H Req to the second entity. Upon receiving a response from the second entity, that may include a CXL.cache H2D Data comprising CQID(q.1.1) and Data(*Data*), the Cable/RPU may translate the CXL.cache H2D Data to a UPLI Read Response/Data (RdRsp) comprising Read Response Source Physical Accelerator ID (e.g., RdRspSrcPhysAccID (b.1)), Read Response Destination Physical Accelerator ID (e.g., RdRspDstPhysAccID(a.1)), Read Response Transaction Tag (e.g., RdRspTag(c.2.1)), and Read Response Data (e.g., RdRspData(*Data*)).

The Cable/RPU may perform further translations, such as opcode or command translations, e.g., translating between standard-based or vendor-defined commands in UPLI request messages and opcodes in CXL.cache request messages, such as RdCurr, RdOwn, RdShared, RdAny, RdOwnNoData, ItoMWr, WrCur, CLFlush, CleanEvict, DirtyEvict, CleanEvictNoData, WOWrInv, WOWrInvF, WrInv, or CacheFlushed. The Cable/RPU may further perform other translations, such as field translations between messages of the UPLI protocol and messages of the CXL.cache protocol, such as translations of tags and translations of error indications.

Figures 34A, 34B:
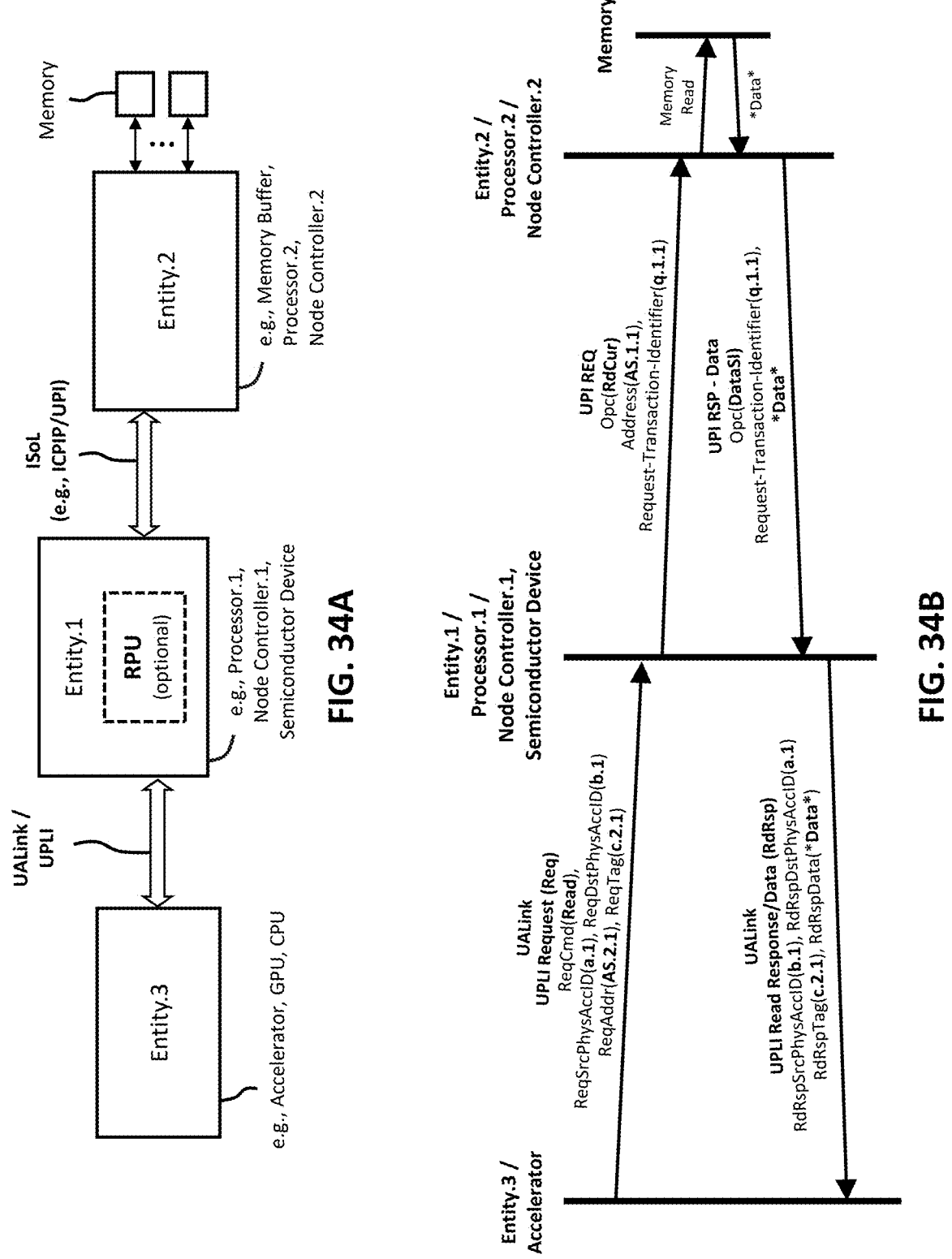
FIG. 34A illustrates one embodiment of a system comprising an entity that translates between a UALink-based protocol and an ISoL protocol.
FIG. 34B illustrates one embodiment of a TFD demonstrating translations between a UALink-based protocol and Intel UPI protocol.

FIG. 34A illustrates one embodiment of a system comprising a first entity (Entity.1), such as a first processor (Processor.1), a first node controller (Node Controller.1), or a semiconductor device, which may include an RPU. The first entity may be coupled to a third entity (Entity.3), which may be an accelerator, a GPU, a CPU, a UALink switch, or a UALink-based originator, wherein the first entity may communicate with the third entity according to a UALink-based protocol, such as UPLI. The first entity may be further coupled to a second entity (Entity.2), which may be a second processor (Processor.2), a memory buffer, or a second node controller (Node Controller.2), wherein the second entity may be coupled to a memory, and wherein the first entity may communicate with the second entity according to an ISoL protocol, such as ARM CHI C2C, a protocol utilizing an NVIDIA NVLink-C2C interconnect, or an Intel Coherent Processor Interconnect Protocol (ICPIP), such as Intel UPI, or Intel UXI. The first node controller (Node Controller.1) and the second node controller (Node Controller.2) may each include an ICPIP node controller, such as a UPI node controller (UNC), or an external node controller (e.g., XNC). The first entity, optionally via the RPU, may translate between the UALink-based protocol, such as UPLI, and the ISoL protocol, such as ICPIP (e.g., Intel UPI or UXI), enabling the third entity to access resources coupled to the first entity, such as the memory that may be coupled to the second entity.

In some embodiments, the UALink-based protocol, such as UPLI, may be associated with a first address space, such as an NPA space, and the ISoL protocol, such as ICPIP, may be associated with a second address space, such as a System Physical Address (SPA) space or a Host Physical Address (HPA) space; wherein the first entity, optionally via the RPU, may perform address translations between addresses within the first and second address spaces, respectively, such as between addresses within the NPA space and addresses within the SPA space or the HPA space. In other embodiments, the UALink-based protocol, such as UPLI, and the ISoL protocol, such as ICPIP, may be associated with the same physical address space, such as with a global address space, a partitioned global address space (PGAS), a pod address space, a virtual pod address space, or a fabric address space; wherein the first entity, optionally via the RPU, may perform address translations between addresses within the same address spaces.

The first entity (Entity.1), optionally via the RPU, may perform further translations, such as opcode, command, or TLP translations, e.g., translating between commands in request messages of the UALink-based protocol (e.g. UPLI vendor-defined read command) to opcodes in request messages of the ISoL Protocol (e.g., Intel UPI RdCur opcode). The first entity, optionally via the RPU, may further perform other translations, such as field translations between messages of the UALink-based protocol and protocol data units (PDUs) of the ISoL Protocol, such as tag translations, traffic class (TC) translations, or cross-field translations, wherein the first entity, optionally via the RPU, may maintain tracking between tags of the UALink-based protocol domain and tags of the ISoL protocol domain, such as in order to associate responses with their corresponding requests.

FIG. 34B illustrates one embodiment of a TFD demonstrating translations between a UALink-based protocol, such as UPLI, and an ISoL protocol, such as ICPIP (e.g., Intel UPI or UXI). The translations are performed by a first entity (Entity.1), such as a first processor (Processor.1), a first node controller (Node Controller.1), or a semiconductor device, optionally via an RPU. The UALink-based protocol may be utilized for communicating with a third entity (Entity.3), such as an accelerator, and the ISoL protocol may be utilized for communicating with a second entity (Entity.2), such as a second processor (Processor.2), or a second node controller (Node Controller.2). The second entity may be coupled to memory, such as DRAM, which may be mapped to a physical address space (PAS) utilized by the first processor. The third entity may initiate a UPLI transaction that may include a UPLI Request (Req) comprising Request Command (e.g., ReqCmd(Read)), Request Source Physical Accelerator ID (e.g., ReqSrcPhysAccID(a.1)), Request Destination Physical Accelerator ID (e.g., (ReqDstPhysAccID (b.1)), Request Tag (e.g., ReqTag(c.2.1)), and Request Address (e.g., ReqAddr(AS.2.1)). The first entity, optionally via the RPU, may translate the UPLI transaction to an ISoL (e.g., ICPIP) transaction, such as an Intel UPI transaction that may include a UPI request (REQ message class) comprising Opc(RdCur), Address(AS.1.1), and Request-Transaction-Identifier(q.1.1), wherein the Request-Transaction-Identifier (e.g., RTID) may denote a tag, a transaction tag, a transaction identifier, or another field or set of fields carried in UPI transactions which may serve for associating responses with their corresponding requests.

The first entity (Entity.1) may send the UPI request (REQ) to the second entity. Upon receiving a response from the second entity, that may include a UPI data response ("RSP-Data" message class, which may also be denoted by "RSP4-Data") comprising Opc(DataSI), Request-Transaction-Identifier(q.1.1), and *Data*, the first entity, optionally via the RPU, may translate the UPI response (RSP-Data) to a UPLI Read Response/Data (RdRsp) comprising Read Response Source Physical Accelerator ID (e.g., RdRspSrcPhysAccID (b.1)), Read Response Destination Physical Accelerator ID (e.g., RdRspDstPhysAccID(a.1)), Read Response Transaction Tag (e.g., RdRspTag(c.2.1)), and Read Response Data (e.g., RdRspData(*Data*)). In some embodiments, the requested data may be provided by a processor cache instead of by the memory, such as wherein the requested data may be provided by an LLC that may be included in the first entity, or by an LLC that may be included in the second entity.

In other embodiments, the first entity, optionally via the RPU, may translate the UPLI transaction to an ICPIP transaction, such as an Intel UPI transaction, that may include message classes such as REQ, SNP, WB, RSP (such as RSP2 or RSP4), NCB, or NCS, that may include commands, operations, or opcodes (e.g., Opc), such as RdCode, RdCur, RdData, RdInv, RdInvOwn, SnpCode, SnpCur, SnpData, SnpInv, WbMtoS, WcWr, WcWrPtl, DataE, DataSI, or DataM_CmpO.

The first entity, optionally via the RPU, may perform further translations, such as opcode, command, or TLP translations, e.g., translating between commands in request messages of the UALink-based protocol (e.g. UPLI vendor-defined read command) and opcodes in request messages of the ISoL Protocol (e.g., Intel UPI RdCur). The first entity, optionally via the RPU, may further perform other translations, such as field translations between messages of the UALink-based protocol and protocol data units (PDUs) of the ISoL Protocol (e.g., Intel UPI), such as tag translations, traffic class (TC) translations, or cross-field translations, wherein the first entity, optionally via the RPU, may maintain tracking between tags in the UALink-based protocol domain and tags in the ISoL protocol domain, such as in order to associate responses with their corresponding requests, within the same protocol domain and/or between different protocol domains.

Figures 35A, 35B:
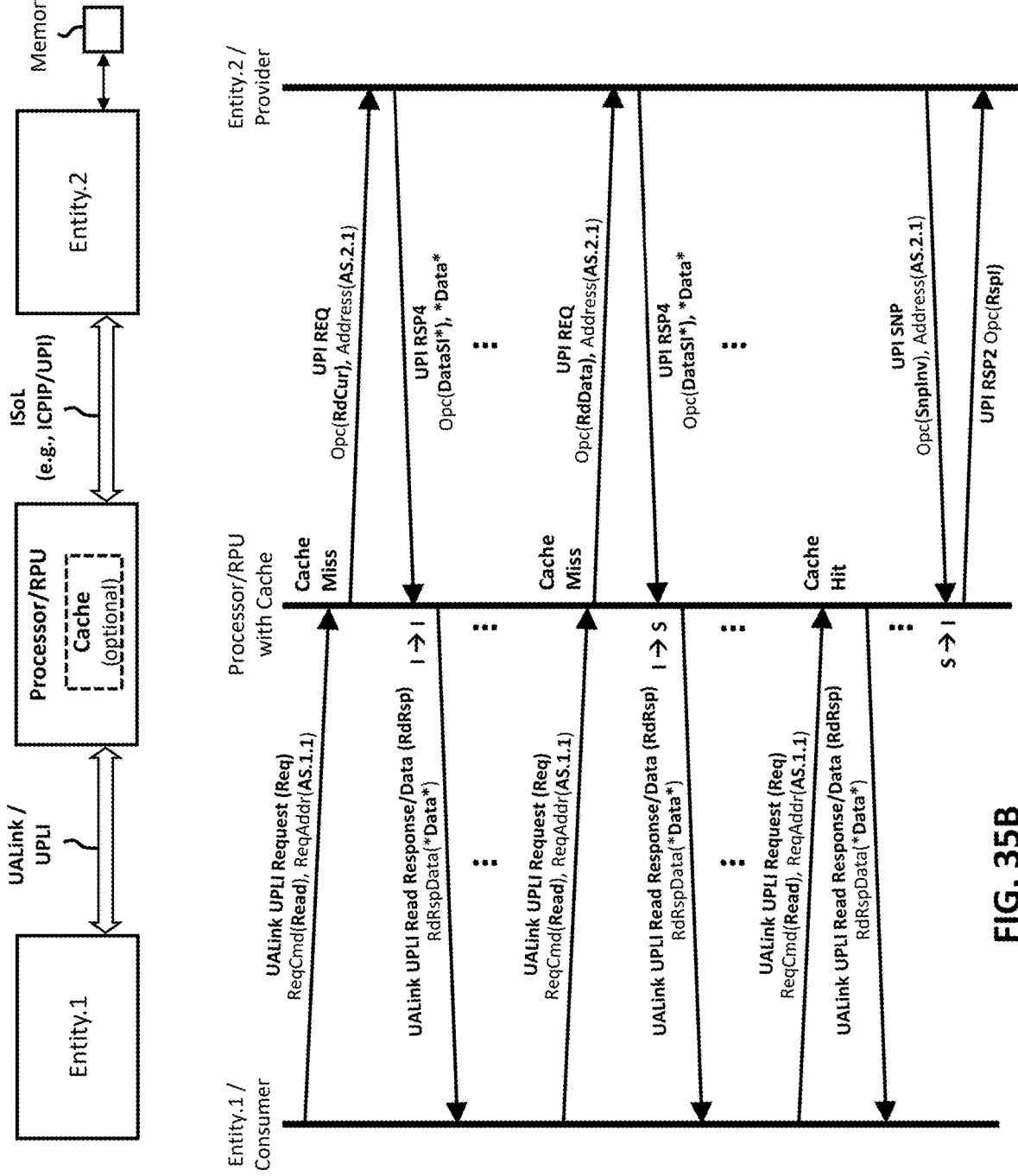
FIG. 35A illustrates one embodiment of a system comprising a processor/RPU that translates between a UALink-based protocol and an ISoL protocol.
FIG. 35B illustrates one embodiment of a TFD demonstrating translations between a UALink-based protocol and an ISoL protocol, such as Intel UPI.

FIG. 35A illustrates one embodiment of a system comprising a processor or an RPU, denoted as Processor/RPU, which may include a cache. The Processor/RPU may be coupled to a first entity (Entity.1), which may be an accelerator, a GPU, a second processor, a UALink Switch, or a resource consumer, wherein the Processor/RPU may communicate with the first entity according to a UALink-based protocol, such as UPLI. The Processor/RPU may be further coupled to a second entity (Entity.2), which may be a third processor, a node controller, or a memory buffer, wherein the second entity may be coupled to a memory, and wherein the Processor/RPU may communicate with the second entity according to an ISoL protocol, such as NVIDIA NVLink-C2C, ARM CHI C2C, or Intel Coherent Processor Interconnect Protocol (ICPIP), such as Intel UPI, or Intel UXI. The Processor/RPU may translate between the UALink-based protocol, such as UPLI, and the ISoL protocol, such as ICPIP (e.g., Intel UPI or UXI), enabling the first entity to access resources coupled to the second entity, such as the memory. The Processor/RPU may cache data retrieved from the second entity and may respond to UPLI requests received from the first entity with data from the cache, instead of issuing read requests to the second entity. Additionally or alternatively, the Processor/RPU may prefetch data from the second entity into the cache. Moreover, the Processor/RPU may perform further translations between the UALink-based protocol domain and the ISoL protocol domain, such as protocol translations, opcode translations, command translations, TLP translations, and field translations between messages of the UALink-based protocol and protocol data units (PDUs) of the ISoL Protocol, such as tag translations, traffic class (TC) translations, or cross-field translations, wherein the Processor/RPU may maintain tracking between tags of the UALink-based protocol domain and tags of the ISoL protocol domain, such as in order to associate responses with their corresponding requests.

FIG. 35B illustrates one embodiment of a TFD demonstrating translations performed by a processor or an RPU, denoted as Processor/RPU, that may include a cache, between a UALink-based protocol, such as UPLI, utilized for communicating with a first entity (Entity.1), and an ISoL protocol, such as ICPIP (e.g., Intel UPI or Intel UXI), utilized for communicating with a second entity (Entity.2) that may be coupled to memory, such as DRAM, wherein the memory may be mapped to a physical address space (PAS)

utilized by the Processor/RPU. The Processor/RPU may perform translations between the UALink-based protocol domain and the ISoL protocol domain, such as protocol translations between the UALink-based protocol and the ISoL protocol, such as translations between UALink/UPLI and Intel UPI/UXI.

The TFD illustrates three exemplary transactions between the first entity and the Processor/RPU. The first exemplary transaction may include UALink UPLI Request (Req) comprising ReqCmd(Read) and ReqAddr(AS.1.1), wherein the Processor/RPU may translate the request address (AS.1.1) to a translated address (AS.2.1) and may look up the data associated with the address and/or with the translated address in the cache before issuing a UPI request to the second entity. The lookup of the data may result in a cache miss, wherein the Processor/RPU may translate the UALink UPLI Request (Req) to UPI REQ comprising Opc(RdCur) and Address(AS.2.1), wherein the Processor/RPU may send the UPI REQ to the second entity. Upon receiving a response from the second entity, which may include UPI RSP4 comprising Opc(DataSI*) and *Data*, the Processor/RPU may translate the UPI RSP4 to a UALink UPLI Read Response/Data (RdRsp) comprising RdRspData(*Data*), without storing the data retrieved from the second entity in the cache, denoted in the drawing by "I-to-I", indicating that the cache state associated with the cacheline address remains invalid.

The second exemplary transaction may include UALink UPLI Request (Req) comprising ReqCmd(Read) and ReqAddr(AS.1.1), referencing the same address as the first exemplary transaction, wherein the Processor/RPU may translate the request address (AS.1.1) to a translated address (AS.2.1) and may look up the data associated with the address and/or with the translated address in the cache before issuing a UPI request to the second entity. The lookup of the data may result in a cache miss, wherein the Processor/RPU may translate the UALink UPLI Request (Req) to UPI REQ comprising Opc(RdData) and Address(AS.2.1), wherein the Processor/RPU may send the UPI REQ to the second entity. Upon receiving a response from the second entity, which may include UPI RSP4 comprising Opc(DataSI*) and *Data*, the Processor/RPU may translate the UPI RSP4 to a UALink UPLI Read Response/Data (RdRsp) comprising RdRspData(*Data*), and may store the data retrieved from the second entity in the cache, denoted in the drawing by "I-to-S", indicating that the cache state associated with the cacheline address transitioned from invalid to shared, possibly indicating that the cacheline data is shared between the Processor/RPU and the second entity.

The third exemplary transaction may include UALink UPLI Request (Req) comprising ReqCmd(Read) and ReqAddr(AS.1.1), referencing the same address as the first and the second transaction, wherein the Processor/RPU may translate the request address (AS.1.1) to a translated address (AS.2.1) and may look up the data associated with the address and/or with the translated address in the cache before issuing a UPI request to the second entity. The lookup of the data may result in a cache hit, wherein the Processor/RPU may respond to the request from the first entity with UALink UPLI Read Response/Data (RdRsp) comprising RdRspData(*Data*) from the cache, without sending a translated UPI REQ to the second entity. Following the third transaction, the second entity may invalidate the cacheline address (AS.2.1) associated with the UPI domain, which may be stored in the Processor/RPU cache. The second entity may send to the Processor/RPU a UPI SNP comprising Opc(SnpInv) and Address(AS.2.1), wherein the Processor/RPU may respond to the UPI SNP by sending to the second entity a UPI RSP (e.g., UPI RSP2) comprising Opc(RspI), indicating that the Processor/RPU invalidated the associated cacheline address from the cache, denoted in the drawing by "S-to-I", indicating that the cache state associated with the cacheline address transitioned from shared to invalid.

The Processor/RPU may perform further translations, such as address translations, opcode translations, command translations, TLP translations, or field translations between messages of the UALink-based protocol and protocol data units (PDUs) of the ISoL Protocol, such as tag translations, traffic class (TC) translations, or cross-field translations, wherein the Processor/RPU may maintain tracking between tags of the UALink-based protocol domain and tags of the ISoL protocol domain, such as in order to associate responses with their corresponding requests. In some embodiments, the Processor/RPU may be configured to perform cache lookups before performing translations related to the UPLI request received from the first entity, or may be configured to perform cache lookups after performing some or all of the translations related to the UPLI request received from the first entity. In still some embodiments, the Processor/RPU may be further configured to organize the cache and perform cache lookups according to addresses associated with the UALink-based protocol domain (e.g., UPLI domain). Additionally or alternatively, the Processor/RPU may be further configured to organize the cache and perform cache lookups according to translated addresses associated with the ISoL protocol domain (e.g., UPI domain).

Figures 36A, 36B:
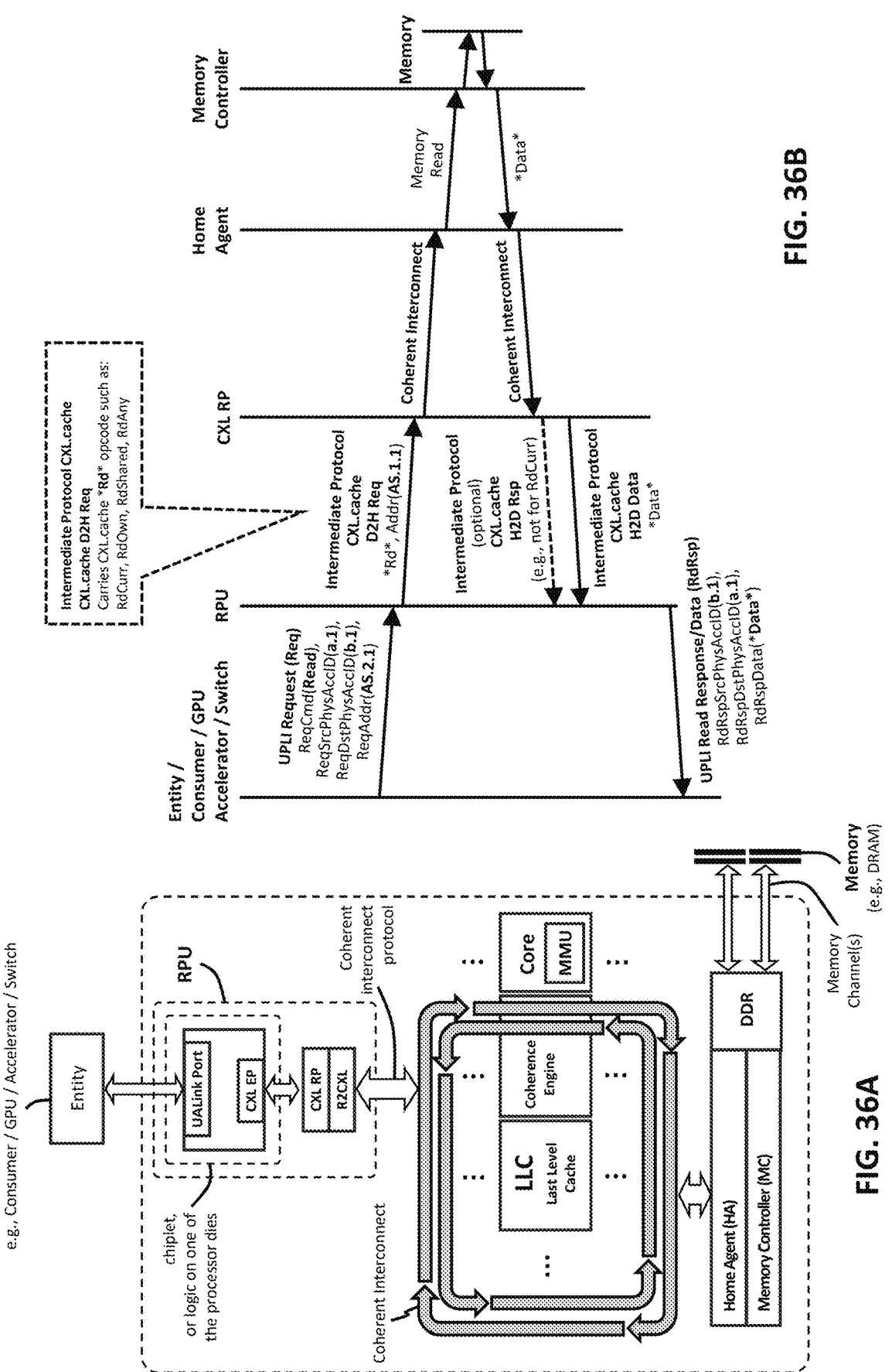
FIG. 36A illustrates one embodiment of a system comprising a processor comprising an RPU chiplet that translates between UALink and CXL.
FIG. 36B illustrates one embodiment of a TFD demonstrating translating a UPLI Request to a protocol utilized by a processor's coherent interconnect.

FIG. 36A illustrates one embodiment of a system comprising a processor (such as an MxPU) comprising processing cores, LLC, a CXL RP, and a memory controller optionally coupled via memory channels to memory, such as DRAM. The CXL RP may be coupled to an on-chip coherent interconnect, such as a CHI ring or mesh interconnect, via a Ring-to-CXL (R2CXL) interconnect interface that may communicate with the coherent interconnect according to a protocol utilized by the coherent interconnect, such as ARM CHI, Intel IDI, Intel UPI, or AMD Infinity Fabric. An RPU, which may be included in the MxPU, performs physical address translations that may enable an entity such as a GPU to access the memory. The MxPU may expose to the entity, optionally via the RPU, a UALink port that may communicate with the entity according to a UPLI protocol. The RPU may further perform protocol translations, such as from UPLI to a protocol utilized by the coherent interconnect, wherein the RPU may utilize an intermediate protocol, such as CXL (e.g., CXL.cache), for providing the protocol translations. The RPU may expose to the processor, via a CXL RP that may be included in the RPU, a CXL device utilizing a CXL Endpoint (CXL EP), such as a Type-1 CXL device or a Type-2 CXL device, where an R2CXL, that may reside in the RPU, may communicate with the coherent interconnect and complement the translation path from UPLI to a protocol utilized by the coherent interconnect. In some embodiments, the RPU, the UALink port and the CXL device may be implemented in a chiplet inside an IC package of an MxPU, whereas in other embodiments, they may be implemented as functional blocks on the same die with the CXL RP of the processor, or split between multiple processor dies or chiplets.

FIG. 36B illustrates one embodiment of a TFD demonstrating a UPLI Request (Req) received from an entity, such as a GPU or an accelerator, wherein the RPU may translate a physical address (AS.2.1) carried in the UPLI Request, to a physical address (AS.1.1) utilized for accessing the memory. The RPU may perform further translations, such as protocol translations from UPLI to a protocol utilized by the processor's coherent interconnect, possibly utilizing an intermediate protocol such as CXL.cache, wherein the RPU may perform further translations, such as opcode translations and tag translations, e.g., of transaction tags, such as translating from UPLI tags to CQIDs. The CXL.cache request, carrying the translated address (AS.1.1), is sent to the CXL RP for further processing and fetching of the requested data, such as from an LLC over the on-chip ring interconnect, or from memory, such as DRAM via the memory channels. The data may then return over the on-chip ring interconnect to the RPU, wherein the RPU provides UPLI Read Response/Data (RdRsp) to the requesting entity.

Figures 37A, 37B:
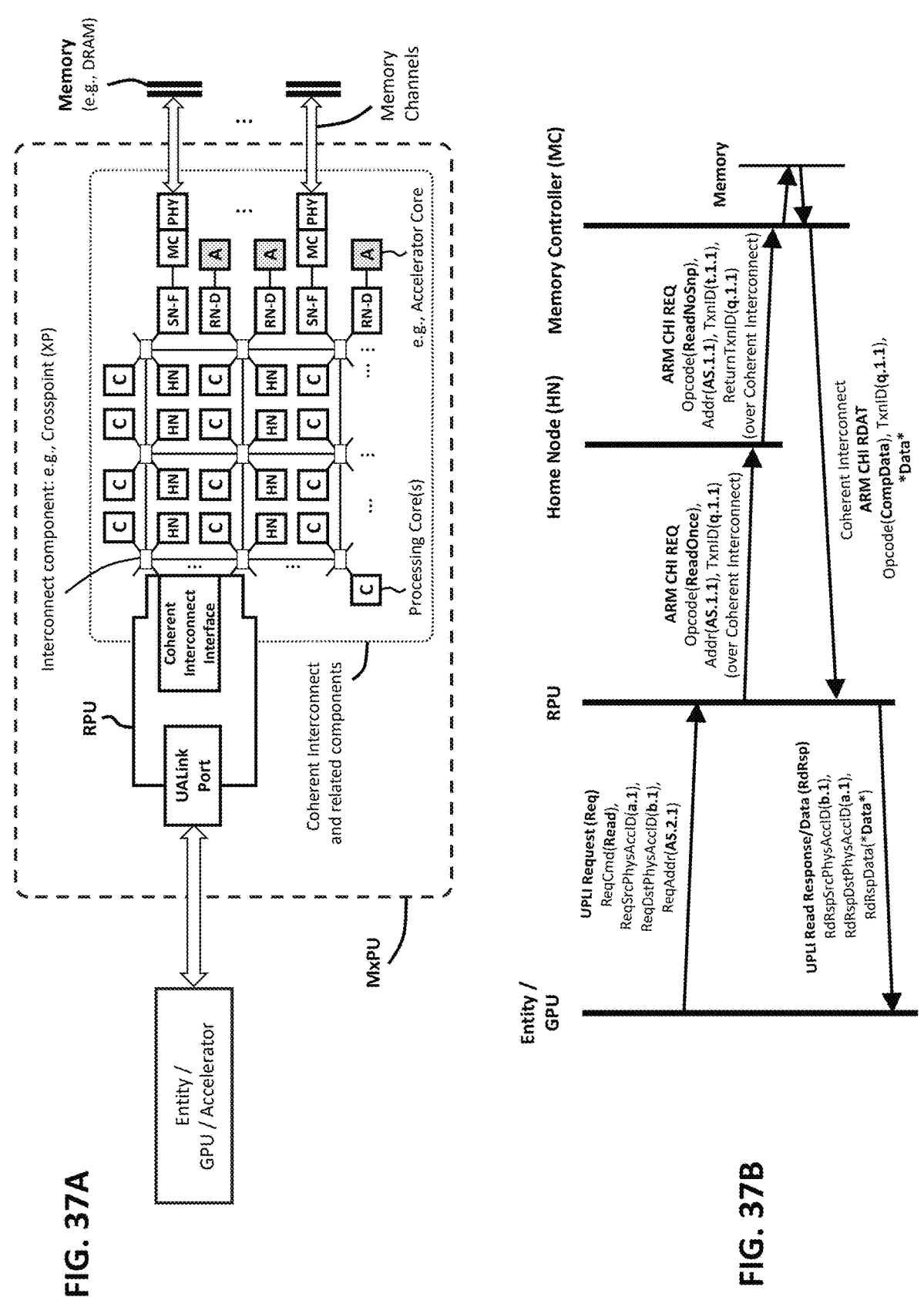
FIG. 37A illustrates one embodiment of a system comprising an RPU that translates between UALink and a Coherent Interconnect Interface.
FIG. 37B illustrates one embodiment of a TFD showing address translation between UALink UPLI and ARM CHI ReadOnce.

FIG. 37A illustrates one embodiment of a system where an entity, such as a GPU or accelerator, communicates via a UALink port included in an RPU that further includes a Coherent Interconnect Interface that may utilize a protocol based on ARM CHI. The Coherent Interconnect Interface couples the RPU to an interconnect component, such as a crosspoint (XP), within a coherent interconnect. The Coherent Interconnect Interface performs the necessary protocol conversions between a UALink protocol domain and a coherent interconnect protocol domain, such as between UPLI and ARM CHI, enabling the entity to access memory and other resources coupled to the coherent interconnect. The coherent interconnect may be implemented as a mesh topology connecting various components including processing cores, home nodes (HN), memory controllers (MC), and accelerator cores.

FIG. 37B illustrates one embodiment of a TFD showing address translation between UALink UPLI and CHI. An entity, such as a GPU, initiates a UPLI request with a physical address (AS.2.1), which the RPU translates to a CHI request carrying a ReadOnce opcode with a translated physical address (AS.1.1). The transaction flows through the coherent interconnect via a home node to a memory controller, which retrieves the data and returns it, through the coherent interconnect, to the RPU that translates the response back to the UPLI domain for delivery to the requesting entity.

Figures 38A, 38B:
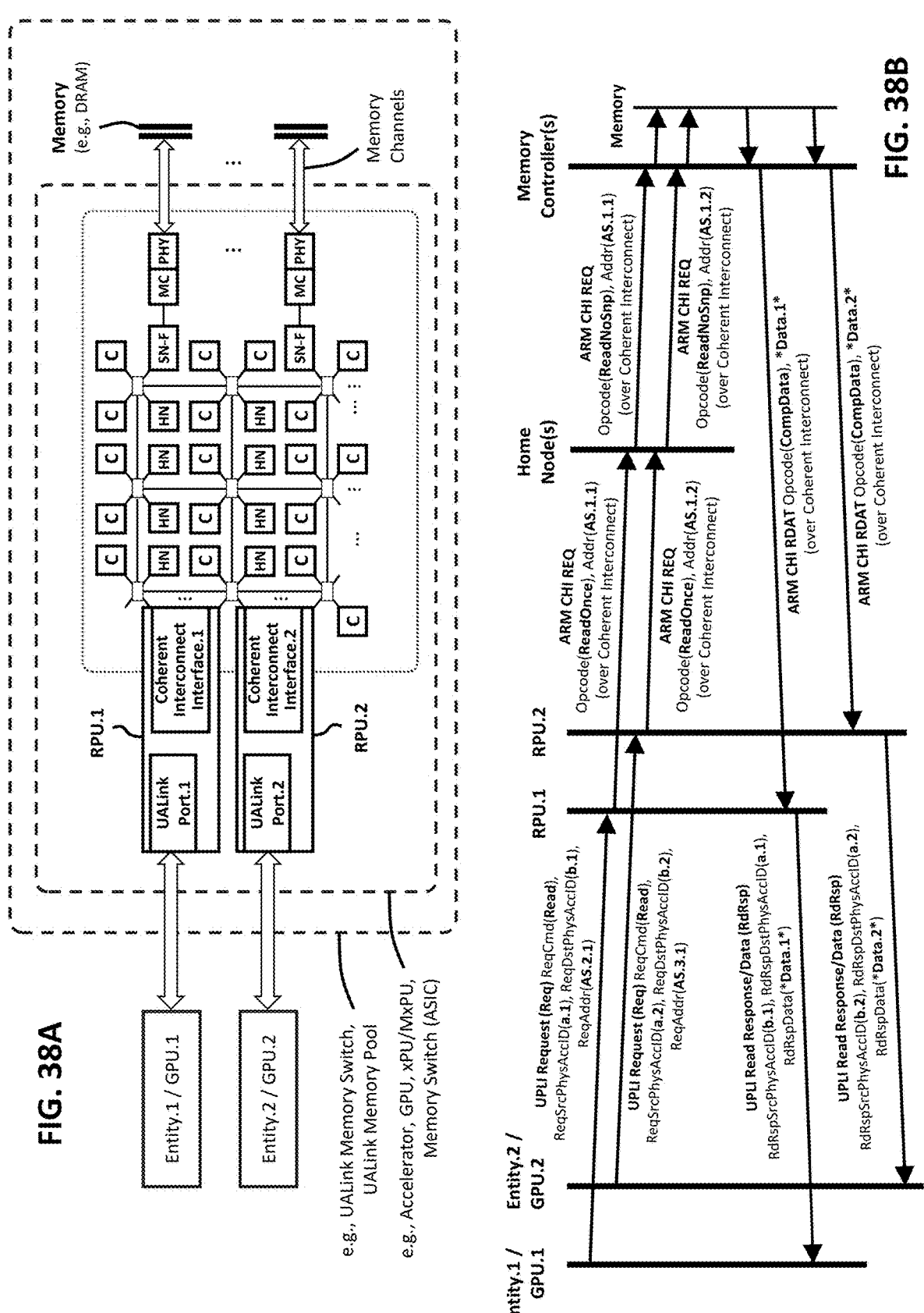
FIG. 38A illustrates one embodiment of a system functioning as a UALink memory switch appliance or a UALink memory pool.
FIG. 38B illustrates one embodiment of a TFD depicting a multi-entity memory access scenario wherein GPUs access memory through UPLI-to-ARM CHI protocol translations.

FIG. 38A illustrates one embodiment of a system that may function as a UALink memory switch appliance or a UALink memory pool, and may include an accelerator, GPU, xPU/MxPU, or a memory switch ASIC, that is coupled to two entities denoted as Entity.1/GPU.1 and Entity.2/GPU.2. The accelerator/xPU includes processing cores and memory controllers coupled to a coherent interconnect that may be based on a CHI protocol. The accelerator/xPU utilizes protocol translations, performed the RPUs, between UALink-based ports and the coherent interconnect. The first RPU (RPU.1) may enable Entity.1/GPU.1 to access, via the first UALink port and the coherent interconnect, resources mapped to a physical address space of the coherent interconnect, such as memory resources of the accelerator/xPU. Correspondingly, the second RPU (RPU.2) may enable Entity.2/GPU.2 to access, via the second UALink port and the coherent interconnect, resources mapped to a physical address space of the coherent interconnect, such as memory resources of the accelerator/xPU.

FIG. 38B illustrates one embodiment of a TFD depicting a multi-entity memory access scenario wherein first and second entities/GPUs access memory mapped to one or more physical address spaces utilized by the coherent interconnect, through UPLI-to-ARM CHI protocol translations.

Entity.1/GPU.1 initiates a first UPLI Request (Req) with ReqCmd(Read), ReqSrcPhysAccID(a.1) to identify the source entity, such as an accelerator or a GPU, ReqDstPhysAccID(b.1) to identify the destination entity/accelerator, and ReqAddr(AS.2.1) representing a UPLI request address, such as a network physical address (NPA) from a second physical address space. RPU.1 translates the first UPLI Request to ARM CHI REQ carrying Opcode(ReadOnce) and Addr(AS.1.1) from a first physical address space utilized by the coherent interconnect. Concurrently or sequentially, Entity.2/GPU.2 may initiate a second UPLI Request (Req) with ReqCmd(Read), ReqSrcPhysAccID(a.2), ReqDstPhysAccID(b.2), and ReqAddr(AS.3.1) representing a UPLI request address, such as a network physical address (NPA) optionally from a third physical address space or from the second physical address space. RPU.2 translates the second UPLI Request to ARM CHI REQ carrying Opcode (ReadOnce) and Addr(AS.1.2) from the first physical address space utilized by the coherent interconnect. Both transactions flow through the coherent interconnect to one or more home nodes, which may send respective ARM CHI REQ messages to one or more memory controllers with Opcode(ReadNoSnp) and the addresses Addr(AS.1.1) and Addr(AS.1.2), respectively.

The memory controller(s) retrieve the requested data from the memory and send first and second ARM CHI RDAT messages with Opcode(CompData) carrying *Data.1* and *Data.2*, representing the data retrieved from the addresses AS.1.1 and AS.1.2, respectively. RPU.1 translates the first ARM CHI RDAT message to UPLI Read Response/Data (RdRsp) with RdRspSrcPhysAccID(b.1), RdRspDstPhysAccID(a.1), and RdRspData(*Data.1*) for Entity.1/GPU.1. RPU.2 translates the second ARM CHI RDAT message to UPLI Read Response/Data (RdRsp) with RdRspSrcPhysAccID(b.2), RdRspDstPhysAccID(a.2), and RdRspData (*Data.2*) for Entity.2/GPU.2. The embodiment demonstrates how entities/GPUs may share access to the same memory through different RPUs that perform both protocol translation between UPLI and ARM CHI, and physical address translations. Alternatively, the embodiment may be viewed as two separate UPLI transactions that utilize the same coherent interconnect infrastructure to access the memory, wherein entities such as accelerators or GPUs may access the memory via a shared or a separate address space that may be translated to a shared coherent interconnect physical address space. Still alternatively, the response and read data paths may be implemented according to other designs, such as wherein the memory controller(s) may send the data to the home node(s) that send it to the respective RPUs, or the home node(s) send responses to the RPUs while the memory controller(s) send the data directly to the RPUs.

Figures 39A, 39B:
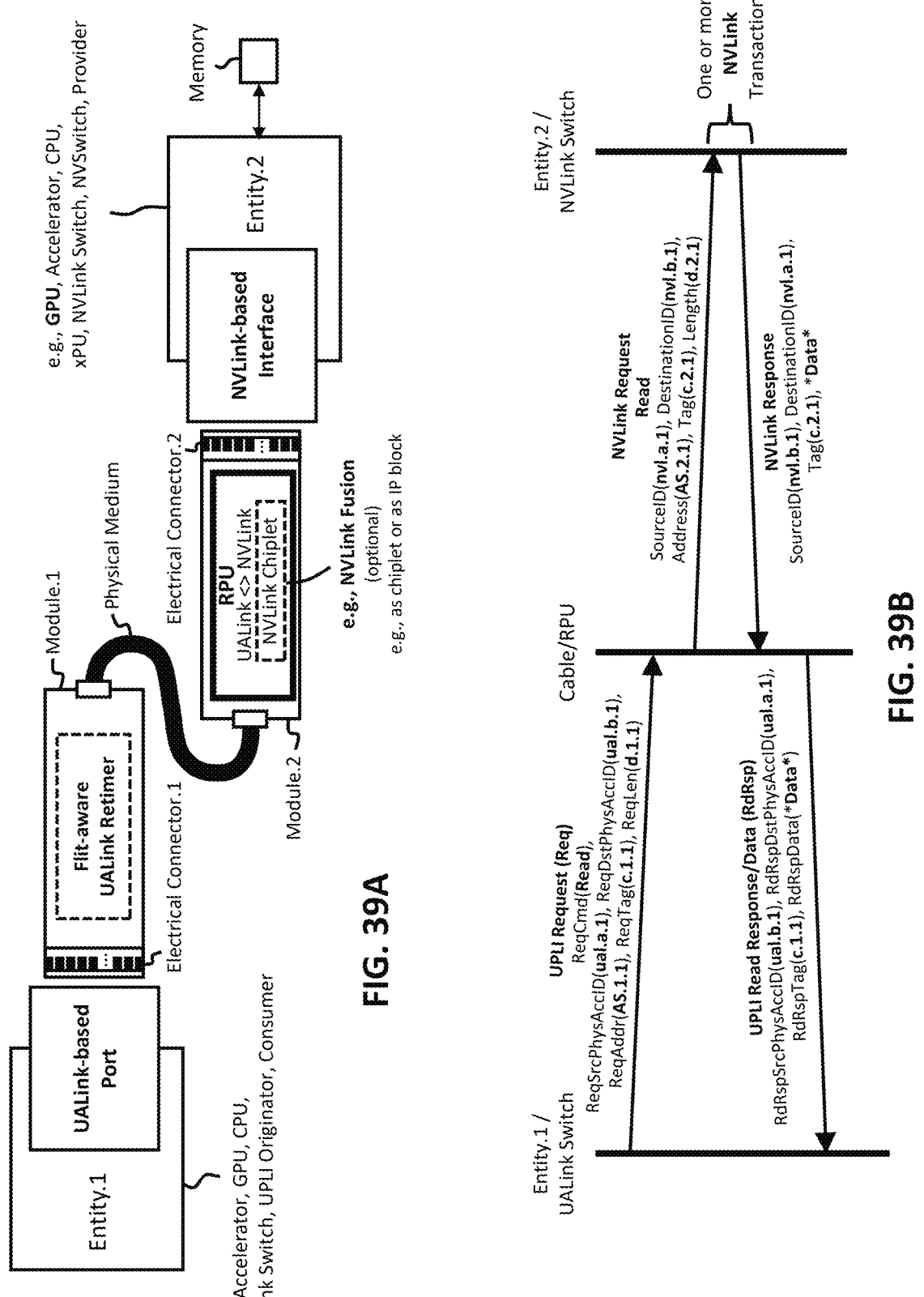
FIG. 39A illustrates one embodiment of a system comprising a cable that translates between a UALink-based protocol and an NVLink-based protocol.
FIG. 39B illustrates one embodiment of a TFD demonstrating translations performed by a cable between a UALink-based protocol and an NVLink-based protocol.

FIG. 39A illustrates one embodiment of a system comprising a cable, referred to as Cable/RPU, which may perform translations between a UALink-based protocol, such as UPLI, and an NVLink-based protocol, such as a protocol utilizing NVLink 5 technology. The Cable/RPU enables a first entity (Entity.1), which may be an accelerator, a GPU, a CPU, a UALink switch, a UPLI originator, or a resource consumer, to access, via a UALink-based port, via the Cable/RPU, and via an NVLink-based interface, resources, such as memory, coupled to a second entity (Entity.2), which may be a GPU, an accelerator, a CPU, an xPU, an NVLink switch, an NVSwitch, or a resource provider. The Cable/RPU, which may include an RPU, may communicate with the first entity according to a UALink-based protocol, such as a UPLI, and may communicate with the second entity according to an NVLink-based protocol, such as a protocol utilizing NVLink 5 technology.

In some embodiments, the UALink-based protocol, such as UPLI, may be associated with a first address space, such as an NPA space, and the NVLink-based protocol may be associated with a second address space, such as an NVLink-based address space or an NVLink-based network address space; wherein the Cable/RPU may perform address translations between addresses within the first and second address spaces, respectively, such as between addresses within the NPA space and addresses within the NVLink-based network address space. In other embodiments, the UALink-based protocol, such as UPLI, and the NVLink-based protocol, may be associated with the same address space, such as an NVLink-based common address space, a global address space, a pod address space, or a fabric address space; wherein the Cable/RPU may perform address translations between addresses within the same common address spaces.

The Cable/RPU may perform further translations, such as opcode translations, command translations, or TLP translations, e.g., translating between commands in UPLI request messages and request types utilized by the NVLink-based protocol. The Cable/RPU may further perform other translations, such as field translations between messages of the UALink-based protocol and protocol data units (PDUs) of the NVLink-based protocol, such as translations of tags and translations of error indications, such as data corruption indications or poison. In some embodiments, the Cable/RPU may further include a first module (Module.1), which may include a flit-aware UALink retimer, and may further include a second module (Module.2), which may include the RPU, optionally comprising an NVLink chiplet, such as NVLink Fusion. In some embodiments, the Cable/RPU may be coupled to the UALink-based port via a first electrical connector (Electrical Connector.1) and may be further coupled to the NVLink-based interface via a second electrical connector (Electrical Connector.2). Whereas in other embodiments, the Cable/RPU may be coupled to the UALink-based port and/or the NVlink-based interface via optical connectors. The Cable/RPU may further include a physical medium that may include a copper wire or an optical fiber.

FIG. 39B illustrates one embodiment of a TFD demonstrating translations performed by a cable, denoted as Cable/RPU, between a UALink-based protocol, such as UPLI, utilized for communicating with a first entity (Entity.1), such as UALink switch, and an NVLink-based protocol, such as an protocol utilizing NVLink 5 technology, utilized for communicating with a second entity (Entity.2), such as an NVLink switch. The first entity may initiate a UPLI transaction that may include a UPLI Request (Req) comprising Request Command (e.g., ReqCmd(Read)), Request Source Physical Accelerator ID (e.g., ReqSrcPhysAccID(ual.a.1)), Request Destination Physical Accelerator ID (e.g., (ReqDstPhysAccID(ual.b.1)), Request Address (e.g., ReqAddr (AS.1.1)), Request Tag (e.g., ReqTag(c.1.1)), and Request Length (e.g., ReqLen(d.1.1)). The Cable/RPU, which may include an RPU, may translate the UPLI request to an NVLink request or an NVLink read request that may include SourceID(nvl.a.1), such as source GPU ID, DestinationID (nvl.b.1), such as destination GPU ID, Address(AS.2.1), such as a network address or a GPU physical address, Tag(c.2.1), and Length(d.2.1), wherein the Cable/RPU may send the NVLink request to the second entity. Upon receiving a response from the second entity, that may include an NVLink Response that may include SourceID(nvl.b.1), such as source GPU ID, DestinationID(nvl.a.1), such as destination GPU ID, Tag(c.2.1), and *Data*, the Cable/RPU may translate the NVLink response to a UPLI Read Response/ Data (RdRsp) comprising Read Response Source Physical Accelerator ID (e.g., RdRspSrcPhysAccID(ual.b.1)), Read Response Destination Physical Accelerator ID (e.g., RdRspDstPhysAccID(ual.a.1)), Read Response Transaction Tag (e.g., RdRspTag(c.1.1)), and Read Response Data (e.g., RdRspData(*Data*)).

The Cable/RPU may perform further translations, such as opcode translations, command translations, or TLP translations, e.g., translating between commands in UPLI requests and request types utilized by the NVLink-based protocol. The Cable/RPU may further perform other translations, such as field translations between messages of the UALink-based protocol and protocol data units (PDUs) of the NVLink-based protocol, such as translations of tags and translations of error indications, such as data corruption indications or poison. In some embodiments, the Cable/RPU may issue more than one NVLink request in response to receiving a UPLI request from the first entity, such as when splitting a UPLI request for a large block of data to multiple smaller NVLink requests, or when prefetching data from the second entity.

In one embodiment, an apparatus, comprises: an integrated circuit comprising processing cores comprising memory management units (MMIUs) and coherent caches; wherein the processing cores are configured to respond to snoop requests that utilize physical addresses within a physical address space (PAS), and wherein the MMIUs are configured to translate virtual addresses to physical addresses within the PAS; a coherent interconnect coupling the processing cores to memory controllers, wherein the memory controllers are coupled to memory channels capable of supporting more than 64 GB of memory, and wherein the processing cores are configured to execute an operating system (OS) that accesses the memory utilizing the physical addresses within the PAS; a resource provisioning unit (RPU) comprising an NVLink-based interface configured to communicate, according to an NVLink-based protocol, with an entity coupled to the apparatus; and wherein the RPU is further coupled to the coherent interconnect and configured to translate physical addresses associated with the NVLink-based protocol to physical addresses within the PAS; whereby the translate of the physical addresses enables the entity to access the memory via the NVLink-based interface and the memory controllers.

Optionally, the NVLink-based interface may comprise at least one differential pair and may be configured to support reliable communication by utilizing at least one of: a replay buffer configured to enable retransmissions of packets that were not positively acknowledged by a receiver, or a Forward Error Correction (FEC) code configured to enable correction of symbol errors. Furthermore, in addition to the physical address translations, the RPU may be further configured to translate between first fields belonging to first message formats of the NVLink-based protocol, and second fields belonging to second message formats of a protocol utilized by the coherent interconnect.

The protocol utilized by the coherent interconnect may be based on Coherent Hub Interface (CHI) protocol (CHI-based protocol), and the RPU may be further configured to translate read requests corresponding to the NVLink-based protocol to requests corresponding to the CHI-based protocol carrying ReadOnce opcodes or ReadShared opcodes. Optionally, the RPU may further translate CHI responses to NVLink responses, such as CHI responses carrying CompData opcodes to NVLink responses. Additionally, the RPU may maintain transaction context to properly correlate requests and responses across the protocol domains. The translation to CHI ReadOnce opcodes may be utilized for non-cacheable data accesses, while ReadShared opcodes may be utilized for cacheable shared data. The RPU may handle protocol-specific differences in flow control, credit management, and response ordering between the NVLink and CHI domains. The CompData responses from CHI may carry the requested data along with completion status, which the RPU translates into appropriate NVLink response formats.

The protocol utilized by the coherent interconnect may be based on an Intel Coherent Processor Interconnect Protocol (ICPIP-based protocol) for scalable multiprocessors with a shared physical address space, and wherein the RPU may be further configured to translate memory access requests corresponding to the NVLink-based protocol to requests corresponding to the ICPIP-based protocol, while maintaining coherency state tracking for physical addresses within the PAS that are associated with the coherent caches. Examples of ICPIP include Intel's Ultra Path Interconnect (UPI), KTI, UXI, and future Intel's Coherent Processor Interconnect Protocols. Optionally, the coherency state tracking between NVLink and ICPIP domains may include monitoring cache line states and ensuring consistency across protocol boundaries. The RPU may include state machines to track outstanding transactions and their coherency implications. The translation may accommodate differences in data transfer granularity and response timing between NVLink and ICPIP protocols.

In certain aspects, the protocol utilized by the coherent interconnect may be based on Infinity Fabric protocol (IF-based protocol), and wherein the RPU may be further configured to translate transactions associated with the NVLink-based protocol to commands associated with the IF-based protocol, while preserving memory ordering semantics required by the entity. Optionally, the preservation of memory ordering semantics may include tracking transaction dependencies and enforcing completion ordering as required by both NVLink and Infinity Fabric specifications. The RPU may include ordering enforcement mechanisms that respect producer-consumer relationships and memory barrier semantics across the protocol boundary. The RPU may translate NVLink transactions that include partial write indicators to appropriate Infinity Fabric write command types while maintaining data integrity.

The RPU may be further configured to translate commands or encodings associated with the NVLink-based protocol to commands or opcodes associated with a protocol utilized by the coherent interconnect, based on a mapping between request types of the NVLink-based protocol and corresponding request types of the protocol utilized by the coherent interconnect. Optionally, the mapping between NVLink transaction types and coherent interconnect transaction types may be implemented utilizing lookup tables, state machines, or programmable translation logic. The RPU may handle various NVLink transaction categories including memory reads, memory writes, and atomic operations, translating them to appropriate coherent interconnect opcodes while preserving transaction semantics.

The RPU may be further configured to translate a request corresponding to the NVLink-based protocol to at least one message corresponding to the protocol utilized by the coherent interconnect; wherein the at least one message causes prefetch to a cache of a processor comprising the processing cores. Optionally, the RPU may translate NVLink requests, such as requests carrying explicit or implicit prefetch hints, to messages of a protocol utilized by the coherent interconnect that effectively prefetch data into a cache of the processor, enabling reduced memory access latency for anticipated future accesses. An example of a prefetch hint may include a case wherein the RPU detects a pattern of reading pairs of addresses that are adjacent to each other or separated by a distinguishable stride.

The RPU may be further configured to utilize an intermediate protocol selected from Peripheral Component Interconnect Express (PCIe) or Compute Express Link (CXL) when translating between the NVLink-based protocol and a protocol utilized by the coherent interconnect. Optionally, the use of an intermediate protocol may facilitate translation by leveraging existing protocol conversion mechanisms. When utilizing PCIe as an intermediate protocol, the RPU may translate NVLink transactions to PCIe Transaction Layer Packets (TLPs) and subsequently to coherent interconnect transactions. When utilizing CXL as an intermediate protocol, the RPU may leverage CXL.cache or CXL.mem protocols as appropriate for the transaction type. The intermediate protocol stage may enable reuse of existing protocol bridges and translation logic.

In some implementations, the RPU may be further configured to maintain mappings between transaction identifiers utilized by the NVLink-based protocol and transaction identifiers utilized by the coherent interconnect, enabling correlation of requests and responses across protocol domains. Optionally, the transaction identifier mappings may accommodate different identifier formats, sizes, and allocation schemes between NVLink and the coherent interconnect. Transaction identifiers may be used to identify a transaction, such as when supporting multiple outstanding requests in-flight through the RPU, or may be used to convey properties associated with messages or transactions, such as trace identifiers used for debugging and performance measurements, or authorization identifiers used for security. The RPU may include identifier pools and allocation mechanisms to prevent identifier exhaustion and may support identifier recycling upon transaction completion. The mapping structures may be optimized for fast lookup during high-frequency transaction processing and may utilize on-silicon SRAM, content-addressable memory (CAM) or Ternary Content-Addressable Memory (TCAM) structures.

The RPU may be further configured to: maintain a transaction tracking structure to monitor outstanding transactions from the entity, allocate coherent interconnect transaction identifiers for transactions initiated by the RPU, and release identifiers upon transaction completion. Optionally, the transaction tracking structure may be implemented using content-addressable memories, linked lists, or circular buffers optimized for the expected transaction rates. The RPU may include timeout mechanisms to handle lost or excessively delayed transactions and may support error recovery procedures. The tracking structure may maintain additional transaction attributes such as timestamps, retry counts, or quality-of-service parameters.

The RPU may be further configured to enable bidirectional access by translating requests between the NVLink-based protocol and the protocol utilized by the coherent interconnect; whereby the entity accesses the memory via the NVLink-based protocol, and the processing cores access resources attached to the entity via the coherent interconnect. Optionally, the bidirectional access capability may enable memory pooling and memory sharing architectures wherein system memory and entity-attached memory form a memory space accessible from both domains via translations. The RPU may maintain separate translation contexts for each direction and may apply different translation policies based on the initiator and target of each transaction. The bidirectional capability may support various computing paradigms including GPU-direct operations and peer-to-peer transfers. When processing cores access entity-attached resources, such as High-Bandwidth Memory (HBM) resources, the RPU may handle different memory attributes between the two domains.

The entity may comprise at least one of: high-bandwidth memory (HBM), Low-Power Double Data Rate (LPDDR) memory, or Graphics Double Data Rate (GDDR) memory, and wherein the RPU may be further configured to map a portion of the entity memory into the PAS, enabling the processing cores to access the entity memory based on memory-mapped operations. Optionally, the mapping of entity memory such as HBM, LPDDR, or GDDR memory into PAS may include establishing memory windows with specific attributes optimized for the memory type. The RPU may handle differences in memory access granularity, bandwidth characteristics, and latency profiles between system memory and entity memory. The memory-mapped operations may be subject to caching policies and coherency protocols appropriate for cross-domain memory access.

Additionally, the RPU may be further configured to provide access control by validating the physical addresses associated with the NVLink-based protocol against permitted address ranges for the entity, and blocking NVLink-based protocol transactions targeting prohibited address ranges. Optionally, the permitted address ranges may be configured utilizing secure configuration registers or loaded from trusted firmware during system initialization. The RPU may support multiple access control contexts for different operational modes or security domains. The blocking of prohibited transactions may generate error responses conforming to NVLink error reporting mechanisms and may trigger security event logging.

The RPU may be further configured to evaluate transaction attributes associated with the NVLink-based protocol, including source identifiers and access types, and to apply security policies to allow or deny transactions based on preconfigured security rules. Optionally, the security policies may consider combinations of transaction attributes including source device identification, vendor-defined commands or fields, transaction type, address range, and temporal factors. The RPU may provide role-based access control wherein different entities have different access privileges. The security rules may be updateable utilizing authenticated channels and may support both static and dynamic security policy enforcement.

The RPU may be further configured to detect access patterns in NVLink-based protocol transactions from the entity, and generates prefetch requests based on predicted future accesses, wherein the prefetch requests are routed via the coherent interconnect and the memory controllers. Optionally, the access pattern detection may utilize algorithms such as stride detection, stream buffers, or correlation-based prediction algorithms. The RPU may maintain pattern history tables to track access behaviors and may adapt prefetching aggressiveness based on prefetch accuracy metrics. The prefetch requests may be tagged with lower priority to avoid interfering with demand requests and may be cancelled if subsequent access patterns diverge from predictions.

The RPU may be further configured to coalesce coherent interconnect transactions targeting contiguous or nearby addresses into fewer NVLink-based protocol transactions; whereby the coalescing improves memory bandwidth utilization. Optionally, the request coalescing may consider factors including address proximity, request types, and timing windows when determining which transactions to combine. The RPU may include write combining buffers for write transactions and may support read coalescing for sequential read patterns. In one example, coherent interconnects may use up to 64-byte transfers, that may reflect a nominal cacheline size utilized by the coherent interconnect, whereas NVLink may use larger transfers up to 256 bytes, making coalescing beneficial for bandwidth efficiency.

Furthermore, the NVLink-based interface may be configured to support virtual channels, and the RPU may be further configured to map the virtual channels to quality-of-service (QoS) attributes in a protocol utilized by the coherent interconnect. Optionally, the virtual channel to QoS mapping may enable differentiated service levels for different traffic classes, such as bulk data transfers versus latency-sensitive communications. The RPU may include programmable mapping tables to allow flexible QoS policy configuration. The mapping may consider both NVLink virtual channel priorities and coherent interconnect QoS mechanisms to maintain end-to-end service level objectives.

The memory may comprise dynamic random-access memory (DRAM), and the entity may comprise a graphics processing unit (GPU) or an accelerator coupled to the apparatus via the NVLink-based interface; and wherein the RPU may enable the entity to access the DRAM with cache-line granularity. An entity, such as a GPU or an accelerator, may utilize the NVLink interface for memory access to memory resources attached to the processor. Optionally, when the entity is coupled through an NVLink switch, the RPU may handle switch-specific routing information and may support multiple entities sharing the NVLink interface through switch-based connectivity. The GPU or accelerator entity may utilize the NVLink interface for high-bandwidth memory access patterns characteristic of parallel computing workloads. The RPU may optimize translation mechanisms for the specific access patterns and bandwidth requirements of GPU or accelerator workloads.

In one embodiment, a method for enabling an entity to access memory via an NVLink-based interface and memory controllers, comprises: operating a processor comprising processing cores, memory management units (MMUs), and coherent caches; wherein the processing cores respond to snoop requests that utilize physical addresses within a physical address space (PAS), and the MMUs translate virtual addresses to physical addresses within the PAS; communicating, via a coherent interconnect, between the processing cores and the memory controllers, wherein the memory controllers communicate with memory channels coupled to more than 64 GB of memory; executing, by the processing cores, an operating system (OS) that accesses the memory utilizing the physical addresses within the PAS; communicating according to an NVLink-based protocol with the entity via an NVLink-based interface; and translating physical addresses associated with the NVLink-based protocol to physical addresses within the PAS.

Optionally, the method may further comprise translating from non-address fields belonging to message formats of the NVLink-based protocol to corresponding fields belonging to message formats of a protocol utilized by the coherent interconnect; and wherein the translating of the physical addresses may be performed by a resource provisioning unit (RPU) coupled between the NVLink-based interface and the coherent interconnect. The protocol utilized by the coherent interconnect may be based on Coherent Hub Interface (CHI) protocol (CHI-based protocol), and wherein the translating between non-address fields may comprise translating NVLink-based protocol read commands to CHI-based protocol opcodes or commands comprising ReadOnce or ReadShared. Optionally, the method further includes translating CHI response opcodes to NVLink response opcodes, such as translating CHI responses carrying CompData opcodes to NVLink responses.

The protocol utilized by the coherent interconnect may be based on an Intel Coherent Processor Interconnect Protocol (ICPIP-based protocol) for scalable multiprocessors with a shared physical address space, and wherein the translating between non-address fields may comprise translating NVLink-based protocol memory access commands to ICPIP-based protocol requests while maintaining coherency state tracking between the NVLink-based protocol domain and the ICPIP-based protocol domain. Furthermore, the protocol utilized by the coherent interconnect may be based on Infinity Fabric protocol (IF-based protocol), and wherein the translating between non-address fields may comprise translating NVLink-based protocol transactions to IF-based protocol commands while preserving memory ordering semantics required by the entity.

The method may further comprise translating NVLink-based protocol commands or encodings to commands or opcodes associated with a protocol utilized by the coherent interconnect, based on a mapping between NVLink-based protocol transaction types and corresponding transaction types of the protocol utilized by the coherent interconnect. It is noted that in the context of such embodiments, the terms commands and encodings are interchangeable.

In some implementations, the translating of the physical addresses may comprise utilizing an intermediate protocol selected from Peripheral Component Interconnect Express (PCIe) or Compute Express Link (CXL) as an intermediate stage between the NVLink-based protocol and a protocol utilized by the coherent interconnect. The method may further comprise translating transaction identifiers utilized by the NVLink-based protocol to transaction identifiers utilized by the coherent interconnect, maintaining a transaction tracking structure to monitor outstanding transactions from the entity, allocating coherent interconnect transaction identifiers for RPU-initiated transactions, and releasing identifiers upon transaction completion. The method may also comprise validating the physical addresses associated with the NVLink-based protocol against permitted address ranges for the entity, and blocking NVLink-based protocol transactions targeting prohibited address ranges; and further comprising evaluating NVLink-based protocol transaction attributes including source identifiers and access types, and applying security policies to allow or deny transactions based on preconfigured security rules. Additionally, the method may comprise detecting access patterns in NVLink-based protocol transactions from the entity, and generating prefetch requests based on predicted future accesses, wherein the prefetch requests are routed via the coherent interconnect and the memory controllers.

In one embodiment, a system, comprises: a host processor; a memory comprising at least 64 GB of memory; a coherent interconnect architecture coupling processing elements to the memory, wherein the processing elements utilize a local physical address space to access the memory; and a resource provisioning unit (RPU) configured to translate physical addresses associated with an NVLink-based protocol, utilized by an entity coupled to the RPU via an NVLink-based interface, to physical addresses within the local physical address space; whereby the translate of the physical addresses enables the entity to utilize the memory as disaggregated memory access via the NVLink-based interface and the memory controllers.

Figures 40A, 40B:
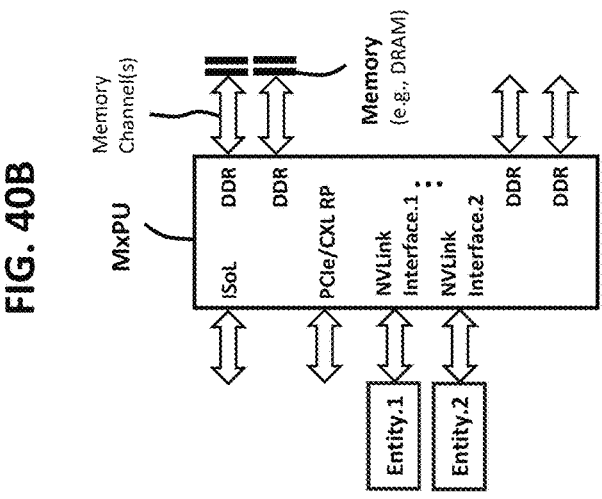
FIG. 40A illustrates one embodiment of a processor comprising an NVLink interface, processing cores, LLCs, and a coherent interconnect.
FIG. 40B illustrates one embodiment of a processor comprising NVLink interfaces and DDR channels.

FIG. 40A illustrates one embodiment of a processor (such as an MxPU that may be derived from an established processor design) comprising processing cores, last level cache (LLC), and a coherent interconnect utilizing a topology structure of a ring. Alternatively, the coherent interconnect may utilize other topology structures such as a mesh, a crossbar, or a custom topology. The processor may include an NVLink interface, and an ISoL port, such as a port utilizing ARM CHI C2C, NVIDIA NVLink-C2C, Intel UPI, or AMD Infinity Fabric. The processor may further include a PCIe/CXL Root Port (PCIe/CXL RP), and may be coupled to memory, such as DRAM, optionally via a memory controller and memory channels. The NVLink interface may communicate with an entity, such as a GPU or a CPU, optionally via a switch, according to an NVLink-based protocol, wherein an RPU may perform physical address translations that may enable the entity to access the memory via the NVLink interface. The illustrated RPU is coupled to the on-chip ring interconnect via a coherent interconnect interface, such as a Ring-to-RPU (R2RPU). Alternatively, the RPU may be coupled to the on-chip ring interconnect essentially directly. Similarly, the illustrated ISoL port is coupled to the on-chip ring interconnect via a coherent interconnect interface, such as a Ring-to-ISoL (R2ISoL), and the PCIe/CXL RP is coupled to the on-chip ring interconnect via a coherent interconnect interface, such as a Ring-to-PCIe/CXL (R2PCIe/CXL). The processor may be implemented as a monolithic die, as chiplets within an IC package, such as by utilizing separate compute die(s) and I/O die(s), or as components on a board.

FIG. 40B illustrates one embodiment of a processor (such as an MxPU) comprising NVLink interfaces, DDR channels, at least one optional PCIe/CXL RP, and at least one optional ISoL. The NVLink interfaces may not utilize the same physical address space, may be coupled to entities, optionally via a switch, and may communicate with the entity according to one or more NVLink-based protocols.

Figure 41B:
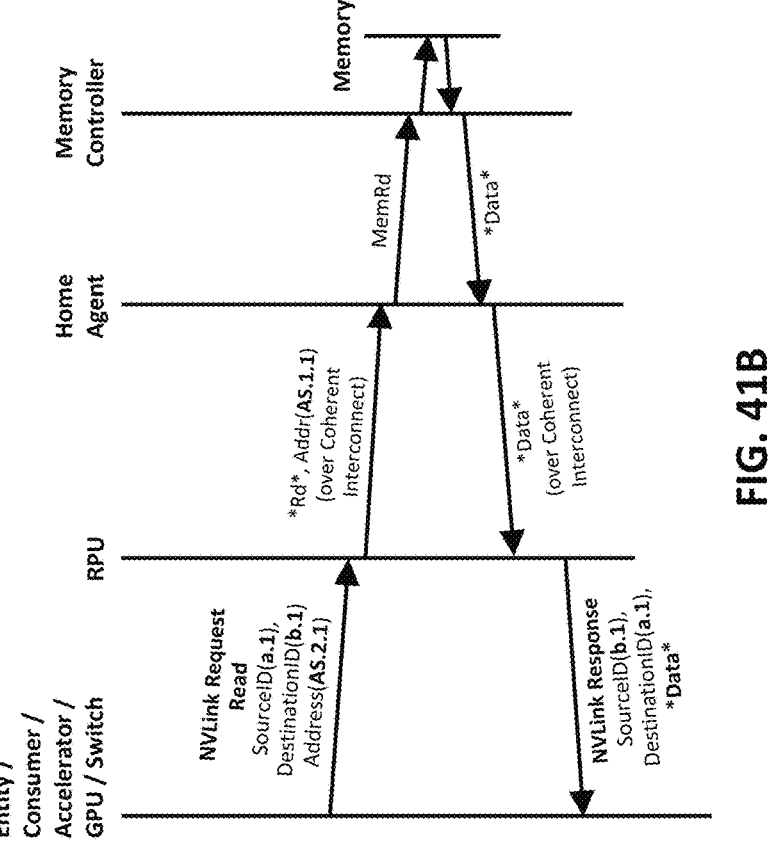
FIG. 41B illustrates one embodiment of a TFD demonstrating translating an NVLink read request to a read transactions of a protocol utilized by a processor's coherent interconnect to access memory.
Figure 41A:
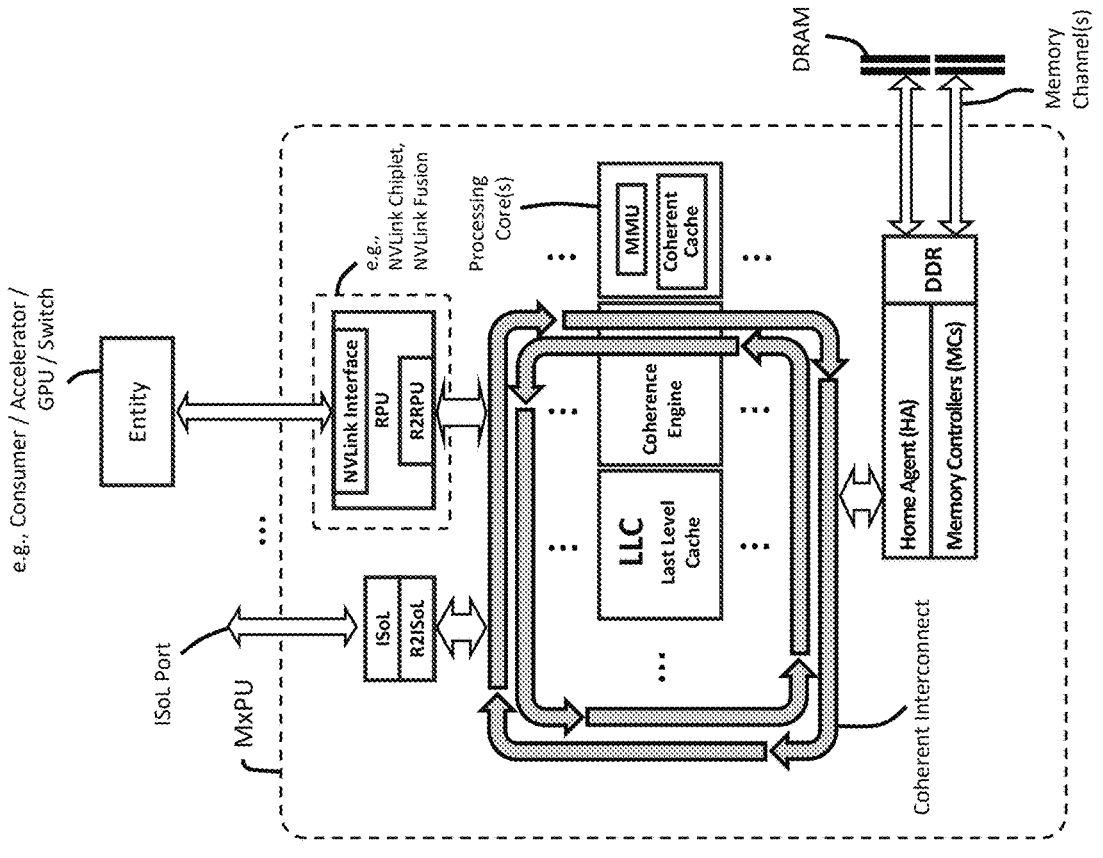
FIG. 41A illustrates one embodiment of a processor comprising an NVLink interface, processing cores, caches, and a coherent interconnect.

FIG. 41A illustrates one embodiment of a processor (such as an MxPU) comprising processing cores, caches, and a coherent interconnect utilizing a topology structure of a ring. Alternatively, the coherent interconnect may utilize other topology structures such as a mesh, a crossbar, or a custom topology. The processor may further include an ISoL port such as ARM CHI C2C, NVIDIA NVLink-C2C, Intel UPI, or Intel UXI, and memory controllers coupled via memory channels to memory, such as DRAM. The processor may include an NVLink interface that may communicate with an entity such as a GPU or an accelerator, according to an NVLink-based protocol, wherein an RPU may perform physical address translations to enable the entity to access the memory. The illustrated RPU is coupled to the coherent interconnect via a Ring-to-RPU (R2RPU) interconnect interface. Alternatively, the RPU may be coupled to the on-chip ring interconnect essentially directly. In some embodiments, the RPU, the NVLink interface, and the R2RPU may reside on a chiplet, such as an NVLink chiplet or NVLink Fusion, and coupled to the coherent interconnect via a chip-to-chip (C2C) interface. Similarly, the illustrated ISoL port may be coupled to the on-chip ring interconnect via a Ring-to-ISoL (R2ISoL) interconnect interface. The processor may be implemented as a monolithic die that includes the RPU and the NVLink interface, as silicon dies or chiplets within an IC package, such as by utilizing separate compute die(s) and I/O die(s), or as components on a board.

FIG. 41B illustrates one embodiment of a TFD demonstrating an NVLink read request received from an entity, such as a GPU or an accelerator, wherein the RPU may translate a physical address (AS.2.1) carried in the NVLink request, to a physical address (AS.1.1) utilized for accessing the memory. The NVLink request may carry ID-based fields, such as source ID and destination ID, which may be utilized by NVLink switches for routing the request. In some embodiments, the NVLink request may further include a Tag field that may be utilized to identify a transaction and match it with a corresponding NVLink response, and may further include a Length field that may specify the length of the data transfer requested. In some embodiments, the RPU may translate an NVLink request to multiple read transactions of the protocol utilized by the coherent interconnect, such as in order to fulfill the length of the data transfer specified in the NVLink request. The RPU may perform further translations, such as protocol translations from an NVLink-based protocol to a protocol utilized by the processor's coherent interconnect, and may further send the optionally translated request to a home agent (also known as home node), and/or to a memory controller, requesting the read of address (AS.1.1). In some embodiments, the requested data may be provided by a processor cache, such as by an LLC, instead of being provided by the memory. The data may then return over the processor's coherent interconnect to the RPU, wherein the RPU provides an NVLink response to the requesting entity. In some embodiments, the NVLink response may include a Tag field that may identify the transaction and may enable matching the NVLink response with a corresponding NVLink request.

Figures 49A, 49B:
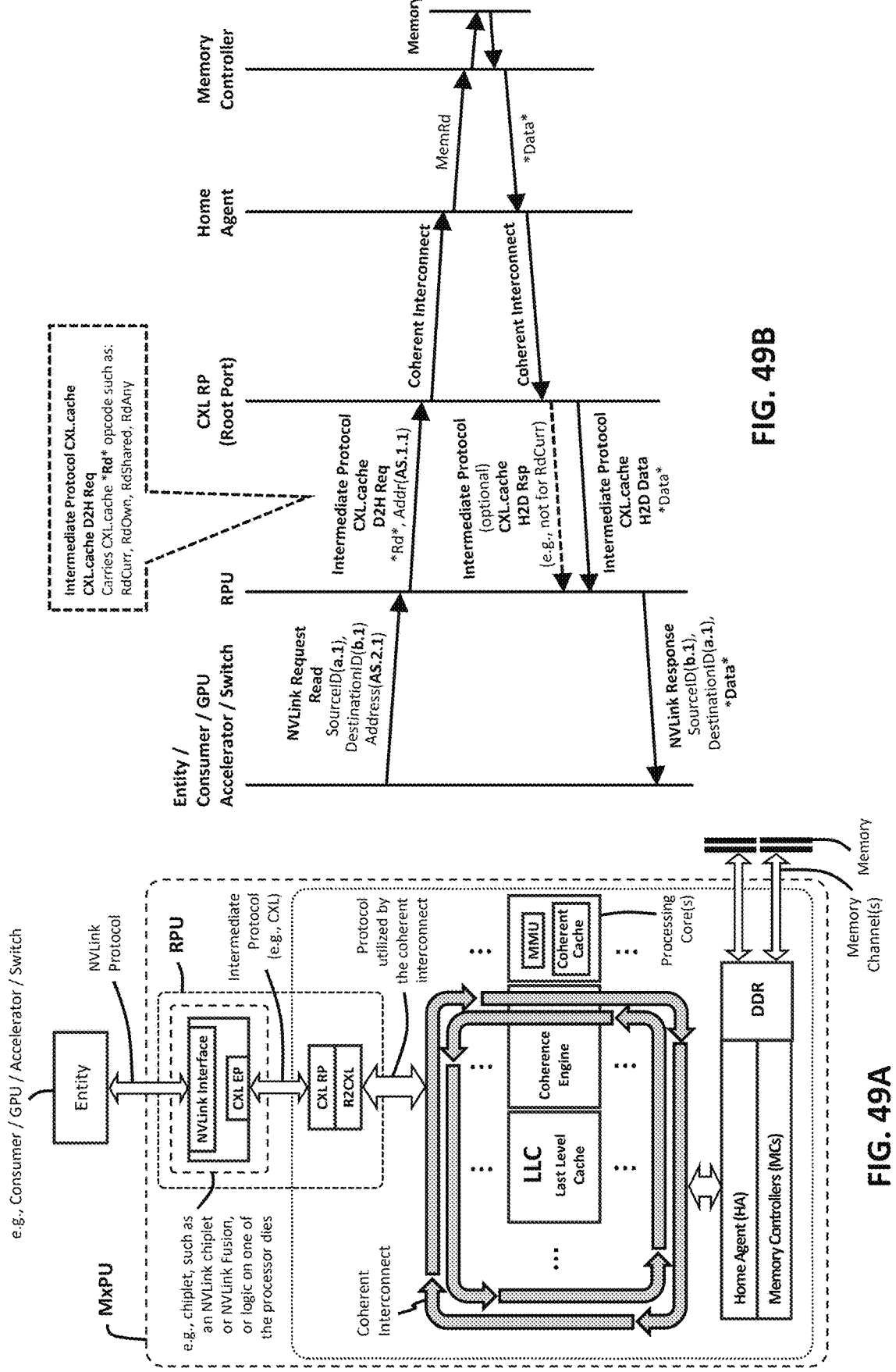
FIG. 49A illustrates one embodiment of a system comprising a processor comprising an NVLink interface, processing cores, LLC, a CXL RP, and memory controllers coupled via memory channels to memory.
FIG. 49B illustrates one embodiment of a TFD demonstrating protocol translations from an NVLink protocol to a protocol utilized by a processor's coherent interconnect.

FIG. 49A illustrates one embodiment of a system comprising a processor (such as an MxPU) comprising processing cores, LLC, a CXL RP, and memory controllers coupled via memory channels to memory, such as DRAM. The CXL RP may be coupled to an on-chip coherent interconnect, such as a CHI ring or mesh interconnect, via a Ring-to-CXL (R2CXL) interconnect interface that may communicate with the coherent interconnect according to a protocol utilized by the coherent interconnect, such as ARM CHI, Intel IDI, Intel UPI, or AMD Infinity Fabric. An RPU, which may be included in the MxPU, performs physical address translations that may enable an entity such as a GPU to access the memory. The MxPU may expose to the entity, optionally via the RPU, an NVLink interface that may communicate with the entity according to an NVLink protocol. The RPU may further perform protocol translations, such as from an NVLink protocol to a protocol utilized by the coherent interconnect, wherein the RPU may utilize an intermediate protocol, such as CXL (e.g., CXL.cache), for providing the protocol translations. The RPU may expose to the processor, via a CXL RP that may be included in the RPU, a CXL device utilizing a CXL Endpoint (CXL EP), such as a Type-1 CXL device, or a Type-2 CXL device. The R2CXL interconnect interface, that may reside in the RPU, may couple the CXL RP to the coherent interconnect and complement the translation path from the NVLink protocol, via the intermediate protocol, such as CXL, to the protocol utilized by the coherent interconnect. In some embodiments, the RPU, the NVLink interface, and the CXL device (e.g., CXL EP) may be implemented in a chiplet, such as an NVLink chiplet, or NVLink Fusion, inside an IC package of an MxPU, whereas in other embodiments, they may be implemented as functional blocks on the same die with the CXL RP of the processor, or split between silicon dies or chiplets inside the IC package of the MxPU.

FIG. 49B illustrates one embodiment of a TFD demonstrating an NVLink read request received from an entity (such as a consumer, GPU, accelerator, or a switch), wherein the RPU may translate a physical address (AS.2.1) carried in the NVLink request, to a physical address (AS.1.1) utilized for accessing the memory. The RPU may perform further translations, such as protocol translations from an NVLink protocol to a protocol utilized by the processor's coherent interconnect, possibly utilizing an intermediate protocol such as CXL.cache, wherein the RPU may perform further translations, such as opcode translations and tag translations, e.g., of transaction tags, such as translating from NVLink tags to CXL.cache CQIDs. The CXL.cache D2H request, carrying the translated address (AS.1.1), is sent to the CXL RP for further processing and fetching of the requested data, such as from an LLC over the coherent interconnect, or from DRAM via the memory channels. The data may then return over the coherent interconnect to the RPU, wherein the RPU provides an NVLink response to the requesting entity.

Figure 42B:
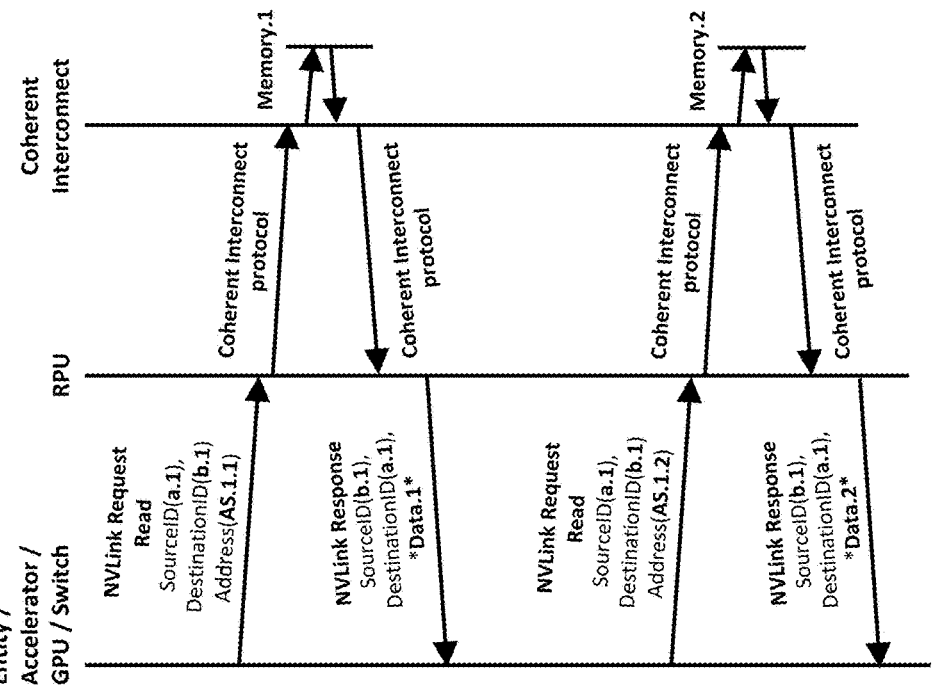
FIG. 42B illustrates one embodiment of a TFD demonstrating two translations from an NVLink-based protocol to a protocol utilized by a processor's coherent interconnect.
Figure 42A:
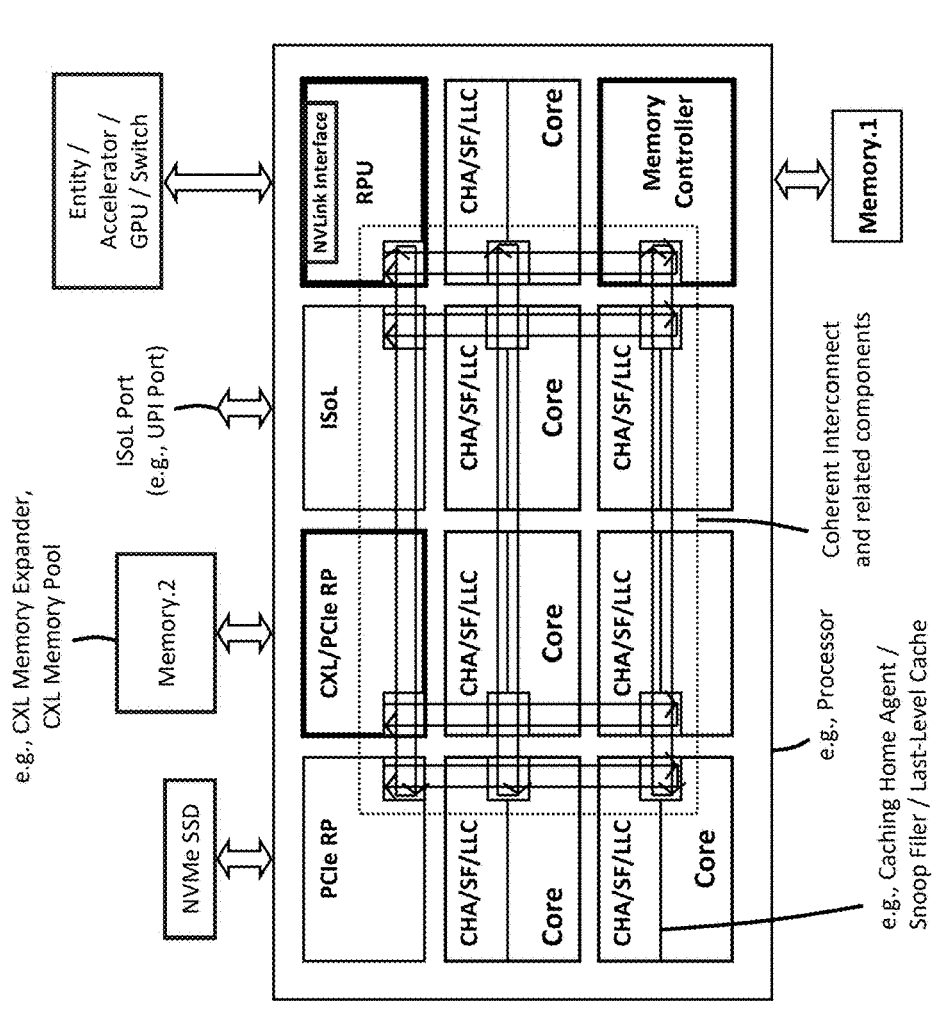
FIG. 42A illustrates one embodiment of a system comprising a processor that includes an NVLink interface.

FIG. 42A illustrates one embodiment of a system comprising a processor, including a coherent interconnect, capable of enabling an external entity to access memory resources mapped to the coherent interconnect's address space. Optionally, the processor may include an MxPU derived from an established processor design that may include processing cores, caching/home agent (CHA), snoop filter (SF), and last-level cache (LLC), optionally implemented as slices distributed across tiles on the coherent interconnect mesh. The processor may further include an ISoL port (such as a port utilizing Intel Coherent Processor Interconnect Protocol (ICPIP), or ARM CHI C2C), a PCIe RP that may be coupled to an NVMe SSD, a CXL/PCIe RP, and/or a memory controller that may be coupled to a first memory, such as DRAM. The processor may be coupled to a second memory, such as a CXL memory expander or a CXL memory pool, and may further include an RPU that includes or coupled to an NVLink interface that may communicate with an entity, such as an accelerator, according to an NVLink-based protocol, wherein the RPU may perform physical address translations to enable the entity to access the first memory (Memory.1) and/or the second memory (Memory.2). The illustrated RPU may be coupled to the coherent interconnect, and may translate between the NVLink-based protocol and a protocol utilized by the coherent interconnect. The processor may be implemented as a monolithic die, as chiplets within an IC package, such as by utilizing separate compute die(s) and I/O die(s), or as components on a board, and may utilize a mesh-based coherent interconnect, or in other embodiments, may utilize a ring, a crossbar, or other types of coherent interconnects. In other embodiments, the NVLink interface may reside on a separate chiplet, such as an NVLink Fusion, and may be coupled to the coherent interconnect via a UCIe interface or a proprietary chip-to-chip or die-to-die interface.

FIG. 42B illustrates one embodiment of a TFD demonstrating two NVLink requests, such as NVLink read requests, received from an entity (such as an accelerator, GPU, or a switch) and forwarded to different memories mapped to a coherent interconnect's address space. The RPU may perform physical address translations to enable the entity to access the processor's memories. The processor may have multiple memory resources, such as DRAM coupled to a memory controller of the processor, and/or memory expanders that may be coupled to a CXL RP of the processor. The RPU may further perform additional translations, such as protocol translations from an NVLink-based protocol to a protocol utilized by the coherent interconnect, and may send the optionally translated request to the coherent interconnect, requesting a read from memory. In some embodiments, the requested data may be provided by a processor cache, such as by an LLC, instead of by the memory. The data may then return over the coherent interconnect to the RPU, wherein the RPU provides an NVLink Response to the requesting entity. The TFD illustrates two exemplary transactions carrying different physical addresses mapped to different memory resources. The first exemplary transaction includes an NVLink Request with physical address (AS.1.1), which the RPU translates and forwards via the coherent interconnect protocol to Memory.1, resulting in the retrieval of *Data.1* that is returned to the entity with the first NVLink Response. The second exemplary transaction includes an NVLink request with physical address (AS.1.2), which the RPU translates and forwards via the coherent interconnect protocol to Memory.2, resulting in the retrieval of *Data.2* that is returned to the entity with the second NVLink response. The physical addresses (AS.1.1) and (AS.1.2) may belong to different memory regions within the coherent interconnect's address space, enabling the entity to access memory resources based on the RPU's translation capabilities.

Figures 43A, 43B:
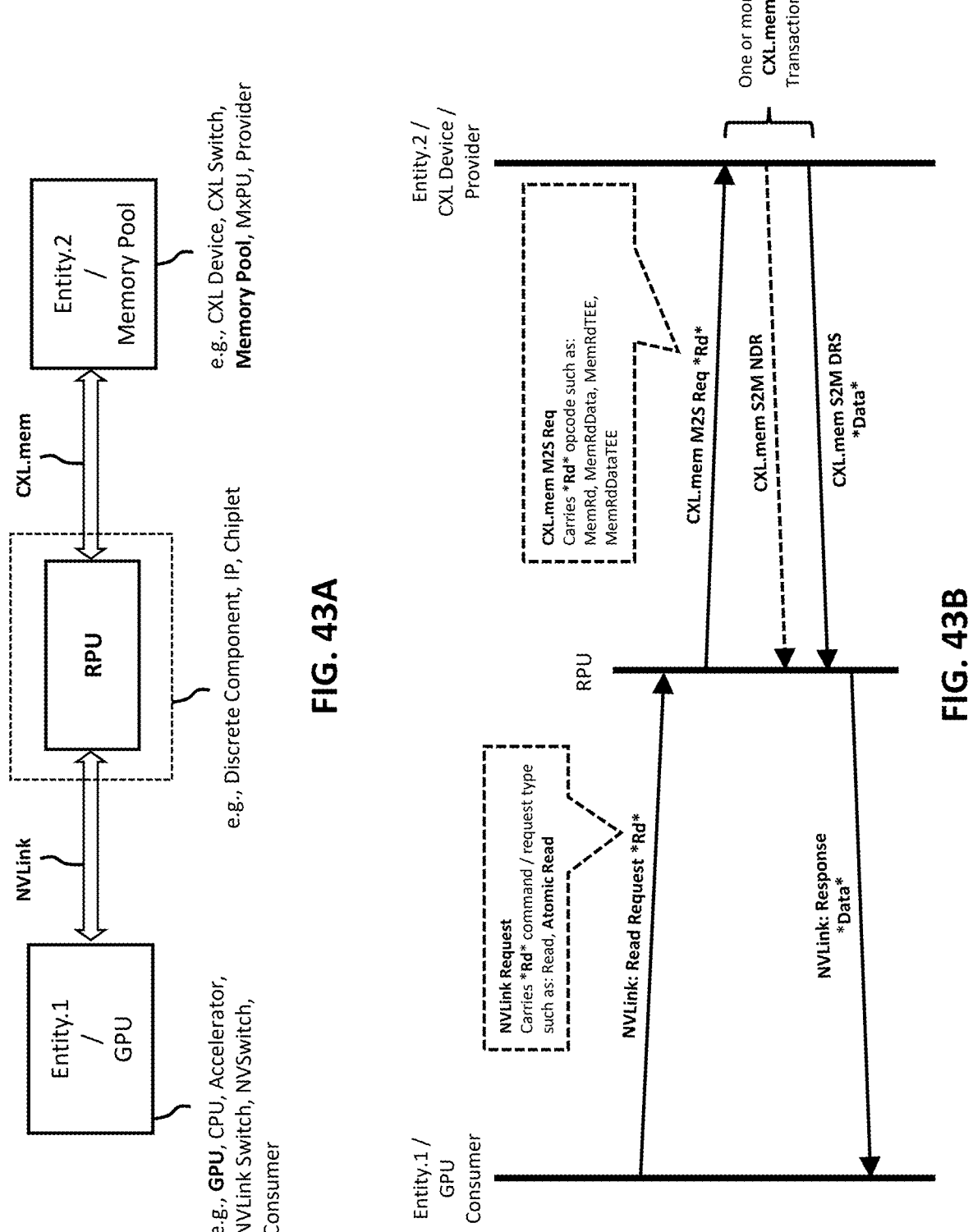
FIG. 43A illustrates one embodiment of a system comprising an apparatus that translates between an NVLink-based protocol and a CXL.mem.
FIG. 43B illustrates one embodiment of a TFD demonstrating a protocol translation between an NVLink-based protocol and CXL.mem.

FIG. 43A illustrates one embodiment of a system comprising an apparatus, such as an RPU, which may translate between an NVLink-based protocol (such as a protocol utilizing NVLink 5 technology) and a CXL-based protocol (such as CXL.mem). Additionally or alternatively, the RPU may perform protocol translations between the NVLink-based protocol and CXL.io, and/or between the NVLink-based protocol and CXL.cache. In some embodiments, the RPU may be implemented as a discrete component, such as on a PCB, coupled to other components such as CPUs, GPUs, accelerators, switches, or CXL devices. In other embodiments, the RPU may be embedded in another silicon design, such as an IP within a processor, or may be implemented as a chiplet within an IC package.

FIG. 43B illustrates one embodiment of a TFD demonstrating an apparatus, such as an RPU, that may perform a protocol translation between an NVLink-based protocol, such as a protocol utilizing NVLink 5 technology, and a CXL-based protocol, such as CXL.mem. The RPU may receive and process other CXL-based protocols, such as CXL.io, and/or CXL.cache. The RPU may receive from a first entity (Entity.1), such as a GPU, or a resource consumer, an NVLink-based request or an NVLink-based read request, translate the NVLink-based request to a CXL-based request, such as a CXL request comprising CXL.mem M2S Request that may carry a *Rd* opcode, and send the translated request to a second entity (Entity.2), such as a CXL device, or a resource provider. The notation *Rd* included in the NVLink-based request, may represent an applicable read-class operation, such as a read request type, a read command, or a read opcode, that is supported by the NVLink-based request associated with the NVLink-based protocol. Similarly, the notation *Rd* included in the CXL-based request, may represent an applicable read-class operation supported by the CXL-based request associated with the CXL-based protocol, such as MemRd, MemRdData, MemRdTEE, or MemRdDataTEE in the translated CXL.mem M2S Request. The RPU may further translate between other fields of the NVLink-based request and fields of the CXL-based request, such as between address fields, tag fields, QoS-related fields, or identification (ID) fields that may serve to route the NVLink-based request to its target.

In some embodiments, the RPU may translate a single NVLink-based request to more than one CXL-based request (e.g., more than one CXL.mem request), such as wherein the NVLink-based request may include a request for a data payload size that may be larger than the maximum data payload size supported by the CXL-based protocol. For example, the RPU may translate an NVLink-based read request for a data payload of 256 Bytes to four CXL.mem M2S Requests, that each may carry 64 Bytes of data that may represent a cacheline. The RPU may further translate between CXL-based responses, such as CXL.mem S2M NDR and/or CXL.mem S2M DRS, and NVLink-based responses, and may forward read data carried in CXL-based responses, such as data carried in CXL.mem DRS messages, into NVLink-based responses. In some embodiments, the RPU may accumulate data from one or more CXL-based responses, such as accumulating data from one or more CXL.mem DRS messages, before sending the data via an NVLink-based response.

Figures 44A, 44B:
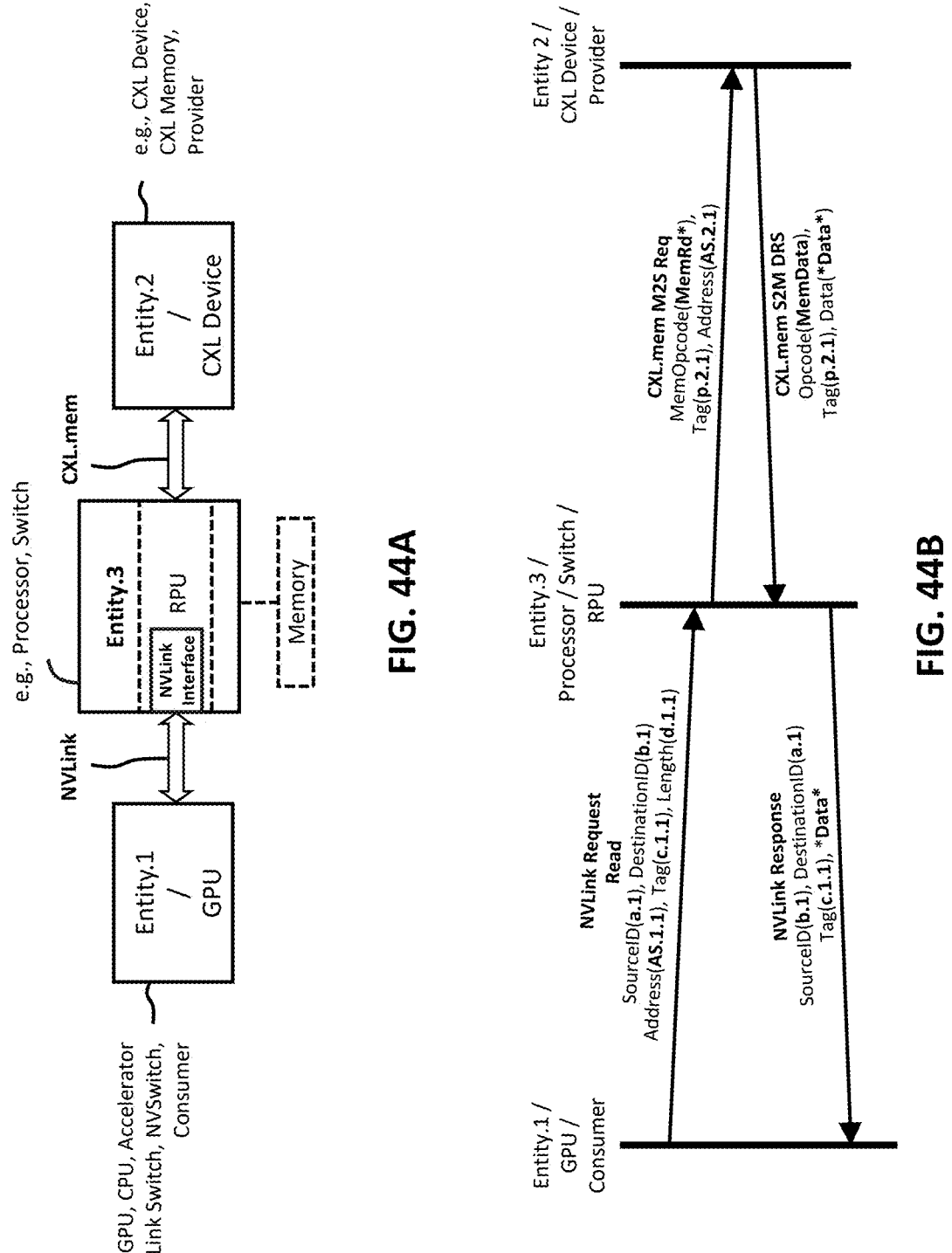
FIG. 44A illustrates one embodiment of a system comprising a processor or a switch comprising an RPU that includes an NVLink interface enabling external entities to access resources coupled to the processor utilizing CXL.mem.
FIG. 44B illustrates one embodiment of a TFD demonstrating translations between an NVLink-based protocol and a CXL.mem protocol utilized for communicating with a CXL device or CXL memory.

FIG. 44A illustrates one embodiment of a system comprising a third entity (Entity.3), such as a processor or a switch, which may be coupled to a memory. The third entity may include an RPU that includes an NVLink interface, enabling external entities to access, via the NVLink interface, resources coupled to the third entity. The third entity is coupled to a first entity (Entity.1), which may be a GPU, a CPU, an accelerator, an NVLink switch, or a resource consumer, wherein the third entity may communicate with the first entity according to an NVLink-based protocol, such as a protocol utilizing NVLink 5 technology. The third entity is further coupled to a second entity (Entity.2), which may be a CXL device, CXL memory, or a resource provider, wherein the third entity may communicate with the second entity according to a CXL.mem protocol. In some embodiments, the NVLink-based protocol may be associated with a first physical address (PA) space, such as a GPU physical address space or an NVLink-based network addresses space; the CXL.mem protocol may be associated with a second PA space, such as an HPA space; and wherein the RPU may perform address translations between addresses within the first PA space and addresses within the second PA space, such as between addresses within an NVLink-based network addresses space and addresses within an HPA space. In other embodiments, the NVLink-based protocol and the CXL.mem protocol may be associated with the same PA space, such as a global address space; wherein the RPU may perform address translations between addresses within the same physical address spaces. Optionally, the RPU may perform further translations between the NVLink-based protocol domain and the CXL.mem protocol domain, such as protocol translations, opcode translations, command translations, and field translations.

FIG. 44B illustrates one embodiment of a TFD demonstrating translations performed by a third entity (Entity.3), such as a processor, a switch, or an RPU, between an NVLink-based protocol utilized for communicating with a first entity (Entity.1), such as a GPU, a CPU, or an accelerator, and a CXL.mem protocol utilized for communicating with a second entity (Entity.2), such as a CXL device or CXL memory. The first entity may initiate an NVLink request, such as an NVLink read request comprising SourceID(a.1), DestinationID(b.1), Address(AS.1.1), Tag (c.1.1), and Length(d.1.1), wherein SourceID(a.1) may denote the NVLink interconnect address of the requesting entity, such as source GPU, and wherein DestinationID(b.1) may denote the NVLink interconnect address of the target of the NVLink request, such as destination GPU, destination processor, or destination RPU. DestinationID(b.1) and optionally SourceID(a.1) may be utilized for routing or forwarding the NVLink request to its destination. The third entity may translate the NVLink request to a CXL.mem M2S Request comprising MemOpcode(MemRd*), Tag (p.2.1), and Address(AS.2.1), and may send the CXL.mem M2S Request to the second entity. Upon receiving a response from the second entity, which may include a CXL.mem S2M DRS comprising Opcode(MemData), Tag (p.2.1), and Data(*Data*), the third entity may translate the CXL.mem S2M DRS to an NVLink response comprising SourceID(b.1), DestinationID(a.1)

Tag(c.1.1), and *Data*. The third entity may perform further translations, such as opcode translations, command translations, or field translations between PDUs of the NVLink-based protocol and messages of the CXL.mem protocol, such as translations of tags and translations of error indications, such as poison.

Figure 45B:
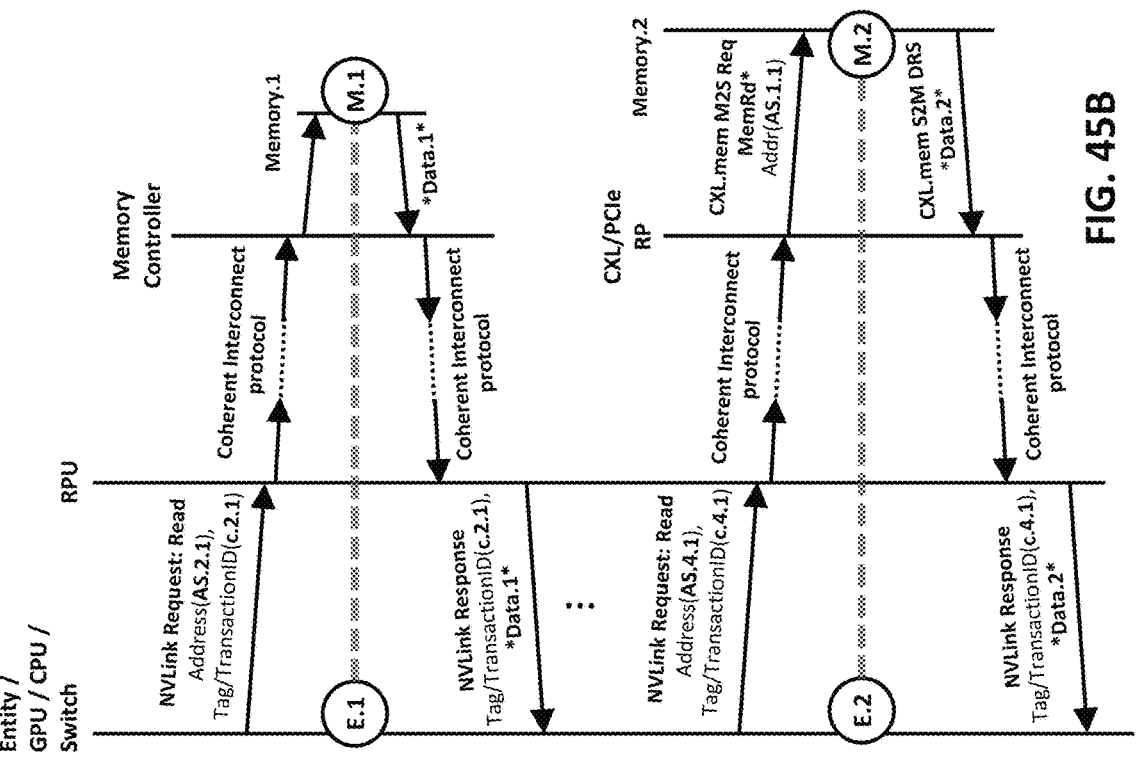
FIG. 45B illustrates one embodiment of a TFD demonstrating two NVLink requests processed by an RPU, which are forwarded to different memories.
Figure 45A:
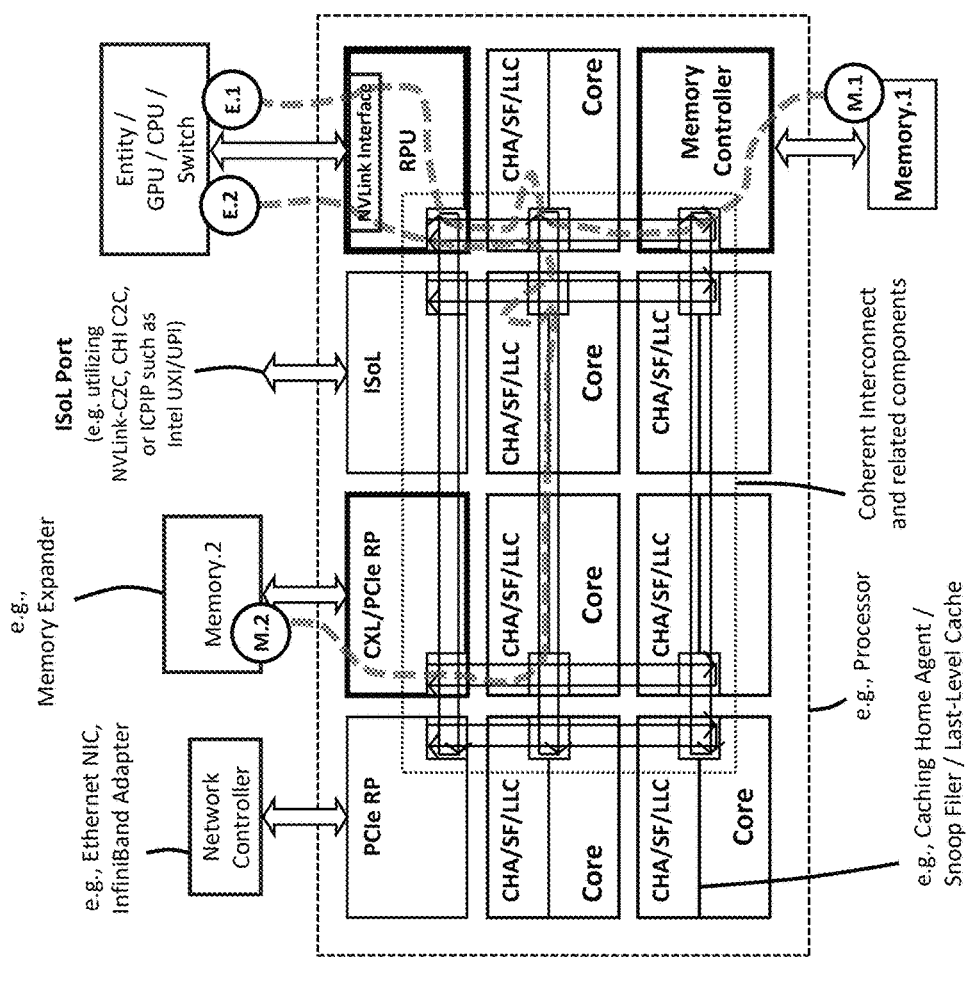
FIG. 45A illustrates one embodiment of a system comprising a processor including a coherent interconnect and an NVLink interface.

FIG. 45A illustrates one embodiment of a system comprising a processor including a coherent interconnect, which may enable an external entity, such as a GPU or CPU, to access memory resources mapped to an address space utilized by the coherent interconnect, such as via one or more of the two illustrated paths denoted as (E.1)-(M.1) and (E.2)-(M.2). The processor may include processing cores, caching/home agent (CHA), snoop filter (SF), and LLC, optionally implemented as distributed slices coupled to the coherent interconnect. The processor may further include a PCIe RP that may be coupled to a Network Controller, such as an Ethernet NIC or an InfiniBand Adapter, a CXL/PCIe RP, a memory controller that may be coupled to a first memory (Memory.1), such as DRAM, and an ISoL port, such as a port utilizing NVIDIA NVLink-C2C, ARM CHI C2C, or Intel Coherent Processor Interconnect Protocol (ICPIP), e.g., Intel UPI, or Intel UXI. The processor may be coupled to a second memory (Memory.2), such as a CXL memory expander, and may further include an RPU that includes or coupled to an NVLink interface that may communicate with the entity according to an NVLink-based protocol, such as a protocol utilizing an NVLink interconnect, wherein the RPU may perform physical address translations to enable the entity to access the first memory, such as via the path (E.1)-(M.1), and/or access the second memory, such as via the path (E.2)-(M.2). The illustrated RPU may be coupled to the coherent interconnect, and may translate between the NVLink-based protocol and a protocol utilized by the coherent interconnect. Optionally, the processor may be implemented as an IP block embedded into a silicon design, such as a switch or an accelerator. In other embodiments, the processor may be implemented as a monolithic die, as chiplets within an IC package, or as components on a board, and may utilize a mesh-based coherent interconnect, or in other embodiments, may utilize a ring, a crossbar, a Network on Chip (NoC) or other types of coherent interconnects.

FIG. 45B illustrates one embodiment of a TFD demonstrating two NVLink requests, such as NVLink read requests, received from an entity, such as a GPU or a CPU, processed by an RPU and forwarded, possibly using a protocol utilized by a coherent interconnect of a processor, to different memories that may be mapped to an address space utilized by the coherent interconnect. The paths from the RPU to the different memories may optionally traverse other components, such as CHA/SF/LLC slices, memory controllers, or in other embodiments a home agent or a home node, optionally for resolving coherency. The RPU may perform physical address translations between first physical addresses, such as from GPU physical addresses or NVLink-based network addresses that may be carried in the NVLink requests, and second physical addresses, such as Host Physical Addresses (HPAs), which may belong to an address space utilized by the coherent interconnect, wherein the physical address translations may enable the entity to access the processor's memories. The processor may have multiple memory resources, such as first memory (Memory.1), which may be DRAM coupled to a memory controller of the processor, and/or second memory (Memory.2), which may be a CXL memory expander coupled to a CXL/PCIe RP of the processor. The RPU may further perform additional translations, such as protocol translations between an NVLink-based protocol, such as a protocol that utilizes an NVLink interconnect, and a protocol utilized by the coherent interconnect, wherein the RPU may send the optionally translated request to the coherent interconnect, requesting a read from memory. In some embodiments, the requested data may be provided by a processor cache, such as by an LLC, instead of by the memory. The data may then return over the coherent interconnect to the RPU, wherein the RPU may provide the data to the requesting entity via an NVLink response.

The TFD illustrates two exemplary transactions between the entity and the RPU, corresponding to two distinct memory read paths denoted as (E.1)-(M.1) and (E.2)-(M.2), carrying different physical addresses mapped to different memory resources. The first exemplary transaction includes a first NVLink read request comprising Address(AS.2.1) and Tag/TransactionID(c.2.1), wherein Tag/TransactionID may denote a tag, a transaction tag, a transaction identifier, or another field or set of fields carried in NVLink requests and/or NVLink Responses, which may serve for associating the NVLink responses with the NVLink requests. The RPU may translate the first NVLink read request and forward the translated request via the coherent interconnect protocol, resulting in the retrieval of *Data.1* from the first memory (Memory.1) via the memory controller, wherein *Data.1* may be sent to the entity via the coherent interconnect protocol and via the RPU with the first NVLink Response.

The second exemplary transaction includes a second NVLink read request comprising Address(AS.4.1) and Tag/TransactionID(c.4.1). The RPU may translate the second NVLink read request, and may further translate the physical address (AS.4.1) carried in the second NVLink read request to a translated physical address (AS.1.1) which may belong to an address space utilized by the coherent interconnect. The RPU may forward the translated request, that may include the translated physical address (AS.1.1), via the coherent interconnect protocol, resulting in the retrieval of *Data.2* from the second memory (Memory.2) via the CXL/PCIe RP, utilizing a CXL.mem M2S Request comprising MemRd* and the translated physical address (AS.1.1), and further utilizing a CXL.mem S2M DRS comprising *Data.2*, wherein *Data.2* is sent to the RPU via the coherent interconnect protocol. The RPU may then send *Data.2* to the entity via the second NVLink Response. It is noted that the physical addresses (AS.2.1) and (AS.4.1) may belong to different memory regions within an address space, such as a GPU physical address space or an NVLink-based network addresses space, which may be exposed via an NVLink interface, enabling the entity to access memory resources based on the translation capabilities of the RPU.

Figures 46A, 46B:
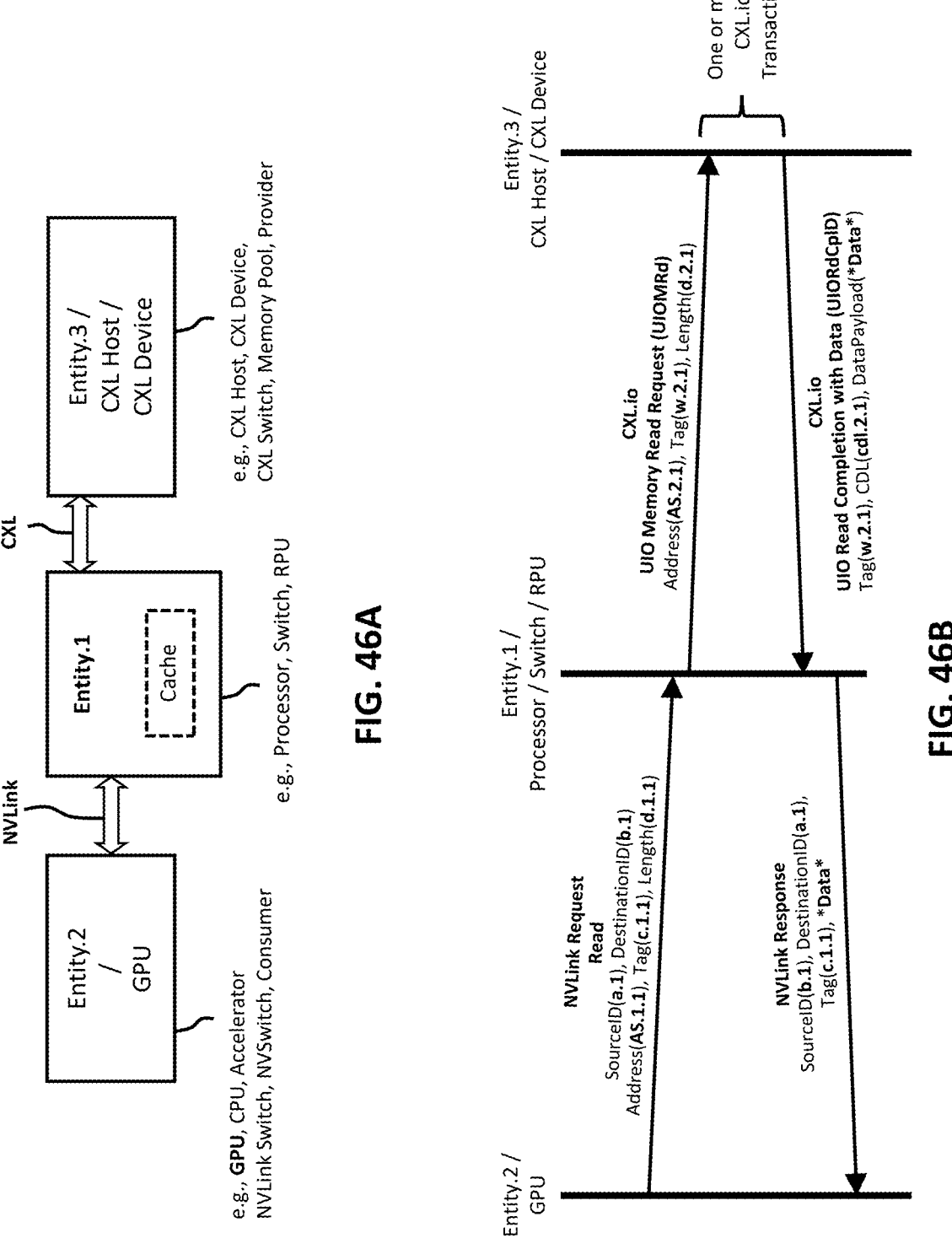
FIG. 46A illustrates one embodiment of a system comprising a processor configured to translate between an NVLink-based protocol and a CXL-based protocol.
FIG. 46B illustrates one embodiment of a TFD demonstrating translations between an NVLink request to a CXL.io request.

FIG. 46A illustrates one embodiment of a system comprising a first entity (Entity.1), such as a processor, a switch, or an RPU, optionally comprising a cache, that may enable NVLink-based resource consumers to access resources coupled to the first entity, such as CXL hosts, CXL devices, or CXL memory. The first entity is coupled to a second entity (Entity.2), which may be a GPU, a CPU, an accelerator, an NVLink switch, or a consumer, wherein the first entity may communicate with the second entity according to an NVLink-based protocol, such as a protocol utilizing an NVLink interconnect. The first entity is further coupled to a third entity (Entity.3), which may be a CXL host, a CXL device, a CXL switch, a CXL-based memory pool, CXL memory, or a resource provider, wherein the first entity may communicate with the third entity according to a CXL-based protocol, such as at least one of CXL.io, CXL.mem, or CXL.cache.

In some embodiments, the NVLink-based protocol may be associated with a first address space, such as an NVLink-based address space, an NVLink-based network address space, or a GPU address space, and the CXL-based protocol, such as CXL.io, may be associated with a second address space, such as a System Physical Address (SPA) space or a Host Physical Address (HPA) space; wherein the first entity may perform address translations between addresses within the first and second address spaces, respectively, such as between addresses within the NVLink-based address space and addresses within the SPA space or the HPA space. In other embodiments, the NVLink-based protocol and the CXL-based protocol may be associated with the same physical address space, such as a global address space, a pod address space, or a fabric address space; wherein the first entity may perform address translations between addresses within the same address spaces. The first entity may perform further translations, such as opcode translations, command translations, request translations, or TLP translations, such as when translating between NVLink requests and CXL.io requests. The first entity may further perform other translations, such as field translations between PDUs of the NVLink-based protocol and PDUs of the CXL protocol, such as translations of tags and translations of error indications, such as data corruption indications or poison.

FIG. 46B illustrates one embodiment of a TFD demonstrating a first entity (Entity.1), such as a processor, a switch, or an RPU, that may perform protocol translations between an NVLink-based protocol, such as a protocol utilizing an NVLink interconnect, and a CXL-based protocol, such as CXL.io. The first entity may receive from a second entity (Entity.2), which may be a GPU, an NVLink request, such as an NVLink read request, that may include SourceID(a.1), DestinationID(b.1), Address(AS.1.1), Tag(c.1.1), and Length(d.1.1), wherein SourceID(a.1) may denote the NVLink interconnect address of the requesting entity, such as source GPU, and wherein DestinationID(b.1) may denote the NVLink interconnect address of the target of the NVLink request, such as destination GPU, and may be utilized for routing or forwarding the NVLink request to its destination. The first entity may translate the NVLink request to a CXL.io request that may include CXL.io Memory Read Request (MRd) or CXL.io UIO Memory Read Request (UIOMRd) comprising Address(AS.2.1), Tag(w.2.1), and Length(d.2.1). Alternatively or additionally, the first entity may translate the NVLink request to a PCIe request that may include a PCIe MRd TLP or a PCIe UIOMRd TLP.

The first entity may further translate between other fields of the NVLink request and fields of the CXL.io request, such as between address fields, tag fields, QoS-related fields, or identification (ID) fields that may serve to route or forward the NVLink request to its destination. In some embodiments, the first entity may translate a single NVLink request to more than one CXL.io request, such as in order to split a large data read request (e.g., splitting a large 256B NVLink read request to multiple 64B smaller CXL.io read requests), or in order to prefetch data, optionally into a cache that may be included in or coupled to the first entity. The first entity may further translate between CXL.io responses or completions, such as CXL.io Completion with Data (CpID) or CXL.io UIO Read Completion with Data (UIORdCpID), and NVLink responses, and may forward data carried in CXL.io completions into NVLink responses. Alternatively or additionally, the first entity may further translate between PCIe responses or completions, such as PCIe CpID TLP or PCIe UIORdCpID TLP, and NVLink responses, and may forward data carried in PCIe completions into NVLink Responses.

In some embodiments, upon receiving a response from the second entity (Entity.2), which may include a CXL.io UIO Read Completion with Data (UIORdCpID) comprising Tag(w.2.1), CDL(cdl.2.1), and DataPayload(*Data*), the first entity may translate the CXL.io UIO Read Completion with Data (UIORdCpID) to an NVLink response comprising SourceID(b.1), DestinationID(a.1), Tag(c.1.1), and *Data*. The CDL field that may be included in the CXL.io UIO Read Completion with Data (UIORdCpID) may denote a CXL DevLoad (CDL) field, and may be populated with information related to Quality-of-Service (QoS), such as QoS telemetry value or values. The first entity may be configured to translate information carried in the CDL field and send it via one or more fields of the NVLink response, such as via reserved fields. Alternatively or additionally, the first entity may collect QoS information, telemetry, or statistics from UIORdCpID completions.

Figures 47A, 47B:
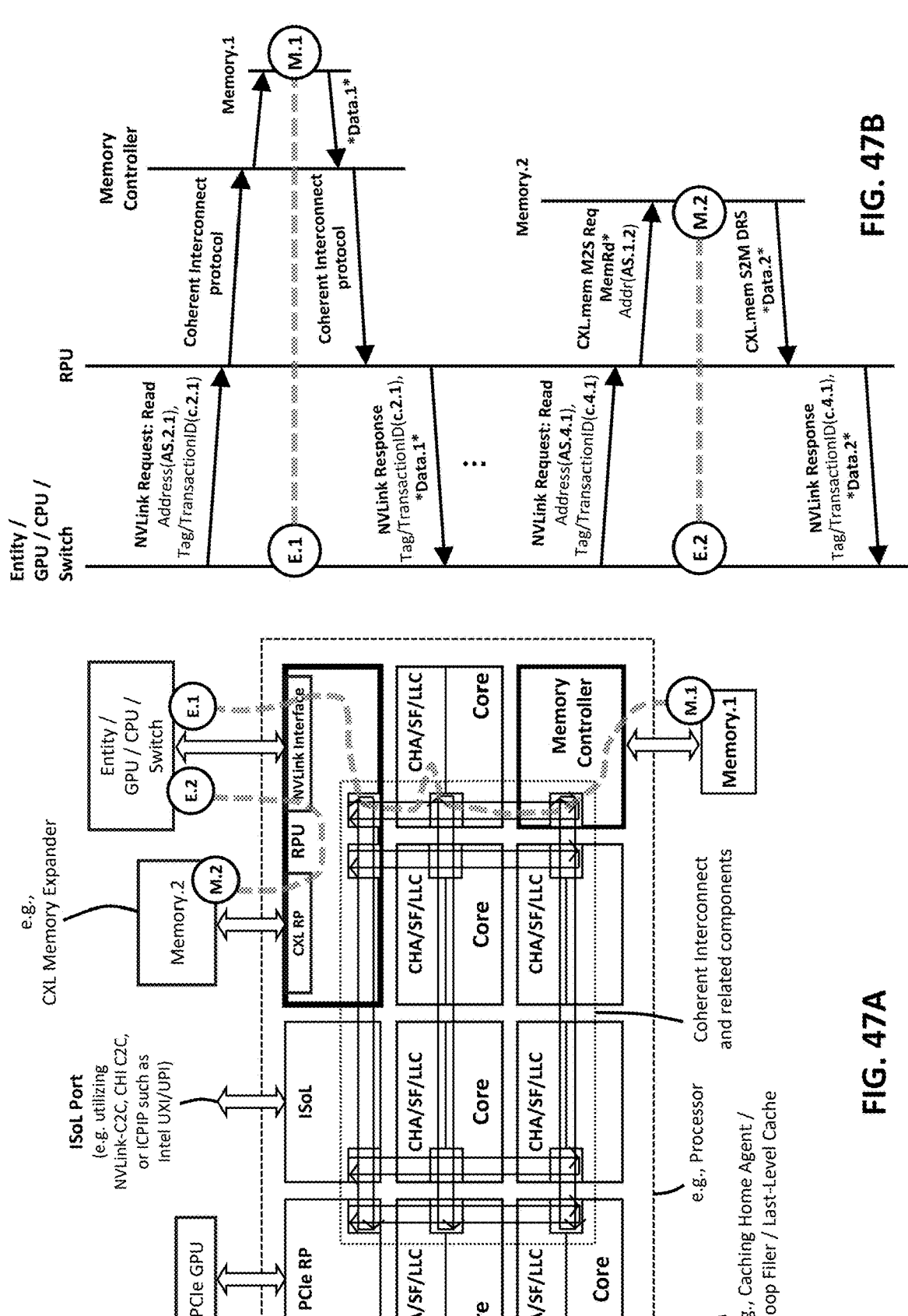
FIG. 47A illustrates one embodiment of a system comprising a processor comprising an NVLink interface and a CXL RP.
FIG. 47B illustrates one embodiment of a TFD demonstrating translating a first NVLink request to a coherent interconnect protocol, and translating a second NVLink read request to a CXL.mem M2S MemRd request.

FIG. 47A illustrates one embodiment of a system comprising a processor, including a coherent interconnect, capable of enabling an external entity, such as a GPU or an accelerator, to access memory resources mapped to an address space utilized by the coherent interconnect, such as via one or more of the two illustrated paths denoted as (E.1)-(M.1) and (E.2)-(M.2). The processor may include processing cores, caching/home agent (CHA), snoop filter (SF), and LLC, optionally implemented as distributed slices coupled to the coherent interconnect. The processor may further include a PCIe RP that may be coupled to a PCIe GPU, a memory controller that may be coupled to a first memory (Memory.1), such as DRAM, and an ISoL port, such as a port utilizing NVIDIA NVLink-C2C, ARM CHI C2C, or Intel Coherent Processor Interconnect Protocol (ICPIP), e.g., Intel UPI, or Intel UXI. The processor may include an RPU that includes or coupled to an NVLink interface that may communicate with the entity according to an NVLink-based protocol, such as a protocol utilizing an NVLink interconnect, wherein the RPU further comprises a CXL RP coupled to a second memory (Memory.2), such as a CXL memory expander. The RPU may perform physical address translations to enable the entity to access the first memory, such as via the path (E.1)-(M.1), and/or access the second memory, such as via the path (E.2)-(M.2). The illustrated RPU may be coupled to the coherent interconnect, and may translate between the NVLink-based protocol and a protocol utilized by the coherent interconnect. The processor may utilize a mesh-based coherent interconnect, or in other embodiments, may utilize a ring, a crossbar, a Network on Chip (NoC) or other types of coherent interconnects.

FIG. 47B illustrates one embodiment of a TFD demonstrating two NVLink requests, such as NVLink read requests, received from an entity, such as a GPU or an accelerator, processed by an RPU and forwarded, possibly using a protocol utilized by a coherent interconnect of a processor, to different memories mapped to an address space utilized by the coherent interconnect. The paths from the RPU to the different memories may optionally traverse other components, such as CHA/SF/LLC slices, memory controllers, or in other embodiments a home agent or a home node, optionally for resolving coherency. The RPU may perform physical address translations between first physical addresses, such as NVLink-based physical addresses, NVLink-based network addresses, or GPU physical addresses, and second physical addresses, such as Host Physical Addresses (HPAs) or System Physical Addresses (SPAs), to enable the entity to access memory resources of the processor. The processor may have multiple memory resources, such as first memory (Memory.1), which may be a DRAM coupled to a memory controller of the processor, and/or second memory (Memory.2), which may be a CXL memory expander coupled to a CXL RP of the processor, wherein the CXL RP may be included in the RPU. The RPU may further perform additional translations, such as protocol translations, between an NVLink-based protocol, such as a protocol utilizing an NVLink interconnect, and a protocol utilized by the coherent interconnect, wherein the RPU may send the optionally translated NVLink requests to the coherent interconnect, requesting reads from memory, such as from the first memory or from the second memory. Additionally or alternatively, the RPU may perform protocol translations such as between the NVLink-based protocol and a CXL-based protocol (e.g., CXL.mem), wherein the RPU may send the optionally translated NVLink requests to the second memory via the CXL RP. In some embodiments, the requested data may be provided by a cache of the processor, such as by an LLC, instead of by the memory. The data may then return over the coherent interconnect to the RPU, wherein the RPU may provide an NVLink response to the requesting entity.

The TFD illustrates two exemplary transactions between the entity and the RPU, corresponding to two distinct memory read paths denoted as (E.1)-(M.1) and (E.2)-(M.2), carrying different physical addresses mapped to different memory resources. The first exemplary transaction corresponds to the memory read path denoted as (E.1)-(M.1), and may include a first NVLink request comprising Address (AS.2.1) and Tag/TransactionID(c.2.1), wherein Tag/TransactionID may denote a tag, a transaction tag, a transaction identifier, or another field or set of fields carried in NVLink requests and/or NVLink Responses, which may serve for associating the NVLink responses with the NVLink requests. The RPU may translate the first NVLink request and forward the translated request via the coherent interconnect protocol, resulting in the retrieval of *Data.1* from the first memory (Memory.1) via the memory controller, wherein *Data.1* may be sent to the entity via the coherent interconnect protocol and via the RPU with the first NVLink Response.

The second exemplary transaction corresponds to the memory read path denoted as (E.2)-(M.2), and may include a second NVLink request comprising Address(AS.4.1) and Tag/TransactionID(c.4.1). The RPU may translate the second NVLink request to a CXL.mem M2S Request comprising MemRd* opcode and translated Address(AS.1.2), wherein the RPU may send the translated request to the second memory (Memory.2) via the CXL RP. *Data.2* is retrieved from the second memory via a CXL.mem S2M DRS, and sent to the RPU via the CXL RP, wherein the RPU may send *Data.2* to the entity via the second NVLink Response.

Figures 48A, 48B:
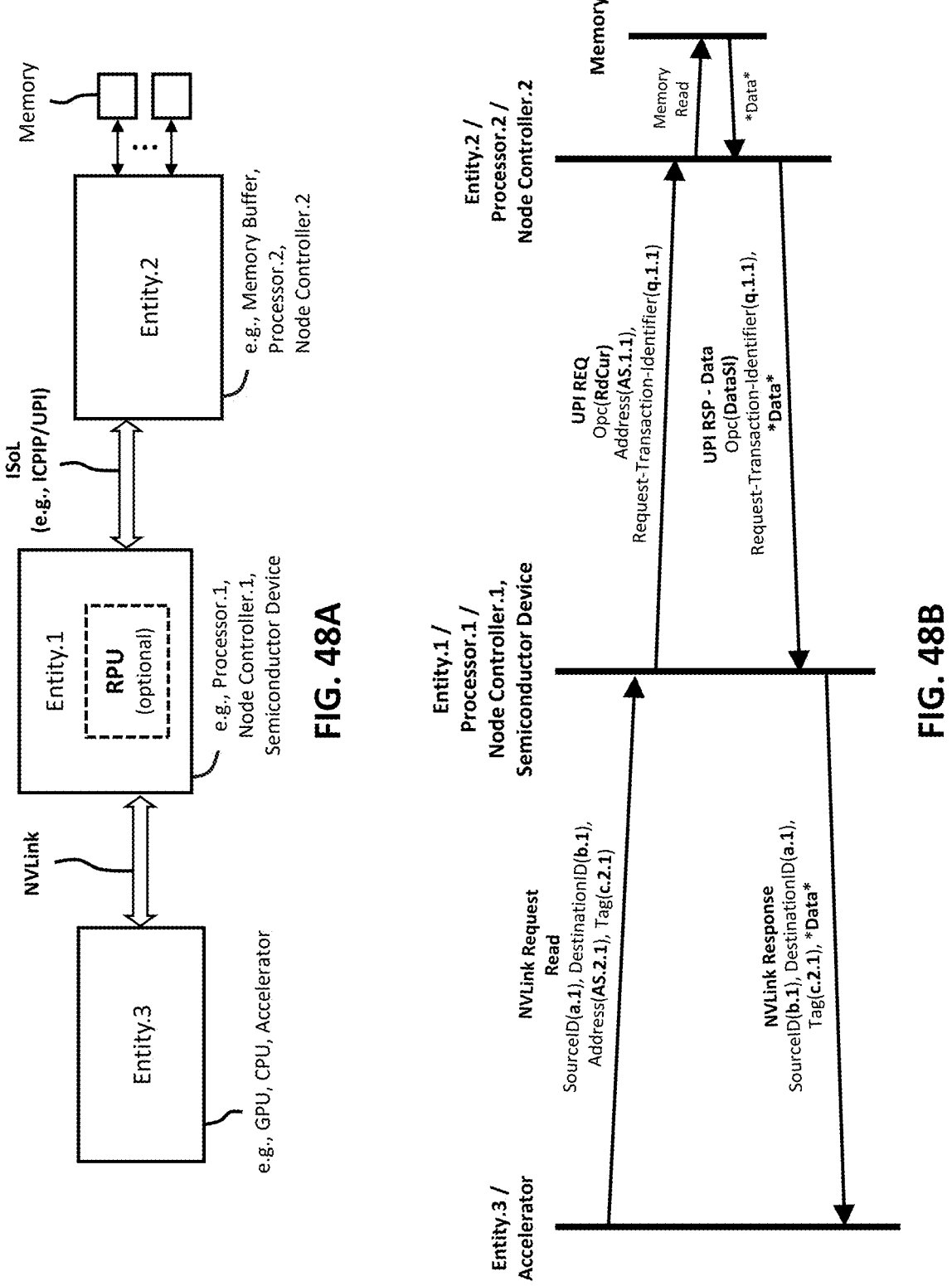
FIG. 48A illustrates one embodiment of a system that translates between an NVLink-based protocol and an ISoL protocol.
FIG. 48B illustrates one embodiment of a TFD demonstrating translations between an NVLink-based protocol and Intel UPI.

FIG. 48A illustrates one embodiment of a system comprising a first entity (Entity.1), such as a first processor (Processor.1), a first node controller (Node Controller.1), or a semiconductor device, which may include an RPU. The first entity may be coupled to a third entity (Entity.3), which may be an accelerator, a GPU, a CPU, or an NVLink switch, wherein the first entity may communicate with the third entity according to an NVLink-based protocol, such as a protocol utilizing an NVLink interconnect. The first entity may be further coupled to a second entity (Entity.2), which may be a second processor (Processor.2), a memory buffer, or a second node controller (Node Controller.2), wherein the second entity may be coupled to memory, and wherein the first entity may communicate with the second entity according to an ISoL protocol, such as ARM CHI C2C, a protocol utilizing an NVIDIA NVLink-C2C interconnect, or Intel Coherent Processor Interconnect Protocol (ICPIP), such as Intel UPI or Intel UXI. The first node controller (Node Controller.1) and the second node controller (Node Controller.2) may each include an ICPIP node controller, such as a UPI node controller (UNC), or an external node controller (e.g., XNC).

The first entity, optionally via the RPU, may translate between the NVLink-based protocol and the ISoL protocol, such as ICPIP (e.g., Intel UPI or UXI), enabling the third entity to access resources coupled to the first entity (Entity.1), such as the memory that may be coupled to the second entity. In some embodiments, the NVLink-based protocol may be associated with a first address space, such as an NVLink-based address space, an NVLink-based network address space, or a GPU address space, and the ISoL protocol, such as ICPIP (e.g., Intel UPI), may be associated with a second address space, such as a System Physical Address (SPA) space or a Host Physical Address (HPA) space; wherein the first entity, optionally via the RPU, may perform address translations between addresses within the first and second address spaces, respectively, such as between addresses within the NVLink-based address space and addresses within the SPA space or the HPA space. In other embodiments, the NVLink-based protocol and the ISoL protocol, such as ICPIP (e.g., Intel UPI), may be associated with the same physical address space, such as with a global address space, a partitioned global address space (PGAS), a pod address space, a virtual pod address space, or a fabric address space; wherein the first entity, optionally via the RPU, may perform address translations between addresses within the same address spaces.

The first entity, optionally via the RPU, may perform further translations, such as opcode translations, command translations, TLP translations, or field translations (e.g. cross-field translations), such as between request types of NVLink requests and opcodes in request messages of the ISoL Protocol (e.g., Intel UPI RdCur opcode). The first entity, optionally via the RPU, may further perform other field translations, such as between fields carried in protocol data units (PDUs) of the NVLink-based protocol and fields carried in PDUs of the ISoL Protocol, e.g., traffic class (TC) translations, or tag translations, wherein the first entity, optionally via the RPU, may maintain tracking between tags of the NVLink-based protocol domain and tags of the ISoL protocol domain, such as in order to associate responses with their corresponding requests, within the same protocol domain and/or between different protocol domains.

FIG. 48B illustrates one embodiment of a TFD demonstrating translations performed by a first entity (Entity.1), such as a first processor (Processor.1), a first node controller (Node Controller.1), or a semiconductor device, optionally via an RPU, between an NVLink-based protocol, such as a protocol utilizing an NVLink interconnect, and an ISoL protocol, such as ICPIP (e.g., Intel UPI or UXI). The NVLink-based protocol may be utilized for communicating with a third entity (Entity.3), such as an accelerator, and the ISoL protocol may be utilized for communicating with a second entity (Entity.2), such as a second processor (Processor.2), or a second node controller (Node Controller.2). The second entity may be coupled to a memory, such as DRAM, which may be mapped to a physical address space (PAS) utilized by the first entity. The third entity may initiate an NVLink request, such as an NVLink read request, comprising SourceID(a.1), DestinationID(b.1), Address (AS.2.1), and Tag(c.2.1), wherein SourceID(a.1) may identify the source entity in the NVLink interconnect, such as the source GPU, wherein DestinationID(b.1) may identify the destination entity in the NVLink interconnect, such as the destination GPU, and wherein the NVLink interconnect may utilized ID-based routing when forwarding the NVLink request. The first entity, optionally via the RPU, may translate the NVLink request to an ISoL (e.g., ICPIP) transaction, such as an Intel UPI transaction that may include a UPI request (REQ message class) comprising Opc(RdCur), Address(AS.1.1), and Request-Transaction-Identifier(q.1.1), wherein the Request-Transaction-Identifier (e.g., RTID) may denote a tag, a transaction tag, a transaction identifier, or another field or set of fields carried in UPI transactions which may serve for associating responses with their corresponding requests. The first entity may send the UPI request (REQ) to the second entity.

Upon receiving a response from the second entity, that may include a UPI data response ("RSP-Data" message class, which may also be denoted by "RSP4-Data") comprising Opc(DataSI), Request-Transaction-Identifier(q.1.1), and *Data*, the first entity, optionally via the RPU, may translate the UPI response (RSP-Data) to an NVLink response comprising SourceID(b.1), DestinationID(a.1), Tag(c.2.1), and *Data*. In some embodiments, the requested data may be provided by a processor cache instead of by the memory, such as wherein the requested data may be provided by an LLC that may be included in the first entity, or by an LLC that may be included in the second entity. In other embodiments, the first entity (Entity.1), optionally via the RPU, may translate the NVLink request to an ICPIP transaction, such as an Intel UPI transaction, that may include message classes such as REQ, SNP, WB, RSP (such as RSP2 or RSP4), NCB, or NCS, that may include commands, operations, or opcodes (e.g., Opc), such as RdCode, RdCur, RdData, RdInv, RdInvOwn, SnpCode, SnpCur, SnpData, SnpInv, WbMtoS, WcWr, WcWrPtl, DataE, DataSI, or Data-M_CmpO. The first entity, optionally via the RPU, may perform further translations, such as opcode translations, command translations, or field translations between protocol data units (PDUs) of the NVLink-based protocol and PDUs of the ISoL Protocol (e.g., Intel UPI), such as traffic class (TC) translations, cross-field translations, or tag translations, wherein the first entity, optionally via the RPU, may maintain tracking between tags in the NVLink-based protocol domain and tags in the ISoL protocol domain, such as in order to associate responses with their corresponding requests, within the same protocol domain and/or between different protocol domains.

Figure 50:
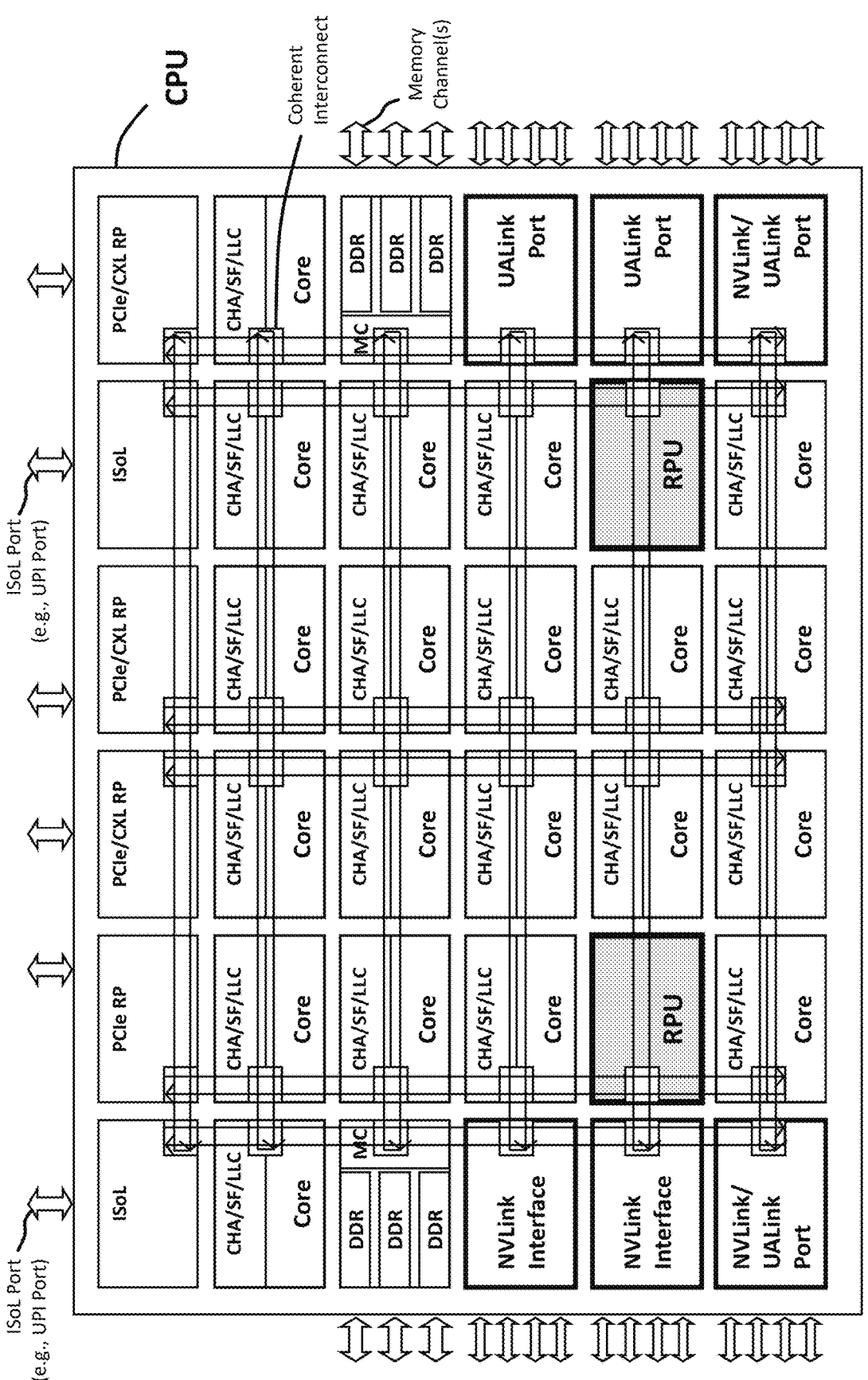
FIG. 50 illustrates one embodiment of a processor comprising RPUs, NVLink interfaces, and UALink ports.

FIG. 50 illustrates one embodiment of a processor, such as a CPU, comprising a coherent interconnect, processing cores, caching/home agent (CHA), snoop filter (SF), and last-level cache (LLC), optionally implemented as slices distributed across tiles on the coherent interconnect mesh. The processor may further include ISoL ports (such as ports utilizing Intel Coherent Processor Interconnect Protocol (ICPIP), e.g., UPI ports), one or more PCIe RPs, CXL/PCIe RPs, and memory controllers that may be coupled to memory such as DRAM. The processor may further include one or more RPUs, NVLink interfaces and/or UALink ports, wherein the RPUs may perform physical address translations to enable external entities (not shown in the figure), such as GPUs and accelerators, to access the memory. The illustrated RPUs may be coupled to the coherent interconnect, and may translate between an NVLink-based protocol or a UALink-based protocol and a protocol utilized by the coherent interconnect. Optionally, the RPUs may further enable the processing cores to access resources exposed by the external entities, such as HBM resources. In some embodiments, the processor may further include one or more multi-protocol ports, such as NVLink/UALink ports, which may be configured, either independently or as a group of ports, to communicate according to an NVLink-based protocol or according to a UALink-based protocol, utilizing a physical layer (PHY) such as an Ethernet-based PHY or a PHY based on IEEE 802.3 PMA. The processor may be implemented as a monolithic die, as chiplets within an IC package, such as by utilizing separate compute die(s) and I/O die(s), or as components on a board. In other embodiments, the NVLink interface may reside on a separate chiplet, such as NVLink Fusion, and may be coupled to the coherent interconnect via a UCIe interface or a proprietary chip-to-chip or die-to-die interface.

Figures 51A, 51B:
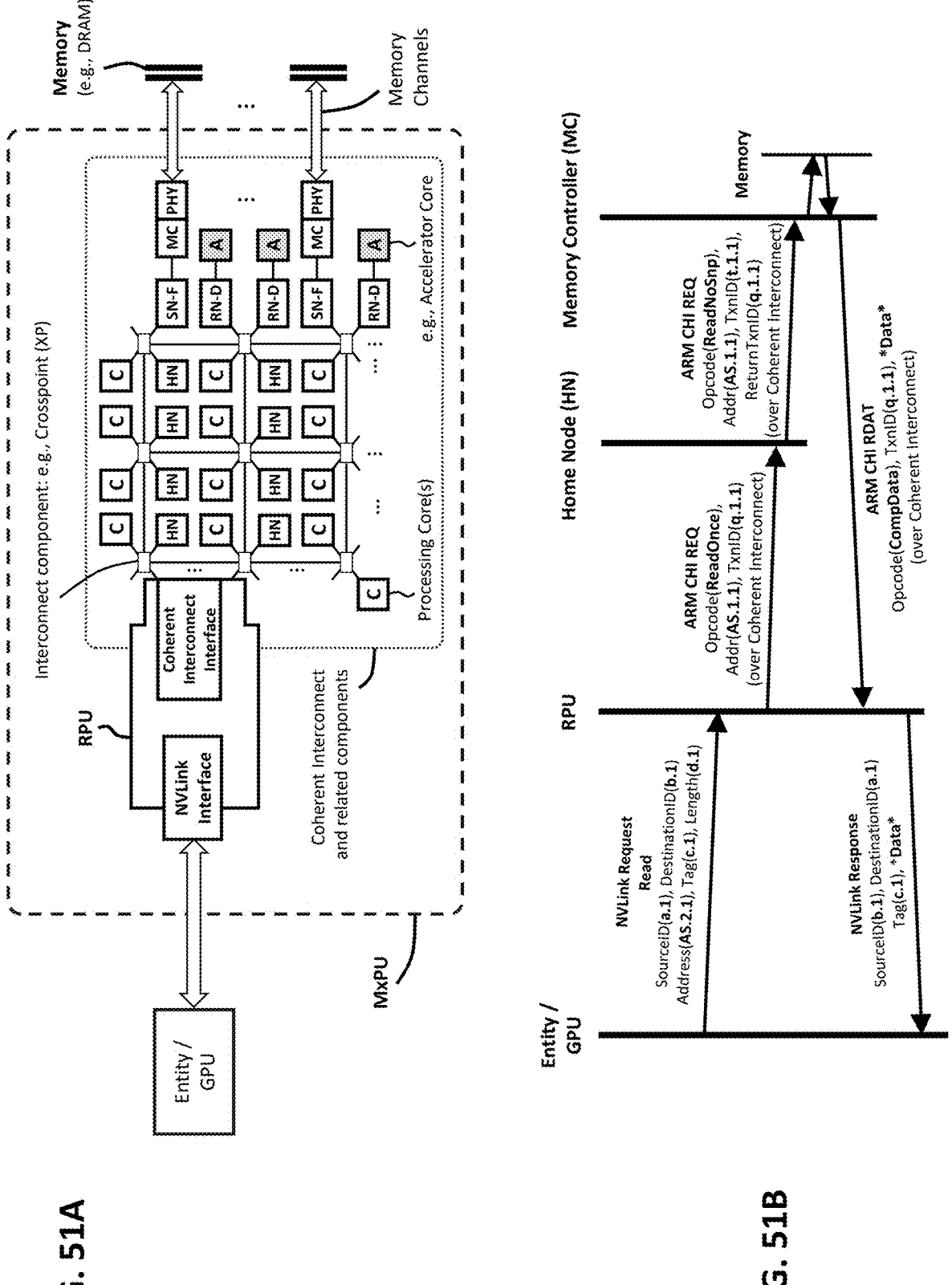
FIG. 51A illustrates one embodiment of a system comprising an RPU that translates between an NVLink interface and a CHI-based Coherent Interconnect Interface.
FIG. 51B illustrates one embodiment of a TFD showing address translation between an NVLink read request and an ARM CHI ReadOnce request.

FIG. 51A illustrates one embodiment of a system comprising an entity, such as a GPU, that communicates with a processor via an RPU comprising an NVLink interface and a Coherent Interconnect Interface that may utilize a protocol based on ARM CHI. The Coherent Interconnect Interface couples the RPU to an interconnect component, such as a crosspoint (XP), within a coherent interconnect. The Coherent Interconnect Interface performs the necessary protocol conversions between an NVLink protocol domain and a coherent interconnect protocol domain, such as between NVLink and ARM CHI, enabling the entity to access memory and other resources coupled to the coherent interconnect. The coherent interconnect may be implemented as a mesh topology connecting various components including processing cores, home nodes (HN), memory controllers (MC), and accelerator cores.

FIG. 51B illustrates one embodiment of a TFD showing address translation between NVLink and CHI. An entity, such as a GPU, initiates an NVLink read request with a physical address (AS.2.1), which the RPU translates to a CHI request carrying a ReadOnce opcode with a translated physical address (AS.1.1). The transaction flows through the coherent interconnect via a home node to a memory controller, which retrieves the data and returns it, through the coherent interconnect, to the RPU that translates the response back to the NVLink domain for delivery to the requesting entity.

Figures 52A, 52B:
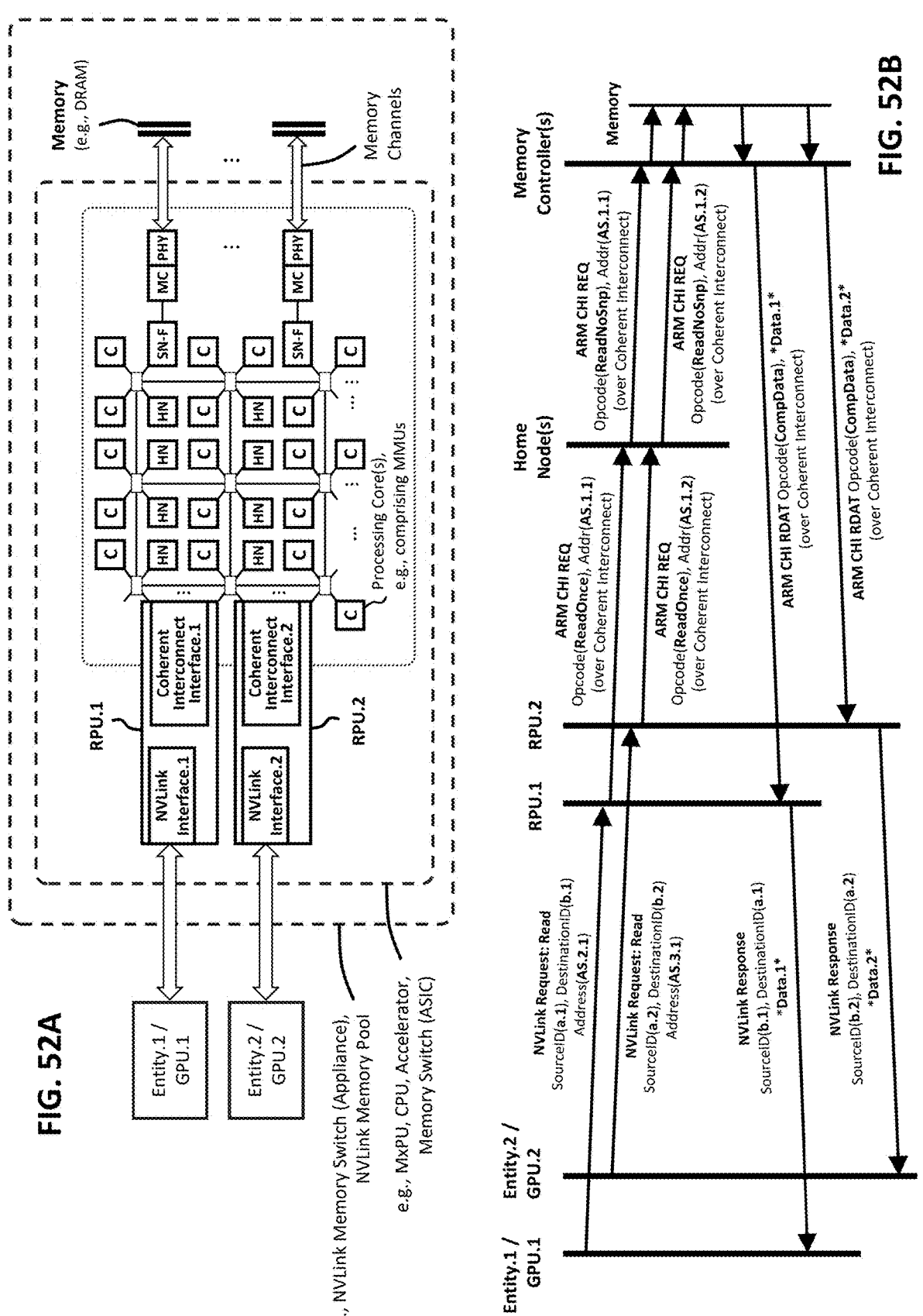
FIG. 52A illustrates one embodiment of a system that may function as an NVLink memory switch appliance or an NVLink memory pool.
FIG. 52B illustrates one embodiment of a TFD depicting a multi-entity memory access scenario wherein GPUs access memory mapped to physical address spaces through NVLink-to-ARM CHI protocol translations.

FIG. 52A illustrates one embodiment of a system that may function as an NVLink memory switch appliance or an NVLink memory pool, and may include an MxPU, CPU, accelerator, or a memory switch ASIC, that is coupled to two entities denoted as Entity.1/GPU.1 and Entity.2/GPU.2. The MxPU includes processing cores and memory controllers coupled to a coherent interconnect that may be based on a CHI protocol. The MxPU utilizes protocol translations, performed by the RPUs, between NVLink-based interfaces and an MxPU's coherent interconnect. The first RPU (RPU.1) may enable Entity.1/GPU.1 to access resources mapped to a physical address space of the MxPU's coherent interconnect, wherein the access is via the first NVLink interface and the MxPU's coherent interconnect. Examples of resources mapped to the physical address space of the MxPU's coherent interconnect include DRAM or other memory resources of the MxPU. Correspondingly, the second RPU (RPU.2) may enable Entity.2/GPU.2 to access, via the second NVLink interface and the MxPU's coherent interconnect, resources mapped to a physical address space of the MxPU's coherent interconnect, such as memory resources of the MxPU.

FIG. 52B illustrates one embodiment of a TFD depicting a multi-entity memory access scenario wherein first and second entities/GPUs access memory mapped to one or more physical address spaces utilized by the coherent interconnect (CohInterMappedMemory), through NVLink-to-ARM CHI protocol translations. Entity.1/GPU.1 initiates a first NVLink Request: Read with SourceID(a.1) to identify the source GPU, DestinationID(b.1) to identify the destination GPU, and Address(AS.2.1) representing an NVLink network address from a second physical address space. RPU.1 translates the first NVLink Request to ARM CHI REQ carrying Opcode(ReadOnce), and Addr(AS.1.1) from a first physical address space utilized by the coherent interconnect. Concurrently or sequentially, Entity.2/GPU.2 may initiate a second NVLink Request: Read with SourceID (a.2), DestinationID(b.2), and Address(AS.3.1) representing an NVLink network address optionally from a third physical address space or from the second physical address space. RPU.2 translates the second NVLink Request to ARM CHI REQ carrying Opcode(ReadOnce) and Addr(AS.1.2) from the first physical address space utilized by the coherent interconnect.

Both transactions flow through the coherent interconnect to one or more home nodes, which may send respective ARM CHI REQ messages to one or more memory controllers with Opcode(ReadNoSnp) and the addresses Addr (AS.1.1) and Addr(AS.1.2), respectively. The memory controller(s) retrieve the requested data from the CohInterMappedMemory and send first and second ARM CHI RDAT messages with Opcode(CompData) carrying *Data.1* and *Data.2*, representing the data retrieved from the addresses AS.1.1 and AS.1.2, respectively. RPU.1 translates the first ARM CHI RDAT message to NVLink Response with SourceID(b.1), DestinationID(a.1), and *Data.1* for Entity.1/GPU.1. RPU.2 translates the second ARM CHI RDAT message to NVLink Response with SourceID(b.2), DestinationID(a.2), and *Data.2* for Entity.2/GPU.2. The embodiment demonstrates how entities/GPUs may share access to the same CohInterMapped-Memory through different RPUs that perform both protocol translation between NVLink and ARM CHI, and physical address translations. Alternatively, the embodiment may be viewed as two separate NVLink transactions that utilize the same coherent interconnect infrastructure to access CohInterMappedMemory, wherein the GPU entities may access the CohInterMappedMemory via a shared or separate address spaces that are translated to the shared coherent interconnect physical address space. Still alternatively, the response and read data paths may be implemented according to other designs, such as wherein the memory controller(s) may send the data to the home node(s) that send it to the respective RPUs, or the home node(s) send responses to the RPUs while the memory controller(s) send the data directly to the RPUs.

Depending on system characteristics, such as implementation choices and platform configurations, different physical addresses, such as (AS.1.1) and (AS.1.2), within a physical address space utilized by the coherent interconnect, may be typically partitioned, such as via hashing or interleaving schemes, across a set of home nodes. Such partitioning is typically performed in order to reduce bottleneck effects in the system and spread the load of transaction processing across home nodes of the coherent interconnect, and may result in mapping the different physical addresses, such as (AS.1.1) and (AS.1.2), to the same home node, or to different home nodes. Similarly, different physical addresses may be associated with one memory controller, or with different memory controllers, such as according to a separate mapping scheme, which may be different from the mapping scheme utilized for selecting a home node for processing the request. Alternatively, other embodiments may co-locate the home node function with a specific memory controller, utilizing a unified mapping scheme that selects both a home node and a memory controller.

In one embodiment, an apparatus, comprises: an integrated circuit (IC) package comprising processing cores comprising instruction caches; wherein the processing cores are coupled via a coherent interconnect to a memory controller, and are configured to respond to snoop requests that utilize physical addresses within a first physical address space; a memory management unit (MU), coupled to the processing cores, configured to translate virtual addresses to physical addresses within the first physical address space; memory channels capable of supporting more than 64 GB of memory; a physical layer, based on IEEE 802.3 physical medium attachment (PMA), configured to receive transmissions comprising data indicative of Compute Express Link (CXL) opcodes and physical addresses within a second physical address space; and a resource provisioning unit (RPU) configured to translate the data to CXL requests; whereby the translate of the data enables an entity external to the apparatus to read the memory via the physical layer based on IEEE 802.3 PMA, the memory controller, and the memory channels.

Optionally, the translate of the data to CXL requests may comprise translate the physical addresses within the second physical address space to the physical addresses within the first physical address space. The physical layer based on IEEE 802.3 PMA may comprise a UALink physical layer. In other aspects, the physical layer based on IEEE 802.3 PMA may comprise an NVLink physical layer. The physical layer based on IEEE 802.3 PMA may also be configured to receive and transmit Ethernet frames. The RPU may be included in the IC package or may be included in a second IC package coupled to the IC package. In some implementations, the memory comprises dynamic random-access memory (DRAM), and the RPU coupled to at least one of a CXL device, a CXL endpoint, or a CXL port. The CXL port may comprise a switch port or a root port, and the entity may comprise a GPU, a network device, or a storage device. Furthermore, the CXL device may comprise a Global Fabric-Attached Memory (G-FAM) Device (GFD), and the RPU may communicate with the GFD according to at least one of CXL.mem or CXL.io.

In certain aspects, the second physical address space may be identical to the first physical address space, and the RPU may be further configured to enable the entity to read memory-mapped I/O (MMIO) registers coupled to the apparatus. The CXL opcode may comprise a UIOMRd Transaction Layer Packet (TLP) type. Alternatively, the second physical address space may be a subset of the first physical address space, and the RPU may be further configured to block the entity from reading at least one predetermined address region within the first physical address space.

The data indicative of CXL opcodes and physical addresses may be encapsulated within messages conforming to a carrier protocol, and wherein the RPU may be configured to extract the data indicative of CXL opcodes and physical addresses within the messages conforming to the carrier protocol and to translate the extracted data to the CXL requests. The physical layer based on IEEE 802.3 PMA may be configured to receive the messages conforming to the carrier protocol, and wherein the RPU may be further configured to translate the physical addresses within the second physical address space to physical addresses within the first physical address space when processing the CXL requests. The RPU may be further configured to encapsulate data from CXL responses into response messages conforming to the carrier protocol for transmission via the physical layer based on IEEE 802.3 PMA. The carrier protocol may be based on Ethernet or based on IEEE 802.3, and wherein the data indicative of CXL opcodes and physical addresses may be encapsulated within Ethernet frames or IEEE 802.3 frames, respectively.

Optionally, the carrier protocol may be based on Ultra Ethernet Transport (UET) protocol, and wherein the data indicative of CXL opcodes and physical addresses may be encapsulated within Link Layer Retry eligible frames (LLR-eligible frames). Alternatively, the carrier protocol may be based on Scale Up Ethernet (SUE), and wherein the data indicative of CXL opcodes and physical addresses may be encapsulated within an SUE-based Protocol Data Unit (PDU). Examples of SUE-based PDU may include SUE PDU, SUE Lite PDU, or PDUs based on future revisions of SUE. Furthermore, the CXL requests may comprise CXL.mem Master-to-Subordinate Request (M2S Req) messages, and wherein the RPU may be further configured to receive CXL responses comprising CXL.mem Subordinate-to-Master Data Response (S2M DRS) messages. The RPU may be further configured to: translate tags, associated with the data, from a first tag space to a second tag space, wherein the first tag space is utilized by the entity external to the apparatus and the second tag space is utilized by a host coupled to the apparatus. Optionally, the RPU further translates tags in CXL responses associated with the second tag space to tags associated with the first tag space before encapsulation into the carrier protocol.

In one embodiment, a method, comprises: operating a processor comprising processing cores and instruction caches; and wherein the processing cores communicate via a coherent interconnect with a memory controller, and respond to snoop requests that utilize physical addresses within a first physical address space; translating virtual addresses to physical addresses for the processing cores; communicating, via memory channels, with more than 64 GB of memory; receiving, via a physical layer based on IEEE 802.3 physical medium attachment (PMA), transmissions comprising data indicative of Compute Express Link (CXL) opcodes and physical addresses within a second physical address space; and translating, by a resource provisioning unit (RPU), the data to CXL requests; whereby the translating enables an entity external to the processor to read the memory via the physical layer based on IEEE 802.3 PMA, the memory controller, and the memory channels.

Optionally, the translating of the data to CXL requests may comprise translating the physical addresses within the second physical address space to the physical addresses within the first physical address space. The second physical address space may be identical to the first physical address space, and the method may further comprise enabling, by the RPU, the entity to read memory-mapped I/O (MMIO)

registers coupled to the processor. Alternatively, the second physical address space may be a subset of the first physical address space, and the method may further comprise blocking, by the RPU, the entity from reading at least one predetermined address region within the first physical address space. The data indicative of CXL opcodes and physical addresses may be encapsulated within messages conforming to a carrier protocol, and the method may further comprise extracting, by the RPU, the data indicative of CXL opcodes and physical addresses from the messages conforming to the carrier protocol, and translating the extracted data to the CXL requests. The method may also comprise receiving, via the physical layer based on IEEE 802.3 PMA, the messages conforming to the carrier protocol, translating, by the RPU, the physical addresses within the second physical address space to physical addresses within the first physical address space, and encapsulating, by the RPU, data from CXL responses into second messages conforming to the carrier protocol for transmission via the physical layer based on IEEE 802.3 PMA. The method may further comprise translating, by the RPU, tags from a first tag space to a second tag space, wherein the first tag space is utilized by the entity external to the processor, and the second tag space is utilized by a host coupled to the processor; and further comprising translating, by the RPU, tags associated with the second tag space to tags associated with the first tag space before encapsulation into the carrier protocol.

In one embodiment, a system, comprises: an integrated circuit (IC) package comprising processing cores coupled via a coherent interconnect to memory controllers, wherein the processing cores respond to snoop requests utilizing physical addresses within a host physical address space; memory management units (MMIUs) configured to translate virtual addresses to physical addresses within the host physical address space; memory channels coupled to at least 64 GB of memory accessible via the memory controllers; physical layers based on IEEE 802.3 physical medium attachment (PMA), configured to communicate with respective external entities, wherein the physical layers receive transmissions comprising data indicative of memory access requests with physical addresses; and at least one resource provisioning unit (RPU) configured to translate between (i) physical addresses associated with the transmissions and (ii) physical addresses within the host physical address space; whereby the translate enables the external entities to access the memory via the physical layers based on IEEE 802.3 PMA, the memory controllers, and the memory channels.

Optionally, the memory access requests may conform to at least one protocol selected from Ultra Accelerator Link (UALink) requests, UALink Protocol Level Interface (UPLI) requests, or NVLink requests; and wherein at least one of the physical layers based on IEEE 802.3 PMA may comprise a UALink physical layer, an NVLink physical layer, or an Ethernet physical layer operating at 100 Gbps or higher. The at least one RPU may comprise multiple RPUs distributed across the IC package or across multiple IC packages, wherein the RPUs may maintain different address translation tables for different external entities, and wherein the RPUs may enforce access control policies defining permitted address ranges for corresponding external entities, thereby creating isolated security domains for memory access while sharing the same physical memory resources.

Figure 53:
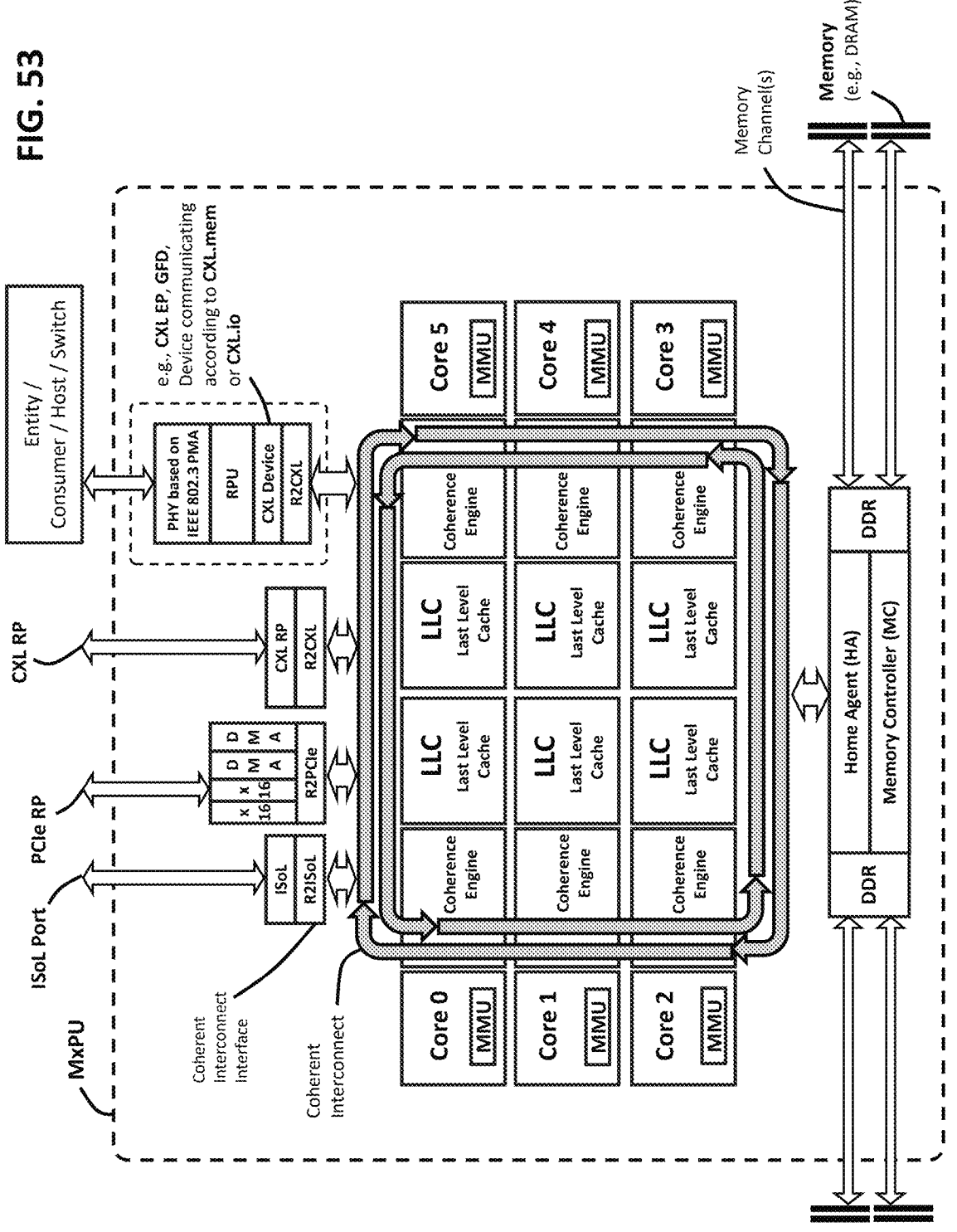
FIG. 53 illustrates one embodiment of a system comprising a processor comprising an RPU based interface including an IEEE 802.3 PMA coupled to a CXL Device.

FIG. 53 illustrates one embodiment of a system comprising a processor (such as an MxPU) comprising processing cores (Core 0 through Core 5) comprising MMUs. The cores are coupled to LLC sections and coherence engines via a coherent interconnect, which may be an on-chip processor interconnect such as Intel ring/mesh/crossbar or ARM CHI ring/mesh/crossbar. The MxPU includes external interfaces: an ISoL Port (e.g., ARM CHI C2C, or Intel UPI) coupled to the coherent interconnect via a coherent interconnect interface labeled Ring-to-ISoL (R2ISoL), a PCIe Root Port (RP) coupled via R2PCIe with PCIe lane configurations (such as x16 and DMA), a CXL RP coupled via R2CXL, and an RPU based interface. The RPU based interface includes a Physical Layer based on IEEE 802.3 PMA coupled to an RPU, coupled to a CXL Device, couped to an R2CXL interface coupled to the coherent interconnect. The CXL Device may function as different device types such as a CXL EP, GFD, or other device communicating according to a protocol based on CXL, such as CXL.mem or CXL.io. An entity, shown as Entity/Consumer/Host/Switch, is coupled to the MxPU via the Physical Layer based on IEEE 802.3 PMA. The CXL Device enables communication with the external entity using encapsulated CXL protocols over a carrier protocol supported by the IEEE 802.3 PMA, while the RPU performs the necessary address translations and protocol translations between the carrier protocol domain and the MxPU's internal coherent interconnect domain. The MxPU further includes a Home Agent (HA) and Memory Controller (MC) coupled to memory (e.g., DRAM) via DDR memory channels.

Figures 54A, 54B:
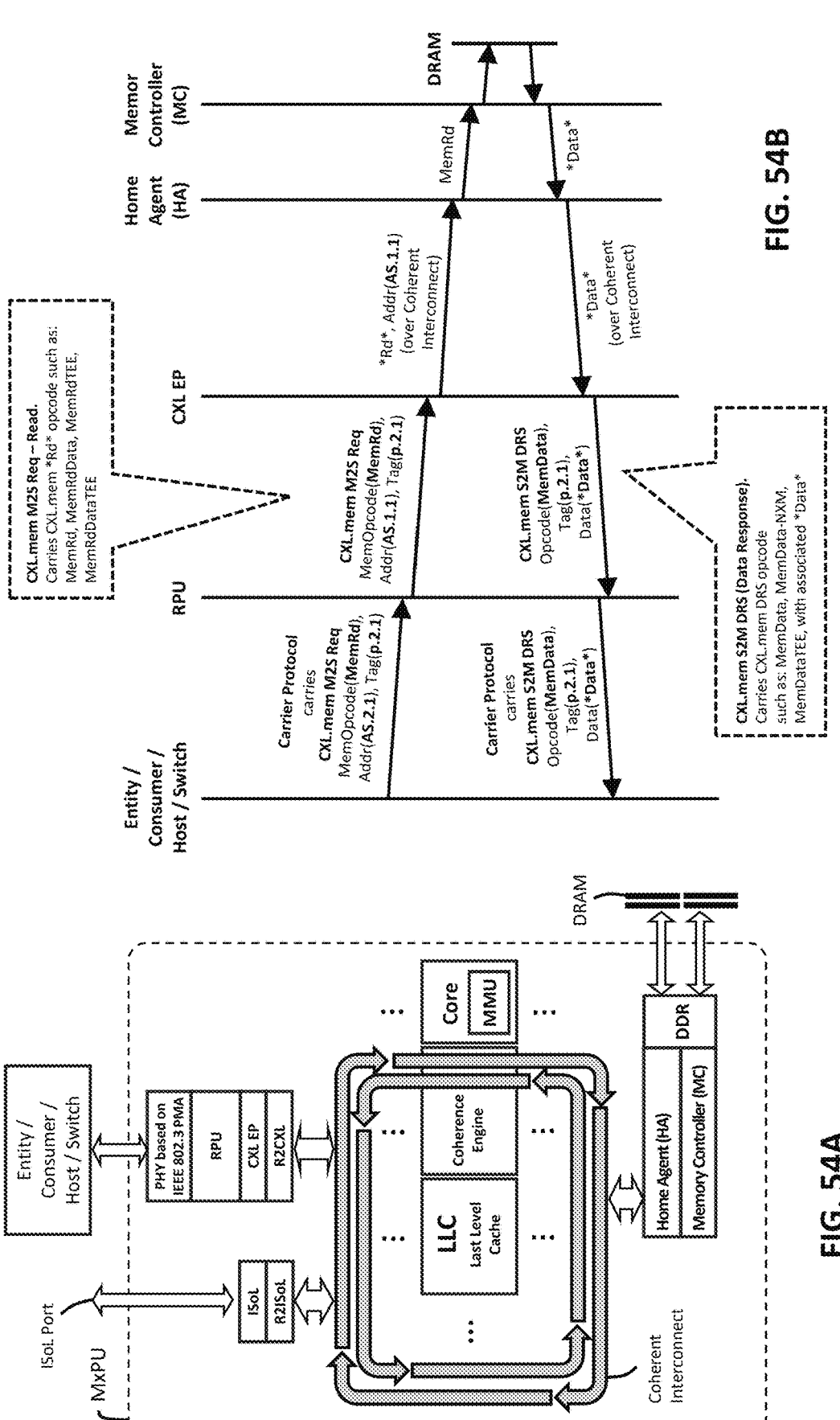
FIG. 54A illustrates one embodiment of a system comprising a processor comprising a CXL EP and a PHY based on IEEE 802.3 PMA.
FIG. 54B illustrates one embodiment of a TFD demonstrating CXL.mem communications over a carrier protocol utilizing PHY based on IEEE 802.3 PMA.

FIG. 54A illustrates one embodiment of a system comprising a processor, such as an MxPU, comprising a PHY based on IEEE 802.3 PMA for transmitting and receiving data according to a carrier protocol. The processor comprises processing cores with MMU and LLC coupled via a coherent interconnect, such as a ring-based interconnect, to various components including a Home Agent (HA), Memory Controller (MC), and CBox (LLC Coherence Engine). The processor further includes an ISoL port, such as ARM CHI C2C, Intel UPI, or Intel UXI, coupled to the coherent interconnect via a Ring-to-ISoL (R2ISoL) interface. The memory controller is coupled via DDR memory channels to DRAM. The PHY based on IEEE 802.3 PMA enables communication with entities using carrier protocols that encapsulate CXL messages, wherein the IEEE 802.3 PMA provides the physical layer interface for transmitting and receiving frames carrying the encapsulated CXL protocol data. The processor further includes an RPU and a CXL EP associated with the PHY, wherein the RPU is coupled to the coherent interconnect via a Ring-to-CXL (R2CXL) interface. Alternatively, the RPU may be coupled to the coherent interconnect essentially directly. The CXL EP exposes a Type-3 CXL Device or a Type-2 CXL Device. The RPU performs extraction of CXL messages from the carrier protocol frames received via the PHY, performs host-to-host physical address translations between the entity's HPA space and the processor's HPA space, and encapsulates CXL responses back into the carrier protocol for transmission via the PHY.

FIG. 54B illustrates one embodiment of a TFD demonstrating CXL communications over a carrier protocol utilizing the PHY based on IEEE 802.3 PMA. An entity, such as a host or switch, transmits frames via the carrier protocol, wherein the frames encapsulate CXL.mem M2S Request messages. The PHY based on IEEE 802.3 PMA receives these frames and provides them to the RPU. The encapsulated request includes a CXL.mem read opcode such as MemRd, MemRdData, MemRdTEE, or MemRdDataTEE, along with a physical address (AS.2.1) from a second physical address space and optionally a tag (p.2.1) from the entity's tag space. The RPU extracts the CXL.mem request from the carrier protocol frame, translates the physical address (AS.2.1) to a physical address (AS.1.1) from a first physical address space utilized by the coherent interconnect, and optionally translates the tag (p.2.1) to a tag from the coherent interconnect's tag space. The figure illustrates one embodiment wherein the RPU does not terminate the protocol, and thus the tag (p.2.1) stays the same when passing through the RPU. The RPU performs protocol translations to generate a read request conforming to the coherent interconnect protocol, which is sent to the Home Agent (also known as home node) and/or Memory Controller. The requested data is retrieved from the LLC or DRAM and returned via the coherent interconnect. The CXL EP generates CXL.mem S2M DRS messages carrying the data and optionally CXL.mem S2M NDR messages. The RPU optionally translates response tags back from the processor's tag space to the entity's tag space, encapsulates the CXL.mem responses within carrier protocol frames, and transmits them via the PHY based on IEEE 802.3 PMA to the requesting entity.

FIG. 58A illustrates one embodiment of a processing pipeline for extracting passenger protocol messages from carrier protocol communications received over a physical layer based on IEEE 802.3 Physical Medium Attachment (PMA). The pipeline may process various carrier protocols that utilize a PMA based on IEEE 802.3, such as certain versions of Ethernet, UALink, or NVLink, to extract encapsulated passenger protocol messages such as CXL.mem, CXL.cache, or CXL.io messages. The figure describes a transmission received by a PMA that is based on IEEE 802.3, which forwards a data stream of the carrier protocol to a Physical Coding Sublayer (PCS). The PCS may include protocol-specific processing operations that may vary based on the carrier protocol being utilized. For Ethernet embodiments, the PCS may perform operations such as 64B/66B block decoding, block framing, block synchronization, descrambling, lane deskewing, and/or forward error correction (FEC) decoding. For UALink or NVLink embodiments, the PCS may additionally or alternatively perform other operations specific to those protocols while maintaining compatibility with the IEEE 802.3 PMA interface.

The PCS forwards processed data to a Parser. The data may take the form of a partially-delineated stream wherein protocol boundaries have been identified but detailed field parsing has not yet been performed. The Parser may analyze the received data to identify protocol structures and extract protocol-specific information. The Parser may perform analysis operations including identification of the carrier protocol type by examining protocol-specific patterns or markers in the data stream, identification of the passenger protocol type that is encapsulated within the carrier protocol, delineation of Protocol Data Units (PDUs) of the carrier protocol (Carrier PDU) according to the specific framing rules of the identified carrier protocol (such as Ethernet framing, frame-boundary delimitation, and frame synchronization which may involve operations similar to those performed by an Ethernet MAC), and identification of locations of interest within the carrier protocol PDU such as headers, addresses, identifiers, payload sections, and other fields that may be required by subsequent stages of the processing pipeline. The Parser may add metadata fields to the processed data, such as metadata identifying protocol types and data patterns.

The Parser forwards to a Validity Checker a structured data with location information, such as an array of offsets to locations of interest in the Carrier PDU. The Validity Checker performs validation operations on the received data structure, such as validation of data stream format conformance and carrier PDU validity checks including cyclic redundancy checks (CRC) or other error detection mechanisms specific to the carrier protocol. The Validity Checker forwards validated data structures to a Stream Extractor.

The Stream Extractor processes the validated data structures to extract passenger protocol information, such as extracting fields of interest from the Carrier PDU including data indicative of passenger protocol opcodes and physical addresses within a second physical address space utilized by the requesting entity. The Stream Extractor may identify and extract various passenger protocol fields necessary for message processing, regardless of the specific passenger protocol type. The Stream Extractor forwards its output to an optional Access Control List (ACL) module that may validate access permissions based on the extracted fields. The ACL feeds validated data to a Field Translator that performs field-level transformations between carrier and passenger protocol formats, such as translating fields of interest from the Carrier PDU (e.g., a command field) to fields conforming to the Passenger Protocol specifications (e.g., a CXL opcode field required for constructing a CXL request).

The Field Translator feeds transformed field data to a Stream Editor that reconstructs complete passenger protocol messages. The Stream Editor may perform several operations including reconstruction and formatting of translated fields into a PDU structure compliant with a valid Passenger Protocol PDU (Passenger PDU), such as CXL, insertion of mandatory or optional Passenger Protocol fields that may not be included in the Carrier PDU such as reserved fields of a CXL message that may be omitted from the Carrier PDU but are necessary for an element utilizing passenger protocol, such as a CXL device, to properly parse the request wherein values of omitted fields may be reconstructed based on RPU configurations and/or configurable default values, and removal of intermediate data and metadata that was collected and generated in the processing pipeline but is not part of a compliant Passenger PDU, such as CXL request.

When there is no address translation or protocol translation required, the Stream Editor forwards the Passenger PDU to an element utilizing passenger protocol, such as a CXL device within an RPU. When there is address translation and/or protocol translation required, the Stream Editor forwards the Passenger PDU, such as a CXL.mem M2S Req message carrying a physical address within a second HPA space, to an optional Address Translator. The Address Translator translates physical addresses between different physical address spaces, such as translating from a second HPA space to a first HPA space, and forwards the result to an optional Protocol Translator. The Protocol Translator may perform protocol-specific translations, such as translating from a CXL.mem M2S Req message to a CXL.cache D2H Req message. The translated Passenger PDU is then forwarded to the appropriate protocol device, such as forwarding a CXL.cache D2H Req message carrying the physical address within the first HPA space to an element utilizing passenger protocol, such as a CXL host.

FIG. 58B illustrates one embodiment of a packet structure that may be suitable for Layer 3 (L3) switching operations. L3 switching typically refers to packet forwarding based on network layer information, typically using IP addresses or similar network-layer identifiers to make routing decisions across different network segments or subnets. The illustrated packet structure shows a carrier protocol PDU in a regular format that may be processed by standard networking equipment while carrying an encapsulated passenger protocol PDU. The packet structure includes a Carrier Protocol Header, shown as an Ethernet header, which may contain standard Ethernet fields such as destination MAC address, source MAC address, and EtherType or length fields. Following the Ethernet header, the packet includes an IP header that may contain network layer routing information including source and destination IP addresses, protocol identifiers, and other IP-specific fields necessary for L3 routing decisions. A UDP header follows the IP header and may contain transport layer information including source and destination port numbers that may be used to identify specific services or applications. The packet includes a Carrier Protocol Encapsulating Header that may carry metadata specific to the encapsulation scheme. This header may include a PDU Version (Ver) field that indicates the version or format of the protocol PDU structure, enabling the Parser to correctly interpret the packet structure. A Source Node ID (SourceNodeID) field may identify the originating node in a format specific to the overlay network or fabric topology. A Destination Node ID (DestinationNodeID) field may identify the target node for routing within the overlay network. A Segmentation ID (SegmentID) field may be used for infrastructure virtualization, such as to provide isolation between different tenants or logical networks in multi-tenant environments. A PDU Sequence Number (PSN) field may provide ordering information for reliable delivery or reassembly of segmented messages. A Passenger Protocol (PassengerProt) field may identify the type of passenger protocol encapsulated within the PDU, such as CXL.io, CXL.cache, or CXL.mem, enabling the Parser to apply appropriate processing rules. The Passenger Protocol PDU section may contain the actual passenger protocol message, such as a CXL.mem PDU, that is being transported across the network. The Passenger Protocol PDU section may include the fields required by the passenger protocol specification, or a subset of the fields that enable reconstruction of the message, as further discussed below.

The packet further includes a Carrier Protocol Encapsulating Trailer that may carry additional metadata and integrity information. This trailer may include an Encapsulating CRC (E-CRC) field that provides error detection for the encapsulated portion of the packet, potentially offering stronger integrity protection than the standard Ethernet FCS. A Data Poisoning (Poison) field may be used to mark data that is known to be corrupted, allowing protocols such as CXL or UPI to propagate error indications across the network. A Reported Load (ReportedLoad) field may communicate congestion or load information from the source device, possibly augmented with congestion information from intermediate components along the path, such as CXL DevLoad indicators, enabling network-aware load balancing or congestion management. The packet structure may further includes an optional Pad field that may be used to meet minimum frame size requirements of the carrier protocol, and may conclude with an Ethernet Frame Check Sequence (FCS) that provides error detection for the entire Ethernet frame according to Ethernet specifications.

FIG. 58C illustrates one embodiment of a packet structure that may be suitable for Layer 2 (L2) switching operations. L2 switching typically refers to packet forwarding based on data link layer information, typically using MAC addresses to make forwarding decisions within a single network segment or broadcast domain. The Carrier Protocol Optimized Header may contain condensed addressing or routing information suitable for L2 forwarding decisions. The Carrier Protocol Encapsulating Header, Passenger Protocol PDU, and Carrier Protocol Encapsulating Trailer may contain similar fields and serve similar functions as described for the L3 packet structure in FIG. 58B, adapted for the L2 switching context. The packet structure maintains the optional Pad field and Ethernet FCS for compatibility with standard Ethernet frame requirements.

Figures 59A, 59B, 59C:
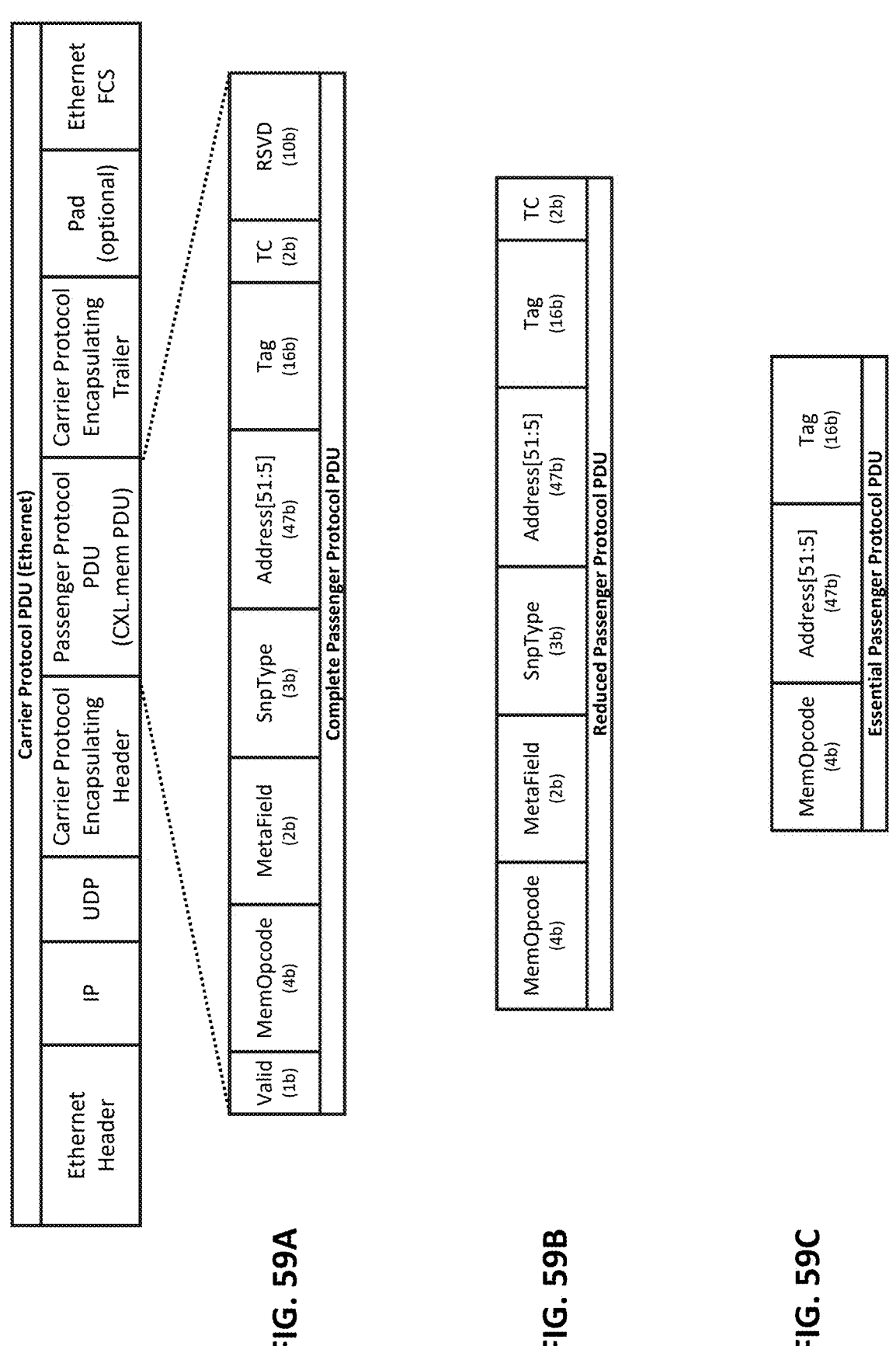
FIG. 59A, FIG. 59B, and FIG. 59C illustrate three embodiments of variations for the Passenger Protocol PDU that may be encapsulated within the Carrier Protocol PDU illustrated in FIG. 58B.

FIG. 59A to FIG. 59C illustrate three embodiments of variations for the Passenger Protocol PDU that may be encapsulated within the Carrier Protocol PDU illustrated in FIG. 58B. These variations illustrate different levels of field inclusion that may be utilized to optimize bandwidth utilization while maintaining the ability to reconstruct complete passenger protocol messages. The lower part of FIG. 59A illustrates a complete Passenger Protocol PDU for a CXL.mem message according to Revision 1.1 of the CXL Specification. The complete PDU includes the fields required by the CXL.mem protocol specification: a Valid field (1 bit) that indicates whether the message contains valid data, a MemOpcode field (4 bits) that specifies the memory operation type, a MetaField field (2 bits) that contains metadata about the transaction, a SnpType field (3 bits) that indicates the snoop type for cache coherency operations, an Address field (47 bits) that carries the physical address for the operation, a Tag field (16 bits) that provides a unique identifier for tracking the transaction, a TC field (2 bits) that may indicate traffic class or priority information, and a Reserved (RSVD) field (10 bits) that is reserved for future use or protocol compliance. This complete format may be utilized when full protocol compliance is required or when the carrier protocol has sufficient bandwidth to accommodate the fields.

FIG. 59B illustrates one embodiment of a reduced Passenger Protocol PDU, wherein some of the fields that can be reconstructed are omitted from the Carrier PDU to reduce bandwidth requirements. The reduced PDU retains the MemOpcode field (4 bits), MetaField field (2 bits), SnpType field (3 bits), Address field (47 bits), Tag field (16 bits), and TC field (2 bits). The reconstructed fields, which are not included in the Carrier PDU but are necessary for a CXL device for parsing the CXL Request, may be reconstructed by the Stream Editor of the RPU. For FIG. 59B, the fields to be reconstructed are the one bit Valid field and the 10 bits Reserved (RSVD) field. The Valid field may be reconstructed based on the presence of a well-formed PDU, while the RSVD field may be reconstructed using configured default values.

FIG. 59C illustrates one embodiment of an essential Passenger Protocol PDU, which may include only the minimum fields necessary for basic operation of the passenger protocol. The essential PDU comprises the MemOpcode field (4 bits) that specifies the operation to be performed, the Address field (47 bits) that identifies the physical address, and the Tag field (16 bits) that enables transaction tracking and response correlation. The fields omitted from the essential PDU, including Valid, MetaField, SnpType, TC, and RSVD fields, may be reconstructed by the Stream Editor using protocol-specific default values or configuration parameters.

Figures 60A, 60B:
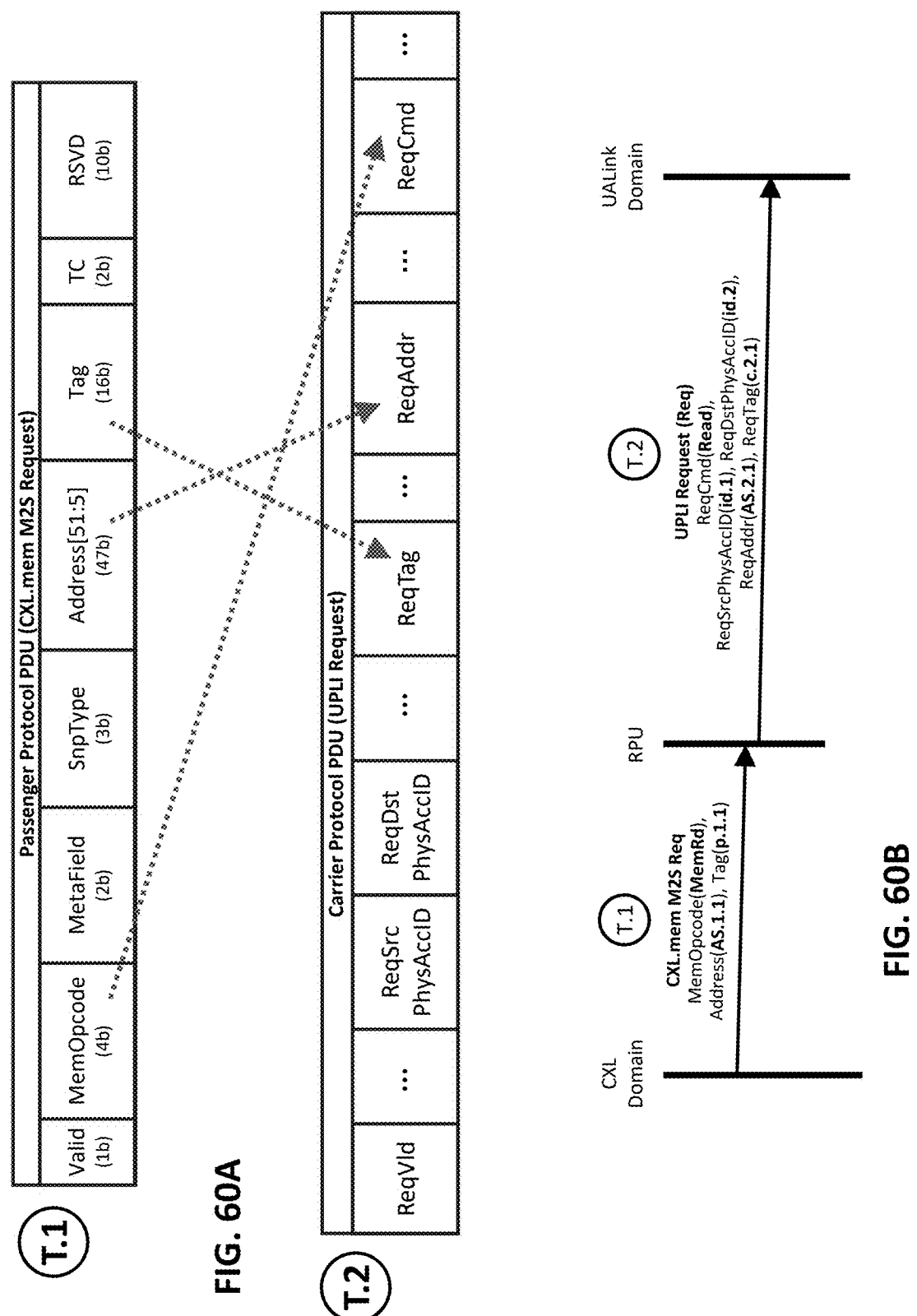
FIG. 60A illustrates one embodiment of passing CXL traffic or CXL-related traffic over a PHY based on IEEE 802.3 PMA utilizing carrier protocol encapsulation.
FIG. 60B illustrates one embodiment of a TFD showing the mapping between CXL.mem transaction layer and UPLI transaction layer.

FIG. 60A illustrates one embodiment of passing CXL traffic or CXL-related traffic over a physical layer (PHY) based on IEEE 802.3 PMA utilizing carrier protocol encapsulation. The embodiment comprises a carrier protocol that runs over a PHY based on IEEE 802.3 PMA and a passenger protocol PDU associated with CXL. Optionally, the passenger protocol PDU may be based on CXL.mem protocol. The carrier protocol encapsulates the CXL.mem PDU or portions thereof within carrier protocol structures that are suitable for transmission over the PHY based on IEEE 802.3 PMA. It may enable CXL communications to traverse physical infrastructure based on IEEE 802.3 standards, including but not limited to UALink physical layers, NVLink physical layers, or Ethernet physical layers, wherein UALink may utilize a modified IEEE 802.3 PHY or other types of IEEE 802.3 PHY, and wherein UALink may alternatively utilize a PCIe PHY in some variants.

FIG. 60B illustrates one embodiment of a TFD showing the mapping between a CXL transaction layer and a UPLI transaction layer, wherein TL denotes transaction layer. The figure shows a CXL.mem M2S Request at the CXL transaction layer being translated to a UPLI Request at the UPLI transaction layer. The mapping comprises translating a MemOpcode field from the CXL request to a ReqCmd field in the UPLI request, translating a Tag field to a ReqTag field, and translating an Address field to a ReqAddr field. These represent the major mappings for the translation process, wherein additional mappings may include traffic class or other fields that are not explicitly illustrated. Some fields may pass through direct mapping while other fields may undergo translation, wherein for example the address may be translated between different address spaces, and the request tag may be assigned from a pool rather than directly translated from the CXL tag. The TFD shows the transaction flowing from a CXL.mem M2S Req through the translation process to a UPLI Req, demonstrating the protocol translation at the transaction layer (TL) level.

Figures 61A, 61B:
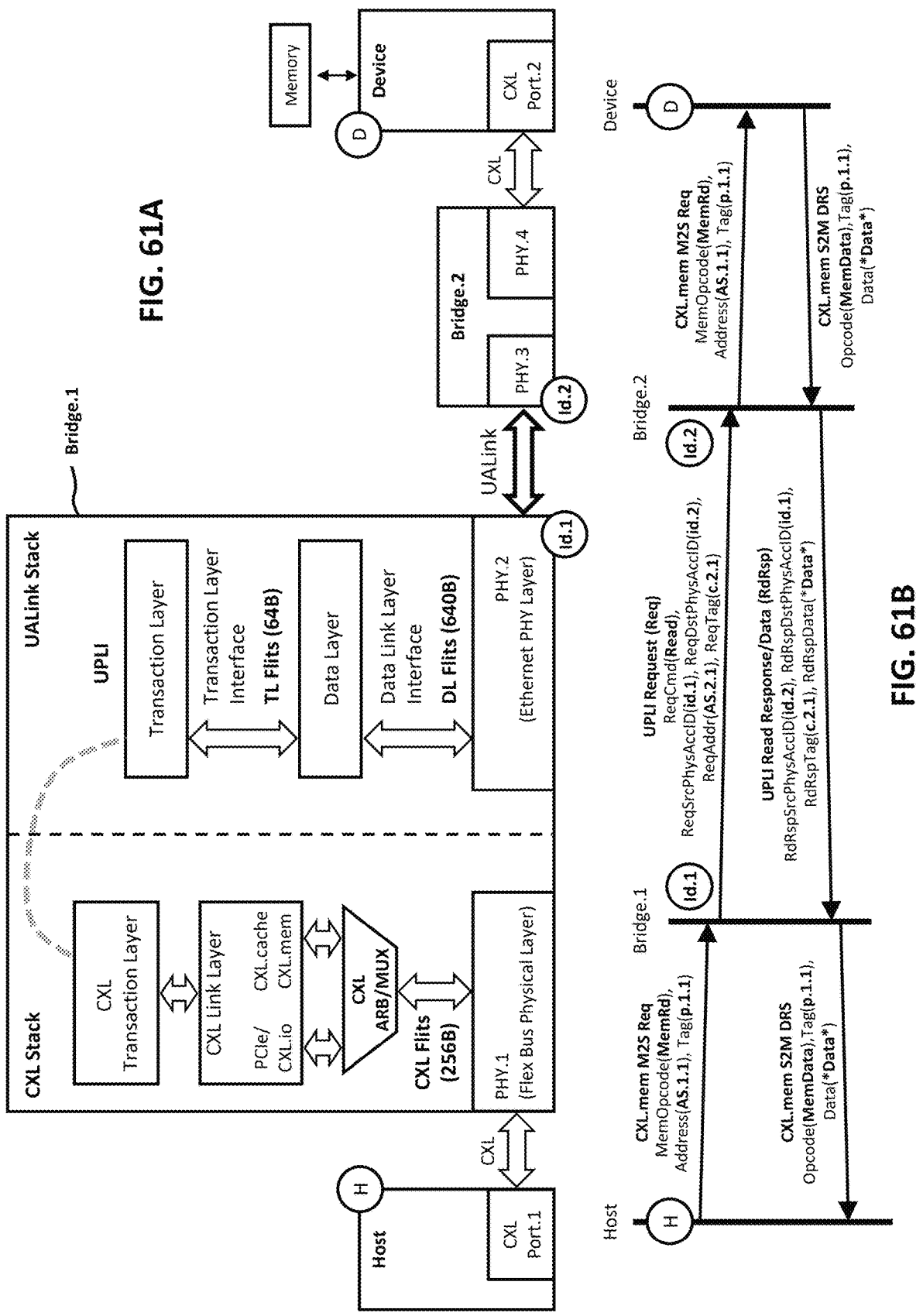
FIG. 61A illustrates one embodiment of a system comprising a host and a device coupled via abridges that translates between CXL and carrier protocols that utilize PHYs based on IEEE 802.3 PMA.
FIG. 61B illustrates one embodiment of a TFD demonstrating bidirectional CXL communications between a host and a device utilizing UALink as an intermediate protocol.

FIG. 61A illustrates one embodiment of a system featuring host and device components coupled via bridges that perform protocol translations between CXL and carrier protocols that utilize PHYs based on IEEE 802.3 PMA. The system comprises a host on the left side and a device on the right side, reflecting the asymmetry built into CXL wherein specific roles are assigned to each side. The system includes Bridge.1 and Bridge.2, wherein Bridge.1 translates between a Flex bus physical layer (a physical layer utilized by CXL) and an Ethernet PHY Layer (representing one embodiment of a PHY based on IEEE 802.3 PMA), and Bridge.2 performs the reverse translation from an Ethernet PHY Layer back to a Flex bus physical layer. The host and device sides comprise CXL ports, designated as CXL Port.1 and CXL Port.2, which utilize a Flex bus physical layer and are unaware of the intermediate UALink or the IEEE 802.3-based physical layer infrastructure. The intermediate link between Bridge.1 and Bridge.2 may utilize UALink, wherein the UALink physical layer may be based on an IEEE 802.3 Ethernet PHY as specified in the UALink specification. The figure shows the detailed protocol stacks for both CXL and UPLI sides, wherein the CXL stack may include a CXL Transaction Layer, a CXL Link Layer with separate paths for PCIe/CXL.io and CXL.cache/CXL.mem, a CXL ARB/MUX that transmits CXL Flits (256 bytes representing one embodiment), and a Flex Bus Physical Layer (denoted as PHY.1). The UPLI stack may include a transaction layer (which may include a transaction layer interface that transmits TL flits of 64 bytes), a Data Layer or a Data Link Layer (which may include a data link layer interface that transmits DL flits of 640 bytes), and an Ethernet PHY layer (denoted as PHY.2). This mapping occurs between transaction layers, specifically between the CXL transaction layer and the UPLI transaction layer, representing the typical translation approach wherein the system receives signals at the physical layer, processes upward to the transaction layer for mapping operations, and then processes downward to the physical layer for transmission. The bridges may be implemented or embedded within switches, such as CXL switches, UALink switches, or hybrid switches, enabling hosts and devices to connect through a switching infrastructure with UALink links between the switches, effectively tunneling CXL.mem transactions over UALink between switches.

FIG. 61B illustrates one embodiment of a TFD corresponding to the system described in FIG. 61A, demonstrating bidirectional CXL communications between a host and a device utilizing UALink as an intermediate protocol. The TFD shows four communication points comprising the Host edge designated H, Id.1 representing the UALink identity of Bridge.1, Id.2 representing the UALink identity of Bridge.2, and the Device edge designated D. In the forward path from host to device, the Host H originates a CXL.mem M2S Req with MemOpcode(MemRd), Address(AS.1.1), and Tag (p.1.1). Bridge.1 translates this CXL request to a UPLI Request (Req) with ReqCmd(Read), ReqSrcPhysAccID (Id.1) identifying the source bridge, ReqDstPhysAccID (Id.2) identifying the destination bridge, ReqAddr(AS.2.1) representing the translated address, and ReqTag(c.2.1) representing the translated tag. The UPLI Request is transmitted at Id.1 using the UALink identities for routing between the Id.1 and Id.2 communication points. Bridge.2 at Id.2 receives the UPLI Request and translates it back to a CXL.mem M2S Req with MemOpcode(MemRd), Address (AS.1.1), and Tag(p.1.1) for delivery to the Device designated D, wherein the original CXL physical address and tag values may be restored.

In the return path from device to host, the Device sends a CXL.mem S2M DRS with Opcode(MemData), Tag(p.1.1), and Data(*Data*). Bridge.2 translates this CXL response to a UPLI Read Response/Data (RdRsp) with RdRspSrcPhysAccID(Id.2) identifying the source bridge, RdRspDstPhysAccID(Id.1) identifying the destination bridge, RdRspTag (c.2.1) representing the translated tag that matches the original request tag, and RdRspData(*Data*) carrying the response data. The UPLI response is transmitted at Id.2 using the UALink identities for routing between the Id.2 and Id.1 communication points. Bridge.1 at Id.1 receives the UPLI RdRsp and translates it back to a CXL.mem S2M DRS with Opcode(MemData), Tag(p.1.1), and Data(*Data*) for delivery to Host H, wherein the original tag value enables the host to correlate the response with the original request. A UALink switch or other switching infrastructure may be positioned between Bridge.1 and Bridge.2, wherein the UALink physical accelerator identifiers (ReqSrcPhysAccID, ReqDstPhysAccID, RdRspSrcPhysAccID, RdRspDstPhysAccID) enable routing through such intermediate switching infrastructure. The translation process maintains the semantic content of the CXL transactions while adapting the protocol format for transport over the UALink infrastructure, wherein Bridge.1 performs protocol translations between CXL and UPLI requests and Bridge.2 performs the reverse protocol translations between UPLI and CXL requests. The address translation between AS.1.1 in the CXL domain and AS.2.1 in the UPLI domain, and the tag translation between p.1.1 in the CXL domain and c.2.1 in the UPLI domain, enable the bridges to maintain proper transaction tracking and response correlation while adapting between different addressing and identification schemes utilized by the respective protocols.

Figures 64A, 64B:
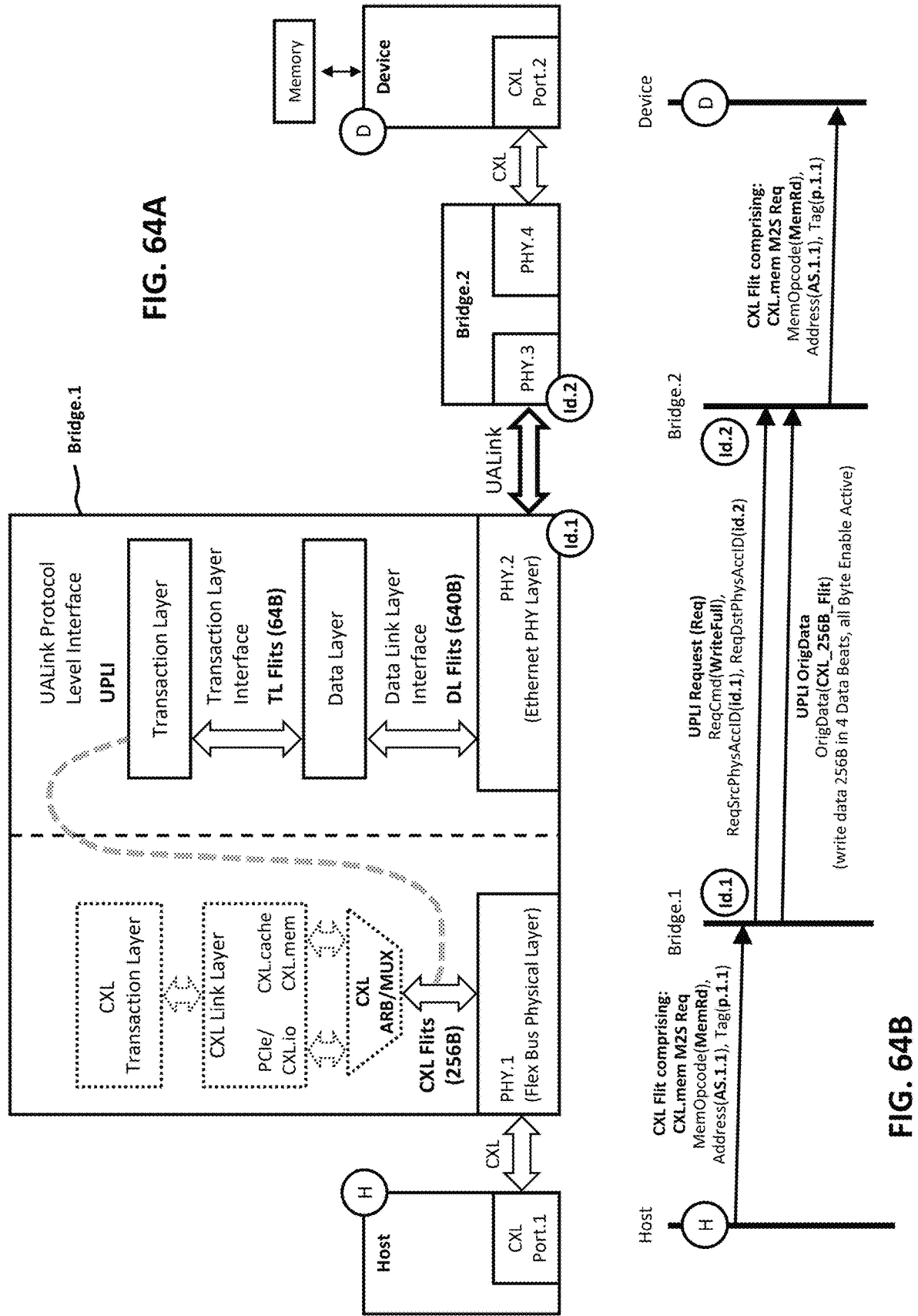

FIG. 64A illustrates one embodiment of a system that translates CXL flits to UPLI transaction layer messages, providing a method for passing CXL protocols over a UALink infrastructure, wherein LL denotes link layer and TL denotes transaction layer. The system captures CXL flits from the interface between the CXL ARB/MUX and the Flex bus physical layer, or from the Flex bus physical layer (denoted as PHY.1), and maps them to the UPLI transaction layer. The upper-layers of the CXL side of the system, that may include the CXL Transaction Layer, the CXL Link Layer, and the CXL ARB/MUX, is illustrated with dotted lines, indicating that the dotted elements may not be utilized in the translation process. The interface between the CXL ARB/MUX and the Flex bus physical layer conveys CXL Flits, such as 256 bytes Flits, which may be captured for mapping to the UPLI transaction layer. The UPLI side shows the UPLI Transaction Layer that transmits TL Flits (of 64 Bytes in one example) to the Data Link Layer that transmits, via the data link layer interface, DL Flits (of 640 Bytes in one example) to the Ethernet PHY layer (denoted as PHY.2). The translation from the CXL link layer to the UPLI transaction layer may provide advantages wherein traffic may already be packed efficiently at the CXL link layer, and may enable support for various protocol types including CXL.mem, CXL.cache, CXL.io, and PCIe, without requiring separate translation schemes for each protocol type, wherein at the CXL link layer all protocols are packed into CXL flits regardless of whether the original traffic is PCIe, CXL.io, CXL.cache, or CXL.mem. The system encapsulates CXL flits entirely into UPLI requests, wherein 256-byte CXL flits may be packed into 256-byte UALink WriteFull transactions, wherein WriteFull utilizes the maximum 256-byte payload size in contrast to regular UALink write commands that support variable length with byte enables. The dotted lines for the CXL Transaction Layer and the CXL Link Layer indicate that these layers are bypassed in the translation process, distinguishing this embodiment from transaction layer to transaction layer translations.

FIG. 64B illustrates one embodiment of a TFD depicting the tunneling of CXL flits over a UPLI protocol, wherein the CXL flit structure is preserved during encapsulation and transport. The TFD shows a CXL Flit, which may comprise a CXL.mem M2S Req or other CXL protocol transactions, being translated to a UPLI WriteFull command. The notation indicates that the CXL Flit comprises CXL protocol transactions that were originally present at the transaction layer but are now packed within the flit structure. The UPLI WriteFull command encapsulates the entire 256-byte CXL flit, maintaining the flit structure intact during transmission over the UALink infrastructure. The TFD demonstrates flit-level tunneling wherein the contents of the flit remains opaque to the intermediate protocol, enabling a universal transport mechanism that may support any type of CXL protocol, possibly including future CXL protocols, without requiring modifications to the translation logic, wherein the CXL link layer packs transactions into CXL flits and the translation process encapsulates these CXL flits into UPLI transactions for transport. The embodiment may operate point-to-point between known endpoints, wherein switching decisions are made at the transaction layer by edge switches while the tunneling maintains CXL flit integrity between translation points.

Figures 62A, 62B:
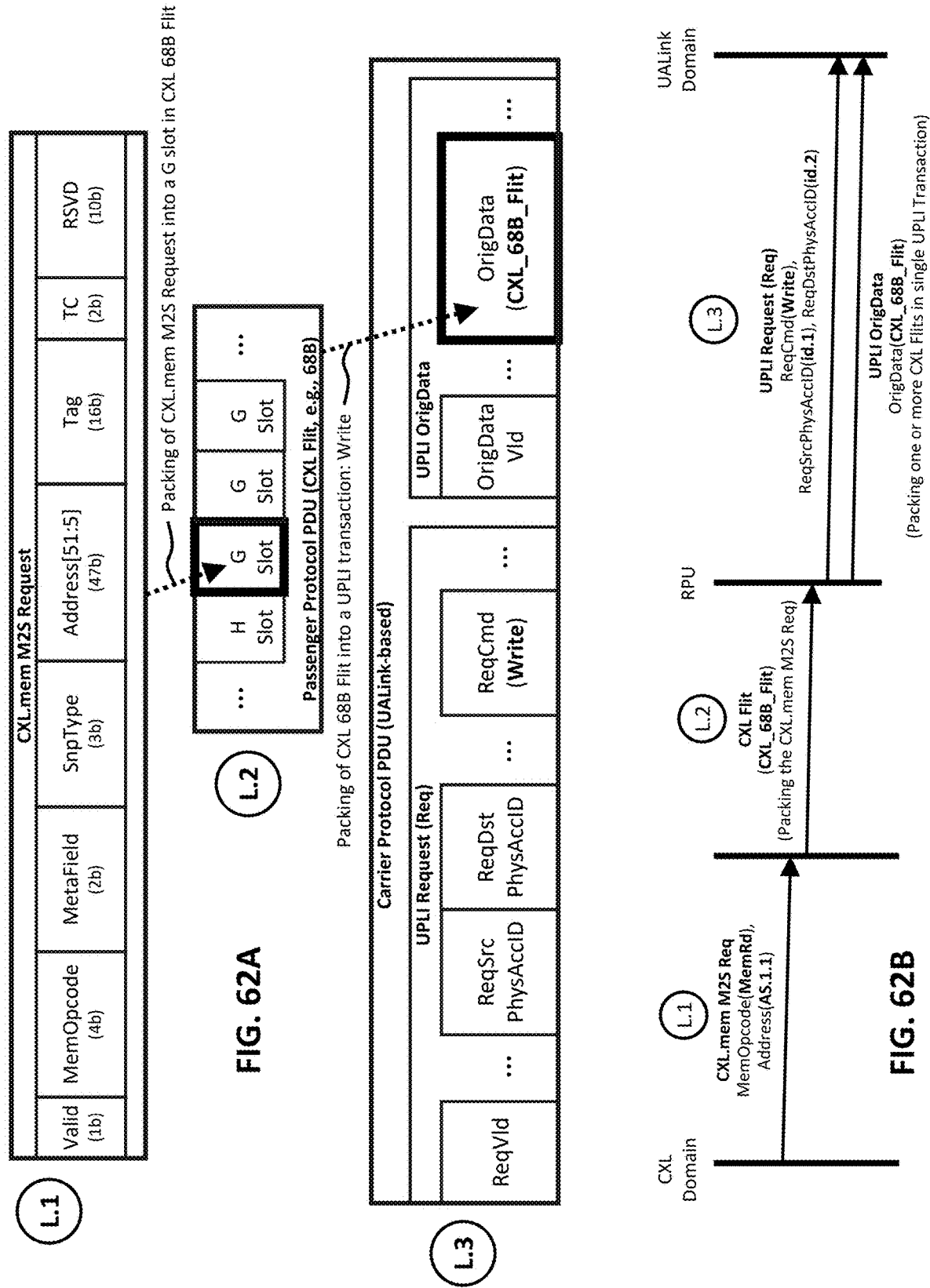
FIG. 62A illustrates one embodiment of encapsulating 68-byte CXL flits into UPLI transactions comprising Write commands.
FIG. 62B illustrates one embodiment of a TFD depicting protocol translations utilized for encapsulating a 68-byte CXL flit into a UPLI Write command.

FIG. 62A illustrates one embodiment of encapsulating 68-byte CXL flits into UPLI transactions comprising Write commands. The figure illustrates a CXL Transaction Layer message comprising a CXL.mem M2S Request that is packed into a 68-byte CXL flit. The 68-byte CXL flits comprise H slots and G slots for organizing transaction data, wherein 68-byte flits correspond to CXL 1.1 and 2.0 specifications or may be utilized in other CXL versions. The UPLI side shows the encapsulation into a UPLI Write command, which supports variable payload sizes between 1 and 256 bytes, making it suitable for accommodating the 68-byte CXL flit payload. The UPLI Write command structure comprises a UPLI Request section with fields including ReqVId, ReqSrcPhysAccID, ReqDstPhysAccID, and ReqCmd (Write), and a UPLI OrigData section wherein the 68-byte CXL flit payload is carried. The embodiment may pack one or more 68-byte CXL flits into a single UPLI transaction, enabling flexible encapsulations wherein multiple 68-byte flits may be combined into a larger UPLI write command that does not necessarily utilize the full 256-byte capacity.

FIG. 62B illustrates one embodiment of a TFD depicting protocol translations utilized for encapsulating a 68-byte CXL flit into a UPLI Write command. The transaction flow shows a CXL.mem M2S Request being packed into a 68-byte CXL Flit and subsequently encapsulated into a UPLI Write command. The UPLI Write command supports variable-size payloads and is suitable for encapsulating the 68-byte CXL flit, wherein the write command may specify the data payload size and utilize byte enables to indicate which bytes are being written. The TFD indicates that the OrigData channel of UPLI is utilized to pass the actual data content of the CXL flit. The encapsulation enables CXL communications to be transported over UPLI infrastructure while preserving the transaction semantics, wherein the UPLI Write command provides sufficient capacity and flexibility to accommodate the 68-byte CXL flit payload that does not align with native UPLI block sizes of 64 bytes or 256 bytes. The byte enable mechanism allows specification of the valid data bytes within the write transaction, accommodating the non-standard 68-byte payload size.

Figures 63A, 63B:
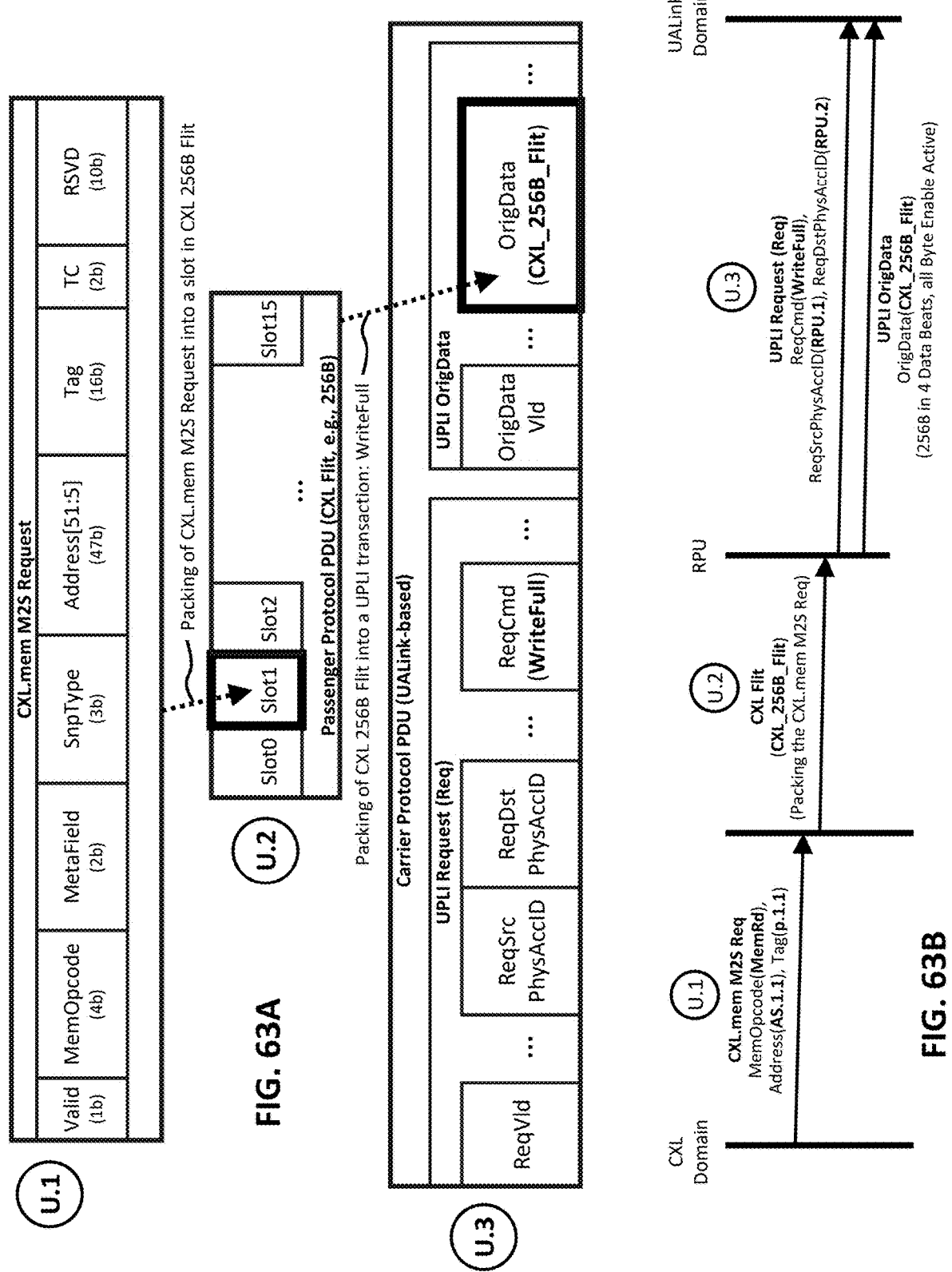

FIG. 63A illustrates one embodiment of encapsulating 256-byte CXL flits into UPLI WriteFull commands. The figure is organized in three levels labeled U.1, U.2, and U.3, demonstrating the transformation from a CXL transaction layer message to UPLI carrier protocol PDU encapsulation. Level U.1 shows the CXL.mem M2S Request message structure comprising fields Valid (1 bit), MemOpcode (4 bits), MetaField (2 bits), SnpType (3 bits), Address[51:5] (47 bits), Tag (16 bits), TC (2 bits), and RSVD (10 bits). Level U.2 shows the packing of the CXL.mem M2S Request into a slot within a CXL 256-byte flit, wherein the flit structure comprises 16 slots labeled Slot0 through Slot15, representing the Passenger Protocol PDU (CXL Flit, e.g., 256B). Level U.3 shows the packing of the CXL 256-byte flit into a UPLI transaction utilizing WriteFull command, wherein the Carrier Protocol PDU (UPLI Write) comprises two main sections: a UPLI Request (Req) section with fields including ReqVId, ReqSrcPhysAccID, ReqDstPhysAccID, and ReqCmd (WriteFull), and a UPLI OrigData section wherein the CXL_256B_Flit is carried as the OrigData payload. The WriteFull command is specifically designed for 256-byte payloads, matching the 256-byte CXL flit size and enabling efficient encapsulation wherein all bytes are active and all byte enables are set, in contrast to the variable-length Write command that requires byte enable management.

FIG. 63B illustrates one embodiment of a TFD depicting translations utilized for encapsulating or packing of a CXL.mem request message into a 256-byte CXL flit that is further encapsulated into a UPLI WriteFull command. At U.1 in the CXL Domain, a CXL.mem M2S Req structure originates with MemOpcode(MemRd), Address(AS.1.1), and Tag(p.1.1). At U.2, the RPU receives or generates a CXL Flit designated as CXL_256B_Flit, which indicates the packing of the CXL.mem M2S Req into the flit structure. At U.3 in the UALink Domain, the transaction is encapsulated into a UPLI Request (Req) with ReqCmd(WriteFull), ReqSrcPhysAccID(RPU.1) identifying the source RPU, and ReqDstPhysAccID(RPU.2) identifying the destination RPU. The UPLI OrigData section carries the OrigData(CXL 256B_Flit) payload, wherein the 256-byte payload is transmitted in 4 Data Beats with all Byte Enable Active, reflecting that UPLI transactions utilize 64-byte data beats such that four beats are required to transmit the 256-byte flit (4×64 bytes=256 bytes). The WriteFull command enables all bytes, indicating that the entire 256-byte capacity is utilized without requiring selective byte enable management, providing an efficient match between the 256-Byte CXL flit size and the 256-Byte UPLI WriteFull command capacity.

Figures 65A, 65B:
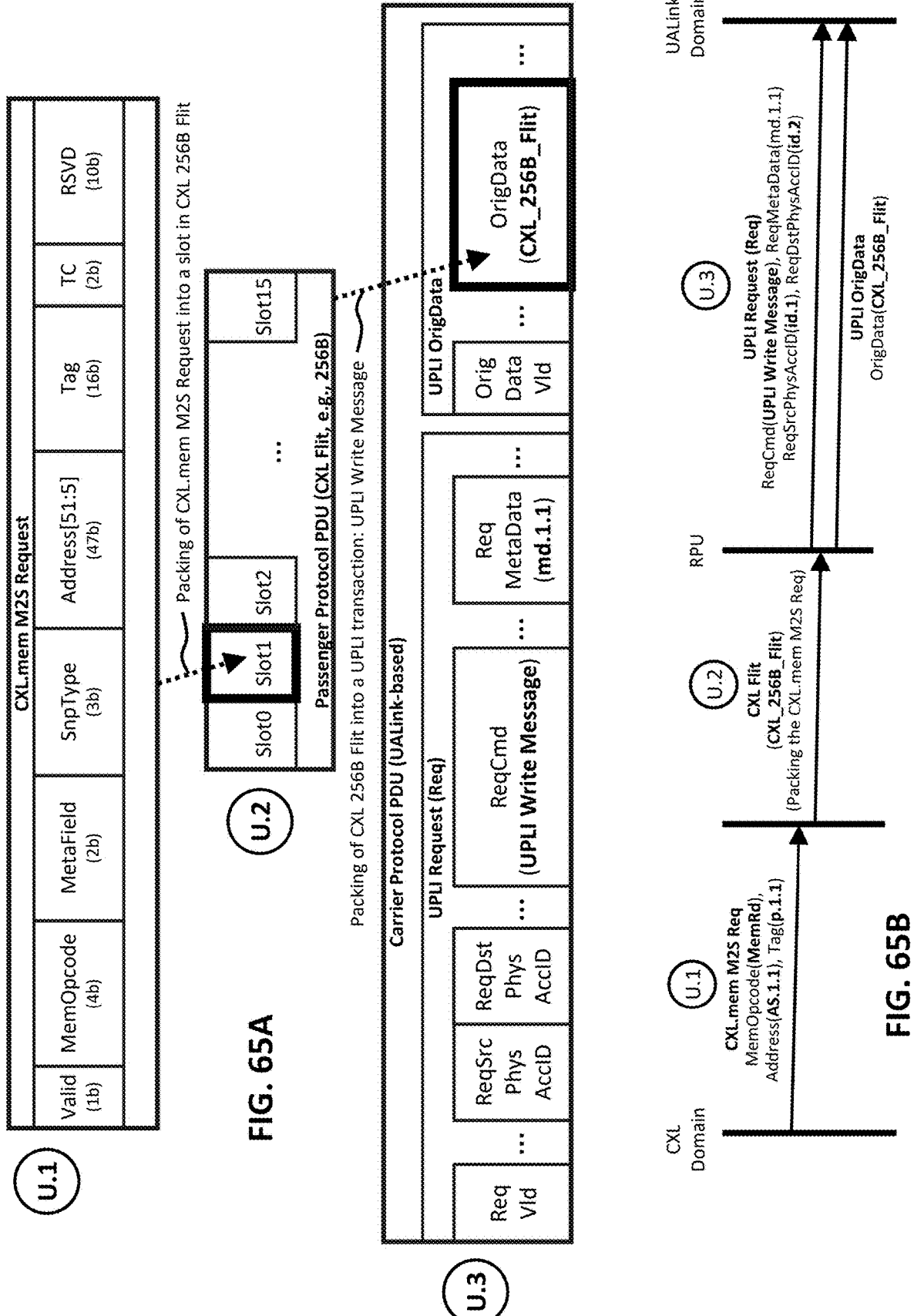

FIG. 65A illustrates one embodiment of utilizing a UPLI Write Message command for tunneling CXL flits, wherein the UPLI Write Message command provides both read semantics and write semantics. The UPLI Write Message command may be suitable for tunneling applications wherein bidirectional data flow is required, enabling both read operations (wherein data flows from the remote side back to the requester) and write operations (wherein data flows from the requester to the remote side). The UPLI Write Message command may support general-purpose tunneling wherein the semantic flexibility of supporting both read and write patterns within a single command type may simplify the translation logic. The UPLI Write Message command may be utilized to encapsulate CXL flits regardless of whether the underlying CXL transaction is a read request (wherein response data will flow in the opposite direction) or a write request (wherein data accompanies the request).

FIG. 65B illustrates one embodiment of a TFD depicting utilizing a UPLI Write Message command for tunneling a CXL transaction, wherein the command's dual semantics enable handling of both read and write transaction patterns. The TFD demonstrates how CXL requests are encapsulated within UPLI Write Message commands for transport over a UPLI protocol infrastructure, such as a UALink infrastructure, wherein the UPLI Write Message command provides the necessary semantic flexibility to support the bidirectional nature of CXL communications. The UPLI Write Message command enables to maintain transaction semantics during tunneling operations, wherein read requests generate data responses flowing in the reverse direction and write requests include data flowing in the forward direction, and wherein a single command type accommodates both patterns.

Figures 66A, 66B:
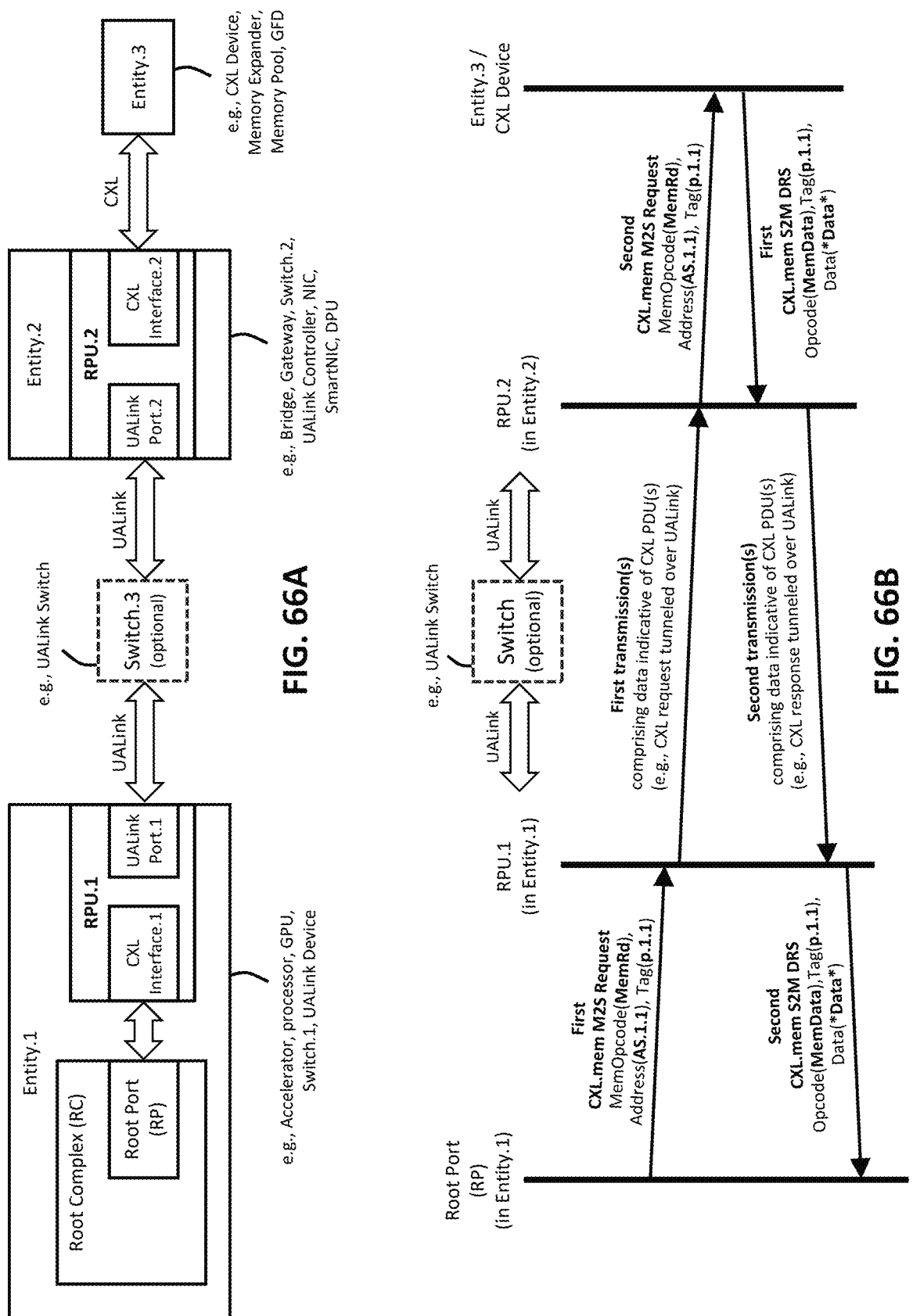

FIG. 66A illustrates one embodiment of a system comprising a first entity (Entity.1), such as an accelerator, a processor, a GPU, a first switch (Switch.1), or a UALink device, wherein the first entity may include a Root Complex (RC) comprising a Root Port (RP), and may further include a first RPU (RPU.1) comprising a first CXL interface (CXL Interface.1) and a first UALink port (UALink Port.1). The system may further include an optional third switch (Switch.3), such as a UALink switch, and a second entity (Entity.2), such as a bridge, a gateway, a second switch (Switch.2), a UALink controller, a Network Interface Card (NIC), e.g., a UALink NIC, a SmartNIC, e.g., a UALink SmartNIC, or a Data Processing Unit (DPU), e.g., a UALink DPU. The second entity may include a second RPU (RPU.2) comprising a second CXL interface (CXL Interface.2) and a second UALink port (UALink Port.2). The system further includes a third entity (Entity.3), such as a CXL device, a memory expander, a memory pool, or a GFD.

The first and second RPUs may enable the first entity to communicate with the third entity according to a CXL-based protocol, via the second entity and optionally via the third switch (Switch.3), such as by translating between CXL-based PDUs (such as TLPs, requests, messages, or flits) and transmissions comprising data indicative of CXL PDUs, such as transmissions comprising data indicative of CXL opcodes and physical addresses, wherein the transmissions utilize UALink PDUs (such as UPLI messages or UALink flits, e.g., TL Flits, DL Flits, or Payload Flits), which may be sent and received via the first and second UALink ports, optionally enabling the first entity to access resources of the third entity, such as registers or memory. In some embodiments, translating between the CXL-based PDUs and the transmissions utilizing UALink PDUs may enable CXL over UALink, such as via CXL tunneling over UALink, e.g., tunneling of CXL.mem requests and responses over UALink, tunneling of CXL.io TLPs over UALink, tunneling of CXL-based PDUs over UALink, or tunneling of CXL transactions over UALink.

In still some embodiments, the first UALink port and the second UALink port may utilize the same physical layer technology, such as a physical layer based on IEEE 802.3 PMA (e.g., UALink 200 PHY based on 802.3 Ethernet PHY), or a physical layer based on PCIe (e.g., UALink 128G based on PCIe 6.3), wherein in other embodiments the first UALink port and the second UALink port may utilize different physical layer technologies. The first RPU may be implemented in a chiplet inside an IC package of the first entity, as a functional block on the same silicon die with the RP, or may be split between dies or chiplets. Alternatively, the first RPU may be implemented as a discrete component coupled to the second entity. Additionally or alternatively, the first RPU may be included in a switch, such as in a UALink switch.

In still some embodiments, the first entity may be a first switch (Switch.1), such as a first CXL switch comprising the first UALink port, the second entity may be a second switch (Switch.2), such as a second CXL switch comprising the second UALink port, wherein the CXL traffic between the first CXL switch and the second CXL switch may be tunneled over UALink, and wherein the first CXL switch and the second CXL switch may optionally be coupled by the third switch (Switch.3), that may be a UALink switch. In another embodiment, the first entity may be a first switch (Switch.1), such as a first UALink switch comprising the first CXL interface (CLX Interface.1), the second entity may be a second switch (Switch.2), such as a second UALink switch comprising the second CXL Interface (CXL Interface.2), wherein the CXL traffic between the RP and the third entity (e.g., a CXL device) may be tunneled over UALink via the second UALink switch (Switch.2) and optionally via the third switch (Switch.3), such as a third UALink switch.

FIG. 66B illustrates one embodiment of a TFD demonstrating a CXL communication between a first entity (Entity.1), such as a processor comprising a Root Port (RP), and a third entity (Entity.3), such as a CXL device, wherein the CXL communication may be tunneled over UALink. The first entity may initiate a read from the third entity, such as by sending a first CXL.mem M2S Request comprising MemOpcode(MemRd), Address(AS.1.1), and Tag(p.1.1) via the RP. The first RPU (RPU.1), which may reside in the first entity, may be configured to receive the first CXL.mem M2S Request and translate it to first transmission(s) comprising data indicative of CXL PDU, such as transmission(s) comprising data indicative of CXL opcodes and physical addresses, wherein the first RPU may send the first transmission(s) which may utilize one or more UALink PDUs (such as UPLI messages or UALink flits, e.g., TL Flits, DL Flits, or Payload Flits), to a second RPU (RPU.2), which may reside in a second entity, such as a bridge or a gateway. The first RPU may be further configured to translate the first CXL.mem M2S Request to the first transmission(s) in a manner that enables reconstruction of the first CXL.mem M2S Request at the second RPU with minimal (or no)

modifications, effectively tunneling the first CXL.mem M2S Request over UALink. For example, the first RPU may be configured to encapsulate the first CXL.mem M2S Request into a UPLI Write Message, and send the UPLI Write Message to the second RPU, wherein the CXL request may be extracted from the UPLI Write Message such as by decapsulation. Additionally or alternatively, the first RPU may be configured to encapsulate a CXL flit comprising the first CXL.mem M2S Request into a UPLI Write Message, and send the UPLI Write Message to the second RPU, wherein the CXL flit comprising the first CXL.mem M2S Request may be extracted from the UPLI Write Message such as by decapsulation.

The second RPU may receive the first transmission(s) and translate it to a second CXL.mem M2S Request comprising MemOpcode(MemRd), Address(AS.1.1), and Tag(p.1.1), and send the second CXL.mem M2S Request to the third entity. In some embodiments, the first CXL.mem M2S Request and the second CXL.mem M2S Request may be identical, whereas in other embodiments, the second RPU may construct the second CXL.mem M2S Request based on the first CXL.mem M2S Request with variations such as utilizing a different opcode (e.g., MemRdData instead of MemRd), utilizing a different tag namespace, e.g., Tag (q.2.1) instead of Tag (p.1.1), or utilizing address translations, e.g., Address(AS.2.1) instead of Address(AS.1.1). The third entity may respond to the second CXL.mem M2S Request by sending a first CXL.mem S2M DRS comprising Opcode(MemData), Tag(p.1.1), and Data(*Data*) to the second RPU, wherein the second RPU may be configured to translate the first CXL.mem S2M DRS to second transmission(s) comprising data indicative of CXL PDU, and send the second transmission(s) to the first RPU. The first RPU may be further configured to receive the second transmission(s) and translate it to a second CXL.mem S2M DRS comprising Opcode(MemData), Tag(p.1.1), and Data (*Data*), and send the second CXL.mem S2M DRS to the RP.

In some embodiments, the first CXL.mem S2M DRS and the second CXL.mem S2M DRS may be identical, whereas in other embodiments, the first RPU may construct the second CXL.mem S2M DRS based on the first CXL.mem S2M DRS with variations, such as updating fields, e.g., Device Load (DevLoad), MetaField, MetaValue, TRP, Opcode, or reserved fields. Additionally or alternatively, the first RPU may alter the structure of the second CXL.mem S2M DRS compared to the original first CXL.mem S2M DRS, such as by adding a trailer. In still some embodiments, the second CXL.mem M2S Request may be different from the first CXL.mem M2S Request due to differences in protocol revisions, such as when the first RPU communicates with the RP according to CXL 1.1, whereas the second RPU communicates with the third entity according to CXL 3.2, or such as when message format conversion is required between HBR and PBR formats, e.g., when the second RPU utilizes PBR mode or PBR messages, whereas, for example, the RP is associated with an HBR host. Similarly, the second CXL.mem S2M DRS may be different from the first CXL.mem S2M DRS due to differences in protocol revisions, or such as when message format conversion is required between HBR and PBR formats. In some embodiments the first RPU and the second RPU may be coupled by a switch, such as a UALink switch.

Figures 55A, 55B:
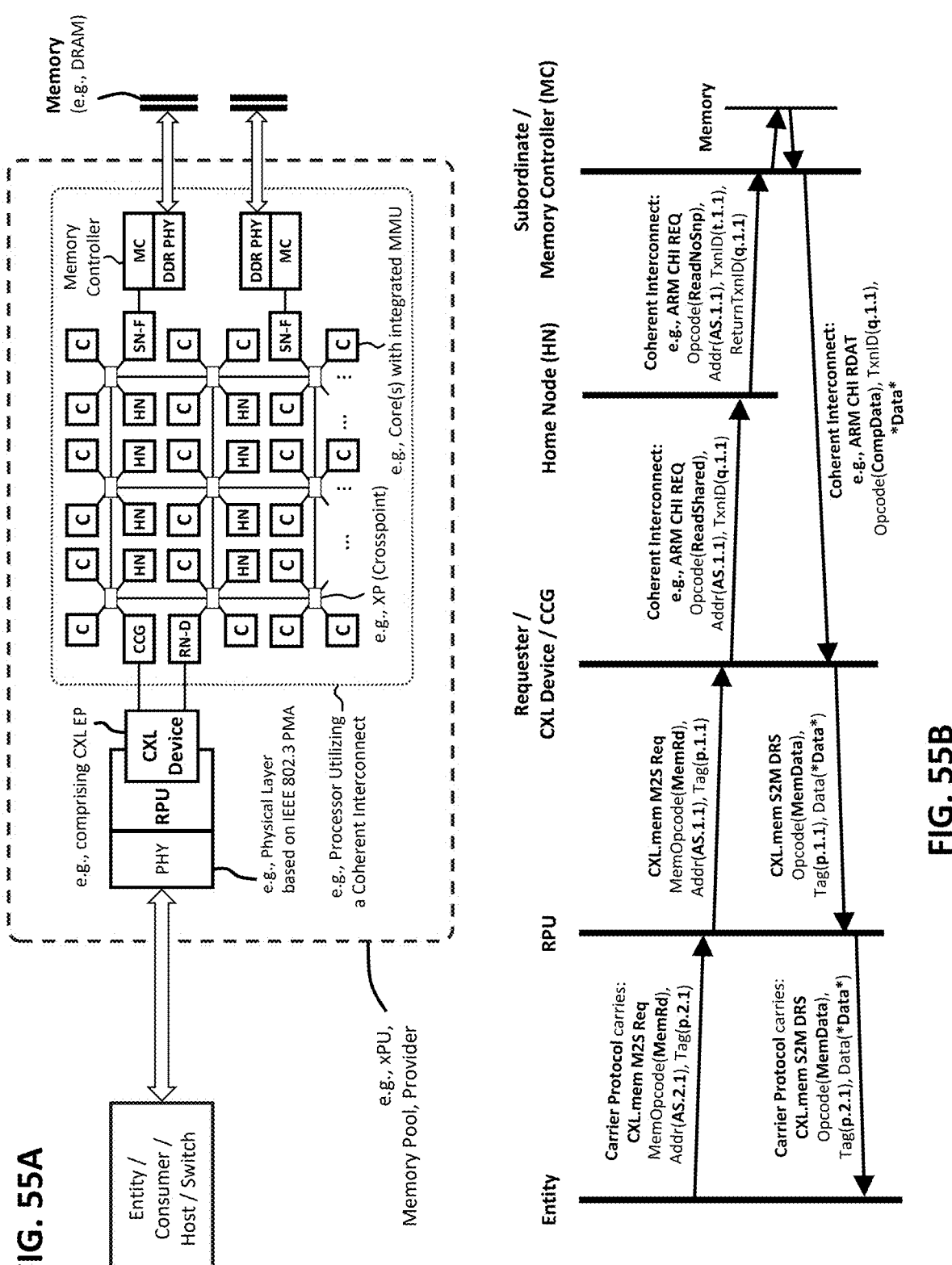
FIG. 55A illustrates one embodiment of a system wherein an entity is coupled through an IEEE 802.3 PHY to an RPU comprising a CXL device coupled to an ARM architecture processor.
FIG. 55B illustrates one embodiment of a TFD demonstrating translating CXL.mem messages to ARM CHI requests.

FIG. 55A illustrates one embodiment of a system wherein an entity is coupled through a Physical Layer based on IEEE 802.3 PMA to an RPU that includes or is coupled to a CXL device that is coupled to an ARM architecture processor through one or more CCG nodes and possibly one or more RN-D nodes. The memory controller (MC) within the system is coupled to SN-F nodes and interfaces with DRAM through DDR PHYs and memory channels. The embodiment includes crosspoints (XP) that function as routing elements within the ARM mesh interconnect, examining packet identifiers to determine appropriate routing paths and managing traffic flow between sources and destinations within the mesh structure.

FIG. 55B illustrates one embodiment of a TFD that may be executed on the embodiment described in FIG. 55A, demonstrating a CHI protocol transaction sequence. The flow shows a Requester, which may be the CCG or the CXL device from FIG. 55A, initiating an allocating read request to a Home Node, with the Memory Controller serving as the Subordinate node. The diagram illustrates the optimization technique of combined response from subordinate, wherein the Home Node sends a ReadNoSnp request to the Memory Controller, which then returns data directly to the Requester using a CompData opcode, reducing message count and potentially improving transaction latency by eliminating the need for data to flow back through the Home Node.

Figures 67A, 67B:
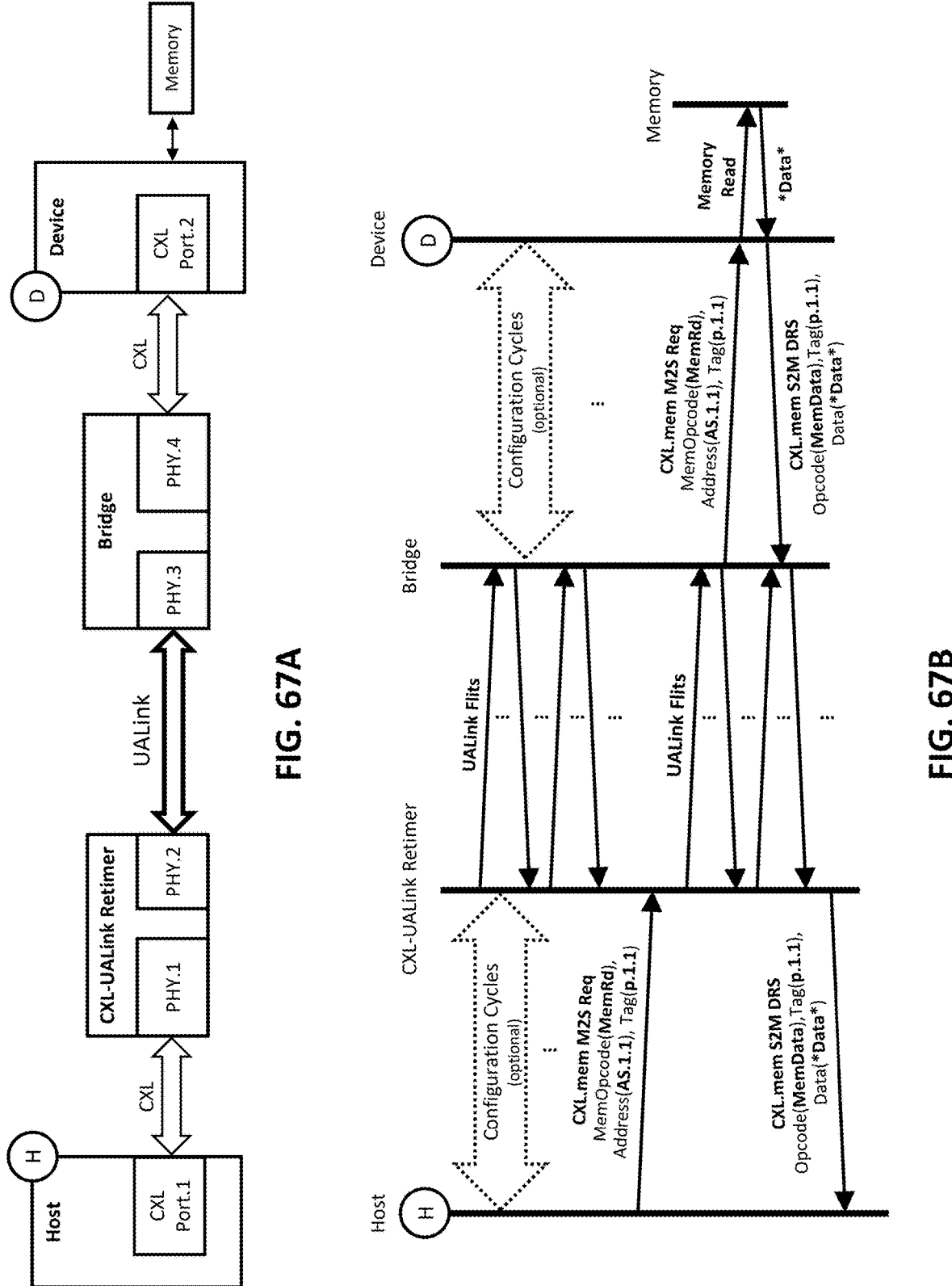

FIG. 67A illustrates one embodiment of a system comprising a host comprising a first CXL port, a retimer (such as a flit-aware CXL-UALink retimer or a hybrid multi-protocol retimer), a bridge (that may be an RPU), and a device comprising a second CXL port. The retimer may be configured to communicate with the host via a first physical layer (PHY.1), such as a Flex Bus PHY, a UCIe PHY, or an NVLink-C2C PHY, and may be further configured to communicate with the bridge via a second physical layer (PHY.2) based on IEEE 802.3 PMA, such as a UALink PHY, an NVLink PHY, or an Ethernet PHY. The bridge may be configured to receive, via a third physical layer (PHY.3) based on IEEE 802.3 PMA (such as a UALink PHY, an NVLink PHY, or an Ethernet PHY), transmissions comprising data indicative of CXL opcodes and physical addresses, wherein the bridge may be further configured to translate the data to CXL requests, such as CXL.mem M2SReq, and send the translated CXL request to the device, via a fourth PHY (PHY.4, such as a Flex Bus PHY, a UCIe PHY, or an NVLink-C2C PHY), enabling the host to read the memory coupled to the device.

In some embodiments, the transmissions comprising data indicative of CXL opcodes and physical addresses may include tunneling or encapsulation of CXL-related traffic, such as tunneling or encapsulation of CXL PDUs, CXL messages, CXL requests, CXL responses, CXL.io TLPs, or CXL flits, over a carrier protocol such as UALink, UPLI, NVLink, or Ethernet, including Scale Up Ethernet (SUE) or Ultra Ethernet Transport (UET). The tunneling or encapsulation of CXL-related traffic over the carrier protocol may be performed from different layers of the CXL protocol stack to different layers of the carrier protocol stack, such as (1) tunneling or encapsulation of CXL transaction layer PDUs, e.g., CXL messages or TLPs, over UALink UPLI protocol layer PDUs, e.g., UPLI write requests or UPLI requests utilizing vendor-defined commands, (2) tunneling or encapsulation of CXL messages or TLPs over UALink Transaction Layer (TL) Flits, such as over 64-Byte UALink TL Flits, (3) tunneling or encapsulation of CXL messages or TLPs over UALink Data Link Layer (DL) Flits, such as 640-Byte UALink DL Flits, or (4) tunneling or encapsulation of CXL flits in/over carrier protocol flits, such as over UALink flits (e.g., UALink TL flits or UALink DL flits), or over NVLink flits.

In still some embodiments, one or more CXL flits may be tunneled over or encapsulated in a carrier protocol flit, such as over a UALink flit or an NVLink flit. In still other embodiments, the bridge may be implemented in a chiplet inside an IC package of the device, whereas in other embodiments, the bridge may be implemented as a functional block on the same silicon die with the memory controller, or may be split between dies or chiplets. Alternatively, the bridge may be implemented as a discrete component coupled to the device. Additionally or alternatively, the bridge may be included in a switch, such as a UALink switch, or a CXL switch.

FIG. 67B illustrates one embodiment of a TFD demonstrating CXL communications between a host and a device utilizing a PHY based on IEEE 802.3 PMA, such as a UALink PHY, an NVLink PHY, or an Ethernet PHY. In some embodiments, CXL requests sent by the host, may be converted or translated by a retimer, such as a CXL-UALink retimer, to transmissions that may include data indicative of CXL opcodes and physical addresses, which may be packed in UALink flits. In other embodiments, the data indicative of CXL opcodes and physical addresses may be packed in NVLink flits. CXL responses from the device may be converted or translated by the bridge to transmissions that may be packed in UALink flits and sent towards the host. Optionally, the system may utilize configuration cycles for discovery, enumeration, and initialization of the device.

Figures 68A, 68B:
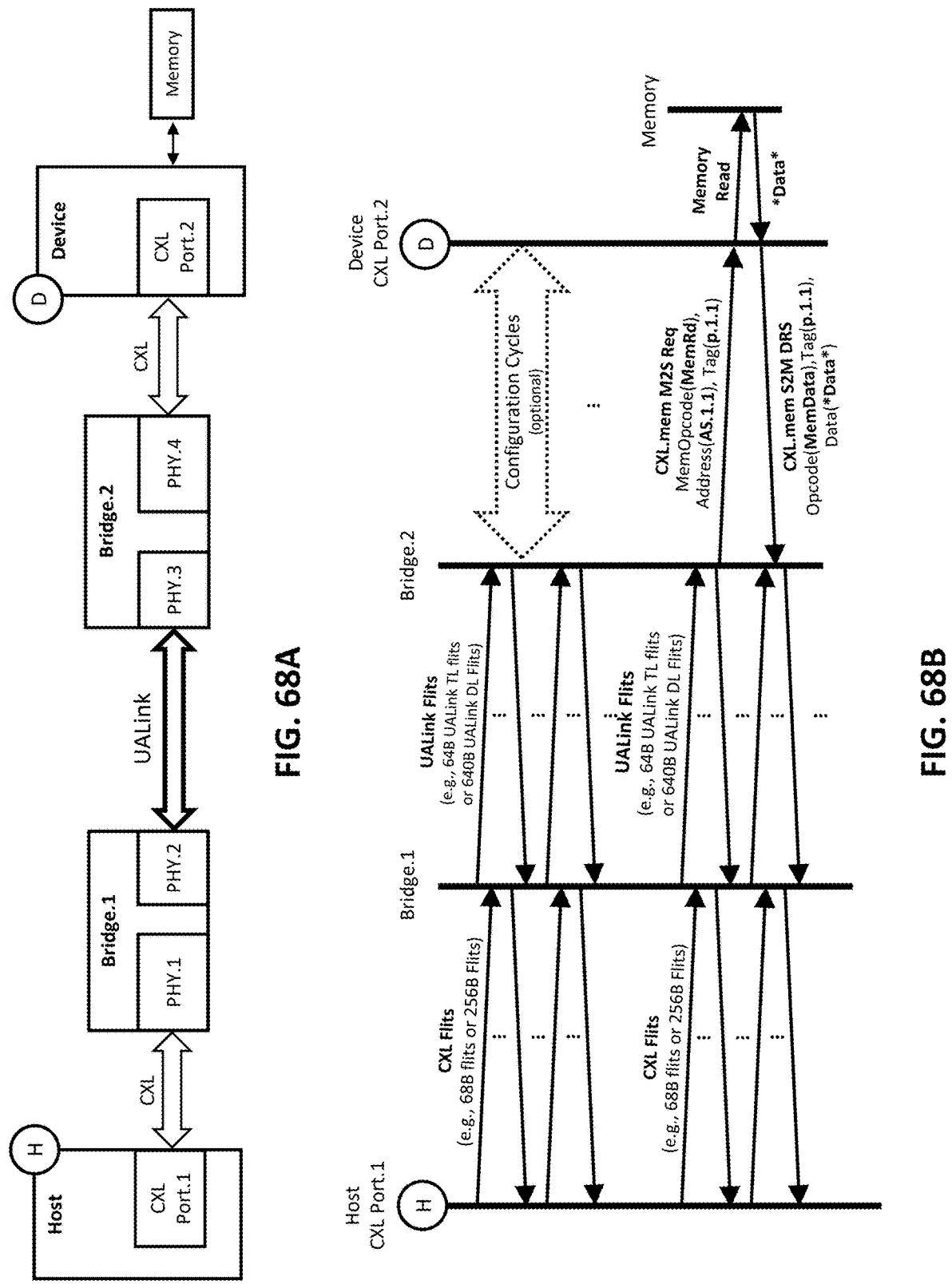

FIG. 68A illustrates one embodiment of a system comprising a host with a first CXL port coupled to Bridge.1 via a first PHY (PHY.1), which may be implemented as a Flex Bus PHY, a UCIe PHY, or an NVLink-C2C PHY. Bridge.1 communicates with Bridge.2 via a second PHY (PHY.2) which may be based on IEEE 802.3 PMA, and may utilize a UALink PHY, an NVLink PHY, or an Ethernet PHY. Bridge.2 is coupled to a device comprising a second CXL port, via a fourth PHY (PHY.4), which may be implemented as a Flex Bus PHY, a UCIe PHY, or an NVLink-C2C PHY. In this embodiment, Bridge.1 may potentially provide bridge-specific features while maintaining the ability to transport CXL protocol data units across the physical layer based on IEEE 802.3 PMA between the bridges.

FIG. 68B illustrates one embodiment of a TFD demonstrating a translation mechanism between CXL flits and UALink flits, showing how CXL protocol data units (PDUs) may be packed, encapsulated or translated for transmission over UALink physical layers, such as IEEE 802.3-based UALink physical layers, or PCIe-based UALink physical layers. The embodiment shows CXL flits, which may comprise 68-byte flits or 256-byte flits depending on the CXL protocol configuration, being translated to UALink flits without specifying the particular protocol layer at which the translation occurs, as the translation may be performed at the transaction layer, link layer, or flit level depending on the implementation requirements. The translation mechanism enables CXL transactions to traverse a UALink infrastructure while maintaining protocol semantics, wherein the specific methodology for translating between the flit formats may vary based on factors such as bandwidth optimization, latency requirements, and protocol compatibility constraints.

FIG. 69A illustrates one embodiment of a system comprising a first entity (Entity.1), such as an accelerator, a processor, a GPU, a first switch (Switch.1), or a UALink device, wherein the first entity may include a Root Complex (RC) comprising a Root Port (RP), and may further include a first RPU (RPU.1) comprising a first PCIe port (PCIe Port.1) and a first UALink port (UALink Port.1). The system may further include an optional third switch (Switch.3), such as a UALink switch, and a second entity (Entity.2), such as a bridge, a gateway, a second switch (Switch.2), a UALink controller, a Network Interface Card (NIC), e.g., a UALink NIC, a SmartNIC, e.g., a UALink SmartNIC, or a Data Processing Unit (DPU), e.g., a UALink DPU. The second entity may include a second RPU (RPU.2) comprising a second PCIe port (PCIe Port.2) and a second UALink port (UALink Port.2). The system further includes a third entity (Entity.3), such as a PCIe device, a PCIe NIC, or an NVMe SSD. The first and second RPUs may enable the first entity to communicate with the third entity according to a PCIe-based protocol, via the second entity and optionally via the third switch, such as by translating between PCIe-based PDUs (such as PCIe TLPs, requests, messages, or flits) and transmissions comprising data indicative of PCIe PDUs, such as transmissions comprising data indicative of PCIe TLP types and physical addresses, wherein the transmissions utilize UALink PDUs (such as UPLI messages or UALink flits, e.g., TL Flits, DL Flits, or Payload Flits), which may be sent and received via the first and second UALink ports, optionally enabling the first entity to access resources of the third entity, such as registers or memory. In some embodiments, translating between the PCIe-based PDUs and the transmissions utilizing UALink PDUs may enable PCIe over UALink, such as via PCIe tunneling over UALink, e.g., tunneling of PCIe requests and completions over UALink, tunneling of PCIe TLPs over UALink, tunneling of PCIe-based PDUs over UALink, or tunneling of PCIe transactions over UALink.

In still some embodiments, the first UALink port and the second UALink port may utilize the same physical layer technology, such as a physical layer based on IEEE 802.3 PMA (e.g., UALink 200 PHY based on 802.3 Ethernet PHY), or a physical layer based on PCIe (e.g., UALink 128G based on PCIe 6.3), wherein in other embodiments the first UALink port and the second UALink port may utilize different physical layer technologies. The first RPU may be implemented in a chiplet inside an IC package of the first entity, as a functional block on the same silicon die with the RP, or may be split between dies or chiplets. Alternatively, the first RPU may be implemented as a discrete component coupled to the second entity. Additionally or alternatively, the first RPU may be included in a switch, such as in a UALink switch. In still some embodiments, the first entity may be a first switch, such as a first PCIe switch comprising the first UALink port, the second entity may be a second switch, such as a second PCIe switch comprising the second UALink port, wherein the PCIe traffic between the first PCIe switch and the second PCIe switch may be tunneled over UALink, and wherein the first PCIe switch and the second PCIe switch may optionally be coupled by a the third switch, that may be a UALink switch. In another embodiment, the first entity may be a first switch, such as a first UALink switch comprising the first PCIe Port (PCIe Port.1), the second entity may be a second switch, such as a second UALink switch comprising the second PCIe Port (PCIe Port.2), wherein the PCIe traffic between the RP and the third entity (e.g., a PCIe device) may be tunneled over UALink via the second UALink switch and optionally via the third switch, such as a third UALink switch.

FIG. 69B illustrates one embodiment of a TFD demonstrating a PCIe communication between a first entity (Entity.1), such as a processor comprising a Root Port (RP), and a third entity (Entity.3), such as a PCIe device, wherein the PCIe communication may be tunneled over UALink. The first entity may initiate a read from the third entity, such as by sending a first PCIe UIO Memory Read Request (UI-OMRd) comprising Address(AS.1.1) and Tag(w.1.1) via the RP. The first RPU (RPU.1), which may reside in the first entity, may be configured to receive the first PCIe UIO Memory Read Request (UIOMRd) and translate it to first transmission(s) comprising data indicative of PCIe PDU, such as transmission(s) comprising data indicative of TLP types and physical addresses, wherein the first RPU may send the first transmission(s) which may utilize one or more UALink PDUs (such as UPLI messages or UALink flits, e.g., TL Flits, DL Flits, or Payload Flits), to a second RPU (RPU.2), which may reside in a second entity, such as a bridge or a gateway. The first RPU may be further configured to translate the first PCIe UIO Memory Read Request (UIOMRd) to the first transmission(s) in a manner that enables reconstruction of the first PCIe UIO Memory Read Request (UIOMRd) at the second RPU with minimal (or no) modifications, effectively tunneling the first PCIe UIO Memory Read Request (UIOMRd) over UALink. For example, the first RPU may be configured to encapsulate the first PCIe UIO Memory Read Request (UIOMRd) into a UPLI Write Message, and send the UPLI Write Message to the second RPU, wherein the PCIe request may be extracted from the UPLI Write Message such as by decapsulation. Additionally or alternatively, the first RPU may be configured to encapsulate a PCIe flit comprising the first PCIe UIO Memory Read Request (UIOMRd) into a UPLI Write Message, and send the UPLI Write Message to the second RPU, wherein the PCIe flit comprising the first PCIe UIO Memory Read Request (UIOMRd) may be extracted from the UPLI Write Message such as by decapsulation.

The second RPU may receive the first transmission(s) and translate it to a second PCIe UIO Memory Read Request (UIOMRd) comprising Address(AS.1.1) and Tag(w.1.1), and send the second PCIe UIO Memory Read Request (UIOMRd) to the third entity. In some embodiments, the first PCIe UIO Memory Read Request (UIOMRd) and the second PCIe UIO Memory Read Request (UIOMRd) may be identical, whereas in other embodiments, the second RPU may construct the second PCIe UIO Memory Read Request (UIOMRd) based on the first PCIe UIO Memory Read Request (UIOMRd) with variations such as utilizing a different TLP type (e.g., MRd instead of UIOMRd), utilizing a different tag namespace, e.g., Tag(q.2.1) instead of Tag (w.1.1), or utilizing address translations, e.g., Address (AS.2.1) instead of Address(AS.1.1). The third entity may respond to the second PCIe UIO Memory Read Request (UIOMRd) by sending a first PCIe UIO Read Completion with Data (UIORdCpID) comprising Tag(w.1.1) and Data-Payload(*Data*) to the second RPU, wherein the second RPU may be configured to translate the first PCIe UIO Read Completion with Data (UIORdCpID) to second transmission(s) comprising data indicative of PCIe PDU, and send the second transmission(s) to the first RPU. The first RPU may be further configured to receive the second transmission(s) and translate it to a second PCIe UIO Read Completion with Data (UIORdCpID) comprising Tag (w.1.1) and DataPayload(*Data*), and send the second PCIe UIO Read Completion with Data (UIORdCpID) to the RP.

In some embodiments, the first PCIe UIO Read Completion with Data (UIORdCpID) and the second PCIe UIO Read Completion with Data (UIORdCpID) may be identical, whereas in other embodiments, the first RPU may construct the second PCIe UIO Read Completion with Data (UIORdCpID) based on the first PCIe UIO Read Completion with Data (UIORdCpID) with variations, such as updating fields, e.g., reserved fields or fields treated as reserved, such as EP, or CDL that may represent CXL device load for QoS telemetry, where this field may be treated as reserved for use cases not covered by CXL. Additionally or alternatively, the first RPU may alter the structure of the second PCIe UIO Read Completion with Data (UIORdCpID) compared to the original first PCIe UIO Read Completion with Data (UIORdCpID), such as by adding a TLP trailer, such as for supporting Transaction Layer end-to-end 32-bit CRC (ECRC) that may cover the path between the second RPU and the RP.

In still some embodiments, the second PCIe UIO Memory Read Request (UIOMRd) may be different from the first PCIe UIO Memory Read Request (UIOMRd) due to differences in protocol revisions, such as when the first RPU communicates with the RP according to a first PCIe specification revision, whereas the second RPU communicates with the third entity according to a second PCIe specification revision (that may be different than the first PCIe specification revision), or such as when translation is required between Flit Mode (FM) and Non-Flit Mode (NFM) TLP formats. Similarly, the second PCIe UIO Read Completion with Data (UIORdCpID) may be different from the first PCIe UIO Read Completion with Data (UIORdCpID) due to differences in protocol revisions, or such as when translation is required between FM and NFM TLP formats. In some embodiments the first RPU and the second RPU may be coupled by a switch, such as a UALink switch.

FIG. 70A illustrates one embodiment of a system wherein a host comprising a first CXL port is coupled to Bridge.1 via a first PHY (PHY.1), which may be implemented as a Flex Bus PHY, a UCIe PHY, or an NVLink-C2C PHY. Bridge.1 communicating with Bridge.2 via a second PHY (PHY.2) which may be based on IEEE 802.3 PMA and may include an NVLink PHY instead of a UALink PHY. Bridge.2 is coupled via a fourth PHY (PHY.4) to a device comprising a second CXL port. Using NVLink PHY for inter-bridge communication demonstrates the flexibility of the bridge architecture to support different high-speed interconnect protocols while maintaining CXL protocol compatibility at the host and device interfaces.

FIG. 70B illustrates one embodiment of a TFD depicting tunneling of CXL.io transactions between a host and a device through bridge.1 and bridge.2, utilizing physical layers based on IEEE 802.3 PMA. The TFD shows CXL.io Memory Read Request (MRd) transmitted from the host through bridge.1, which translates or encapsulates the request for transmission to bridge.2 over NVLink flits, wherein bridge.2 performs the necessary translations to forward the request as a CXL.io transaction to the device 'D', with the corresponding CXL.io Completion with Data (CpID) response following the reverse path from the device through bridge.2 and bridge.1 back to the host 'H'.

FIG. 71A illustrates one embodiment of a system comprising a first entity (Entity.1), such as a GPU, a CPU, a processor, an accelerator, a first switch (Switch.1), or an NVLink device, wherein the first entity may include a Root Complex (RC) comprising a Root Port (RP), and may further include a first RPU (RPU.1) comprising a first CXL interface (CXL Interface.1) and a first NVLink Interface (NVLink Interface.1). The system may further include an optional third switch (Switch.3), such as an NVLink switch, and a second entity (Entity.2), such as a bridge, a gateway, a second switch (Switch.2), an NVLink controller, a Network Interface Card (NIC), e.g., an NVLink NIC, a Smart-NIC, e.g., an NVLink SmartNIC, or a Data Processing Unit (DPU), e.g., an NVLink DPU. The second entity may include a second RPU (RPU.2) comprising a second CXL interface (CXL Interface.2) and a second NVLink Interface (NVLink Interface.2). The system further includes a third entity (Entity.3), such as a CXL device, a memory expander, a memory pool, or a GFD. The first and second RPUs may enable the first entity to communicate with the third entity according to a CXL-based protocol, via the second entity and optionally via the third switch, such as by translating between CXL-based PDUs (such as TLPs, requests, messages, or flits) and transmissions comprising data indicative of CXL PDUs, such as transmissions comprising data indicative of CXL opcodes and physical addresses, wherein the transmissions utilize NVLink PDUs (such as NVLink requests, NVLink packets, or NVLink flits), which may be sent and received via the first and second NVLink interfaces, optionally enabling the first entity to access resources of the third entity, such as registers or memory.

In some embodiments, translating between the CXL-based PDUs and the transmissions utilizing NVLink PDUs may enable CXL over NVLink, such as via CXL tunneling over NVLink, e.g., tunneling of CXL.mem requests and responses over NVLink, tunneling of CXL.io TLPs over NVLink, tunneling of CXL-based PDUs over NVLink, or tunneling of CXL transactions over NVLink. In still some embodiments, the first NVLink Interface and the second NVLink Interface may utilize the same physical layer technology, wherein in other embodiments the first NVLink interface and the second NVLink interface may utilize different physical layer technologies. The first RPU may be implemented in a chiplet inside an IC package of the first entity, as a functional block on the same silicon die with the RP, or may be split between dies or chiplets. Alternatively, the first RPU may be implemented as a discrete component coupled to the second entity. Additionally or alternatively, the first RPU may be included in a switch, such as in an NVLink switch.

In still some embodiments, the first entity may be a first switch, such as a first CXL switch comprising the first NVLink interface, the second entity may be a second switch, such as a second CXL switch comprising the second NVLink interface, wherein the CXL traffic between the first CXL switch and the second CXL switch may be tunneled over NVLink, and wherein the first CXL switch and the second CXL switch may optionally be coupled by the third switch, that may be an NVLink switch. In another embodiment, the first entity may be a first switch, such as a first NVLink switch comprising the first CXL interface (CLX Interface.1), the second entity may be a second switch, such as a second NVLink switch comprising the second CXL Interface (CXL Interface.2), wherein the CXL traffic between the RP and the third entity (e.g., a CXL device) may be tunneled over NVLink via the second NVLink switch and optionally via the third switch, such as a third NVLink switch.

FIG. 71B illustrates one embodiment of a TFD demonstrating a CXL communication between a first entity (Entity.1), such as a processor comprising a Root Port (RP), and a third entity (Entity.3), such as a CXL device, wherein the CXL communication may be tunneled over NVLink. The first entity may initiate a read from the third entity, such as by sending a first CXL.mem M2S Request comprising MemOpcode(MemRd), Address(AS.1.1), and Tag(p.1.1) via the RP. The first RPU (RPU.1), which may reside in the first entity, may be configured to receive the first CXL.mem M2S Request and translate it to first transmission(s) comprising data indicative of CXL PDU, such as transmission(s) comprising data indicative of CXL opcodes and physical addresses, wherein the first RPU may send the first transmission(s) which may utilize one or more NVLink PDUs (such as NVLink requests, NVLink packets, or NVLink flits), to a second RPU (RPU.2), which may reside in a second entity, such as a bridge or a gateway. The first RPU may be further configured to translate the first CXL.mem M2S Request to the first transmission(s) in a manner that enables reconstruction of the first CXL.mem M2S Request at the second RPU with minimal (or no) modifications, effectively tunneling the first CXL.mem M2S Request over NVLink. For example, the first RPU may be configured to encapsulate the first CXL.mem M2S Request into an NVLink request, such as an NVLink write request, and send the NVLink request to the second RPU, wherein the CXL request may be extracted from the NVLink request such as by decapsulation. Additionally or alternatively, the first RPU may be configured to encapsulate a CXL flit comprising the first CXL.mem M2S Request into an NVLink request, such as an NVLink write request, and send the NVLink request to the second RPU, wherein the CXL flit comprising the first CXL.mem M2S Request may be extracted from the NVLink request such as by decapsulation. The second RPU may receive the first transmission(s) and translate it to a second CXL.mem M2S Request comprising MemOpcode (MemRd), Address(AS.1.1), and Tag(p.1.1), and send the second CXL.mem M2S Request to the third entity. In some embodiments, the first CXL.mem M2S Request and the second CXL.mem M2S Request may be identical, whereas in other embodiments, the second RPU may construct the second CXL.mem M2S Request based on the first CXL.mem M2S Request with variations such as utilizing a different opcode (e.g., MemRdData instead of MemRd), utilizing a different tag namespace, e.g., Tag(q.2.1) instead of Tag (p.1.1), or utilizing address translations, e.g., Address (AS.2.1) instead of Address(AS.1.1).

The third entity may respond to the second CXL.mem M2S Request by sending a first CXL.mem S2M DRS comprising Opcode(MemData), Tag(p.1.1), and Data (*Data*) to the second RPU, wherein the second RPU may be configured to translate the first CXL.mem S2M DRS to second transmission(s) comprising data indicative of CXL PDU, and send the second transmission(s) to the first RPU. The first RPU may be further configured to receive the second transmission(s) and translate it to a second CXL.mem S2M DRS comprising Opcode(MemData), Tag (p.1.1), and Data(*Data*), and send the second CXL.mem S2M DRS to the RP. In some embodiments, the first CXL.mem S2M DRS and the second CXL.mem S2M DRS may be identical, whereas in other embodiments, the first RPU may construct the second CXL.mem S2M DRS based on the first CXL.mem S2M DRS with variations, such as updating fields, e.g., Device Load (DevLoad), MetaField, MetaValue, TRP, Opcode, or reserved fields. Additionally or alternatively, the first RPU may alter the structure of the second CXL.mem S2M DRS compared to the original first CXL.mem S2M DRS, such as by adding a trailer.

In still some embodiments, the second CXL.mem M2S Request may be different from the first CXL.mem M2S Request due to differences in protocol revisions, such as when the first RPU communicates with the RP according to CXL 1.1, whereas the second RPU communicates with the third entity according to CXL 3.2, or such as when message format conversion is required between HBR and PBR formats, e.g., when the second RPU utilizes PBR mode or PBR messages, whereas, for example, the RP is associated with an HBR host. Similarly, the second CXL.mem S2M DRS may be different from the first CXL.mem S2M DRS due to differences in protocol revisions, or such as when message format conversion is required between HBR and PBR formats. In some embodiments the first RPU and the second RPU may be coupled by a switch, such as a UALink switch.

FIG. 72A illustrates one embodiment of a system comprising a first entity (Entity.1), such as a GPU, a CPU, a processor, an accelerator, a first switch (Switch.1), or an NVLink device, wherein the first entity may include a Root Complex (RC) comprising a Root Port (RP), and may further include a first RPU (RPU.1) comprising a first PCIe port (PCIe Port.1) and a first NVLink Interface (NVLink Interface.1). The system may further include an optional third switch (Switch.3), such as a NVLink switch, and a second entity (Entity.2), such as a bridge, a gateway, a second switch (Switch.2), an NVLink controller, a Network Interface Card (NIC), e.g., an NVLink NIC, a SmartNIC, e.g., an NVLink SmartNIC, or a Data Processing Unit (DPU), e.g., an NVLink DPU. The second entity may include a second RPU (RPU.2) comprising a second PCIe port (PCIe Port.2) and a second NVLink Interface (NVLink Interface.2). The system further includes a third entity (Entity.3), such as a PCIe device, a PCIe NIC, or an NVMe SSD. The first and second RPUs may enable the first entity to communicate with the third entity according to a PCIe-based protocol, via the second entity and optionally via the third switch, such as by translating between PCIe-based PDUs (such as PCIe TLPs, requests, messages, or flits) and transmissions comprising data indicative of PCIe PDUs, such as transmissions comprising data indicative of PCIe TLP types and physical addresses, wherein the transmissions utilize NVLink PDUs (such as NVLink requests, NVLink packets, or NVLink flits), which may be sent and received via the first and second NVLink interfaces, optionally enabling the first entity to access resources of the third entity, such as registers or memory.

In some embodiments, translating between the PCIe-based PDUs and the transmissions utilizing NVLink PDUs may enable PCIe over NVLink, such as via PCIe tunneling over NVLink, e.g., tunneling of PCIe requests and completions over NVLink, tunneling of PCIe TLPs over NVLink, tunneling of PCIe-based PDUs over NVLink, or tunneling of PCIe transactions over NVLink. In still some embodiments, the first NVLink Interface and the second NVLink Interface may utilize the same physical layer technology, wherein in other embodiments the first NVLink interface and the second NVLink interface may utilize different physical layer technologies. The first RPU may be implemented in a chiplet inside an IC package of the first entity, as a functional block on the same silicon die with the RP, or may be split between dies or chiplets. Alternatively, the first RPU may be implemented as a discrete component coupled to the second entity. Additionally or alternatively, the first RPU may be included in a switch, such as in an NVLink switch.

In still some embodiments, the first entity may be a first switch, such as a first PCIe switch comprising the first NVLink interface, the second entity may be a second switch, such as a second PCIe switch comprising the second NVLink interface, wherein the PCIe traffic between the first PCIe switch and the second PCIe switch may be tunneled over NVLink, and wherein the first PCIe switch and the second PCIe switch may optionally be coupled by the third switch, that may be an NVLink switch. In another embodiment, the first entity may be a first switch, such as a first NVLink switch comprising the first PCIe Port (PCIe Port.1), the second entity may be a second switch, such as a second NVLink switch comprising the second PCIe Port (PCIe Port.2), wherein the PCIe traffic between the RP and the third entity (e.g., a PCIe device) may be tunneled over NVLink via the second NVLink switch and optionally via the third switch, such as a third NVLink switch.

FIG. 72B illustrates one embodiment of a TFD demonstrating PCIe communication between a first entity (Entity.1), such as a processor comprising a Root Port (RP), and a third entity (Entity.3), such as a PCIe device, wherein the PCIe communication may be tunneled over NVLink. The first entity may initiate a read from the third entity, such as by sending a first PCIe UIO Memory Read Request (UIOMRd) comprising Address(AS.1.1) and Tag(w.1.1) via the RP. The first RPU (RPU.1), which may reside in the first entity, may be configured to receive the first PCIe UIO Memory Read Request (UIOMRd) and translate it to first transmission(s) comprising data indicative of PCIe PDU, such as transmission(s) comprising data indicative of TLP types and physical addresses, wherein the first RPU may send the first transmission(s) which may utilize one or more NVLink PDUs (such as NVLink requests, NVLink packets, or NVLink flits), to a second RPU (RPU.2), which may reside in a second entity, such as a bridge or a gateway. The first RPU may be further configured to translate the first PCIe UIO Memory Read Request (UIOMRd) to the first transmission(s) in a manner that enables reconstruction of the first PCIe UIO Memory Read Request (UIOMRd) at the second RPU with minimal (or no) modifications, effectively tunneling the first PCIe UIO Memory Read Request (UIOMRd) over NVLink. For example, the first RPU may be configured to encapsulate the first PCIe UIO Memory Read Request (UIOMRd) into an NVLink request, such as an NVLink write request, and send the NVLink request to the second RPU, wherein the PCIe request may be extracted from the NVLink request such as by decapsulation. Additionally or alternatively, the first RPU may be configured to encapsulate a PCIe flit comprising the first PCIe UIO Memory Read Request (UIOMRd) into an NVLink request, such as an NVLink write request, and send the NVLink request to the second RPU, wherein the PCIe flit comprising the first PCIe UIO Memory Read Request (UIOMRd) may be extracted from the NVLink request such as by decapsulation.

The second RPU may receive the first transmission(s) and translate it to a second PCIe UIO Memory Read Request (UIOMRd) comprising Address(AS.1.1) and Tag(w.1.1), and send the second PCIe UIO Memory Read Request (UIOMRd) to the third entity. In some embodiments, the first PCIe UIO Memory Read Request (UIOMRd) and the second PCIe UIO Memory Read Request (UIOMRd) may be identical, whereas in other embodiments, the second RPU may construct the second PCIe UIO Memory Read Request (UIOMRd) based on the first PCIe UIO Memory Read Request (UIOMRd) with variations such as utilizing a different TLP type (e.g., MRd instead of UIOMRd), utilizing a different tag namespace, e.g., Tag(q.2.1) instead of Tag (w.1.1), or utilizing address translations, e.g., Address (AS.2.1) instead of Address(AS.1.1). The third entity may respond to the second PCIe UIO Memory Read Request (UIOMRd) by sending a first PCIe UIO Read Completion with Data (UIORdCpID) comprising Tag(w.1.1) and Data-Payload(*Data*) to the second RPU, wherein the second RPU may be configured to translate the first PCIe UIO Read Completion with Data (UIORdCpID) to second transmission(s) comprising data indicative of PCIe PDU, and send the second transmission(s) to the first RPU. The first RPU may be further configured to receive the second transmission(s) and translate it to a second PCIe UIO Read Completion with Data (UIORdCpID) comprising Tag (w.1.1) and DataPayload(*Data*), and send the second PCIe UIO Read Completion with Data (UIORdCpID) to the RP.

In some embodiments, the first PCIe UIO Read Completion with Data (UIORdCpID) and the second PCIe UIO Read Completion with Data (UIORdCpID) may be identical, whereas in other embodiments, the first RPU may construct the second PCIe UIO Read Completion with Data (UIORdCpID) based on the first PCIe UIO Read Completion with Data (UIORdCpID) with variations, such as updating fields, e.g., reserved fields or fields treated as reserved, such as EP, or CDL that may represent CXL device load for QoS telemetry, where this field may be treated as reserved for use cases not covered by CXL. Additionally or alternatively, the first RPU may alter the structure of the second PCIe UIO Read Completion with Data (UIORdCpID) compared to the original first PCIe UIO Read Completion with Data (UIORdCpID), such as by adding a TLP trailer, such as for supporting Transaction Layer end-to-end 32-bit CRC (ECRC) that may cover the path between the second RPU and the RP.

In still some embodiments, the second PCIe UIO Memory Read Request (UIOMRd) may be different from the first PCIe UIO Memory Read Request (UIOMRd) due to differences in protocol revisions, such as when the first RPU communicates with the RP according to a first PCIe specification revision, whereas the second RPU communicates with the third entity according to a second PCIe specification revision (that may be different than the first PCIe specification revision), or such as when translation is required between Flit Mode (FM) and Non-Flit Mode (NFM) TLP formats. Similarly, the second PCIe UIO Read Completion with Data (UIORdCpID) may be different from the first PCIe UIO Read Completion with Data (UIORdCpID) due to differences in protocol revisions, or such as when translation is required between FM and NFM TLP formats. In some embodiments the first RPU and the second RPU may be coupled by a switch, such as an NVLink switch.

Figure 56:
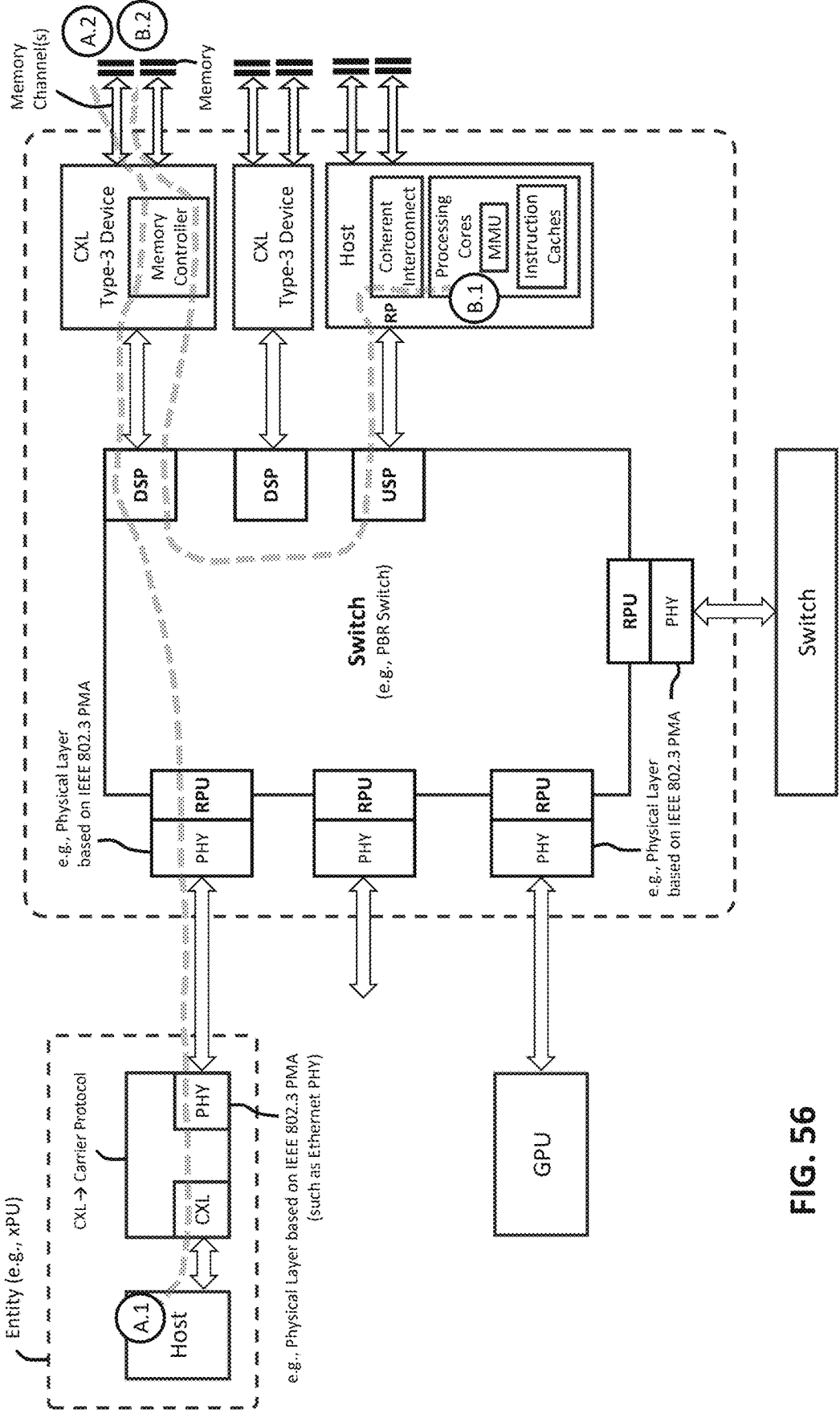
FIG. 56 illustrates one embodiment of a multi-host memory pooling or sharing utilizing a switch-based topology with physical layers based on IEEE 802.3 PMA.

FIG. 56 illustrates one embodiment of a multi-host memory pooling or sharing utilizing a switch-based topology with physical layers based on IEEE 802.3 PMA. The system includes at least two distinct paths for hosts to access memory resources through the same memory channels. The first path shows an entity, such as an xPU, with a host designated as A.1 that connects via CXL, carried on a carrier protocol interface, which transmits over a physical layer based on IEEE 802.3 PMA (which may utilize Ethernet PHY) to an RPU. RPUs are coupled to or included in a switch, which may be a PBR switch, enabling scalable connectivity. The switch includes downstream ports (DSPs) that are coupled to CXL Type-3 devices containing memory controllers and associated memory channels coupled to memories (denoted as A.2 and B.2), allowing for distributed memory resources. The second path shows the switch's upstream port (USP) coupled through a root port (RP) to a host system (denoted as B.1) that includes a coherent interconnect, processing cores with MMU functionality, and instruction caches. This dual-path coupling enables the hostB.1 to access memory through its connection via the switch's USP and RP, while simultaneously allowing external entities like the xPU (host A.1) to access the same memory resources through the RPU and switch infrastructure. A GPU may also connect to the switch through its own RPU and PHY based on IEEE 802.3 PMA, demonstrating the system's capability to integrate heterogeneous computing elements.

Figures 57A, 57B:
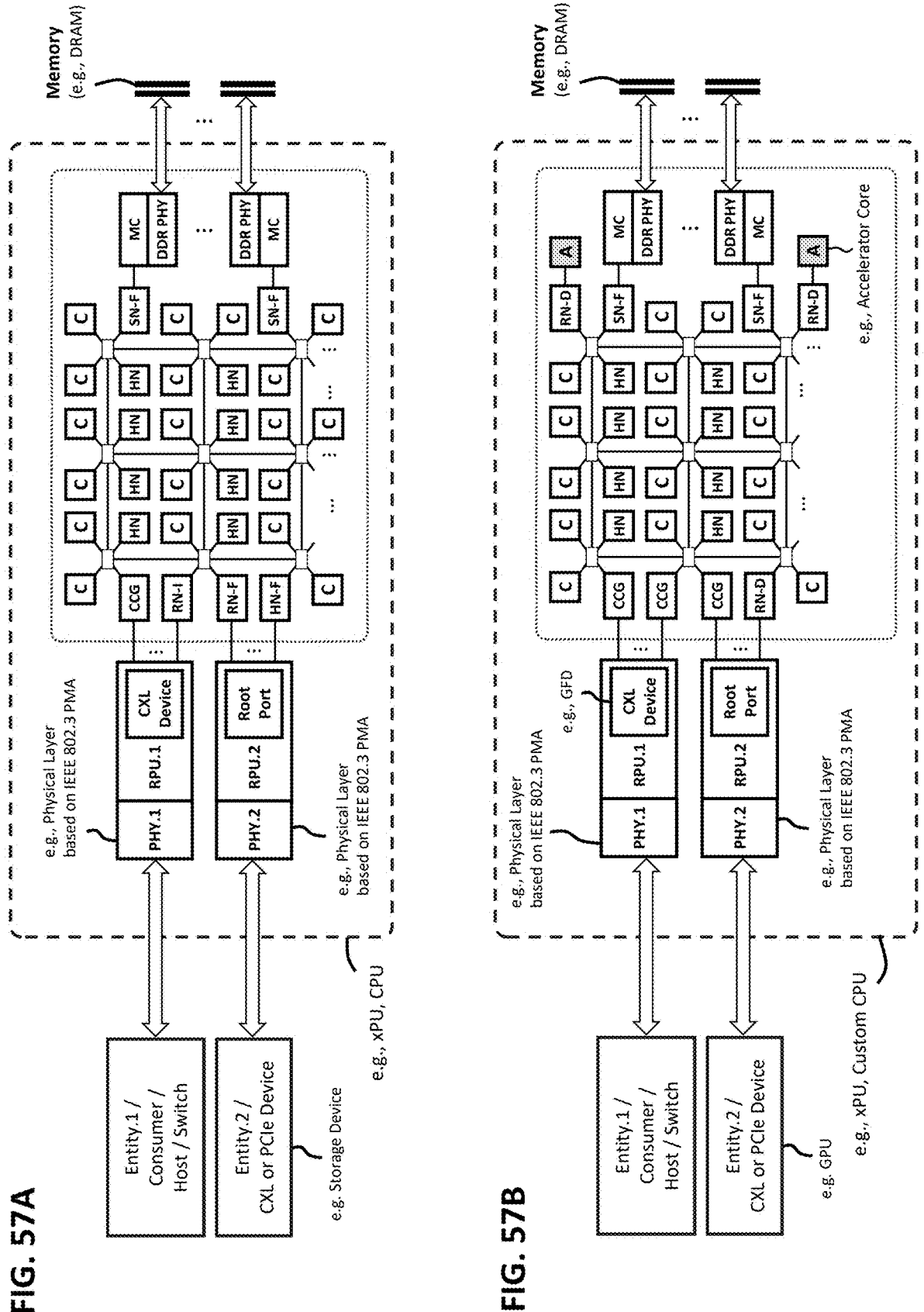
FIG. 57A illustrates one embodiment of a system comprising a processor having multiple interfaces.
FIG. 57B illustrates one embodiment of a system comprising a processor capable of servicing external requests through CCGs optimized for handling CXL.mem traffic.

FIG. 57A illustrates one embodiment of a system comprising a processor having multiple interfaces that may utilize a physical layer based on IEEE 802.3 PMA. A first RPU includes or is coupled to a CXL device that is coupled to both a CCG node for handling coherent CXL.mem and/or CXL.cache transactions and an RN-D node for handling non-coherent CXL.io transactions. The system may optionally couple the first RPU to the CCG over a CXS interface, providing a path for coherent communications. A second RPU includes or is coupled to a Root Port that is coupled to both a fully coherent request nodes (RN-F) and to a fully coherent home nodes (HN-F) that may be included within a gateway or a bridge node structure, enabling bidirectional coherent access wherein an external entity, such as a GPU or a storage device may read from the processor's DRAM through the RN-F node; and in the opposite direction, the processor cores may read from the GPU's HBM or from buffers in the storage device through the HN-F node.

FIG. 57B illustrates one embodiment of a system comprising an XPU or a CPU, which may be a custom CPU design, incorporating accelerator cores and multiple interfaces that may utilize a physical layer based on IEEE 802.3 PMA. A Global Fabric-Attached Memory (G-FAM) Device (GFD), utilized by a first RPU, may operate as a specialized CXL device, and may support only CXL.mem transactions, allowing it to service the external requests through CCGs that are optimized for handling CXL.mem traffic, thereby simplifying the design by eliminating the need for separate CXL.io handling paths typically managed by RN-D or RN-I nodes. The system further includes an optional second RPU that includes or is coupled to a Root Port, coupled to a coherent interconnect via a CCG and an I/O-Coherent Request Node with DVM support (RN-D), wherein the RN-D may handle CXL.io or PCIe traffic.

It is noted that a line in a mesh drawing may denote more than one port, interface, or link. For example, a single line connecting a CCG to an XP may represent two ports, such as one port for a Request Agent (RA) proxy and another port for a Home Agent (HA) proxy.

FIG. 73A illustrates one embodiment of a system that utilizes protocol translations between NVLink-based interfaces and a coherent interconnect based on a CHI protocol. The NVLink connections are coupled via an RPU to an interconnect component such as a crosspoint (e.g., XP), which may serve as a fundamental building block of a coherent interconnect, providing switching or routing of CHI messages between participating elements such as request nodes, home nodes, gateways, protocol bridges, or other elements that connect to the coherent interconnect. The RPU may translate directly between an NVLink protocol utilized by an entity, such as a GPU or a CPU, to a CHI protocol utilized by the interconnect component, possibly eliminating intermediate protocol translations. Alternatively, the RPU may translate between an NVLink protocol and a CHI protocol by utilizing intermediate protocols such as Advance Extensible Interface (AXI), or AXI Coherency Extensions Lite (ACE-Lite), or by utilizing streaming interface protocols such as Credited eXtensible Stream (CXS). Direct protocol translation from NVLink to CHI may provide high-performance connectivity between a GPU coupled to the NVLink interface and memory coupled to the coherent interconnect, a performance gain that may be reflected via lower-latency accesses to memory and higher-bandwidth of reads and writes.

FIG. 73B illustrates one embodiment of a transaction flow diagram (TFD) showing the translation of an NVLink transaction to a CHI transaction. An entity, such as a GPU or a CPU, initiates an NVLink read request, that is received by the RPU via the NVLink interface. The RPU translates the NVLink request to a CHI request carrying a ReadOnce opcode, optionally translating the physical address (AS.1.1) associated with the NVLink protocol to a physical address (AS.2.1) associated with the CHI protocol. The RPU may capture identification information associated with the NVLink request, such as source identifier of the requesting entity, and transaction tag identifier, and may record the information together with identification information associated with the CHI request generated, such as the transaction ID (TxnID), in order to support the generation of an NVLink response for the NVLink request received from the entity. The RPU sends the CHI request, via the CHI interface, to an interconnect component, such as a crosspoint (e.g., an XP on a CHI coherent interconnect), that forwards the request to a home node. The home node processes the request and issues a CHI request carrying a ReadNoSnp opcode to a memory controller coupled to the coherent interconnect. The memory controller may read the requested data from memory, and may send the data directly to the RPU, or alternatively the memory controller may send the data to the home node, wherein the home node is responsible for sending the data to the RPU. When the RPU receives the data via the CHI interface, the RPU may issue an NVLink response with the data to the requesting entity, utilizing the identification information the RPU captured when processing and translating the NVLink request.

FIG. 74A illustrates one embodiment of a system that utilizes protocol translations between an NVLink-based interface and ARM CHI interconnect components. The NVLink connections are coupled via an RPU to crosspoint (e.g., XP) interconnect components of the CHI coherent interconnect. The RPU may include request nodes (e.g., RNs), such as I/O-coherent RN-I nodes and/or RN-D, and/or home nodes (e.g., HNs), such as non-coherent HN-I nodes. This embodiment enables external entities, such as GPUs, CPUs, or accelerators, communicating according to NVLink protocols, to access resources within the ARM-based processor's coherent domain utilizing appropriate protocol translations and routing, such as by an RPU translating from an NVLink protocol utilized by a GPU entity, to a CHI protocol, utilized by a crosspoint (XP) component of the CHI interconnect, wherein a request node or a home node provides the CHI interface for connecting to the XP.

FIG. 74B illustrates one embodiment of an RPU that translates between an NVLink protocol and a CHI protocol, utilizing an intermediate protocol based on ARM Advanced Microcontroller Bus Architecture (AMBA) Advance Extensible Interface (AXI) Coherency Extensions Lite (ACE-Lite). The RPU may further translate physical addresses associated with the NVLink protocol to physical addresses associated with the CHI protocol. The RPU may be configured to process NVLink transactions, received from an NVLink interface, translate the NVLink transactions to ACE-Lite transactions for further processing, and send the ACE-Lite transactions to a request node (e.g., RN). The request node translates the ACE-Lite transactions to CHI transactions and provides a CHI interface for connecting to the coherent interconnect. In this embodiment, The RPU receives from an entity, such as a GPU or a CPU, an NVLink transaction that includes a read request. The RPU translates the NVLink transaction to an intermediate ACE-Lite ReadOnce transaction, that is further translated by a request node to a CHI ReadOnce transaction destined to a home node (e.g., HN). The home node processes the CHI ReadOnce transaction and may issue a ReadNoSnp transaction to a memory controller, for servicing the original read request received from the entity via the NVLink interface.

The memory controller reads the requested data from memory, and may send the data via the coherent interconnect to the CHI interface of the RPU for delivery to the entity over the NVLink interface.

FIG. 75A illustrates one embodiment of a system that utilizes protocol translations between an interface based on an NVLink protocol, and interconnect components that communicate according to a protocol based on ARM CHI. The system enables entities, such as GPUs or CPUs, to access, via an optional NVLink switch, and an NVLink interface, resources coupled to the coherent interconnect. The NVLink connections are coupled, via an RPU, to crosspoint (e.g., XP) interconnect components of the coherent interconnect. The RPU may include a gateway or interface logic (marked GW in the figure), such as CMN multi-Chip Gateway (CCG), Coherent Multi-Chip Link (CML), Cache Coherent Interconnect for Accelerators (CCIX) Gateway (CXG), CHI C2C, or NVLink-C2C, that may include a CHI interface coupled to the coherent interconnect, enabling connectivity between the NVLink interface and the coherent interconnect, via the RPU. The gateway or interface logic may utilize a streaming interface protocol, such as Credited eXtensible Stream (CXS), to provide packing and un-packing of CHI C2C or an intermediate protocol over the streaming interface. The RPU may further include one or more request nodes (e.g., RN-I), home nodes (e.g., HN-I), optionally placed in the GW, that may enable DMA engines in the RPU to move blocks of data between the NVLink interface and the CHI interface. Examples of the gateway or interface logic include CCG, CML, CXG, CHI C2C, or NVLink-C2C.

FIG. 75B illustrates one embodiment of an RPU that translates between an NVLink protocol and a CHI protocol. The RPU may further translate physical addresses associated with the NVLink protocol to physical addresses associated with the CHI protocol. The RPU utilizes a streaming interface protocol that may be based on ARM Advanced Microcontroller Bus Architecture (AMBA) Credited eXtensible Stream (CXS). Optionally, the RPU may utilize an intermediate protocol, such as CCIX, PCIe, or CXL, over the streaming interface protocol, and may translate from the NVLink protocol to the intermediate protocol, and/or from the intermediate protocol to the CHI protocol. Optionally or alternatively, the RPU may include interfacing logic such as CHI C2C or NVLink-C2C, that may utilize a streaming interface protocol based on CXS.

FIG. 76A illustrates one embodiment of a TFD showing a read transaction from an entity such as a GPU to memory resources of an xPU or a memory pool, wherein an RPU provides translations between an NVLink protocol, such as a protocol utilizing NVLink5, and a CHI protocol that may be utilized by the coherent interconnect of the xPU or the memory pool. The RPU may further translate physical addresses associated with the NVLink protocol to physical addresses associated with the CHI protocol, such as when translating from (AS.1.1) to (AS.2.1), optionally utilizing one stage of address translation. The RPU may utilize a streaming interface protocol, such as CXS, and may optionally utilize PCIe as an intermediate protocol over the CXS streaming interface protocol, translating from the NVLink protocol to the PCIe intermediate protocol, and/or from the PCIe intermediate protocol to the CHI protocol.

The entity/GPU initiates the transaction by sending an NVLink Read Request carrying a physical address (AS.1.1) to the RPU, which translates the NVLink Read Request to a PCIe UIO Memory Read Request utilizing a UIOMRd TLP type, optionally translating the physical address (AS.1.1) carried in the NVLink Read Request to a different physical address (AS.2.1) carried in the UIOMRd TLP. The RPU further translates the PCIe UIO Memory Read Request to an ARM CHI REQ carrying a ReadOnce opcode and a physical address (AS.2.1 in the illustrated embodiment), which is sent via the coherent interconnect to the Home Node (HN). The Home Node processes the request and sends a subsequent ARM CHI REQ with a ReadNoSnp opcode and the physical address (AS.2.1), to the Memory Controller (MC) for retrieving the requested data from memory. The Memory Controller accesses the memory and returns the data via an ARM CHI RDAT message carrying a CompData opcode and the requested data. The RPU receives the CHI response and translates it to the intermediate protocol, such as to PCIe UIO Read Completion with Data, utilizing a UIORdCplD TLP type, and further translates from the intermediate protocol to an NVLink response carrying the data, which is sent back to the entity/GPU via the NVLink interface, completing the read transaction.

When the RPU provides address translations, these address translations may take place during a stage wherein the RPU translates from an NVLink protocol to an intermediate protocol, such as PCIe or CXL. Additionally or alternatively, address translations may take place during a stage wherein the RPU translates from the intermediate protocol, such as PCIe or CXL, to a CHI protocol. In some embodiments, the RPU may perform address translations in stages, such as from a physical address (AS.1.1) in an NVLink request, to physical address (AS.2.1) in a PCIe request or a CXL request, and to physical address (AS.3.1) in a CHI request, optionally providing physical address space isolation between the NVLink domain, the intermediate protocol domain, and the CHI domain. Opcodes, TLP types, or intermediate protocols shown in this embodiment, serve as an example only. Other embodiments may utilize other TLP types such as MRd for a PCIe or CXL request, CplD for PCIe or CXL response, and other intermediate protocols such as CXL.mem or CXL.io.

FIG. 76B illustrates one embodiment of a TFD showing a read transaction from an entity such as a GPU to memory resources of an xPU or a memory pool, wherein an RPU provides translations between an NVLink protocol, such as a protocol utilizing NVLink5, and a CHI protocol that may be utilized by the coherent interconnect of the xPU or the memory pool. The RPU may further translate physical addresses associated with the NVLink protocol to physical addresses associated with the CHI protocol, such as when translating from (AS.1.1) to (AS.3.1), optionally utilizing two stages of address translation with an intermediate address (AS.2.1) that may be associated with an intermediate protocol. The RPU utilizes a streaming interface protocol, such as CXS, and may optionally utilize CXL as an intermediate protocol over the CXS streaming interface protocol, translating from the NVLink protocol to the CXL intermediate protocol, and/or from the CXL intermediate protocol to the CHI protocol.

The entity/GPU initiates the transaction by sending an NVLink Read Request carrying a physical address (AS.1.1) to the RPU, which translates the NVLink Read Request to a CXL.cache D2H Request utilizing a RdCurr opcode, optionally translating the physical address (AS.1.1) carried in the NVLink Read Request to a different physical address (AS.2.1) carried in the CXL.cache D2H Request, wherein (AS.2.1) may be an intermediate address associated with the intermediate protocol. The RPU further translates the CXL-.cache D2H Request to an ARM CHI REQ carrying a ReadOnce opcode, optionally translating the physical address (AS.2.1) carried in the CXL.cache D2H Request to a different physical address (AS.3.1), carried in the ARM CHI REQ, which is sent via the coherent interconnect to the Home Node (HN). The Home Node processes the request and sends a subsequent ARM CHI REQ with a ReadNoSnp opcode and the physical address (AS.3.1), to the Memory Controller (MC) for retrieving the requested data from memory. The Memory Controller accesses the memory and returns the data via an ARM CHI RDAT message carrying a CompData opcode and the requested data. The RPU receives the CHI response and translates it to the intermediate protocol, such as to CXL.cache H2D Data, and further translates from the intermediate protocol to an NVLink response carrying the data, which is sent back to the entity/ GPU via the NVLink interface, completing the read transaction.

When the RPU provides address translations, these address translations may take place during a stage wherein the RPU translates from an NVLink protocol to an intermediate protocol, such as PCIe or CXL. Additionally or alternatively, address translations may take place during a stage wherein the RPU translates from the intermediate protocol, such as PCIe or CXL, to a CHI protocol. In some embodiments, the RPU may perform address translations in stages, such as from a physical address (AS.1.1) in an NVLink request, to physical address (AS.2.1) in a PCIe request or a CXL request, and to physical address (AS.3.1) in a CHI request, optionally providing physical address space isolation between the NVLink domain, the intermediate protocol domain, and the CHI domain. Opcodes, TLP types, or intermediate protocols shown in this embodiment, serve as an example only. Other embodiments may utilize other opcodes, such as CXL.cache RdShared or CXL.cache RdAny, other TLP types such as MRd for a PCIe or CXL request, CplD for PCIe or CXL response, and other intermediate protocols such as CXL.mem or CXL.io.

FIG. 77A illustrates one embodiment of a system comprising an external entity coupled to an optional NVLink switch coupled to a processor comprising (such as an xPU) comprising an RPU comprising an NVLink interface, a Request Agent (RA) Proxy, and a Home Agent (HA) Proxy. The RPU may further comprise an NVLink controller, wherein the NVLink controller may include the NVLink interface. The RPU may be coupled to an interconnect component, such as a crosspoint (e.g., XP), optionally via the RA Proxy and/or the HA Proxy, wherein the RPU may be configured to communicate with the interconnect component according to a CHI-based protocol. The RPU may be further coupled, via the NVLink interface, and optionally via an NVLink switch, to an external entity, such as a GPU, wherein the RPU may be configured to communicate with the external entity according to an NVLink-based protocol. The RPU may translate between the NVLink-based protocol and the CHI-based protocol, possibly enabling the external entity to access resources of the xPU, such as xPU local memory (e.g., DRAM), and/or enabling the xPU to access resources of the external entity, such as remote memory coupled to the entity. The Request Agent (RA) proxy may receive requests that originate outside of the coherent interconnect, such as from remote agents, from the NVLink interface, from the NVLink controller, from an attached accelerator die, or from a remote chip, wherein the RA proxy may represent such remote initiators as a proxy when communicating with the coherent interconnect, e.g., by utilizing a Source ID (SrcID) namespace and a Transaction ID (TxnID) namespace associated with the coherent interconnect. The Home Agent (HA) proxy may own an address window backed by memory that may be placed on another chip or silicon die, such as on the external entity, wherein the HA proxy may enable processing cores of the xPU to access resources coupled to the external entity, such as memory (e.g., HBM).

FIG. 77B illustrates one embodiment of a system comprising an xPU, such as a custom accelerator, that may utilize translations between NVLink and CHI, wherein the xPU may utilize NVLink for communicating with a first entity and with a second entity, which may each be a GPU external to the xPU, and wherein the xPU may further utilize CHI for intra-xPU communications between xPU resources coupled to a coherent interconnect of the xPU. The xPU may include first and second NVLink chiplets, or silicon dies, such as NVLink Fusion, coupled to the first and second entities, respectively. The first and second NVLink chiplets may be further coupled to first and second RPUs, respectively, via first and second physical layers (PHYs), respectively. The first and second RPUs may each include a Die-to-Die (D2D) adapter, a Request Agent (RA) Proxy, and/or a Home Agent (HA) proxy, wherein each RPU may communicate with the coherent interconnect, via the RA Proxy and/or the HA Proxy. The first and second PHYs may each include a UCIe PHY, an NVLink-C2C PHY, or a custom PHY.

The translations between NVLink and CHI may enable the first and/or the second entity to access resources coupled to the coherent interconnect of the xPU; and may further enable processing cores of the xPU to access resources coupled to the first and/or second entity. The translations between NVLink and CHI may further enable the xPU to perform as a switch, such as an NVLink switch, that may utilize NVLink to enable communication between the first entity and the second entity. The first entity may communicate with the second entity via the xPU, such as via the first NVLink chiplet, the first RPU, the coherent interconnect, the second RPU, and the second NVLink chiplet. Similarly, the second entity may communicate with the first entity via the xPU, such as via the second NVLink chiplet, the second RPU, the coherent interconnect, the first RPU, and the first NVLink chiplet FIG. 78A illustrates one embodiment of a system comprising an xPU comprising an RPU that translates between an NVLink protocol and a CHI protocol. The RPU may include a die-to-die (D2D) adapter, such as UCIe D2D adapter or NVLink-C2C adapter, which may perform at least one of: (1) Serve as an interfacing logic coupling the coherent interconnect and a die-to-die link; (2) Packetize CHI C2C into flits that can be streamed out to another chip or die, and correspondingly, handle de-packetization in the reverse direction; (3) Provide a CHI interface for connecting to an interconnect component such as a crosspoint (e.g., XP); or (4) Couple to a PHY such as a UCIe PHY, an NVLink-C2C PHY, or a PCIe PHY, for connecting to an NVLink chiplet, such as NVLink Fusion.

FIG. 78B illustrates one embodiment of a system comprising a third entity (Entity.3), such as a semiconductor device, a CPU, an MxPU, an accelerator, or a memory switch, wherein the third entity may be coupled to a memory, such as DRAM, optionally via memory channels. The third entity may include a coherent interconnect, a first RPU (RPU.1) comprising an NVLink port and a first CHI interface (CHI Interface.1), and a second RPU (RPU.2) comprising a CXL port and a second CHI interface (CHI Interface.2). The third entity may be coupled, via the NVLink port and optionally via a first switch (Switch.1), such as an NVLink switch or an NVSwitch, to a first entity (Entity.1), such as a GPU, wherein the third entity may be further coupled, via the CXL port and optionally via a second switch (Switch.2), which may be a CXL switch, to a second entity (Entity.2), such as a CXL device (e.g., CXL memory). The third entity may utilize translations between NVLink and CHI that may enable the first entity to access the memory of the third entity, wherein the third entity may further utilize translations between CXL and CHI that may enable the second entity to access the memory of the third entity.

In some embodiments, the translations between NVLink and CHI, and the translations between CXL and CHI, may enable the third entity to perform as a switch, such as a multi-protocol switch, a hybrid switch, or an NVLink/CXL switch, enabling communication between the first entity and the second entity, such as enabling the GPU to utilize the CXL memory. For example, the first entity may communicate with the second entity via the third entity, such as via the first RPU comprising the NVLink port and the first CHI interface (CHI Interface.1), via the coherent interconnect, and via the second RPU that includes the CXL port and the second CHI interface (CHI Interface.2). In another example, the second entity may communicate with the first entity via the third entity, such as via the second RPU, the coherent interconnect, and the first RPU.

In some embodiments, the third entity may be configured to enable communication between the NVLink domain and the CXL domain, such as communication between NVLink ports and CXL ports, or communication between NVLink interfaces and CXL ports, whereas in other embodiments, the communication between the NVLink domain and the CXL domain may be restricted, optionally by an access control list (ACL), such as to a subset of the NVLink ports and/or to a subset of the CXL ports. Additionally or alternatively, communication between the NVLink domain and the CXL domain may be restricted to a subset of allowed address regions associated with one or more address spaces, or may be restricted to a subset of allowed protocols, such as CXL.mem (e.g., not allowing CXL.cache transactions).

FIG. 79A illustrates one embodiment of a system comprising an xPU or a custom accelerator, coupled to an entity such as a GPU, optionally via an NVLink switch. The xPU includes an RPU which translates between an NVLink protocol and a CHI protocol. The RPU includes an NVLink chiplet, such as NVLink Fusion, that provides an NVLink interface for coupling to the external entity. The RPU further includes an NVLink-C2C for coupling the NVLink chiplet to the coherent interconnect, wherein the NVLink-C2C utilizes a CHI interface for connecting to at least one crosspoint of the coherent interconnect. The RPU may provide bi-directional memory access between the xPU and the GPU, enabling the xPU to read from the GPU's HBM, and enabling the GPU to read from DRAM coupled to the xPU. Alternatively, the RPU may provide unidirectional memory access, enabling the GPU to access xPU memory but not vice-versa, such as by exposing at least some of the xPU resources as a memory expander or a memory pool for use by the GPU.

FIG. 79B illustrates one embodiment of a system comprising an xPU coupled to an entity such as a GPU. The xPU includes an RPU which translates between an NVLink protocol and a protocol based on ARM CHI, wherein the RPU includes a CHI interface for coupling to a coherent interconnect, an NVLink-C2C logic, optionally integrated into an NVLink-C2C controller that includes a transactional layer, a data link layer and a physical layer. The RPU further includes an NVLink chiplet, such as NVLink Fusion, for coupling to the GPU, wherein the NVLink chiplet is further coupled to the coherent interconnect via the NVLink-C2C logic, optionally communicating with at least one crosspoint interconnect component according to a protocol based on ARM CHI.

FIG. 80A illustrates one embodiment of an xPU coupled to an entity such as a CPU or a GPU. The xPU includes an RPU which translates between an NVLink protocol and a protocol based on ARM CHI. The xPU further includes at least two silicon dies, wherein the first die includes a CHI interface of the RPU, and the second die includes an NVLink interface of the RPU. The second die may further include an optional PCIe PHY to communicate with a device, external to the xPU, according to a PCIe protocol or a cNVLink protocol. The first die and the second die are coupled by at least one C2C interface, utilizing chip-to-chip or die-to-die protocols such as CHI C2C, NVLink-C2C, or cNVLink. The RPU may enable coherent memory access from the entity to the xPU, and optionally, from the device to the xPU.

FIG. 80B illustrates one embodiment of an xPU coupled to an entity such as an NVIDIA Blackwell GPU. The xPU includes processing cores, acceleration cores, memory controllers, a coherent interconnect, and an NVLink chiplet, such as NVLink Fusion, that is coupled to the coherent interconnect via a first NVLink-C2C. The NVLink chiplet includes a second NVLink-C2C, and an RPU that translates between an NVLink protocol and a protocol based on ARM CHI. The RPU includes an NVLink interface for coupling to the entity, and a CHI interface for coupling to the second NVLink-C2C. The NVLink-C2C interfaces are optionally integrated into NVLink-C2C controllers that includes transactional layers, data link layers and physical layers. The RPU may enable the GPU to access, via the NVLink interface, resources mapped to the physical address space of the xPU coherent interconnect. Correspondingly, the RPU may enable the processing cores of the xPU to access, via the NVLink interface, resources of the GPU, such as HBM or GDDR memory.

FIG. 81A illustrates one embodiment of a system that may function as an NVLink memory switch appliance, and may include an xPU, CPU, custom accelerator, or a memory switch ASIC, that is coupled to two entities denoted as Entity.1/CPU.1 and Entity.2/CPU.2. The xPU includes processing cores and memory controllers coupled to a coherent interconnect that is based on a CHI protocol. The xPU utilizes protocol translations, performed by the RPUs, between NVLink-based interfaces and the xPU coherent interconnect. The first RPU (RPU.1) may enable Entity.1/CPU.1 to access, via the first NVLink interface and the xPU coherent interconnect, resources mapped to the physical address space of the xPU coherent interconnect, such as memory resources of the xPU. Correspondingly, the second RPU (RPU.2) may enable Entity.2/CPU.2 to access, via the second NVLink interface and the xPU coherent interconnect, resources mapped to the physical address space of the xPU coherent interconnect, such as memory resources of the xPU.

FIG. 81B illustrates one embodiment of a TFD showing a read transaction from Entity.1/CPU.1 to memory resources of an xPU, wherein the first RPU provides translations between an NVLink protocol, such as cNVLink, and a CHI protocol utilized by the coherent interconnect of the xPU. Entity.1/CPU.1 initiates the transaction by sending a cNVLink Request: Read carrying a ReadOnce opcode and a physical address (AS.1.1) to RPU.1. RPU.1 translates the NVLink request to an ARM CHI REQ carrying the ReadOnce opcode and the same physical address (AS.1.1), or a different physical address if the RPU also performs address translation, which is sent via the coherent interconnect to the Home Node (HN). The Home Node processes the request and sends a subsequent ARM CHI REQ with a ReadNoSnp opcode and the physical address (AS.1.1) to the Memory Controller (MC) for retrieving the requested data from memory. The Memory Controller accesses the memory and returns the data via an ARM CHI RDAT message carrying a CompData opcode and the requested data. The RPU.1 receives the CHI response and translates it to a cNVLink Response carrying a CompData opcode and the data, which is sent back to Entity.1/CPU.1 via the NVLink interface, completing the read transaction.

FIG. 82A illustrates one embodiment of a system that may function as a multi-protocol memory switch appliance or a multi-protocol memory pool, and may include an MxPU, CPU, accelerator, or a memory switch ASIC, that may be coupled to two entities, optionally via switches: (1) Entity.1/ GPU via an optional first switch (Switch.1), such as an NVLink switch or NVSwitch, and (2) Entity.2/Accelerator via an optional second switch (Switch.2), such as a UALink switch. The MxPU includes processing cores and memory controllers coupled to a coherent interconnect that may be based on a CHI protocol. The MxPU may utilize different protocol translations for the external interfaces, performed by different RPUs, such as between NVLink-based interfaces and the MxPU coherent interconnect, or between UALink-based interfaces and the MxPU coherent interconnect. The first RPU (RPU.1) may enable Entity.1/GPU to access resources mapped to a physical address space of the MxPU coherent interconnect, wherein the access is via the optional first switch, the NVLink interface and the MxPU coherent interconnect. Examples of resources mapped to the physical address space of the MxPU coherent interconnect include DRAM or other memory resources of the MxPU. Correspondingly, the second RPU (RPU.2) may enable Entity.2/Accelerator to access, via the optional second switch, the UALink interface and the MxPU's coherent interconnect, resources mapped to a physical address space of the MxPU's coherent interconnect, such as DRAM or other memory resources of the MxPU.

FIG. 82B illustrates one embodiment of a TFD depicting a multi-entity memory access scenario wherein a GPU/first entity and an accelerator/second entity access memory mapped to one or more address spaces utilized by the coherent interconnect (CohInterMappedMemory) utilizing heterogeneous protocol message translations. Entity.1/ GPU.1 initiates an NVLink Request: Read with SourceID (a.1) to identify the source GPU, DestinationID(b.1) to identify the destination, and Address(AS.1.1) representing a physical address, such as an NVLink network address. RPU.1 translates the NVLink Request to ARM CHI REQ carrying Opcode(ReadOnce) while preserving Addr(AS.1.1) unchanged. Concurrently or sequentially, Entity.2/Accelerator may initiate a UALink UPLI Request (Req) with ReqCmd(Read), ReqSrcPhysAccID(a.2) to identify the source accelerator, ReqDstPhysAccID(b.2) to identify the destination, and ReqAddr(AS.1.2) representing a request address, such as a network physical address (NPA). RPU.2 translates the UALink UPLI Request to ARM CHI REQ carrying Opcode(ReadOnce) while preserving Addr(AS.1.2) unchanged. Both transactions flow through the coherent interconnect to one or more home nodes, which may send respective ARM CHI REQ messages to one or more memory controllers with Opcode(ReadNoSnp) and the addresses Addr(AS.1.1) and Addr(AS.1.2), respectively. The memory controller(s) retrieve the requested data from the CohInterMappedMemory and send first and second ARM CHI RDAT messages with Opcode(CompData) carrying *Data.1* and *Data.2*, representing the data retrieved from the addresses AS.1.1 and AS.1.2, respectively. RPU.1 translates the first ARM CHI RDAT message to NVLink Response with SourceID(b.1), DestinationID(a.1), and *Data.1* for Entity.1/GPU. RPU.2 translates the second ARM CHI RDAT message to UALink UPLI Read Response/Data (RdRsp) with RdRspSrcPhysAccID(b.2), RdRspDstPhysAccID(a.2), and RdRspData(*Data.2*) for Entity.2/Accelerator.

This embodiment demonstrates how heterogeneous entities utilizing different protocols may share access to the same CohInterMappedMemory through different RPUs that translate messages between different protocols while preserving the physical addresses unchanged. Alternatively, the embodiment may be viewed as separate NVLink and UALink transactions that utilize the same coherent interconnect infrastructure to access the CohInterMapped-Memory. Still alternatively, the response and read data paths may be implemented according to other designs, such as wherein the memory controller(s) may send the data to the home node(s) that send it to the respective RPUs, or the home node(s) send responses to the RPUs while the memory controller(s) send the data directly to the RPUs.

In one embodiment, an apparatus, comprises: a coherent interconnect based on Coherent Hub Interface (CHI) protocol, comprising an interconnect component configured to receive CHI-based messages; processing cores coupled via the coherent interconnect to memory controllers, wherein the memory controllers are coupled to memory channels capable of supporting more than 64 GB of memory; a resource provisioning unit (RPU) comprising an NVLink interface and a CHI interface; wherein the NVLink interface utilizes differential pairs and is capable of communicating according to an NVLink-based protocol with an entity external to the apparatus; wherein the CHI interface is coupled to the interconnect component; and wherein the RPU is configured to translate between the NVLink-based protocol and the CHI-based protocol to enable the entity to access resources via: the NVLink interface and the coherent interconnect.

Optionally, the RPU may be further configured to: translate first physical addresses associated with the NVLink-based protocol to second physical addresses associated with the CHI-based protocol, and translate NVLink command encodings to corresponding CHI opcodes. Optionally, the RPU may perform address translation from the NVLink domain to the CHI domain. The address translation may support different memory mapping schemes between the NVLink and CHI domains, while the command translation may preserve the intent of the transaction. For example, when translating an NVLink read request transaction, received from a GPU, to a CHI request transaction, targeting an xPU coherent interconnect, wherein the CHI transaction carries a ReadOnce opcode for obtaining a non-cacheable snapshot of the data, satisfying the intent of the I/O coherent NVLink read request. The RPU may preserve the ordering requirements of the original NVLink transactions within the CHI-based protocol framework.

The resources may be selected from at least one of: registers within the apparatus, SRAM or HBM within the apparatus, at least some of the 64 GB of memory, network devices coupled to the apparatus, or storage devices coupled to the apparatus. The RPU may further comprise a request node which does not include a hardware-coherent cache, and wherein the request node is configured to communicate with the interconnect component according to the CHI-based protocol. The request node may be coupled to the interconnect component and may be further configured to expose registers accessible utilizing memory-mapped I/O (MMIO) operations, to enable the entity to detect at least one of: node type, node configuration, or connection topology based on register inspection. In such a case, the request node may be configured to expose the registers via Advanced Microcontroller Bus Architecture (AMBA) Advanced Peripheral Bus (APB) interface, to enable the entity to read the registers via the NVLink interface.

The request node may comprise an I/O-Coherent Request Node (RN-I) or an I/O-Coherent Request Node with Distributed Virtual Memory (DVM) support (RN-D); and the RPU may be configured to translate NVLink read requests to CHI read requests. Optionally, the integration with ARM mesh architecture allows the NVLink-coupled entity to participate in the broader system interconnect fabric, with interconnect components, such as crosspoints, providing routing decisions based on transaction addresses and types. The MMIO-accessible registers enable system firmware or diagnostic software to discover the structure of the coherent interconnect, the presence of request nodes and home nodes comprised in the RPU, verify correct node connections, detect NVLink translation capabilities in the RPU via additional register inspections, and configure operational parameters for the translation path.

In some implementations, the RPU may further comprise a home node which does not include a Point of Coherence (PoC) and is not capable of processing snoopable requests, and wherein the home node is configured to communicate with the interconnect component according to the CHI-based protocol. This home node may comprise a Non-coherent Home Node (HN-I), enabling the processing cores to access resources via the NVLink interface. The RPU may further comprise a request node and a home node, wherein the request node couples the NVLink interface to the interconnect component, and wherein the home node coupled the NVLink interface to the second interconnect component. Optionally, the RPU may implement routing decisions based on transaction types, directing memory access transactions from the NVLink domain through a request node, such as an RN-I node, while receiving, from a home node, such as an HN-I node, transactions targeting the NVLink domain. The apparatus may enable entities communicating according to NVLink-based protocol to perform I/O-coherent accesses to resources within a CHI-based system through appropriate non-coherent or I/O-coherent nodes. A request node, such as an RN-D node, may receive DVM transactions and generate a subset of CHI protocol transactions without maintaining a hardware-coherent cache. The home node, such as an HN-I node, may process a limited subset of request types and manage ordering between I/O requests targeting the I/O subsystem without maintaining coherency utilizing snooping. The RPU may perform protocol-specific translations including command mapping, address formatting, address translations, orchestration and tracking of transaction IDs, and transaction sequencing between the NVLink and CHI protocol domains.

Additionally, the RPU may further comprise an interconnect gateway configured to communicate with the interconnect component according to the CHI-based protocol, wherein the RPU is further configured to utilize a streaming interface protocol to enable connectivity between the NVLink interface and the coherent interconnect via the interconnect gateway. The streaming interface protocol may transport packets of an intermediate protocol, and wherein the RPU may be further configured to translate between the intermediate protocol and the CHI-based protocol. For instance, the intermedia protocol may comprise PCIe and wherein the RPU may be further configured to translate a PCIe UIO memory read request utilizing a UIOMRd TLP type to a CHI REQ comprising a ReadOnce opcode. In other aspects, the streaming interface protocol may be based on Advanced Microcontroller Bus Architecture (AMBA) Credited eXtensible Stream (CXS), and wherein the interconnect gateway provides credit-based flow-control and supports bi-directional connectivity between the NVLink interface and the coherent interconnect. The interconnect gateway may comprise CMN multi-Chip Gateway (CCG) comprising a link agent that supports the streaming interface protocol, providing flit packing and unpacking, end-to-end data integrity, and a flit-retry mechanism for reliability, availability and serviceability (RAS) containment when data corruption is detected. The interconnect gateway may also comprise at least one of Coherent Multi-Chip Link (CML) or Cache Coherent Interconnect for Accelerators (CCIX) Gateway (CXG), and wherein the gateway is configured to utilize a 32-bit cyclic-redundancy check (CRC-32) to protect transactions conforming to the streaming interface protocol. In other embodiments, the RPU may comprise a request agent (RA) proxy configured to communicate with the interconnect component according to the CHI-based protocol, enabling the entity to access, via the NVLink interface, resources coupled to the coherent interconnect. The RPU may also comprise a home agent (HA) proxy configured to communicate with the interconnect component according to the CHI-based protocol, enabling the processing cores to access resources via the NVLink interface. The interconnect component may comprise a crosspoint comprising at least four mesh ports and at least two device ports, and wherein the RPU is coupled to a device port of the at least two device ports.

The coherent interconnect may comprise a scalable coherent fabric (SCF), wherein the interconnect component comprises a Cache Switch Node (CSN), and wherein the RPU is coupled to the CSN via the CHI interface. The xPU may be based on an NVIDIA Scalable Coherent Fabric (SCF) coherent interconnect that includes Cache Switch Nodes (CSNs) as a crosspoint, and an NVLink-C2C for connecting to an external entity, such as a GPU, via an NVLink interface. In such an apparatus, the SCF may comprise an SCF Cache partition (SCC), and wherein the RPU and the SCC are coupled to the CSN, providing the entity, via the NVLink interface, with low-latency access to caching resources of the apparatus. The memory may comprise dynamic random-access memory (DRAM), and the entity may comprise an NVLink Switch, a GPU, or an accelerator.

In one embodiment, a method, comprises: operating a coherent interconnect that utilizes a protocol based on Coherent Hub Interface (CHI-based protocol), comprising an interconnect component that receives CHI-based messages; communicating, via the coherent interconnect, between processing cores and memory controllers, wherein the memory controllers communicate with memory channels coupled to more than 64 GB of memory; operating a resource provisioning unit (RPU) comprising an NVLink interface and a CHI interface, wherein the NVLink interface utilizes differential pairs and communicates according to an NVLink-based protocol with an entity external to the RPU, and wherein the CHI interface communicates with the interconnect component; and translating, by the RPU, between the NVLink-based protocol and the CHI-based protocol to enable the entity to access resources via the NVLink interface and the coherent interconnect.

Optionally, the method may further comprise translating, by the RPU, first physical addresses associated with the NVLink-based protocol to second physical addresses associated with the CHI-based protocol, and translating NVLink command encodings to corresponding CHI opcodes. In some implementations, the RPU may comprise a request agent (RA) proxy, and the method may further comprise communicating, by the RA proxy, with the interconnect component according to the CHI-based protocol, enabling the entity to access, via the NVLink interface, resources coupled to the coherent interconnect. Additionally or alternatively, the RPU may comprise a home agent (HA) proxy, and the method may further comprise communicating, by the HA proxy, with the interconnect component according to the CHI-based protocol, enabling the processing cores to access resources via the NVLink interface.

In one embodiment, a system, comprises: a coherent interconnect based on Coherent Hub Interface (CHI) protocol, comprising interconnect components configured to route CHI-based messages; processing cores coupled via the coherent interconnect to memory controllers, wherein the memory controllers are coupled to memory channels coupled to at least 64 GB of memory; resource provisioning units (RPUs) comprising external interfaces and CHI interfaces, wherein at least one of the external interfaces comprises an NVLink interface utilizing differential pairs for communication according to an NVLink-based protocol with one or more external entities; wherein the CHI interfaces are coupled to the interconnect components; and wherein the RPUs are configured to translate between protocols utilized by the external interfaces and the CHI-based protocol; whereby the translate enables the external entities to access system resources via the external interfaces and the coherent interconnect.

Optionally, the RPUs may be configured to translate physical addresses from physical address spaces associated with their external interface protocol to physical address spaces associated with the CHI-based protocol, and to translate command encodings from the external interface protocol to corresponding CHI opcodes. The RPU may comprise at least one of request agent (RA) proxies or home agent (HA) proxies configured to communicate with the interconnect components according to the CHI-based protocol; wherein the RA proxies enable external entities to access memory and I/O resources coupled to the coherent interconnect, and the HA proxies enable the processing cores to access external memory resources via the external interfaces, thereby implementing a distributed shared memory architecture. In certain aspects, at least one of the RPUs may comprise an interconnect gateway configured to communicate with a corresponding interconnect component according to the CHI-based protocol, wherein the interconnect gateway utilizes a streaming interface protocol to enable connectivity between the external interface associated with the at least one of the RPUs and the coherent interconnect via the at least one of the RPUs.

Optionally, the external interfaces associated with the RPUs may implement various protocol bridging architectures to enable communication between external entities and the coherent interconnect. In one example, an RPU may utilize proxy-based mechanisms such as Request Agent (RA) proxy and Home Agent (HA) proxy for NVLink protocol translation. In alternative implementations, the RPUs may employ direct protocol translation engines that perform stateless or stateful conversion between external protocols and CHI-based messages, transaction queuing and reordering mechanisms that handle protocol-specific ordering requirements, or address remapping units that maintain translation tables for converting between different physical address spaces. The RPUs may implement credit-based flow control mechanisms, transaction tracking structures, or protocol-specific state machines that manage the lifecycle of transactions as they traverse between protocol domains. These various implementation approaches may enable external entities to access system memory while system components concurrently access resources attached to the external entities.

Optionally, the architectural flexibility of the RPUs may enable multiple protocols to co-exist within the system utilizing various mechanisms. Different RPUs in the system may support UALink protocol through UPLI message processing engines, CXL protocol through CXL.mem and/or CXL.cache transaction handlers, PCIe protocol through TLP processing units, or proprietary interconnect protocols through custom translation logic. The system may include RPUs configured for multi-protocol operation, such as multi-protocol RPUs embedded in a Fabric Processing Unit (FPU) or in a software-defined fabric processor, wherein a single RPU implements protocol detection and routing mechanisms, shared transaction buffers with protocol-specific handling, unified address translation units that support multiple addressing schemes, or configurable state machines that adapt to different protocol requirements. The streaming interface protocol utilized by the interconnect gateway may provide a common transport mechanism with protocol-agnostic packetization and framing, enabling these diverse protocols to efficiently communicate with the CHI-based coherent interconnect. The RPUs may implement protocol-specific optimizations such as transaction coalescing, speculative prefetching, or latency hiding techniques while maintaining protocol semantics and coherency requirements utilizing appropriate translation and synchronization mechanisms.

In one embodiment, an apparatus designed for asymmetric bandwidth capacity, comprises: processing cores coupled via a coherent interconnect to memory controllers, wherein the memory controllers are coupled to memory channels capable of supporting more than 64 GB of memory; a resource provisioning unit (RPU) comprising an NVLink interface and a coherent interconnect interface, wherein the NVLink interface is configured to exchange first messages conforming to an NVLink-based protocol with an entity external to the apparatus; wherein the coherent interconnect interface comprises a first set of interface components configured to send second messages to the coherent interconnect and a second set of interface components configured to receive third messages from the coherent interconnect, wherein the second and third messages conform to a coherent interconnect protocol and comprising at least one of read requests or write requests; wherein a ratio of bandwidth capacity between the first and second sets of interface components is at least 1.5:1 or at least 1:1.5; and wherein the RPU is configured to translate between the first messages and the second and third messages to enable the entity to access resources via: the NVLink interface, the coherent interconnect interface, and the coherent interconnect.

Optionally, the coherent interconnect protocol may be based on Coherent Hub Interface (CHI) protocol, the first set of interface components may comprise Home Nodes, the second set of interface components may comprise Request Nodes, and wherein a number of the Home Nodes exceeds a number of the Request Nodes. Optionally, when implementing asymmetric bandwidth capacity using ARM CHI architecture, the RPU may utilize different numbers of Request Nodes and Home Nodes to create the bandwidth asymmetry. The greater number of Home Nodes relative to Request Nodes may optimize the apparatus for read-heavy workloads initiated by the processing cores, enabling higher bandwidth data transfers from the entity to the processing cores. Optionally, the configuration with more Home Nodes than Request Nodes may benefit workloads wherein processing cores of the accelerator predominantly read data from an entity, such as a GPU or another accelerator. The Home Nodes may separately service read requests, and enable parallel data transfers from the entity to the accelerator.

In some implementations, the coherent interconnect protocol may be based on Coherent Hub Interface (CHI) protocol, the first set of interface components may comprise Request Nodes, the second set of interface components may comprise Home Nodes, and wherein a number of the Request Nodes exceeds a number of the Home Nodes.

The RPU may be further configured to translate physical addresses between a first physical address space utilized by the entity and a second physical address space utilized by the processing cores. Optionally, the RPU may perform address translations while maintaining the asymmetric bandwidth capacity characteristics. The address translation may support various mapping schemes including linear translations, windowed translations, or page-table-based translations, while preserving the bandwidth asymmetry designed into the system.

The first set of interface components may comprise Request Agent (RA) proxy nodes, and wherein the second set of interface components may comprise Home Agent (HA) proxy nodes, and wherein asymmetric bandwidth capacity may be achieved by implementing different numbers of RA proxy nodes and HA proxy nodes. Optionally, agent proxy nodes such as Request Agent (RA) proxy and Home Agent (HA) proxy may be configured in asymmetric numbers to create bandwidth imbalance. Implementing agent proxy nodes for handling traffic in one direction while using fewer agent proxy nodes for the opposite direction may create the required bandwidth asymmetry. The agent proxy nodes may provide protocol processing and data path capabilities, and their parallel operation may multiply the effective bandwidth in the direction with more agent proxy nodes.

The coherent interconnect interface may comprise physical connections, wherein connections allocated to the first set of interface components may have a different aggregate width than connections allocated to the second set of interface components. Optionally, the asymmetric bandwidth capacity may be implemented utilizing different aggregate connection widths. While individual lanes in high-speed serial interfaces typically operate bidirectionally, the allocation of lanes to different interface components may create asymmetry. For example, if the first set of interface components is allocated connections totaling 16 lanes while the second set is allocated connections totaling 8 lanes, the system may achieve a 2:1 bandwidth ratio, which allows for efficient use of physical resources by allocating more lanes to the direction with higher bandwidth requirements.

The ratio of bandwidth capacity may provide greater bandwidth from the coherent interconnect to the NVLink interface than from the NVLink interface to the coherent interconnect; and wherein the first set of interface components may have preferential access to memory controllers coupled to the coherent interconnect, thereby optimizing memory reads initiated by the entity. Optionally, a read-optimized configuration may allocate more bandwidth resources and provide preferential memory controller access for read requests from the entity to the apparatus memory and for data flowing from the processor's memory to the entity. Beyond the ratio of interface components, the system may implement quality-of-service mechanisms that prioritize read traffic initiated by the entity via the NVLink interface, dedicate specific memory channels to servicing read requests, or implement read-ahead buffers in the first set of interface components. The memory controllers may be configured with larger read queues and optimized scheduling algorithms for memory reads.

In certain aspects, the ratio of bandwidth capacity may provide greater bandwidth for the write requests from the NVLink interface to the coherent interconnect than for the write requests from the coherent interconnect to the NVLink interface; and wherein the first set of interface components may comprise write posting buffers and write combining logic to optimize write operations initiated by the entity. Optionally, a write-optimized configuration may include architectural features beyond the basic bandwidth ratio. The second set of interface components may implement large write posting buffers that can absorb burst write traffic from the entity, write combining logic that merges partial writes into full cache lines, and dedicated write channels in the coherent interconnect. These features work together with the bandwidth asymmetry to efficiently handle write-intensive workloads.

The apparatus may further comprise a second coherent interconnect interface coupled to a second RPU comprising a second NVLink interface; wherein the NVLink interface may be configured to couple to a first GPU and the second NVLink interface may be configured to couple to a second GPU; and wherein the asymmetric bandwidth capacity configuration may provide greater bandwidth in a direction from the first GPU to the second GPU than in the opposite direction. Optionally, the apparatus may enable GPU-to-GPU communication through the coherent interconnect with asymmetric bandwidth capacity tailored to the communication pattern. When the first GPU primarily sends data to the second GPU, such as in pipelined processing wherein the first GPU performs initial computations and the second GPU performs subsequent processing, the asymmetric configuration may optimize this unidirectional data flow. The bandwidth asymmetry may be achieved by allocating more interface components or resources in the path from the first GPU through the first RPU, across the coherent interconnect, through the second RPU, to the second GPU.

The RPU may further comprise a second NVLink interface configured to communicate with a second entity; wherein the RPU may be further configured to provide different bandwidth asymmetry ratios for the first and second NVLink interfaces based on their respective workload characteristics. Optionally, the apparatus may support entities having customized bandwidth asymmetry configurations. The RPU may allocate interface components to different entities based on their bandwidth requirements and traffic patterns. For example, a first GPU entity performing read-intensive operations may be allocated a 3:1 read-to-write bandwidth ratio, while a second accelerator entity performing write-intensive operations may be allocated a 1:2 read-to-write ratio.

FIG. 83 illustrates one embodiment of a system demonstrating asymmetric bandwidth configuration between an RPU and a coherent interconnect, wherein the RPU includes a first set of four interface components (denoted '1') for one direction of traffic flow, and a second set of two interface components (denoted '2') for another direction of traffic flow. The unequal number of interface components between the two sets creates an asymmetric bandwidth characteristic that may be optimized for specific workload patterns, wherein the interface components may optionally be implemented as request nodes (RNs) and home nodes (HNs) in ARM CHI-based implementations, with the specific ratio and types of nodes selected based on whether the system prioritizes requests from external entities to internal resources, or prioritizes requests from internal processing cores to external resources.

FIG. 84A illustrates one embodiment of a system optimized for accelerator applications utilizing UALink interfaces, wherein an RPU includes more home nodes (HN) than request nodes (RN) coupled between one or more UALink ports and a coherent interconnect comprising crosspoints (XPs) and memory controllers (MCs) that are coupled to memory. The embodiment with multiple home nodes and fewer request nodes provides greater bandwidth for transactions initiated by processing cores within the coherent interconnect targeting external entities through the UALink ports, while providing more limited bandwidth for transactions initiated by external entities requesting access to internal memory resources, making this architecture particularly suitable for accelerator implementations wherein the accelerator may initiate substantial outbound request traffic but may receive fewer inbound requests.

FIG. 84B illustrates one embodiment of a system optimized for a memory pool or a memory switch applications utilizing UALink interfaces, wherein an RPU includes more request nodes (RN) than home nodes (HN) coupled between one or more UALink ports and a coherent interconnect comprising processing cores. The embodiment with multiple request nodes and fewer home nodes provides greater bandwidth for transactions initiated by external entities through the UALink ports requesting access to the internal memory resources, while providing more limited bandwidth for transactions initiated by processing cores targeting external resources, making this architecture particularly suitable for memory pooling implementations wherein external entities frequently read from or write to the shared memory resources.

FIG. 85A illustrates one embodiment of a system utilizing NVLink interfaces in an accelerator-optimized configuration, wherein an RPU includes more home nodes (HN) than request nodes (RN) coupled between at least one NVLink interface and a coherent interconnect comprising crosspoints (XPs) and memory controllers (MCs) that are coupled to memory. The asymmetric embodiment with multiple home nodes serving outbound request traffic and fewer request nodes handling inbound request traffic creates bandwidth characteristics optimized for accelerator workloads utilizing an NVLink protocol, wherein the accelerator prioritizes requests to external resources over serving requests from external entities. The Request Nodes may include I/O-coherent request nodes (RN-I) or I/O-coherent request nodes with DVM support (RN-D), while the Home Nodes may include non-coherent home nodes (HN-I). The entity, which may be a GPU such as NVIDIA Rubin GPU, is coupled through an optional NVLink switch, such as NVIDIA NVSwitch, to the RPU's NVLink interface. This asymmetric configuration may be particularly beneficial for read-heavy workloads, such as wherein the accelerator requires high bandwidth capacity for receiving data from memory associated with the entity, such as an HBM of a GPU.

Optionally, the bandwidth capacity of a set of interface components refers to the maximum sustained data throughput that the set of interface components can collectively support for transferring messages in a given direction through the coherent interconnect interface. The bandwidth capacity may be determined by multiple factors including the number of interface components within the set, the aggregate width of physical connections allocated to those components, the processing capabilities of the individual components, and/or the degree to which the components can operate in parallel. For example, a first set comprising multiple Home Nodes coupled to the coherent interconnect through wider physical connections may provide greater bandwidth capacity than a second set comprising fewer Request Nodes with narrower connections. In embodiments wherein the first set of interface components is configured to send messages to the coherent interconnect and the second set of interface components is configured to receive messages from the coherent interconnect, each set may have a different bandwidth capacity, creating an asymmetric configuration wherein data throughput in one direction through the coherent interconnect interface differs from data throughput in the opposite direction. This asymmetry may be implemented by allocating different numbers of interface components to each set, assigning different physical connection widths to each set, and/or providing different levels of access to shared resources such as memory controllers, wherein such design choices may optimize the apparatus for workload patterns that exhibit directional preferences in data traffic.

FIG. 85B illustrates one embodiment of a system configured as an NVLink-based memory pool, wherein an RPU includes more request nodes (RN) than home nodes (HN) coupled between one or more NVLink interfaces and a coherent interconnect comprising crosspoints (XPs), memory controllers (MCs), and memory. The embodiment with multiple request nodes handling inbound NVLink request traffic and fewer home nodes managing outbound request traffic optimizes the system for memory pooling scenarios wherein external GPUs or accelerators frequently access the shared memory resources through NVLink interfaces, providing high bandwidth for external memory access requests while limiting bandwidth for internally-initiated transactions targeting external resources, which corresponds to typical memory pool access patterns in GPU-accelerated computing environments. The Request Nodes may handle read operations, write operations, command submissions, or other transactions initiated by the entity, while the fewer Home Nodes may be sufficient for coordinating read requests from the apparatus to the entity. The entity, which may be a GPU such as NVIDIA Rubin GPU, is coupled through an optional NVLink switch, such as NVIDIA NVSwitch, to the RPU's NVLink interface. This asymmetric configuration may be beneficial for memory-intensive workloads wherein the entity generates substantial data traffic to and from the memory of the apparatus.

In one embodiment, an apparatus comprises: first and second silicon dies coupled by a Chip-to-Chip (C2C) interface; the first silicon die comprises a Coherent Hub Interface (CHI) interface that is coupled to an interconnect component associated with a coherent interconnect configured to utilize a CHI-based protocol; the coherent interconnect couples processing cores to memory controllers that are coupled to memory channels capable of supporting more than 64 GB of memory; the second silicon die comprises an NVLink interface capable of communicating according to an NVLink-based protocol with an entity external to the apparatus; and a resource provisioning unit (RPU) disposed in at least one of the first or the second silicon dies, and configured to translate between the NVLink-based protocol and the CHI-based protocol, to enable the entity to access resources via: the NVLink interface, the C2C interface, and the memory controllers.

The C2C interface may be based on at least one of: CHI C2C, NVLink-C2C, or coherent NVLink (cNVLink). Optionally, the second silicon die may further comprise a die-to-die (D2D) adapter coupled to the NVLink interface. The second silicon die may further comprise a physical-layer (PHY) selected from a Universal Chiplet Interconnect Express (UCIe) PHY, an NVLink-C2C PHY, a PCI Express PHY, a Compute Express Link (CXL) PHY, or a custom PHY configured for chip-to-chip communication. In some implementations, the second silicon die is implemented as an NVLink Fusion chiplet, or an NVLink chiplet, and is configured to enable the processing cores to access resources coupled to the second silicon die via the NVLink interface. The NVLink interface may be comprised in an NVLink Fusion module disposed on the second silicon die, wherein the NVLink Fusion module is configured to enable the entity to access resources via: the NVLink interface and the coherent interconnect.

The RPU may be further configured to translate first physical addresses associated with the NVLink-based protocol to second physical addresses associated with the CHI-based protocol, and translate NVLink command encodings to corresponding CHI opcodes. In certain aspects, the RPU comprises a first portion disposed in the first silicon die and a second portion disposed in the second silicon die, wherein the first portion comprises the CHI interface and the second portion comprises the NVLink interface. The memory channels may be coupled to dynamic random-access memory (DRAM), and the entity comprises a graphics processing unit (GPU), an NVLink Switch, or an accelerator. Optionally, the RPU further comprises, disposed in the first silicon die, at least one of: (i) a request node that does not include a hardware-coherent cache and is configured to communicate with the interconnect component according to the CHI-based protocol, (ii) a request-agent (RA) proxy that forwards requests originating at the NVLink interface, or (iii) a home-agent (HA) proxy that services requests targeting resources accessible via the NVLink interface. The RPU may further comprise a request node disposed in the first silicon die, wherein the request node does not include a hardware-coherent cache and is configured to communicate with the interconnect component according to the CHI-based protocol.

The C2C interface may utilize a streaming interface protocol based on Advanced Microcontroller Bus Architecture (AMBA) Credited eXtensible Stream (CXS) for communication between the first and second silicon dies, and wherein the RPU is configured to aggregate NVLink request packets into a single CHI flit prior to transmission over the C2C interface. The RPU may be further configured to enable bidirectional access, wherein the entity accesses memory coupled to the memory channels via the NVLink interface, and the processing cores access entity-attached memory via the CHI interface, and wherein the apparatus further comprises on-package high-bandwidth memory (HBM) coupled to the NVLink interface, and the RPU translates CHI-based protocol requests targeting the HBM into NVLink-based protocol requests. Additionally, the first silicon die may comprise a second interconnect component, and wherein the RPU is coupled to both the interconnect component and the second interconnect component to provide increased bandwidth for the entity to access resources. The interconnect component may comprise a crosspoint comprising at least four mesh ports and at least two device ports, and wherein the CHI interface of the RPU is coupled to one of the at least two device ports. Optionally, the RPU is configured to expose registers accessible utilizing memory-mapped I/O (MMIO) operations via an Advanced Peripheral Bus (APB) interface, enabling detection of at least one of: RPU configuration, NVLink translation capabilities, or C2C interface status. The first silicon die may further comprise a gateway configured to communicate with the interconnect component according to the CHI-based protocol, wherein the gateway comprises a CMN multi-Chip Gateway (CCG) that interfaces with the RPU. Furthermore, the NVLink interface may support virtual channels and the RPU maps the virtual channels to corresponding quality-of-service fields of the CHI-based protocol.

In one embodiment, a system comprises: a first silicon die comprising a coherent interconnect based on Coherent Hub Interface (CHI) protocol, and processing cores coupled via the coherent interconnect to memory controllers, wherein the memory controllers are coupled to memory channels coupled to at least 64 GB of memory; second silicon dies coupled to the first silicon die via respective Chip-to-Chip (C2C) interfaces, wherein the second silicon dies comprise NVLink interfaces configured to communicate according to one or more NVLink-based protocols with respective external entities; and resource provisioning units (RPUs), disposed in at least one of the first or second silicon dies, configured to translate between the one or more NVLink-based protocols and the CHI-based protocol to enable the external entities to access resources via their respective NVLink interfaces, C2C interfaces, and the memory controllers.

Optionally, the C2C interfaces may be based on at least one of CHI C2C, NVLink-C2C, or coherent NVLink (cNVLink), and wherein the second silicon dies further comprise die-to-die (D2D) adapters coupled to the NVLink interface. Optionally, the second silicon dies further comprise physical-layers (PHYs) based on at least one of: a Universal Chiplet Interconnect Express (UCIe) PHY, an NVLink-C2C PHY, a PCI Express PHY, a Compute Express Link (CXL) PHY, or a custom PHY configured for chip-to-chip communication. The RPUs may be configured to translate first physical addresses associated with the one or more NVLink-based protocols to second physical addresses associated with the CHI-based protocol, and to translate NVLink command encodings to corresponding CHI opcodes. At least one RPU may comprise a first portion disposed in the first silicon die and a second portion disposed in one of the second silicon dies, wherein the first portion comprises a CHI interface and the second portion comprises an NVLink interface associated with the second portion. In some implementations, at least one of the second silicon dies is implemented as an NVLink Fusion chiplet or an NVLink chiplet configured to enable the processing cores to access resources coupled to the second silicon die via its NVLink interface.

In one embodiment, an artificial intelligence (AI) cluster system comprises: processor chips interconnected via inter-socket links (ISoLs), wherein the processor chips comprise coherent interconnects based on Coherent Hub Interface (CHI) protocol, and processing cores coupled via the coherent interconnects to memory controllers that are coupled to memory channels coupled to at least 64 GB of memory times the number of the processor chips; second silicon dies coupled to the processor chips via Chip-to-Chip (C2C) interfaces, wherein the second silicon dies comprise NVLink interfaces configured to communicate according to NVLink-based protocol with AI accelerators; resource provisioning units (RPUs) disposed in at least one of the processor chips or the second silicon dies, configured to translate between the NVLink-based protocol and the CHI-based protocol; and wherein the RPUs enable the AI accelerators to access memory resources across the processor chips via the NVLink interfaces, the C2C interfaces, the coherent interconnects, and the ISoLs.

Optionally, the processor chips may further comprise on-package high-bandwidth memory (HBM) coupled to the NVLink interfaces of the second silicon dies, and wherein the RPUs enable bidirectional accesses such that AI accelerators access memory coupled to the memory channels via the NVLink interfaces, and the processing cores access accelerator-attached memory via the CHI interfaces.

Optionally, the different NVLink interfaces utilize different physical address spaces. At least one of the processor chips may comprise interconnect components, and wherein its corresponding RPU is coupled to the interconnect components to provide increased bandwidth for AI accelerators to access resources. The NVLink interfaces may support virtual channels, and the RPUs map virtual channels to corresponding quality-of-service fields of the CHI-based protocol, enabling prioritization of AI training data transfers. The RPUs may translate NVLink read requests to CHI requests carrying ReadOnce opcodes for non-cacheable data access or ReadShared opcodes for cacheable data access. Optionally, the RPU may further translate CHI responses to NVLink responses for delivery to the AI accelerators, such as translate CHI responses carrying CompData opcodes to NVLink responses. In certain aspects, the NVLink interfaces are included in NVLink Fusion modules disposed on the second silicon dies, wherein the NVLink Fusion modules enable their associated AI accelerators to access resources via the NVLink interfaces and the coherent interconnects of the corresponding processor chips.

FIG. 86A illustrates one embodiment of a system that implements an NVLink-based switch, or an NVLink Memory Switch, utilizing an interconnect based on a CHI protocol. The switch is coupled to two entities marked in the figure as Entity.1/GPU.1 and Entity.2/GPU.2. The switch may include processing cores, accelerator cores such as security accelerators, and memory controllers, coupled to the CHI-based interconnect. The switch utilizes protocol translations, performed by each of the RPUs, between NVLink-based interfaces and the switch interconnect. The first RPU may enable Entity.1/GPU.1 to access, via the first NVLink interface and the switch interconnect (which may be a coherent interconnect), resources mapped to the address space of the switch interconnect, such as memory resources of the switch. Correspondingly, the second RPU may enable Entity.2/GPU.2 to access, via the second NVLink interface and the switch interconnect, resources mapped to the address space of the switch interconnect, such as memory resources of the switch. The first RPU may map resources of Entity.1/GPU.1, such as memory resources, to the physical address space associated with the switch interconnect, and may further enable Entity.2/GPU.2 to access resources mapped to the address space of the switch interconnect, so that Entity.2/GPU.2 is able to access memory resources of Entity.1/GPU.1, via the second NVLink interface, the switch interconnect, and the first NVLink interface. Correspondingly, the second RPU may map resources of Entity.2/GPU.2, such as memory resources, to the physical address space associated with the switch interconnect, and may further enable Entity.1/GPU.1 to access resources mapped to the address space of the switch interconnect, so that Entity.1/GPU.1 is able to access memory resources of Entity.2/GPU.2, via the first NVLink interface, the switch interconnect, and the second NVLink interface.

FIG. 86B illustrates one embodiment of a TFD demonstrating NVLink switching operation between entities through a switch interconnect. Entity.1/GPU.1 issues a first NVLink request with source ID, destination ID and an address (AS.1.1). The first NVLink request is switched through the switch interconnect wherein a first RPU (RPU.1) translates it to an ARM CHI request with a ReadOnce opcode. The embodiment demonstrates a switching operation wherein the switch typically does not change the message or the PDU, similar to how an Ethernet switch typically does not change an Ethernet frame. The first NVLink request is translated to an ARM CHI request that is translated to a second NVLink request, resulting in a switching operation of an NVLink request that passes from Entity.1/GPU.1 to Entity.2/GPU.2 through the first RPU, the switch interconnect, and a second RPU (RPU.2). The first RPU converts the first NVLink request to an ARM CHI request carrying a ReadOnce opcode, possibly utilizing user-defined fields within the switch interconnect protocol to pass fields of the first NVLink request such as NVLink source ID, destination ID, tags, and length, to the second RPU, wherein the ARM CHI request is translated to the second NVLink request that is sent to Entity.2/GPU.2. The ARM CHI protocol may include fields such as RSVDC that may be utilized as user-defined fields for passing transaction-related information such as fields from the first NVLink request of Entity.1/GPU.1 to the second NVLink request sent to Entity.2/GPU.2. Some of the fields of the NVLink transaction received from Entity.1/GPU.1 may be translated, whereas some of the fields may be truncated or compressed to fit within the available user-defined field widths. The second RPU translates the ReadOnce ARM CHI request to the second NVLink request, and translates the first NVLink response to an ARM CHI RDAT. The first RPU on the receiving side may translate the ARM CHI response (ARM CHI RDAT) with CompData opcode and data back to a second NVLink response. The ARM CHI RDAT may also utilize user-defined fields for passing information to the other side, while the data itself may be passed natively through the ARM CHI RDAT data field.

FIG. 92A illustrates one embodiment of a system comprising a third entity (Entity.3), which may be an xPU, comprising an I/O die, that may communicate, via a first RPU (RPU.1) die, with a first entity (Entity.1), which may be a first GPU, or a first switch, according to a first protocol (Protocol.1), which may be a UALink-based protocol, such as UPLI. The I/O die may further communicate, via a second RPU (RPU.2) die, with a second entity (Entity.2), which may be a second GPU, or a second switch, according to a second protocol (Protocol.2), which may be a UALink-based protocol, such as UPLI. The I/O die may include an interconnect configured to switch traffic associated with an interconnect protocol (protocol.3) that may be based on ARM CHI, NVIDIA NVLink, Intel ICPIP, or AMD Infinity Fabric (IF).

The first RPU (RPU.1) may perform translations between the first protocol and the third protocol (Protocol.3), such as between a UALink-based protocol, which may be UPLI, and the interconnect protocol, wherein the second RPU may perform translations between the second protocol and the third protocol, such as between a UALink-based protocol, that may UPLI and the interconnect protocol, enabling the first entity to communicate with the second entity, according to a UALink-based protocol, such as UPLI, wherein the third entity may operate as a UALink switch, or a UALink-based switch. In some embodiments, the first protocol and the second protocol may belong to the same UALink-based protocol revision, whereas in other embodiments, the first protocol and the second protocol may belong to different protocol revisions, wherein the first RPU and the second RPU may provide translations between protocol revisions.

FIG. 92B illustrates one embodiment of a TFD demonstrating translations performed by a third entity (Entity.3), which may be an xPU, such as translations between protocols, that may enable the third entity to operate as a UALink switch, or as a UALink-based switch. The third entity may receive from a first entity (Entity.1), via the first RPU (RPU.1), a first UPLI Request (Req) comprising Request Command (e.g. ReqCmd(Read)), Request Source Physical Accelerator ID (e.g., ReqSrcPhysAccID(a.1)), Request Destination Physical Accelerator ID (e.g., ReqDstPhysAccID (b.1)), Request Address (e.g., ReqAddr(AS.1.1)), Request Tag (e.g., ReqTag(c.1.1)), and Request Length (e.g., ReqLen (d.1.1)). The third entity may translate, optionally via the first RPU, the first UPLI Request (Req), to a first set one or more Protocol Data Units (PDUs) of an interconnect protocol utilized by the third entity. The third entity may further translate, optionally via the second RPU (RPU.2), the first set one or more PDUs of the interconnect protocol to a second UPLI Request (Req), comprising Request Command (e.g. ReqCmd(Read)), Request Source Physical Accelerator ID (e.g., ReqSrcPhysAccID(a.1)), Request Destination Physical Accelerator ID (e.g., ReqDstPhysAccID(b.1)), Request Address (e.g., ReqAddr(AS.1.1)), Request Tag (e.g., ReqTag(c.1.1)), and Request Length (e.g., ReqLen (d.1.1)), wherein the third entity may send the second UPLI Request (Req) to a second entity (Entity.2). Optionally, the second UPLI Request (Req) may be equivalent to the first UPLI Request (Req).

Upon receiving a response from the second entity, the third entity may translate, optionally via the second RPU, the response to a second set one or more PDUs of the interconnect protocol. Wherein the response from the second entity may include a first UPLI Read Response/Data (RdRsp) comprising Read Response Source Physical Accelerator ID (e.g., RdRspSrcPhysAccID(b.1)), Read Response Destination Physical Accelerator ID (e.g., RdRspDstPhysAccID(a.1)), Read Response Transaction Tag (e.g., RdRspTag(c.1.1)), and Read Response Data (e.g., RdRspData (*Data*)).

The third entity may further translate, optionally via the first RPU (RPU.1), the second set one or more PDUs of the interconnect protocol to a second UPLI Read Response/Data (RdRsp) comprising Read Response Source Physical Accelerator ID (e.g., RdRspSrcPhysAccID(b.1)), Read Response Destination Physical Accelerator ID (e.g., RdRspDstPhysAccID(a.1)), Read Response Transaction Tag (e.g., RdRspTag(c.1.1)), and Read Response Data (e.g., RdRspData (*Data*)), wherein the third entity may send the second UPLI Read Response/Data (RdRsp) to the first entity. In some embodiments, the second UPLI Read Response/Data (RdRsp) may be equivalent to the first UPLI Read Response/Data (RdRsp). In some embodiments, the first UPLI Request (Req), the second UPLI Request (Req), the first UPLI Read Response/Data (RdRsp), and the second UPLI Read Response/Data (RdRsp), may belong to the same protocol revision, whereas in other embodiments, the first UPLI Request (Req), and the second UPLI Read Response/Data (RdRsp) may belong to different protocol revisions than the second UPLI Request (Req), and the first UPLI Read Response/Data (RdRsp).

FIG. 87A illustrates one embodiment of a memory switch configured to provide memory to entities coupled to it. Entity.1 is coupled to the memory switch wherein the entity may utilize the memory coupled to the coherent interconnect. The memory switch may function as an NVLink-based switch or an NVLink memory pool, providing switching capabilities between entities while also enabling access to memory resources.

FIG. 87B illustrates one embodiment of a TFD demonstrating an NVLink request from Entity.1 to access memory. RPU.1 receives an NVLink request carrying a read request with an address, and translates it to an ARM CHI request with a ReadOnce opcode, potentially with a different address due to address translation. The request flows through the coherent interconnect to a home node (HN), which may translate it to a ReadNoSnp transaction destined to a memory controller (MC). The MC retrieves the data from memory and may return the data directly to RPU.1 without routing through the HN, or alternatively may send the data through the HN to RPU.1. Then RPU.1 generates the NVLink response with the data to Entity.1.

FIG. 100 illustrates one embodiment of a system wherein CXL runs over a PHY based on IEEE 802.3 PMA, and the connection proceeds over CCCI (cache-coherent ISoL). The system includes an element that receives CXL over an IEEE 802.3 based PMA, includes a CXL device, and then connects over CCCI. The embodiment demonstrates protocol conversion from CXL over a PHY based on IEEE 802.3 to CCCI, utilizing a ring-based architecture as one possible implementation.

FIG. 101 illustrates one embodiment of a system demonstrating direct conversion from a CXL device to a CCCI protocol. The system shows a CXL interface such as a CXL device or CXL EP coupled to an RPU that connects to a CCCI interface, specifically referenced as R2CCCI rather than R2ISoL. The embodiment demonstrates translation from CXL protocol directly into CCCI protocol.

FIG. 126A illustrates one embodiment of a system that couples between CXL protocol on one side and CCCI protocol (such as UPI) on the other side. The system includes an RPU that translates between CXL (via CXL device or CXL EP) and CCCI interface that couples the RPU with a processor. The system may be implemented as a chiplet or a discrete component comprising the CXL device, RPU, and the CCCI interface.

FIG. 126B illustrates one embodiment of a TFD showing the translation of a CXL.mem protocol transaction to a UPI protocol transaction. The RPU receives the CXL transaction from the CXL interface and translates it to the UPI transaction on the CCCI interface, including translating the opcodes and the relevant fields.

FIG. 103A illustrates a prior art AMD xPU architecture. The system includes an I/O die, a Compute Die such as a Core Complex Die (CCD) in AMD terminology, and a coherent interconnect such as AMD Infinity Fabric connecting the two dies. The embodiment shows processing cores, a root port, and represents an established CPU design with a designated area marked within the architecture.

FIG. 103B illustrates one embodiment of a CPU with a designated area modified by a reduced number of processing cores and an added UALink port and an RPU. It demonstrates utilization of a designated area where cores are removed or reduced in number, and the area is repurposed to include a UALink port and an RPU, enabling UALink connectivity within the processor architecture. The structure maintains the I/O die and compute die arrangement with a coherent interconnect, such as AMD Infinity Fabric.

FIG. 104 illustrates one embodiment of a memory switch or AI switch implementation utilizing two IC packages, or two processors with designated areas for building a switch. The GPUs are coupled to UALink ports in a first processor, and another set of GPUs are coupled to UALink ports in a second processor. The processors are coupled via one or more ISoL ports, enabling switching of traffic from the UALink ports placed into the designated areas through the ISoL interface, such as NVIDIA NVLink-C2C, ARM CHI C2C, Intel UPI, or AMD Infinity-Fabric. The embodiment demonstrates how a switch can be constructed based on processor architectures with modified designated areas.

FIG. 105 illustrates one embodiment of a Multi-Headed Device (MHD) implementation based on a designated area within an MxPU. The system shows an established CPU design with a designated area where processing cores are replaced with multiple CXL endpoint ports, creating an MHD multi-headed device, where the designated area may be modified to accommodate multiple CXL endpoints, enabling MHD functionality within the processor architecture.

FIG. 106 illustrates a prior art established CPU design, such as an Intel x86 CPU design, with a designated area marked within the processor architecture. The system represents a baseline processor design with standard components, including processing cores, caches, and interconnect structures, with a designated area identified for potential modification in subsequent implementations.

FIG. 107 illustrates one embodiment wherein processing cores in a designated area are removed and replaced with a mix of CXL endpoint ports and RPUs. The system demonstrates a CXL endpoint focused implementation where the designated area contains multiple CXL endpoints instead of the original processing cores, enabling CXL connectivity and functionality within the processor architecture.

FIG. 108 illustrates one embodiment wherein a designated area includes UALink ports. The system shows processing cores removed from the designated area and replaced with UALink ports and RPUs, creating a UALink focused implementation. The embodiment is an alternative configuration to the CXL-focused implementation, where the same designated area approach is utilized for UALink connectivity instead of CXL endpoints.

In one embodiment, an apparatus comprises processing cores coupled via a coherent interconnect based on Coherent Hub Interface (CHI) protocol to memory controllers, wherein the memory controllers are coupled to memory channels capable of supporting more than 64 GB of memory; first and second resource provisioning units (RPUs) comprising first and second NVLink interfaces and first and second CHI interfaces; wherein the first and second NVLink interfaces utilize differential pairs and are capable of communicating according to NVLink-based protocol with first and second entities external to the apparatus, respectively; and wherein the first and second RPUs are configured to translate between the NVLink-based protocol and the CHI-based protocol to enable the first and second entities to concurrently access the memory via the respective first and second NVLink interfaces and the coherent interconnect.

Optionally, the first entity comprises a graphics processing unit (GPU) configured to: access dynamic random-access memory (DRAM) coupled to the memory channels via the first NVLink interface and the first RPU, and receive memory access requests from the processing cores targeting GPU-attached memory; wherein the first RPU is further configured to translate CHI-based protocol requests to NVLink-based protocol requests. Optionally, the bidirectional communication enables the GPU to function as both an initiator of memory transactions to system DRAM and a target for processor-initiated accesses to GPU-attached memory such as HBM. The RPU may maintain transaction context for both directions, managing protocol differences in flow control, credit management, and response generation between NVLink and CHI-based protocols.

In some implementations, the GPU comprises on-package high-bandwidth memory (HBM), and the first RPU translates CHI-protocol write-back transactions targeting the HBM into NVLink-protocol transactions. The first RPU may be further configured to maintain translations from first physical addresses associated with the first NVLink interface to physical addresses associated with the coherent interconnect, and the second RPU may be further configured to maintain separate translations from second physical addresses associated with the second NVLink interface to the physical addresses associated with the coherent interconnect. The coherent interconnect may comprise first and second interconnect components, wherein the first RPU is coupled to the first interconnect component and the second RPU is coupled to the second interconnect component, providing distributed bandwidth for the first and second entities to access resources.

A path between at least one of the first or second RPUs and at least one memory controller and/or processing core may comprise one interconnect component. In one embodiment, the RPU and at least one memory controller may be coupled to the same interconnect component, providing a low-latency communication path between the NVLink interface and memory attached to the xPU.

In certain aspects, each of the first and second RPUs exposes registers accessible utilizing memory-mapped I/O (MMIO) operations via an Advanced Microcontroller Bus Architecture (AMBA) Advanced Peripheral Bus (APB) interface, enabling detection of RPU presence, NVLink-interface status, and translation capabilities. Each of the first and second RPUs may also be configured to: translate physical addresses associated with the respective NVLink-based protocol to physical addresses associated with the CHI-based protocol, and translate NVLink command encodings to corresponding CHI opcodes. Furthermore, at least one of the first or second RPUs may comprise a gateway utilizing a streaming interface protocol based on Advanced Microcontroller Bus Architecture (AMBA) Credited eXtensible Stream (CXS); and wherein the first and second entities are accelerators, from which at least one comprises a graphics processing unit (GPU). Additionally, each of the first and second RPUs may comprise a request node that does not include a hardware-coherent cache and is configured to communicate with the coherent interconnect according to the CHI-based protocol; and wherein the first and second entities are accelerators, from which at least one comprises a graphics processing unit (GPU).

At least one of the request nodes may comprise an I/O-coherent request node (RN-I) or an I/O-coherent request node with distributed-virtual-memory support (RN-D). In some implementations, the coherent interconnect comprises at least one crosspoint comprising at least four mesh ports and at least two device ports, wherein at least one of the first or second RPUs is coupled to one of the at least two device ports; and wherein the first and second entities are accelerators, from which at least one comprises a graphics processing unit (GPU). Each of the first and second NVLink interfaces may support virtual channels, and the respective RPUs map the virtual channels to corresponding quality-of-service fields of the CHI-based protocol. The mapping between NVLink virtual channels and CHI quality-of-service fields may be programmable via the MMIO registers exposed by the RPUs. Furthermore, the memory may comprise dynamic random-access memory (DRAM) of at least 256 GB; wherein the first and second entities are accelerators, from which at least one comprises a graphics processing unit (GPU); and wherein the first and second entities can concurrently access different regions of the DRAM.

The apparatus may further comprise a third NVLink interface coupled via a third RPU to the coherent interconnect, enabling a third entity to access resources via the third NVLink interface and the coherent interconnect, while maintaining I/O-coherency without cache coherency participation. Optionally, the embodiment may be scaled to support multiple NVLink-coupled entities, with their own translation paths through the I/O-coherent or non-coherent nodes, enabling high-bandwidth parallel access to system memory resources while the CHI-based protocol maintains appropriate ordering and coherency at the I/O level without requiring the NVLink entities to participate in cache coherency protocols. Moreover, each of the first and second RPUs may maintain a link translation look-aside buffer that translates NVLink network addresses, including destination identifiers, into physical addresses employed by the coherent interconnect.

FIG. 96A illustrates one embodiment of a system comprising a processor incorporating protocol interfaces integrating an RPU with a CXL device. The RPU includes or is coupled to a CXL device that is coupled to both (i) a CCG node for handling coherent CXL.mem and/or CXL.cache transactions, and (ii) an RN-D node for handling non-coherent CXL.io transactions. The system may optionally couple the RPU to the CCG over a CXS interface, providing a path for coherent communications. The connection of NVLink-C2C interfaces to fully coherent request nodes (RN-F) and fully coherent home nodes (HN-F) may be included within a gateway node structure, enabling bidirectional coherent access wherein a GPU may read from the processor's DRAM through the RN-F node and the processor cores may read from the GPU's HBM through the HN-F node.

FIG. 96B illustrates one embodiment of a system including a CPU, which may be a custom CPU design, incorporating NVLink-C2C capabilities and optionally including an NVLink-C2C chiplet, such as NVLink Fusion. The system integrates a Global Fabric-Attached Memory (G-FAM) Device (GFD) that operates as a specialized CXL device. The GFD may support only CXL.mem transactions, allowing it to service external requests through CCG nodes that are optimized for handling CXL.mem traffic, thereby simplifying the design by eliminating the need for separate CXL.io handling paths typically managed by RN-D or RN-I nodes.

In one embodiment, an apparatus comprises processing cores coupled via a coherent interconnect to memory controllers, wherein the coherent interconnect is based on Coherent Hub Interface (CHI) protocol, and the memory controllers are coupled to memory channels capable of supporting more than 64 GB of memory; interconnect gateway coupled to the coherent interconnect, or a Fully Coherent Request Node (RN-F) comprising a hardware-coherent cache and a Fully Coherent Home Node (HN-F) comprising a Point of Coherence (PoC) coupled to the coherent interconnect; an NVLink Chip-to-Chip (NVLink-C2C) interface configured to communicate according to NVLink-C2C coherent protocol with an entity external to the apparatus; and an NVLink-C2C to CHI adapter configured to translate between the NVLink-C2C coherent protocol and the CHI-based protocol, wherein the adapter couples the NVLink-C2C interface to the CCGs or the RN-F and HN-F to enable bidirectional coherent memory access between the entity and the processing cores.

The following are two exemplary embodiments according to which the apparatus enables full cache-coherent communication between entities using NVLink-C2C protocol and the CHI-based system. In the first embodiment, dedicated RN-F and HN-F nodes provide coherent connectivity, wherein the RN-F node may generate transactions defined by the CHI-based protocol and support snoop transactions, while the HN-F node manages coherency by snooping required RN-F nodes and serving as both the Point of Coherence and Point of Serialization. In the second embodiment, CCGs provide integrated coherent gateway functionality that internally implements RN-F and HN-F capabilities. The adapter may perform coherency-preserving protocol translations that enable the external entity to read from the apparatus's DRAM through the coherent request path while the processing cores may read from the entity's memory through the coherent home path, maintaining full cache coherency across both directions of communication.

Optionally, the entity comprises a graphics processing unit (GPU), and wherein: the GPU accesses dynamic random-access memory (DRAM) coupled to the memory channels through the NVLink-C2C interface, the adapter, and the coherent interconnect; and the processing cores access memory attached to the GPU through the coherent interconnect, the adapter, and the NVLink-C2C interface. Optionally, the bidirectional coherent access enables the GPU to read from the processor's DRAM while maintaining cache coherency utilizing the coherent request functionality, and simultaneously allows the processor cores to access GPU-attached memory such as High Bandwidth Memory (HBM) through the coherent home functionality, creating a coherent memory space across heterogeneous processing elements.

The NVLink-C2C interface may comprise an NVLink Fusion chiplet coupled to the adapter via a physical layer (PHY), wherein the PHY is a UCIe PHY configured for chiplet-to-chiplet communication. Optionally, the NVLink Fusion chiplet may provide a modular embodiment of NVLink-C2C protocol processing, with the UCIe PHY offering a standardized chiplet interconnect that enables integration of NVLink-C2C coherent capabilities into processors that may not have native NVLink support.

The adapter may comprise a CHI C2C die-to-die adapter with UCIe streaming, configured to bridge between the UCIe PHY domain and the CHI-based protocol domain while maintaining coherency. Optionally, the ARM CHI C2C die-to-die adapter may implement streaming optimizations for UCIe transfers while performing the necessary protocol translations between NVLink-C2C and CHI, managing credit flow, transaction ordering, and coherency state transitions required for maintaining cache coherency across the die boundary.

The apparatus may comprise the RN-F and HN-F coupled to the coherent interconnect, and the adapter couples the NVLink-C2C interface to the RN-F and HN-F; and wherein the apparatus further comprises additional CCGs coupled to the coherent interconnect, and a Compute Express Link (CXL) device coupled to the additional CCGs, configured to communicate with a second entity based on a CXL protocol, wherein the CXL device and the NVLink-C2C interface share access to the memory channels through their respective coherent nodes. Optionally, this configuration provides dedicated coherent paths for different protocols, with the NVLink-C2C interface utilizing discrete RN-F and HN-F nodes while the CXL device utilizes CCGs that internally implement their own coherent functionality, enabling optimizations of protocol paths while sharing access to memory resources.

The CXL device may be configured to route CXL.mem and/or CXL.cache transactions through the additional CCGs via a CXS interface; the apparatus further comprises an I/O-Coherent Request Node with DVM support (RN-D) coupled to the coherent interconnect; and the CXL device is further configured to route CXL.io transactions through the RN-D via an AXI interface. Optionally, the separation of CXL protocol types leverages the additional CCGs' coherency management capabilities for CXL.mem and/or CXL.cache transactions while utilizing the simpler RN-D path for CXL.io transactions, with the CXS interface providing an optimized bridge protocol for coherent transactions and the AXI interface handling I/O transactions similar to PCIe.

The CXL device may comprise a Global Fabric-Attached Memory (G-FAM) Device (GFD) configured to support only CXL.mem transactions through the additional CCGs. Optionally, the GFD embodiment allows the CXL transactions to be processed through the coherent path provided by the additional CCGs, which is particularly suitable for memory pooling applications wherein I/O functionality is not required.

The second entity may communicate with the CXL device via a physical layer based on IEEE 802.3 physical medium attachment (PMA) coupled to a resource provisioning unit (RPU) that includes the CXL device. Optionally, the physical layer based on IEEE 802.3 PMA may enable the CXL device to receive CXL protocol messages encapsulated within a carrier protocol, extending the reach of CXL communications beyond traditional PCIe-based physical layers while the NVLink-C2C interface provides high-bandwidth coherent connectivity for tightly-coupled accelerators.

The apparatus may comprise the CCGs coupled to the coherent interconnect, and the adapter couples the NVLink-C2C interface to the CCGs; and wherein the apparatus further comprises a Compute Express Link (CXL) device coupled to additional CCGs, wherein the additional CCGs provide shared coherent infrastructure for both the NVLink-C2C interface and the CXL device. Optionally, this configuration leverages the CCGs as unified coherent gateways that handle both NVLink-C2C and CXL protocols, with the CCGs internally implementing the coherent request and home functionality required for coherent transactions, potentially simplifying the system architecture by consolidating coherent protocol handling within shared CCG blocks.

The processing cores may be part of a custom CPU comprising an integrated NVLink-C2C interface, and wherein the entity comprises an NVIDIA Blackwell GPU, an accelerator processing unit (xPU), or a second custom CPU with an NVLink-C2C interface. Optionally, the custom CPU design may incorporate native NVLink-C2C support to enable direct coherent communication with NVIDIA GPUs or other NVLink-C2C capable devices, eliminating the need for protocol bridges in GPU-accelerated computing systems while maintaining full cache coherency between the CPU and accelerator domains.

The interconnect gateway may comprise CMN multi-Chip Gateway (CCG) that utilizes a streaming interface protocol, wherein the CCG comprises a link agent that supports the streaming interface protocol, providing flit packing and unpacking, end-to-end data integrity, and a flit-retry mechanism for reliability, availability and serviceability (RAS) containment when data corruption is detected. Additionally, the interconnect gateway may comprise at least one of Coherent Multi-Chip Link (CML) or Cache Coherent Interconnect for Accelerators (CCIX) Gateway (CXG) that utilizes a streaming interface protocol, and wherein the gateway is configured to utilize a 32-bit cyclic-redundancy check (CRC-32) to protect transactions conforming to the streaming interface protocol.

In one embodiment, a system, comprises: a processor comprising processing cores coupled via a coherent interconnect to memory controllers, wherein the coherent interconnect is based on Coherent Hub Interface (CHI) protocol, and the memory controllers are coupled to memory channels with more than 64 GB of memory; a first graphics processing unit (GPU) coupled to the coherent interconnect via a first interface path comprising a first NVLink interface and a first adapter; a second GPU coupled to the coherent interconnect via a second interface path comprising a second NVLink interface and a second adapter; and wherein the first adapter and the second adapter are configured to translate between NVLink-based protocol and the CHI-based protocol, enabling the first GPU and the second GPU to communicate with each other through the coherent interconnect while both GPUs have access to the memory via the coherent interconnect.

Optionally, the system enables GPU-to-GPU communication through the processor's coherent interconnect rather than through direct GPU-to-GPU links or NVSwitch, providing a flexible communication architecture wherein GPUs may exchange data while sharing access to the processor's memory resources. The adapters perform protocol translations between the NVLink domains and the CHI domain, managing differences in transaction formats, flow control, and addressing. The coherent interconnect serves as a common communication fabric that routes transactions between the GPUs while also handling memory access requests from both GPUs and the processor cores, potentially enabling new computational models wherein GPUs collaborate utilizing shared memory spaces managed by the processor. Optionally, this embodiment may provide an alternative approach to GPU-to-GPU communication that differs from conventional direct GPU interconnects such as NVSwitch or point-to-point NVLink connections. Traditional GPU communication architectures typically employ dedicated switching fabric like NVSwitch that creates a fully-connected topology among GPUs, or utilize direct NVLink connections between GPU pairs. This embodiment may route GPU-to-GPU communications through a processor's coherent interconnect, potentially offering several technical advantages. It may leverage existing processor interconnect infrastructure without requiring additional dedicated GPU switching hardware, may enable GPUs to communicate while simultaneously accessing processor-attached memory through the same interconnect, and may allow heterogeneous accelerators using different protocols to participate in the same communication fabric. This embodiment may also facilitate integration scenarios wherein the number or configuration of GPUs is not known at processor design time, as the coherent interconnect may dynamically route communications between whatever GPUs are coupled. Furthermore, by translating GPU protocols to the processor's native coherent protocol, the system may apply the processor's existing quality-of-service, security, and routing mechanisms to GPU traffic, potentially simplifying system-level traffic management. The protocol translation performed by the adapters may enable unified memory architectures wherein GPUs, CPUs, and other accelerators share a common view of memory resources.

Optionally, the first NVLink interface and the second NVLink interface may be NVLink interfaces configured for I/O-coherent communication; the first adapter may couple the first NVLink interface to an I/O-Coherent Request Node with DVM support (RN-D) and a Non-coherent Home Node (HN-I); and wherein the second adapter may couple the second NVLink interface to a second RN-D and a second HN-I. Optionally, the I/O-coherent NVLink configuration may utilize I/O-Coherent nodes that do not maintain hardware cache coherency, suitable for GPU workloads that manage their own memory consistency, with the RN-D nodes handling DVM transactions and the HN-I nodes managing IO ordering for GPU-initiated operations.

In some implementations, the first NVLink interface and the second NVLink interface may be NVLink-C2C interfaces configured for coherent communication; the first adapter may couple the first NVLink-C2C interface to a Fully Coherent Request Node (RN-F) and a Fully Coherent Home Node (HN-F); and the second adapter may couple the second NVLink-C2C interface to a second RN-F and a second HN-F, enabling cache-coherent GPU-to-GPU communication through the coherent interconnect. Optionally, the coherent NVLink-C2C configuration enables the GPUs to participate in the processor's cache coherency protocol, with the RN-F nodes supporting snoop transactions and the HN-F nodes managing coherency as Points of Coherence, allowing GPUs to maintain cache-coherent views of shared data structures during communication.

The first interface path may further comprise a first NVLink Fusion chiplet coupled to the first adapter via a first physical layer (PHY); the second interface path may further comprise a second NVLink Fusion chiplet coupled to the second adapter via a second PHY; and the first and second PHYs may be selected from a UCIe PHY, an NVLink-C2C PHY, or a custom PHY. Optionally, the NVLink Fusion chiplets may provide modular NVLink-based protocol processing capabilities that can be integrated into systems without native NVLink support, with the PHY selection enabling different physical layer embodiments based on packaging technology and bandwidth requirements.

The system may further comprise a third accelerator coupled to the coherent interconnect via a third interface path; wherein the third accelerator may be selected from a custom accelerator, an xPU, or a third GPU; and wherein the third interface path may comprise a Compute Express Link (CXL) device coupled to CXL/CCIX Gateways (CCGs), enabling the third accelerator to communicate with the first GPU and the second GPU through the coherent interconnect. Optionally, the mixed configuration demonstrates the flexibility of the coherent interconnect to support heterogeneous accelerators using different protocols, with CXL-attached accelerators communicating with NVLink-attached GPUs based on appropriate protocol translations at their respective adapter/gateway interfaces.

Additionally, the first GPU may read data from the memory through the first adapter and the coherent interconnect while the second GPU reads the same data from the memory; and the first GPU may write results to the memory that are subsequently read by the second GPU, implementing a producer-consumer pattern utilizing the processor's memory. Optionally, the shared memory access patterns may enable collaborative computing models wherein GPUs coordinate utilizing processor memory rather than utilizing direct GPU memory transfers, potentially simplifying programming models and enabling dynamic work distribution among GPUs.

The first adapter may comprise a CHI C2C die-to-die adapter configured to translate between the first NVLink Fusion chiplet's protocol domain and the CHI-based protocol domain; and the second adapter may comprise a second CHI C2C die-to-die adapter configured to translate between the second NVLink Fusion chiplet's protocol domain and the CHI-based protocol domain. Optionally, the ARM CHI C2C die-to-die adapters may provide protocol translation while managing inter-die communication requirements including credit flow, transaction ordering, and optional support for UCIe streaming when coupled with UCIe PHYs.

Furthermore, the first GPU may be an NVIDIA Blackwell GPU with High Bandwidth Memory (HBM); the second GPU may be a different GPU architecture; and the coherent interconnect may enable the asymmetric GPUs to exchange data despite differences in their native memory architectures and protocol embodiments. Optionally, the support for asymmetric GPU configurations may enable systems to combine GPUs with different capabilities, memory hierarchies, or vendor implementations, with the coherent interconnect and adapters abstracting protocol differences to enable interoperability.

The first adapter may translate GPU physical addresses within a first GPU physical address space to CHI physical addresses within the coherent interconnect's physical address space; the second adapter may translate GPU physical addresses within a second GPU physical address space to CHI physical addresses; and the processor may maintain address mappings that enable the first GPU to access memory regions allocated to the second GPU through the coherent interconnect. Optionally, the multi-level address translation may enable the GPUs to maintain their own physical address spaces while the processor's coherent interconnect provides a unified addressing scheme for routing transactions, with the processor potentially implementing memory protection and isolation between GPU physical address spaces.

The system may further comprise additional GPUs coupled to the coherent interconnect via additional interface paths, the additional interface paths may comprise NVLink interfaces and adapters; wherein the GPUs may communicate with each other through the coherent interconnect in a fully-connected logical topology without requiring a dedicated GPU switch. Optionally, the scalable architecture may support arbitrary numbers of GPUs limited by the coherent interconnect's capacity rather than by dedicated GPU switching hardware, with the GPUs able to communicate with each other through the processor's routing infrastructure.

In one embodiment, an apparatus comprises: processing cores coupled via a coherent interconnect to: a interconnect gateway, an I/O-Coherent node, and memory controllers; wherein the coherent interconnect is based on Coherent Hub Interface (CHI), the processing cores are configured to respond to snoop requests that utilize physical addresses within a first physical address space, and the memory controllers are coupled to memory channels capable of supporting more than 64 GB of memory; and a resource provisioning unit (RPU) configured to: receive transmissions comprising data indicative of Compute Express Link (CXL) messages; wherein the CXL messages comprise CXL.mem messages and/or CXL.cache messages, and at least some of the second CXL.mem and/or CXL.cache messages carry physical addresses within a second physical address space; translate the physical addresses within the second physical address space to physical addresses within a first physical address space; generate first CXL.mem and/or CXL.cache messages based on the second CXL.mem and/or CXL.cache messages and the physical addresses within the first physical address space; and forward the first CXL.mem and/or CXL.cache messages to the interconnect gateway.

Optionally, the interconnect gateway comprises a Compute Express Link (CXL)/Cache-Coherent Interconnect for Accelerators (CCIX) Gateway (CCG), and the I/O-Coherent node comprises an I/O-Coherent Request Node with DVM support (RN-D) and/or an I/O-Coherent Request Node (RN-I). The RPU may forward the first CXL.mem and/or CXL.cache messages to the CCG via a CXS interface, and the apparatus may be further configured to translate the first CXL.mem and/or CXL.cache messages to CHI-based protocol transactions for transmission over the coherent interconnect. Optionally, the CXS interface provides an intermediate protocol layer between CXL and CHI, with the CCG performing the final protocol conversion to CHI while managing coherency requirements for the translated transactions. In some implementations, the apparatus operates as a Global Fabric-Attached Memory (G-FAM) Device (GFD); the RPU receives CXL.mem messages in the transmissions; and the received CXL.mem messages are forwarded to the CCG after address translation. The CCG and the I/O-Coherent node may be mapped to an internal protocol bus with configuration registers; the configuration registers may be accessible utilizing memory-mapped I/O (MMIO) operations; and the configuration registers may enable discovery of address translation capabilities and configuration of address translation parameters. Optionally, the MMIO-accessible configuration registers may allow system software to discover the presence of address translation functionality, configure address translation tables or parameters, and monitor translation statistics or error conditions through standardized register interfaces.

The data may be further indicative of second CXL.io messages, and the RPU may be further configured to: translate the second CXL.io messages to first CXL.io messages, and forward the first CXL.io messages to the I/O-Coherent node. The RPU may forward the first CXL.io messages to the I/O-Coherent node via an AXI interface, and the I/O-Coherent node may comprise an RN-D that translates the first CXL.io messages to CHI-based protocol transactions for non-coherent operations. Optionally, the AXI interface leverages its PCIe-like characteristics to handle CXL.io messages, which maintain PCIe compatibility, while the RN-D provides appropriate translation to CHI for I/O operations without cache coherency overhead. The transmissions may be received via a physical layer based on IEEE 802.3 physical medium attachment (PMA), and the data indicative of CXL messages may be encapsulated within a carrier protocol transmitted over the physical layer based on IEEE 802.3 PMA. Optionally, the use of IEEE 802.3 PMA enables CXL messages to be transported over longer distances using established physical layer technology, with the carrier protocol providing encapsulation while enabling transmission over Ethernet-compatible physical infrastructure.

In certain aspects, the carrier protocol is based on Ethernet or based on IEEE 802.3, and the data indicative of CXL messages is encapsulated within Ethernet frames or IEEE 802.3 frames, respectively. Furthermore, the carrier protocol may be based on Ultra Ethernet Transport (UET) protocol, and the data indicative of CXL messages may be encapsulated within Link Layer Retry eligible frames (LLR-eligible frames). Additionally, the carrier protocol may be based on Scale Up Ethernet (SUE), and the data indicative of CXL messages may be encapsulated within an SUE-based Protocol Data Unit (PDU). Examples of SUE-based PDU may include SUE PDU, SUE Lite PDU, or PDUs based on future revisions of SUE. The RPU may be further configured to: translate the first CXL.mem and/or CXL.cache messages to CHI-based protocol transactions after generating the first CXL.mem and/or CXL.cache messages; and forward the CHI-based protocol transactions to the interconnect gateway. Optionally, the two-stage process first performs address translation while maintaining CXL-based protocol format, then converts to CHI-based protocol for transmission over the coherent interconnect, enabling modular processing wherein address translation logic can be separated from protocol conversion logic.

The second CXL.mem and/or CXL.cache messages may comprise source tags from an originating entity; the RPU may maintain a tag mapping table that associates the source tags with local tags; and the first CXL.mem and/or CXL.cache messages may comprise the local tags, enabling the RPU to correlate responses with original requests. Optionally, the tag mapping enables the RPU to manage transaction tracking across the address translation boundary, ensuring that responses can be properly routed back to the originating entity even though the transactions use different physical address spaces and potentially different tag namespaces.

The RPU may be further configured to: receive transmissions from entities that utilize different physical address spaces, maintain separate address translation contexts for the entities, and generate the first CXL.mem and/or CXL.cache messages with appropriate address translations based on the originating entity. Optionally, the multi-entity support enables the RPU to serve as a consolidation point for multiple CXL devices or hosts associated with different physical address space views, while providing unified access to the system's memory resources utilizing appropriate per-entity address translations. The RPU may enforce memory access permissions during address translation, comprising: validating that addresses within the second physical address space are within permitted ranges for the originating entity; and generating error responses for attempts to access addresses outside permitted ranges. Optionally, the address translation process may incorporate security and isolation mechanisms that prevent entities from accessing memory regions allocated to other entities or system-reserved areas, implementing hardware-enforced memory protection at the protocol translation boundary.

The RPU may be further configured to: receive CHI-based protocol responses from the coherent interconnect via the interconnect gateway; translate physical addresses within the CHI-based protocol responses from the first physical address space to the second physical address space; generate CXL response messages based on the CHI-based protocol responses and the translated addresses; and transmit the CXL response messages to the originating entity. Optionally, the bidirectional address translation ensures that response messages carry addresses that are meaningful to the originating entity, maintaining address space consistency throughout the complete transaction lifecycle from request to response.

In some implementations, the interconnect gateway comprises CMN multi-Chip Gateway (CCG) that utilizes a streaming interface protocol, wherein the CCG comprises a link agent that supports the streaming interface protocol, providing flit packing and unpacking, end-to-end data integrity, and a flit-retry mechanism for reliability, availability and serviceability (RAS) containment when data corruption is detected. Furthermore, the interconnect gateway may comprise at least one of Coherent Multi-Chip Link (CML) or Cache Coherent Interconnect for Accelerators (CCIX) Gateway (CXG) that utilizes a streaming interface protocol, and the interconnect gateway may be configured to utilize a 32-bit cyclic-redundancy check (CRC-32) to protect transactions conforming to the streaming interface protocol.

In one embodiment, an apparatus comprises: processing cores coupled via a coherent interconnect to memory controllers, wherein the coherent interconnect is based on Coherent Hub Interface (CHI) protocol, and the memory controllers are coupled to memory channels capable of supporting more than 64 GB of memory; at least one interconnect gateway coupled to the coherent interconnect; one or more I/O-Coherent nodes coupled to the coherent interconnect, wherein the one or more I/O-Coherent nodes comprise an I/O-Coherent Request Node with DVM support (RN-D) and/or an I/O-Coherent Request Node (RN-I); and a resource provisioning unit (RPU) configured to: receive transmissions comprising data indicative of Compute Express Link (CXL) messages from an entity external to the apparatus, wherein the CXL messages comprise CXL.mem messages, CXL.cache messages, and/or CXL.io messages; route the CXL.mem messages and/or the CXL.cache messages to the one or more CCGs; and route the CXL.io messages to the one or more I/O-Coherent nodes. Optionally, the apparatus enables entities communicating according to CXL-based protocol semantics to access resources within a CHI-based system utilizing protocol-aware routing that directs different CXL sub-protocols to appropriate nodes based on their coherency requirements. The CCGs may provide coherent gateway functionality optimized for CXL.mem and CXL.cache transactions that require cache coherency support, while the I/O-Coherent nodes handle CXL.io transactions that operate without cache coherency. The RPU may parse incoming CXL messages to identify their protocol type and apply routing decisions that leverage the specialized capabilities of different node types within the CHI interconnect. This architectural separation may optimize transaction processing by avoiding coherency overhead for CXL.io transactions while providing full coherency support for CXL.mem and CXL.cache transactions.

Optionally, the RPU is configured to route the CXL.mem messages to the one or more CCGs via a CXS interface, and the apparatus further comprises a CXL controller configured to translate the CXL.mem messages to CHI-based protocol transactions for transmission over the coherent interconnect. The RPU may be configured to route the CXL.cache messages to the one or more CCGs via a CXS interface, and the apparatus further comprises a CXL controller configured to translate the CXL.cache messages to CHI-based protocol transactions. Optionally, the CXL.cache routing through CCGs enables external CXL devices to participate in the processor's cache coherency domain, with the CCGs managing snoop operations and coherency state transitions required for cache-line-level sharing. The one or more I/O-Coherent nodes may comprise the RN-D; the RPU may be configured to route the CXL.io messages to the RN-D via an AXI interface; and the RN-D translates the CXL.io messages to CHI-based protocol transactions for non-coherent or I/O-coherent operations. Optionally, the AXI interface may leverage its similarity to PCIe for handling CXL.io transactions, which maintain PCIe compatibility, while the RN-D provides DVM support for I/O operations without the overhead of cache coherency management.

The RPU may comprise a CXL protocol parser configured to identify whether received CXL messages are CXL.mem, CXL.cache, or CXL.io messages; coherent CXL protocols comprising the CXL.mem messages and the CXL.cache messages may be routed through a coherent path via the one or more CCGs; and CXL.io messages may be routed through a non-coherent path via the one or more I/O-Coherent nodes. Optionally, the protocol parser may examine CXL message headers or protocol-specific fields to determine the message type, enabling dynamic routing decisions to appropriate processing path within the CHI interconnect architecture based on the message type. The CXL messages may comprise physical addresses within a second physical address space utilized by the entity; and the RPU may be further configured to translate the physical addresses within the second physical address space to physical addresses within a first physical address space utilized by the coherent interconnect. Optionally, the address translation may map between the external entity's view of physical memory and the internal addressing scheme used by the CHI-based system, enabling CXL devices to access system resources using their native addressing while maintaining proper routing within the coherent interconnect.

The CXL messages may include CXL tags for transaction identification; the CHI-based protocol may utilize CHI tags for transaction tracking; and the RPU may be further configured to translate between the CXL tags and the CHI tags while maintaining transaction correlation. Optionally, the tag translation may include maintaining a mapping table or using algorithmic translation to properly correlate responses with requests across the protocol boundary, enabling end-to-end transaction tracking despite the protocol conversion. The RPU may be further configured to translate CXL opcodes to corresponding CHI opcodes, comprising: translating CXL.mem read opcodes to CHI read transaction types; translating CXL.mem write opcodes to CHI write transaction types; and translating CXL.cache opcodes to CHI cache coherency transaction types. Optionally, the opcode translation may adapt the different command encodings used by CXL and CHI protocols while maintaining the intent and ordering requirements of the transactions across the protocol boundary.

The one or more CCGs and the one or more I/O-Coherent nodes may be mapped to an internal protocol bus with registers accessible utilizing memory-mapped I/O (MMIO) operations; and the registers may enable detection of node presence, node type, and routing configuration based on software inspection. Optionally, the MMIO-accessible registers may contain capability information, configuration parameters, and status indicators that allow system firmware or diagnostic software to discover the CXL-to-CHI translation capabilities and verify proper routing configuration. The RPU may be further configured to: receive a CXL.mem Master-to-Subordinate Request (M2S Req) comprising a MemRd* opcode from the entity; translate the M2S Req to a CXL.cache Device-to-Host Request (D2H Req) comprising a RdCurr opcode; and forward the D2H Req to a host via the coherent interconnect. Optionally, this translation enables interoperability between CXL.mem devices and CXL.cache hosts, with the RPU converting between CXL.mem and CXL.cache transactions. The RPU may be further configured to: receive a CXL.mem M2S Request with Data (M2S RwD) comprising a MemWr* opcode and write data; translate the M2S RwD to a CXL.cache D2H Request comprising a WrCur or MemWr opcode; and forward the D2H Request with the write data to the host.

The CXL.mem M2S Req may comprise a Tag field for transaction identification; the CXL.cache D2H Req may utilize a Command Queue ID (CQID) for transaction tracking; and the RPU may translate between the Tag and the CQID while maintaining transaction correlation between the CXL.mem and CXL.cache domains. Optionally, the Tag to CQID translation may include algorithmic mapping or table-based translation to properly route completions and responses to the originating CXL.mem device utilizing the appropriate command queue structure used by CXL.cache.

The RPU may be further configured to: receive CXL.io Configuration Request Transaction Layer Packets (TLPs) from the entity; terminate the Configuration Request TLPs within the RPU; and process the Configuration Request TLPs locally without forwarding translated versions to the coherent interconnect. Optionally, the local termination of configuration TLPs may allow the RPU to handle device enumeration and configuration without burdening the coherent interconnect with configuration traffic, potentially implementing virtual configuration spaces for CXL devices.

The RPU may be further configured to: forward translations of CXL.io Memory Read (MRd) TLPs, Memory Write (MWr) TLPs, and Completion with Data (CpID) TLPs to the coherent interconnect; and block CXL.io Configuration Read (CfgRd0, CfgRd1) TLPs, Configuration Write (CfgWr0, CfgWr1) TLPs, and Completion for Locked Memory Read (CplDLk) TLPs from being forwarded to the coherent interconnect. Optionally, the selective forwarding may implement security and isolation policies by preventing certain transaction types from propagating into the coherent interconnect while allowing memory-mapped I/O operations to proceed, similar to non-transparent bridge functionality.

The RPU may be further configured to receive CXL.io Memory Transaction Layer Packets (Memory TLPs) comprising physical addresses within a CXL.io address space; and the RPU may be further configured to translate the physical addresses within the CXL.io address space to physical addresses within a CHI physical address space before routing to the one or more I/O-Coherent nodes. Optionally, the CXL.io address translation may support different memory maps between the CXL.io device's view and the system's internal addressing, enabling flexible memory allocation and potential address space isolation for different CXL.io devices.

In some implementations, the at least one interconnect gateway comprises a CMN multi-Chip Gateway (CCG) that utilizes a streaming interface protocol, wherein the CCG comprises a link agent that supports the streaming interface protocol, providing flit packing and unpacking, end-to-end data integrity, and a flit-retry mechanism. Furthermore, the at least one interconnect gateway may comprise a Coherent Multi-Chip Link (CML) or a Cache Coherent Interconnect for Accelerators (CCIX) Gateway (CXG), wherein the at least one interconnect gateway utilizes a streaming interface protocol and is configured to utilize a 32-bit cyclic-redundancy check (CRC-32) to protect transactions conforming to the streaming interface protocol.

In one embodiment, an apparatus comprises: processing cores with integrated memory management units (MMUs) coupled via a coherent interconnect to memory controllers, wherein the coherent interconnect is based on Coherent Hub Interface (CHI) protocol and comprises crosspoints for routing; at least one interconnect gateway coupled to the coherent interconnect; one or more I/O-Coherent nodes coupled to the coherent interconnect; Subordinate Nodes (SN-F) coupled between the coherent interconnect and the memory controllers, wherein the memory controllers are coupled via DDR PHY to memory channels; a physical layer, based on IEEE 802.3 physical medium attachment (PMA), configured to receive transmissions from an entity external to the apparatus; and a resource provisioning unit (RPU) comprising a Compute Express Link (CXL) device, wherein the RPU is coupled between the physical layer based on IEEE 802.3 PMA and the coherent interconnect, and wherein the RPU is configured to process data from the transmissions to enable the entity to access memory via the CXL device, the coherent interconnect, and the memory channels. Optionally, the apparatus enables external entities to access processor-attached memory utilizing a physical layer based on IEEE 802.3 PMA, which may support various carrier protocols for extended reach communications. The RPU serves as a protocol processing unit that bridges between the IEEE 802.3 PMA domain and the CHI-based processor architecture. The CXL device within the RPU may connect to the CCGs for coherent transactions and to the I/O-Coherent nodes for non-coherent transactions. The SN-F nodes handle memory requests from the coherent interconnect and forward them to the memory controllers, which access the physical memory through DDR PHY interfaces. The crosspoints within the coherent interconnect examine transaction identifiers and route messages between the various nodes, creating a flexible communication fabric that supports both local processor traffic and external entity access.

Optionally, the transmissions received via the physical layer based on IEEE 802.3 PMA may comprise a carrier protocol; the carrier protocol encapsulates CXL.mem messages comprising opcodes, physical addresses, and tags; and the RPU is configured to extract the CXL.mem messages from the carrier protocol for processing by the CXL device. Optionally, the carrier protocol provides a transport mechanism for CXL messages over EEE 802.3 PMA physical infrastructure, enabling CXL communications to extend beyond traditional PCIe-based physical layers. The encapsulation preserves at least the essential portions of the CXL message while allowing transmission over Ethernet-compatible networks or other protocols that utilize IEEE 802.3 PMA, with the RPU performing de-encapsulation to recover messages equivalent to the original CXL messages.

The CXL.mem messages may comprise physical addresses within a second physical address space and source tags from the entity; the RPU translates the physical addresses within the second physical address space to physical addresses within a first physical address space utilized by the coherent interconnect; the RPU translates the source tags to local tags utilized within the apparatus; and the CXL device forwards translated CXL.mem messages with the physical addresses within the first physical address space and the local tags to the one or more CCGs. Optionally, the address and tag translations enable the external entity to maintain its own physical address space and tag namespace while the RPU performs necessary mappings to integrate with the processor's internal addressing and transaction tracking schemes. The CCGs receive pre-translated messages that conform to the processor's physical address space, simplifying their role in converting CXL to CHI protocols.

The apparatus may further comprise a CXL controller configured to translate the CXL.mem messages to CHI-based protocol requests; the CHI-based protocol requests are routed through the coherent interconnect to Home Nodes (HN); and the Home Nodes coordinate with the SN-F nodes to access the memory controllers. Optionally, the Home Nodes serve as coherency management points that may snoop caches and coordinate memory access through the SN-F nodes, which act as memory-side interfaces in the CHI architecture.

The CXL.mem messages may comprise read requests with MemRd opcodes; the CHI-based protocol requests comprise allocating read requests with opcodes selected from ReadClean, ReadShared, ReadUnique, or ReadPreferUnique; the Home Nodes send ReadNoSnp requests to the SN-F nodes; and the memory controllers return data utilizing a combined response using a CompData opcode that enables data to be sent directly to the CXL device. Optionally, the read transaction sequence includes a multi-hop protocol conversion wherein CXL.mem messages are translated to appropriate CHI-based messages, with the Home Node enabling the memory controller to send data directly to the requester using CompData, reducing latency and message count.

The RPU may be configured to: receive the data with the CompData response; generate CXL.mem Subordinate-to-Master Data Response (S2M DRS) messages with opcodes selected from MemData; translate the local tags back to the source tags; encapsulate the S2M DRS messages in the carrier protocol; and transmit the encapsulated messages to the entity via the physical layer based on IEEE 802.3 PMA. Optionally, the response path performs reverse translations to ensure that the external entity receives responses in its expected format with its original tag namespace, maintaining end-to-end protocol transparency despite the protocol conversions occurring within the apparatus.

The CompData response may bypass the Home Node on the return path; the memory controller is configured to send the CompData response directly to the originating CXL device or CCG; and the Home Node is configured to send a separate completion acknowledgment to complete the coherency protocol. Optionally, the direct response reduces data return latency by allowing the memory controller to send data directly to the requester while the Home Node handles coherency protocol completion separately, improving performance for memory reads while maintaining protocol correctness.

The carrier protocol may further encapsulate CXL.io messages; the RPU is further configured to extract and forward the CXL.io messages to the one or more I/O-Coherent nodes; and the one or more I/O-Coherent nodes comprise an RN-D configured to translate the CXL.io messages to CHI transactions. Optionally, the apparatus may support both coherent CXL.mem and non-coherent CXL.io protocols through the same physical interface, with the RPU directing different protocol types to appropriate nodes based on their coherency requirements, leveraging RN-D nodes for efficient I/O transaction processing without cache coherency overhead.

In certain aspects, the CXL.mem messages may comprise write requests with MemWr opcodes and associated write data; the apparatus is further configured to translate the write requests to CHI write transactions; and the write data is forwarded through the coherent interconnect to the memory controllers via the SN-F nodes. Optionally, write transactions follow a similar translation path as reads but include data payload forwarding.

The carrier protocol may be based on Ethernet, and the CXL.mem messages are encapsulated within Ethernet-based frames. Optionally, using Ethernet as the carrier protocol enables CXL communications over standard Ethernet infrastructure, potentially supporting standard Ethernet switching and routing while carrying CXL protocol messages as pay-load, extending CXL connectivity beyond direct-attached scenarios. Alternatively, the carrier protocol may be based on Ethernet.

In some implementations, the carrier protocol is based on Ultra Ethernet Transport (UET) protocol, and the CXL.mem messages are encapsulated within Link Layer Retry eligible frames (LLR-eligible frames). Furthermore, the carrier protocol may be based on Scale Up Ethernet (SUE), and the CXL.mem messages are encapsulated within an SUE-based Protocol Data Unit (PDU).

The physical layer based on IEEE 802.3 PMA may receive transmissions from entities; the RPU maintains separate transaction contexts for the entities; and the cross-points within the coherent interconnect arbitrate between transactions from different entities while maintaining ordering requirements. Optionally, the apparatus may serve as a shared memory resource for external entities, with the RPU managing per-entity state and the coherent interconnect's crosspoints providing fair arbitration and routing between competing transactions while preserving ordering requirements specified by the protocols.

The apparatus may function as a memory pool provider, the entity comprises a memory pool consumer, and the memory channels are coupled to more than 256 GB of dynamic random-access memory (DRAM) accessible by the entity utilizing the CXL device. Optionally, the memory pool configuration enables the apparatus to provide large-scale memory resources to external consumers, with the CXL protocol providing memory semantics over the IEEE 802.3 PMA physical layer, supporting disaggregated computing architectures wherein memory can be dynamically allocated to different consumers.

In some implementations, the at least one interconnect gateway comprises a CMN multi-Chip Gateway (CCG) that utilizes a streaming interface protocol, wherein the CCG comprises a link agent that supports the streaming interface protocol, providing flit packing and unpacking, end-to-end data integrity, and a flit-retry mechanism. Additionally, the at least one interconnect gateway may comprise a Coherent Multi-Chip Link (CML) or a Cache Coherent Interconnect for Accelerators (CCIX) Gateway (CXG) that utilizes a streaming interface protocol, wherein the at least one interconnect gateway is configured to utilize a 32-bit cyclic-redundancy check (CRC-32) to protect transactions conforming to the streaming interface protocol.

In one embodiment, an apparatus comprises an integrated circuit (IC) package comprising processing cores comprising instruction caches; wherein the processing cores are coupled via a coherent interconnect to a memory controller, and are configured to respond to snoop requests that utilize physical addresses within a physical address space; a memory management unit (MMU), coupled to the processing cores, configured to translate virtual addresses to physical addresses within the physical address space; memory channels capable of supporting more than 64 GB of memory; a physical layer, based on IEEE 802.3 physical medium attachment (PMA), configured to receive transmissions comprising data indicative of a CXL.mem Master-to-Subordinate Request (M2S Req), wherein CXL refers to Compute Express Link; and a resource provisioning unit (RPU) configured to translate the data to a CXL.cache Device-to-Host Request (D2H Req) to enable an entity to access the memory based on the M2S Req, whereby the entity is external to the apparatus. Optionally, the RPU comprises a CXL device configured to expose Host-managed Device Memory (HDM) regions and support CXL.mem protocol. Optionally, the CXL device within the RPU may expose one or more HDM regions that appear as memory-mapped regions to the external entity. The HDM regions may be configured utilizing HDM decoders that specify the size, base address, and attributes of the memory regions. By supporting CXL.mem protocol, the CXL device may enable the entity to perform memory reads and writes using CXL.mem semantics while the RPU handles the necessary protocol translations between CXL.mem and CXL.cache domains.

The memory may comprise dynamic random-access memory (DRAM), and the RPU comprises a Global Fabric-Attached Memory (G-FAM) Device (GFD). Optionally, the GFD may implement global memory pooling capabilities without requiring PCIe configuration space. The GFD may support multi-domain access wherein multiple (optionally independent) hosts can access portions of the DRAM utilizing the RPU's protocol translation capabilities. Configuration and management of the GFD may be accomplished utilizing Global Memory Access Endpoints or out-of-band mechanisms.

The M2S Req may comprise a memory read opcode selected from MemRd, MemRdData, MemRdTEE, or MemRdDataTEE, and the D2H Req comprises a corresponding cache read opcode selected from RdCurr, RdOwn, RdShared, or RdAny. Optionally, the RPU may translate specific CXL.mem read opcodes to appropriate CXL.cache opcodes based on the memory access characteristics. MemRd and MemRdData opcodes may be translated to RdCurr for obtaining current data without exclusive ownership, while MemRdTEE opcodes for trusted execution environment accesses may be translated with additional security attributes preserved. The translation may maintain the semantic intent of the original request while adapting to the cache coherency requirements of the CXL.cache protocol.

The M2S Req may comprise a Tag field and physical addresses within a second physical address space utilized by the entity, and the RPU may be further configured to translate the Tag field to a Command Queue ID (CQID) for the D2H Req and translate the physical addresses within the second physical address space to physical addresses within the physical address space utilized by the memory controller. Optionally, the RPU may maintain dual translation mechanisms for both transaction identification and address mapping. The Tag to CQID translation may involve mapping tables or algorithmic conversion to track transactions across protocol boundaries, while the physical address translation may enable the entity to utilize its own physical address space view while the apparatus maintains isolation and proper routing to memory resources. The combined translation may result in both proper transaction correlation and memory access isolation between different domains.

The data indicative of the M2S Req may be encapsulated within Ethernet frames received via the physical layer based on IEEE 802.3 PMA. Optionally, encapsulating CXL.mem requests within Ethernet frames may enable the transport of CXL-based protocol over standard Ethernet infrastructure. The Ethernet frames may include standard Ethernet headers with source and destination MAC addresses, EtherType fields, and frame check sequences, while the payload contains the encapsulated CXL.mem M2S Req messages. This encapsulation may enable CXL-based memory access over longer distances using established Ethernet switching and routing equipment.

The data indicative of the M2S Req may be encapsulated within Scale Up Ethernet (SUE) Protocol Data Units (PDUs) received via the physical layer based on IEEE 802.3 PMA.

Optionally, utilizing SUE as the carrier protocol may provide optimized transport for scale-up computing environments wherein low latency and high bandwidth are priorities. The SUE PDUs may include SUE-specific headers that provide enhanced routing, Quality-of-Service, and congestion management features tailored for datacenter-scale memory disaggregation while maintaining compatibility with IEEE 802.3 PMA physical infrastructure.

The data indicative of the M2S Req may be encapsulated within Ultra Ethernet Transport (UET) protocol Link Layer Retry eligible frames (LLR-eligible frames) received via the physical layer based on IEEE 802.3 PMA. Optionally, UET protocol with LLR-eligible frames may provide reliable transport for CXL messages by implementing link-layer retry mechanisms that can recover from transient errors without requiring end-to-end retransmission. The LLR-eligible frames may include sequence numbers and acknowledgment mechanisms that enable quick detection and recovery from frame loss or corruption, which support memory access operations wherein data integrity is paramount.

The physical layer based on IEEE 802.3 PMA may comprise a UALink physical layer, and the RPU may be further configured to extract the data indicative of the M2S Req from UALink Protocol Level Interface (UPLI) messages. Optionally, the UALink physical layer may provide compatibility with the Ultra Accelerator Link ecosystem while leveraging IEEE 802.3 PMA standards. The RPU may process UPLI messages that encapsulate CXL.mem requests, enabling interoperability between UALink-coupled accelerators and CXL memory resources. The extraction process may involve parsing UPLI headers and payloads to recover the original CXL.mem M2S Req for subsequent translation to CXL.cache protocols.

The RPU may be further configured to receive NVLink memory access requests via a second interface and translate the NVLink memory access requests to CXL.cache requests for accessing the memory. Optionally, the RPU may function as a multi-protocol bridge that enables NVLink-coupled GPUs to access memory through CXL infrastructure. The translation from NVLink to CXL.cache may involve converting NVLink's coherency model to CXL's coherency model, mapping between different transaction types, and handling protocol-specific features such as atomic operations. This bridging capability may enable heterogeneous computing systems wherein GPUs using NVLink can share memory resources with CPUs and other devices through the CXL fabric.

The RPU may be further configured to maintain separate translation contexts for first and second entities, enabling concurrent access to the memory by the first and second entities utilizing different Tag spaces and different physical address spaces, respectively. Optionally, the RPU may implement multi-tenant support by maintaining different translation contexts for different coupled entities. The translation contexts may include separate Tag-to-CQID mapping tables, address translation tables, and transaction state tracking, which may enable the apparatus to function as a shared memory resource wherein entities can access memory concurrently while maintaining isolation between their respective transaction streams and physical address spaces.

The RPU may be further configured to translate CXL.mem Master-to-Subordinate Request with Data (M2S RwD) messages comprising write opcodes to CXL.cache D2H Req messages comprising write opcodes selected from WrCur or MemWr. Optionally, the RPU may handle write transactions by translating CXL.mem write requests that include both command and data payloads into appropriate CXL.cache write requests. The translation may preserve write semantics while adapting to cache coherency requirements, potentially including the handling of partial writes, write combining, and ensuring proper write ordering according to both protocols' memory models.

The processing cores may be x86-compatible cores, the apparatus may further comprise at least three levels of cache hierarchy coupled to the coherent interconnect, and the MMU supports both first-level address translation and second-level address translation (SLAT) for virtualization. Optionally, the x86-compatible architecture may include support for Intel VT-x or AMD-V virtualization extensions wherein SLAT provides Extended Page Tables (EPT) or Nested Page Tables (NPT) respectively. The three-level cache hierarchy may comprise L1 instruction and data caches per core, shared or private L2 caches, and a shared L3 cache that may serve as a last-level cache. This configuration may enable enterprise-class server implementations supporting virtualized workloads while providing CXL memory access capabilities.

The processing cores may be ARM-compatible cores supporting ARMv8 or later instruction set architecture, and the apparatus may further comprise stage-two translation capability for translating intermediate physical addresses (IPAs) to physical addresses. Optionally, the ARM-compatible architecture may implement the ARM virtualization extensions wherein stage-two translation enables hypervisors to control guest physical to host physical address mappings. The stage-two translation capability may work in conjunction with the MMU's stage-one translation to provide complete virtualization support while the RPU handles CXL protocol translations for memory accesses from external entities.

The RPU may be further configured to translate CXL.cache Host-to-Device Response (H2D Rsp) messages received from the memory controller to CXL.mem Subordinate-to-Master Data Response (S2M DRS) messages for transmission to the entity. Optionally, the bidirectional translation capability may complete the transaction flow by converting responses from the CXL.cache domain back to the domain based on CXL.mem. The H2D Rsp messages may include data payloads and completion status that the RPU translates into S2M DRS format, maintaining proper correlation with the original M2S Req utilizing transaction identifiers and ensuring data integrity throughout the round-trip protocol conversion.

The RPU may be further configured to implement Quality-of-Service (QoS) mechanisms by assigning different priority levels to translated D2H Req messages based on traffic class indicators in the received M2S Req messages. Optionally, the RPU may preserve or map QoS indicators from CXL.mem requests to appropriate priority levels in the CXL.cache domain. The traffic class indicators in M2S Req messages may be translated to virtual channel assignments, arbitration weights, or deadline-based scheduling in the coherent interconnect. This QoS translation may enable differentiated service levels for different types of memory accesses, such as prioritizing latency-sensitive requests over bulk data transfers.

FIG. 97 illustrates one embodiment of a system comprising a processor inside an IC package, which may be referred to as an MxPU, having processing cores (Core 0 through Core 5) that include instruction caches and associated MMUs. The processing cores, which are able to respond to snoop requests, are coupled via a coherent interconnect interface to last level caches (LLCs) and a memory controller (MC) coupled to memory channels for connection to memory (e.g., DRAM). The embodiment includes an RPU coupled to the coherent interconnect via interconnect components such as an R2CXL node, with the RPU configured to translate between data indicative of a CXL.mem M2S Req and CXL.cache protocols. The RPU may include a CXL device that exposes Host-managed Device Memory (HDM) regions and supports communication over a PHY based on IEEE 802.3 PMA. The apparatus further includes optional PCIe RP and CXL RP to couple external entities such as consumers, hosts, or switches. In some embodiments, wherein the RPU may be embedded into an MxPU, such as in a chiplet, and located tightly coupled to the CXL RP, the RPU may communicate with the CXL RP according to a CXL.cache protocol without requiring a complete implementation of a CXL Device, e.g., without requiring an implementation of CXL.io and a configuration space, and instead utilizing proprietary configuration mechanisms similar to those employed in hardened security appliances, wherein both the CXL RP and RPU may be configured by system firmware, or by a device driver, to communicate with each other according to CXL.cache semantics without requiring discovery and enumeration handshake phases that are typically performed when coupling a discrete CXL Device to a CXL RP.

FIG. 98A illustrates one embodiment of a system (MxPU) comprising processing cores with instruction caches and associated MMUs, LLCs, and a coherence engine (CBox) coupled through a coherent interconnect. The apparatus further includes an RPU configured to translate transmissions, comprising data indicative of a CXL.mem M2S Req received via a physical layer based on IEEE 802.3 PMA from an entity (e.g., Consumer/Host/Switch), to CXL.cache. The RPU may be implemented as a chiplet or logic on a processor die, and is coupled to the coherent interconnect via an R2CXL interconnect component to enable the entity to access memory (e.g., DRAM) through the memory controller based on the M2S Req.

FIG. 98B illustrates one embodiment of a TFD demonstrating protocol translations performed by the RPU between CXL.mem and CXL.cache protocols. The diagram shows the entity (Consumer/Host/Switch) sending a CXL.mem M2S Req comprising opcodes such as MemRd, MemRdData, MemRdTEE, or MemRdDataTEE, which the RPU translates to a CXL.cache D2H Req with corresponding cache read opcodes such as RdCurr, RdOwn, RdShared, or RdAny, along with the associated address Addr(AS.1.1). The CXL RP sends the request through the coherent interconnect to the Home Agent and Memory Controller for accessing DRAM utilizing MemRd. The return path shows the RPU translating CXL.cache H2D Rsp messages back to CXL.mem S2M DRS messages with associated data and tags for transmission to the entity.

FIG. 99A illustrates one embodiment of a system featuring dual-protocol support wherein a GPU is coupled to a coherent interconnect via an NVLink-C2C chiplet and a Device-to-Device (D2D) Adapter, and a host that communicates with an RPU utilizing a protocol based on CXL carried over CXL Carrier Protocol, such as PMA based on IEEE 802.3. The RPU includes a CXL RP coupled to the coherent interconnect.

FIG. 99B illustrates one embodiment of a TFD demonstrating protocol translation operations performed by the RPU of FIG. 99A, including the translation of Tag fields to Command Queue ID (CQID) and physical address translation between different physical address spaces. The TFD shows the Host transmitting CXL.mem M2S Req messages comprising MemOpcode (such as MemRd), physical addresses Addr(AS.2.1) within a second physical address space optionally utilized by the host, and Tag fields Tag (p.2.1). The carrier protocol carries data indicative of the CXL.mem M2S Req to the RPU, which translates the Tag field to CQID(w.1.1) for the CXL.cache D2H Req with Opcode(RdCurr), and translates the physical addresses within the second physical address space (AS.2.1) to physical addresses within the physical address space (AS.1.1) utilized by the coherent interconnect and optionally also by the memory controller. The Requester/CXL RP/CCG component further translates the CXL.cache D2H Req to coherent interconnect protocol messages, such as ARM CHI REQ messages with Opcode(ReadShared), maintaining the translated address Addr(AS.1.1) and generating a transaction identifier TxnID(g.1.1) for tracking within the coherent interconnect domain. The Home Node processes the request and forwards in one example to the Memory Controller ARM CHI REQ messages with Opcode(ReadNoSnp), Addr (AS.1.1), TxnID(t.1.1), and ReturnTxnID(q.1.1). The memory controller reads the memory and returns data to the Requester/CXL RP/CCG via the coherent interconnect utilizing ARM CHI RDAT messages with Opcode(CompData), TxnID(q.1.1), and the *Data*. The return path shows the Requester/CXL RP/CCG translating the coherent interconnect response to CXL.cache H2D Data messages with the corresponding CQID(w.1.1) and Data(*Data*), which the RPU then translates to a carrier protocol carrying data indicative of CXL.mem S2M DRS, which is translated to CXL.mem S2M DRS messages with Opcode(MemData), the original Tag(p.2.1), and the Data(*Data*) payload for transmission to the host, thereby maintaining transaction correlation utilizing the Tag and CQID mappings across the protocol translation boundaries.

In one embodiment, an apparatus comprises: processing cores comprising instruction caches; wherein the processing cores are coupled via a coherent interconnect to a memory controller, and are configured to respond to snoop requests that utilize physical addresses within a physical address space; memory channels capable of supporting more than 64 GB of memory; a chiplet or a discrete component coupled to the coherent interconnect over a Cache-Coherent Chip-to-Chip Interconnect (CCCI); wherein: the chiplet or the discrete component comprises: a physical layer, based on IEEE 802.3 physical medium attachment (PMA), coupled to a resource provisioning unit (RPU) coupled to the CCCI; the physical layer based on IEEE 802.3 PMA is configured to receive transmissions comprising data indicative of a Compute Express Link (CXL) request; and the RPU is configured to translate the data to a CCCI request to be sent over the CCCI to the coherent interconnect, wherein the CCCI request carries a physical address within the physical address space.

Optionally, the RPU comprises a CXL device, the data is indicative of a CXL.mem Master-to-Subordinate Request (M2S Req), and the RPU enables an entity external to the apparatus to access the memory via the physical layer based on IEEE 802.3 PMA, the memory controller, and the memory channels. Additionally, the memory may comprise dynamic random-access memory (DRAM), and the CXL device may comprise a Global Fabric-Attached Memory (G-FAM) Device (GFD). In some implementations, the data is indicative of a CXL.mem Master-to-Subordinate Request (M2S Req), and the CCCI is selected from an interconnect based on: an Intel Coherent Processor Interconnect Protocol (ICPIP) for scalable multiprocessors with a shared physical address space, Coherent Hub Interface chip-to-chip (CHI C2C), External Global Memory Interconnect (xGMI), Infinity Fabric, or NVLink chip-to-chip (NVLink-C2C). Examples of ICPIP include Intel's QuickPath Interconnect (QPI), Ultra Path Interconnect (UPI), KTI, UXI, and future Intel's Coherent Processor Interconnect Protocols. The RPU may include a CXL root port, the data may be indicative of a CXL.cache Device-to-Host Request (D2H Req), and the CCCI is selected from an interconnect based on: an Intel Coherent Processor Interconnect Protocol (ICPIP) for scalable multiprocessors with a shared physical address space, Coherent Hub Interface chip-to-chip (CHI C2C), External Global Memory Interconnect (xGMI), Infinity Fabric, or NVLink chip-to-chip (NVLink-C2C). Furthermore, the CXL request may comprise physical addresses within a second physical address space, and the RPU may be further configured to translate the physical addresses within the second physical address space to the physical addresses within the physical address space. In certain aspects, the data is indicative of a CXL.io memory read request comprising physical addresses within a second physical address space, and the RPU may be further configured to translate the data to a CCCI request comprising physical addresses within the physical address space, utilizing non-transparent bridging (NTB) to enable an entity external to the apparatus to access the memory. Additionally, the CXL.io memory read request may comprise an MRd TLP Type or a UIOMRd TLP Type, and the RPU may be further configured to translate the CXL.io memory read request to at least one CCCI request comprising a Coherent Hub Interface Request (CHI REQ) comprising a ReadOnce opcode or a ReadNoSnp opcode.

The data may be indicative of a CXL.mem Master-to-Subordinate Request (M2S Req) comprising a MemRdData opcode, and the RPU may be further configured to translate the data to a CCCI request comprising a request based on an Ultra Path Interconnect Request (UPI REQ) comprising a RdCur opcode. Alternatively, the data may be indicative of a CXL.mem Master-to-Subordinate Request (M2S Req) comprising a MemRdData opcode and a Tag, and the RPU may be further configured to translate the data to a CCCI request comprising a Coherent Hub Interface Request (CHI REQ) comprising a ReadShared opcode and a transaction identifier (TxnID). Furthermore, the RPU may be further configured to store the Tag associated with the CXL.mem M2S Req, maintain a mapping between the Tag and the CHI REQ TxnID, utilize the mapping for matching CHI responses with pending CXL.mem M2S Req, and utilize the stored Tag for generating a CXL.mem S2M DRS. In another implementation, the CXL Request is a CXL.cache Device-to-Host Request (D2H Req) comprising a RdShared opcode and a Command Queue ID (CQID), and the RPU may be further configured to translate the CXL request to a CCCI request comprising a Coherent Hub Interface Request (CHI REQ) comprising a ReadShared opcode and a transaction identifier (TxnID). Additionally, the RPU may be further configured to translate between the CXL.cache CQID and the CHI TxnID.

In one embodiment, an apparatus comprises processing cores comprising instruction caches; wherein the processing cores are coupled via a coherent interconnect to a memory controller, and are configured to respond to snoop requests that utilize physical addresses within a first physical address space; memory channels capable of supporting more than 64 GB of memory; a chiplet or a discrete component comprising a Compute Express Link (CXL) device, a resource provisioning unit (RPU), and a Cache-Coherent Chip-to-Chip Interconnect (CCCI); wherein: the CXL device is configured to receive, from a host external to the apparatus, CXL read requests comprising physical addresses within a second physical address space; the RPU is configured to: translate the physical addresses within the second physical address space to physical addresses within the first physical address space, and generate corresponding CCCI read requests based on the CXL read requests and the physical addresses within the first physical address space; the CCCI is configured to send the CCCI read requests to the coherent interconnect; the CCCI is further configured to receive CCCI read responses from the coherent interconnect, wherein the CCCI read responses comprise data retrieved from the memory via the memory controller; the RPU is further configured to generate corresponding CXL read responses based on the CCCI read responses; and the CXL device is further configured to send the CXL read responses to the host.

Optionally, the apparatus may enable external hosts to access memory resources based on a multi-stage translation process. The chiplet or discrete component translates between the CXL protocol domain and the internal CCCI protocol domain of the apparatus. The RPU performs physical address translations to map the host's view of memory (second physical address space) to the apparatus's internal memory addressing (first physical address space). The coherent interconnect may maintain cache coherency across the processing cores while servicing memory access requests from both internal processing cores and external hosts. The memory controller may handle the actual memory access operations, retrieving data from the attached memory in response to the translated requests.

Optionally, the CXL read requests and the CXL read responses comprise CXL tags, the CCCI read requests and the CCCI read responses comprise CCCI tags, and the RPU is further configured to: translate the CXL tags to corresponding CCCI tags when generating the CCCI read requests, and translate the CCCI tags in the CCCI read responses to corresponding CXL tags when generating the CXL read responses. Optionally, the tag translation enables proper tracking and correlation of outstanding transactions across the protocol domains, wherein the CXL tags identify specific transactions from the host's perspective and the CCCI tags serve the same purpose within the apparatus's coherent interconnect. The RPU may maintain a mapping table or other data structure to track the correspondence between the CXL tags and the CCCI tags, allowing it to properly route responses back to the originating host requests.

The CXL read requests and the CXL read responses may comprise CXL opcodes, the CCCI read requests and the CCCI read responses comprise CCCI opcodes, and the RPU may be further configured to: translate the CXL opcodes to corresponding CCCI opcodes when generating the CCCI read requests, and translate the CCCI opcodes in the CCCI read responses to corresponding CXL opcodes when generating the CXL read responses. Optionally, the opcode translation enables mapping between different protocols, wherein the RPU translates between these opcode sets to maintain the operations' intent while adapting to the requirements of the protocol domains.

The CXL device may be further configured to receive, from the host, CXL write requests comprising write data and physical addresses within the second physical address space; the RPU may be further configured to translate the physical addresses within the second physical address space to physical addresses within the first physical address space, and generate corresponding CCCI write requests based on the CXL write requests and the physical addresses within the first physical address space; the CCCI may be further configured to send the CCCI write requests to the coherent interconnect, and to receive CCCI write responses from the coherent interconnect; the RPU may be further configured to generate corresponding CXL write responses based on the CCCI write responses; and the CXL device may be further configured to send the CXL write responses to the host. Optionally, the write path may operate similarly to the read path but with data flowing from the host to the memory. The RPU may perform address translation and potentially buffer the write data while coordinating the protocol conversion. The CCCI write responses may indicate completion status of the write operations, which the RPU may translate into CXL write response formats appropriate for the host.

The CXL write requests may comprise CXL.mem Master-to-Subordinate Request with Data (M2S RwD) messages comprising write opcodes selected from MemWr, MemWrPtl, MemWrTEE, or MemWrPtlTEE; and wherein the CXL write responses comprise CXL.mem Subordinate-to-Master No Data Response (S2M NDR) messages. The M2S RwD messages carry both the write command and the associated data payload from the master (the host) to the subordinate (the apparatus). Optionally, different write opcodes may specify different intents. MemWr may indicate a standard memory write operation. MemWrPtl may indicate a partial write operation where a portion of a cache line is updated. And MemWrTEE and MemWrPtlTEE may indicate writes to trusted execution environment memory regions, requiring special security handling. The RPU may translate these CXL.mem write opcodes to appropriate CCCI write commands that optionally preserve the original intent. The S2M NDR messages provide write completion acknowledgments.

The M2S RwD messages may comprise CXL tags, the S2M NDR messages comprise essentially the same CXL tags, and the RPU may be further configured to store the CXL tags from the M2S RwD messages and utilize the stored CXL tags when generating the S2M NDR messages. Optionally, maintaining tag consistency between write requests and responses may enable the host to properly correlate write completions with outstanding write operations. The RPU may include storage mechanisms such as content-addressable memories or FIFO structures to temporarily store CXL tags while write operations are in progress within the apparatus's coherent interconnect.

In one embodiment, an apparatus comprises: a processor comprising processing cores inside an integrated circuit (IC) package; wherein the processing cores are coupled via a coherent interconnect configured to respond to snoop requests that utilize physical addresses within a first physical address space; wherein the processor further comprises: memory channels capable of supporting more than 64 GB of memory, and a Compute Express Link (CXL) device capable of communicating with an entity external to the apparatus that utilizes a second physical address space; and a resource provisioning unit (RPU) configured to translate physical addresses within the second physical address space to physical address within the first physical address space in order to enable the entity to access the memory via the CXL device and the memory channels.

Optionally, the processor inside the IC package may be implemented as a system-on-chip (SoC), multi-chip module (MCM), or chiplet-based architecture. The processing cores may include general-purpose CPU cores, specialized accelerator cores, or a heterogeneous combination thereof. The coherent interconnect may implement cache coherency protocols such as MESI, MOESI, or proprietary coherency schemes, and may include a mesh interconnect, ring bus, or crossbar topology. The RPU may be implemented as dedicated hardware logic, programmable logic, or firmware executing on dedicated cores, and may maintain translation tables, use content-addressable memories, or implement programmable address decoders to convert between the second physical address space used by the external entity and the first physical address space used internally by the processor.

Optionally, at least some of the communications between the entity and the memory are transmitted over the coherent interconnect. Optionally, the communications transmitted over the coherent interconnect may include memory read/write requests, cache line transfers, and/or coherency messages such as snoop requests and responses. The coherent interconnect may route these communications based on physical addresses and may implement quality-of-service (QoS) mechanisms to prioritize different traffic classes. The entity's memory accesses may be tagged with unique identifiers to distinguish them from local memory traffic, and the coherent interconnect may enforce memory ordering rules and consistency models appropriate for the CXL protocol requirements.

The CXL device may be located inside the IC package or outside the IC package, the RPU is located inside the IC package or outside the IC package, and the CXL device comprises a CXL endpoint. Optionally, when the CXL device is located inside the IC package, it may be integrated as an on-die component or as a separate chiplet coupled via high-speed die-to-die interconnects. When located outside the IC package, the CXL device may be coupled via PCIe PHY layers or dedicated CXL physical interfaces. The CXL endpoint may implement Type 1, Type 2, or Type 3 CXL device functionality according to CXL semantics, and may support CXL.io, CXL.cache, and/or CXL.mem protocols. The RPU, whether inside or outside the IC package, may be positioned in the data path between the CXL endpoint and the coherent interconnect to perform address translations in real-time.

The CXL device may be located inside the IC package or outside the IC package, the RPU is located inside the IC package or outside the IC package, and the CXL device comprises a G-FAM Device (GFD). Optionally, the GFD may implement global memory pooling capabilities that allow hosts to share the memory resources. The GFD may support memory allocation and deallocation requests from entities, implement access control mechanisms, and maintain metadata for memory ownership and permissions. When the GFD is inside the IC package, it may directly interface with the memory controllers and coherent interconnect. When outside the IC package, the GFD may communicate through CXL links and may include its own memory management capabilities.

The CXL device may communicate according to a protocol based on CXL.mem semantics and expose at least one Host-managed Device Memory (HDM) address region to the entity. Additionally, the CXL device may communicate according to a protocol based on CXL.io semantics, and the RPU translates from physical addresses carried in CXL.io UIOMRd Transaction Layer Packets (TLPs) received from the entity to physical addresses within the first physical address space. Furthermore, the entity may utilize a second Host Physical Address (HPA) space as the second physical address space, the processing cores utilize a first HPA space as the first physical address space, the processor is a Modified CPU or GPU (MxPU), the memory comprises dynamic random-access memory (DRAM), and the RPU enables the entity to utilize more than 250 GB of the DRAM. The apparatus may further comprise a CXL Root Port configured to communicate with a CXL memory expander that utilizes a Device Physical Address (DPA) space; and wherein at least one of an operating system, system firmware, or the memory expander is configured to map between physical addresses within the first physical address space and physical addresses within the DPA space, which enable the entity to utilize the memory and/or the CXL memory expander.

The CXL device may comprise a CXL Endpoint (EP), and the apparatus may further comprise a second CXL EP configured to communicate with a second entity utilizing a second protocol based on CXL, whereby the second entity utilizes a third physical address space; and wherein the RPU is further configured to translate physical addresses within the third physical address space to physical addresses within the first physical address space, which enable the second entity to utilize the CXL memory expander. The CXL device may comprise a CXL Endpoint (EP), and the apparatus may further comprise a second CXL EP configured to communicate with a second entity utilizing a second protocol based on CXL, whereby the second entity utilizes a third physical address space; and wherein the RPU is further configured to translate physical addresses within the third physical address space to physical addresses within the first physical address space, which enable the second entity to utilize the memory. The second protocol based on CXL may be different from a CXL-based protocol utilized by the CXL device to communicate with the entity. At least one of the processing cores may be hidden, and the RPU may be further configured to utilize the hidden core for internal tasks, wherein the internal tasks comprise at least one of internal firmware processing, CXL Fabric Manager (FM) API processing, processing in memory (PIM), near-memory processing, or housekeeping tasks. The hidden core may be isolated from user access and visibility, providing user-infrastructure isolation.

Optionally, at least one of the processing cores may be hidden and may be utilized for collection of memory telemetry. At least one of the processing cores may be hidden and may be utilized for secure key storage and management for encrypting and decrypting data transmitted via the CXL device, leveraging user-infrastructure isolation provided by the at least one hidden core. The processor may further comprise a hardware-accelerated cryptographic engine, and the hidden core may be configured to utilize the hardware-accelerated cryptographic engine for performing at least part of the cryptographic operations on the data transmitted via the CXL device. Furthermore, the hidden core may enable support for confidential computing over memory exposed by the RPU via the CXL device; whereby confidential computing performs computation within a secure isolated environment to protect data in use. At least one of the processing cores may be hidden, and the RPU may be further configured to utilize the hidden core for error handling and/or correction tasks within a memory pool comprising the processor and the memory, enhancing data integrity and reliability. The error handling and/or correction tasks may further comprise predictive failure analysis (PFA) operations, configured to predict and handle imminent failure of memory components within the memory pool, thereby preempting potential data loss and system downtime.

The memory may comprise dynamic random-access memory (DRAM), and at least one of the processing cores may be hidden; and the RPU may be further configured to utilize the hidden core for controlling or managing memory access scheduling within a memory pool comprising the processor and the DRAM, to improve memory utilization and throughput. In other aspects, at least one of the processing cores may be hidden, and the RPU may be further configured to utilize the hidden core for managing security protocols within a memory pool comprising the processor and the memory, including data encryption and/or access controls. Additionally, at least one of the processing cores may be hidden, and the RPU may be further configured to utilize the hidden core for configuration management tasks within a memory pool comprising the processor and the memory, including the dynamic allocation and deallocation of memory resources. At least one of the processing cores may also be hidden, and the RPU may be further configured to utilize the hidden core for memory tiering tasks. The memory tiering tasks may further comprise migration of data between memory tiers based on the hotness level of the data, thereby increasing the performance of memory accesses from the entity to hot data. The processor may further comprise a direct Memory Access (DMA) engine, and the hidden core may be configured to utilize the DMA engine for migrating data between memory tiers.

In one embodiment, a method comprises: responding, by processing cores coupled via a coherent interconnect within an integrated circuit (IC) package, to snoop requests that utilize physical addresses within a first physical address space; accessing, by the processing cores, memory coupled to the IC package via memory channels; communicating, via a Compute Express Link (CXL) device, with an entity coupled to the IC package, wherein the CXL device utilizes a second physical address space; and translating, by a resource provisioning unit (RPU), physical addresses within the second physical address space to physical addresses within the first physical address space to enable the entity to access the memory via the CXL device and the memory channels.

Optionally, the communicating comprises communicating according to CXL.mem semantics, and the method further comprises exposing at least one Host-managed Device Memory (HDM) address region to the entity via the CXL device. Alternatively, the communicating may comprise communicating according to CXL.io semantics, and the second physical addresses are carried in CXL.io UIOMRd Transaction Layer Packets (TLPs) received from the entity. At least one of the processing cores may be hidden, and the method may further comprise utilizing the hidden core for internal tasks, wherein the internal tasks comprise at least one of internal firmware processing, CXL Fabric Manager (FM) API processing, processing in memory (PIM), near-memory processing, or housekeeping tasks. In other aspects, at least one of the processing cores may be hidden, and the method may further comprise utilizing the hidden core for memory tiering tasks, wherein the memory tiering tasks comprise migrating data between memory tiers based on hotness level of the data to increase performance of memory accesses from the entity to hot data.

To improve yield and reduce development costs, an MxPU may leverage intentional reservation of silicon area as designated area, such as a designated impaired area, to improve manufacturing yield and reduce time to market. Design blocks that reside in the designated areas are not mandatory for correct operation of the un-modified xPU, and may be replaced by other design blocks to create different types of MxPUs with different features and functional behaviors. By reserving an area in a die floorplan of an established xPU silicon design for a designated area, it may be possible to reuse the established silicon design, along with its core floorplan, packaging and substrate, more rapidly compared to developing a new design that removes the designated area from the silicon die, potentially reducing development time and associated costs while maintaining the original die size and layout. Additionally, this approach may allow for quicker adaptation of established designs to create new product variants, leveraging established manufacturing processes and potentially minimizing the need for extensive redesign and validation efforts typically associated with the development of new chip layouts, thereby streamlining the overall product development cycle.

FIG. 102A illustrates one embodiment of a silicon device functioning as an established xPU design before modification, which may include processing cores associated with Last Level Caches (LLCs), coupled through a cache coherent interconnect. The device may also include memory channels for external memory access, an inter-socket link (ISoL) for multi-processor configurations, and CXL Root Ports (RP) for peripheral connectivity. The designated area shown contains four processing cores with their associated LLC and one CXL RP, representing silicon area that may be repurposed in modified designs while maintaining the original die dimensions. The designated area may serve for creating Modified xPU (MxPU) derivatives of the original xPU or may serve for other purposes such as improving manufacturing yield.

FIG. 102B illustrates one embodiment of a silicon device functioning as a CXL Multi-Headed Device (MHD), wherein the designated area may accommodate an RPU and CXL endpoints instead of the processing cores and optionally CXL Root Ports that originally resided in the designated area as illustrated in FIG. 102A. The RPU performs physical address translations that enable hosts coupled to the CXL MHD MxPU to access memory via the MxPU memory channels. The remaining silicon area within the designated area may be utilized for on-die decoupling capacitors or spare/ECO standard cells, maximizing the utility of the repurposed space, which may enable the device to serve as a CXL-attached memory resource for external hosts while maintaining compatibility with the original die size and package.

FIG. 102C illustrates one embodiment of a silicon device (MxPU) functioning as a UALink Switch, wherein the designated area may accommodate an RPU and UALink ports instead of the processing cores and the CXL Root Port that originally resided in the designated area. The four UALink ports shown may provide connectivity to UALink-enabled devices, with the RPU performing physical address translations, such as between UALink Network Physical Addresses (NPAs) to MxPU Host Physical Addresses (HPAs) that enable UALink Accelerators coupled to the MxPU to access memory via the MxPU memory channels. The RPU may further enable UALink Accelerators to communicate with each other by translating UALink messages to MxPU interconnect messages and relaying the translated messages between UALink ports. The CXL MHD MxPU embodiment and the UALink Switch MxPU embodiment demonstrate how the same base silicon design may be adapted for different connectivity standards by repurposing the designated area with appropriate functional blocks.

In one embodiment, a Modified CPU or GPU (MxPU) comprises: memory channels capable of communicating with memory located outside the MxPU; a silicon die comprising (i) processing cores, coupled via a coherent interconnect, configured to utilize a first physical address space to access the memory via the memory channels, and (ii) a designated area occupying a space equivalent to at least one processing core; a communication port, selected from a Compute Express Link (CXL) endpoint, a CXL switch port, an NVLink port, or a UALink port, configured to receive messages comprising physical addresses within a second physical address space; a resource provisioning unit (RPU) configured to translate physical addresses within the second physical address space to physical addresses within the first physical address space; and wherein the designated area, which was originally designed to accommodate at least one processing core, accommodates at least one of the communication port or the RPU.

Optionally, the designated impaired area comprises a designated impaired area comprising at least one electrically disabled processing core. Optionally, the designated impaired area may be created by electrically disabling one or more processing cores that were part of the original xPU design. This electrical disabling may be accomplished utilizing various methods such as power gating, clock gating, fuse programming, or other techniques that render the core non-functional while preserving the physical silicon area. By electrically disabling one or more cores rather than physically removing them from the silicon die, the MxPU may maintain the original die dimensions and layout, potentially allowing for the reuse of established packaging, thermal solutions, and manufacturing processes while creating space for implementing alternative functional blocks such as the communication port or RPU.

The at least one of the communication port or the RPU may draw operating power through a power rail originally designed to supply power to the designated area. Optionally, the MxPU may leverage existing power distribution infrastructure by repurposing power rails that were originally designed to supply the processing cores in the designated area, which may enable efficient power delivery to the communication port or RPU without requiring extensive redesign of the power distribution network. The power rails may include metal layers, vias, and power delivery components that were already optimized for the original die layout, potentially reducing development time and maintaining established power integrity characteristics while supplying the newly implemented functional blocks.

The designated impaired area may comprise a designated impaired area, and the at least one of the communication port or the RPU may receive a clock signal through a clock distribution network originally designed to provide clock signals to the designated impaired area. Optionally, the MxPU may utilize existing clock distribution infrastructure by tapping into clock networks that were originally designed for the processing cores in the designated impaired area. Clock distribution networks are typically complex structures requiring careful design to minimize skew and jitter, and redesigning these networks late in the development cycle may be costly and time-consuming. By maintaining the existing clock distribution segments and inserting appropriate buffers or clock receivers, the communication port or RPU may obtain necessary clock signals without requiring extensive clock tree re-synthesis or re-layout, potentially preserving timing closure achievements from the original design while reducing development complexity.

The communication port of the RPU may be coupled to the coherent interconnect through an interconnect port originally designed for coupling the designated area to the coherent interconnect. Optionally, the MxPU may reuse existing interconnect infrastructure by electrically reassigning interconnect fabric ports that were originally allocated to processing cores in the designated area. The coherent interconnect typically includes ports for coupling various components, wherein the ports may have associated routing, arbitration logics, and protocol interfaces. By reusing an existing interconnect port for the communication port or RPU, the MxPU design may minimize changes to global routing and interconnect topology, potentially preserving timing closure margins and reducing verification complexity. This approach may enable the new functional blocks to communicate with other system components through established interconnect pathways without requiring extensive modifications to the interconnect fabric architecture.

The MxPU may further comprise a memory management unit (MMU); wherein the memory located outside the MxPU comprises at least 64 GB of dynamic random-access memory (DRAM) coupled via the memory channels, wherein the first physical address space is a Host Physical Address (HPA) space, and the MMU is configured to map addresses within a virtual address space, utilized by an operating system of the MxPU, to physical addresses within the first physical address space. Optionally, the MMU may enable the operating system running on the MxPU to utilize virtual addressing, which may provide memory protection, process isolation, and flexible memory allocation. The coupling of at least 64 GB of DRAM via the memory channels may provide sufficient memory capacity for memory pooling applications, wherein the MxPU may serve as a memory resource for external entities. The first physical address space being designated as the HPA space may enable coherent memory access across the system components and establish a unified addressing scheme for the MxPU's resources.

The processing cores may be configured to execute instructions compatible with an x86 instruction set architecture, and the MxPU may further comprise at least three levels of in-package cache memory coupled to the coherent interconnect, wherein a third level of the in-package cache memory has a capacity of at least 4 MB. Optionally, the MxPU may be based on x86 architecture, which may provide compatibility with a wide range of existing software and operating systems. The inclusion of at least three levels of in-package cache memory, with the third level (typically the last level cache or LLC) having at least 4 MB capacity, may provide a sophisticated cache hierarchy that can improve memory access performance. This cache hierarchy may be particularly beneficial when the MxPU serves as a CXL memory device, as the LLC may cache frequently accessed data from external entities, potentially reducing access latency compared to direct DRAM access.

The processing cores may be configured to execute instructions compatible with a RISC-based instruction set architecture selected from ARM instruction set architecture or RISC-V instruction set architecture, and the MxPU may further comprise at least two levels of in-package cache memory coupled to the coherent interconnect, wherein a last level of the in-package cache memory has a capacity of at least 4 MB. Optionally, the MxPU may be based on RISC architectures such as ARM or RISC-V, which may provide power efficiency and scalability advantages for memory pooling applications. The inclusion of at least two levels of in-package cache memory, with the last level having substantial capacity of at least 4 MB, may help reduce memory access latency and improve overall system performance. The cache hierarchy may work in conjunction with the coherent interconnect to maintain data consistency across the processing cores and external accesses through the communication port.

The processing cores may comprise streaming multiprocessors (SM) configured to execute instructions compatible with NVIDIA's Compute Unified Device Architecture (CUDA) parallel computing platform, wherein a number of the streaming multiprocessors exceeds 50. Optionally, the MxPU may be based on GPU architecture utilizing NVID-IA's CUDA platform, wherein the processing cores are implemented as streaming multiprocessors (SM) optimized for parallel computation. Having more than 50 streaming multiprocessors may provide substantial parallel processing capability, which may be beneficial for certain memory access patterns and workloads. This GPU-based MxPU architecture may be particularly suitable for applications that benefit from high memory bandwidth and parallel memory access capabilities, while the designated area may accommodate the communication port and RPU functionality needed for CXL-based or UALink-based memory pooling.

A design of the MxPU may be derived from an established CPU or GPU design comprising a second silicon die, and the silicon die of the MxPU may have a die size within +9% of the die size of the second silicon die of the established CPU or GPU design. Optionally, the MxPU may be manufactured with one or more designated impaired areas while retaining a comparable die size of an established CPU or GPU design. This approach may improve the effective manufacturing yield of silicon dies comprising the MxPU devices because the designated impaired areas may not be required to pass the stringent functional correctness testing during the production phases of the MxPU, as they were originally required during the production phases of the established CPU or GPU design. Consequently, the impact of defects may be mitigated, leading to a higher effective manufacturing yield, which may contribute to reducing the manufacturing costs associated with the production of such MxPU devices. Additionally or alternatively, utilizing such designated impairment techniques may reduce design and manufacturing costs associated with creating additional product variants, by identifying die areas associated with functionalities that are deemed unnecessary (hence functionally impaired) for specific product variants, and basing those MxPU variants on changes made in the designated impaired areas of an established CPU or GPU design. The term "established" in this context refers to a design that exists at the time of making the modification, which may be well after the date of filing this patent application, and indicates a pre-existing design without implying a specific timeframe relative to the date of filing this patent application. Alternative words that could convey a similar meaning include current, pre-designed, previously developed, legacy, available, already-designed, in-use, or prevailing. These terms aim to describe a silicon die design that is already in existence and potentially in use at the time the modification, the impairment, and/or the chopping-out is implemented, regardless of when the design was originally created or when this patent application was filed.

A design of the MxPU may be derived from an established CPU or GPU design, and the MxPU may retain memory controllers of the established CPU or GPU design. Optionally, the MxPU is derived from an established CPU/GPU design such that it is manufactured with one or more designated areas while retaining the memory controllers supported by the established design. By designating one or more processing cores as impaired areas without affecting the memory controller operation, the design may be optimized for its intended purpose in scenarios that require retaining maximum memory capacity. Non-limiting examples of intended purposes include memory pool, memory switch, memory processor, or protocol translator. This modification may allow for more cost-effective production of the MxPU while preserving its ability to provision a larger memory capacity, a capability inherent to the established CPU/GPU design and beneficial for memory-intensive applications and workloads.

A design of the MxPU may be derived from an established CPU or GPU design that included CXL root ports, and the MxPU may retain the CXL root ports of the established CPU or GPU design. Optionally, for the purpose of designing and manufacturing a memory processor or a memory switch, designating processing cores as impaired areas without affecting the CXL ports of the established CPU/GPU design may enable creating additional stock keeping units (SKUs) with minimal or no redesign of the floorplan and with minimal changes to the masks used during manufacturing. This approach may allow manufacturers to obtain additional product variants without incurring the full costs associated with rebuilding the floorplan layout, potentially reducing time-to-market and development expenses while maintaining the connectivity capabilities of the original design.

The MxPU may further comprise an inter-socket link (ISoL) configured to utilize the first physical address space, wherein the ISoL couples the MxPU to a second MxPU and enables the processing cores to access a second memory coupled via second memory channels to the second MxPU. Optionally, the MxPU may include an ISoL to support scaling from a single MxPU to a cluster of interconnected homogeneous or heterogeneous MxPUs. An ISoL may enable near-linear scaling, coherent shared memory, sub-microsecond atomics, and rapid migration of workloads. It may expose remote high-bandwidth memory and I/O, support composable disaggregation, and/or provide redundant paths for RAS features such as fail-over and hot-service. Partitioning target functionality across xPU instances may improve manufacturing yield, allow mixed process nodes, and lower power per bit. Optionally, the ISoL may be selected from an interconnect based on: AMD Infinity Fabric, NVIDIA NVLink-C2C, ARM CHI C2C, or Intel UPI.

The communication port may comprise the CXL endpoint, and the MxPU may further comprise a second CXL endpoint configured to communicate with a second entity, wherein the second entity utilizes a third physical address space, and the RPU is further configured to translate physical addresses within the third physical address space to physical addresses within the first physical address space to enable the second entity to access at least a portion of the memory. Optionally, the MxPU may include CXL endpoints to support multi-headed configurations wherein external entities can simultaneously access the MxPU's memory resources. The RPU may maintain separate translation contexts for the coupled entities, performing host-to-host physical address translations from the entities' physical address spaces to the MxPU's first physical address space. This multi-headed capability may enable the MxPU to function as a shared memory pool resource, providing memory services to hosts while maintaining proper isolation and access control between different entities.

The designated area may comprise the at least one of the communication port or the RPU and a remaining unassigned area, wherein the remaining unassigned area is utilized for at least one of on-die decoupling capacitors or spare standard cells. Optionally, the designated area may include not only functional blocks such as the communication port or RPU but also remaining unassigned silicon area. This remaining unassigned area may be utilized for on-die decoupling capacitors, which may help improve power delivery stability and reduce noise in the power distribution network. Alternatively or additionally, the remaining unassigned area may be reserved for spare standard cells or Engineering Change Order (ECO) cells, which may provide flexibility for late-stage design fixes or modifications without requiring substantial layout changes, which may increase the utility of the designated area while maintaining design flexibility.

The communication port may comprise an NVLink port, and the second physical address space comprises a network address space. The first physical address space may comprise a GPU physical address space, and the RPU may be further configured to translate physical addresses within the network address space to the GPU physical address space. The MxPU may further comprise a second silicon die comprising the communication port. Additionally, the communication port may comprise an NVLink port, and the second silicon die may comprise an NVLink Fusion chiplet.

The communication port may comprise NVLink ports, and the designated area may accommodate at least some of the NVLink ports. Optionally, when the MxPU is configured as a processor or a switch with NVLink ports, the designated area may accommodate NVLink ports rather than a single port. This multi-port configuration may enable the MxPU to function as a multi-port GPU or an NVLink-based switch device, facilitating interconnection between NVLink-enabled devices in a fabric topology. The NVLink ports may share the RPU resources for address translation and protocol handling.

The second physical address space may comprise a Network Physical Address (NPA) space, and the messages may comprise UALink-based messages. In some implementations, the second physical address space comprises a Network Physical Address (NPA) space, the first physical address space comprises a System Physical Address (SPA) space, and the RPU may be further configured to translate physical addresses within the NPA space to the SPA space. Furthermore, the second physical address space may comprise a Network Physical Address (NPA) space, the first physical address space comprises a Host Physical Address (HPA) space, and the RPU may be configured to translate physical addresses within the NPA space to the HPA space.

The communication port may comprise UALink ports, and the designated area may accommodate at least some of the UALink ports. Optionally, when the MxPU is configured as a UALink switch, the designated area may accommodate UALink ports rather than a single port. This multi-port configuration may enable the MxPU to function as a UALink switch device, facilitating interconnection between UALink-enabled devices in a fabric topology. The UALink ports may share the RPU resources for address translation and protocol handling.

The memory located outside the MxPU may comprise at least 8 GB of dynamic random-access memory (DRAM) coupled via the memory channels, and the communication port may comprise CXL endpoints located in the designated area, enabling the MxPU to function as a CXL Multi-Headed Device (MHD). Optionally, the MxPU may be configured as a CXL Multi-Headed Device (MHD) by incorporating CXL endpoints within the designated area. This MHD configuration may allow external hosts to simultaneously access the MxPU's memory resources through different CXL connections. Different CXL endpoints may have different address translation contexts managed by the RPU, enabling isolated access to different portions of the DRAM or shared access with appropriate coherency mechanisms. Additionally or alternatively, the designated area may be sufficiently large to accommodate both the communication port and the RPU, rather than just one or the other. This configuration may enable the MxPU to implement complete CXL or UALink functionality within the repurposed silicon area, potentially allowing for more sophisticated memory pooling or switching capabilities while maintaining the original footprint of the silicon die.

In one embodiment, a method for improving manufacturing yield of processor devices comprises: identifying at least one processing core area in a processor design for designation as an impaired area; configuring the processor design to exclude the at least one processing core area from functional testing requirements while retaining a same die size; implementing at least one of a communication port or a resource provisioning unit (RPU) in the designated impaired area, wherein the communication port is selected from a Compute Express Link (CXL) endpoint, a CXL switch port, an NVLink port, or a UALink port, and the RPU is configured to translate physical addresses between different physical address spaces; and manufacturing processor devices based on the configured processor design, whereby defects occurring within the designated impaired area do not cause rejection of the processor devices during production testing. Optionally, this method may enable improved manufacturing yield by identifying and designating certain areas of a processor die as potential impaired areas that are excluded from stringent functional testing requirements. By implementing alternative functional blocks such as communication ports or RPUs within these designated impaired areas, the method may create valuable product variants while reducing the silicon area that must pass stringent functional tests. For example, processing cores are typically tested to operate correctly at high clock rates that significantly exceed the typical clock rates required for communication ports and RPUs. Defects that would normally cause die rejection if they occur in processing cores may be tolerated when they occur in alternative functional blocks in the designated impaired area, potentially increasing the percentage of usable dies from the wafers.

In one embodiment, a method for operating a Modified CPU or GPU (MxPU) comprises: utilizing, by processing cores of the MxPU coupled via a coherent interconnect, a first physical address space to access memory located outside the MxPU via memory channels; receiving, via a communication port selected from a Compute Express Link (CXL) endpoint, a CXL switch port, an NVLink port, or a UALink port, messages comprising physical addresses within a second physical address space; translating, by a resource provisioning unit (RPU), physical addresses within the second physical address space to physical addresses within the first physical address space; and operating at least one of the communication port or the RPU from a silicon die area that excludes at least one processing core present in an established processor design from which the MxPU was derived.

Optionally, the communication port comprises the CXL endpoint configured to communicate with an entity according to a protocol based on CXL, the first physical address space is a first Host Physical Address (HPA) space utilized by the processing cores, the second physical address space is a second Host Physical Address (HPA) space utilized by the entity, and the translating comprises performing host-to-host physical address translations from the second HPA space to the first HPA space. Optionally, the method may include performing host-to-host physical address translations that enable external entities to access the MxPU's memory resources utilizing protocols based on CXL. These translations may dynamically map between different HPA spaces during operation, allowing the MxPU to serve memory access requests from external hosts while maintaining physical address space isolation and proper access control.

The method may further comprise receiving, via a second communication port, second messages comprising physical addresses within a third physical address space utilized by a second entity; and translating, by the RPU, physical addresses within the third physical address space to physical addresses within the first physical address space to enable the second entity to access at least a portion of the memory. Optionally, the method may include supporting multi-headed operations wherein external entities simultaneously access the MxPU's memory resources. The RPU may maintain separate translation contexts and perform different address translations for different coupled entities during operation, enabling the MxPU to function as a shared memory pool resource with concurrent access capabilities while maintaining isolation between different entities' memory accesses.

FIG. 113 illustrates one embodiment of a processor derived from an established CPU design, wherein termination circuits are implemented at interfaces between different silicon die areas. The processor may be manufactured using one of two exemplary approaches. A first approach is to remove a portion of the silicon design during the floorplan partitioning stage, resulting in a chip design that excludes the unnecessary part. A second approach is to physically chop the unnecessary part at the dicing stage, which includes physically cutting away a portion of the manufactured chip. The illustrated processor includes a first silicon die area comprising Memory Channels, an MMU, one or more CXL EPs, one or more CXL RPs, processing cores with LLCs, and an RPU. A second silicon die area comprises additional processing cores with their associated LLCs. To preserve the integrity of the remaining components (whether the portion is removed at the floorplan partitioning stage or at the dicing stage), termination circuits are added between the first and second silicon die areas to block signal propagation beyond specific physical points. The termination circuits are used to properly end signal paths, preventing reflections or unintended signal propagation. By adding the termination circuits at potential cut points, the design becomes more tolerant to variations in the physical dicing process, as signals are cleanly terminated regardless of the exact cut location within a certain range. Therefore, adding the termination circuits may also increase the permissible variance in the dicing process compared to an alternative solution that does not add such termination circuits.

The termination circuits may be implemented during the floorplan partitioning stage, which includes the systematic division of the integrated circuit design to large functional blocks. This implementation of termination circuits enables the creation of one or more chip versions with distinct cutting locations. For example, a first version of the integrated circuit may be designed with termination circuits positioned for cutting at a first predetermined location between the first and second silicon die areas, and a second version of the integrated circuit may be designed with termination circuits positioned for cutting at a second predetermined location. The termination circuits should be added adjacent to the connection or cutting points between the silicon die areas to ensure that signals are properly terminated close to where they may be interrupted. This adjacency minimizes the length of unterminated signal paths, thereby mitigating risks associated with signal integrity issues and unintended electromagnetic coupling effects. In the illustrated embodiment, the termination circuits form an interface region between the first silicon die area containing the communication ports (CXL EP, CXL RP/EP, CXL RP) and the second silicon die area containing the additional processing cores.

Optionally, at least some of the termination circuits incorporate an "enable" input that serves as a control mechanism for their operation when activated. The functionality of the termination circuits is such that when the enable input is activated, the termination circuit effectively blocks signal propagation between the first and second silicon die areas, whereas when the enable input is deactivated, the circuit allows signals to pass through unimpeded. This "enable" functionality that controls the chip's behavior allows for the selective activation or deactivation of certain signal paths depending on which version of the chip is being produced or utilized. For example, if there is a need to chop-out the second silicon die area containing optional processing cores coupled to the coherent interconnect, then the interconnect loops must be closed such that data can still circulate through the remaining portions of the coherent interconnect in the first silicon die area, maintaining the chip's functionality despite the removal of the second silicon die area. Thus, in this example the termination circuits operate in two modes: either allowing passage to the second silicon die area that exists after it, or performing a turnaround for the data arriving on the interconnect paths, effectively shortening the path logically. Additionally, the length of the conductors connecting the termination circuits to the optional logic in the second silicon die area (that may be chopped from a certain version of the chip) may be changed according to the required tolerance and properties of the dicing stage. Typically, signal ends are not left floating, especially not inputs that can lead to unstable or metastable states. Therefore, pullup or pulldown termination circuits are placed on the inputs to ensure that the input is in a defined logical state. These circuits are designed such that they handle input signals even if they are floating due to the second silicon die area being cut. On the output, the termination circuits block the signals to prevent antennas or to prevent short circuits when the signals themselves were blocked already in the logical termination block.

One of the possible goals during the modification of an established CPU design to create the processor illustrated in FIG. 113 may be to modify the Register Transfer Level (RTL) as little as possible. RTL is a design abstraction representing the registers of a digital circuit and the operations performed on signals as they pass between these registers. Modifying RTL can have far-reaching effects on the chip's functionality and timing, and changes typically requires re-verification of the entire design and re-synthesis of the affected portions. Thus, modifying the RTL can be time-consuming and may introduce new issues. By minimizing RTL changes, the design process becomes more efficient and less prone to errors. Additionally, large chip designs are often divided to smaller, manageable blocks that can be designed and synthesized separately, which allows for parallel development and easier management of complex designs. By implementing the chopping at the floorplan partitioning stage between the first and second silicon die areas, it is possible to isolate the effects to specific blocks, leaving others unchanged, which minimizes the scope of necessary modifications and reduces the overall impact on the design and verification process. In this embodiment, the first silicon die area retains the communication ports (CXL EP, CXL RP/EP, CXL RP) and the RPU necessary for the processor's operation, while the second silicon die area containing additional processing cores may be optionally removed based on product requirements.

In one embodiment, a processor, derived from an established CPU design, comprises memory channels capable of communicating with memory located outside the processor; processing cores, coupled via a coherent interconnect, configured to utilize a first physical address space to access the memory via the memory channels, and to respond to snoop requests that include physical addresses within the first physical address space; communication ports, selected from at least one of: Compute Express Link (CXL) endpoints, CXL switch ports, or UALink ports; wherein the communication ports are configured to receive messages comprising physical addresses within other physical address spaces; a resource provisioning unit (RPU) configured to translate physical addresses within the other physical address spaces to physical addresses within the first physical address space; and termination circuits implemented at interfaces connecting between (i) a first silicon die area comprising the communication ports, and (ii) a second silicon die area that do not include the communication ports. Optionally, the processor may be manufactured by modifying an established CPU design wherein termination circuits are placed at interfaces between different silicon die areas. The first silicon die area may contain the communication infrastructure including CXL endpoints, CXL switch ports, and/or UALink ports along with the RPU, while the second silicon die area may contain components that are not required for the processor's intended functionality. The coherent interconnect may implement cache coherency protocols such as MESI, MOESI, or proprietary coherency schemes to maintain data consistency across the processing cores. The RPU may perform real-time address translations to enable external entities to access memory resources through the communication ports while maintaining proper isolation between different physical address spaces. The termination circuits may serve as electrical boundaries that allow for flexible manufacturing options, including the ability to retain or remove the second silicon die area based on product requirements.

Optionally, at least some of the termination circuits comprise an enable input configured to control signal propagation, wherein when the enable input is activated, the termination circuits block signal propagation on conductors designed to connect the first silicon die area with the second silicon die area, and when the enable input is deactivated, the termination circuits allow signal propagation between the first silicon die area and the second silicon die area. Optionally, the enable input functionality may provide dynamic control over the termination circuits' behavior, allowing for configuration or manufacturing-time selection of different processor variants. When the enable input is activated, the termination circuits may effectively isolate the first silicon die area from the second silicon die area, creating electrical boundaries that prevent signal propagation across the interface. This isolation may be achieved utilizing various circuit techniques such as tri-state buffers, transmission gates, or analog switches that can disconnect the signal paths. When the enable input is deactivated, the termination circuits may become transparent to signal flow, allowing normal communication between the silicon die areas as if the termination circuits were not present. The enable input may be controlled utilizing various mechanisms including fuse programming, configuration registers, external pins, or firmware settings, providing flexibility in how the processor's functionality is configured.

The termination circuits may be configured to block signal propagation between the second silicon die area and the first silicon die area, wherein for input signals, the termination circuits comprise pullup or pulldown circuits to provide a defined logical state, and wherein for output signals, the termination circuits block signal propagation to prevent antenna effects and/or short circuits. Optionally, the termination circuits may have different implementations for handling input and output signals to maintain signal integrity and prevent electrical issues. For input signals that would normally come from the second silicon die area, pullup or pulldown circuits may be employed to ensure that these inputs maintain a stable and predictable logical state rather than floating, which could cause metastability, increased power consumption, or unpredictable behavior in the receiving logic. The pullup circuits may connect the input to a positive voltage rail through a resistor, while pulldown circuits may connect to ground, with the choice between pullup and pulldown potentially depending on the default state requirements of the specific signals. For output signals from the first silicon die area, the termination circuits may include blocking mechanisms such as series switches or gates that prevent these signals from propagating to the removed or disconnected second silicon die area, thereby avoiding antenna effects that could cause electromagnetic interference or signal integrity issues, and preventing potential short circuits that could occur if output drivers were coupled to severed or improperly terminated conductors.

The processor may further comprise conductors connecting the termination circuits to the second silicon die area, wherein the conductors are modified during a floorplan partitioning stage based on required tolerance of a dicing stage; and wherein the termination circuits are configured to maintain integrity of the coherent interconnect by: allowing passage to the second silicon die area when present, or performing a turnaround for data arriving on interconnect paths when the second silicon die area is removed. Optionally, the conductors between the termination circuits and the second silicon die area may be designed with specific lengths and routing patterns that accommodate variations in the dicing process, wherein longer conductors may provide greater tolerance for dicing position variations while shorter conductors may minimize signal delay and area overhead. During the floorplan partitioning stage, these conductor lengths may be optimized based on the expected precision of the dicing equipment and the acceptable range of cut positions. The termination circuits may incorporate logic to maintain the coherent interconnect's functionality, particularly for ring-based or mesh-based interconnect topologies wherein data packets circulate through the entire network. When the second silicon die area is present, the termination circuits may act as pass-through elements, allowing data packets to flow normally through the interconnect. When the second silicon die area is removed, the termination circuits may implement turnaround functionality that receives incoming data packets and redirects them back into the interconnect, effectively shortening the interconnect path while maintaining the logical continuity required for proper packet routing and preventing deadlock conditions.

In some implementations, functional blocks in the first silicon die area not directly affected by removal of the second silicon die area maintain functional characteristics of their original Register Transfer Level (RTL) design; and interface blocks that directly connect between the first silicon die area and the second silicon die area have modified RTL designs comprising modifications to at least one of: signal routing, interface logic, or adaptations required for maintaining functionality without the second silicon die area. Optionally, the design methodology may minimize modifications to the established CPU design's RTL by concentrating changes in the interface blocks that directly interact with the potentially removed second silicon die area. Functional blocks in the first silicon die area that do not have direct connections to the second silicon die area may retain their original RTL implementation, which may reduce verification effort, maintain proven functionality, and minimize the risk of introducing new bugs. The interface blocks requiring RTL modifications may include changes to signal routing logic to redirect signals that would normally go to the second silicon die area, modifications to interface protocols to handle the absence of expected responses from the removed area, and adaptations to state machines or control logic that may need to operate differently when the second silicon die area is not present. These RTL modifications may be designed to be minimally invasive, potentially using conditional compilation or parameterization techniques that allow the same RTL source to support both configurations with and without the second silicon die area.

The modified RTL designs may further comprise modifications to clock distribution networks that are modified to exclude the second silicon die area, and power management logic that is adjusted to account for removal of the second silicon die area. Optionally, the clock distribution network modifications may include reconfiguring clock trees to eliminate branches that would have supplied clock signals to the second silicon die area, which may reduce clock network power consumption and potentially improve clock skew characteristics for the remaining portions of the processor. The clock distribution modifications may include changes to clock gating cells, adjustments to clock buffer placement, and potential rebalancing of the clock tree to maintain proper timing relationships in the first silicon die area. The power management logic modifications may encompass changes to power gating controls that would have managed power domains in the second silicon die area, updates to power state machines that no longer need to coordinate with components in the removed area, and adjustments to dynamic voltage and frequency scaling algorithms that may need to account for the reduced computational resources and power consumption characteristics of the modified processor. These modifications may also include updates to power monitoring and reporting mechanisms to accurately reflect the power consumption of the reduced processor configuration.

Manufacturing of the processor may comprise physically removing the second silicon die area from silicon die while retaining the communication ports in the first silicon die area, thereby reducing die size compared to the established CPU design. Optionally, the processor may be derived from an established CPU design by physically removing the second silicon die area from the silicon die while retaining the communication ports supported by the established CPU design. This manufacturing process may be designed to reduce the overall die size, and potentially also the manufacturing costs, compared to the established CPU design, while preserving the full communication port functionality. By removing portions of the silicon die that do not affect the communication port operation, the design may be optimized for its intended purpose as a memory-centric processing unit in high-fanout, multi-tier memory pool scenarios. The retention of the communication ports, which may include CXL endpoints, CXL switch ports, and/or UALink ports, may enable establishing connections with the same number of external entities as could be achieved with the established CPU design, thereby maintaining connectivity capabilities, facilitating efficient resource sharing among coupled entities, and allowing for more cost-effective production while preserving the processor's ability to provide services to other systems.

In certain aspects, manufacturing of the processor comprises physically removing the second silicon die area from silicon die while retaining memory controllers supported by the established CPU design in the first silicon die area, thereby reducing die size compared to the established CPU design. Optionally, the processor may be derived from an established CPU design such that the manufacturing process includes physically removing the second silicon die area from the silicon die while retaining memory controllers supported by the established CPU design. This manufacturing process may be designed to reduce the overall die size while preserving the full functionality of the memory controllers. By removing portions of the silicon die that do not affect memory controller operation, the design may be optimized for its intended purpose as a memory-centric processing unit in scenarios that require maximized memory capacity. The retention of memory controllers may enable the processor to support the same amount of memory coupled via the memory channels as the established CPU design, thereby facilitating efficient memory utilization. This modification may allow for more cost-effective production of the processor while preserving its ability to support larger memory capacity, a capability inherent to the established CPU design and beneficial for memory-intensive applications and workloads.

The RPU may be further configured to perform host-to-host physical address translations from a second host physical address (HPA) space, utilized by an entity coupled to at least one of the communication ports, to physical addresses within the first physical address space utilized by the processing cores. Optionally, the RPU may implement address translation mechanisms to enable seamless memory access between different physical address spaces. The host-to-host physical address translations may include maintaining translation tables, implementing content-addressable memories, or utilizing programmable address decoders that can map addresses within the second HPA space to corresponding physical addresses within the first physical address space. The entity utilizing the second HPA space may be an external host, accelerator, or another processor that requires access to memory resources managed by the processor. The translation process may support various mapping schemes including linear offset mappings, windowed mappings, or more complex non-contiguous mappings, and may include access control mechanisms to enforce memory protection boundaries between different entities.

The memory channels may comprise at least four memory channels, and the second silicon die area comprises processing cores that were utilized in the established CPU design but are unnecessary for operation of the processor when functioning as a memory processor. Optionally, the inclusion of at least four memory channels may provide substantial memory bandwidth to support the processor's role as a memory processor, wherein channels may operate in parallel to increase aggregate bandwidth and reduce access latency utilizing interleaving. The second silicon die area containing processing cores from the established CPU design may represent computational resources that, while useful in a general-purpose CPU context, may not be required when the processor is repurposed for memory-centric operations. The removal of these processing cores may reduce power consumption, decrease die area, and potentially improve yields while maintaining the memory access capabilities required for the processor's intended use case.

The termination circuits may be implemented during a floorplan partitioning stage that includes systematic division of integrated circuit design into functional blocks, enabling creation of multiple processor versions with distinct cutting locations between the first silicon die area and the second silicon die area. Optionally, the implementation of termination circuits during the floorplan partitioning stage may provide flexibility in creating different processor variants from a single base design. The floorplan partitioning stage may include evaluating the established CPU design to identify optimal boundaries between functional blocks where termination circuits can be inserted with minimal impact on the overall design. This systematic division may consider factors such as signal routing complexity, power domain boundaries, clock domain crossings, and functional dependencies between blocks. It may also enable a product family with different cost points and capabilities while leveraging a common design foundation and a reduced engineering effort required for the variants.

The termination circuits may be positioned adjacent to connection points between the first silicon die area and the second silicon die area to minimize length of unterminated signal paths and mitigate risks associated with signal integrity issues and electromagnetic coupling effects; and wherein the communication ports comprise at least one CXL endpoint configured to communicate according to CXL.mem semantics. Optionally, the adjacent positioning of termination circuits to the connection points may be designed to minimize the stub length of unterminated conductors, which may reduce signal reflections, minimize electromagnetic emissions, and improve overall signal integrity. The proximity of termination circuits to the boundary between silicon die areas may ensure that signals are properly terminated within a short distance of where they would be interrupted by the removal of the second silicon die area, potentially reducing the risk of these unterminated segments acting as antennas or causing crosstalk with nearby signals. The inclusion of at least one CXL endpoint configured for CXL.mem protocol may enable the processor to function as a CXL-attached memory device, wherein external hosts can access the processor's memory resources utilizing CXL.mem messages.

In one embodiment, a method of manufacturing a processor derived from an established CPU design, the method comprises fabricating circuitry for memory channels capable of communicating with memory located outside the processor; fabricating circuitry for processing cores coupled via a coherent interconnect, wherein the processing cores are configured to utilize a first physical address space to access the memory via the memory channels, and to respond to snoop requests that include physical addresses within the first physical address space; fabricating circuitry for communication ports selected from at least one of: Compute Express Link (CXL) endpoints, CXL switch ports, or UALink ports; wherein the communication ports are configured to receive messages comprising physical addresses within other physical address spaces; fabricating circuitry for a resource provisioning unit (RPU) configured to translate physical addresses within the other physical address spaces to physical addresses within the first physical address space; and fabricating termination circuits at interfaces connecting between: a first silicon die area comprising the communication ports, and a second silicon die area that do not include the communication ports. Optionally, the method of manufacturing the processor may include modifying an established CPU design by placement of termination circuits that create defined boundaries between different silicon die areas. The fabrication process may include creating the first silicon die area containing the communication infrastructure and the RPU, while the second silicon die area may contain components from the established CPU design that are not required for the processor's intended functionality. The termination circuits may be fabricated during various stages of the manufacturing process, including during metallization layers where they can be integrated into the interconnect structure.

Optionally, fabricating the termination circuits comprises fabricating an enable input as part of at least some of the termination circuits, the enable input being configured such that when activated, the termination circuit blocks signal propagation on conductors connecting the first silicon die area with the second silicon die area, and when deactivated, the termination circuit allows signal propagation between the first silicon die area and the second silicon die area. The established CPU design may be defined by a first Register Transfer Level (RTL) design, and the processor is defined by a second RTL design derived from the first RTL design by: preserving portions of the first RTL design corresponding to functional blocks in the first silicon die area not directly affected by removal of the second silicon die area to form part of the second RTL design; and modifying portions of the first RTL design corresponding to interface blocks that connect between the first silicon die area and the second silicon die area, to specify the termination circuits in the second RTL design. Furthermore, the fabricating of the termination circuits may be performed at locations determined during a floorplan partitioning stage of a design modification process applied to the established CPU design, the floorplan partitioning stage comprising: systematically dividing an integrated circuit design corresponding to the established CPU design; identifying potential cut points between the first silicon die area and the second silicon die area; and optimizing placement for the termination circuits.

The method may further comprise configuring the termination circuits to allow signal propagation between the first silicon die area and the second silicon die area for manufacturing a first version of a semiconductor device; and configuring the termination circuits to block signal propagation between the first silicon die area and the second silicon die area for manufacturing a second version of a semiconductor device. Optionally, the method may support manufacturing versions of semiconductor devices from a single base design by configuring the termination circuits differently for different versions. For the first version of the semiconductor device, the termination circuits may be configured in a pass-through mode that allows normal signal propagation between the first and second silicon die areas, effectively creating a processor that retains the full functionality of the established CPU design. For the second version of the semiconductor device, the same termination circuits may be configured in a blocking mode that prevents signal propagation between the silicon die areas, creating a reduced-functionality processor optimized for specific use cases such as memory processing or communication switching. The ability to create different product variants from a single mask set may reduce development costs and time-to-market while enabling a broader product portfolio.

In such a method, for input signals the termination circuits may comprise pullup or pulldown circuits to maintain a defined logical state, and for output signals the termination circuits block signals to prevent antenna effects or short circuits. The method may further comprise modifying conductors connecting the termination circuits to the second silicon die area based on tolerance requirements of a dicing stage. The method may also comprise maintaining integrity of the coherent interconnect by configuring the termination circuits to: allow passage to the second silicon die area when present, or perform a turnaround for data arriving on interconnect paths when the second silicon die area is removed. The processor may be manufactured based on a modified design created by: preserving Register Transfer Level (RTL) design of functional blocks in the first silicon die area not directly affected by removal of the second silicon die area, and modifying RTL design of interface blocks that connect between the first silicon die area and the second silicon die area. The modifying of the RTL design may be limited to signal routing modifications, interface logic modifications, and adaptations required for maintaining functionality without the second silicon die area. Additionally, the modifying of the RTL design may comprise at least one of: updating signal routing to accommodate the termination circuits, modifying clock distribution networks to exclude the second silicon die area, or adjusting power management logic to account for removal of the second silicon die area.

The method may further comprise verifying functionality of the modified RTL design by: performing static timing analysis on modified interface blocks, conducting functional simulations of the processor design, and comparing results with the established CPU design to verify equivalent performance in remaining functional blocks. Optionally, the verification process for the modified RTL design may employ a methodology to ensure functional correctness and performance equivalence with the established CPU design. The static timing analysis on modified interface blocks may verify that the addition of termination circuits and modifications to signal routing do not introduce timing violations or degrade critical path performance significantly. The functional simulations may include directed tests targeting the termination circuit behavior under various configurations, random testing to uncover corner cases, and system-level simulations to verify proper operation in the context of the complete processor design. The comparison with the established CPU design may involve running identical test suites on both designs and verifying that the remaining functional blocks exhibit identical behavior, ensuring that the modifications have not inadvertently affected unmodified portions of the design. This verification process may also include formal verification techniques to mathematically prove the equivalence of specific properties between the original and modified designs.

Furthermore, the method may comprise physically removing the second silicon die area while retaining the communication ports in the first silicon die area. The method may also comprise physically removing the second silicon die area while retaining memory controllers supported by the established CPU design in the first silicon die area.

In one embodiment, a semiconductor device, comprises: memory channels capable of communicating with memory located outside the semiconductor device; processing cores, coupled via a coherent interconnect, configured to utilize a first physical address space to access the memory via the memory channels, and to respond to snoop requests that include physical addresses within the first physical address space; memory management units (MMIUs) configured to translate virtual addresses to physical addresses within the first physical address space in response to memory access requests from the processing cores; a port capable of receiving, from a host located outside the semiconductor device, messages comprising Compute Express Link (CXL)

requests and physical addresses within a second physical address space; and a resource provisioning unit (RPU) configured to translate physical addresses within the second physical address space to physical addresses within the first physical address space to enable the host to access resources accessible via the first physical address space.

It is noted that the MMUs may translate virtual addresses not only for memory access but also for memory-mapped I/O operations, device register access, configuration space access, interrupt controller registers, performance monitoring unit registers, system management registers, PCIe configuration spaces, accelerator control registers, network interface card (NIC) registers, storage controller registers, and/or other system resources that are mapped into the physical address space. In data center environments, MMUs may additionally handle address translation for accessing shared resources such as remote direct memory access (RDMA) regions, GPU memory spaces, persistent memory (PMEM) regions, storage class memory (SCM), and virtualized device interfaces. The first physical address space may therefore encompass, in addition to the memory accessible through the memory channels, also these various memory-mapped resources, allowing the processing cores and other components within the semiconductor device to access both memory and I/O resources utilizing a unified addressing mechanism.

The term "resources" encompasses a broad range of system components and capabilities that may be accessed via a physical address space. Resources may include memory resources and/or memory-mapped devices. Memory resources may include DRAM, SRAM, non-volatile memory, or storage class memory (SCM) accessible through memory channels. Memory-mapped devices may include processors, accelerators, input/output devices, and other components that are accessible utilizing memory-mapped I/O operations. Examples of memory-mapped devices include GPUs, NICs, Host Bus Adapters (HBAs), NVMe SSDs, cryptographic accelerators, compression/decompression engines, machine learning accelerators, and other specialized processing units. The RPU may translate physical addresses to enable external hosts to access at least some of these resources utilizing the unified addressing mechanism provided by the first physical address space, thereby allowing integration of diverse system components through the CXL interface.

Optionally, at least one of the resources comprises at least 8 GB of dynamic random-access memory (DRAM), and the memory channels are Double Data Rate (DDR) channels. Memory channels in semiconductor devices provide high-bandwidth communication pathways between the processing cores and external memory components. The memory channels may support various memory interface standards, such as DDR5, and may include memory controllers, physical interfaces, and associated circuitry for managing data transfers and memory operations. Multiple memory channels may operate in parallel to increase memory bandwidth and capacity. Optionally, the size of the memory may be at least 32 GB, 64 GB, 128 GB, 256 GB, 0.5 TB, or 1 TB.

At least one of the resources may comprise at least a portion of the memory located outside the semiconductor device, and the semiconductor device may be capable of exposing to the host the at least one of the resources as a CXL-attached memory. Optionally, the semiconductor device may function as a memory pooling device that aggregates memory resources for access by external hosts. The CXL-attached memory may appear to the host as local memory accessible utilizing standard memory operations, while the actual memory may be physically located outside the semiconductor device and coupled via the memory channels. The semiconductor device may implement memory abstraction layers that hide the physical location and characteristics of the memory from the host, providing a unified memory interface. The RPU may handle the necessary address translations and protocol conversions to enable access to the external memory as if it were attached to the host. The semiconductor device may support various memory topologies, including directly attached memory modules, memory coupled through memory buffers or expanders, and hierarchical memory configurations with tiers of memory devices.

The semiconductor device may be further configured to: expose the CXL-attached memory to hosts, implement memory interleaving across the memory channels, and provide memory capacity expansion beyond native memory limit of an average host out of the hosts. In one example, the CXL-attached memory is, or functions as, a Type 3 CXL memory expander device.

At least one of the resources may comprise a memory mapped device selected from at least one of: a Graphics Processing Unit (GPU), a Network Interface Card (NIC), Host Bus Adapter (HBA), or a Non-Volatile Memory Express Solid-State Drive (NVMe SSD). Optionally, the memory mapped devices accessible as resources may be coupled to the semiconductor device through various interconnect technologies such as PCIe, UCIe, CXL, or proprietary interconnects. When a GPU is accessed as a memory mapped device, the RPU may translate addresses to enable the host to access GPU memory regions, control registers, and computation resources. For NICs, the accessible resources may include packet buffers, descriptor rings, and control registers for network configuration. HBAs may expose storage command queues, data buffers, and status registers utilizing memory-mapped regions. NVMe SSDs may provide access to submission and completion queues, controller registers, and data buffers through the memory-mapped interface. The RPU may implement device-specific translation logic to properly map host accesses to the appropriate regions of the memory mapped devices while maintaining proper ordering and coherency requirements for the different device types.

In certain aspects, at least one of the resources comprises at least a portion of the memory located outside the semiconductor device, the port is configured to expose a CXL device that communicates according to CXL.mem semantics, and to expose a Host-managed Device Memory (HDM) region to the host. Optionally, the HDM region exposed to the host may be configured utilizing CXL HDM decoder registers that specify the size, base address, and attributes of the memory region. The semiconductor device may support HDM decoders to expose memory regions with different characteristics or to different hosts. The CXL.mem protocol enables the host to perform memory reads and writes to the HDM region using standard load/store semantics, while the semiconductor device handles the protocol conversion and address translation to access the actual memory resources. The HDM region may be backed by various types of memory including volatile DRAM, persistent memory, or a combination thereof, and the semiconductor device may implement appropriate memory controller logic to manage the different memory types transparently to the host.

The port may be configured to expose a CXL device that communicates according to CXL.io semantics, and to support CXL non-transparent bridging (NTB). Optionally, CXL non-transparent bridging enables the semiconductor device to isolate the host's address space from the internal address space while still allowing controlled access to resources. The NTB functionality may include address translation windows that map specific regions of the host's address space to corresponding regions in the semiconductor device's internal address space. The semiconductor device may implement doorbell registers, message registers, and scratchpad registers to facilitate communication between the host and the semiconductor device across the non-transparent bridge. The RPU may work in conjunction with the NTB logic to perform the necessary address translations while maintaining proper isolation and security between different address domains. The CXL.io protocol may be used for configuration, messaging, and data transfers across the non-transparent bridge.

The port may be configured to expose a CXL device that communicates according to CXL.cache semantics, and to support exchanging messages comprising at least one of: (i) opcodes indicative of requested cache line states that can be selected from at least two states comprising: modified, exclusive, shared, or invalid cache line states; or (ii) snoop requests associated with cachelines. Optionally, when supporting CXL.cache protocol, the semiconductor device may participate in cache coherency protocols with the host to maintain data consistency across multiple caching agents. The opcodes for requested cache line states may follow the MESI (Modified, Exclusive, Shared, Invalid) protocol or extensions thereof such as MOESI or MESIF. The semiconductor device may process various CXL.cache opcodes including RdCurr for reading current data, RdOwn for obtaining exclusive ownership, RdShared for shared access, and RdAny for flexible memory reads. Snoop requests may be initiated by the host to query the semiconductor device about cached data, and the semiconductor device may respond with appropriate snoop responses indicating the presence and state of requested cache lines. The RPU may maintain coherency state information for cache lines accessed utilizing address translation to ensure proper coherency protocol operation across address space boundaries.

The port may be configured to expose a CXL device, and the semiconductor device may be further configured to implement at least one of: (i) Device-to-Host (D2H) cache coherency flows; or (ii) back-invalidation snoop flows for maintaining coherency. Optionally, D2H cache coherency flows enable the semiconductor device to maintain cache coherency when acting as a caching agent for data owned by the host. The semiconductor device may send D2H requests to obtain cache lines from host memory, update cache line states, or writeback modified data. Back-invalidation snoop flows allow the host to invalidate cache lines held by the semiconductor device when the host needs exclusive access or when cache lines are being evicted from host caches. The semiconductor device may implement snoop filters or directories to track which cache lines are held by various agents and optimize snoop traffic. The coherency mechanisms may support various coherency models including home agent-based coherency, or broadcast-based coherency wherein coherency messages are sent to the participating agents. The semiconductor device may further comprise a root port, wherein the RPU enables the host to communicate with a device coupled to the root port via the coherent interconnect. Optionally, the root port may be a PCIe root port or a CXL root port.

The port may be selected from: a CXL upstream switch port, a CXL downstream switch port, or a CXL fabric port. Optionally, when the port is configured as a CXL upstream switch port, the semiconductor device may aggregate downstream CXL connections and present them as a single upstream connection to the host. As a CXL downstream switch port, the semiconductor device may distribute CXL traffic from an upstream port to downstream devices while maintaining proper routing and coherency. When configured as a CXL fabric port, the semiconductor device may participate in a larger CXL fabric topology that enables flexible connectivity between hosts and devices. The switch port functionality may include virtual hierarchy support, multicast capabilities, and Quality-of-Service mechanisms for prioritizing different types of CXL traffic. The RPU may adapt its address translation behavior based on the port configuration to properly handle the different traffic patterns and routing requirements of different port types.

The processing cores may comprise level 1 (L1) caches, and wherein the processing cores are configured to maintain cache coherency between the L1 caches utilizing the snoop requests. The semiconductor device may optionally include various cache architectures to improve memory access performance. Optionally, a centralized last-level cache may be shared by the processing cores, wherein the centralized last-level cache may filter snoop requests before forwarding them to the processing cores, reducing snoop traffic and improving system efficiency. In other embodiments, the semiconductor device may implement distributed cache banks associated with subsets of the processing cores, wherein the distributed cache banks may coordinate cache line ownership utilizing a cache coherency protocol, providing scalable cache capacity and bandwidth across the processing cores.

The coherent interconnect may be an on-chip coherent interconnect designed to couple the memory channels, the processing cores, the MMUs, and the RPU, which are assembled in an integrated circuit (IC) package. Optionally, the on-chip coherent interconnect may be implemented as a mesh, ring, crossbar, or hierarchical topology that provides high-bandwidth, low-latency communication between the various components within the IC package. The interconnect may support virtual channels for different traffic classes, implement flow control mechanisms to prevent congestion, and provide ordering guarantees for memory and I/O operations. The integration of the memory channels, processing cores, MMUs, and RPU on the same interconnect enables efficient data sharing and reduces the latency of address translation operations. The interconnect may support various coherency protocols such as MESI, MOESI, or proprietary protocols, and may include coherency controllers or directories to manage cache line states across the different components. The IC package may utilize advanced packaging technologies such as 2.5D or 3D integration to achieve high interconnect density and bandwidth.

The processing cores may be configured to execute instructions compatible with an x86 instruction set architecture, at least one of the MMUs is designed to support first-level address translation, and further comprising a secondary translation unit for second-level address translation (SLAT) for hardware-assisted virtualization. In one example, the SLAT is selected from Intel's Extended Page Tables (EPT) or AMD's Rapid Virtualization Indexing (RVI) technologies.

The semiconductor device may further comprise at least three levels of in-package cache memory, having a minimum capacity of 4 MB, coupled to the coherent interconnect; and wherein the port comprises at least 4 lanes available for communication with one or more hosts. Optionally, the three levels of in-package cache memory may be organized as L1, L2, and L3 caches with increasing capacity and latency at each level. The L1 cache may be split into separate instruction and data caches for each processing core, the L2 cache may be private to each core or shared among small groups of cores, and the L3 cache may be shared among the processing cores as a last-level cache. The minimum 4 MB capacity may be distributed across the cache levels, with typical configurations allocating the majority to the L3 cache. The port supporting at least 4 lanes may operate at various CXL link speeds such as 32 GT/s or 64 GT/s per lane, providing aggregate bandwidth suitable for memory-intensive workloads. The lanes may support lane reversal, polarity inversion, and degraded operation with fewer lanes in case of lane failures.

The processing cores may be configured to execute instructions compatible with a RISC-based instruction set architecture, at least one of the MMUs is designed to support first-level address translation, and further comprising at least two levels of in-package cache memory coupled to the coherent interconnect, wherein a last level of the in-package cache memory has a capacity of at least 4 MB. Optionally, the RISC-based instruction set architecture may provide a simplified and regular instruction encoding that facilitates efficient pipeline implementation in the processing cores. The two levels of in-package cache memory may include private L1 caches for the processing cores and a shared L2 or last-level cache that serves the cores. The 4 MB minimum capacity for the last-level cache may be implemented using high-density SRAM arrays with support for way-partitioning, cache allocation policies, and Quality-of-Service features. The cache hierarchy may support various replacement policies such as LRU, pseudo-LRU, or random replacement, and may implement prefetching mechanisms to hide memory latency. The first-level address translation in the MMUs may support multiple page sizes, translation lookaside buffers (TLBs) with separate entries for different page sizes, and hardware page table walkers for handling TLB misses.

The RISC-based instruction set architecture may be selected from a group comprising ARM-class instruction set architecture or RISC-V class instruction set architecture; wherein the port comprises at least 4 lanes available for communication; and further comprising a stage-two translation unit configured to translate guest physical addresses to physical addresses within the first physical address space. Optionally, the stage-two translation unit enables nested virtualization by providing an additional level of address translation from guest physical addresses used by virtual machines to host physical addresses used by the hypervisor or host operating system. For ARM architecture, the stage-two translation may be implemented according to the ARMv8 virtualization extensions, supporting features such as intermediate physical addresses (IPAs) and two-stage page table walks. For RISC-V architectures, the stage-two translation may follow the RISC-V hypervisor extension specification. The translation unit may support different page sizes at different translation stages, implement separate TLBs for stage-one and stage-two translations, and provide mechanisms for invalidating translations at either stage. The minimum 4 lanes for communication may support various link widths and speeds depending on the specific embodiment and power constraints.

The processing cores may comprise at least 50 streaming multiprocessors (SM) configured to execute instructions compatible with NVIDIA's Compute Unified Device Architecture (CUDA) parallel computing platform; wherein the memory channels support at least one of Graphics Double Data Rate (GDDR) memory or High Bandwidth Memory (HBM); and further comprising at least two levels of in-package cache memory coupled to the coherent interconnect, wherein a last level of the in-package cache memory has a capacity of at least 500 KB. Optionally, the port or additional ports in the semiconductor device may support CXL type 3 devices or CXL type 2 devices, providing different levels of functionality and capabilities within the CXL fabric. The semiconductor device may also include at least one processing core supporting Simultaneous Multithreading (SMT), such as Intel's Hyper-Threading Technology (HTT or HT), enabling threads to run concurrently on a single core, which may increase parallel processing capabilities and overall performance. Furthermore, the semiconductor device may be designed to run at least a PC-desktop-grade operating system, such as Windows 11 OS, Redhat Linux, or openSUSE Linux, and/or may be certified by Microsoft to run a desktop version of Windows, which may provide compatibility with software applications and user environments. To support these capabilities, the semiconductor device may utilize a PC-grade or a server-grade BIOS/UEFI to boot, providing system initialization and configuration. Additionally, the semiconductor device may incorporate various hardware features and interfaces to enhance functionality and connectivity. These may include an internal Trusted Platform Module (TPM) for cryptographic operations and key storage, or an interface to connect to an external TPM. The semiconductor device may also feature a coherent inter-socket link, such as UPI/UXI, XGMI, CHI, or similar, to couple caches on at least two devices, which may enable data sharing between processing cores or other components. To facilitate system management and/or monitoring capabilities within a networked/fabric environment, the semiconductor device may include a connection to a Baseboard Management Controller (BMC), such as an Aspeed 2500/2600 chip, which may allow for remote management and control of the system. Furthermore, the semiconductor device may incorporate an Ethernet port for network connectivity and/or a SATA port coupled to storage devices, which may expand the system's I/O capabilities and enable integration with various network and storage infrastructures.

In some implementations, at least a subset of the messages further comprises a process identification field, such that for first and second processes running on the host the RPU is further configured to perform different address translations based on the identification field. Optionally, the process identification field may be implemented using mechanisms such as Process Address Space ID (PASID) defined in the PCIe specification, or similar process identification schemes. Process running on the host may be assigned unique identifiers that are included in memory access requests sent to the semiconductor device. The RPU may maintain separate translation contexts for different process identifiers, enabling fine-grained isolation between different processes accessing the semiconductor device. This capability may support use cases such as shared virtual memory wherein processes on the host can access device memory with their own virtual address mappings, or multi-tenant scenarios wherein different applications or users require isolated access to device resources. The RPU may implement translation caches indexed by both physical address and process identifier to accelerate repeated accesses from the same process.

The semiconductor device may further comprise a Trusted Platform Module (TPM) interface, wherein the RPU is configured to utilize cryptographic keys stored in the TPM to authenticate the CXL requests from the host before performing the translation of physical addresses. Optionally, the TPM interface may connect to either an integrated TPM module within the semiconductor device or an external discrete TPM chip. The cryptographic keys stored in the TPM may be used to implement various security mechanisms including authentication of CXL requests, encryption of data in transit, and attestation of the semiconductor device's configuration. The RPU may verify digital signatures or message authentication codes included with CXL requests before allowing address translation and resource access. The authentication mechanism may support different security levels, from basic password-based authentication to complex cryptographic protocols involving challenge-response mechanisms and certificate chains. The TPM may also store measurement logs and platform configuration registers that enable remote attestation of the semiconductor device's security state.

The CXL requests may correspond to a first protocol, and the RPU may be further configured to translate the CXL requests to second CXL requests that correspond to a second protocol. Optionally, protocol translations between different CXL protocols enable the semiconductor device to bridge between hosts and devices that support different subsets of the CXL specification. For example, the RPU may translate CXL.mem requests from the host to CXL.cache requests for accessing cache-coherent memory regions, or translate CXL.io requests to CXL.mem requests for memory-mapped I/O operations. The protocol translation may include converting between different transaction types, adjusting transaction attributes, and managing protocol-specific state machines. The RPU may implement translation tables that map opcodes, addresses, and attributes between the different protocols while maintaining proper ordering and intent. The protocol translation capability may enable heterogeneous CXL topologies wherein devices with different protocol support can interoperate.

The port may utilize an IEEE 802.3 physical medium attachment (PMA). Optionally, utilizing an IEEE 802.3 PMA for the port enables the semiconductor device to leverage standard Ethernet physical layer components and infrastructure for CXL communication. The IEEE 802.3 PMA may support various data rates such as 25G, 50G, 100G, or higher, providing flexibility in bandwidth and reach requirements. The physical layer may include features such as forward error correction (FEC), auto-negotiation, and link training that improve reliability and interoperability. The use of Ethernet physical layer technology may enable longer reach connections compared to traditional PCIe or CXL physical layers, supporting rack-scale or even row-scale disaggregated architectures. The semiconductor device may implement appropriate protocol adaptation layers to map CXL transactions onto the Ethernet physical layer while maintaining the latency and reliability requirements of memory access operations.

The CXL requests may be encapsulated in Ethernet frames. Optionally, encapsulating CXL requests in Ethernet frames enable the transport of CXL protocol over standard Ethernet networks, facilitating disaggregated and composable infrastructure deployments. The encapsulation may follow standardized formats such as CXL-over-Ethernet (CXLoE) or proprietary encapsulation schemes suitable for CXL while adding Ethernet headers for routing. The Ethernet frames may include additional fields for quality-of-service marking, virtual LAN tags, and timestamp information for latency measurement. The semiconductor device may implement de-encapsulation logic to extract CXL requests from received Ethernet frames and encapsulation logic to package CXL responses into Ethernet frames for transmission. The encapsulation mechanism may support features such as fragmentation and reassembly for large CXL transactions, flow control to prevent congestion, and error detection and recovery to maintain reliability over the Ethernet network. Optionally, the port may comprise a Scale Up Ethernet (SUE) port or an Ultra Ethernet Transport (UET) port, and wherein the Ethernet frames comprise at least one Frame Check Sequence (FCS) field utilized to detect communication errors.

In one embodiment, a method, comprises: communicating, via memory channels of a semiconductor device, with memory located outside the semiconductor device; utilizing, by processing cores coupled via a coherent interconnect, a first physical address space to access the memory via the memory channels, and to respond to snoop requests that include physical addresses within the first physical address space translating, by memory management units (MMIUs), virtual addresses to physical addresses within the first physical address space in response to memory access requests from the processing cores; receiving, via a port of the semiconductor device, messages from a host located outside the semiconductor device, wherein the messages comprise Compute Express Link (CXL) requests and physical addresses within a second physical address space; and translating, by a resource provisioning unit (RPU), physical addresses within the second physical address space to physical addresses within the first physical address space to enable the host to access resources accessible via the first physical address space.

Optionally, at least one of the resources comprises at least a portion of the memory located outside the semiconductor device, and the method further comprises exposing to the host the at least one of the resources as a CXL-attached memory. The method may further comprise exposing the CXL-attached memory to hosts, implementing memory interleaving across the memory channels, and providing memory capacity expansion beyond native memory limit of an average host out of the hosts. Additionally, at least one of the resources may comprise at least a portion of the memory located outside the semiconductor device, and the method may further comprise exposing a CXL device that communicates according to CXL.mem semantics via the port, and exposing a Host-managed Device Memory (HDM) region to the host. The method may also comprise exposing a CXL device that communicates according to CXL.cache semantics via the port, and supporting exchanging of messages comprising at least one of: (i) opcodes indicative of requested cache line states that can be selected from at least two states comprising: modified, exclusive, shared, or invalid cache line states; or (ii) snoop requests associated with cachelines. Furthermore, the method may comprise exposing a CXL device via the port, and implementing at least one of: (i) Device-to-Host (D2H) cache coherency flows; or (ii) back-invalidation snoop flows for maintaining coherency.

In one embodiment, a semiconductor device, comprises: memory channels capable of communicating with memory located outside the semiconductor device; processing cores, coupled via a coherent interconnect, configured to utilize a first physical address space to access the memory via the memory channels, and to respond to snoop requests that include physical addresses within the first physical address space; memory management units (MMUs) configured to translate virtual addresses to physical addresses within the first physical address space in response to memory access requests from the processing cores; a port capable of receiving, from an entity located outside the semiconductor device, messages comprising: physical addresses within a second physical address space, and commands conforming to a Cache-Coherent Chip-to-Chip Interconnect (CCCI) protocol; and a resource provisioning unit (RPU) configured to translate physical addresses within the second physical address space to physical addresses within the first physical address space to enable the entity to access resources accessible via the first physical address space. Optionally, the semiconductor device may enable external entities to access internal resources utilizing Cache-Coherent Chip-to-Chip Interconnect protocols that provide high-bandwidth, low-latency communication between chips. The CCCI protocols may maintain cache coherency across chip boundaries using protocol-specific coherency mechanisms. The RPU may handle protocol-specific message formats, coherency states, and transaction flows while performing the necessary address translations between different physical address spaces.

Optionally, the CCCI protocol is based on a protocol selected from: an Intel Coherent Processor Interconnect Protocol (ICPIP) for scalable multiprocessors with a shared address space, Coherent Hub Interface chip-to-chip (CHI C2C), External Global Memory Interconnect (xGMI), Infinity Fabric, or NVLink chip-to-chip (NVLink-C2C); wherein at least one of the resources comprises at least 8 GB of dynamic random-access memory (DRAM), and wherein the memory channels are Double Data Rate (DDR) channels. Optionally, the DDR channels may support DDR4, DDR5, or future DDR standards, with multiple channels operating in parallel to provide aggregate memory bandwidth. The 8 GB minimum DRAM capacity may be distributed across memory modules coupled to different memory channels.

At least one of the resources may comprise at least a portion of the memory located outside the semiconductor device, and the semiconductor device is capable of exposing to the entity the at least one of the resources as CCCI-accessible shared memory. Optionally, the CCCI-accessible shared memory may enable entities to access a common memory pool through their respective CCCI interfaces. The semiconductor device may implement memory allocation and access control mechanisms to manage shared memory regions among different entities while maintaining coherency utilizing the CCCI protocol.

The semiconductor device may be further configured to: expose the CCCI-accessible shared memory to entities, implement memory interleaving across the memory channels, and provide memory capacity expansion beyond native memory limit of an average entity out of the entities. Optionally, memory interleaving across channels may distribute memory accesses to improve bandwidth utilization and reduce access hotspots. The capacity expansion may enable entities with limited local memory to access larger memory pools through the CCCI interface.

At least one of the resources may comprise a memory mapped device selected from at least one of: a Graphics Processing Unit (GPU), a Network Interface Card (NIC), Host Bus Adapter (HBA), or a Non-Volatile Memory Express Solid-State Drive (NVMe SSD). Optionally, memory mapped devices may be accessed utilizing MMIO regions translated by the RPU. Different device type may have different memory-mapped register sets and data buffer regions that are made accessible to external entities utilizing appropriate address translations.

In some implementations, more than half of the opcodes utilized by the CCCI protocol are based on Ultra Path Interconnect (UPI) opcodes, and the RPU is further configured to: translate UPI-based home agent requests that reference node identifiers in the second physical address space to corresponding node identifiers in the first physical address space, and maintain coherency directory state for cache lines accessed by the entity utilizing the translated addresses. Optionally, UPI-based home agents may coordinate cache coherency by maintaining directory information about cache line states across nodes. The RPU may translate node identifiers embedded in coherency messages to ensure proper routing and coherency protocol operation across different physical address spaces. It is noted that sentences in the form of a protocol conforming to a known protocol encompass revisions, versions, or variations of such known protocol, including those that may be developed after the filing date of this application. For example, sentences such as "the CCCI protocol conforms to UPI" or "the CCCI protocol conforms to CHI C2C," are intended to cover versions of the referenced protocol, whether existing at the time of filing or subsequently developed. This includes, without limitation, earlier versions, current versions, and future versions of the protocol that maintain compatibility with the fundamental characteristics of the protocol family. The term "conforms to" is used to indicate that the protocol adheres to the specifications, requirements, or standards of the referenced known protocol, while allowing for additional features, extensions, or modifications that do not prevent conformance with the referenced protocol. In the context of protocol conformance, a protocol conforms to a referenced protocol when it implements the required elements, follows the specified communication sequences, uses compatible message formats, and maintains interoperability with other devices implementing the referenced protocol. For example, when stating that "the CCCI protocol conforms to CHI C2C," this means that the CCCI protocol implements the required CHI C2C transaction types, follows CHI C2C's coherency model, uses CHI C2C-compatible message formats and channels, and can successfully communicate with other CHI C2C-compliant devices, even if the CCCI protocol may include additional custom transactions, extended fields, or supplementary features not defined in the base CHI C2C specification. Such conformance allows the protocol to participate in the CHI C2C ecosystem while potentially offering enhanced or specialized functionality.

The CCCI protocol may conform to Coherent Hub Interface chip-to-chip (CHI C2C), and the RPU is further configured to maintain transaction identifiers across address translation for CHI request and response channels. Optionally, CHI C2C transaction identifiers may uniquely identify outstanding transactions between chips. The RPU may maintain mapping tables to preserve transaction ordering and properly route responses back to requesting entities. The CCCI protocol may conform to External Global Memory Interconnect (xGMI), and the RPU is further configured to translate addresses for xGMI atomic operations while preserving operation atomicity across the physical address space boundary. Optionally, xGMI atomic operations may include atomic reads, writes, and read-modify-write operations that must complete without interruption. The RPU may implement mechanisms to ensure atomicity is preserved when translating addresses across different memory domains.

The CCCI protocol may conform to Infinity Fabric, and the RPU is further configured to: translate addresses for both coherent and non-coherent Infinity Fabric traffic classes, and maintain separate translation contexts for different Infinity Fabric coherency domains. Optionally, Infinity Fabric may support traffic classes with different coherency requirements. The RPU may maintain separate translation tables or contexts for coherent traffic requiring cache coherency and non-coherent traffic used for I/O or streaming data transfers. The CCCI protocol may conform to NVLink chip-to-chip (NVLink-C2C), and the RPU is further configured to support NVLink's unified memory addressing by coordinating address translations with GPU memory management units. Optionally, NVLink's unified memory addressing may enable CPUs and GPUs to share a common virtual address space. The RPU may coordinate with GPU MMUs to ensure consistent address translations for memory regions accessible through both CPU and GPU memory paths.

In certain aspects, more than half of the opcodes utilized by the CCCI protocol are based on one of the following: an Intel Coherent Processor Interconnect Protocol (ICPIP) for scalable multiprocessors with a shared physical address space, Coherent Hub Interface chip-to-chip (CHI C2C), External Global Memory Interconnect (xGMI), Infinity Fabric, or NVLink chip-to-chip (NVLink-C2C); and wherein the semiconductor device is further configured to implement at least one of: (i) entity-to-device cache coherency flows; or (ii) back-invalidation snoop flows for maintaining coherency across the CCCI protocol. Examples of ICPIP include Intel's QPI, UPI, KTI, UXI, and future Intel's Coherent Processor Interconnect Protocols. Optionally, entity-to-device cache coherency flows may enable external entities to maintain coherent caches of device memory. Back-invalidation snoops may allow the device to invalidate cached copies held by external entities when memory contents change.

The processing cores may comprise level 1 (L1) caches, and the processing cores are configured to maintain cache coherency between the L1 caches utilizing the snoop requests; and wherein the coherent interconnect is an on-chip coherent interconnect designed to couple the memory channels, the processing cores, the MMUs, and the RPU, which are assembled in an integrated circuit (IC) package. Optionally, L1 cache coherency between processing cores may be maintained utilizing a snooping protocol or directory-based coherency mechanism. The coherent interconnect may carry snoop requests and responses to ensure cache consistency across the processing cores.

The processing cores may be configured to execute instructions compatible with an x86 instruction set architecture, at least one of the MMUs is designed to support first-level address translation, and further comprising a secondary translation unit for second-level address translation (SLAT) for hardware-assisted virtualization. Optionally, the x86 instruction set architecture may include support for various extensions such as SSE, AVX, or other SIMD instructions. The SLAT may enable efficient virtualization by reducing the overhead of address translation in virtualized environments.

The semiconductor device may further comprise at least three levels of in-package cache memory, having a minimum capacity of 4 MB, coupled to the coherent interconnect. Optionally, the three levels of cache may be organized as per-core L1 and L2 caches and a shared L3 cache. The 4 MB minimum capacity may refer to the total cache capacity or specifically to the last-level cache.

The processing cores may be configured to execute instructions compatible with a RISC-based instruction set architecture, at least one of the MMUs is designed to support first-level address translation, and further comprising at least two levels of in-package cache memory coupled to the coherent interconnect, wherein a last level of the in-package cache memory has a capacity of at least 4 MB. Optionally, the RISC-based architecture may provide simplified instruction decoding and execution compared to complex instruction set architectures. The cache hierarchy may be optimized for the specific characteristics of RISC instruction streams and data access patterns.

The RISC-based instruction set architecture may be selected from a group comprising ARM-class instruction set architecture or RISC-V class instruction set architecture; and further comprising a stage-two translation unit configured to translate guest physical addresses to physical addresses within the first physical address space. Optionally, the stage-two translation unit may support virtualization extensions defined by the respective instruction set architecture. The translation unit may include dedicated TLBs for caching stage-two translations to improve translation performance.

The processing cores may comprise at least 50 streaming multiprocessors configured to execute instructions compatible with NVIDIA's Compute Unified Device Architecture (CUDA) parallel computing platform; wherein the memory channels support at least one of Graphics Double Data Rate (GDDR) memory or High Bandwidth Memory (HBM); and further comprising at least two levels of in-package cache memory coupled to the coherent interconnect, wherein a last level of the in-package cache memory has a capacity of at least 500 KB. Optionally, the streaming multiprocessors may execute CUDA kernels with thousands of concurrent threads. GDDR or HBM memory may provide the high memory bandwidth required for GPU workloads, while the cache hierarchy may be optimized for GPU access patterns.

In some implementations, at least one of the processing cores supports Simultaneous Multithreading (SMT), and wherein the RPU is further configured to maintain separate address translation contexts for different hardware thread executing on the at least one of the processing cores supporting SMT, enabling concurrent transactions from the entity for different threads. Optionally, SMT support may enable physical cores to execute instruction streams concurrently. The RPU may maintain per-thread translation contexts to ensure isolation between different hardware threads accessing the device.

The semiconductor device may further comprise a Trusted Platform Module (TPM) interface, wherein the RPU is configured to utilize cryptographic keys stored in the TPM to authenticate the commands from the entity before performing the translation of physical addresses. Optionally, TPM-based authentication may provide hardware-rooted security for verifying the authenticity of external entities. The cryptographic keys may be used to validate digital signatures or perform challenge-response authentication before allowing access to device resources.

The CCCI protocol may be a first CCCI protocol, and the RPU is further configured to translate the commands conforming to the first CCCI protocol to commands conforming to a second CCCI protocol, enabling interoperability between different cache-coherent interconnect standards. Optionally, protocol translation between different CCCI standards may enable heterogeneous systems wherein components using different interconnect technologies can communicate. The translation may include converting message formats, adjusting coherency states representations, and adapting flow control mechanisms between protocols.

In one embodiment, a method, comprises: communicating, via memory channels of a semiconductor device, with memory located outside the semiconductor device; utilizing, by processing cores coupled via a coherent interconnect, a first physical address space to access the memory via the memory channels, and for responding to snoop requests that include physical addresses within the first physical address space; translating, by memory management units (MMUs), virtual addresses to physical addresses within the first physical address space in response to memory access requests from the processing cores; receiving, via a port of the semiconductor device, messages from an entity located outside the semiconductor device, wherein the messages comprise: physical addresses within a second physical address space, and commands conforming to a Cache-Coherent Chip-to-Chip Interconnect (CCCI) protocol; and translating, by a resource provisioning unit (RPU), physical addresses within the second physical address space to physical addresses within the first physical address space to enable the entity to access resources accessible via the first physical address space.

Optionally, at least one of the resources comprises at least a portion of the memory located outside the semiconductor device, and the method further comprises exposing to the entity the at least one of the resources as CCCI-accessible shared memory. Furthermore, wherein more than half of the opcodes utilized by the CCCI protocol are based on opcodes utilized by: an Intel Coherent Processor Interconnect Protocol (ICPIP) for scalable multiprocessors with a shared physical address space, Coherent Hub Interface chip-to-chip (CHI C2C), External Global Memory Interconnect (xGMI), Infinity Fabric, or NVLink chip-to-chip (NVLink-C2C); the method may further comprise exposing the CCCI-accessible shared memory to entities, implementing memory interleaving across the memory channels, and providing memory capacity expansion beyond native memory limit of an average entity out of the entities. Additionally, wherein the CCCI protocol conforms to an Intel Coherent Processor Interconnect Protocol (ICPIP) for scalable multiprocessors with a shared physical address space, the method may further comprise translating ICPIP home agent requests that reference node identifiers in the second physical address space to corresponding node identifiers in the first physical address space, and maintaining coherency directory state for cache lines accessed by the entity utilizing the translated addresses. The method may also comprise, wherein the CCCI protocol conforms to Coherent Hub Interface chip-to-chip (CHI C2C), maintaining transaction identifiers across address translation for CHI request and response channels. In certain aspects, wherein the CCCI protocol conforms to External Global Memory Interconnect (xGMI), the method may further comprise translating addresses for xGMI atomic operations while preserving operation atomicity across the physical address space boundary.

Moreover, wherein the CCCI protocol is based on Infinity Fabric, the method may further comprise translating addresses for both coherent and non-coherent Infinity Fabric traffic classes, and maintaining separate translation contexts for different Infinity Fabric coherency domains. The method may also comprise, wherein the processing cores comprises level 1 (L1) caches, maintaining cache coherency between the L1 caches utilizing the snoop requests; and wherein the coherent interconnect is an on-chip coherent interconnect designed to couple the memory channels, the processing cores, the MMUs, and the RPU, which are assembled in an integrated circuit (IC) package. Additionally, wherein at least one of the processing cores supports Simultaneous Multithreading (SMT), the method may further comprise maintaining separate address translation contexts for hardware threads executing on the at least one of the processing cores supporting SMT, enabling concurrent transactions from the entity for different threads. Alternatively, wherein the CCCI protocol is a first CCCI protocol, the method may further comprise translating the commands conforming to the first CCCI protocol to commands conforming to a second CCCI protocol, enabling interoperability between different cache-coherent interconnect standards.

In one embodiment, a system capable of changing its functionality, comprises: memory channels designed to communicate with memory; processing cores, coupled via a coherent interconnect, configured to utilize a first physical address space to access the memory via the memory channels, and to respond to snoop requests that include physical addresses within the first physical address space; memory management units (MMIUs) configured to translate virtual addresses to physical addresses within the first physical address space responsive to memory access requests from the processing cores; first and second ports capable of exposing a Compute Express Link (CXL) type 3 device when the system functions as a Multi-Headed Device (MHD), or operate as switch ports when the system functions as a switch; and wherein when the system functions as the MHD, the system is configured to route data from the first and second ports to the memory channels, and when the system functions as the switch, the system is configured to route data between the first and second ports. Optionally, the system may dynamically switch between operating as a Multi-Headed Device that provides memory resources to hosts and operating as a CXL switch that routes traffic between ports. The dual functionality may be configured utilizing firmware settings, hardware strapping, or software configuration.

Optionally, the system further comprises a resource provisioning unit (RPU); wherein when the system functions as the MHD, the first and second ports are configured to be coupled to hosts, and the RPU is configured to enable the hosts to access the memory utilizing messages that at least conforming to a protocol based on CXL.mem. Optionally, when functioning as an MHD, the RPU may perform address translations to enable hosts to access shared memory resources. Different hosts may view the memory through their own physical address spaces while the RPU manages the mapping to physical memory locations.

The memory may comprise at least 32 GB of dynamic random-access memory (DRAM) coupled via at least four memory channels to the processing cores. Optionally, the 32 GB minimum DRAM capacity may be distributed across four or more memory channels to provide parallel access paths and increased memory bandwidth. The memory channels may operate separately to serve different memory requests concurrently.

The memory may comprise dynamic random-access memory (DRAM) having capacity exceeding 250 GB; and wherein the DRAM comprises mainstream DRAM modules exhibiting an average unit price per gigabyte that does not exceed three times an average unit price per gigabyte of a lowest-cost DRAM module technology in volume production for servers in data centers. Optionally, mainstream DRAM modules may refer to widely deployed memory technologies such as DDR4 or DDR5 modules in standard capacities. The pricing constraint ensures the system uses cost-effective memory solutions rather than specialized high-cost memory technologies.

At least one of the processing cores may support Simultaneous Multithreading (SMT), and wherein the RPU is further configured to maintain separate address translation contexts for hardware threads executing on the at least one of the processing cores supporting SMT, enabling concurrent transactions based on CXL requests from the hosts. Optionally, SMT support in MHD mode may enable the processing cores to handle concurrent memory requests from different hosts or different processes within hosts. Different hardware threads may have different translation contexts maintained by the RPU.

The system may further comprise a Trusted Platform Module (TPM) interface, wherein the RPU is configured to utilize cryptographic keys stored in the TPM to authenticate CXL requests from the hosts before performing translation of physical addresses. Optionally, TPM-based authentication in MHD mode may provide security for shared memory access by verifying that memory requests originate from authorized hosts. The TPM may store cryptographic keys used for request authentication and data encryption.

In certain aspects, the system further comprises a resource provisioning unit (RPU); wherein when the system functions as the switch, the first and second ports are configured to forward CXL messages between hosts coupled to the first and second ports, and the RPU is configured to translate physical addresses within a host physical address space utilized by a first host coupled to the first port to a host physical address space utilized by a second host coupled to the second port. Optionally, when functioning as a switch, the system may route CXL messages between ports while the RPU performs address translations to enable communication between hosts using different physical address spaces, which enables physical address space isolation between different hosts.

The first port may be configured as an upstream port and the second port is configured as a downstream port, enabling hierarchical CXL fabric connectivity. Optionally, the upstream port may connect to a host or higher-level switch, while the downstream port may connect to CXL devices or lower-level switches. This configuration enables building hierarchical CXL topologies.

The system may further comprise third and fourth ports, and wherein the third and fourth ports are configured as additional downstream ports, enabling the system to connect CXL devices in a switched fabric topology. Optionally, additional downstream ports may enable the system to function as a multi-port switch connecting several CXL devices to an upstream host. The switch may implement routing tables to direct traffic between the upstream port and appropriate downstream ports.

The first and second ports may support forwarding of CXL.mem, CXL.cache, and CXL.io protocols between the coupled hosts. Optionally, supporting the three CXL protocols in switch mode enables the system to forward different types of CXL traffic including memory transactions CXL.mem, cache-coherent transactions CXL.cache, and I/O transactions CXL.io between coupled devices.

The coherent interconnect may be an on-chip coherent interconnect designed to couple the memory channels, the processing cores, and the MMUs, which are assembled in an integrated circuit (IC) package. Optionally, the on-chip coherent interconnect may be implemented as a network-on-chip, mesh, or ring topology that provides communication paths between system components. Integration in a single IC package may reduce latency and increase bandwidth compared to multi-chip embodiments.

The processing cores may be configured to execute instructions compatible with an x86 instruction set architecture, at least one of the MMUs is designed to support first-level address translation, and further comprising a secondary translation unit for second-level address translation (SLAT) for hardware-assisted virtualization. Optionally, x86 compatibility may enable the system to run standard operating systems and applications designed for x86 processors.

The SLAT capability may support efficient virtualization for running virtual machines with isolated address spaces.

The system may further comprise at least three levels of in-package cache memory, having an aggregated capacity>=4 MB, coupled to the coherent interconnect; and wherein each of the first and second ports comprises at least 16 lanes available for communication. Optionally, the cache hierarchy may include L1, L2, and L3 caches with the 4 MB minimum referring to total cache capacity. The 16-lane ports may operate at CXL-specified speeds to provide high-bandwidth connections to external devices.

The processing cores may be configured to execute instructions compatible with a RISC-based instruction set architecture, at least one of the MMUs is designed to support first-level address translation, and further comprising at least two levels of in-package cache memory coupled to the coherent interconnect, wherein a last level of the in-package cache memory has a capacity of at least 4 MB. Optionally, RISC-based architectures may provide power-efficient processing suitable for memory-centric workloads. The two-level cache hierarchy may balance performance with area and power constraints typical of RISC embodiments.

The RISC-based instruction set architecture may be selected from a group comprising ARM-class instruction set architecture or RISC-V class instruction set architecture; wherein each of the first and second ports comprises at least 16 lanes available for communication; and further comprising a stage-two translation unit configured to translate guest physical addresses to physical addresses within the first physical address space. Optionally, ARM or RISC-V architectures may support specific virtualization extensions that enable efficient virtual machine operation. The stage-two translation unit may handle guest-to-host physical address translations required for virtualization.

The processing cores may comprise at least 50 streaming multiprocessors configured to execute instructions compatible with NVIDIA's Compute Unified Device Architecture (CUDA) parallel computing platform; wherein the memory channels support at least one of Graphics Double Data Rate (GDDR) memory or High Bandwidth Memory (HBM); and further comprising at least two levels of in-package cache memory coupled to the coherent interconnect, wherein a last level of the in-package cache memory has a capacity of at least 500 KB. Optionally, CUDA-compatible streaming multiprocessors may enable the system to execute GPU workloads while providing CXL connectivity. GDDR or HBM memory interfaces may deliver the high bandwidth required for GPU computations.

The first and second ports may be configured to expose CXL devices, and the system is further configured to implement at least one of: (i) Device-to-Host (D2H) cache coherency flows; or (ii) back-invalidation snoop flows for maintaining coherency. Optionally, D2H cache coherency flows may enable the CXL devices to participate in cache coherency protocols with coupled hosts. Back-invalidation snoops may maintain cache consistency when memory contents are modified.

The processing cores may comprise level 1 (L1) caches, and wherein the processing cores are configured to maintain cache coherency between the L1 caches utilizing the snoop requests. Optionally, L1 cache coherency may be maintained utilizing a coherency protocol that tracks cache line states and generates snoop requests when cores access potentially shared data. The snoop requests ensure data consistency across the L1 caches.

In one embodiment, an apparatus comprises: processing cores configured to execute instructions; memory channels supporting connections to at least 32 GB of dynamic random-access memory (DRAM); a Compute Express Link (CXL) Root Port (RP); a coherent interconnect coupling the processing cores with the memory channels and the CXL RP; and a resource provisioning unit (RPU) coupled to the CXL RP via a die-to-die interconnect; wherein the RPU is configured to translate from CXL.mem messages, received from an entity coupled to the apparatus, to CXL.cache messages sent to the CXL RP. Optionally, the RPU is further configured to translate from CXL.cache messages received from the CXL RP to CXL.mem messages sent to the entity. It is noted that references to CXL.mem messages and CXL.cache messages may also encompass CXL.mem transactions and CXL.cache transactions, and vice versa, because CXL transactions utilize messages. Examples of entity that may be coupled to the apparatus include a host and a switch coupled to a host. The RPU may be further configured to translate a single CXL.mem message, selected from the CXL.mem messages, to multiple CXL.cache messages sent to the CXL RP. For example, the system may implement mirroring based on translating a single CXL.mem message to multiple corresponding CXL.cache messages. In another example, the RPU implements retransmission based on translating a single CXL.mem message to multiple corresponding CXL.cache messages.

The RPU may be implemented in a chiplet; the chiplet, the processing cores, the memory channels, and the CXL RP are assembled into an integrated circuit (IC) package; and the RPU is further configured to translate between CXL.io packets communicated with the CXL RP and CXL.io packets communicated with the entity. The apparatus may further comprise a second RPU coupled over a second die-to-die interconnect to a second CXL RP coupled to the coherent interconnect; and wherein the second RPU is configured to translate between (i) CXL.cache messages communicated with a second entity coupled to the apparatus via a CXL type 1 device (T1-D), and (ii) CXL.cache messages communicated with the second CXL RP via a CXL type 1 device (T1-D). The apparatus may also further comprise a second RPU coupled over a second die-to-die interconnect to a second CXL RP coupled to the coherent interconnect; and wherein the second RPU is configured to translate from (i) CXL.mem messages and CXL.cache messages received from a second entity coupled to the apparatus via a CXL type 2 device (T2-D), to (ii) CXL.cache messages sent to the second CXL RP via a CXL type 1 device (T1-D). In some implementations, the entity comprises a host, and the RPU is further configured to translate from physical addresses within host physical address (HPA) space of the host to physical addresses within a local HPA space utilized by at least one of the processing cores. The instructions may also be compatible with an x86 instruction set architecture, the apparatus further comprises at least three levels of in-package cache memory coupled to the coherent interconnect, and the RPU further comprises a CXL type 3 device (T3-D) supporting at least 16 lanes available for communication with the entity. In such implementations, a third level of the in-package cache memory may have a capacity of at least 4 MB, and the apparatus may further comprise a memory management unit (MMU) supporting first-level address translation, and a secondary translation unit supporting second-level address translation (SLAT) for hardware-assisted virtualization.

Alternatively, the instructions may be compatible with a RISC-based instruction set architecture, the apparatus further comprises at least two levels of in-package cache memory coupled to the coherent interconnect, and the RPU further comprises a CXL type 3 device (T3-D) supporting at least 16 lanes available for communication with the entity. In this case, the RISC-based instruction set architecture may be selected from a group comprising ARM-class instruction set or RISC-V class instruction set; and wherein a last level of the in-package cache memory has a capacity of at least 4 MB, and the apparatus may further comprise a memory management unit (MMU) supporting first-level address translation, and a stage two translation to translate guest physical addresses to local physical addresses. In another alternative, the instructions may be compatible with NVIDIA's Compute Unified Device Architecture (CUDA) parallel computing platform, the processing cores are streaming multiprocessors, number of the streaming multiprocessors is above 50, and the RPU further comprises a CXL type 3 device (T3-D) supporting at least 16 lanes available for communication with the entity. This apparatus may further comprise NVIDIA Virtual GPU (vGPU) configured to utilize hardware-assisted virtualization to enable virtual machines to share a single GPU, and further comprising at least two levels of in-package cache memory coupled to the coherent interconnect, wherein a last level of the in-package cache memory has a capacity of at least 500 KB. Furthermore, the coherent interconnect may be further coupled to at least two in-package High Bandwidth Memory (HBM) stacks, and wherein the memory channels are a memory interface supporting at least one of Graphics Double Data Rate (GDDR) memory or High Bandwidth Memory (HBM).

In one embodiment, an apparatus comprises: processing cores configured to execute instructions; memory channels supporting connections to at least 32 GB of dynamic random-access memory (DRAM); a Compute Express Link (CXL) Root Port (RP); a coherent interconnect coupling the processing cores with the memory channels and the CXL RP; and a resource provisioning unit (RPU) coupled to the CXL RP via a die-to-die interconnect; wherein the RPU is configured to translate between first CXL.cache messages, communicated with an entity coupled to the apparatus, and second CXL.cache messages sent to the CXL RP. Optionally, the RPU is implemented in a chiplet; the chiplet, the processing cores, the memory channels, and the CXL RP are assembled into an integrated circuit (IC) package; and the RPU is further configured to translate between CXL.io packets communicated with the CXL RP and CXL.io packets communicated with the entity.

The apparatus may further comprise a second RPU coupled over a second die-to-die interconnect to a second CXL RP coupled to the coherent interconnect; wherein the second RPU is configured to translate from (i) CXL.mem messages received from a second entity coupled to the apparatus via a CXL type 3 device (T3-D) to (ii) third CXL.cache messages sent to the second CXL RP via a CXL type 1 device or a CXL type 2 device. The apparatus may also further comprise a second RPU coupled over a second die-to-die interconnect to a second CXL RP coupled to the coherent interconnect; wherein the second RPU is configured to translate between (i) CXL.mem messages and third CXL.cache messages communicated with a second entity coupled to the apparatus via a CXL type 2 device (T2-D) and (ii) fourth CXL.cache messages communicated with the second CXL RP via a CXL type 1 device (T1-D). In some implementations, the entity comprises a host, and the RPU is further configured to translate from physical addresses within host physical address (HPA) space of the host to physical addresses within a local HPA space utilized by at least one of the processing cores. The apparatus may also utilize different CQID trackers for the first and second CXL.cache messages. In certain aspects, the entity comprises a host, the instructions are compatible with an x86 instruction set architecture, the apparatus further comprises at least three levels of in-package cache memory coupled to the coherent interconnect, and the RPU further comprises a CXL type 1 device (T1-D) supporting at least 16 lanes available for communication with the host. In such an apparatus, a third level of the in-package cache memory may have a capacity of at least 4 MB, and the apparatus may further comprise a memory management unit (MMU) supporting first-level address translation, and a secondary translation unit supporting second-level address translation (SLAT) for hardware-assisted virtualization. Alternatively, the entity may comprise a host, the instructions are compatible with a RISC-based instruction set architecture, the apparatus further comprises at least two levels of in-package cache memory coupled to the coherent interconnect, and the RPU further comprises a CXL type 1 device (T1-D) supporting at least 16 lanes available for communication with the host. In this case, the RISC-based instruction set architecture may be selected from a group comprising ARM-class instruction set or RISC-V class instruction set; and wherein a last level of the in-package cache memory has a capacity of at least 4 MB, and the apparatus may further comprise a memory management unit (MMU) supporting first-level address translation, and a stage two translation to translate guest physical addresses to local physical addresses.

In another alternative, the instructions may be compatible with NVIDIA's Compute Unified Device Architecture (CUDA) parallel computing platform, the processing cores are streaming multiprocessors, number of the streaming multiprocessors is above 50, and the RPU further comprises a CXL type 1 device (T1-D) supporting at least 16 lanes available for communication with the entity. This CUDA-compatible apparatus may further comprise NVIDIA Virtual GPU (vGPU) configured to utilize hardware-assisted virtualization to enable virtual machines to share a single GPU, and further comprising at least two levels of in-package cache memory coupled to the coherent interconnect, wherein a last level of the in-package cache memory has a capacity of at least 500 KB. Additionally, the coherent interconnect may be further coupled to at least two in-package High Bandwidth Memory (HBM) stacks, and the memory channels are a memory interface supporting at least one of Graphics Double Data Rate (GDDR) memory or High Bandwidth Memory (HBM).

In one embodiment, a method for translating Compute Express Link (CXL) communications in a computing system comprises: receiving, by a resource provisioning unit (RPU) from a first host, a first message comprising a first CXL opcode, a first tag, and a first physical address; wherein the RPU is implemented in a chiplet; translating, by the RPU, the first message to a second message comprising a second tag and a second physical address; transmitting the second message to a CXL Root Port (RP) over a die-to-die interconnect; receiving, by the RPU from the CXL RP over the die-to-die interconnect, a third message comprising a second CXL opcode and a third tag; translating the third message to a fourth message comprising a fourth tag; and transmitting the fourth message to the first host.

Optionally, the first message conforms to CXL.mem protocol, the first CXL opcode is selected from MemRd, MemRdData, MemRdTEE, or MemRdDataTEE for memory reads; the first message is received via a CXL.mem Master-to-Subordinate Request (M2S Req) channel; the fourth message is transmitted via a CXL.mem Subordinate-to-Master Data Response (S2M DRS) channel; and wherein the translating of the first physical address to the second physical address comprises mapping from a Host-managed Device Memory (HDM) decoder range to a memory range accessible by the CXL RP.

The second message may conform to CXL.cache protocol, the second CXL opcode is selected from RdCurr, RdOwn, RdShared, RdAny, or WrCur; the second message is transmitted via a CXL.cache Device-to-Host Request (D2H Req) channel; and the third message is received via a CXL.cache Host-to-Device Response (H2D Rsp) channel.

FIG. 109A and FIG. 111 illustrate two approaches for transforming an xPU design (such as a standard CPU design) to a CXL memory device, which may enable it to serve as a building block for a Memory Expander or Memory Pool. In FIG. 109A, an RPU is integrated as a separate chiplet within the same IC package as the xPU, potentially allowing for a modular design approach that may provide flexibility in manufacturing and integration. The RPU may be coupled to the xPU's CXL RP via die-to-die interconnect, which may enable high-bandwidth and low-latency communication between the components. In one example, the RPU may include three main components, which are (i) A Type 3 Device (T3-D) interface, supporting CXL.mem and CXL.io protocols, (ii) A computer, handling protocol translation, and (iii) A Type 1 Device (T1-D) interface, supporting CXL.cache and CXL.io protocols. In another example, current modern CPUs, such as Intel Sapphire Rapids (SPR), include one or more CXL RPs, but do not include a CXL EP as the CPU acts as the host in a CxL system. The RPU illustrated in FIG. 109A is coupled to the CPU's CXL RP and translates between CXL.mem (via type 3 device) and CXL.cache (via type 1 device), potentially allowing the CPU to function as a building block for a Memory Expander or a Memory Pool. FIG. 109B illustrates an alternative embodiment wherein the RPU translates between first and second Type 1 Device interfaces.

FIG. 111 illustrates one embodiment of another approach wherein the RPU is embedded in the MxPU's silicon die, which may offer potential benefits in terms of reduced latency and improved performance through tighter coupling with the MxPU's internal components. In one example, this configuration includes: (i) Memory Controllers (MC) coupled to DDR interfaces coupled to DRAM, (ii) Compute Cores with associated caches and Last Level Caches (LLC), (iii) RP Core Logic blocks, (iv) An integrated RPU with T1-D and T3-D interfaces for translating between CXL.cache and CXL.mem protocols, And (v) Physical layer (PHY) coupled, in the illustrated example, to three Root Ports and one T3-D Endpoint.

Both approaches may leverage the xPU's/MxPU's large LLC to enhance memory read performance from a Multi-Headed Device (MHD), which may offer two potential advantages of (i) Improved read performance, wherein the relatively large LLC may provide better performance for memory reads from the MHD compared to typical CXL memory controllers, which often have smaller caches, and (ii) Flexible resource allocation, wherein an LLC provisioning policy may be implemented to allocate specific LLC resources for CXL memory flows, potentially allowing for optimized cache utilization based on the needs of different CXL ports or workloads, and/or allocating to certain CXL ports more cache resources than others. The remaining portion of the LLC may continue to be used by the processing cores and PCIe devices, maintaining compatibility with standard xPU configurations and potentially allowing for features such as Intel's Data Direct I/O (DDIO). These approaches may enable the transformation of standard xPUs designs, which typically include CXL Root Ports but no CXL Endpoints, to versatile CXL memory device designs.

Still referring to FIG. 111, some CPU vendors, such as Intel, provide CPUs with Root Ports (RPs) that implement the three protocols (e.g., CXL.io, CXL.cache, CXL.mem), and thus can connect to Type-1, Type-2, or Type-3 CXL Devices. Other CPU vendors, such as certain AMD CPUs, may support only CXL.io and CXL.mem on the CPU RP, thus it can connect only to Type 3 CXL Devices. As a result, the top RP Module may support the three protocols, or a subset of the protocols (e.g., CXL.io and CXL.cache, or CXL.io and CXL.mem). The second RP module is coupled internally (which means a permanent connection) to an RPU that translates between Type-1 CXL Device (T1-D) and Type-3 CXL Device (T3-D). Therefore, the Second RP Module, which is coupled to the T1-D of the RPU, should support at least CXL.io and CXL.cache, and may support the three protocols. Optionally, the RP Modules may be instantiations of the same design module supporting the three protocols. Alternatively, different RP Modules may be instantiations of different design modules supporting a subset of the protocols.

FIG. 112 illustrates one embodiment of an MxPU including RPUs coupled to RP modules, wherein different RPUs translate between different combinations of CXL device types, such as CXL T1-D to T3-D, CXL T1-D to T2-D, or CXL T1-D to T1-D, providing flexibility in protocol translation capabilities. The PHY module may include one or more PHY block blocks based on design requirements. FIG. 112 illustrates one embodiment with a single PHY block coupled to the RP module and the RPUs, while FIG. 111I illustrates one embodiment with separate PHY blocks coupled to the different RP modules or RPUs.

FIG. 110 illustrates one embodiment of building a CXL Multi-Headed Device (MHD) Memory Pool based on an xPU (CPU and/or GPU) comprising three CXL RPs (#1 to #3) coupled to three RPUs (#1 to #3) via the symmetric CXL.cache and CXL.io interfaces. The diagram illustrates three hosts coupled to a system operating similar to a CXL MHD, which can be either with or without an accelerator. The hosts include CXL RPs that can be coupled to the CXL device types exposed by the RPUs. Host #1 is coupled to CXL MHD via CXL type 1 port through RPU #1 that translates between (i) CXL.cache messages and CXL.io packets with Host #1 and (ii) CXL.cache messages and CXL.io packets with CXL RP #1 of the xPU. It is noted that because transactions include messages, then it is also possible to describe the functionality of RPU #1 as translating between (i) CXL.cache and CXL.io transactions with Host #1 and (ii) CXL.cache and CXL.io transactions with CXL RP #1 of the xPU. Host #2 is coupled to CXL MHD via CXL type 2 port through RPU #2 that translates between (i) CXL.cache messages, CXL.mem messages, and CXL.io packets with Host #2 and (ii) CXL.cache messages, CXL.mem messages, and CXL.io packets with CXL RP #2 of the xPU. And Host #3 is coupled to CXL MHD via CXL type 3 port through RPU #3 that translates between (i) CXL.mem messages and CXL.io packets with Host #3 and (ii) CXL.cache messages and CXL.io packets with CXL RP #3 of the xPU. The CXL MHD may also include a CXL.mem interface, which is coupled to the device's internal memory. In the case where the CXL MHD includes an accelerator, the processor within the device can serve as the accelerator. The internal cache of the processor, particularly the Last Level Cache (LLC), can function as the cache for the accelerator in CXL.cache flows, maintaining coherency with the coupled hosts. The xPU in the diagram represents the processing unit that manages the overall operation of the CXL MHD, coordinating the communication between the coupled hosts, the RPUs, and the internal memory. In summary, this figure illustrates an architecture for building a CXL MHD Memory Pool using one or more xPUs with CXL RPs and no CXL EPs. The design incorporates RPUs to enable the coupling of (T3-D), (T2-D), and/or (T1-D) ports between the hosts and xPU in the CXL MHD. When an accelerator is included in the CXL MHD, the processor's internal cache, especially the LLC, may serve as the cache for the accelerator, maintaining coherency with the coupled hosts.

FIG. 127A illustrates one embodiment of a multi-tier memory pool that includes first and second semiconductor devices illustrated as first and second Modified CPUs/GPUs (MxPUs).

FIG. 128 illustrates one embodiment of a high-fanout large-scale multi-tier memory pool.

FIG. 129 illustrates one embodiment of connecting at least some of the xPUs and/or MxPUs in the memory pool utilizing a node controller. Utilizing one or more node controllers enables scaling a single server to larger topologies than what is possible with just meshing processors to each other. When using a node controller, the xPUs are not necessarily connected directly to each other. In some embodiments, node controller refers to a hardware component in a multi-socket computing system that manages communication and coherency between sockets, where each socket typically holds or houses one or more CPUs or GPUs. The node controller primarily interfaces with ISoL, such as UPI, NVLink, or similar proprietary or standardized interconnects designed for high-bandwidth, low-latency communication between processors. Key functions of the node controller may include one or more of: facilitating data transfer and communication between sockets using ISoL protocols; maintaining cache coherency across CPUs or GPUs in different sockets; managing distributed memory access and coherency across the system's memory hierarchy; routing memory and I/O requests between local and remote sockets; implementing various cache coherency protocols suitable for multi-socket architectures; supporting different memory coherency models, including hardware-managed and software-managed approaches; providing address translation and memory mapping services across sockets; enabling scalability of multi-socket systems beyond typical two or four-socket configurations; optimizing data movement and reducing latency between sockets; supporting advanced features such as cache directory management or snoop filtering to improve system performance; facilitating load balancing and resource allocation across sockets; providing mechanisms for partitioning and isolation in multi-socket environments; and/or implementing security and access control features for inter-socket communication. The node controller may be integrated into the package of a CPU or GPU, implemented as a separate chip on the system board, or implemented utilizing a combination of on-die and off-die components. It may be designed to support various processor architectures and may incorporate programmable elements to allow for flexibility and feature updates.

In one embodiment, a memory pool comprises: a first semiconductor device comprising: memory channels, a first Compute Express Link (CXL) Endpoint (EP), a first resource provisioning unit (RPU), and a first inter-socket link (ISoL) port; at least 8 GB of memory coupled via the memory channels; a second semiconductor device comprising: a second CXL EP, a second RPU, and a second ISoL port; wherein the first ISoL port is coupled to the second ISoL port, and the first and second semiconductor devices utilize a first host physical address (HPA) space; wherein the first RPU is configured to perform first host-to-host physical address translations (HHPAT) to enable a first host, coupled to the first CXL EP via a first CXL.mem interface, to utilize a first portion of the memory; and wherein the second RPU is configured to perform second HHPAT to enable a second host, coupled to the second CXL EP via a second CXL.mem interface, to utilize a second portion of the memory.

Optionally, the first and second hosts utilize second and third HPA spaces, respectively, the first HHPAT translate physical addresses within the second HPA space to physical addresses within the first HPA space, and the second HHPAT translate physical addresses within the third HPA space to physical addresses within the first HPA space. The memory may comprise dynamic random-access memory (DRAM), the second MxPU further comprises second memory channels, the second memory channels are coupled to at least 8 GB of second DRAM; and wherein the second and third address translations enable the first and second hosts, respectively, to utilize the second DRAM. The memory pool may further comprise third and fourth MxPUs coupled to the first and second MxPUs over additional ISoLs; the third and fourth MxPUs comprise third and fourth CXL EPs and third and fourth RPUs, respectively; the third and fourth CXL EPs are configured to be coupled to third and fourth hosts via third and fourth CXL.mem interfaces; and wherein the memory pool enables the third and fourth hosts to utilize at least a portion of the memory. In some implementations, the memory pool may further comprise third and fourth MxPUs coupled to the first and second MxPUs over additional ISoLs, wherein the ISoL and the additional ISoLs are interconnected by at least one Node Controller.

In certain aspects, the first and second MxPUs may be modified Intel CPUs, and the first and second ISoLs are based on Intel's Ultra Path Interconnect (UPI). Alternatively, the first and second MxPUs may be modified AMD CPUs, and the first and second ISoLs are Infinity Fabric (IF) or External Global Memory Interconnect (xGMI). In other implementations, the first and second MxPUs may be modified Nvidia GPUs, and the first and second ISoLs are Nvidia NVLink. Furthermore, the first MxPU may further comprise a first memory management unit (MMIU) configured to map virtual addresses, utilized by an operating system of the first MxPU, to physical addresses within the first HPA space; and the second MxPU further comprises a second MMU configured to map virtual addresses, utilized by an operating system of the second MxPU, to physical addresses within the second HPA space. The memory pool may also be configured to support training of a Mixture-of-Experts (MoE) AI model, and wherein the first and second portions of the memory are allocated to different experts of the MoE model. Additionally, the first and second RPUs may be further configured to create secure memory enclaves within the memory, thereby providing confidential computing environments for the first and second hosts. The first and second ISoL ports may also be compliant with an Ultra Accelerator Link (UALink) current or future specification.

In one embodiment, a method comprises: utilizing a first host physical address (HPA) space, by first and second semiconductor devices coupled over an inter-socket link (ISoL), to access at least 8 GB of memory via memory channels of the first semiconductor device; performing first host-to-host physical address translations (HHPAT) to enable a first application host, coupled to a first Compute Express Link (CXL) Endpoint (EP) of the first semiconductor device via a first CXL.mem interface, to utilize a first portion the memory; and performing second HHPAT to enable a second application host, coupled to a second CXL EP of the second semiconductor device via a second CXL.mem interface, to utilize a second portion the memory. Optionally, the first application host utilizes a second HPA space, the second application host utilizes a third HPA space, the first HHPAT is translating physical addresses within the second HPA space to physical addresses within the first HPA space, and the second HHPAT is translating physical addresses within the third HPA space to physical addresses within the first HPA space. The method may further comprise monitoring power consumption of the memory and dynamically adjusting the first and second portions of the memory allocated to the first and second application hosts to optimize power efficiency. In addition, the first HPA space may be further utilized to access Storage Class Memory (SCM); and the method may further comprise utilizing a tiered memory solution, based on the DRAM coupled to the memory channels and the SCM, to accelerate training of a Large Language Model (LLM).

In one embodiment, a memory pool comprises: a CPU or GPU (xPU) comprising: processing cores, a first inter-socket link (ISoL) port, and first memory channels; wherein the first memory channels are coupled to at least 8 GB of a first memory; a semiconductor device comprising: a Compute Express Link (CXL) Endpoint (EP), are source provisioning unit (RPU), a second ISoL port, and second memory channels; wherein the second memory channels are coupled to at least 8 GB of a second memory, the first ISoL port is coupled to the second ISoL port, and the semiconductor device and the xPU utilize a first host physical address (HPA) space; and wherein the RPU is configured to perform host-to-host physical address translations (HHPAT) to enable an application host, communicating with the CXL EP according to a CXL.mem protocol, to utilize portions of the first memory and the second memory. FIG. 127B illustrates one embodiment of a multi-tier memory pool.

Optionally, the first and second memories are dynamic random-access memory (DRAM), the application host utilizes a second HPA space, and the HHPAT translate physical addresses within the second HPA space to physical addresses within the first HPA space. The memory pool may further comprise second and third xPUs coupled to the semiconductor device and the xPU over additional inter-socket links; the second and third xPUs comprise memory channels coupled to at least 8 GB of third DRAM and fourth DRAM, respectively; and whereby the HHPAT further enables the application host to utilize the third DRAM and the fourth DRAM. In some implementations, the semiconductor device further comprises a CXL RP configured to be coupled to a CXL memory expander utilizing another CXL.mem interface; and wherein the HHPAT further enables the application host to utilize memory of the memory expander. Additionally, the xPU may further comprise a CXL Root Port (RP), and the memory pool may further comprise a CXL memory expander coupled to the CXL RP of the xPU; and wherein the HHPAT enable the application host to utilize memory of the memory expander while communicating according to the CXL.mem protocol and via the first and second ISoLs. The semiconductor device and the xPU may further comprise memory management units (MMIUs) configured to translate virtual addresses within virtual address spaces, utilized by at least one operating system of the xPU, to physical addresses within the first HPA space.

In certain aspects, the semiconductor device comprises a Modified CPU or GPU (MxPU). The memory pool may also be configured to support training of a Mixture-of-Experts (MoE) AI model, and wherein the first and second portions of the memory are allocated to different experts of the MoE model. Furthermore, the RPU may be further configured to create a secure memory enclave within the memory, thereby providing confidential computing environments for the application host. The first and second ISoL ports may also be compliant with an Ultra Accelerator Link (UALink) current or future specification.

In one embodiment, a method comprises: utilizing a first host physical address (HPA) space by a semiconductor device and a CPU or GPU (xPU) coupled over an inter-socket link (ISoL); communicating, via first memory channels of the xPU, with at least 8 GB of memory; communicating, via second memory channels of the semiconductor device, with at least 8 GB of a second memory; communicating with an application host via a Compute Express Link (CXL) Endpoint (EP) of the semiconductor device according to a CXL.mem protocol, whereby the application host utilizes a second HPA space; and enabling the application host to utilize the first memory and the second memory based on host-to-host physical address translations (HHPAT) performed by a resource provisioning unit (RPU) associated with the semiconductor device. Optionally, the HHPAT translate physical addresses within the second HPA space to physical addresses within the first HPA space. The method may further comprise utilizing machine learning-based controller to dynamically allocate portions of the first memory and the second memory to the application host based on real-time analysis of the application host's memory access patterns. Additionally, the ISoL may be tunneled over an Ultra Ethernet fabric, and the method may further comprise providing a disaggregated memory solution in a hyperscaler data center.

The CPU's market is significantly larger than the memory pool controller's market (referred to in this context as MxPU), which would probably result in a greater variety of CPU configurations compared to MxPUs. CPU variations may include differences in cache sizes, number of cores, number and type of ports, clock speeds (e.g., higher frequency for enhanced performance for a busy host, and a lower frequency for improved power efficiency for a station with a low load), and/or support for specialized instructions (e.g., Advanced Vector Extensions (AVX), TensorFlow operations). Additionally, some CPUs may integrate accelerators like GPUs, Tensor Processing Units (TPUs), or FPGAs to further enhance computational capabilities. This diversity in CPU configurations allows for various combinations of essentially the same MxPU with different types of CPUs to address a wide range of use cases. In large data centers, such combinations may improve HPC tasks, virtualized environments, and/or storage and data management. For AI model training and utilization, these combinations can support tasks such as distributed training, AI inference services, model optimization, or model fine-tuning. As a result, the flexibility provided by the MxPU in managing address translations and resource provisioning can enhance the efficiency and performance of systems leveraging diverse CPU configurations.

The MxPU enables the provisioning of CXL memory to other hosts via CXL Endpoints, a capability not present in the currently available CPUs. The quantity of MxPUs required in the system can be determined by the number of ports necessary to establish the connections with the hosts, while the remaining processors may be standard CPUs or GPUs (xPUs) lacking CXL Endpoints. However, in scenarios necessitating a high-fanout, multi-tier memory pool, the system may incorporate multiple MxPUs to increase the number of CXL EPs through which additional hosts can be coupled to the memory pool. This configuration allows for the expansion of the memory pool's connectivity and facilitates efficient memory sharing among a larger number of coupled hosts.

The following examples are three use-cases of combining an MxPU with multiple CPUs for large data centers: In a first example, combining one MxPU with multiple CPUs, such as seven CPUs, can leverage the high parallel processing capabilities required for HPC tasks; the MxPU can handle intensive resource management and address translations between multiple CPUs, optimizing performance for simulations, scientific computations, and data analysis. In a second example, combining one MxPU with three CPUs can be useful for data centers running multiple virtual machines; the MxPU can manage memory and resource allocation efficiently, facilitating isolation and performance stability across virtualized workloads. And in a third example, combining one MxPU with one CPU may be suitable for tasks like data indexing, search, and/or retrieval in large storage systems; the MxPU can facilitate quick address translations and resource allocation, improving data access speeds.

The following are three use case examples of combining an MxPU with multiple CPUs for AI model training and utilization: In a first example, combining one or few MxPUs with multiple CPUs, such as one MxPU with seven CPUs can support distributed training of large AI models, wherein multiple CPUs handle different portions of the dataset; the MxPU may manage memory coherence and data flow between CPUs, facilitating efficient training. In a second example, combining one MxPU with three CPUs may be suitable for deploying AI models for inference in real-time applications; the MxPU can balance the load across multiple CPUs, improving response times and throughput for inference requests. And in a third example, combining one MxPU with one CPU may be useful for tasks like model pruning, quantization, and/or fine-tuning on specific datasets; the MxPU may provide efficient memory management and computational resource allocation, speeding up the optimization process.

FIG. 88 illustrates one embodiment of a system comprising an IC package comprising an input/output (IO) die coupled to compute dies and RPU dies via xPU interconnect links. The IC package may be representative of a modified AMD server-grade processor such as a modified EPYC processor or a modified consumer-grade processor such as a modified RYZEN processor. The IO die is positioned essentially centrally within the IC package and provides external interfaces including inter-socket link (ISoL) interfaces for multi-processor configurations, DRAM interfaces for memory connectivity, and PCIe/CXL interfaces for peripheral device connectivity. The xPU interconnect links may utilize high-bandwidth die-to-die interconnect protocols to enable communication between the various dies and the IO die within the IC package. The compute dies and RPU dies are arranged around the IO die, wherein the RPU dies are positioned at peripheral locations within the IC package. Entity.1/Host.1/Switch.1 is coupled to a first RPU die utilizing Protocol.1, which may be CXL, UALink, or Ethernet. Entity.2/Host.2/Switch.2 is coupled to a second RPU die utilizing Protocol.3, which may be CXL, UALink, or Ethernet. The IO die utilizes Protocol.2 for internal communications with both the compute dies and the RPU dies via the xPU interconnect links, wherein Protocol.2 may be ISoL protocol. Entity.3/MxPU.1 is the apparatus that includes the IO die, compute dies and RPU dies. Entity.4/MxPU.2 is coupled to the IC package via ISoL interfaces. The IO die may further provide connectivity to Memory/DRAM via DRAM interfaces and to Entity.5/Device/Switch.3 via PCIe/CXL interfaces. The RPU dies may enable protocol translation between the external protocols (Protocol.1 and Protocol.3) utilized by the coupled entities and the internal protocol (Protocol.2) utilized by the coherent interconnect of the IC package.

FIG. 89A illustrates one embodiment of a system comprising a memory switch comprising an IC package with an IO die coupled to at least first and second RPU dies. The coherent interconnect of the xPU utilizes Protocol.2 for communications between the IO die and the RPU dies, wherein Protocol.2 may be based on Intel Intra-Die Interconnect (IDI) protocol or AMD Infinity Fabric (IF) protocol. The coherent interconnect may be implemented as AMD Infinity Fabric or Intel Ring/Mesh Interconnect. RPU.1 is configured to translate between Protocol.1 and Protocol.2, and RPU.2 is configured to translate between Protocol.2 and Protocol.3. The memory switch may support various protocol translation scenarios including: (a) translation from CXL.mem to Intel IDI to CXL.cache, (b) translation from CXL.mem to AMD IF Protocol to CXL.cache, (c) translation from CXL.io Unordered IO (UIO) to AMD IF Protocol to CXL.io UIO, (d) translation from PCIe UIO to AMD IF Protocol to PCIe UIO, or (e) translation from UALink to AMD IF Protocol to UALink.

FIG. 89B illustrates one embodiment of a TFD demonstrating protocol and address translation relevant to the memory switch embodiment shown in FIG. 89A. Entity.1/Host.1/Switch.1 initiates a CXL.mem Master-to-Subordinate Request (M2S Req) comprising a MemRd opcode, a physical address (AS.1.1) within a first physical address space, and a tag (p.1.1). RPU.1 receives the CXL.mem M2S request and translates it for transmission over the xPU/Processor Coherent Interconnect. RPU.2 receives the translated M2S request from the coherent interconnect and generates a CXL.cache Device-to-Host Request (D2H Req) comprising an RdCurr opcode, a translated physical address (AS.2.1) within a second physical address space, and a translated identifier (q.1.1) that may be a Command Queue ID (CQID). Entity.2/Host.2/Switch.2 processes the CXL.cache request and returns a CXL.cache Host-to-Device Data Response (H2D Data) comprising the CQID (q.1.1) and the requested data. The response traverses back through RPU.2 and the coherent interconnect to RPU.1, which translates it to a CXL.mem Subordinate-to-Master Data Response (S2M DRS) comprising a MemData opcode, the original tag (p.1.1), and the data for delivery to Entity.1/Host.1/Switch.1.

FIG. 90A illustrates one embodiment of a system comprising a memory switch comprising an IC package with an IO die coupled to at least first and second RPU dies. Entity.3/MxPU may function as a Memory Pool, Memory Switch, or Scalable RPU. The memory switch functionality enables two distinct transaction paths: a host-to-host transaction path marked with bubbles a1 through a5, and a host-to-memory transaction path marked with bubbles b1 through b4. RPU.1 Die is coupled to Entity.1/Host.1/Switch.1 via Protocol.1, such as CXL.mem. RPU.2 Die is coupled to Entity.2/Host.2/Switch.2 via Protocol.3, such as CXL.cache. The IO die utilizes Protocol.2 for internal communications with the RPU dies via xPU interconnect links, which may be a coherent interconnect. Memory/DRAM is coupled to the IO die, enabling memory access for the host-to-memory transactions. ISoL interfaces on the IO die may provide connectivity to additional processors or coherent interconnects.

FIG. 90B illustrates one embodiment of a TFD demonstrating protocol and address translation relevant to the memory switch embodiment shown in FIG. 90A. The TFD illustrates two CXL transactions. The first CXL transaction is a host-to-host transaction, wherein the request path follows bubbles a1 through a5. Entity.1/Host.1/Switch.1 initiates a CXL.mem Master-to-Subordinate Request (M2S Req) comprising a MemRd opcode, physical address (AS.1.1), and tag (p.1.1, bubble a1). RPU.1 receives the request (bubble a2) and translates it for transmission over the xPU/Processor Coherent Interconnect (bubble a3). RPU.2 receives the translated request (bubble a4) and generates a CXL.cache Device-to-Host Request (D2H Req) comprising an RdCurr opcode, translated physical address (AS.2.1), and CQID (q.1.1) for delivery to Entity.2/Host.2/Switch.2 (bubble a5). The response path includes a CXL.cache Host-to-Device Data Response (H2D Data) comprising CQID (q.1.1) and Data.1, which traverses back through the xPU/Processor Coherent Interconnect to RPU.1, wherein it is translated to a CXL.mem Subordinate-to-Master Data Response (S2M DRS) comprising a MemData opcode, tag (p.1.1), and Data.1.

The second CXL transaction is a host-to-memory transaction, which may be a host to fabric-attached memory, host to switch-attached memory, or host to memory pool transaction. The request path follows bubbles b1 through b4, wherein Entity.1/Host.1/Switch.1 initiates a CXL.mem M2S Req comprising a MemRd opcode, physical address (AS.1.2), and tag (p.1.2, bubble b1). RPU.1 processes this request (bubble b2) and forwards it to Memory/DRAM via the IO die (bubbles b3 and b4). The response path includes Data.2 being retrieved from Memory/DRAM and sent to RPU.1, which encapsulates it in a CXL.mem S2M DRS comprising a MemData opcode, tag (p.1.1), and Data.2 for delivery to Entity.1/Host.1/Switch.1.

FIG. 91A illustrates one embodiment of a system comprising an xPU-based multi-protocol switch comprising an IC package with an IO die coupled to at least first and second RPU dies. Entity.3/MxPU functions as an xPU-based multi-protocol switch. Entity.1/GPU/Switch.1 is coupled to RPU.1 Die utilizing Protocol.1, such as UALink. Entity.2/Host/Switch.2 is coupled to RPU.2 Die utilizing Protocol.3, such as CXL.cache. The IO die utilizes Protocol.2 for internal communications with the RPU dies via xPU interconnect links. ISoL interfaces on the IO die may provide connectivity to additional processors or xPU-based multi-protocol switches. The xPU-based multi-protocol switch enables translation between three or more distinct protocols.

FIG. 91B illustrates one embodiment of a TFD demonstrating protocol and address translation relevant to the xPU-based multi-protocol switch embodiment shown in FIG. 91A. Entity.1/GPU/Switch.1 initiates a UPLI Request (Req) comprising ReqCmd(Read), ReqSrcPhysAccID(a.1), ReqDstPhysAccID(b.1), ReqAddr(AS.1.1), ReqTag(c.1.1), and ReqLen(d.1.1). RPU.1 receives the UPLI request and translates it for transmission over the xPU/Processor Coherent Interconnect. RPU.2 receives the translated request and generates a CXL.cache Device-to-Host Request (D2H Req) comprising an RdCurr opcode, CQID (q.1.1), and translated physical address (AS.2.1) for delivery to Entity.2/Host/Switch.2. The response path includes a CXL.cache Host-to-Device Data Response (H2D Data) comprising CQID (q.1.1) and the requested data, which traverses back through the xPU/Processor Coherent Interconnect to RPU.1. RPU.1 translates the response to a UPLI Read Response/Data (RdRsp) comprising RdRspSrcPhysAccID(b.1), RdRspDstPhysAccID(a.1), RdRspTag(c.1.1), and RdRspData for delivery to Entity.1/GPU/Switch.1. Protocol.2, utilized by the xPU/processor's coherent interconnect, may enable communication between the IO die and the RPUs. The xPU-based multi-protocol switch may support various protocol translation scenarios, including: (a) UALink to Intel IDI to CXL.cache, (b) UALink to AMD IF Protocol to CXL.cache, (c) CXL.mem to Intel IDI to CXL.cache, (d) CXL.mem to AMD IF Protocol to CXL.cache, (e) CXL.io UIO to AMD IF Protocol to CXL.io UIO, or (f) PCIe UIO to AMD IF Protocol to PCIe UIO.

FIG. 93 illustrates one embodiment of a scalable GPU interconnect utilizing an xPU-based AI switch, comprising at least first and second xPU-based switches coupled via one or more ISoL interfaces. The AI switch may function as a GPU-to-GPU Switch or UALink Switch. GPUs on the left side of the switch are coupled to RPU.1 and additional RPUs that are coupled to IO Die.1, while GPUs on the right side are coupled to RPU.2 and additional RPUs (not shown) that are coupled to IO Die.2. The numbered bubbles 1 through 7 illustrate a transaction path from GPU.1 to GPU.2. Modern CPUs comprise one or more high-bandwidth coherent interconnects that couple elements such as compute cores, caching elements such as LLC slices, and port modules such as PCIe and CXL. The total bandwidth provided by the coherent interconnect of current advanced CPUs (in year 2025) may exceed 1 TB/s (>8 Tbps), and may reach several TB/s in current advanced CPU architectures that utilize MCR-DIMMs or MR-DIMMs. The two xPU-based switches, coupled via the ISoL interface denoted as bubble 4, enable memory transactions between GPU.1 and GPU.2 in a manner similar to a UALink switch when the GPUs communicate according to UPLI protocol. When GPUs communicate according to UPLI, the transaction path follows: GPU.1 sends a UPLI request to RPU.1 (bubbles 1-2), RPU.1 translates the UPLI request to the coherent interconnect protocol utilized by IO Die.1 (bubble 3), the translated request traverses through the ISoL interface to IO Die.2 (bubble 4), IO Die.2 forwards the request to RPU.2 (bubbles 5-6), and RPU.2 translates the request back to UPLI protocol for delivery to GPU.2 (bubble 7). In another example, when the GPUs communicate according to Infinity Fabric (IF) protocol, the RPUs may translate between IF protocol and the coherent interconnect protocol of the IO dies, enabling GPU-to-GPU communication through the ISoL-coupled switches. In still another example, when the GPUs communicate according to Infinity Fabric over Ethernet (IFoE) protocol, the RPUs may extract IF messages from Ethernet frames, translate them to the coherent interconnect protocol, and re-encapsulate them for delivery to the destination GPU.

FIG. 94A illustrates one embodiment of a system comprising an xPU-based UALink switch and memory pool, comprising an IC package with an IO die coupled to at least first and second RPU dies. Entity.3/MxPU functions as a UALink switch and memory pool. Entity.1/GPU.1/Switch.1 is coupled to RPU.1 Die via Protocol.1, such as UALink. Entity.2/GPU.2/Switch.2 is coupled to RPU.2 Die via Protocol.1, which may also be UALink. Memory/DRAM is coupled to the IO die, enabling the Entity.3 xPU-based device to function as both a UALink switch for GPU-to-GPU transactions and a memory pool for GPU-to-memory transactions. This embodiment supports two distinct transaction paths: a GPU-to-GPU transactionpath marked with bubbles a1 through a5, and a GPU-to-memory transaction path marked with bubbles b1 through b4. The IO die utilizes Protocol.2 for internal communications with the RPU dies via xPU interconnect links. ISoL interfaces on the IO die may provide connectivity to additional processors, xPU-based switches, or memory resources.

FIG. 94B illustrates one embodiment of a TFD demonstrating two UALink transactions through the xPU-based UALink switch and memory pool embodiment shown in FIG. 94A. The first UALink transaction is a GPU-to-GPU transaction, wherein the request path follows bubbles a1 through a5. Entity.1/GPU.1/Switch.1 initiates a UPLI Request (Req) comprising ReqCmd(Read), ReqSrcPhysAc-cID(a.1), ReqDstPhysAccID(b.1), ReqAddr(AS.1.1), ReqTag(c.1.1), and ReqLen(d.1.1) (bubble a1). RPU.1 receives this request (bubble a2) and forwards it via the xPU/Processor Coherent Interconnect (bubble a3) to RPU.2 (bubble a4). RPU.2 forwards the UPLI request to Entity.2/GPU.2/Switch.2 with essentially the same parameters (bubble a5). The response path includes a UPLI Read Response/Data (RdRsp) from Entity.2/GPU.2/Switch.2 comprising RdRspSrcPhysAccID(b.1), RdRspDstPhysAc-cID(a.1), RdRspTag(c.1.1), and RdRspData, which traverses back through the xPU/Processor Coherent Interconnect to RPU.1, wherein it is forwarded as a UPLI Read Response/Data (RdRsp) to Entity.1/GPU.1/Switch.1. The second UALink transaction is a GPU-to-memory transaction, which may be GPU to fabric-attached memory, GPU to switch-attached memory, or GPU to memory pool transaction. The request path follows bubbles b1 through b4, wherein Entity.1/GPU.1/Switch.1 initiates a UPLI Request (Req) comprising ReqCmd(Read), ReqSrcPhysAccID(a.1), ReqD-stPhysAccID(b.2), ReqAddr(AS.1.2), ReqTag(c.1.2), and ReqLen(d.1.2) (bubble b1). RPU.1 processes this request (bubble b2) and forwards it to Memory/DRAM via the xPU/Processor Coherent Interconnect and IO die (bubbles b3 and b4). The response path includes data being retrieved from Memory/DRAM and sent via the xPU/Processor Coherent Interconnect to RPU.1, which generates a UPLI Read Response/Data (RdRsp) comprising RdRspSrcPhys-AccID(b.2), RdRspDstPhysAccID(a.1), RdRspTag(c.1.2), and RdRspData for delivery to Entity.1/GPU.1/Switch.1.

FIG. 95 illustrates one embodiment of a heterogeneous computing system comprising an xPU or custom accelerator that utilizes an ARM-based mesh architecture with protocol interconnections. The xPU comprises a coherent interconnect implemented as a mesh topology with crosspoints (XP) that route transactions between various system components. Processing cores (C) are distributed throughout the mesh architecture and coupled to the coherent interconnect via the crosspoints. Home nodes are positioned within the mesh, optionally including HN-I nodes that may handle I/O coherent transactions and HN-F nodes that may manage fully coherent transactions. System Node Fully-coherent (SN-F) nodes are coupled to memory controllers (MC) which interface with external memory via physical layers (PHYs). The memory may be DRAM accessible through the memory channels. An entity comprising an NVIDIA Rubin GPU with integrated HBM is coupled to the xPU coherent interconnect via an NVLink chiplet. The NVLink chiplet, which may be an NVLink Fusion chiplet or custom PHY, is coupled utilizing a first physical layer (PHY.1, such as a UCIe PHY) to a die-to-die (D2D) adapter, which may be a CHI D2D Adapter or an NVLink-C2C Adapter, that enables communication between the NVLink chiplet and the coherent interconnect. The NVLink chiplet may provide the NVLink physical layer interface and may additionally provide higher protocol layers including the NVLink data link layer and transaction layer functionality.

Moreover, a CXL device, which may be a memory expander, may be coupled to the xPU coherent interconnect via a second physical layer (PHY.2) and a Root Port. The Root Port provides the interface between the CXL device and the coherent interconnect, enabling the CXL device to be discovered and configured by the system. The xPU architecture may enable the GPU to access memory resources of the CXL memory expander utilizing protocol translation performed by the RPU and the coherent interconnect. The transaction path denoted as A.1 to A.2 in the figure illustrates a memory access flow that may represent an NVLink read transaction initiated by the GPU. The transaction may traverse from the GPU through the NVLink chiplet to the ARM mesh interconnect, wherein the RPU may translate the NVLink read request to a CHI protocol transaction compatible with the ARM mesh interconnect. The CHI transaction may then be routed through the coherent interconnect to the appropriate home node and subsequently to the Root Port, wherein it may be further translated to a CXL.mem MemRd transaction for delivery to the CXL memory expander (A.2). The xPU may additionally comprise accelerator cores that may perform specialized computation tasks and may access both the GPU-attached HBM and the CXL-attached memory through the coherent interconnect.

In one embodiment, an apparatus comprises: processing cores integrated within the apparatus; a Compute Express Link (CXL) port; wherein a first subset of the processing cores is configured to execute a first Operating System (OS) that supports execution of a first program configured to manage memory in a CXL fabric coupled to the CXL port; wherein a second subset of the processing cores is configured to execute a second OS configured to execute a second program configured to utilize a portion of the memory managed by the first program; and a partitioning controller configured to adjust a ratio between number of processing cores in the first subset compared to number of processing cores in the second subset based on a parameter related to the CXL fabric.

Optionally, the parameter is indicative of workload demands related to CXL memory accesses in the CXL fabric, and wherein the partitioning controller is further configured to increase the ratio between the number of processing cores in the first subset compared to the number of processing cores in the second subset, responsive to an increase above a predetermined threshold of at least one of frequency, pattern, or intensity of the CXL memory accesses. Increasing the number of processing cores in the first subset may enable the system to handle a higher volume of CXL memory accesses, resulting in lower latency and higher throughput. The system may accommodate different types of memory access patterns, such as sequential or random access, read-intensive or write-intensive workloads, and varying block sizes, by dynamically adjusting the ratio of processing cores dedicated to managing memory in the CXL fabric. The parameter may be indicative of scalability and topology of the CXL fabric, and wherein the partitioning controller is further configured to adjust the ratio between the number of processing cores in the first subset compared to the number of processing cores in the second subset based on at least one of a number of memory devices in the CXL fabric, a depth or breadth of a hierarchy of the CXL fabric, or an interconnect bandwidth of the CXL fabric. The scalability and topology of the CXL fabric affect the memory provisioning system, as they determine how efficiently a large amount of memory can be provisioned and accessed by the coupled components. By adjusting the ratio of processing cores based on these parameters, the system may optimize performance and resource utilization. For example, when the number of memory devices in the CXL fabric increases, the system may allocate more processing cores to the first subset to handle the increased memory management workload.

In certain aspects, the parameter may be indicative of CXL bandwidth requirements, and wherein the partitioning controller is further configured to adjust the ratio between the number of processing cores in the first subset compared to the number of processing cores in the second subset based on anticipated workload demands and available bandwidth in the CXL fabric. CXL bandwidth requirements in a memory provisioning system dictate the speed at which data can be transferred to and from the memory pool. By adjusting the ratio of processing cores based on the anticipated workload demands and available bandwidth, the system may improve the speed and efficiency of memory access requests. In addition, the system may employ techniques such as traffic prioritization, flow control, and/or load balancing to optimize bandwidth utilization and reduce congestion. The parameter may also be indicative of CXL bandwidth requirements, and wherein the partitioning controller is further configured to adjust the ratio between the number of processing cores in the first subset compared to the number of processing cores in the second subset based on data transfer rates required by various applications accessing the memory in the CXL fabric. CXL bandwidth requirements are used to enable the memory pool to handle the high data transfer rates required by various applications. By adjusting the ratio of processing cores based on these bandwidth requirements, the system can allocate more resources to memory management when high-bandwidth applications are running, to provide better performance and reduce data transfer bottlenecks.

In some implementations, the parameter may be indicative of Quality-of-Service (QoS) requirements for CXL transactions, and wherein the partitioning controller is further configured to adjust the ratio between the number of processing cores in the first subset compared to the number of processing cores in the second subset based on priorities and/or criticalities of different types of memory traffic in the CXL fabric. QoS requirements for CXL transactions help handling the memory access requests appropriately based on their priority and criticality. The system may define and enforce QoS policies that prioritize different types of memory traffic, such as high-priority, low-latency requests for critical applications, and/or best-effort traffic for less sensitive workloads. By adjusting the ratio of processing cores based on such QoS requirements, the system may prioritize the more critical memory access requests over low-priority memory access requests. The first program may be further configured to prioritize memory transactions in the CXL fabric based on Quality-of-Service (QoS) requirements to meet predetermined performance metrics.

In environments with diverse applications accessing the memory pool, there may be a need for QoS requirements for CXL transactions. The first program may prioritize memory transactions based on predefined QoS policies to cause that certain applications receive the necessary resources to meet their performance metrics, which may include assigning higher priority to latency-sensitive or bandwidth-intensive applications while providing best-effort service to less demanding workloads. The parameter may be indicative of coherency requirement in the CXL fabric, and wherein the partitioning controller is further configured to adjust the ratio between the number of processing cores in the first subset compared to the number of processing cores in the second subset based on a level of data integrity, concurrency, and/or synchronization required by components accessing a shared memory pool in the CXL fabric. The system may implement appropriate coherency protocols, such as cache coherency controllers, and adjust the ratio of processing cores based on the level of data integrity, concurrency, and/or synchronization required. For example, when expecting multiple components to frequently access the same memory locations simultaneously, the system may allocate more processing cores to the first subset to handle the increased coherency workload effectively. Additionally, the parameter may be indicative of power management and efficiency requirements in the CXL fabric, and wherein the partitioning controller is further configured to adjust operational states of the processing cores in the first subset based on energy consumption and performance trade-offs in the CXL fabric.

Power management and efficiency are considerations in a CXL-based memory provisioning system, particularly when dealing with CPU cores used to manage a large amount of memory. The system may implement power management techniques, such as the use of low-power memory devices, dynamic voltage and frequency scaling (DVFS), and fine-grained power gating, to reduce energy consumption. By adjusting the ratio of processing cores and/or the operational states of the processing cores based on energy consumption and performance trade-offs, the system may optimize resource utilization and energy efficiency in the CXL fabric. The parameter may also be indicative of fault tolerance and resilience requirements in the CXL fabric, and wherein the partitioning controller is further configured to adjust the ratio between the number of processing cores in the first subset compared to the number of processing cores in the second subset based on a level of availability, data protection, and/or error recovery required in the presence of failures or errors in the CXL fabric. Fault tolerance and resilience are aspects of a memory provisioning system supporting the availability and integrity of the memory pool in the presence of failures or errors. The system may incorporate mechanisms to detect and isolate faults, such as memory device failures, link errors, and/or data corruption, and employ techniques like error correction codes (ECC), memory mirroring, and redundancy to protect against data loss. By adjusting the ratio of processing cores based on the level of availability, data protection, and/or error recovery required, the system is better suited to maintain the continued operation and data integrity of the CXL fabric in the event of component failures or errors.

The first program may be further configured to dynamically adjust memory resources in the CXL fabric by scaling memory resources up or down based on real-time usage and workload demands. The system may incorporate dynamic capacity adjustment controllers to efficiently manage memory resources in the CXL fabric. By monitoring real-time usage and workload demands, the system can scale memory resources up or down as needed. This dynamic adjustment allows the system to adapt to changing requirements without requiring a system reset, optimizing resource utilization and reducing overall costs. Furthermore, the first program may be further configured to maintain data consistency across the memory in the CXL fabric and devices coupled to the CXL fabric. Maintaining data consistency across the memory pool and its coupled devices may be needed for integrity and reliability of the system. The first program, executed by the first subset of processing cores, may implement coherency management controllers to keep data synchronized across the devices in the CXL fabric, which may include using cache coherence protocols, atomic operations, and/or other techniques to prevent data conflicts and generate a consistent view of the memory pool.

The first program may be further configured to enforce security policies for data protection within the memory in the CXL fabric, and wherein the partitioning controller is further configured to adjust the ratio between the number of processing cores in the first subset compared to the number of processing cores in the second subset based on a level of security required for the data in the CXL fabric. The system may enforce various security policies to protect data within the memory pool, and the partitioning controller may adjust the ratio of processing cores dedicated to managing memory based on the level of security required. For example, when dealing with highly sensitive data, the system may allocate more processing cores to the first subset to enforce security policies more strictly and to provide sufficient resources to perform security-related tasks such as encryption, access control, and monitoring.

The partitioning controller may be further configured to increase the ratio of the first subset to the second subset of the processing cores responsive to an increased demand for encryption and decryption operations related to the data in the CXL fabric. Encryption and decryption operations may be required to maintain the confidentiality of data within the memory pool. When there is an increased demand for these operations, the partitioning controller may allocate more processing cores to the first subset to handle the additional workload, optionally in order to reduce the impact of running encryption and decryption tasks on the system's performance or security. The partitioning controller may be further configured to increase the ratio of the first subset to the second subset of the processing cores responsive to a detection of a potential security threat or vulnerability in the CXL fabric. When a potential threat or vulnerability is detected, the partitioning controller may allocate additional processing cores to the first subset to provide additional resources for security monitoring, threat analysis, and/or mitigation. This may allow the system to respond faster to security incidents and reduce the risk of data breaches or unauthorized access.

In certain implementations, the partitioning controller may be further configured to adjust the ratio between the number of processing cores in the first subset compared to the number of processing cores in the second subset based on a level of access control required for different components or applications accessing the memory in the CXL fabric. Access control ensures that only authorized components or applications can access specific memory regions or perform certain operations. The partitioning controller may adjust the ratio of processing cores based on the level of access control required for different components or applications. For example, when there are applications with varying levels of trust or privileged accessing the memory pool, the system may allocate more processing cores to the first subset to enforce access control policies and prevent unauthorized access.

The first OS may be a Special-Purpose Operating System (SPOS), the first program is hidden from a user of the CXL fabric, the second OS is General-Purpose Operating System (GPOS), and the second program is user-controlled. Furthermore, the apparatus may be a semiconductor device, the semiconductor device functions as a CXL memory processor, and the CXL fabric comprises at least two active CXL links.

In some embodiments, CXL memory processor refers to an apparatus comprising a processor, which implements, configures, provides services, and/or participates in providing services that perform memory-related functions, configurations, and/or services within a CXL fabric, depending on the specific functionality, configuration, and/or service described in each embodiment or claim. A CXL memory processor may be utilized to provide, enable, and/or facilitate any combination, partial functionalities, and/or management of one or more of the following non-limiting exemplary elements: CXL device, memory buffer, memory expander (e.g., memory buffer coupled with DRAM), memory controller, memory accelerator, memory device, CXL types 3 memory device, Domain Specific Accelerator (DSA), Multi-headed Multi-Logical Device (HD-MLD), Multi-headed Single Logical Device (MH-SLD), device-attached memory, host-attached memory, fabric-attached memory, memory pooling, switch, and/or CXL switch subset component providing a subset of CXL switch capabilities (such as an element providing a subset of CXL switch capabilities related to memory pooling, as defined in one or more of CXL Specification Revisions 2.0, 3.0, 3.1, 4.0 or future versions). Depending on the context, a CXL memory processor may be implemented according to one or more of the Modified CPU or GPU (MxPU) embodiments discussed herein. Moreover, a CXL memory processor may encompass other memory-related functionalities, configurations, operations, services, and/or optimizations, as long as its interface(s) to CXL entities are at least partially compatible with current and/or future CXL Specification Versions; this compatibility may include: supporting one or more CXL protocol layers, implementing one or more CXL device types, utilizing CXL-defined memory access mechanisms, participating in CXL-based coherency protocols, and/or leveraging CXL-specific features or capabilities.

Furthermore, a CXL memory processor may incorporate additional functionalities and/or services that extend beyond the current CXL Specifications, as long as they are designed to interoperate with or enhance CXL-based systems; examples of such functionalities may include: (i) memory caching, compression, encryption, and/or error correction schemes that improve parameters such as efficiency, latency, security, and/or reliability of CXL memory, (ii) advanced memory allocation, migration, or tiering mechanisms that improve the placement and/or movement of data across CXL memory resources, and/or (iii) specialized memory-centric computing paradigms, such as in-memory processing or near-data computing, which may leverage CXL memory processors to achieve higher performance or energy efficiency. In one example, a CXL memory processor operating as a memory accelerator, and/or enabling/facilitating the operation of a memory accelerator, may perform one or more of the following operations: processing in memory, caching, sparse memory translations, sparse memory operations, malware detection, memory compression, memory encryption, in-memory database acceleration, memory-based AI acceleration, enhancing memory virtualization, and/or supporting data deduplication at the memory level. In another example, a CXL memory processor may operate as, and/or enable/facilitate/support the operation of a system operating as: a memory pool, a memory device, a CXL type 3 memory device, a CXL type 2 memory device, a CXL type 1 memory device, and/or an RPU.

In one embodiment, a method comprises: executing, by a first subset of processing cores integrated within a semiconductor device, a first Operating System (OS) that executes a first program that manages memory in a Compute Express Link (CXL) fabric coupled to a CXL port of the semiconductor device; executing, by a second subset of the processing cores, a second OS that executes a second program that utilizes a portion of the memory managed by the first program; and adjusting, by a partitioning controller, a ratio between number of processing cores in the first subset compared to number of processing cores in the second subset based on at least one parameter related to the CXL fabric.

In one embodiment, an apparatus comprises: processing cores integrated within the apparatus; a Compute Express Link (CXL) port configured to be coupled to a CXL fabric; wherein a first subset of the processing cores is hidden from user access and visibility, the first subset configured to execute an infrastructure program for managing memory in the CXL fabric; wherein a second subset of the processing cores is visible and accessible to a user, the second subset configured to execute a user program that utilizes a portion of the memory managed by the infrastructure program; and wherein hiding the first subset of the processing cores from the user provides user-infrastructure isolation, protecting the infrastructure program from interference by the user program. The apparatus may implement a security architecture that physically separates infrastructure management from user workloads utilizing core visibility control. The hidden cores may operate in an isolated execution environment that cannot be accessed, modified, or monitored by user-level software, potentially supporting critical memory management functions to remain protected from both malicious attacks and unintentional interference. This hardware-enforced isolation may be implemented utilizing various mechanisms including hypervisor control, firmware configuration, CPU microcode, or custom silicon design that prevents the OS running on the visible cores from detecting or interacting with the hidden cores.

Optionally, the infrastructure program is further configured to utilize the first subset of the processing cores for secure key storage and management for encrypting and decrypting data transmitted via the CXL port. The apparatus may leverage the isolated environment provided by the hidden cores to perform sensitive cryptographic operations in a trusted execution domain. By confining key management operations—which may include key generation, storage, rotation, and destruction—to the hidden cores, the system may prevent user programs from accessing or tampering with cryptographic material. This embodiment may enhance the security of data-in-transit over the CXL fabric by potentially keeping encryption keys and cryptographic operations protected from potentially untrusted user environments, while also possibly enabling compliance with security standards that require physical separation of key management infrastructure.

The apparatus may further comprise a hardware-accelerated cryptographic engine, wherein the first subset of the processing cores is configured to utilize the hardware-accelerated cryptographic engine for performing at least part of the cryptographic operations on the data transmitted via the CXL port. The apparatus may implement a control/data plane separation for cryptographic operations, wherein hidden cores manage the control plane while dedicated hardware handles data plane processing. The hidden cores may orchestrate cryptographic operations by selecting appropriate keys, configuring the cryptographic engine with proper algorithms and modes, and enforcing security policies, while the hardware-accelerated engine may perform bulk encryption and decryption at line rate. This architectural division may enable the system to achieve high-throughput, low-latency data protection on the CXL interface without consuming excessive general-purpose processing resources, while potentially maintaining the security benefit of keeping key management isolated from user space.

The infrastructure program may be further configured to utilize the first subset of the processing cores for error handling and/or correction tasks within a memory pool comprising the apparatus and the memory in the CXL fabric. The apparatus may employ hidden cores as a reliability management subsystem that operates separately of user workloads. These cores may monitor memory health by performing background tasks such as patrol scrubbing to detect and correct single-bit and multi-bit errors before they potentially accumulate into uncorrectable errors. The infrastructure program may maintain error logs, implement advanced error correction schemes beyond standard ECC, and coordinate with memory controllers to handle error recovery procedures. By potentially isolating these reliability functions from user-visible cores, the system may support error handling operations to continue essentially uninterrupted regardless of user workload behavior.

The error handling and correction tasks may further comprise predictive failure analysis (PFA) operations configured to predict and handle imminent failure of memory components within the memory pool. The hidden cores may execute machine learning algorithms and statistical models to potentially anticipate memory failures before they occur. By analyzing error patterns, access latencies, temperature variations, and other telemetry data, the infrastructure program may identify memory components exhibiting pre-failure signatures. Upon detecting components likely to fail, the system may proactively migrate data to healthy memory regions and mark the at-risk components for replacement or decommissioning. This predictive capability may transform reactive error handling into proactive reliability management, potentially reducing the risk of data loss and unplanned downtime.

In some implementations, the infrastructure program is further configured to utilize the first subset of the processing cores for memory tiering tasks, including migration of data between different memory tiers in the CXL fabric based on access patterns of the data. The apparatus may implement an autonomous memory tiering system managed by hidden cores, potentially transparent to user applications. The infrastructure program may monitor memory access patterns using hardware performance counters and memory controller statistics to classify data as hot (frequently accessed), warm (moderately accessed), or cold (rarely accessed). Based on this classification, it may orchestrate data migration between memory tiers, potentially moving hot data to high-bandwidth, low-latency tiers such as HBM or DDR5, while relocating cold data to cost-effective, high-capacity tiers such as CXL-attached memory expanders or persistent memory. This dynamic optimization may occur without user intervention or awareness, potentially maximizing memory system performance while minimizing cost.

The infrastructure program may be further configured to utilize the first subset of the processing cores for controlling memory access scheduling to improve memory bandwidth utilization and reduce access latency in the CXL fabric. The hidden cores may function as an intelligent memory request arbitration system that potentially optimizes the scheduling of memory operations across the CXL fabric. The infrastructure program may evaluate incoming memory requests and implement scheduling algorithms that consider factors such as: potentially maximizing memory bank parallelism, optimizing row buffer hit rates, minimizing read-write turn-arounds, and enforcing QoS policies for different traffic classes. By potentially reordering and coalescing memory requests at the system level, the scheduler may improve effective memory bandwidth and reduce average access latency, particularly under mixed workload conditions.

The apparatus may further comprise CXL endpoints configured to enable the apparatus to function as a CXL Multi-Headed Device (MHD) capable of communicating with one or more hosts via the CXL fabric; and wherein the infrastructure program is further configured to manage memory allocation and access control for the coupled hosts. The apparatus may extend its architecture to support multiple simultaneous host connections utilizing a Multi-Headed Device configuration. The CXL endpoints may operate as interfaces that can be discovered and configured by possibly different host systems, potentially enabling the apparatus to function as a shared memory resource. The infrastructure program running on hidden cores may manage the complexity of multi-host coordination, potentially including partitioning memory resources among hosts, enforcing isolation boundaries between different hosts' memory regions, and implementing fair arbitration policies when hosts compete for memory bandwidth. This MHD capability may enable efficient memory pooling in datacenter environments where servers need to share a common memory resource.

The infrastructure program may be further configured to: dynamically allocate memory capacity to coupled hosts based on their respective memory demands; and adjust bandwidth allocation to CXL endpoints based on observed traffic patterns. The apparatus may implement intelligent resource management algorithms that monitor and potentially adapt to changing workload requirements across hosts. The infrastructure program may track memory usage patterns, bandwidth consumption, and/or request latencies for coupled hosts, potentially using telemetry to make dynamic allocation decisions. When one host experiences increased memory pressure, the system may automatically migrate unused memory capacity from underutilized hosts, potentially subject to configured minimum guarantees and maximum limits. Similarly, bandwidth allocation may be dynamically adjusted using weighted fair queuing or similar algorithms to potentially ensure that hosts with higher memory traffic receive proportionally more bandwidth while preventing any single host from monopolizing the memory subsystem.

The first subset of the processing cores may comprise hidden cores; and the infrastructure program is configured to allocate specific hidden cores to manage operations for specific hosts coupled to the CXL endpoints. The apparatus may implement a scalable management architecture wherein hidden cores can potentially be dedicated to specific hosts or CXL endpoints to support QoS and minimize interference. This per-host allocation model may allow the infrastructure program to run host-specific management tasks—such as encryption with host-specific keys, maintaining separate error logs, or implementing custom memory policies—in potentially isolated execution contexts. By possibly dedicating hidden cores to specific hosts, the system may support a more consistent performance and security isolation, which is particularly valuable in multi-tenant cloud environments wherein different hosts may belong to different security domains or have different service level agreements.

Additionally, the infrastructure program may be further configured to utilize the first subset of the processing cores for collecting and analyzing memory telemetry data, comprising one or more of: memory access patterns, error rates and locations, temperature measurements, or bandwidth utilization statistics. The hidden cores may operate a telemetry collection system that potentially gathers detailed operational metrics from across the memory subsystem. The infrastructure program may interface with memory controllers, thermal sensors, and/or performance monitoring units to collect raw telemetry data, then potentially process this information to generate actionable insights. The collected metrics may enable advanced memory management features such as predictive maintenance, performance optimization, and capacity planning. By potentially running telemetry collection on hidden cores, the system may support monitoring overhead to essentially not impact user application performance and that sensitive operational data remains isolated from user access.

The infrastructure program may be further configured to utilize the first subset of the processing cores for processing CXL Fabric Manager (FM) Application Programming Interface (API) requests, comprising one or more of: device discovery and enumeration, memory allocation and deallocation, Quality-of-Service (QoS) configuration, or error reporting and statistics gathering. The hidden cores may implement a CXL Fabric Manager interface to manage the CXL memory resources. The infrastructure program may process FM API commands received over management channels, potentially translating high-level management requests into low-level hardware operations, which may include handling device capability reporting, configuring memory interleaving across devices, setting up QoS parameters for different traffic classes, and/or providing detailed statistics to fabric management software. By potentially implementing FM API processing on hidden cores, the apparatus may support management operations to remain isolated from user workloads and that management traffic does not interfere with data plane performance.

Furthermore, the infrastructure program may be further configured to utilize the first subset of the processing cores for coordinating processing-in-memory (PIM) operations, comprising one or more of: scheduling PIM commands from requestors, managing PIM execution resources, or ensuring coherency between PIM operations and normal memory accesses. The apparatus may leverage hidden cores to orchestrate processing-in-memory operations that potentially execute computational tasks directly within or near the memory arrays. The infrastructure program may manage PIM resources by scheduling commands from sources, preventing resource conflicts, and supporting PIM operations to not violate memory consistency models. This may include implementing barriers and synchronization primitives to coordinate between PIM operations and traditional load/store accesses, managing the allocation of PIM execution units among competing requests, and handling the movement of computation results back to requesting hosts.

The infrastructure program may also be further configured to utilize the first subset of the processing cores for housekeeping tasks, comprising one or more of: garbage collection for memory pools, metadata management and optimization, background data compression and deduplication, or memory defragmentation operations. The hidden cores may execute maintenance operations that potentially optimize memory utilization and performance over time. The infrastructure program may perform garbage collection to reclaim memory from deallocated objects, maintain and optimize metadata structures such as address translation tables, and/or potentially implement background data reduction techniques including compression and deduplication to increase effective memory capacity. Additionally, it may perform periodic defragmentation to consolidate free memory regions and potentially reduce fragmentation-induced performance degradation. These housekeeping tasks may run in the background on hidden cores, potentially supporting the memory system to maintain peak efficiency without impacting foreground user applications.

The apparatus may further comprise a Cache-Coherent Chip-to-Chip Interconnect (CCCI) port configured to be coupled to an external entity; and a protocol translation unit configured to translate between CXL protocol messages used to access the memory and CCCI protocol messages used by the external entity; and wherein the CCCI port utilizes a protocol based on: an Intel Coherent Processor Interconnect Protocol (ICPIP) for scalable multiprocessors with a shared physical address space, Coherent Hub Interface chip-to-chip (CHI C2C), External Global Memory Interconnect (xGMI), Infinity Fabric, or NVLink chip-to-chip (NVLink-C2C). Examples of ICPIP include Intel's QPI, UPI, KTI, UXI, and future Intel's Coherent Processor Interconnect Protocols. The apparatus may implement a protocol bridge that potentially enables entities using different coherent interconnect standards to access CXL-attached memory resources. The protocol translation unit may perform message format conversion, address space mapping, and coherency state translation between CXL and the specific CCCI protocol. For example, when translating from UPI to CXL, the unit may convert UPI coherency messages into corresponding CXL.cache transactions while potentially maintaining cache line states and ensuring proper ordering. This translation capability may enable heterogeneous systems wherein processors using different native interconnects can potentially share memory resources through the CXL fabric, facilitating integration of diverse computing architectures in datacenter environments.

The apparatus may further comprise an NVLink port configured to be coupled to a graphics processing unit (GPU); and a protocol translation unit configured to translate between: CXL.mem protocol messages used to access the memory in the CXL fabric, and NVLink-based protocol messages used by the GPU to request memory operations. The apparatus may enable NVIDIA GPUs to access CXL-attached memory by implementing a specialized protocol bridge between NVLink and CXL domains. The protocol translation unit may handle the conversion of NVLink memory requests, which may include specific GPU memory access patterns and atomic operations, into corresponding CXL.mem transactions. This may include translating NVLink's memory addressing scheme to CXL's host physical addresses, converting between different transaction identifiers and tags, and potentially ensuring proper completion of GPU-initiated memory operations. The translation may enable GPUs to leverage large CXL memory pools for applications potentially requiring memory capacity beyond local GPU memory limits.

In certain aspects, the apparatus may further comprise protocol ports comprising at least two different protocols selected from: PCIe, UCIe, UALink, NVLink, Ethernet, or Ultra Ethernet Transport (UET); a protocol translation unit configured to translate between the CXL protocol used to access the memory and the different protocols used by entities coupled to the protocol ports; and wherein the infrastructure program coordinates memory access requests from entities using different protocols. The apparatus may function as a multi-protocol memory gateway that potentially provides access to CXL memory resources from entities using diverse interconnect standards. The protocol translation unit may implement a common internal representation for memory transactions, potentially converting between this representation and native formats of the supported protocols. The hidden cores running the infrastructure program may perform high-level coordination tasks such as arbitrating between requests from different protocols, enforcing QoS policies across protocol boundaries, and managing protocol-specific features like error handling and flow control. This multi-protocol capability may enable the construction of heterogeneous computing systems wherein processors, accelerators, and/or other devices using different native interconnects can potentially share a common memory pool efficiently.

In one embodiment, an apparatus comprises: processing cores integrated within the apparatus; a Compute Express Link (CXL) port; a partitioning controller configured to partition the processing cores to first and second subsets of the processing cores; wherein the first subset of the processing cores is configured to execute a Special-Purpose Operating System (SPOS) that supports execution of a first program configured to manage memory in a CXL fabric coupled to the CXL port; and wherein the second subset of the processing cores is configured to execute a General-Purpose Operating System (GPOS) configured to execute a second program configured to utilize a portion of the memory managed by the first program.

Optionally, the first program that manages the memory in the CXL fabric enables at least one of: memory pooling, memory sharing, dynamic capacity device, or software-managed coherency. The partitioning controller may be further configured to isolate the first subset of processing cores from the second subset of processing cores, the first program enables memory pooling, and the second program is a user-controlled program. The partitioning controller may comprise a Type 1 hypervisor configured to allocate the first subset of processing cores to a first virtual machine (VM) running the SPOS, and further configured to allocate the second subset of processing cores to a second VM running the GPOS; and wherein the first program enables memory pooling, and the Type 1 hypervisor is further configured to utilize the memory pooling to provide memory resources for the second VM. In some implementations, the partitioning controller comprises a Type 2 hypervisor running on a host operating system, the Type 2 hypervisor configured to allocate the first subset of processing cores to a first VM running the SPOS, and further configured to allocate the second subset of processing cores to a second VM running the GPOS. The first program may enable memory pooling, and the partitioning controller may comprise a hardware partitioning unit enabling the SPOS to access the CXL port to provide the memory pooling, while preventing access to the CXL port by the second subset of processing cores. Additionally, the first program may enable memory pooling, and the partitioning controller may comprise a firmware configuration configured to disable the second subset of processing cores from accessing the CXL port; whereby reserving access to the CXL port for the first subset of processing cores running the SPOS improves security level of the memory pooling. The first program may also enable memory pooling, and the partitioning controller may comprise a custom CPU architecture with built-in support for CXL-based partitioning and isolation, enabling the SPOS running on the first subset of processing cores to manage the CXL port and to provide the memory pooling to the GPOS running on the second subset of processing cores.

Furthermore, the SPOS may be configured to be stored on at least one of the following: system firmware, a first storage that is different from a second storage used to store the GPOS, or on a first partition on a storage device that is different from a second partition on the storage device that stores the GPOS. The CXL port may comprise a CXL Endpoint configured to provide interconnect for memory access between the SPOS and an external host, without requiring a CXL switch to couple between the apparatus and the external host. Alternatively, the CXL port may comprise a CXL Root Port (RP), the GPOS is selected from a LINUX OS or a Windows OS, the GPOS is configured to utilize the CXL RP to access a CXL memory device, and the SPOS is selected from an embedded OS, a real-time OS (RTOS), or bare-metal programming. The first and second subsets of processing cores may be included in a Modified CPU or GPU (MxPU); and wherein, in addition to the processing cores, the MxPU comprises memory channels, a memory management unit (MMU), and a resource provisioning unit (RPU) configured to translate physical addresses within an external host physical address (HPA) space to physical addresses within a local HPA space utilized by the processing cores. In certain aspects, the first and second subsets of the processing cores are non-empty and disjoint, and the processing cores utilize the same host physical address (HPA). The apparatus may further comprise a CXL Root Port (RP); and wherein the processing cores and the CXL RP are coupled to the same coherent interconnect and/or inter-socket link (ISoL). Different stock keeping units (SKUs) may be defined based on different combinations of quantities of processing cores in the first and second subsets, and the partitioning controller is further configured to partition the processing cores to the first and second subsets to enable implementation of different SKUs. The partitioning controller may also be further configured to dynamically partition the processing cores between the first and second subsets based on at least one of workload demands, power consumption, thermal constraints, Quality-of-Service (QoS) requirements, service level agreements (SLAs), security policies, user-defined preferences, or a combination thereof; whereby the dynamic partitioning can result in improving resource allocation and system performance. The apparatus may be a semiconductor device, and the CXL fabric comprises at least two active CXL links.

In one embodiment, a method comprises: partitioning processing cores integrated within a semiconductor device to first and second subsets of the processing cores; executing, by the first subset of the processing cores, a Special-Purpose Operating System (SPOS) that executes a first program that manages memory in a Compute Express Link (CXL) fabric coupled to a CXL port of the semiconductor device; and executing, by the second subset of the processing cores, a General-Purpose Operating System (GPOS) that executes a second program that utilizes a portion of the memory managed by the first program.

In one embodiment, an apparatus comprises: processing cores integrated within the apparatus; a Compute Express Link (CXL) port; a partitioning controller configured to partition the processing cores to first and second subsets of the processing cores based on at least one of: CXL configurations, CXL bandwidth requirements, workload demands related to CXL memory access, quality-of-service requirements for CXL transactions, security policies for CXL data protection, or user-defined CXL preferences; wherein the first subset of the processing cores is configured to execute a Special-Purpose Operating System (SPOS) that supports execution of a first program configured to manage memory in a CXL fabric coupled to the CXL port; and wherein the second subset of the processing cores is configured to execute a General-Purpose Operating System (GPOS) configured to execute a second program configured to utilize a portion of the memory managed by the first program.

Optionally, the partitioning controller is further configured to partition the processing cores based on CXL latency constraints, wherein the CXL latency constraints are determined by monitoring CXL transaction latencies and adjusting the partition to make that latencies remain within predetermined thresholds. The partitioning controller may be further configured to partition the processing cores based on CXL latency measurements monitored at the CXL port, wherein latency measurements exceeding a predetermined threshold trigger an adjustment in the partition of the processing cores between the first and second subsets to reduce CXL transaction latency and improve overall system responsiveness. In one example, the partitioning controller monitors the CXL latency measurements at the CXL port. When the latency measurements exceed a predetermined threshold, indicating a potential bottleneck in CXL transaction processing, the partitioning controller adjusts the partition of the processing cores between the first and second subsets. Optionally, it allocates additional processing cores to the first subset, which is responsible for executing the SPOS and handling CXL transactions. By increasing the number of processing cores in the first subset, the apparatus can distribute the CXL workload across more cores, enabling parallel processing and faster completion of the CXL transactions. This adjustment of the processing core partition based on CXL latency measurements may allow the apparatus to reduce overall CXL transaction latency and improve system responsiveness.

The partitioning controller may be further configured to partition the processing cores based on CXL bandwidth requirements monitored at the CXL port, wherein bandwidth requirements exceeding a predetermined threshold trigger an adjustment in the partition of the processing cores between the first and second subsets to make sufficient bandwidth for CXL transactions. In one example, the partitioning controller monitors the CXL bandwidth requirements at the CXL port. When the bandwidth requirements exceed a predetermined threshold, indicating a need for higher data transfer capacity, the partitioning controller may adjust the partition of the processing cores between the first and second subsets. In such scenarios, additional memory channels may be activated to accommodate the increased bandwidth demand. Activating additional memory channels typically requires additional computation capacity, which may require adding one or more processing cores to manage the CXL data flow and maintain the required performance. Consequently, the partitioning controller may allocate additional processing cores to the first subset, which is responsible for executing the SPOS and handling CXL transactions. The increased number of processing cores can help preventing bandwidth bottlenecks and maintaining high-speed data transfer.

The partitioning controller may be further configured to partition the processing cores based on CXL throughput measurements monitored at the CXL port, wherein throughput measurements falling below a predetermined threshold trigger an adjustment in the partition of the processing cores between the first and second subsets to increase CXL data transfer efficiency and improve system performance. In some implementations, the partitioning controller is further configured to partition the processing cores based on CXL error handling, wherein the partition is adjusted in response to detecting CXL errors, and the first and second subsets are reconfigured to isolate source of errors and/or to separate affected components from properly functioning components. The partitioning controller may also be further configured to partition the processing cores based on CXL error rates monitored at the CXL port, wherein error rates exceeding a predetermined threshold trigger an adjustment in the partition of the processing cores between the first and second subsets to isolate source of errors and maintain the integrity of CXL transactions. Furthermore, the partitioning controller may be further configured to partition the processing cores based on CXL power management configured to improve power consumption by allocating processing cores to the first and second subsets as a function of CXL power states. The partitioning controller may be further configured to partition the processing cores based on CXL power consumption monitored at the CXL port, wherein power consumption exceeding a predetermined threshold triggers an adjustment in the partition of the processing cores between the first and second subsets to improve power usage while maintaining performance of CXL transactions.

Additionally, the partitioning controller may be further configured to partition the processing cores based on CXL topology discovery and CXL device enumeration, wherein the partition is adjusted to improve utilization of the discovered CXL devices and their associated memory configurations. The partitioning controller may be further configured to enforce security policies for data protection during CXL transactions by designating a subset from the first subset of the processing cores for processing secure or sensitive CXL data transactions; and the designated subset operates in a secure mode that isolates its memory and execution from the other processing cores in the first subset, thereby preventing unauthorized data access and enhancing data integrity. The partitioning controller may be further configured to partition the processing cores based on CXL performance metrics monitored at the CXL port; wherein the CXL performance metrics exceeding a predetermined threshold trigger an increase in number of processing cores allocated to the first subset. This core partitioning enables the apparatus to adapt its computational resources to maintain efficient CXL performance metrics. The CXL performance metrics may include metrics such as CXL bandwidth requirements, CXL latency measurements, CXL throughput, CXL error rates, and/or CXL power consumption. The partitioning controller may be configured to monitor one or more of these performance metrics at any suitable point within the CXL system, such as the CXL port. When any of the monitored performance metrics exceed a predetermined threshold, which may be set based on factors such as system requirements, workload characteristics, and/or user preferences, it may indicate that the current partition of the processing cores to the first subset (running the SPOS) may not be sufficient to handle the CXL workload. In response, the partitioning controller may adjust the partition of the processing cores between the first and second subsets, potentially increasing the number of processing cores allocated to the first subset to increase the system computational resources to process CXL transactions efficiently, maintain low latency, achieve high throughput, reduce error rates, and/or optimize power consumption.

The apparatus may further comprise a CXL Root Port (RP), wherein the partitioning controller is further configured to partition the processing cores based on CXL performance metrics monitored at the CXL RP; wherein the CXL performance metrics exceeding a predetermined threshold trigger an increase in number of processing cores allocated to the second subset. In certain aspects, the partition of the processing cores to the first and second subsets is performed during at least one of booting of the apparatus or operation of the apparatus. The first and second subsets of processing cores may be included in a Modified CPU or GPU (MxPU);

and wherein, in addition to the processing cores, the MxPU comprises memory channels, a memory management unit (MMIU), and a resource provisioning unit (RPU) configured to translate physical addresses within an external host physical address (HPA) space to physical addresses within a local HPA space utilized by the processing cores. Furthermore, the first and second subsets of the processing cores may be non-empty and disjoint, and the processing cores utilize the same host physical address (HPA).

In one embodiment, a method comprises: partitioning processing cores integrated within a semiconductor device to first and second subsets of the processing cores based on at least one of: Compute Express Link (CXL) configurations, CXL bandwidth requirements, workload demands related to CXL memory access, quality-of-service requirements for CXL transactions, security policies for CXL data protection, or user-defined CXL preferences; executing, by the first subset of the processing cores, a Special-Purpose Operating System (SPOS) that executes a first program that manages memory in a CXL fabric coupled to a CXL port of the semiconductor device; and executing, by the second subset of the processing cores, a General-Purpose Operating System (GPOS) that executes a second program that utilizes at least a portion of the memory managed by the first program.

In one embodiment, an apparatus comprises: processing cores integrated within the apparatus; a Compute Express Link (CXL) port; wherein a first subset of the processing cores is configured to execute a first Operating System (OS) that supports execution of a first program configured to manage memory in a CXL fabric coupled to the CXL port; wherein a second subset of the processing cores is configured to execute a second OS configured to execute a second program configured to utilize a portion of the memory managed by the first program; and a resource provisioning unit (RPU) configured to disable at least one processing core from the first subset of processing cores based on power consumption related to the CXL fabric.

Optionally, the apparatus may be an MxPU, and the RPU of the MxPU may implement a power management mechanism designed to reduce power consumption by controlling the operational state of processing cores within the first subset of cores that execute the vendor-controlled OS (OS1). The first subset may have one or more of its cores disabled temporarily or permanently based on various operational and environmental factors. Optionally, the RPU monitors power consumption indicators, such as spikes in power usage during intense memory operations at the MxPU level or within the associated memory pool system. When these indicators exceed predetermined thresholds, the RPU may temporarily suspend code execution on the affected cores to maintain power consumption within a configured power budget. This suspension is dynamic, allowing for the temporary disabling of cores during runtime. Once the power levels stabilize and fall below the threshold, the RPU may re-enable these cores, resuming normal operations. Furthermore, the RPU may also be configured to disable cores in a more static manner. This longer-term disabling may last until the next reset or reboot of the MxPU, contributing to a lower power consumption profile for the MxPU. This approach is particularly useful in scenarios wherein the MxPU is intended to operate as a lower-power variant, either to satisfy specific customer requirements or to align with stricter power consumption targets.

Additionally or alternatively, in configurations wherein new memory resources may be added dynamically (hot-plugging), the RPU may evaluate, continuously or intermittently, the expected power consumption based on the current and anticipated memory utilization. Based on this analysis, it may proactively disable cores to free up the power budget necessary to support these additional resources without exceeding the overall power limits of the system. In certain configurations, the power supply to the disabled cores may be completely shut down, further reducing power consumption and possibly also enhancing the overall efficiency of the MxPU. Additionally or alternatively, the CPU vendor or memory pool system vendor may configure the RPU to permanently disable at least one of the cores belonging to the first subset. This permanent disabling is done to align the MxPU power consumption to system power targets, also based on the nominal amounts and/or types of memory resources supported by the MxPU or the memory pool system, and/or to differentiate the MxPU from established CPUs while maintaining compatibility with established/existing architectures. These capabilities allow the MxPU to adapt its performance and power usage dynamically, supporting both operational flexibility and energy efficiency.

Optionally, the first OS is a Special-Purpose Operating System (SPOS), the first program is hidden from a user of the CXL fabric, the second OS is General-Purpose Operating System (GPOS), the second program is user-controlled, and whereby the disable of the at least one processing core from the first subset is performed to reduce power consumption. The RPU may be configured to disable temporarily the at least one processing core from the first subset during run-time by triggering a suspension of code execution on the at least one processing core based on power consumption indicators exceeding a predetermined power budget. In such a case, the RPU may be further configured to re-enable the at least one processing core when the power consumption indicators provide sufficient power budget to resume code execution on the at least one processing core. In other implementations, the RPU is configured to disable the at least one processing core from the first subset until a next apparatus reset or until a next system reboot. The RPU may be further configured to shut down power supply to the at least one disabled processing core to achieve higher power reduction. Additionally, the RPU may be further configured to monitor and estimate expected power consumption of the apparatus and/or a memory pool system based on an amount of memory resources populated, and to disable the at least one processing core from the first subset to reclaim additional power budget to support the memory resources populated. The RPU may also be further configured to monitor and estimate expected power consumption and to statically disable one or more processing cores from the first subset based on volume and type of memory resources populated and additional memory resources that are hot-plugged during operation. In certain aspects, the RPU is configured to disable permanently the at least one processing core from the first subset to align power consumption of the apparatus to system power targets based on nominal amounts and types of memory resources supported by the apparatus or a memory pool system. The RPU may also be configured to disable permanently the at least one processing core from the first subset to create a lower-power variant of the apparatus, whereby the permanent disabling aligns the power consumption of the apparatus with system power targets.

The RPU may be further configured to perform periodic testing of processing cores from the first subset during run-time, wherein the at least one processing core from the first subset failed the periodic testing. Optionally, the RPU may implement a core management approach aimed at enhancing the reliability and/or yield of the MxPU. During the manufacturing process, processing cores within the first subset, which are controlled by the vendor-specific OS and are hidden from the user, undergo validation testing. Cores that fail this testing are recorded in a list, which can be stored on-chip or off-chip. Post-manufacture, as the MxPU logic is initialized from a reset state, the list is provided to the RPU, enabling it to further disable the failed cores from the first subset, thereby preventing them from participating in computational activities.

Additionally, the RPU may trigger periodic testing of cores from the first subset during runtime. If any cores fail the periodic testing, the RPU disables them. The RPU may further store these runtime failed cores in a list to keep them disabled also after the next MxPU reset. Disabling failed cores improves the effective manufacturing yield of the MxPU. By identifying, isolating, and disabling failed cores, the MxPU can continue to function correctly. Otherwise, if not disabled, a single failed core would render the entire MxPU device as failed, decreasing the effective manufacturing yield. This core management may also increase the reliability and resiliency of the MxPU, and may have value because cores from the first subset are not exposed to the user, therefore the user is unable to test the functional correctness of these cores and take actions to rectify functional anomalies in their behavior. The RPU's ability to disable failed cores, both during manufacturing and runtime, can improve the MxPU reliability even in the presence of core failures.

The RPU may be further configured to store, in a non-volatile memory, a list of the processing cores from the first subset that failed the periodic testing during run-time, and to keep the failed processing cores disabled after a next reset of the apparatus. In other implementations, the RPU is further configured to disable processing cores from the first subset that failed validation testing during manufacturing stages of the apparatus. In this case, a list of the processing cores that failed validation testing may be stored on-chip or off-chip and is provided to the RPU after the apparatus is released from a reset state; and wherein the RPU is further configured to disable the processing cores from the first subset based on the list. The apparatus may also be a semiconductor device, and the CXL fabric comprises at least two active CXL links.

In one embodiment, a method comprises: executing, by a first subset of processing cores integrated within a semiconductor device, a first Operating System (OS) that executes a first program that manages memory in a Compute Express Link (CXL) fabric coupled to a CXL port of the semiconductor device; executing, by a second subset of the processing cores, a second OS that executes a second program that utilizes at least a portion of the memory managed by the first program; and disabling, by a resource provisioning unit (RPU), at least one processing core from the first subset of processing cores based on power consumption related to the CXL fabric.

In one embodiment, an apparatus comprises: processing cores integrated within the apparatus; a Compute Express Link (CXL) port; wherein a first subset of the processing cores is configured to execute a first Operating System (OS) that supports execution of a first program configured to manage memory in a CXL fabric coupled to the CXL port; wherein a second subset of the processing cores is configured to execute a second OS configured to execute a second program configured to utilize a portion of the memory managed by the first program; and a resource provisioning unit (RPU) configured to disable at least one processing core from the first subset of processing cores to maintain performance within parameters specified by a service level agreement (SLA).

Optionally, the apparatus may be an MxPU, and the RPU of the MxPU may be configured to disable at least one core from the first subset to adjust the processing capabilities of the MxPU to provide different Memory Service Level Agreements (Mem-SLAs). These Mem-SLAs may include adjusting to support memory resources up to a predetermined capacity at the MxPU device level or at the system level, adjusting to support only specific types of memory technologies, or adjusting to support different memory reliability and availability levels. The SLA (which may also be referred to as predetermined SLA) may support memory resources up to a predetermined capacity at the apparatus level or at the system level. The SLA may include criteria for supporting memory resources up to a predetermined capacity, which can be adjusted based on factors such as the type of memory technology employed, the production grade of memory components, and/or environmental parameters such as natural radiation levels, to improve memory reliability and availability at the apparatus level or system level.

The SLA can also be configured to help the memory managed by the first program to meet a predetermined capacity at either the device level or the system level, which may include implementing periodic scanning of memory for errors to maintain data integrity. The RPU may be further configured to execute maintenance tasks necessary for preserving the predetermined memory capacity and performance level. Additionally, the SLA may support predetermined types of memory technologies, such as DRAM, non-volatile memory, or emerging memory technologies. It can also support different memory reliability and availability levels. As an example, when more memory resources are populated, the infrastructure processing capabilities that the MxPU is required to provide grow accordingly, since more maintenance and housekeeping work is needed to support the larger memory capacity. Optionally, such maintenance work may include periodic scanning of memory for errors, wherein memory cells are scanned at a minimum frequency determined by factors such as the memory technology, the production grade of the memory component, and/or environmental parameters such as natural radiation levels that may cause bit flips within memory components.

When more memory is populated, more maintenance and housekeeping work is needed, and hence more MxPU cores are required to maintain that minimum scanning frequency. The RPU can be configured to determine the number of processing cores from the first subset to be left available for running maintenance and housekeeping tasks related to the CXL fabric, based on a target memory-SLA reliability and availability level and periodic memory error scans to improve compliance with the target memory-SLA. Additionally, configuring the RPU to disable cores from the first subset determines the number of cores left available for running maintenance and housekeeping tasks related to the CXL fabric, and hence also determines the maximum memory capacity that can be supported by the MxPU at a certain Mem-SLA reliability and availability level.

The RPU may be further adjust of the number of disabled processing cores from the first subset during runtime to adapt to changing workloads and/or memory requirements to achieve the SLA. The adjustment may be based on real-time monitoring of performance metrics, error rates, or power consumption. The RPU may determine the number of processing cores to disable based on the SLA level and the current system configuration. Optionally, the RPU can also adjust the number of disabled processing cores in the first subset in response to changes in power consumption metrics and/or thermal profiles, as dictated by energy efficiency requirements detailed in the SLA. This adjustment in core activity can help align with sustainability targets and operational efficiency. Additionally, the CPU vendor or memory pool system vendor may configure the RPU to disable at least one of the cores from the first subset to adjust the processing capabilities of the MxPU to target different Mem-SLA levels, or to differentiate the MxPU from established CPUs while maintaining compatibility with established architectures.

Optionally, the SLA supports memory resources up to a predefined maximum capacity at a device level or at system level. The SLA may include criteria for supporting memory resources up to a predefined maximum capacity, which is adjusted based on factors comprising one or more of: type of memory technology employed, production grade of memory components, or natural radiation levels, to improve memory reliability and availability at the apparatus level or system level. The SLA may be configured to direct the memory managed by the first program to meet a predetermined capacity at either the apparatus level or system level, which comprises implementing periodic scanning of memory for errors to maintain data integrity. The RPU may be further configured to execute maintenance tasks necessary for preserving the predetermined capacity and performance level. The SLA may support at least one of the following: only predetermined types of memory technologies, or different memory reliability and availability levels. Examples of predetermined types of memory technologies may include DRAM, non-volatile memory, or emerging memory technologies. The RPU may be further configured to determine a number of processing cores from the first subset to be left available for running maintenance and housekeeping tasks related to the memory managed by the first program based on (i) a target memory-SLA reliability and availability level, and (ii) periodic memory error scans to verify compliance with the target memory-SLA. The RPU may be further configured to perform adjustment of number of the disabled processing cores from the first subset during runtime to adapt to changing workloads and/or memory requirements to achieve the SLA; wherein the adjustment is based on at least one of the following: real-time monitoring of performance metrics, error rates, or power consumption. The RPU may be further configured to determine the number of the disabled processing cores based on the SLA level and a current system configuration. The RPU may adjust the of the disabled processing cores in the first subset in response to changes in power consumption metrics and thermal profiles, as dictated by energy efficiency requirements detailed in the SLA. This adjustment in core activity can help aligning with sustainability targets and operational efficiency.

Optionally, the MxPU's RPU is configured to disable at least one core from the first subset to align the processing capabilities of the MxPU to provide different Service Level Agreements (SLAs) at different granularities, such as Host-level, Port-level, Tenant-level, Virtual Machine-level (VM-level), or Process-level. This allows the MxPU to adapt its resource allocation and performance characteristics to meet the specific requirements of different users, applications, and/or system components.

Optionally, the MxPU may provide different Read-Performance SLAs for Multi-Level flash memory resources deployed in a memory pool system. Multi-Level flash memory technologies, such as triple-level cell (TLC) or quad-level cell (QLC), store multiple bits per cell by using different threshold voltage levels (Vth) to represent different bit combinations. However, data stored in these flash memory cells can deteriorate over time due to various factors, including leakage of electrons from the cell's charge trap (retention loss). This deterioration causes the cell's read threshold voltage (Vth) to shift, resulting in a higher rate of read errors. To mitigate these errors, a technique called Read-Retry can be employed, which includes repeatedly reading the data stored in a cell using different Vth levels until a near-optimal Vth is found that reduces the number of errors to an acceptable level that can be tolerated by the error-correcting circuitry of the flash memory. However, dense flash technologies like TLC or QLC may require dozens of Read-Retry cycles to achieve a successful read, increasing the read latency and decreasing the effective performance of the memory resource. This, in turn, can impact the performance of the workload using that memory resource.

In order to increase the effective performance of the flash memory, the Read-Retry process for finding a near-optimal Vth can be executed periodically in the background (off-line) by cores from the first subset. These cores scan through memory regions associated with SLA profiles that determine the priority and frequency of the scanning. The cores within the first subset execute the Read-Retry process and record the optimal Vth value found for each group of cells (e.g., page). By doing so, the next workload read from cells in that group can achieve lower read latency and higher performance, as the optimal Vth value is already known.

The amount of processing work that cores within the first subset are required to perform increases with several factors, including: (i) The amount of flash memory populated. More flash memory requires more scanning and Read-Retry operations, (ii) The density of the flash technology. Higher-density technologies like QLC require more Read-Retry cycles compared to lower-density technologies like TLC, and (iii) The frequency of scanning requested. Higher scanning frequencies lead to more up-to-date optimal Vth values but also require more processing work.

The scanning frequency may be determined by the SLA profiles associated with the memory regions. Higher service-grade SLA profiles may provide more frequent scanning of the flash cells to cause lower read latencies and higher performance. Cores from the first subset are allocated for this task based on the SLA profiles, with more cores assigned to higher service-grade profiles. Optionally, SLA profiles may be defined with specific scanning frequencies and performance targets for the Read-Retry process; these profiles can be associated with different memory regions, allowing for fine-grained control over the performance characteristics of the flash memory. Additionally, the RPU may dynamically adjust the number of cores from the first subset allocated for the Read-Retry process based on real-time workload requirements and performance metrics; by monitoring read latency and throughput of the Multi-Level flash memory resources, the RPU can allocate additional cores for the Read-Retry process when the performance falls below a predetermined threshold.

Optionally, the SLA may be defined at one of the following granularities: Host-level, Port-level, Tenant-level, Virtual Machine-level, or Process-level. In some implementations, the CXL fabric may comprise Multi-Level flash memory resources, and the RPU is further configured to allocate processing cores from the first subset to execute a Read-Retry process periodically in the background to find optimal read threshold voltage values for the Multi-Level flash memory resources. The processing cores within the first subset may execute the Read-Retry process and record the optimal threshold voltage value found per different groups of cells in the Multi-Level flash memory resources, enabling lower read latency and higher performance for subsequent workload reads from the cells in that group. The number of processing cores from the first subset allocated for the Read-Retry process may be based on factors comprising amount of flash memory populated, density of the flash technology, and frequency of scanning requested. The Read-Retry process may scan through memory regions associated with SLA profiles that determine priority and frequency of the scanning, wherein the SLA profiles define specific scanning frequencies and performance targets for the Read-Retry process. Higher service-grade SLA profiles may provide more frequent scanning of the flash memory cells to achieve lower read latency and higher performance. The RPU may be further configured to dynamically adjust number of processing cores from the first subset allocated for the Read-Retry process based on real-time workload requirements and performance metrics. The RPU may monitor read latency and throughput of the Multi-Level flash memory resources and allocates additional processing cores for the Read-Retry process when the performance falls below a predetermined threshold. The apparatus may be a semiconductor device, and the CXL fabric comprises at least two active CXL links.

In one embodiment, a method comprises: executing, by a first subset of processing cores integrated within a semiconductor device, a first Operating System (OS) that executes a first program that manages memory in a Compute Express Link (CXL) fabric coupled to a CXL port of the semiconductor device; executing, by a second subset of the processing cores, a second OS that executes a second program that utilizes at least a portion of the memory managed by the first program; and disabling, by a resource provisioning unit (RPU), at least one processing core from the first subset of processing cores to maintain performance within parameters specified by a service level agreement (SLA).

In one embodiment, a method for translating from UALink Protocol Level Interface (UPLI) Requests to Compute Express Link (CXL) requests comprises: communicating with a first entity according to UPLI; communicating with a second entity according to CXL.mem; receiving, from the first entity, UPLI Request (Req) comprising a read command and a second physical address; translating the UPLI Req to CXL.mem Master-to-Subordinate Request comprising: a MemRd* opcode, and a first physical address (CXL.mem M2S Req MemRd*); and sending the CXL.mem M2S Req MemRd* to the second entity. Optionally, the UPLI Req further comprises a ReqSrcPhysAccID field, a ReqDstPhysAccID field, a ReqLen field, and a ReqTag field; and further comprising translating the ReqTag to a Tag associated with the CXL.mem M2S Req. The UPLI Req may comprise a ReqAddr field comprising the second physical address, and further comprises a ReqCmd field comprising the read command. The UPLI Req read command may comprise a read class vendor defined command. In some implementations, the second entity comprises a CXL device, and the first physical address is a host physical address (HPA) associated with the RPU. In such cases, the CXL device may comprise a Global Fabric-Attached Memory (G-FAM) Device (GFD).

In one embodiment, a method for translating from UALink Protocol Level Interface (UPLI) Requests to Compute Express Link (CXL) requests comprises: communicating with a first entity according to UPLI; communicating with a second entity according to CXL.cache; receiving, from the first entity, UPLI Request (Req) comprising a read command and a second physical address; translating the UPLI Req to CXL.cache Device-to-Host Request (D2H Req) comprising: a read opcode, and a first physical address (CXL.cache D2H Req); and sending the CXL.cache D2H Req to the second entity. Optionally, the UPLI Req further comprises a ReqSrcPhysAccID field, a ReqDstPhysAccID field, a ReqLen field, and a ReqTag field; and further comprising translating the ReqTag to a Command Queue ID (CQID) associated with the CXL.cache D2H Req. The UPLI Req may comprise a ReqAddr field comprising the second physical address, and further comprises a ReqCmd field comprising the read command. The UPLI Req read command may comprise a read class vendor defined command. The CXL.cache D2H Req read opcode may comprise is selected from RdCurr, RdOwn, RdShared, or RdAny. Furthermore, the second entity may comprise a host, and the first physical address is a host physical address.

In one embodiment, a method for translating from UALink Protocol Level Interface (UPLI) Requests to Compute Express Link (CXL) requests comprises: communicating with a first entity according to UPLI; communicating with a second entity according to CXL.io; receiving, from the first entity, UPLI Request (Req) comprising a read command and a second physical address; translating the UPLI Req to CXL.io Transaction Layer Packet (TLP) comprising: a first physical address, a tag field, and a length field; and sending the CXL.io TLP to the second entity. Optionally, the UPLI Req further comprises a ReqSrcPhysAccID field, a ReqDstPhysAccID field, a ReqLen field, and a ReqTag field; and further comprising translating the ReqTag to a tag associated with the CXL.io TLP. The UPLI Req may comprise a ReqAddr field comprising the second physical address, and further comprises a ReqCmd field comprising the read command. The UPLI Req read command may comprise a read class vendor defined command. In certain aspects, the CXL.io TLP comprises UIO Memory Read Request (UIOMRd) TLP. Alternatively, the CXL.io TLP may comprise Memory Read Request (MRd) TLP.

In one embodiment, a method for translating from UALink Protocol Level Interface (UPLI) Requests to Peripheral Component Interconnect Express (PCIe) requests comprises: communicating with a first entity according to UPLI; communicating with a second entity according to PCIe; receiving, from the first entity, UPLI Request (Req) comprising a read command and a second physical address; translating the UPLI Req to PCIe Transaction Layer Packet (TLP) comprising: a first physical address, a tag field, and a length field; and sending the PCIe TLP to the second entity. Optionally, the UPLI Req further comprises a ReqSrcPhysAccID field, a ReqDstPhysAccID field, a ReqLen field, and a ReqTag field; and further comprising translating the ReqTag to a tag associated with the PCIe TLP. The UPLI Req may comprise a ReqAddr field comprising the second physical address, and further-comprises a ReqCmd field comprising the read command. The UPLI Req read command may comprise a read class vendor defined command. In some implementations, the PCIe TLP comprises UIO Memory Read Request (UIOMRd) TLP. In other implementations, the PCIe TLP comprises Memory Read Request (MRd) TLP.

In one embodiment, a method for translating from UALink Protocol Level Interface (UPLI) Requests to NVLink requests comprises: communicating with a first entity according to UPLI; communicating with a second entity according to NVLink; receiving, from the first entity, UPLI Request (Req) comprising a read command and a second physical address; translating the UPLI Req to an NVLink request comprising: a first physical address, a tag field, and a length field; and sending the NVLink request to the second entity. Optionally, the UPLI Req further comprises a ReqSrcPhysAccID field, a ReqDstPhysAccID field, a ReqLen field, and a ReqTag field; and further comprising translating the ReqTag to a tag associated with the NVLink request. The UPLI Req may comprise a ReqAddr field comprising the second physical address, and further comprises a ReqCmd field comprising the read command. Furthermore, the UPLI Req read command may comprise a read class vendor defined command.

Optionally, the attention key-value cache sharing system may address redundant computation that occurs when multiple inference requests share common prompt prefixes. In large language model (LLM) deployments, system prompts, instruction templates, and context windows may be repeatedly processed across thousands of concurrent inference requests, with each request independently computing the same key-value pairs for these shared portions. The computational overhead for attention mechanisms scales quadratically with sequence length, making the redundant computation of key-value caches for shared prefixes particularly resource-intensive. By centralizing the storage and management of key-value caches for common prompt segments, the system may reduce aggregate computation requirements in scenarios wherein users share similar contexts, such as customer service applications wherein the agents access the same company policies and product information. The processor functioning as a switch may leverage its large memory capacity to maintain a comprehensive cache of computed key-value pairs, amortizing the computation cost across multiple inference requests. The identification of common prompt prefixes may occur utilizing hash-based matching or sequence alignment algorithms that detect overlapping segments with minimal overhead. This embodiment may enable AI service providers to increase inference throughput without proportional increases in GPU computational resources, particularly valuable for applications with high prompt similarity such as document analysis, code completion, or conversational AI with shared context.

In one embodiment, a system, comprises: a processor functioning as a switch, the processor coupled to at least 256 GB of memory; GPUs coupled to the processor via high-speed interconnects; wherein the processor is configured to store attention key-value cache data associated with shared prompt prefixes in the memory; wherein the GPUs are configured to access the attention key-value cache data from the memory when processing inference requests that include the shared prompt prefixes; and wherein the processor is further configured to identify common portions of prompts across multiple inference requests and maintain a copy of the attention key-value cache data for the common portions. Optionally, the processor functioning as a switch may evaluate incoming inference requests to detect overlapping prompt segments, such as system prompts, instruction templates, or common context provided to users. When the processor identifies that multiple inference requests share a prompt prefix of at least a predetermined number of tokens, the processor may store the computed attention key-value cache for that prefix in its memory. The GPUs processing subsequent inference requests may retrieve the pre-computed key-value cache from the processor's memory rather than recomputing it, reducing redundant computation. The processor may maintain metadata tracking which prompt prefixes are cached, their memory locations, and usage frequency to implement cache eviction policies when memory capacity is reached.

Optionally, the system further comprises a resource provisioning unit (RPU) configured to translate between protocols utilized by the GPUs and memory access protocols utilized by the processor, wherein the protocols utilized by the GPUs comprise at least one of NVLink, UALink, CXL, or PCIe. Optionally, the RPU may perform address translations between physical address spaces utilized by the GPUs and physical address spaces utilized by the processor, enabling the GPUs to access the attention key-value cache data utilizing standard memory load/store operations translated to appropriate protocol messages.

Optionally, the mixture-of-experts weight centralization system may address the memory capacity limitations that prevent efficient deployment of sparse expert models. Mixture-of-experts architectures may improve model quality by incorporating hundreds or thousands of specialized expert networks, but storing the experts in each GPU's limited high-bandwidth memory becomes prohibitive for large models. The sparse activation pattern of MoE models, where only 2-4 experts are typically activated per token, means that most expert weights remain idle in GPU memory during any given forward pass. By centralizing expert storage in the processor's larger memory pool, the system may enable GPUs to dynamically fetch only the activated experts, which may reduce in one example the per-GPU memory requirements from potentially 2 TB to 200-400 GB while maintaining computational efficiency. The processor's memory bandwidth, though lower than GPU HBM, may be sufficient for expert weight transfers since expert activation changes relatively infrequently compared to activation tensor operations. The centralized architecture may enable load balancing across GPUs by allowing different GPUs to activate different expert combinations without concern for local memory constraints. This embodiment may make previously infeasible MoE models deployable on existing GPU infrastructure, enabling organizations to leverage the improved scaling properties of sparse expert models without massive capital investment in additional GPU memory.

In one embodiment, a system, comprises: a processor functioning as a switch, the processor coupled to at least 512 GB of memory; GPUs coupled to the processor; wherein the memory stores multiple expert neural network models associated with a mixture-of-experts architecture; wherein the GPUs are configured to request specific expert neural network models from the memory based on sparse activation patterns during inference; and wherein the processor is configured to provide the requested expert neural network models to requesting GPUs without requiring the GPUs to store all expert neural network models locally. Optionally, the processor's memory may store the expert models of a mixture-of-experts architecture, wherein an expert model may comprise billions of parameters occupying tens of gigabytes of memory. During inference, when a GPU processes tokens that activate specific experts according to a gating network, the GPU may request only those activated experts from the processor's memory. The processor may implement prefetching mechanisms that predict which experts will be needed based on observed activation patterns and preemptively load them into higher bandwidth memory regions or cache structures. The processor may support concurrent access from GPUs requesting different experts, providing adequate bandwidth to prevent bottlenecks when different GPUs activate different expert combinations.

Optionally, at least one of the GPUs is configured to maintain a local cache of recently accessed expert neural network models, and wherein the processor is further configured to track which expert neural network models are cached in which GPUs to optimize data transfer. Optionally, the GPUs may implement a local caching strategy wherein recently or frequently accessed experts remain in GPU memory while less frequently accessed experts are fetched from the processor's memory on demand. The processor may maintain a directory tracking which experts are cached in which GPUs, enabling optimizations such as GPU-to-GPU transfers for cached experts rather than processor-to-GPU transfers.

Optionally, a distributed gradient accumulation system may address the synchronization bottlenecks that limit scalability in data-parallel training. Some traditional distributed trainings require all GPUs to synchronize gradient exchanges at each iteration or most iterations, creating all-reduce communication patterns that become performance bottlenecks as cluster size increases. The processor functioning as a switch may provide a central aggregation point wherein GPUs write gradients asynchronously without waiting for peers, enabling continuous computation that overlaps with gradient communication. The asynchronous accumulation may reduce iteration time in large-scale training scenarios by reducing synchronization barriers that force faster GPUs to wait for slower ones. The processor's reduction operations may be performed using vector processing capabilities or specialized reduction hardware that processes gradients from multiple GPUs simultaneously. The gradient accumulation buffers may be organized to support various reduction techniques including averaging for standard Stochastic Gradient Descent (SGD), momentum accumulation for Adam-style optimizers, or hierarchical reduction for extremely large clusters. This embodiment may enable training clusters to scale beyond current limitations, potentially supporting thousands of GPUs in a single training job while optionally maintaining near-linear scaling efficiency.

In one embodiment, a system, comprises: a processor functioning as a switch, the processor coupled to at least 512 GB of memory and configured to perform reduction operations; GPUs coupled to the processor and configured to compute gradients during distributed training; wherein the memory comprises gradient accumulation buffers; wherein the GPUs are further configured to write computed gradients to regions of the gradient accumulation buffers asynchronously; and wherein the processor is further configured to perform gradient reduction operations on the gradient accumulation buffers while the GPUs continue computing gradients for subsequent training iterations. Optionally, the gradient accumulation buffers in the processor's memory may be organized as distinct memory regions assigned to each GPU, preventing write conflicts during asynchronous gradient updates. The GPUs may write their locally computed gradients to their assigned regions without synchronization barriers, enabling continuous forward and backward pass computation. The processor may perform reduction operations, such as averaging or summing gradients across the GPUs, utilizing vector processing instructions or dedicated reduction hardware. The reduction operations may be overlapped with GPU computation through double buffering, wherein one set of buffers accumulates gradients for the current iteration while another set undergoes reduction from the previous iteration.

Optionally, the GPUs are further configured to compress gradients before writing to the gradient accumulation buffers, and wherein the processor is further configured to decompress and aggregate the compressed gradients. Optionally, the GPUs may apply compression techniques such as quantization, sparsification, or top-k selection to reduce the bandwidth required for gradient transfer to the processor's memory. The processor may decompress the gradients during the reduction operation, maintaining full precision accumulation despite compressed transmission.

Modern language models may require embedding tables exceeding 100 GB for vocabularies of millions of tokens, consuming substantial portions of GPU memory that could otherwise store model weights or activations. Embedding table centralization may address the memory capacity and bandwidth challenges of large vocabulary models because the predictable access pattern of embeddings, wherein token identifiers are known at the beginning of the batches, creates opportunities for prefetching that hide memory access latency. By storing embedding tables in the processor's memory and implementing intelligent prefetching, the system may overlap embedding retrieval with GPU computation on previous layers, thus effectively hide the access latency of processor memory. The processor may leverage its memory channels to fetch embeddings for entire batches in parallel, achieving aggregate bandwidth that matches or exceeds single GPU HBM bandwidth for sequential access patterns. The centralized storage may enable embedding table sharing across multiple models that use the same vocabulary, reducing aggregate memory consumption in multi-model serving scenarios. This embodiment may be particularly valuable for recommendation systems and natural language processing applications wherein embedding tables constitute a significant percent of total model memory requirements.

In one embodiment, a system, comprises: a processor functioning as a switch, the processor coupled to at least 128 GB of memory; GPUs coupled to the processor and configured to process neural network layers; wherein the memory stores embedding tables for token vocabularies; wherein the processor is configured to receive token sequences for a batch of inputs and prefetch corresponding embeddings from the embedding tables while the GPUs process previous neural network layers; and wherein the prefetched embeddings are provided to the GPUs when needed, overlapping memory access latency with computation. Optionally, the processor may implement a prefetch pipeline wherein token identifiers for an entire batch are received before the GPUs require the corresponding embeddings. The processor may initiate embedding lookups across multiple memory channels in parallel, gathering the embeddings into a contiguous buffer optimized for sequential transfer to GPUs. The prefetch operation may be triggered by explicit prefetch commands from GPUs or by the processor monitoring the pipeline progress and predicting when embeddings will be needed. The processor may support scatter-gather operations to efficiently handle variable-length sequences within a batch.

Optionally, the processor is further configured to identify duplicate tokens within the batch and reduce redundant retrievals of embeddings from the embedding tables. Optionally, the processor may implement deduplication logic that identifies repeated tokens within a batch, retrieving unique embeddings fewer times than the number of occurrences and broadcasting or multicasting them to requesting GPUs, reducing memory bandwidth consumption.

Optionally, long-context activation checkpointing may address the memory-computation tradeoff that limits context window sizes in transformer models. Processing sequences of millions of tokens requires storing intermediate activations that exceed GPU memory capacity, forcing existing systems to either limit context length or repeatedly recompute activations during backward passes. The processor's large memory capacity may serve as an overflow storage for activation checkpoints, enabling in some cases GPUs to process long sequences without recomputation overhead that can increase training time significantly. The asynchronous transfer of activation tensors to processor memory may overlap with continued forward pass computation, minimizing the performance impact of checkpointing. The system may implement adaptive checkpointing techniques that balance memory consumption against recomputation cost, potentially using the processor's memory for checkpoints of compute-intensive layers while recomputing simpler operations. The external checkpoint storage may enable new AI applications requiring extreme context lengths, and this embodiment may reduce the memory footprint of long-context training while maintaining computational efficiency comparable to full activation storage.

In one embodiment, a system, comprises: a processor functioning as a switch, the processor coupled to at least 1 TB of memory; GPUs coupled to the processor and configured to process neural network forward passes with activation checkpointing; wherein the GPUs are configured to send activation tensors to the processor at predetermined checkpoint layers; wherein the processor is configured to: store the activation tensors in the memory asynchronously while the GPUs continue processing subsequent layers; and provide stored activation tensors to the GPUs during backward passes without requiring recomputation. Optionally, the activation checkpointing method may designate specific layers wherein intermediate activations are saved rather than recomputed during the backward pass. The GPUs may stream activation tensors to the processor's memory using asynchronous transfers that overlap with continued forward pass computation. The processor may implement compression of activation tensors, such as using reduced precision or sparsity encoding, to maximize the number of checkpoints that fit within available memory. During the backward pass, the processor may predictively fetch activation checkpoints based on the backward pass progression, ensuring checkpoints are available in high-bandwidth memory regions when needed by GPUs.

Optionally, the processor is further configured to dynamically select which layers to checkpoint based on memory availability and measured recomputation costs. Optionally, the processor may monitor memory consumption and track the computational cost of regenerating activations for different layer types, dynamically adjusting the checkpointing method to minimize total training time while respecting memory constraints.

Speculative decoding may address the sequential generation bottleneck that limits inference throughput for autoregressive models. Traditional speculative decoding operates on single speculation chains, limiting the probability of finding valid continuations that pass verification by the large model. The processor's memory may store a comprehensive speculation tree containing hundreds of possible token sequences, enabling GPUs to explore different branches in parallel and increasing the likelihood of finding valid multi-token continuations. The tree structure maintained by the processor may track branch probabilities, genealogical relationships, and verification history, enabling exploration methods that focus computational resources on promising paths. The parallel verification across speculation branches may increase effective generation throughput compared to single-chain speculation, particularly valuable for applications requiring real-time response generation. The centralized draft storage may enable speculation techniques such as beam search, diverse sampling, or constraint-guided generation that may be impractical with limited GPU memory. This embodiment may make large language model inference economically viable for interactive applications, potentially enabling real-time conversation with models that would otherwise have prohibitive latency.

In one embodiment, a system, comprises: a processor functioning as a switch, the processor coupled to at least 256 GB of memory; GPUs coupled to the processor; a draft model configured to generate candidate token sequences; wherein the memory stores multiple speculative token sequences generated by the draft model; wherein different GPUs are configured to verify different speculative token sequences in parallel by accessing the speculative token sequences from the memory; and wherein the processor is configured to maintain a tree structure of speculative branches enabling the GPUs to explore multiple generation paths simultaneously. Optionally, the draft model may generate multiple candidate continuations forming a speculation tree wherein different branches represent possible token sequences. The processor's memory may store this tree structure with metadata indicating branch probabilities, parent-child relationships, and verification status. GPUs may retrieve different branches from the processor's memory to verify them against the large model in parallel, significantly increasing the probability of finding valid token sequences that pass verification. The processor may implement intelligent branch selection algorithms that prioritize high-probability branches for verification while pruning low-probability paths to manage memory consumption.

Optionally, the draft model is configured to be executed by the processor, generating the speculative token sequences without consuming GPU resources. Optionally, the processor may execute a smaller draft model locally, leveraging its CPU cores or integrated accelerators to generate speculative tokens while GPUs focus on verification using the large model. This division of labor may optimize resource utilization by matching computational requirements to processor capabilities.

Coherent memory space architecture may reduce the complexity and overhead of explicit synchronization in distributed GPU systems. Some traditional GPU clusters require carefully orchestrated synchronization primitives, memory fences, and communication barriers that complicate programming and limit scalability. The coherent address space shared between the processor and GPUs may enable lock-free data structures and wait-free algorithms that improve parallel efficiency compared to message-passing alternatives. The atomic operations across the coherent memory space may support fine-grained synchronization patterns required for dynamic workload distribution, work stealing queues, or concurrent data structure updates. The hardware-managed coherency protocol may maintain consistency without software intervention, reducing the programming complexity of distributed AI applications and enabling more sophisticated parallel algorithms. The system may support various coherency granularities from cache-line level to page level, optimizing the tradeoff between coherency traffic and memory efficiency based on access patterns. This embodiment may enable new classes of distributed AI algorithms that were previously impractical due to synchronization overhead, including asynchronous Stochastic Gradient Descent (SGD) variants, dynamic neural architecture search, or real-time model adaptation.

In one embodiment, a system, comprises: a processor functioning as a switch, the processor coupled to at least 256 GB of memory; GPUs coupled to the processor; wherein the memory is mapped into a coherent address space shared with the GPUs; wherein the GPUs are configured to perform atomic operations on data structures stored in the memory without explicit synchronization primitives; and wherein the processor is configured to maintain cache coherency between GPU caches and the memory utilizing a coherency protocol. Optionally, the coherent memory space may enable GPUs to directly manipulate shared data structures such as work queues, hash tables, or synchronization variables using atomic compare-and-swap, fetch-and-add, or other atomic operations. The coherency protocol may handle cache line ownership transfers between GPUs and the processor's memory, maintaining consistency without software-managed locks or barriers. The processor may implement directory-based or snoop-based coherency mechanisms to track which GPUs have cached copies of memory lines.

Optionally, the coherency protocol comprises at least one of CXL.cache, UALink coherent protocol, or NVLink coherent protocol. Optionally, the specific coherency protocol may determine the granularity of coherency maintenance, the types of atomic operations supported, and the latency characteristics of coherency operations. Separate addressable memory pool system may provide hardware-enforced isolation for multi-tenant GPU clusters while maintaining memory utilization efficiency. Cloud service providers require strong isolation guarantees between different customers' workloads to prevent data leakage and ensure quality-of-service, but static GPU assignment leads to low utilization when workloads have varying memory requirements. The RPU may implement address space separation that provides tenants with the illusion of dedicated memory while enabling dynamic sharing of the physical memory pool. The address translation mechanism may support various isolation granularities from entire GPU assignments to fine-grained memory page allocation, adapting to workload requirements and security policies. The access control enforcement may operate at line-rate speeds, adding minimal latency to memory accesses while preventing unauthorized cross-tenant data access. The isolated memory regions may be dynamically resized based on workload demands, enabling the system to maintain high aggregate utilization while respecting tenant boundaries. This embodiment may enable cloud providers to offer guaranteed memory capacity SLAs while oversubscribing physical resources, improving the economics of GPU cloud services.

In one embodiment, a system, comprises: a processor functioning as a switch, the processor coupled to at least 512 GB of memory; GPUs coupled to the processor; a resource provisioning unit (RPU) configured to maintain separate physical address spaces for different GPUs; wherein the memory is partitioned into isolated regions assigned to different tenants and/or workloads; wherein the RPU is further configured to translate between GPU-specific physical addresses and processor memory addresses; and wherein the processor is configured to enforce access control in order to prevent GPUs from accessing memory regions assigned to other tenants. Optionally, the separate addressable memory pool may provide security isolation for multi-tenant environments wherein different GPU workloads should be prevented from accessing each other's data. The RPU may maintain translation tables mapping tenant-specific or GPU-specific address spaces to physical memory regions in the processor's memory. The access control enforcement may include checking memory access requests against access control lists (ACLs) or capability-based permissions.

Optionally, the processor is further configured to dynamically adjust the size of isolated memory regions based on workload demands or administrative policies. Optionally, the processor may monitor memory utilization patterns and reallocate memory between tenants or workloads to optimize overall system utilization while maintaining isolation guarantees.

Read-optimized memory architecture may exploit the asymmetric access patterns of inference workloads wherein model weights and embeddings are read thousands of times more frequently than they are written. Some traditional memory systems allocate equal bandwidth to reads and writes, wasting resources on write bandwidth that remains largely unused during inference. The asymmetric bandwidth capacity allocation with 4:1 or higher read-write ratios may better match the actual access patterns of AI inference, potentially increasing effective memory bandwidth utilization. Broadcast or multicast mechanisms may detect when GPUs request identical model weights or embeddings and satisfy these requests with a single memory read operation, effectively multiplying the available read bandwidth by the number of concurrent readers. The read-mostly data organization may enable optimizations such as compression, deduplication, or specialized encoding that would be impractical for frequently written data. This embodiment may support hierarchical caching wherein frequently accessed weights are replicated across multiple memory channels for parallel access, enabling inference systems to serve more concurrent users or larger models without proportional increases in memory bandwidth infrastructure.

In one embodiment, a system, comprises: a processor functioning as a switch, the processor coupled to at least 512 GB of memory; GPUs coupled to the processor; wherein the processor is configured to provide asymmetric memory access bandwidth with read bandwidth exceeding write bandwidth by at least a factor of four; wherein the memory stores read-mostly data comprising at least one of model weights, embedding tables, or cached computations; and wherein the processor is further configured to implement broadcast or multicast mechanisms to serve concurrent read requests from different GPUs using a single memory access. Optionally, the read-optimized architecture may allocate more memory channels, buffers, or interface bandwidth to memory reads compared to memory writes. The broadcast or multicast mechanisms may detect when GPUs request the same or overlapping memory regions and satisfy these requests with a single memory read operation, effectively multiplying the available read bandwidth. The read-mostly data may be updated infrequently utilizing a control plane or during scheduled maintenance windows.

Optionally, write operations to the memory are coordinated through a designated writer GPU or utilizing the processor's control plane to maintain consistency. Optionally, the limited write bandwidth may be managed by designating specific GPUs or time windows for write operations, preventing write conflicts and maintaining data consistency despite the asymmetric bandwidth capacity allocation.

Access pattern learning may optimize memory performance through runtime adaptation to observed workload characteristics. Usually, static memory configurations cannot adapt to the diverse and evolving access patterns of different AI models, which may lead to suboptimal bandwidth utilization and increased latency. The processor may implement hardware monitors or software profiling that track memory access addresses, frequencies, and correlations with a small overhead. The pattern learning may identify phenomena such as strided access in convolution operations, gather-scatter patterns in attention mechanisms, or sequential streaming in recurrent networks. The data reorganization based on learned patterns may include techniques such as memory page coloring to reduce bank conflicts, interleaving adjustments to maximize channel parallelism, or data layout transformations that improve spatial locality. The system may maintain separate pattern profiles for different model types or execution phases, switching between optimization methods as workloads transition between training and inference or between different model architectures. This adaptive approach may improve memory bandwidth efficiency compared to static configurations, particularly valuable for diverse workloads in shared GPU clusters.

In one embodiment, a system, comprises: a processor functioning as a switch, the processor coupled to at least 256 GB of memory; GPUs coupled to the processor; wherein the processor is configured to: monitor memory access patterns from the GPUs and maintains access pattern statistics; identify frequently accessed memory regions based on the access pattern statistics; and reorganize data placement in the memory or adjusts memory interleaving based on the identified access patterns to improve memory bandwidth utilization. Optionally, the processor may implement hardware or software mechanisms to track memory access addresses, frequencies, and sequences from different GPUs. The access pattern statistics may include spatial locality information, temporal locality information, and correlation between different memory regions. The processor may automatically migrate frequently accessed data to memory channels with higher bandwidth or lower latency, or adjust the memory interleaving scheme to reduce bank conflicts for common access patterns.

Optionally, the processor is further configured to predict future memory accesses based on the learned access patterns and prefetches data before GPU requests arrive. Optionally, the processor may implement pattern recognition algorithms to identify sequential, strided, or correlated access patterns and initiate prefetch operations to hide memory latency.

A multi-protocol translation in a switch may enable heterogeneous GPU clusters that combine different vendors' accelerators or multiple hardware generations within a single computational fabric. Organizations may accumulate GPUs from different vendors or generations through incremental infrastructure investments, but protocol incompatibilities prevent these resources from cooperating effectively. The processor functioning as a switch may translate between protocols such as NVLink from NVIDIA GPUs, UALink from AMD accelerators, and CXL from Intel processors, creating a unified memory space accessible to the devices. The protocol translation logic may handle differences in message formats, flow control mechanisms, addressing schemes, and transaction semantics while preserving memory consistency guarantees required for correct execution. The translation overhead may be minimized utilizing hardware acceleration and optimized translation paths for common operations. The heterogeneous cluster enabled by protocol translation may leverage the unique strengths of different accelerator types, such as using NVIDIA GPUs for transformer operations while AMD GPUs handle convolution-heavy vision models. This embodiment may extend the useful lifetime of existing GPU infrastructure while enabling gradual migration to new hardware generations.

In one embodiment, a system, comprises: a processor functioning as a switch, the processor coupled to at least 64 GB of memory; a first set of GPUs coupled to the processor using a first interconnect protocol; a second set of GPUs coupled to the processor using a second interconnect protocol different from the first interconnect protocol; wherein the processor comprises protocol translation logic configured to translate between the first and second interconnect protocols; and wherein the processor is further configured to enable the first and second sets of GPUs to access shared data in the memory despite using different interconnect protocols. Optionally, the first interconnect protocol may be NVLink while the second interconnect protocol may be UALink, CXL, UCIe, or PCIe, enabling GPUs from different vendors or generations to participate in the same distributed computation. The protocol translation logic may translate message formats, addressing schemes, flow control mechanisms, and transaction semantics between the different protocols while preserving memory consistency semantics.

Optionally, the processor is further configured to apply protocol-specific optimizations when translating between protocols, comprising at least one of transaction coalescing, message packing, or credit management adaptation. Optionally, the processor may leverage knowledge of protocol characteristics to optimize translations, such as combining small transactions from one protocol into larger transactions in another protocol to improve bandwidth utilization.

Optionally, the quality-of-service system may prevent interference between latency-sensitive inference requests and bandwidth-intensive training operations sharing the same infrastructure. Co-locating training and inference workloads on the same GPU cluster may improve resource utilization but creates contention where training's bulk memory transfers delay inference responses. The processor may implement QoS mechanisms including weighted fair queuing, rate limiting, and priority-based scheduling that maintain inference latency SLAs while maximizing training throughput. The bandwidth reservation may guarantee minimum memory bandwidth for inference workloads regardless of training demand, ensuring predictable response times for customer-facing applications. The priority queuing may reorder memory requests to serve inference before training while implementing starvation prevention to ensure training workloads make forward progress. The QoS mechanisms may operate at multiple granularities from individual memory requests to entire batch operations, adapting to the characteristic patterns of different workload types. This embodiment may enable organizations to consolidate training and inference clusters, potentially reducing infrastructure costs while maintaining service quality for both workload types.

In one embodiment, a system, comprises: a processor functioning as a switch and coupled to memory; GPUs coupled to the processor, wherein at a given time a first subset of the GPUs executes inference workloads and a second subset executes training workloads; wherein the processor is configured to: implement quality-of-service mechanisms comprising bandwidth reservation and priority queuing for accesses to the memory and to interconnect ports under control of the processor; reserve a minimum service bandwidth for the inference workloads; and prioritize memory or fabric access requests associated with the first subset over requests associated with the second subset upon detecting that latency thresholds associated with the inference workloads are approached, while providing forward-progress guarantees for the training workloads.

Optionally, the QoS mechanisms may monitor request latencies and queue depths to detect when inference requests risk missing latency targets. The bandwidth reservation may guarantee that inference workloads receive a predetermined minimum bandwidth regardless of training workload demands. The priority queuing may reorder memory access requests to serve latency-sensitive inference requests before bandwidth-intensive training requests while still providing forward progress guarantees for training workloads.

Optionally, the processor is further configured to dynamically adjust the bandwidth reservation and priority levels based on measured service-level objectives and system load. Optionally, the processor may monitor whether inference requests meet their latency targets and training workloads achieve their throughput goals, automatically adjusting QoS parameters to optimize overall system performance while meeting service level agreements. In some implementations, the quality-of-service mechanisms further comprise rate limiting of traffic associated with the training workloads. Furthermore, the processor performs admission control that defers initiation of training batch transfers when projected inference latency exceeds a threshold. The priority queuing is implemented using separate queues or virtual lanes per workload type with starvation prevention, and/or wherein the quality-of-service mechanisms operate at multiple granularities including individual memory or fabric requests and aggregated batch transfers.

Optionally, the system may address a fundamental inefficiency in current AI infrastructure wherein GPUs are underutilized due to memory constraints rather than compute limitations. When processing large AI models such as 405B parameter LLMs that require approximately 810 GB of memory in FP16 format, traditional approaches require distributing the model across 11 or more GPUs with 80 GB HBM each, even though the computational requirements might be satisfied by 4-6 GPUs. This results in GPUs spending significant time idle, waiting for memory transfers and synchronization rather than performing actual computations. The extended memory capacity provided by the memory pool may enable fewer GPUs to process the same model by providing additional memory utilizing protocol translation, allowing organizations to achieve essentially the same computational throughput with reduced GPU infrastructure costs. For example, a datacenter processing multiple 70B parameter models simultaneously may reduce GPU requirements by dozens of percent while maintaining essentially the same inference throughput, translating to millions of dollars in infrastructure savings. The protocol translation between GPU interconnects and memory pool protocols may introduce latencies in the range of 200-500 nanoseconds for CXL-based implementations, which is acceptable for model parameters that are accessed sequentially during layer processing. This embodiment may extend beyond cost savings to enable new AI applications that were previously impractical, such as running larger context windows (such as a few million tokens) or processing higher-resolution multimodal inputs that exceed current GPU memory limitations.

In one embodiment, a system, comprises: a processor functioning as a memory pool, the processor coupled to memory via memory channels, wherein the memory comprises at least 256 GB of capacity; at least one GPU coupled to the processor via at least one high-speed interconnect, wherein the at least one GPU comprises local high-bandwidth memory (HBM) having a first memory capacity; wherein when the at least one GPU processes an AI model having memory requirements exceeding the first memory capacity, the system is configured to enable the at least one GPU to utilize portions of the memory as extended memory capacity based on protocol translation between protocols utilized by the at least one GPU and memory access protocols utilized by the processor; and wherein the utilization of the extended memory capacity reduces a number of additional GPUs required to process the AI model compared to processing the AI model using GPUs without access to the extended memory capacity. Optionally, the extended memory capacity may provide overflow storage for model parameters that exceed the GPU's HBM capacity, with the system implementing data placement methods that keep frequently accessed layers in HBM while storing less frequently accessed portions in the processor's memory. The protocol translation may handle differences in transaction formats, addressing schemes, and flow control mechanisms between the GPU interconnect protocols and the memory pool access protocols, maintaining data integrity and ordering guarantees required for model execution.

Optionally, the system further comprises a resource provisioning unit (RPU) configured to perform the protocol translation between the protocols utilized by the at least one GPU and the memory access protocols utilized by the processor. Optionally, the RPU may maintain translation tables, transaction tracking structures, and protocol state machines that enable seamless communication between the GPU and processor memory domains. The RPU may implement optimizations such as transaction coalescing, prefetching, or caching to minimize the performance impact of protocol translation. The processor may be configured to perform the protocol translation between the protocols utilized by the at least one GPU and the memory access protocols utilized by the processor. Optionally, when the processor performs protocol translation directly, it may utilize dedicated hardware blocks, microcode, or firmware to process incoming GPU protocol messages and generate corresponding memory access operations, which approach may reduce translation latency compared to external translation units. In some implementations, the protocols utilized by the at least one GPU are based on at least one of NVLink, UALink, or Scale Up Ethernet (SUE), and the memory access protocols utilized by the processor are based on CXL. Optionally, the translation between GPU interconnect protocols such as NVLink or UALink and CXL memory protocols may involve mapping GPU-initiated memory requests to CXL.mem transactions, handling differences in addressing modes, and managing flow control credits between the different protocol domains.

Memory tier management may exploit the characteristic access patterns of AI models wherein certain portions of the model are accessed significantly more frequently than others. In transformer-based models, attention layers and early embedding layers may be accessed for every token, while deeper layers or specialized expert networks in mixture-of-experts architectures may be accessed less frequently. The system may achieve computational throughput improvements of 2-3× compared to storing the entire model in slower-tier memory by keeping these frequently accessed portions in the high-bandwidth HBM (that in one example provides up to 3.2 TB/s bandwidth) while placing less frequently accessed portions in the memory pool (that in one example provides 100-200 GB/s per CXL link). For training workloads, gradient accumulation buffers and optimizer states that are accessed once per batch may reside in the second tier, while activations requiring immediate access remain in the first tier. The tiered approach may be particularly valuable for serving multiple model variants, wherein a base model's common layers are accessed by the variants and can be efficiently shared in the memory pool, while variant-specific fine-tuning layers remain in GPU HBM. The tiered embodiment may enable deployments serving personalized AI models for millions of users to reduce memory redundancy, potentially enabling a GPU cluster to serve more model variants than traditional architectures.

In one embodiment, a system, comprises: a processor functioning as a memory pool, the processor coupled to memory comprising at least 512 GB of capacity; at least one GPU coupled to the processor, wherein the at least one GPU comprises local high-bandwidth memory (HBM); wherein the system implements memory tiers comprising a first tier including the local HBM and a second tier including the memory coupled to the processor; wherein frequently accessed portions of an AI model are placed in the first tier and less frequently accessed portions of the AI model are placed in the second tier; and wherein the tiered placement enables the at least one GPU to process AI models larger than a capacity of the local HBM while maintaining higher computational throughput than if the entire AI model were stored in the second tier. Optionally, the memory tier management may implement migration policies that dynamically move model portions between tiers based on observed access patterns, adapting to different phases of model execution or changing workload characteristics. The system may maintain metadata tracking the location and access history of model portions, enabling predictive prefetching from the second tier to the first tier before the data is needed.

Optionally, the frequently accessed portions are identified based on at least one of: access frequency counters, model layer criticality, or predictive access patterns derived from model architecture analysis. Optionally, access frequency counters may be implemented in hardware or software to track the number of times the model layers or weight tensors are accessed within a time window. Model layer criticality may be determined utilizing offline profiling or architectural analysis that identifies bottleneck layers whose performance impacts overall throughput. Predictive access patterns may leverage knowledge of transformer architectures, convolution structures, or recurrent connections to anticipate which layers will be accessed next. In certain aspects, GPUs processing variants of a same base AI model share access to common model layers stored in the second tier, reducing redundant storage across the GPUs. Optionally, the shared access to common model layers may be coordinated utilizing a directory-based or broadcast-based coherency mechanism that tracks which GPUs have cached copies of shared layers. The system may implement copy-on-write semantics wherein model layers are shared until a variant modifies them, at which point a private copy is created for that specific variant.

Non-coherent memory extension may provide a simpler and more performant architecture for workloads that can tolerate explicit memory management. By avoiding the complexity and overhead of cache coherency protocols, the system may achieve lower latency for local HBM accesses and reduce protocol processing overhead by reducing or eliminating coherency state tracking, snoop operations, and invalidation messages. The explicit control of data movement may align well with the batch-processing nature of AI workloads, wherein model layers are loaded sequentially and activations flow predictably through the network. Software frameworks such as PyTorch or TensorFlow may implement memory migration techniques that prefetch upcoming layers while processing current layers, overlapping data movement with computation. The non-coherent approach may be advantageous for inference workloads wherein model weights are read-only after loading, eliminating the need for coherency maintenance during processing. For large-scale training, the system may implement double-buffering techniques wherein gradient updates are applied to one copy while the other copy is used for forward passes, avoiding coherency traffic during the most bandwidth-intensive operations. This embodiment may reduce hardware complexity and cost, as non-coherent interfaces may be implemented with fewer transistors and lower power consumption than fully coherent alternatives, potentially reducing system cost while maintaining comparable performance for AI workloads.

In one embodiment, a system, comprises: a processor functioning as a memory pool, the processor coupled to memory comprising at least 256 GB of capacity; at least two GPUs coupled to the processor, wherein the GPUs comprise local high-bandwidth memory (HBM); wherein the system provides non-coherent access to the memory as extended memory capacity for the GPUs; wherein data movement between the local HBM and the memory is controlled; and wherein the non-coherent extended memory capacity enables the GPUs to process AI models exceeding a combined capacity of the local HBM of the GPUs. Optionally, the non-coherent access model may require explicit synchronization points wherein GPUs coordinate their access to shared memory regions, using mechanisms such as memory fences, barriers, or software-managed locks. The system may implement bulk data transfer operations optimized for the large contiguous memory regions typical of AI model parameters.

Optionally, the data movement is controlled by at least one of: the GPUs, the processor, a dedicated controller, or orchestration software executing on the system. Optionally, GPU-controlled data movement may allow fine-grained control over what data to fetch and when, aligning with the GPU's execution pipeline. Processor-controlled movement may enable centralized optimization of memory bandwidth usage across GPUs. A dedicated controller may offload data movement overhead from both GPUs and the processor, implementing prefetching or caching techniques. Orchestration software may provide high-level policies while delegating execution to hardware mechanisms such as the processor. The GPUs may coordinate data movement utilizing a distributed control mechanism that manages access to shared regions of the memory. Optionally, the distributed control mechanism may implement consensus protocols, token passing, or reservation systems that prevent conflicting accesses while maximizing parallelism. The mechanism may support various consistency models from eventual consistency for read-only data to strict ordering for shared mutable state. Furthermore, the processor may manage data movement based on memory access patterns observed from the GPUs and prefetches data from the memory to the local HBM before the GPUs request the data. Optionally, the processor may maintain pattern recognition hardware or software that identifies sequential, strided, or correlated access patterns in GPU memory requests. The prefetching may be triggered by configurable thresholds or predictive models that balance the benefits of hiding latency against the costs of potentially unnecessary data transfers. The non-coherent access may reduce latency for local HBM accesses compared to coherent memory systems. Optionally, the reduced latency may result from eliminating coherency protocol overhead such as snoop requests, invalidation messages, and state transitions that would otherwise delay local memory accesses. The non-coherent design may also enable simpler memory controller designs with fewer pipeline stages and lower power consumption.

Dynamic memory allocation system may address the inefficiency of static memory partitioning in current GPU clusters wherein memory is pre-allocated regardless of actual model requirements. The system may monitor real-time memory usage patterns and adjust allocations with granularity matching AI model architectures, such as allocating memory in chunks corresponding to transformer blocks (such as 200-500 MB each for large models) or attention heads. When a GPU cluster processes a mix of small models (such as 7B parameters requiring 14 GB) and large models (such as 70B parameters requiring 140 GB), the system may dynamically redistribute memory pool capacity to maintain high utilization across the GPUs rather than having some GPUs memory-constrained while others have excess capacity. The allocation system may implement predictive algorithms that anticipate memory requirements based on incoming request patterns, pre-allocating memory before model loading to reduce startup latency. For multi-tenant environments, the system may enforce quality-of-service guarantees by ensuring minimum memory allocations for high-priority workloads while allowing best-effort workloads to utilize available capacity. This embodiment may enable cloud service providers to increase their GPU cluster utilization, potentially increasing the revenue generated per GPU while maintaining service level agreements.

In one embodiment, a system, comprises: a processor functioning as a memory pool, the processor coupled to memory comprising at least 512 GB of capacity; GPUs coupled to the processor, wherein the GPUs comprise local high-bandwidth memory (HBM); wherein the system is configured to: determine memory requirements for AI models being processed by the GPUs; dynamically allocate portions of the memory to the GPUs based on the determined memory requirements; and adjust the allocations when the GPUs switch between AI models having different memory requirements; whereby the dynamic allocation enables the GPUs to process AI models of varying sizes while adapting GPU resource utilization to the memory requirements. Optionally, the memory requirement determination may evaluate model metadata, profiling information from previous executions, or explicit memory requests from AI frameworks. The dynamic allocation may be performed at various time scales from milliseconds for fine-grained adjustments to seconds or minutes for major reconfigurations.

Optionally, the dynamic allocation implements memory oversubscription, allocating aggregate memory capacity to the GPUs exceeding physical memory available, and manages memory pressure utilizing page migration between the memory and the local HBM. Optionally, memory oversubscription may rely on the observation that not all allocated memory is actively used simultaneously, allowing the system to satisfy more allocation requests than physical capacity would normally permit. Page migration may be triggered by memory pressure thresholds, access frequency analysis, or predictive models that anticipate future access patterns. The system may implement various page replacement policies such as LRU, LFU, or application-specific policies optimized for AI workload characteristics. The portions of the memory may be allocated at a granularity corresponding to AI model layers or transformer blocks. Optionally, allocating memory at model-aware granularities may reduce fragmentation and improve data locality by keeping related weights and activations contiguous in memory. The allocation granularity may be dynamically adjusted based on model size, with fine-grained allocation for small models and coarse-grained allocation for large models to balance flexibility against management overhead.

Shared context storage system may reduce redundant memory consumption that occurs when multiple AI workloads process common information. In enterprise deployments, an AI system responding to customer queries may repeatedly access the same company knowledge base, product documentation, or compliance policies across thousands of concurrent sessions. Rather than the GPUs maintaining copies of this shared context in their limited HBMs, the memory pool may store a copy accessible to the GPUs over CXL or UALink connections. For code generation models, shared repository context including common libraries, API definitions, and coding standards may occupy for example 10-50 GB that would otherwise be replicated across every GPU processing code-related requests. The system may implement caching techniques that identify sharing opportunities utilizing content hashing or semantic similarity detection, automatically promoting frequently shared data to the memory pool. For training workloads, reference datasets used for regularization or contrastive learning may be shared across multiple training jobs, reducing aggregate memory requirements. The deduplication mechanisms may operate at various granularities, from entire model layers to individual tensor blocks, maximizing sharing opportunities while maintaining access performance. This embodiment may enable AI service providers to increase their concurrent user capacity possibly without additional GPU memory investment, which is valuable for applications with massive number of users accessing similar base functionalities.

In one embodiment, a system, comprises: a processor functioning as a memory pool, the processor coupled to memory comprising at least 256 GB of capacity; GPUs coupled to the processor, wherein the GPUs comprise local high-bandwidth memory (HBM); wherein the memory stores shared context data that is accessed by AI workloads processed by the GPUs; and wherein storing the shared context data in the memory enables the GPUs to access the shared context data while reducing storage requirements in the local HBM of the GPUs. Optionally, the shared context data may be organized in a hierarchical structure that optimizes for common access patterns, with frequently accessed portions cached in higher-bandwidth memory regions while less frequently accessed portions reside in capacity-optimized storage. The system may implement reference counting or garbage collection mechanisms to manage the lifecycle of shared data.

Optionally, the AI workloads comprise at least one of inference workloads or training workloads. Optionally, inference workloads may share prompt templates, system instructions, or knowledge bases that provide context for generation tasks. Training workloads may share reference datasets, validation sets, or pretrained model components that are incorporated into training runs. The system may implement different sharing policies for different workload types, optimizing for the specific access patterns and consistency requirements of the different workload types. The shared context data may comprise at least one of: organizational knowledge base, company-specific information, code repository data, common prompt prefixes, shared model weights, or reference datasets. Optionally, organizational knowledge bases may include policy documents, procedure manuals, or domain-specific information that provides context for AI responses. Code repository data may include source code, documentation, dependency graphs, or API specifications that inform code generation or analysis tasks. Common prompt prefixes may include instruction templates, role definitions, or formatting specifications that are prepended to user queries. In some implementations, the processor identifies duplicate data across the AI workloads and stores a copy of the duplicate data in the memory accessible to GPUs. Optionally, duplicate identification may use content hashing, fingerprinting, or similarity detection algorithms that identify exact or near-duplicate data across workloads. The deduplication may operate at various granularities from entire files or tensors to individual cache lines, trading deduplication effectiveness against management overhead. The system may maintain mapping tables that redirect duplicate references to the single stored copy while providing copy-on-write semantics for modifications.

Optionally, the signal-guided memory pooling system may address inefficiencies wherein machine learning systems allocate memory resources uniformly without considering the varying learning dynamics of different data samples. Current training systems may process all samples with equal memory allocation regardless of their contribution to model learning, which may lead to suboptimal resource utilization. Model-intrinsic signals, such as metrics derived from the model's internal state during forward passes, may provide indicators of learning dynamics that correlate with gradient magnitudes, convergence rates, and memory access patterns. By dynamically allocating memory resources based on these signals, the system may achieve improvements in training efficiency and memory utilization. For instance, in reinforcement learning scenarios such as those utilizing GAIN-RL, angle concentration signals between token hidden states may influence gradient norms, with higher concentration samples possibly producing larger gradients that drive faster learning. The memory pooling system may leverage such signals to allocate high-bandwidth memory for samples currently contributing to learning, while placing samples with lower learning impact in capacity-optimized memory tiers. This dynamic allocation may reduce memory bandwidth requirements while maintaining training convergence rates. The system may extract various types of model-intrinsic signals including angular relationships between hidden states, neuron activation patterns, attention entropy distributions, gradient flow characteristics, and feature diversity metrics, enabling adaptation to diverse model architectures and training paradigms. For example, neuron activation patterns may be represented as binary vectors indicating which neurons exceed activation thresholds, with overlap between samples computed using similarity metrics. Attention entropy values computed from attention weight distributions in transformers may indicate learning impact, wherein lower entropy possibly indicates more focused attention patterns. Gradient flow indicators may be estimated from activation magnitudes without computing actual gradients, providing proxy metrics correlated with gradient importance.

In one embodiment, a system, comprising: a processor functioning as a memory pool, the processor coupled to memory comprising at least 256 GB of capacity; at least one GPU coupled to the processor, wherein the at least one GPU comprises local high-bandwidth memory (HBM); a computer configured to compute model-intrinsic signals from a machine learning model during forward passes through training data; wherein the system is configured to: determine signal values for data samples based on the model-intrinsic signals; dynamically allocate the data samples to different memory tiers based on the determined signal values; and migrate the data samples between memory tiers during training based on changes in the signal values. Optionally, the model-intrinsic signals may be computed during forward passes without requiring backward propagation, possibly enabling signal extraction with reduced computational overhead. The computer may operate in parallel with training operations, computing signals as data flows through model layers. The signals may be stored in a dedicated signal cache that maintains a mapping between data sample identifiers and their corresponding signal values, enabling lookup during memory allocation decisions. The system may implement threshold-based allocation policies wherein samples with signal values above thresholds are assigned to high-bandwidth memory tiers, while samples below thresholds may be assigned to capacity-optimized tiers.

Optionally, wherein the model-intrinsic signals comprise angle concentration metrics computed from hidden state vectors of the machine learning model, and wherein the angle concentration metrics comprise at least one of: intra-segment angle concentration measuring angular similarity within portions of an input sequence, or inter-segment angle concentration measuring angular similarity between different portions of the input sequence; whereby the dynamic allocation based on model-intrinsic signals may reduce memory bandwidth requirements. Optionally, the angle concentration metrics may be computed as cosine similarities between token hidden state vectors at specified layers of the model, with the final layer possibly providing stronger signals due to inter-segment clustering. For transformer models processing sequences with system prompts and questions, intra-segment concentration may be calculated as the average cosine similarity between pairs of tokens within the question portion, while inter-segment concentration may be calculated as the average cosine similarity between question tokens and system prompt tokens. The system may combine these metrics using weighted sums, wherein the weights may be determined empirically or learned during training.

The memory tiers may comprise: a first tier utilizing the local HBM for samples with highest signal values; a second tier utilizing the processor memory for samples with intermediate signal values; and a third tier utilizing CXL-attached memory or storage for samples with lowest signal values. Optionally, the tier boundaries may be dynamically adjusted based on the distribution of signal values across the training dataset, with the system possibly maintaining statistics for balanced tier utilization. The first tier allocation may be limited to samples that contribute to gradient updates, while the second tier may hold samples currently being learned. The third tier may serve as an overflow pool for samples that have been mastered or are scheduled for future learning phases. The system may implement predictive tier promotion that moves samples to higher tiers before they are needed based on training curriculum patterns.

The processor may be further configured to implement a tier migration policy that promotes samples from lower tiers to higher tiers when their signal values increase above promotion thresholds, and demotes samples from higher tiers to lower tiers when their signal values decrease below demotion thresholds. Optionally, the migration policy may implement hysteresis in the thresholds to reduce migration oscillation, with promotion thresholds possibly set higher than corresponding demotion thresholds. The system may batch migrations to amortize data movement costs, accumulating migration requests over multiple training steps before executing transfers. The policy may consider both absolute signal values and relative rankings within the current batch.

Migration operations may overlap with computation using double buffering where samples are pre-staged in destination tiers.

The system may be further configured to prefetch samples from the processor memory to the local HBM based on predicted access patterns derived from the model-intrinsic signals. Optionally, the prefetching mechanism may utilize prediction models that learn the evolution of signal values over training epochs, possibly enabling proactive data movement before access requests. For curriculum learning scenarios, the system may analyze sampling distribution parameters to predict which samples may be selected in upcoming batches. The prefetcher may maintain accuracy metrics and adjust aggressiveness based on prediction success rates.

The system may be further configured to maintain a signal-to-tier mapping in the processor memory, and wherein the mapping is updated as samples migrate between memory tiers based on evolving signal values. Optionally, the mapping maintenance may utilize hash tables or other data structures for lookups. The mapping updates may be performed atomically to maintain consistency during concurrent access from multiple GPUs. The system may implement versioning or timestamping of mappings to handle cases where GPUs have cached older tier assignments.

The processor may implement memory bandwidth reservation for samples in different tiers, allocating guaranteed bandwidth to high-signal samples while providing best-effort access to low-signal samples. Optionally, the bandwidth reservation may use token bucket algorithms or similar mechanisms to enforce bandwidth allocations while allowing burst access when resources are available. The reservation levels may be adjusted based on the distribution of signals across tiers, possibly preventing bandwidth starvation for any tier.

The system may further comprise a resource provisioning unit (RPU) configured to translate between protocols utilized by the at least one GPU and memory access protocols utilized by the processor, enabling the GPU to access samples in the processor memory tiers. Optionally, the RPU may translate between GPU protocols such as NVLink or UALink and processor memory protocols such as CXL or DDR. The translation may handle differences in transaction formats, addressing schemes, and flow control mechanisms. The RPU may maintain transaction tracking structures for outstanding requests across protocol domains.

In one embodiment, a method for dynamically allocating memory resources based on model-intrinsic signals, comprising: computing, during forward passes of a machine learning model, model-intrinsic signals for training data samples; determining signal values for the data samples based on the model-intrinsic signals; allocating the data samples to different tiers of a memory hierarchy based on the determined signal values, wherein samples with higher signal values are allocated to higher-bandwidth memory tiers; processing the training data samples from their allocated memory tiers during training; and migrating samples between memory tiers as their signal values change during training progression. Optionally, the method may be implemented as a runtime library that intercepts memory allocation requests from machine learning frameworks, redirecting allocations to appropriate memory tiers based on signal values. The signal computation may be performed asynchronously with training. The method may include rebalancing operations that optimize tier assignments based on current signal distributions and available memory capacities.

Optionally, further comprising: maintaining a mapping between data sample identifiers and their current memory tier assignments in a processor-based memory pool; tracking access frequencies for samples in each memory tier; and adjusting tier allocation thresholds based on observed access patterns. Optionally, the access frequency tracking may employ approximate counting algorithms to reduce memory overhead for large datasets. The threshold adjustment may implement control loops that adapt to changing signal distributions while maintaining tier population balance.

The memory hierarchy may comprise GPU high-bandwidth memory as a first tier and a processor-based memory pool as a second tier, and wherein migrating samples comprises copying data between the GPU memory and the processor-based memory pool based on signal value changes. Optionally, the migration may utilize DMA engines or similar hardware mechanisms for efficient data transfer. The method may implement pipelining of migrations to overlap data movement with computation.

In one embodiment, a system, comprising: a processor functioning as a shared memory pool for multiple machine learning accelerators; first and second GPUs coupled to the processor via high-speed interconnects; wherein the processor is configured to: receive model-intrinsic signals computed by the first and second GPUs during distributed training; coordinate memory tier assignments for data samples accessed by both GPUs based on the received signals; and provide coherent access to samples stored in the memory pool for both GPUs. Optionally, the signal aggregation may employ reduction operations to combine signals computed on different GPUs. The coordination may implement consensus protocols for consistent tier assignments across GPUs. The coherent access may utilize directory-based mechanisms that track which GPUs have cached copies of shared data.

Optionally, wherein the processor is further configured to implement differentiated memory allocation policies for the first and second GPUs based on their signal contributions, allocating more high-bandwidth memory to the GPU processing samples with higher aggregate signal values. Optionally, the differentiated policies may adapt to load imbalance between GPUs, dynamically adjusting allocations to maximize overall training throughput. The system may implement fairness mechanisms that prevent starvation while still prioritizing GPUs processing high-signal samples.

The processor may be further configured to implement signal-guided data placement that stores samples in memory locations with lower access latency to GPUs that frequently access them based on historical signal patterns. Optionally, the placement optimization may consider NUMA distances and interconnect topology when determining optimal storage locations. The system may maintain affinity statistics tracking GPU-to-sample access patterns over time.

The memory pool may be partitioned into regions assigned to different training experiments, with each region implementing independent signal-guided tier management. Optionally, the partitioning may provide isolation between different users or experiments while sharing physical memory infrastructure. Each partition may maintain its own signal thresholds and migration policies optimized for specific workloads.

Optionally, the predictive computation sharing system may leverage memory pool infrastructure to reduce redundant calculations across multiple training instances or inference requests. Machine learning workloads may exhibit substantial computational redundancy where identical or similar calculations are performed repeatedly across different data samples, training epochs, or model instances. For example, when processing natural language with transformer models, system prompts, instruction templates, and common context segments may be repeatedly processed across thousands of requests, with each instance independently computing the same attention key-value pairs, embeddings, or intermediate activations. The memory pool architecture may provide a centralized repository for storing and sharing these computed results across multiple GPUs or training jobs. The system may identify redundant computation patterns through various detection mechanisms such as content hashing, sequence matching, or statistical similarity analysis. Once identified, computed results may be stored in the processor's memory pool with appropriate indexing for rapid retrieval. The memory tier hierarchy may be leveraged to maintain frequently accessed computations in high-bandwidth memory while migrating rarely used computations to capacity-optimized tiers. For instance, commonly used prompt embeddings may remain in processor DRAM for fast access, while specialized context computations may reside in CXL-attached memory. The sharing mechanism may extend beyond simple caching to include partial computation results, execution graphs, and reusable intermediate states. Resource provisioning units may translate between different GPU protocols and memory pool access protocols, enabling heterogeneous accelerators to share computed results despite using different interconnect technologies.

In one embodiment, a system, comprising: a processor functioning as a memory pool, the processor coupled to memory; at least one GPU coupled to the processor via an interconnect; wherein the processor is configured to: identify computational patterns that are performed multiple times across machine learning workloads; store computation results from the identified computational patterns in the memory; index the stored computation results for retrieval by the at least one GPU; and provide the stored computation results to the at least one GPU when the at least one GPU requests computations matching the stored computation results. Optionally, the identification of computational patterns may employ fingerprinting algorithms to generate unique identifiers for patterns, enabling rapid matching of repeated operations. The processor may use content hashing, sequence matching, or similarity metrics to detect when the same calculations are being requested multiple times. The indexing may utilize hash tables, tries, or learned index structures optimized for the specific patterns of machine learning computations. The retrieval mechanism may implement prefetching based on workload analysis, moving computation results from the memory pool to GPU memory before they are explicitly requested.

Optionally, wherein the provide of the stored computation results to the at least one GPU reduces redundant processing compared to the at least one GPU recomputing the computation results. Optionally, the reduction in redundant processing may be particularly beneficial for computations with high computational cost such as matrix multiplications, attention calculations, or embedding lookups. The system may track computation savings by comparing retrieval time against estimated recomputation time, adjusting caching policies based on measured benefits.

The computational patterns may comprise attention key-value pairs computed from shared input prefixes in transformer models, and wherein the processor is further configured to store the key-value pairs in a cache structure within the memory. Optionally, the key-value cache may be organized hierarchically, with frequently accessed pairs maintained in contiguous memory regions for efficient bulk transfer. The cache may implement versioning to handle model updates, maintaining multiple versions of key-value pairs computed with different model weights. The system may compress stored key-value pairs using quantization or pruning techniques when memory capacity becomes constrained.

The processor may be further configured to maintain the stored computation results in different memory tiers based on access frequency, with frequently accessed results in higher-bandwidth memory tiers and infrequently accessed results in capacity-optimized tiers. Optionally, the tier assignment may be based on access statistics collected over time windows, with exponential decay weighting to emphasize recent access patterns. The system may implement tier migration policies that balance access latency against storage costs, promoting computations to higher tiers when access frequency exceeds thresholds. Background processes may demote computations to lower tiers during periods of low system activity.

The memory tiers may comprise at least a first tier using processor DRAM and a second tier using CXL-attached memory, and wherein the system is configured to migrate computation results between tiers based on predicted access patterns. Optionally, the migration prediction may utilize machine learning models trained on historical access sequences, learning temporal and spatial access patterns specific to different workload types. The system may batch migrations to amortize data movement overhead, accumulating multiple migration requests before executing bulk transfers. The CXL-attached memory may provide expanded capacity for storing large computation histories while maintaining acceptable access latencies for infrequently used results.

The system may further comprise multiple GPUs coupled to the processor, and wherein the processor is further configured to coordinate sharing of computation results across the multiple GPUs accessing common computational patterns. Optionally, the coordination may implement coherency protocols that track which GPUs have cached copies of shared computations, invalidating stale copies when computations are updated. The processor may maintain reference counts for shared computations, preventing premature eviction of results still needed by active GPUs. The sharing may support both read-only access for immutable computations and copy-on-write semantics for computations that may be modified.

The processor may be further configured to implement access control mechanisms that partition stored computation results into isolated domains, allowing sharing within domains while preventing cross-domain access. Optionally, the domains may correspond to different users, experiments, or security contexts, with hardware-enforced isolation preventing unauthorized access to computations. Each domain may implement independent caching policies optimized for specific workload characteristics. The access control may support hierarchical permissions, allowing selective sharing of certain computations across domain boundaries.

The system may further comprise a resource provisioning unit (RPU) configured to translate between GPU interconnect protocols and memory pool access protocols, enabling GPUs using different protocols to access shared computation results. Optionally, the RPU may translate between NVLink, UALink, or other GPU protocols and CXL or DDR protocols used by the memory pool. The translation may preserve semantic information about computation types, enabling protocol-specific optimizations. The RPU may implement caching of protocol translations to reduce translation overhead for repeated access patterns.

The RPU may be further configured to perform address translation between GPU address spaces and memory pool address spaces when accessing stored computation results. Optionally, the address translation may map GPU virtual addresses to physical addresses in the memory pool, maintaining consistency across different GPU architectures. The RPU may implement translation lookaside buffers to cache frequently used address mappings. The translation mechanism may support various page sizes and memory granularities to optimize for different computation result sizes.

The processor may be further configured to identify partial computation matches where portions of calculations overlap, and to store reusable partial results that may be combined to construct complete computations. Optionally, the partial matching may decompose computations into sub-operations, identifying common sub-expressions that appear across different contexts. The system may maintain dependency graphs linking partial results, enabling reconstruction of complete computations through composition. The storage format may support efficient concatenation or merging of partial results without requiring complete recomputation.

In one embodiment, a method for sharing computations through a memory pool infrastructure, comprising: identifying computational patterns that occur multiple times across machine learning workloads executing on at least one GPU; computing results for the identified computational patterns; storing the computation results in a memory pool managed by a processor; receiving requests from the at least one GPU for computations; determining when the requested computations match the stored computation results; retrieving the matching stored results from the memory pool; and providing the retrieved results to the requesting GPU. Optionally, the identification may occur during training or inference by monitoring computation requests and detecting repeated patterns through similarity metrics. The storage may include metadata describing computation parameters, enabling verification that stored results match requested computations. The retrieval may be optimized through prefetching based on predicted access sequences.

Optionally, further comprising: assigning stored computation results to different tiers of the memory pool based on access patterns; migrating results between memory tiers as access patterns change; and evicting least recently used results when memory capacity is exceeded. Optionally, the tier assignment may consider both temporal locality and computational cost, prioritizing retention of expensive computations even if accessed less frequently. The migration may be performed asynchronously to avoid blocking computation requests. The eviction may implement cost-aware policies that consider recomputation expense when selecting results to remove.

Storing the computation results may comprise distributing results across multiple memory channels of the processor to enable parallel access by multiple GPUs. Optionally, the distribution may use consistent hashing or similar techniques to balance load across channels while maintaining predictable result locations. The parallel access may be coordinated through atomic operations or lock-free data structures to avoid contention.

In one embodiment, a system, comprising: a processor functioning as a memory pool with at least 256 GB of memory; first and second GPUs coupled to the processor, wherein the GPUs execute related machine learning workloads; wherein the processor is configured to: maintain a shared computation cache in the memory pool accessible to both GPUs; detect when the first GPU computes results for computational patterns that match patterns requested by the second GPU; and enable the second GPU to retrieve the computed results from the memory pool. Optionally, the detection may analyze computation requests from both GPUs to identify overlapping patterns, using similarity thresholds to determine reusability. The shared cache may implement consistency mechanisms that handle concurrent access and updates from multiple GPUs. The system may prioritize cache space for computations likely to be shared based on workload analysis.

Optionally, wherein the processor is further configured to implement a hierarchical caching scheme with frequently shared computations maintained in processor memory and GPU-specific computations cached in respective GPU memories. Optionally, the hierarchy may dynamically adjust based on sharing patterns, promoting computations from GPU-private to shared cache when accessed by multiple GPUs. The processor may maintain sharing statistics to guide cache placement decisions. The hierarchical organization may reduce memory traffic by keeping private computations local while centralizing shared resources.

The system may further comprise a resource provisioning unit that enables the first GPU using a first interconnect protocol to store computations accessible by the second GPU using a different interconnect protocol. Optionally, the resource provisioning unit may perform necessary protocol and address translations to enable cross-protocol sharing. The unit may maintain mappings between protocol-specific representations of the same computation. The translation may preserve computation semantics while adapting to protocol-specific requirements.

The processor may be further configured to predict future computation needs based on observed patterns and preemptively store computation results in the memory pool before the GPUs request them. Optionally, the prediction may use sequence modeling to learn typical computation progressions in specific workload types. The preemptive storage may be limited by confidence thresholds to avoid excessive memory consumption for unlikely computations. The system may track prediction accuracy and adjust speculation aggressiveness accordingly.

Optionally, the heterogeneous gradient accumulation system may leverage memory pool infrastructure to optimize storage and processing of parameter update values calculated during neural network training. In machine learning, training involves iteratively adjusting model parameters based on gradients, which are mathematical derivatives that indicate how parameters should change to reduce prediction error. During distributed training, multiple GPUs may independently calculate these gradients for different data batches, requiring aggregation before parameters can be updated. Traditional systems may allocate equal memory resources to all gradient values regardless of their impact on model convergence. The memory pool architecture may enable differentiated storage strategies wherein gradient importance determines memory tier allocation and numerical precision. For example, gradient values associated with high angle concentration samples may be stored with full precision in high-bandwidth memory, while gradients from low-signal samples may be compressed and stored in capacity-optimized tiers. The processor functioning as a memory pool may provide dedicated memory regions where GPUs write their calculated gradient values without synchronization barriers, enabling continuous computation while the processor performs aggregation operations. RPUs may translate between different GPU protocols when collecting gradients from heterogeneous accelerators, enabling mixed-precision training across diverse hardware configurations.

In one embodiment, a system, comprising: a processor functioning as a memory pool, the processor coupled to memory; at least one GPU coupled to the processor and configured to calculate parameter update values during neural network training; wherein the processor is configured to: allocate memory regions for storing parameter update values calculated by the at least one GPU; receive the parameter update values from the at least one GPU; characterize the received parameter update values based on at least one metric; assign the parameter update values to different memory tiers based on the characterization; and aggregate the parameter update values from the memory tiers for updating neural network parameters. Optionally, the parameter update values may be gradients computed during backpropagation, representing partial derivatives of a loss function with respect to model parameters. During neural network training, these gradients indicate how each parameter should be adjusted to minimize prediction error. The characterization may analyze gradient magnitudes, wherein larger magnitudes often indicate more important updates that significantly affect model performance. The memory regions allocated by the processor may function as accumulation buffers wherein gradients from multiple training iterations or multiple GPUs are collected before being applied to update model weights. The aggregation may involve mathematical operations such as averaging gradients across multiple GPUs or accumulating gradients over multiple batches before applying updates.

Optionally, wherein the processor is further configured to store parameter update values at different numerical precisions based on the characterization, with higher-magnitude update values stored at higher precision and lower-magnitude update values stored at reduced precision. Optionally, the numerical precision assignment may recognize that gradient values vary widely in their importance to training convergence. Large gradient values that significantly change parameters may require full 32-bit or 64-bit floating point precision to maintain training stability. Smaller gradient values that represent minor adjustments may be stored using 16-bit or 8-bit, with minimal effect on the convergence. The system may dynamically adjust precision thresholds based on training progress, using higher precision during initial training when gradients are large and reducing precision as training stabilizes.

The memory tiers may comprise at least a first tier using processor DRAM for high-magnitude parameter update values and a second tier using CXL-attached memory for low-magnitude parameter update values. Optionally, the tier assignment may be based on gradient magnitude thresholds determined empirically or adaptively during training. High-magnitude gradients that substantially influence parameter updates may be placed in the first tier for rapid access during the parameter update phase. Low-magnitude gradients that represent fine-tuning adjustments may be stored in the second tier. The system may batch parameter updates to efficiently retrieve gradients from different tiers while minimizing memory access overhead.

The memory regions may be organized as separate areas for each GPU in a multi-GPU system, and wherein GPUs are configured to write their calculated parameter update values to assigned areas without waiting for other GPUs to complete their calculations. Optionally, this asynchronous writing may eliminate synchronization barriers that traditionally force all GPUs to wait for the slowest GPU before proceeding. Each GPU may have a designated memory region in the memory pool where it writes gradient values as soon as they are calculated. The processor may track which GPUs have completed writing for each training iteration using flags or counters. While GPUs continue calculating gradients for the next batch, the processor may aggregate previously written gradients, creating a pipeline that overlaps computation with aggregation.

The characterization of parameter update values may incorporate model-intrinsic signals computed during forward passes of the neural network, and wherein update values associated with high-signal data samples are assigned to higher-bandwidth memory tiers. Optionally, model-intrinsic signals such as angle concentration between hidden states may predict which gradients will have larger magnitudes and greater impact on training. During the forward pass when the model processes input data, these signals may be computed with minimal overhead. The system may maintain associations between data samples and their resulting gradients, using signal values to predict gradient importance before gradients are actually calculated. This predictive assignment may enable proactive memory tier allocation, pre-allocating high-bandwidth memory for gradients expected to be important.

The system may further comprise a resource provisioning unit (RPU) configured to translate parameter update value data between protocols utilized by the at least one GPU and protocols utilized by the memory pool. Optionally, the RPU may handle protocol translation when GPUs communicate using NVLink or UALink while the processor uses CXL or DDR protocols. The translation may preserve numerical precision of gradient values while adapting to different data formats between protocols. For example, the RPU may translate between different floating-point representations or handle endianness differences. The RPU may also implement gradient compression during translation, reducing bandwidth requirements for gradient transfer.

The system may comprise multiple GPUs configured to calculate parameter update values for distributed training, and wherein the processor is further configured to coordinate aggregation of update values across the GPUs with tier-aware combination operations. Optionally, in distributed training, each GPU may process a different subset of training data and calculate gradients based on its local batch. The processor may aggregate these gradients by computing their average or sum, depending on the training algorithm. The tier-aware aggregation may process high-precision gradients separately from low-precision gradients to maintain numerical accuracy. For example, high-magnitude gradients in the first tier may be aggregated using full precision arithmetic, while low-magnitude gradients in the second tier may be aggregated using reduced precision to save computation.

The GPUs may be configured to compress parameter update values before writing to the memory regions, and wherein the processor is further configured to decompress the values during aggregation operations. Optionally, compression techniques may include sparsification where only non-zero gradient values are transmitted, significantly reducing data volume for sparse gradients common in large models. Quantization may reduce gradient precision during transmission while maintaining higher precision for aggregation. Top-k selection may transmit only the largest gradient values, which often contribute most to parameter updates. The processor may implement efficient decompression using vector instructions or dedicated hardware, minimizing the computational overhead of compression.

The processor may be configured to maintain historical parameter update values in the memory pool for optimization algorithms that utilize gradient history, with recent values in higher-bandwidth tiers and older values in capacity-optimized tiers. Optionally, advanced optimization algorithms like Adam, RMSprop, or AdaGrad may require access to historical gradient information to compute moving averages or adaptive learning rates. Recent gradients that are frequently accessed for momentum calculations may remain in high-bandwidth memory. Older gradients used for second-order statistics may migrate to capacity tiers. The system may implement sliding window mechanisms that automatically age out old gradients while maintaining the history required by the specific optimization algorithm.

In one embodiment, a method for accumulating parameter update values using memory pool infrastructure, comprising: allocating memory regions in a processor-based memory pool for parameter update values; receiving parameter update values calculated by at least one GPU during neural network training; characterizing the parameter update values based on at least one metric; assigning the parameter update values to different tiers of the processor-based memory pool based on the characterization; storing the parameter update values in their assigned memory tiers; and aggregating the stored parameter update values from their respective tiers to generate combined updates for neural network parameters. Optionally, the parameter update values may be gradients calculated during backpropagation, wherein each gradient represents how much a specific model parameter should change to reduce training loss. The characterization may evaluate gradient magnitudes, with larger magnitudes indicating more significant parameter updates. The aggregation may compute the average of gradients from multiple GPUs or accumulate gradients over multiple batches before applying them to update model weights. The method may overlap gradient reception with ongoing GPU computation to hide communication latency.

Optionally, further comprising: determining precision levels for parameter update values based on their magnitudes; quantizing the values to their determined precision levels before storage; and adjusting precision thresholds during training based on convergence metrics. Optionally, precision determination may assign 32-bit floating point to gradients above a magnitude threshold, 16-bit to intermediate gradients, and 8-bit or lower to small gradients. Quantization may include stochastic rounding to prevent bias in parameter updates. The precision adjustment may monitor training loss trends, increasing precision if convergence stalls or decreasing precision if training is stable, optimizing the tradeoff between memory usage and training accuracy.

In one embodiment, a system, comprising: a processor functioning as a memory pool; first and second GPUs coupled to the processor and configured to calculate parameter update values during distributed neural network training; wherein the processor is configured to: maintain separate memory regions for parameter update values from the first and second GPUs; receive parameter update values from the first and second GPUs; assign the received values to memory tiers based on their magnitudes; and perform weighted aggregation of the values wherein tier assignment influences aggregation weights. Optionally, during distributed training, each GPU may process different timing data and calculate gradients independently. The separate memory regions may prevent write conflicts while allowing asynchronous gradient updates. The magnitude-based tier assignment may place large gradients that significantly affect parameters in high-bandwidth memory. The weighted aggregation may give higher influence to large-magnitude gradients, recognizing their greater importance for parameter updates. For example, gradients in the high-bandwidth tier may receive weight 1.0 while gradients in capacity tiers may receive weight 0.5, reducing the impact of less important updates.

Optionally, further comprising a resource provisioning unit (RPU) configured to enable the first GPU using a first protocol to write parameter update values accessible by the second GPU using a different protocol. Optionally, the RPU may translate gradient data formats between different GPU architectures that use different floating-point representations or tensor layouts. The translation may preserve numerical precision while adapting to protocol-specific requirements. This enables heterogeneous training wherein different GPU types collaborate despite using incompatible native protocols.

The processor may be further configured to implement hierarchical aggregation with local combination of parameter update values within memory tiers before global combination across tiers. Optionally, the local combination may first aggregate gradients within each tier, maintaining precision appropriate to that tier's characteristics. High-precision gradients in the first tier may be aggregated using full precision arithmetic. Low-precision gradients in capacity tiers may be aggregated using reduced precision. The global combination may then merge tier-specific results, potentially using different combination weights for different tiers based on their importance for training convergence.

Optionally, the self-organizing memory topology system may dynamically adapt memory organization based on observed access patterns during machine learning workloads. Traditional memory systems may use static configurations that cannot adapt to changing access patterns as models evolve through training phases or process different data types. The memory pool infrastructure may enable runtime reconfiguration of memory organization, such as channel assignments, interleaving patterns, and/or tier boundaries. By monitoring access patterns from GPUs, the processor functioning as a memory pool may detect phenomena such as sequential streaming, strided access, or random access patterns and adjust memory topology accordingly. For instance, when detecting sequential access patterns common in transformer models processing long sequences, the system may reorganize memory to maximize prefetch efficiency and minimize bank conflicts. When detecting strided access patterns typical of convolution operations, the system may adjust interleaving to align with stride patterns. The system may learn correlations between model states and optimal memory configurations, building a knowledge base that enables predictive topology adjustments. RPUs may facilitate topology adaptation across heterogeneous memory types by translating access patterns between different protocols while preserving optimization benefits. The self-organizing capability may extend to multitenant scenarios wherein different workloads share the memory pool, with the system dynamically partitioning and configuring memory regions based on aggregate access patterns.

In one embodiment, a system, comprising: a processor functioning as a memory pool, the processor coupled to memory via configurable memory channels; at least one GPU coupled to the processor and configured to access the memory during machine learning operations; wherein the processor is configured to: monitor memory access patterns from the at least one GPU; analyze the monitored patterns to identify access characteristics; adjust memory organization based on the identified characteristics; and apply the adjusted organization to subsequent memory accesses. Optionally, the memory access patterns may include sequences of addresses accessed, timing between accesses, and/or access sizes. The analysis may detect patterns such as sequential access wherein consecutive addresses are accessed in order, strided access wherein addresses are accessed at regular intervals, or random access wherein no clear pattern exists. The memory organization adjustment may include modifying how data is distributed across memory channels, changing memory page sizes, or altering prefetch distances. The adjusted organization may be applied transparently to the GPU without requiring software modifications.

Optionally, wherein adjusting memory organization comprises modifying assignment of memory addresses to memory channels to reduce bank conflicts based on the identified access characteristics. Optionally, bank conflicts may occur when multiple accesses target the same memory bank simultaneously, causing serialization of otherwise parallel accesses. The system may detect conflict patterns by monitoring which memory banks are accessed concurrently. The modification may involve remapping logical addresses to physical channels using different interleaving schemes. For example, if the system detects stride patterns that cause conflicts with current interleaving, it may adjust the interleaving granularity to distribute accesses more evenly across channels.

Adjusting memory organization may comprise modifying memory interleaving patterns to align with detected stride patterns in the memory access. Optionally, memory interleaving determines how consecutive addresses map to different memory channels or banks. Standard interleaving may use fixed block sizes that work well for sequential access but may cause conflicts for strided access common in matrix operations. The system may detect stride lengths by analyzing address sequences and adjust interleaving block sizes to match detected strides. For example, if detecting accesses at stride-64 intervals, the system may adjust interleaving to place stride-64 addresses in different channels.

The memory may comprise multiple tiers with different performance characteristics, and wherein adjusting memory organization comprises modifying boundaries between memory tiers based on access frequency distributions. Optionally, the tier boundaries may determine how much memory capacity is allocated to high-bandwidth versus capacity-optimized storage. The system may monitor which memory regions are accessed more frequently versus more rarely. Based on this monitoring, tier boundaries may be adjusted to place frequently accessed regions in higher-performance tiers. The adjustment may be performed gradually to avoid disrupting ongoing operations, with data migration occurring during idle periods.

The processor may be further configured to learn correlations between workload characteristics and optimal memory organizations, and to predict beneficial organizations for new workloads based on learned correlations. Optionally, the learning may build a mapping between workload features such as model type, layer configurations, or batch sizes and memory organizations that provided good performance. The prediction may use similarity matching to identify new workloads that resemble previously seen workloads. The system may maintain a repository of organization templates that can be quickly applied when similar workloads are detected. The learning may be continual, refining predictions based on observed performance of applied organizations.

The system may further comprise a resource provisioning unit (RPU) configured to translate memory access patterns between protocols utilized by the at least one GPU and protocols utilized by the processor memory pool while preserving pattern characteristics. Optionally, the RPU may translate access patterns expressed in GPU protocols like NVLink or UALink to patterns compatible with processor memory protocols like CXL or DDR. The translation may preserve pattern semantics such as stride lengths or locality characteristics even when protocol differences require different addressing schemes. The RPU may buffer and reorder accesses to maintain pattern coherence across protocol boundaries.

The system may comprise multiple GPUs accessing the memory pool, and wherein the processor is further configured to coordinate memory organization adjustments based on aggregate access patterns from the multiple GPUs. Optionally, different GPUs may exhibit different access patterns based on their assigned workloads or model partitions. The processor may analyze combined patterns to identify common characteristics that benefit all GPUs or detect conflicts wherein different GPUs prefer different organizations. The coordination may implement time-division wherein memory organization alternates between configurations optimized for different GPUs, or space-division wherein different memory regions use different organizations.

The adjust of the memory organization may comprise modifying prefetch policies based on detected sequential or strided access patterns. Optionally, prefetching may anticipate future memory access and retrieve data before it is explicitly requested. The system may adjust prefetch distances based on detected stride lengths, prefetch aggressiveness based on pattern confidence, and/or prefetch directions based on access sequences. For sequential patterns, aggressive prefetching may hide memory latency. For random patterns, prefetching may be reduced to avoid cache pollution.

The processor may be further configured to implement different caching policies for different memory regions based on their observed access patterns, with streaming regions using bypass caching and reused regions using inclusive caching. Optionally, streaming data that is accessed once and then discarded may bypass caches to avoid evicting useful data. Frequently reused data may be cached aggressively to minimize memory accesses. The system may dynamically classify memory regions based on reuse distance analysis and apply appropriate caching policies. The classification may be updated as access patterns evolve during workload execution.

In one embodiment, a method for dynamically organizing memory topology, comprising: monitoring memory access patterns from at least one GPU accessing a memory pool; identifying characteristics of the access patterns; determining memory organization adjustments based on the identified characteristics; applying the adjustments to the memory pool configuration; and servicing subsequent memory accesses using the adjusted organization. Optionally, the monitoring may collect access traces including addresses, timestamps, and access types. The characteristic identification may use pattern recognition algorithms to classify access behaviors. The adjustment determination may use lookup tables mapping pattern types to recommended organizations or optimization algorithms that compute optimal configurations. The application may be performed incrementally to minimize disruption to ongoing operations.

Optionally, further comprising: recording correlations between access patterns and applied organizations; evaluating performance metrics for different organizations; learning optimal organizations for pattern types based on the evaluations; and predicting beneficial organizations for new workloads based on learned correlations. Optionally, the performance metrics may include memory bandwidth utilization, access latency, and bank conflict rates. The learning may use supervised learning wherein performance metrics provide feedback signals, or reinforcement learning wherein the system explores different organizations and learns from results. The prediction may extract features from new workloads and match them against learned patterns to select appropriate organizations.

Applying adjustments may comprise migrating data between memory tiers based on access frequency patterns, with frequently accessed data promoted to higher-bandwidth tiers. Optionally, the migration may use access counters to track which memory pages or regions are accessed most frequently. The promotion may occur when access frequency exceeds thresholds calibrated to tier capacities. The system may implement hysteresis to prevent oscillation between tiers. Background migration may overlap with normal operations using spare memory bandwidth.

In one embodiment, a system, comprising: a processor functioning as a memory pool shared by multiple machine learning workloads; wherein the processor is configured to: partition the memory pool into regions assigned to workloads; monitor access patterns for at least one of the regions; apply memory organizations to one or more regions based on their respective access patterns; and dynamically adjust region boundaries and organizations as workloads evolve. Optionally, each workload may have distinct access patterns that may benefit from specific optimizations. The monitoring may maintain separate pattern statistics for each region or aggregate statistics for groups of regions. The per-region organization may include interleaving schemes, prefetch policies, or tier allocations that may be optimized for each workload's characteristics. Some regions may share the same organization when their workloads have similar patterns. The dynamic adjustment may respond to workload phase changes such as transitions from training to inference or from forward to backward passes.

Optionally, further comprising a resource provisioning unit configured to enable workloads using one or more interconnect protocols to share the adaptively organized memory pool. Optionally, the resource provisioning unit may translate between protocols while preserving the benefits of adaptive organization. Workloads may use various GPU types with potentially incompatible native protocols. Some workloads may use the same protocol while others use different protocols. The translation may maintain pattern characteristics that enable effective organization regardless of protocol variations.

The processor may be further configured to implement collaborative learning wherein at least some organization patterns successful for one workload are adapted for other workloads sharing the memory pool. Optionally, the collaborative learning may identify commonalities between workloads such as similar model architectures or data types. Successful organizations from one workload may be used as starting points for new workloads with similar characteristics, potentially reducing the time needed to discover optimal configurations. The system may maintain a shared knowledge base of organization patterns accessible to workloads while preserving isolation of actual data.

The processor may be further configured to detect interference between access patterns of multiple workloads and adjusts organizations to reduce cross-workload performance impact. Optionally, interference may occur when workloads compete for the same memory resources or when their access patterns conflict. The detection may identify correlation between one workload's activity and another's performance degradation. The adjustment may include temporal isolation where workloads are given exclusive access during time slices, spatial isolation where conflicting workloads use separate memory channels, or pattern-aware scheduling that interleaves accesses to reduce conflicts. Some workloads may not interfere with each other and may share resources without adjustment.

Optionally, the integrated signal-guided memory infrastructure may combine multiple optimization techniques to create a comprehensive memory management system for machine learning workloads. The system may integrate signal-based memory allocation, computation sharing, gradient management, and/or adaptive topology organization within a unified memory pool architecture. By combining these capabilities, the system may achieve synergistic benefits wherein each component enhances the effectiveness of others. For instance, model-intrinsic signals used for memory tier allocation may also guide computation caching decisions and gradient precision assignment. The shared memory pool may serve multiple purposes simultaneously, such as storing cached computations, accumulating gradients, and/or providing extended memory capacity for GPUs. RPUs may enable these integrated capabilities across heterogeneous hardware by translating between different protocols while preserving optimization benefits. The system may implement coordinated learning wherein patterns discovered by one optimization component inform decisions in other components. For example, access patterns learned by the topology optimizer may guide prefetching decisions for cached computations. The integrated architecture may support complex distributed training scenarios wherein multiple GPUs process different model components while sharing memory resources efficiently. The system may adapt to workload transitions such as switching between training and inference phases by reconfiguring the components in a coordinated manner.

In one embodiment, a system, comprising: a processor functioning as a memory pool, the processor coupled to memory; at least one GPU coupled to the processor via an interconnect; wherein the processor is configured to: compute model-intrinsic signals from a machine learning model during forward passes; allocate data samples to memory tiers based on the model-intrinsic signals; identify computational patterns that occur multiple times across workloads; store computation results from the identified computational patterns in the memory; and utilize the model-intrinsic signals to determine memory tier placement for both the data samples and the stored computation results. Optionally, the model-intrinsic signals may serve dual purposes, such as guiding allocation of training data and determining importance of cached computations. High-signal data samples that produce important gradients may have their associated computations cached in high-bandwidth memory tiers. The system may recognize that computations for high-signal samples are likely to be reused in subsequent epochs and prioritize their retention. The unified signal framework may reduce overhead by computing signals once and using them for multiple optimization decisions.

Optionally, wherein the processor is further configured to: receive parameter update values calculated by the at least one GPU during training; assign the parameter update values to memory tiers based on correlation with the model-intrinsic signals; and maintain the stored computation results and the parameter update values in a shared tier hierarchy. Optionally, the shared tier hierarchy may efficiently utilize memory capacity by recognizing that cached computations and accumulated gradients have different temporal access patterns. Cached computations may be read frequently but written rarely, while gradients may be written once per iteration and read during parameter updates. The system may implement different eviction policies for different data types within the same tier, preserving important computations while allowing gradient turnover.

The processor may be further configured to: monitor access patterns for at least one of the data samples, the stored computation results, or the parameter update values; adjust memory organization including channel assignments and interleaving patterns based on the monitored patterns; and coordinate the adjustments with the memory tier assignments to maintain performance. Optionally, the memory organization adjustments may consider the tier structure when optimizing topology. High-bandwidth tiers may use interleaving optimized for random access patterns typical of cached computation lookups. Capacity tiers may use sequential organization optimized for streaming gradient accumulation. The coordination may prevent topology changes from disrupting tier boundaries or causing excessive data migration.

The system may comprise multiple GPUs coupled to the processor, and wherein the processor is configured to: coordinate memory tier assignments across the multiple GPUs; enable sharing of the stored computation results among the multiple GPUs; and aggregate parameter update values from the multiple GPUs with tier-aware reduction operations. Optionally, the coordination may implement global optimization that considers resource needs of the GPUs rather than optimizing for essentially each of the GPUs independently. Shared computations may be placed in tiers accessible with acceptable latency to the consuming GPUs. The tier-aware reduction may process high-precision gradients from high-bandwidth tiers separately from compressed gradients in capacity tiers, maintaining numerical accuracy while optimizing memory bandwidth usage.

The system may further comprise a resource provisioning unit (RPU) configured to translate between different protocols utilized by the multiple GPUs and protocols utilized by the processor memory pool, wherein the RPU preserves signal information and pattern characteristics during translation. Optionally, the RPU may translate signal values computed in different numerical formats used by heterogeneous GPUs to a common format for unified tier assignment. Pattern characteristics such as stride lengths or access localities may be preserved even when address spaces differ between protocols. The RPU may implement signal-aware compression during translation, applying different compression levels based on signal values.

The processor may be further configured to implement predictive allocation by: learning relationships between the model-intrinsic signals and future resource requirements; pre-allocating memory resources based on predicted requirements; and prefetching the stored computation results based on signal evolution patterns. Optionally, the learning may discover that certain signal patterns precede increased memory demands or computation reuse. For example, decreasing angle concentration may indicate transition to a new training phase requiring different cached computations. The pre-allocation may reserve memory capacity in appropriate tiers before demand materializes. Prefetching may move computations from capacity tiers to high-bandwidth tiers based on predicted access patterns.

The processor may be further configured to maintain a unified learning system that: records performance metrics for different combinations of tier assignments, cached computations, and memory organizations; identifies successful configuration patterns; and applies learned patterns when detecting similar workload characteristics. Optionally, the unified learning system may discover complex interactions between different optimization components. Certain memory organizations may work well with specific tier configurations but poorly with others. The system may learn these interactions and apply holistic optimizations rather than optimizing each component independently. The learned patterns may be stored persistently and shared across different training runs or model variations.

In one embodiment, a method for integrated memory optimization, comprising: computing model-intrinsic signals during forward passes of a machine learning model; allocating training data to memory tiers based on the signals; identifying and storing reusable computation results in the memory tiers; receiving parameter update values from at least one GPU; assigning the parameter update values to memory tiers based on the signals; and coordinating tier assignments for the training data, the computation results, and the parameter update values to optimize overall memory utilization. Optionally, the coordination may implement joint optimization that considers memory capacity constraints, bandwidth requirements, and access patterns for the data types. The method may dynamically rebalance tier allocations as workload characteristics change, such as when transitioning from forward to backward passes or when gradient magnitudes evolve during training. The signal computation may be performed once per iteration and reused for multiple allocation decisions.

Optionally, further comprising: monitoring performance metrics during execution; detecting workload phase transitions based on signal evolution; reconfiguring memory tiers, computation caching, and topology settings in response to detected transitions; and maintaining operation continuity during reconfiguration. Optionally, phase transitions may include shifts from exploration to exploitation in reinforcement learning, transitions between training and validation, or changes in batch size or learning rate. The reconfiguration may be coordinated across the optimization components to prevent conflicts. Operation continuity may be maintained using double buffering or gradual transition strategies that avoid disrupting ongoing computations.

In one embodiment, a system, comprising: a processor functioning as a memory pool with at least 512 GB of memory organized in multiple tiers; first and second GPUs coupled to the processor via high-speed interconnects; wherein the processor is configured to: compute model-intrinsic signals from machine learning models during forward passes; store reusable computation results from identified computational patterns in the memory; aggregate parameter update values received from the first and second GPUs; adjust memory organization comprising channel assignments and interleaving patterns based on observed access patterns; and utilize the model-intrinsic signals to coordinate memory tier assignments for at least two of: training data, the computation results, or the parameter update values. Optionally, the integrated configuration may allow the processor to use computed signals for multiple optimization decisions simultaneously. The processor may maintain separate data structures for tracking computation patterns, gradient accumulations, and access patterns while using unified signal values to guide tier assignments across all data types. The memory tiers may implement quality-of-service mechanisms preventing any single function from monopolizing resources. The processor may expose monitoring interfaces that allow observation of each optimization function's performance.

Optionally, wherein the first GPU is configured to process a first portion of a distributed training workload and the second GPU is configured to process a second portion, and wherein the processor is further configured to coordinate resource allocation to balance performance across both portions. Optionally, the portions may represent different layers in model parallelism, different data batches in data parallelism, or different pipeline stages in pipeline parallelism. The coordination may monitor progress of each portion and adjust resource allocations to prevent bottlenecks. For example, if the first GPU processes more compute-intensive layers, it may receive priority for cached computations while the second GPU receives priority for gradient accumulation bandwidth.

The processor may be further configured to partition resources to support multiple independent training jobs, with each job receiving isolated memory regions while sharing optimization benefits. Optionally, the partitioning may provide security isolation between different users or experiments while still benefiting from shared infrastructure. Each partition may maintain separate signal statistics and optimization parameters. However, learned patterns from one partition may inform initial configurations for new partitions with similar workloads, accelerating optimization while maintaining data isolation.

The system may further comprise first and second resource provisioning units (RPUs) configured to enable the first and second GPUs to utilize different interconnect protocols while accessing the shared memory pool. Optionally, the first GPU may use NVLink while the second GPU uses UALink, with the respective RPUs translating to a common memory pool protocol such as CXL. The translation may preserve signal values and pattern characteristics despite protocol differences. The RPUs may coordinate to prevent protocol-specific optimizations from conflicting when accessing shared resources.

The processor may be further configured to implement fault tolerance by: maintaining redundant copies of computation results identified as critical based on recomputation cost; checkpointing gradient accumulation states periodically; and preserving signal history and learned patterns through failures. Optionally, critical computations may be identified based on recomputation cost and reuse frequency. Redundant copies may be stored in different memory tiers or channels to survive single-point failures. Gradient checkpointing may enable recovery from failures without restarting training from the beginning. Signal history and learned patterns may be persisted to non-volatile memory, allowing rapid restoration of optimized configurations after recovery.

The processor may be further configured to monitor at least one of: memory bandwidth utilization across tiers, cache hit rates for the stored computation results, gradient aggregation throughput, or effectiveness of the memory organization adjustments; and wherein the processor is further configured to adjust, based on the monitoring, operational parameters comprising at least one of: tier allocation thresholds, computation retention policies, or memory interleaving configurations. Optionally, the monitoring may detect performance degradation in any optimization function and trigger rebalancing. For example, if cache hit rates decline, the processor may adjust retention policies to keep more computations in memory or modify tier allocation thresholds to place more computations in high-bandwidth tiers. If gradient aggregation becomes a bottleneck, the processor may adjust precision levels or modify tier boundaries to allocate more high-bandwidth memory to gradient accumulation. The operational parameters may be adjusted using control loops that maintain stability while adapting to changing conditions. The processor may implement minimum and maximum bounds for each parameter to prevent extreme adjustments that could destabilize the system.

In one embodiment, a system for disaggregated memory pooling may address memory capacity limitations encountered in advanced data-centric AI training methodologies. Certain training techniques, such as curriculum learning, may involve a data evaluation phase wherein a model performs a forward pass on an entire training dataset. This process may generate large volumes of intermediate model state tensors, such as activations or hidden states, whose aggregate size can exceed the combined HBM capacity of the GPUs performing the computation. This embodiment may utilize a processor functioning as a memory pool to provide a large, centralized memory capacity, which allows for the disaggregation of memory, enabling GPUs to offload these intermediate tensors to the processor's memory pool. The hardware's ability to receive, store, and provide access to tensors at a scale beyond the GPUs' local memory capacity enables scalable computation of training-related metadata, such as training suitability signals.

In one embodiment, a system, comprising: a processor functioning as a memory pool, the processor coupled to memory having a first memory capacity; and a plurality of GPUs coupled to the processor via one or more interconnects, wherein each of the plurality of GPUs comprises local high-bandwidth memory (HBM) having a second memory capacity, and wherein a combined capacity of the local HBM of the plurality of GPUs is less than the first memory capacity; wherein the processor is configured to: receive, from the plurality of GPUs over the one or more interconnects, intermediate model state tensors generated during a data evaluation phase of an AI training workload; store the received intermediate model state tensors in the memory, wherein an aggregate size of the stored intermediate model state tensors exceeds the combined capacity of the local HBM of the plurality of GPUs; and provide access to the stored intermediate model state tensors for computation of training suitability signals used to generate a training curriculum. Optionally, the GPUs may process subsets of a large dataset and, instead of being constrained by their local HBM capacity for storing intermediate results, they may offload at least some of the generated tensors to the much larger memory pool provided by the processor. The processor's function is to aggregate these tensors from multiple GPU sources, effectively creating a complete, dataset-wide collection of intermediate model states that would be too large to hold in GPU memory. The system then makes this aggregated data available for further processing, such as the computation of signals that inform a training curriculum.

Optionally, the processor comprises a resource provisioning unit (RPU) configured to perform the receiving of the intermediate model state tensors by translating between interconnect protocols utilized by the plurality of GPUs and memory access protocols utilized by the processor. Optionally, the RPU may be integrated within or coupled to the processor to manage the data flow between the GPUs and the memory pool. The RPU may perform protocol translation, for example, converting GPU-native protocol packets, such as NVLink or UALink packets, into memory transactions that are compatible with the processor's memory subsystem. This translation may include handling differences in address formats, data ordering, and transaction semantics, providing a seamless data path for the tensors to be offloaded from the GPUs to the memory pool.

In some implementations, the interconnect protocols utilized by the plurality of GPUs comprise at least one of NVLink, UALink, CXL, or PCIe. Optionally, the system may be designed to interface with a variety of industry-standard GPU interconnects. The RPU's translation capabilities may allow it to support GPUs utilizing different protocols, for example, enabling a heterogeneous environment wherein GPUs from different vendors or generations can all contribute to the data evaluation phase by offloading their intermediate tensors to the common memory pool.

The processor may be further configured to compute the training suitability signals by executing instructions on one or more of its processing cores, utilizing the stored intermediate model state tensors as input data retrieved from the memory. Optionally, the processor that manages the memory pool may also be tasked with computing the training suitability signals. By performing this computation on its own cores, the processor may take advantage of its low-latency, high-bandwidth access to the stored tensors. This configuration may also free up the GPUs to perform other tasks in parallel, such as continuing to process additional data samples or beginning training on an initial set of data.

The processor may be configured to receive and store the intermediate model state tensors from one of the plurality of GPUs asynchronously, enabling a data transfer of the tensors to overlap with continued generation of other intermediate model state tensors by the same GPU or other GPUs in the plurality of GPUs. Optionally, the system may support asynchronous operations to improve throughput. The processor may be configured with direct memory access (DMA) engines or similar hardware to manage the data transfers from the GPUs without requiring active intervention from the processor's cores for every transaction. This allows the GPUs to initiate a transfer of a completed batch of tensors and immediately begin work on the next batch, effectively hiding the communication latency behind computation.

The processor may be further configured to provide the computed training suitability signals, or a data structure derived from the training suitability signals, to the plurality of GPUs to control data sample selection during a subsequent training phase. Optionally, after the training suitability signals are computed, the hardware provides a data path for this information to be delivered back to the GPUs. This may involve the processor writing the signals, or a data structure derived from them such as a sorted index list, back to the GPUs' local HBM or to a region of the memory pool that the GPUs can access. This completes the data flow loop, wherein the hardware enables the offload of tensors for analysis and the subsequent return of the analysis results to guide the GPUs' training operations.

Optionally, a system for curriculum-aware tiered memory management may improve the performance of AI training workloads that utilize curriculum learning. Once a training curriculum is established, a large curriculum-ordered multi-terabyte dataset may be generated and stored in a high-capacity memory tier, separate from the GPUs' local HBM. However, the non-uniform and dynamic access patterns dictated by a curriculum can lead to latency penalties and GPU stalls if data is not fetched efficiently from the memory tier. This embodiment implements a tiered memory architecture wherein a processor, functioning as a memory pool manager, is made aware of the high-level logic of the training curriculum's sampling policy. By monitoring the state of the policy, the processor may anticipate future data requests and proactively prefetch the necessary data subsets from the larger memory tier into the GPUs' local HBM. This predictive prefetching, which may be overlapped with ongoing GPU computation, may hide memory access latency and help maintain high computational throughput during the training phase.

In one embodiment, a system, comprising: a processor functioning as a memory pool, the processor coupled to memory; a plurality of GPUs coupled to the processor, wherein each of the plurality of GPUs comprises local high-bandwidth memory (HBM); wherein the system implements a tiered memory architecture comprising a first tier including the local HBM of the plurality of GPUs and a second tier including the memory coupled to the processor; a curriculum-ordered dataset stored in the second tier; and wherein the processor is configured to: monitor a state of a dynamic sampling policy utilized by the plurality of GPUs to select data subsets from the curriculum-ordered dataset; predict, based on the monitored state and an update logic of the dynamic sampling policy, a future data subset to be selected; and prefetch the predicted future data subset from the second tier to the first tier to overlap a data transfer of the future data subset with computation performed by the plurality of GPUs. Optionally, the system creates a synergistic relationship between the training software and the memory hardware. The processor, acting as the manager of the second memory tier, is not merely a passive data store, but may actively participate in the training loop by observing the behavior of the dynamic sampling policy. By understanding the rules that govern how the sampling focus shifts over time, the processor can move from reactive data serving to proactive data placement, fetching the next required blocks of data into the fast, first-tier HBM before the GPUs explicitly request them.

Optionally, the state of the dynamic sampling policy comprises at least one of: a current sampling location within the curriculum-ordered dataset, a training progress metric, or a model performance metric. Optionally, the processor may monitor various signals to inform its predictions. The state may include a direct pointer or index indicating the current center of sampling activity. In other embodiments, the processor may monitor higher-level training metrics, such as epoch count, loss values, or model accuracy, which may serve as inputs to the sampling policy's update logic, allowing the processor to calculate the policy's next state in parallel with the training framework.

Additionally, the curriculum-ordered dataset is structured based on at least one of: a sorted list of data samples, a plurality of prioritized data subsets, or a weighted distribution of data samples. Optionally, the prefetching mechanism may be adapted to various curriculum structures. For a dataset sorted by a suitability signal, the processor may prefetch a contiguous block of data. If the curriculum is organized into discrete subsets or buckets of varying priority, the processor may prefetch data from the next-highest-priority subset. The system's predictive capabilities may be configured to handle these different logical arrangements of the training data.

The second tier may be configured as a read-optimized memory tier, and the processor may be further configured to utilize broadcast or multicast mechanisms to serve the prefetched data to multiple GPUs of the plurality of GPUs concurrently. Optionally, since a curriculum-ordered dataset is typically created once and then read many times during training, the second tier may be architected with asymmetric bandwidth, favoring read operations. When prefetching a data subset that will be used by multiple GPUs, for example in data-parallel training, the processor may use a single read operation from its memory and broadcast or multicast the data over the interconnects to all relevant GPUs, improving bandwidth efficiency.

In certain aspects, the prefetch is performed via a resource provisioning unit (RPU) configured to translate memory access requests for the second tier, generated by the processor, into interconnect protocol messages directed to the first tier of one or more of the plurality of GPUs. Optionally, the physical movement of data for the prefetch operation may be managed by an RPU. The processor, upon predicting which data subset is needed, may issue internal memory read requests to its own memory controllers. The resulting data may then be routed to the RPU, which translates it into the appropriate interconnect protocol, for example NVLink or UALink, for transmission to the target GPUs' local HBM.

The processor may be further configured to dynamically adjust a size or a scope of the prefetched future data subset based on at least one of: available bandwidth on an interconnect between the processor and the plurality of GPUs, or available capacity in the first tier. Optionally, the prefetching logic may be adaptive, and the processor may monitor the system's interconnect traffic and the current HBM utilization on the GPUs. If bandwidth is high and HBM has ample free space, it may prefetch a larger data subset, looking further ahead in the curriculum. If the system is congested or HBM is constrained, it may reduce the prefetch size to a smaller, more immediate subset to avoid evicting useful data or saturating the interconnect.

Furthermore, the dynamic sampling policy comprises a stateful algorithm that adjusts its data selection focus based on model learning progress. Optionally, the dynamic sampling policy may be any algorithm in which the selection of data is not static or random but evolves based on the state of training. For instance, a policy may be implemented wherein a Gaussian sampling window is initially focused on "easy" samples at the beginning of the curriculum-ordered dataset. As the model's accuracy, a monitored state metric, improves, the processor can predict that the policy's update logic will shift the mean of the Gaussian window towards more difficult samples located further into the dataset, and prefetch accordingly.

DRAM components and DRAM modules can be classified based on various characteristics, including DRAM generation (e.g., DDR4, DDR5), interface speed (e.g., 3200 MT/s, 5600 MT/s), and capacity or density (e.g., 64 GB, 96 GB, 256 GB), wherein capacity typically refers to DRAM modules, while density typically refers to DRAM components and may be expressed in bits rather than bytes. DRAM modules, specifically, may be further classified based on form factor (e.g., RDIMM, SO-DIMM, EDSFF E3.S), Error Correction Code (ECC) configuration (e.g., EC8), and rank organization (e.g., 1R×4, 1R×8, 2R×8), which pertains to the module's memory access structure. For example, a 32 GB DDR5-4800 1R×4 EC8 RDIMM, which is commonly used in servers and includes additional storage for ECC, includes a single 80-bit rank composed of 20×4 DDR5 components. Since the RDIMM module's total raw capacity, including the 25% ECC overhead of EC8, is 40 GB (i.e., 32 GB×1.25), it follows that each DDR5 component in the RDIMM holds 2 GB, or 16 Gb, of data. This is determined by dividing the module's total raw capacity (40 GB) by the 20 components.

A DRAM component may be mounted using various mounting configurations. Examples of mounting configurations may include: (i) a Memory Module, such as a Dual In-line Memory Module (DIMM), which may be inserted into a corresponding physical memory slot; (ii) direct mounting on a motherboard or mainboard, including soldering the DRAM component to the motherboard, which may eliminate the need for additional module interfaces; (iii) mounting on a daughtercard or mezzanine board, which may provide flexibility in system architecture and expansion capabilities; (iv) integration within a Multi-Chip Module (MCM) package, which may combine integrated circuit dies into a single package; or (v) incorporation into a superchip configuration, such as NVIDIA Grace-Hopper superchip that integrates processing and memory capabilities. These mounting configurations (including the optional soldering of the DRAM component to the motherboard) may provide different options for implementing the memory pool's mainstream DRAM components while maintaining compatibility with the system's memory interfaces and the RPU, wherein different mounting options may offer distinct advantages in terms of system integration, expandability, and performance characteristics.

Although the individual capacity and internal structure of the memory components on the DIMM is oftentimes overlooked, it has a significant impact on the manufacturing complexity and production yield (and hence, on the manufacturing cost) of the memory module. A memory component is delivered as an IC package that may encapsulate a single silicon die of memory, typically referred to as Single-Die Package (SDP) technology, or two silicon dies of memory, typically referred to as Dual-Die Package (DDP) technology, or a larger number of memory dies typically organized in a 3D Stacking (3DS technology) and interconnected using Through-Silicon Via (TSV). The capacity of a memory die in the package is typically referred to as die density, or DRAM die density. As of 2024, typical DDR5 die densities are 16 Gb, 24 Gb and the recently introduced 32 Gb per die.

The DRAM die density and the internal structure utilized in the packaging of the memory components (e.g., SDP, DDP, 3DS) determine the total raw capacity of the memory module. The module's ECC configuration further determines the effective usable capacity of the module. A standard DDR5 RDIMM memory module form-factor holds up to 40 memory components, with up to 20 components per side of the memory module. Assuming that 16 Gb DDR5 memory dies are encapsulated in memory components using SDP technology, the maximum raw capacity of the RDIMM is calculated as 80 GB=((40 components×16 Gb per component)/(8 bits per byte)). After accounting for the 25% ECC overhead in EC8 configurations, the maximum effective usable capacity of the RDIMM is 64 GB (80 GB÷1.25).

Achieving higher RDIMM module capacities requires higher-density packaging technologies such as DDP and 3DS that are more complex and more expensive to manufacture. SDP is a lower-density and less complex packaging technology to manufacture. DDP is a higher-density and more complex packaging technology than SDP since it requires placing two memory dies within the same package, oftentimes one die on top of each other, and then typically use wirebond assembly to connect the top die to the bottom die or to the package contacts. 3DS is typically higher-density and significantly more complex packaging technology than DDP. It requires high-precision placement of memory dies, sometimes up to 16, in a 3D Stack, typically using advanced TSV interconnect. Due to the high precision required in 3DS, manufacturing defects typically occur at a higher rate, leading to lower production yield, which in turn increases overall manufacturing costs.

As of 2024, higher-density and more complex DDP and 3DS packaging technologies enable increased RDIMM module capacities. Utilizing 16 Gb memory dies encapsulated in DDP-based memory components effectively doubles the maximum RDIMM capacity from 64 GB, as achieved with SDP-based memory components, to 128 GB. Likewise, attaining a 256 GB RDIMM capacity while maintaining a 16 Gb per-die density necessitates 3DS-4H technology, in which a memory component incorporates four vertically stacked DRAM dies.

The cost per GB of DRAM DIMMs increases with the density of the packaging technology (e.g., SDP, DDP, 3DS) due to several factors. Manufacturing complexity is a significant contributor; higher-density packaging requires more sophisticated manufacturing processes, which elevate production costs. Additionally, yield rates for higher density memory components are typically lower, as the manufacturing process becomes more intricate and prone to defects, thereby increasing costs. The need for enhanced performance and reliability in higher density DIMMs also contributes to the higher cost per GB. These modules often incorporate advanced features to ensure optimal performance and durability, which further drives up costs.

FIG. 130 is an example of mainstream and non-mainstream DRAM component costs as of 2024. It shows that the approximate representative relative costs of SDP vs. DDP vs. 3DS may be 1:1.5:5, reflecting the higher manufacturing complexity of the memory components and the loss of yield due to the assembly process. Hence, the cost per GB of memory is higher with DDP compared to SDP, and significantly higher cost per GB with 3DS. In the previous examples with 16 Gb DRAM die density, the approximate normalized cost of one GB in the 64 GB RDIMM is "1" (lowest, considered as Mainstream DIMM), whereas the approximate normalized cost of one GB in the 128 GB RDIMM is "1.5" (50% higher cost per GB than SDP), and the approximate relative normalized cost of one GB in the 256 GB RDIMM is "5" (400% higher than SDP per GB, considered as High-Capacity DIMM). Market demand is also a contributing factor in pricing. Specialized applications that require higher memory capacities, such as Large Language Model (LLM) artificial intelligence (AI) applications and high-performance computing (HPC) systems, justify a premium price for advanced memory components that utilize DDP and 3DS, thereby influencing market pricing. Consequently, as of 2024, the cost per gigabyte (GB) for mainstream SDP-based DIMMs is approximately $3, whereas the highest-capacity commercially available 3DS-based DIMMs are priced at around $15 per GB, demonstrating the substantial cost escalation associated with higher-density memory modules.

The price of CPUs increases with the number of cores and supported sockets due to multiple factors. Some of these factors are associated with increased production costs, including larger die sizes, higher complexity, enhanced performance requirements, and more demanding manufacturing processes. Other factors arise from vendor marketing and pricing strategies.

As of 2024, server-grade CPUs, such as the Intel Xeon series, that feature fewer cores and support only single-socket server designs typically range in price from $300 to $500, with examples such as the Intel Xeon Bronze 3408U, which is priced at approximately $415. Dual-processor server CPUs with comparable number of cores are generally priced between $500 and $2000 per unit, with models like the Intel Xeon Gold 5415+ priced at around $1,000. As the number of supported CPU sockets increases, CPU prices rise significantly; CPUs designed for four, eight, sixteen, and thirty-two socket servers can be priced at several thousand dollars each. For instance, high-end models such as the Intel Xeon Platinum 8490H, which supports 8-socket configurations, can exceed $17,000 per unit.

One contributing factor for this price increase is the higher costs associated with the increased complexity and sophistication required to support multiple CPUs within a single system. Multi-socket servers necessitate advanced architectures to efficiently manage inter-processor communication, maintain synchronization, and balance workloads. These requirements demand more sophisticated hardware and firmware, thereby increasing manufacturing costs. Additionally, the development and validation flows for multi-socket CPUs are more rigorous and expensive, further contributing to the overall costs.

Moreover, multi-socket CPUs often include advanced features such as higher core counts, larger caches, and support for greater amounts of memory, all of which add to their price. For example, an 8-socket CPU must handle intricate data pathways and synchronization tasks, necessitating additional circuitry and design innovations. The market demand for such high-performance, multi-socket CPUs is generally concentrated in specialized fields like high-performance computing (HPC), big-data applications, and high-density cloud environments, wherein performance, platform density and reliability are critical. Consequently, the limited production volume and specialized nature of these CPUs also contribute to their higher cost per unit compared to single and dual-processor CPUs.

Another significant factor influencing CPU pricing is the marketing and pricing strategies of processor vendors. Vendors typically set higher prices for CPUs that support an increased number of sockets, reflecting the added value and enhanced performance capabilities of multi-socket processors. High-end CPUs are positioned as premium products due to their ability to handle demanding workloads and support complex applications, thereby commanding a higher market price.

Moreover, in many high-end CPU designs, the speed of DRAM access is influenced by the number of DIMMs installed per memory channel. For example, the Intel Xeon Platinum 8480+ achieves memory speeds of up to 4800 MT/s with one DIMM per channel (1DPC), decreasing to 4400 MT/s with two DIMMs per channel (2DPC). Similarly, the AMD EPYC 9654 supports up to 4800 MT/s with one DIMM per channel (1DPC), reducing to 4000 MT/s with two DIMMs per channel (2DPC). This characteristic is due to the increased complexity of managing multiple memory components per channel and the higher electrical load on the memory subsystem. To maintain higher memory speeds while increasing total memory capacity, system designers often opt for higher-density DIMMs such as 256 GB Registered DIMMs (RDIMMs), which incorporate higher-density DRAM components utilizing 3D-Stacking (3DS) packaging technology. These higher-density DIMMs enable greater total memory capacity while reducing the number of required DIMM slots, thereby preserving higher memory speeds. However, this approach introduces additional cost considerations. As of 2024, higher-density DIMMs, such as 256 GB or 512 GB modules, are significantly more expensive per gigabyte compared to lower-density modules, often by a factor of 1.5 to 5 times or more.

Consequently, system designers face a trade-off between memory speed, capacity, and cost. Opting for higher-density DIMMs to maintain speed while increasing capacity significantly raises the overall system cost. This factor contributes to the non-linear increase in system prices as memory capacity grows, especially in high-performance computing (HPC) and AI environments wherein both speed and capacity are critical.

The need for higher-density DIMMs becomes even more pronounced in large-memory platforms that utilize multi-socket configurations, wherein each CPU socket requires substantial memory capacity. In such configurations, the use of high-density DIMMs is often necessary or even inevitable to balance performance and capacity requirements, further escalating the system cost. This interplay between DIMM density, processor model, memory speed, and system cost underscores the complexity of designing high-performance computing systems with large memory capacities. It also explains why the cost per gigabyte of memory in very high-capacity systems can be significantly higher than in systems with more moderate memory configurations.

To address the challenges associated with constructing high-capacity memory systems, several of the following embodiments present innovative approaches that enable the creation of large memory capacity systems using mainstream DIMMs and servers with single processors or a limited number of sockets. These embodiments are based on the novel RPU, which serves as a key element in overcoming many of the constraints and cost escalations typically encountered in conventional high-capacity memory architectures.

The implementation of the RPU technology, as described in the subsequent embodiments, offers potential solutions for developing more economical and efficient large-memory systems. This approach may have significant implications for various fields requiring extensive memory resources, including but not limited to high-performance computing (HPC), data analytics, artificial intelligence (AI), and scientific simulations. Some of the embodiments aim to mitigate the significant non-linear cost increases typically associated with memory expansions in traditional architectures, potentially offering more scalable and cost-effective alternatives for memory-intensive applications.

The total maximum DRAM capacity that may be installed on a server motherboard is typically determined by the number of physical memory slots available on the motherboard, each of which typically accommodates a single DRAM module, such as an RDIMM, and by the maximum capacity of each DRAM module. The maximum capacity of a DRAM module is typically influenced by the maximum number of DRAM components that can be incorporated within its mechanical form factor, as well as by the maximum density of the DRAM components. The maximum density of a DRAM component is typically dictated by the density of the underlying DRAM die type utilized in that DRAM component, and by the packaging technology employed, such as SDP, DDP, or 3D Stacking. These packaging technologies typically allow different numbers of DRAM dies to be integrated within a single DRAM component, which in turn influences the density of the DRAM component and thereby enables higher DRAM module capacities and higher overall system memory capacities.

In one embodiment, DRAM modules incorporating DRAM components manufactured using SDP technology generally provide a lower per-slot capacity compared to alternative packaging methods, such as DDP, which can approximately double the effective capacity per slot relative to SDP. Furthermore, 3D Stacking may enable capacities that exceed those achievable using either SDP or DDP by several multiples.

For example, a DRAM module including SDP components may provide a maximum capacity of approximately 64 GB per physical memory slot. In such an arrangement, a server motherboard equipped with 16 physical memory slots may support a total capacity of around 1 TB, while a high-end motherboard with 32 slots may support about 2 TB. In another embodiment employing DDP technology, wherein each module can attain an effective capacity of approximately 128 GB per slot, a 16-slot configuration may provide a total capacity of roughly 2 TB, and a 32-slot configuration of a high-end motherboard may support approximately 4 TB. Further, as of 2024, embodiments utilizing 3D Stacking packaging technology may achieve capacities on the order of 256 GB per slot, allowing a 16-slot configuration to reach a total capacity of about 4 TB, and a 32-slot configuration to reach a total capacity of about 8 TB.

These example calculations are provided for illustrative purposes and are intended to demonstrate the principle that the overall maximum DRAM capacity of a server system is a function of the number of available physical memory slots, such as DIMM slots, and the per-slot memory module capacity. The latter is influenced by the specific DRAM packaging technology used and the density of the DRAM dies utilized. The embodiments are not limited to the specific numerical values disclosed, and improvements in DRAM capacity per module or in the number of physical memory slots available on a motherboard may be incorporated within the scope of the present disclosure without departing from its underlying principles.

In one embodiment, a system, comprising: a memory pool comprising CPUs coupled to physical memory slots populated with dynamic random-access memory (DRAM) modules; wherein total DRAM capacity installed in the memory pool is a function of the number of the populated physical memory slots and capacities of the DRAM modules; a Resource Provisioning Unit (RPU), coupled to the memory pool and to an entity, the RPU is configured to: communicate with the memory pool according to a first protocol based on Compute Express Link (CXL); communicate with the entity according to a second protocol that is different from the first protocol; translate between messages according to the second protocol and messages according to the first protocol; and wherein the RPU is capable of exposing, to the entity, a memory capacity that exceeds total capacity of the DRAM modules populated in the physical memory slots coupled to any individual CPU belonging to the CPUs. Unless explicitly specified otherwise, the relevant embodiments and features are applicable to both the configuration wherein the RPU is implemented as a separate appliance from the memory pool and the configuration wherein the RPU is integrated within the memory pool, wherein the choice between these configurations may depend on specific deployment requirements, system constraints, and desired performance characteristics.

Optionally, the memory capacity exceeds 800 GB, 1.5 TB, 2 TB, or 4 TB; and wherein the DRAM modules are mainstream DRAM modules exhibiting an average unit price per gigabyte that does not exceed three times an average unit price per gigabyte of a lowest-cost DRAM module technology in volume production for servers in data centers. The DRAM modules may also be mainstream DRAM modules comprising single-die package (SDP) DRAM components and/or dual-die package (DDP) DRAM components, and less than 15% of the memory capacity may be based on three-dimensional (3D) stack DRAM components.

In some implementations, an average capacity of a DRAM module does not exceed 64 GB, wherein each of the CPUs is coupled to at least 4 physical memory slots, and wherein the memory capacity exposed by the RPU to the entity exceeds 256 GB. Sentences in the form of "a CPU is coupled to physical memory slots" are to be interpreted broadly to encompass direct or indirect coupling, as well as any communicative relationship that enables data exchange between the CPU and memory modules installed in the physical memory slots. Such coupling may be implemented through various intermediary components, including but not limited to an integrated or discrete memory controller, memory channels, motherboard circuitry, chipset components, or other interface elements. The coupling may involve electrical connections via PCB traces, silicon interposers, and/or other conductive pathways that carry address signals, data signals, and control signals between the CPU and the physical memory slots. For example, a modern implementation may include a CPU with an integrated memory controller that connects to physical DDR5 DIMM slots through memory channels and associated motherboard circuitry, thereby enabling the CPU to read from and write to memory modules installed in those slots. Additionally, an average capacity of a DRAM module may not exceed 96 GB, wherein each CPU is coupled to at least 4 physical memory slots, and the memory capacity exposed by the RPU to the entity exceeds 384 TB.

In certain aspects, at least 70% of the memory capacity is based on single-die package (SDP) technology DRAM, and the memory pool collectively comprises at least 2 TB of the SDP DRAM components, whereby the SDP technology provides improved reliability over higher-density DRAM components due to reduced thermal stress and simpler structure. Mainstream DRAM components (such as DDR5 SDP technology) are usually more reliable than high-density DRAM components (such as DDR5 3D Stacking technology), both per DRAM module (e.g., a DIMM) and per gigabyte, due to simpler structure, reduced thermal challenges, and absence of inter-die connections. While 3D-stacked technology can incorporate error correction and redundancy mechanisms to enhance reliability, the intrinsic complexity and thermal management difficulties associated with stacking dies may make it more prone to potential reliability issues over time. Therefore, for applications possibly requiring maximum reliability, a simpler technology such as DDR5 SDP may offer an advantage over a more complicated technology such as DDR5 3D Stacking technology, in addition to its reduced manufacturing complexity and higher production yields.

In other aspects, at least 70% of the memory capacity is based on dual-die package (DDP) technology DRAM, and the memory pool collectively comprises at least 4 TB of the DDP DRAM components, whereby the DDP technology provides improved reliability over higher-density DRAM components due to reduced thermal stress and simplified inter-die connections. DDP DRAM components are also usually more reliable than 3D-stacked technology due to simpler structure, reduced thermal challenges, and fewer inter-die connections. Therefore, for applications possibly requiring higher reliability, a simpler technology such as DDR5 DDP may offer an advantage over a more complicated technology such as DDR5 3D Stacking technology, in addition to its reduced manufacturing complexity and higher production yields. The first and second protocols may be based on at least one different CXL protocol, and none of the messages translated by the RPU between the first and second protocols may span the entire communication path between the entity and the memory pool.

In such a case, the messages according to the first protocol may comprise first physical addresses within Host Physical Address (HPA) space of the CPUs; the messages according to the second protocol may comprise second physical addresses within HPA spaces of the entity; and the translation between the messages comprises translating between the first physical addresses and the second physical addresses. As entities may operate within their own HPA spaces, and hosts within the memory pool may have their own HPA spaces, the RPU acts as an intermediary, performing address translation between physical addresses associated with these distinct HPA spaces. For example, when an entity requests data at a particular physical address within its HPA space, the RPU may map that address (e.g., using a lookup table) to a corresponding physical address within the HPA space of the host in the memory pool where the data actually resides. This translation mechanism enables transparent access to the distributed memory resources while maintaining proper isolation between different address spaces.

The first protocol may utilize CXL.cache semantics and the second protocol may utilize CXL.mem semantics, and none of the messages translated by the RPU between the CXL.cache and CXL.mem protocols spans the entire communication path between the entity and the memory pool. In some implementations, the second protocol is UALink, and the RPU further comprises: an Ultra Accelerator Link Protocol Level Interface (UPLI) completer configured to communicate with the entity according to UPLI, and a CXL endpoint configured to communicate with the memory pool according to the first protocol. Alternatively, the second protocol may be NVLink, and the RPU may further comprise: an NVLink interface configured to communicate with the entity according to NVLink, and a CXL endpoint configured to communicate with the memory pool according to the first protocol. In another alternative, the second protocol is Peripheral Component Interconnect Express (PCIe), and the RPU further comprises: a PCIe interface configured to communicate with the entity according to PCIe, and a CXL endpoint configured to communicate with the memory pool according to the first protocol.

The entity may be configured to execute one or more applications requiring large memory capacities, and the RPU may be further configured to aggregate memory capacities of at least two CPUs, selected from the CPUs, utilizing different Host Physical Address (HPA) spaces to present contiguous memory spaces to the entity. The RPU may allow one or more applications running on the entity to access a contiguous memory space, which is larger than the physical memory directly attached to any one or more CPUs utilizing the same HPA space, for example by aggregating memory from CPUs associated with different hosts. For example, if the memory pool includes five hosts, each with 128 GB of DRAM, the RPU may present a single 640 GB contiguous memory space to an application, while the actual physical location of the data within the memory pool is managed by the RPU and is transparent to the application. This aggregation capability enables applications to utilize memory capacities that far exceed the physical memory limitations of individual hosts.

The system may further comprise additional entities and RPUs, wherein number of the RPUs is equal to or greater than number of the entities. The system may further comprise additional entities, wherein the RPU comprises one or more RPUs located inside premises of the memory pool, and wherein number of the RPUs is smaller than number of the entities. The system may support different RPU deployment models to accommodate various scaling requirements. In one embodiment, wherein the number of RPUs equals or exceeds the number of entities, different entities can have different RPUs or multiple RPUs, enabling parallel processing of memory transactions and potentially reducing latency. Alternatively, when the RPUs are located within the memory pool premises and their number is smaller than the number of entities, the system may implement load balancing mechanisms to distribute memory requests across the hosts, which may improve resource utilization. The choice between these deployment models depends on factors such as performance requirements, cost constraints, and operational considerations.

In one embodiment, a system, comprising: a memory pool comprising at least first and second hosts, wherein each of the first and second hosts is populated with at least 32 GB of dynamic random-access memory (DRAM) components; and a Resource Provisioning Unit (RPU) configured to: communicate with the first and second hosts according to first and second protocols based on Compute Express Link (CXL) that utilize first and second host physical addresses (HPAs) associated with first and second HPA spaces of the first and second hosts, respectively; communicate with an entity according to another protocol that utilizes other physical addresses associated with another physical address space; and perform physical address translations from the other physical addresses to the first and second HPAs, which enable the RPU to expose, to the entity, a memory capacity that exceeds total capacity of the DRAM components populated in any of the first or second hosts.

Optionally, each of the first and second hosts comprises a single CPU, which reduces system costs compared to hosts utilizing motherboards, wherein each motherboard is populated with multiple CPUs. Examples of motherboards populated with multiple CPUs include motherboards with sockets or motherboards with CPUs soldered directly onto them.

In some implementations, each of the first and second hosts comprises two CPUs, which reduces system costs compared to hosts utilizing motherboards with higher numbers of CPUs. The first protocol may utilize CXL.cache semantics and the second protocol may utilize CXL.mem semantics. In such a case, the RPU may be further configured to perform protocol termination to the first protocol and the another protocol. The RPU may also be further configured to aggregate memory capacities addressable via the first and second HPA spaces, and to expose memory to the entity via at least one contiguous address range. In this configuration, at least half of the DRAM components may be of single-die package (SDP) technology. Alternatively, at least half of the DRAM components may be of Dual-Die Package (DDP) technology. Furthermore, the RPU may be integrated within at least some of the CPUs belonging to the at least first and second hosts. The RPU may also be further configured to load balance memory provisioning across the at least first and second hosts to maximize DRAM bandwidth available to the entity. The system may be configured to support hot-swapping of hosts, enabling runtime capacity expansion or replacement of a host without system downtime. Additionally, the memory pool may be configured to run one or more workloads, which enables it to both provide memory capacity to the entity and to execute computational tasks.

The DRAM components may be implemented in at least one of: memory modules inserted into corresponding physical memory slots, or components soldered to a motherboard. The memory modules may include various form factors such as DIMMs, SO-DIMMs, RDIMMs, LRDIMMs, or NVDIMMs. For example, standard DIMMs are commonly used in desktop and server applications, while SO-DIMMs are typically employed in space-constrained systems such as laptops. RDIMMs and LRDIMMs offer improved signal integrity and higher capacity configurations suitable for server environments with demanding memory requirements. Alternatively, the DRAM components may be soldered directly to the motherboard, which may eliminate the need for module connectors, potentially improving signal integrity and reducing physical space and cost.

In one embodiment, a system, comprising: a memory pool comprising hosts, each of the hosts comprises up to four CPUs, and each of the CPUs is operatively associated with at least 32 GB of dynamic random-access memory (DRAM) components accessible within its memory address space; a Resource Provisioning Unit (RPU) configured to: communicate with an entity via a first Compute Express Link (CXL) interface, communicate with the memory pool via a second CXL interface; and perform host-to-host physical address translations that enable the entity to utilize a memory capacity that is mapped to DRAM components populated in at least two hosts belonging to the hosts.

Optionally, each host comprises a single CPU, which reduces system costs compared to hosts utilizing motherboards wherein each motherboard is populated with multiple CPUs. In other implementations, each host comprises two CPUs, which reduces system costs compared to hosts utilizing motherboards with higher numbers of CPUs. The host-to-host physical address translations may translate physical addresses within Host Physical Address (HPA) space of the entity to physical addresses within one or more HPA spaces of the hosts. The first CXL interface may communicate according to CXL.mem semantics and the second CXL interface may communicate according to CXL-.cache semantics. The RPU may be further configured to perform protocol termination to CXL protocols utilized by the first and second CXL interfaces. The RPU may also be further configured to aggregate memory capacities addressable via physical addresses within HPA spaces of at least two of the hosts, and to present contiguous memory spaces to the entity. In such a case, at least half of the DRAM components may be of single-die package (SDP) technology. Alternatively, at least half of the DRAM components may be of Dual-Die Package (DDP) technology. Furthermore, the RPU may be integrated within at least some of the CPUs belonging to the hosts. The RPU may be further configured to load balance memory provisioning across the hosts to maximize DRAM bandwidth available to the entity. The system may be configured to support hot-swapping of hosts, enabling runtime capacity expansion or replacement of a host without system downtime. Moreover, the memory capacity may exceed total capacity of the DRAM components populated in a single host selected from the hosts.

In one embodiment, a system configured to utilize large amounts of mainstream dynamic random-access memory (DRAM) components, comprising: a memory pool comprising first and second hosts that utilize first and second host physical address (HPA) spaces, respectively, wherein each host is populated with multiple mainstream DRAM components having a combined total capacity of at least 64 GB; a Resource Provisioning Unit (RPU) coupled to the memory pool and to an entity, wherein the RPU is configured to:

maintain a mapping from addresses in a third physical address (PA) space to addresses in the first and second HPA spaces, wherein the third PA space is larger than the total capacity of the mainstream DRAM components populated in a single host selected from the first and second hosts; communicate with the entity according to a first protocol that utilizes the third PA space; and communicate with the first and second hosts according to a second protocol that utilizes the first and second HPA spaces, respectively, wherein the second protocol is different from the first protocol. For example, the system may be based on two dual-socket machines including four CPUs associated with two different HPA spaces. In this scenario, the RPU combines memory addresses from the first and second hosts into a third physical address space utilized in communication with the entity.

Optionally, the mainstream DRAM components utilize single-die package (SDP) technology, and the memory pool collectively comprises at least 4 TB of the SDP DRAM components; whereby the SDP technology provides improved reliability over higher-density DRAM components due to reduced thermal stress and simpler structure. Mainstream DRAM components (such as DDR5 SDP technology) are typically more reliable than high-density DRAM components (such as DDR5 3D Stacking technology), both per DIMM and per GB, due to their simpler structure, reduced thermal challenges, and no inter-die connections. While 3D Stacking technology can incorporate error correction and redundancy mechanisms to enhance reliability, the intrinsic complexity and thermal management difficulties associated with stacking multiple dies make it more prone to potential reliability issues over time. Therefore, for applications requiring maximum reliability, a simpler technology such as DDR5 SDP may offer an advantage over a more complicated technology such as DDR5 3D Stacking technology, in addition to its reduced manufacturing complexity and higher production yields.

In some implementations, the mainstream DRAM components utilize Dual-Die Package (DDP) technology, and the memory pool collectively comprises at least 4 TB of the DDP DRAM components; whereby the DDP technology provides improved reliability over higher-density DRAM components due to reduced thermal stress and simplified inter-die connections. DDP DRAM components are usually more reliable than 3D Stacking technology due to its simpler structure, reduced thermal challenges, and fewer inter-die connections. Therefore, for applications requiring higher reliability, a simpler technology such as DDR5 DDP may offer an advantage over a more complicated technology such as DDR5 3D Stacking technology, in addition to its reduced manufacturing complexity and higher production yields.

The entity may be configured to execute one or more applications requiring a large memory capacity, and the RPU may be further configured to expose at least one contiguous memory region to the entity, wherein the contiguous memory region comprises addresses from the third PA space. The entity may also comprise an accelerator configured to execute at least one workload requiring a large memory capacity, and the RPU may be further configured to allow the accelerator to access at least one contiguous memory region, wherein the contiguous memory region comprises addresses from the third PA space. Furthermore, the first and second protocols may comprise Compute Express Link (CXL)protocols.

In such a system, the first protocol may comprise CXL.mem, the second protocol may comprise CXL.cache, and the RPU may be further configured to translate between the CXL.mem and CXL.cache D2H protocols. The RPU may also be further configured to terminate transactions associated with the first protocol and initiate transactions associated with the second protocol. Additionally, the RPU may be further configured to translate between first physical addresses associated with the first protocol and second physical addresses associated with the second protocol, wherein the first physical addresses are from address space of the entity and the second physical addresses are from address spaces of the hosts. In certain aspects, at least one of the first or second protocols may comprise Ultra Accelerator Link (UALink) Protocol Level interface (UPLI). In this case, at least one transaction, selected from the group of (i) first transactions associated with the first protocol, or (ii) second transactions associated with the second protocol, may be transferred over a UALink interface. Furthermore, the first transactions may comprise first UALink requests, the second transactions may comprise second UALink requests, and the RPU may be further configured to translate between the first and second UALink requests while maintaining UALink ordering requirements.

The system may further comprise additional entities and RPUs, wherein number of the RPUs is equal to or greater than number of the entities. Alternatively, the system may further comprise additional entities, wherein the RPU comprises one or more RPUs located inside premises of the memory pool, and wherein number of the RPUs is smaller than number of the entities. The RPU may also be further configured to: establish quality-of-service levels for different entities; reserve minimum memory capacity guarantees for each quality-of-service level; enforce memory access rate limits based on quality-of-service levels; and prioritize memory transaction routing based on the established quality-of-service levels.

The RPU may be coupled to entities comprising the entity, and the RPU may be further configured to: maintain a second mapping from addresses in additional PA spaces to addresses in the first and second HPA spaces, monitor memory access patterns for each of the entities, identify frequently accessed addresses, migrate frequently accessed addresses along with associated data to hosts with lower access latency, and update the mapping and the second mapping to reflect the migrated addresses while maintaining application access to the migrated addresses and associated data. Optionally, the RPU migrates the frequently accessed addresses along with associated data to hosts with lower access latency. Since the RPU controls the mapping from addresses in the third PA space and additional PA spaces to addresses in the first and second HPA spaces, the RPU can migrate the addresses and associated data while maintaining application access. This migration remains transparent to the entity, which continues to use the same address in the third PA space, while the RPU routes memory access requests to a different host in the memory pool having lower access latency.

The system may further comprise a second entity coupled to the RPU, wherein the RPU is further configured to: communicate with the second entity according to the first protocol that utilizes the third PA space; and maintain a second mapping from addresses in the third PA space associated with the second entity, to addresses in the first and second HPA spaces. In this configuration, the RPU may be further configured to: dynamically modify the mapping and the second mapping based on memory demands of the entity and the second entity; and maintain memory access continuity during the dynamic modification of the mapping and the second mapping. Furthermore, the entity may comprise a first type of computing device; the second entity may comprise a second type of computing device different from the first type; and the RPU may be further configured to handle memory access requests from the entity and from the second entity based on the different types of computing devices.

In another aspect, the system may further comprise a second entity coupled to the RPU, wherein the RPU is further configured to: maintain a second mapping from addresses in a fourth PA space to addresses in the first and second HPA spaces, maintain separate access permissions for each entity, manage concurrent memory access requests from the entity and the second entity, and prevent memory access conflicts between the entity and the second entity.

The RPU may be coupled to the entity via one or more first interfaces, each configured to utilize the first protocol, and may be further coupled to the first and second hosts via one or more second and third interfaces, respectively, each configured to utilize the second protocol. Using separate interfaces for the different hosts enables the RPU to manage memory accesses across different address spaces and/or domains while mapping one or more HPA addresses or contiguous address ranges for use by the entity. Additionally, it may provide flexibility in system architecture, allowing hosts with different memory technologies, capacities, or address implementations to be integrated into a single memory pool. In some embodiments, the first interfaces may comprise multiple interfaces to the same entity, allowing for increased bandwidth, redundancy, and/or specialized memory transaction types through different physical or logical connections while maintaining a coherent view of the PA space. For example, one interface may be optimized for small, frequent transactions while another may be optimized for large data transfers, thereby enhancing overall system performance. Furthermore, the RPU may implement different interfaces to different entities, enabling multiple entities to access the memory pool essentially simultaneously. Each entity may utilize a different interface protocol, address width, and/or transaction format based on its specific requirements, with the RPU handling the necessary translations between the application-specific interfaces and the host interfaces while managing memory allocation and access permissions for each entity separately.

The memory pool may be configured to run one or more workloads, which enables it to both provide memory capacity to the entity and to execute computational tasks. The DRAM components may be implemented in at least one of: memory modules inserted into corresponding physical memory slots, or components soldered to a motherboard.

In one embodiment, a system, comprising: a memory pool comprising single-chip semiconductor devices, each formed on a monolithic die comprising at least 4 memory controllers, and at least one Compute Express Link (CXL) interface; wherein the single-chip semiconductor devices are coupled via memory channels to dynamic random-access memory (DRAM) components; a Resource Provisioning Unit (RPU), coupled to the memory pool and to an entity, the RPU is configured to: communicate with the memory pool according to a first protocol based on CXL; communicate with the entity according to a second protocol; and translate between messages according to the second protocol and messages according to the first protocol; and wherein the RPU is capable of exposing, to the entity, a memory capacity that exceeds total capacity of the DRAM components coupled to any individual one of the single-chip semiconductor devices. The system may utilize single-chip semiconductor devices, such as monolithic single-die processors, that can maintain lower-latency communication over internal pathways between CXL interfaces and memory controllers with relatively low propagation delays. A single-chip design can potentially avoid die-to-die crossing delays that are typical in multi-chiplet architectures, wherein data crossing from one chiplet to another typically passes through chip-to-chip (C2C) physical interfaces (PHYs), which may add latency to memory operations. A monolithic single-die approach provides the opportunity to have internal signal paths that are short enough to maintain lower propagation delays which may result in more efficient memory access patterns and reduced overall latency for memory operations between the DRAM components, CXL interfaces, and processing cores.

Optionally, each of the single-chip semiconductor devices comprises a processor comprising a limited core count of up to 64 cores. As of 2025, server-grade processor designs with a limited core count of up to 64 cores typically represent a tradeoff balance that prioritizes memory-intensive workloads over compute-intensive workloads in the described architecture. Such server-grade processors with relatively limited core count in this range can typically be implemented as monolithic single-die designs rather than requiring multi-chiplet approaches. When reaching beyond approximately 64 cores, many modern processor architectures transition to chiplet-based designs, which introduce additional latency due to inter-chiplet communication requirements.

The limited core count of up to 64 cores may enable shorter propagation paths between interface components within the processor, resulting in reduced internal signal propagation delays compared to processors with higher core counts. In a monolithic single-die processor with limited core count, typically up to 64 cores in server-grade processors, the physical distance between different interfaces (such as CXL interfaces and DDR memory controllers) is typically reduced compared to higher core count designs. These shorter physical distances translate to shorter electrical pathways on the processor's internal interconnect (whether ring-based, mesh-based, or other topologies). With shorter pathways, signals propagate more quickly between interfaces, reducing internal latency. Additionally, the reduced number of intermediary stopping points or "hops" in the interconnect further decreases propagation delays, as each hop typically requires buffering and synchronization operations that add to overall latency.

The processor may operate at higher clock frequencies within a given thermal envelope compared to processors with higher core counts, thereby reducing signal propagation latency through the processor internal pathways. Lower core count processors typically dissipate less total heat than higher core count processors, allowing processor manufacturers to implement higher clock frequencies while maintaining the same thermal design point (TDP). Higher clock frequencies can translate to reduced cycle times, meaning that operations requiring a fixed number of clock cycles complete more quickly. Additionally, the internal processor interconnect (typically structured as a mesh, ring, network-on-chip (NoC), or bus) operates at these higher clock frequencies, decreasing the time required for signals to propagate through buffered flop-based elements within the processor. For example, if a signal must traverse six mesh-stops with each stop requiring one clock cycle, a 20% increase in clock frequency may be translated to a 20% reduction in propagation time through these stops.

The memory pool may be configured to run one or more workloads, which enables it to both provide memory capacity to the entity and to execute computational tasks. The DRAM components may be implemented in at least one of: memory modules inserted into corresponding physical memory slots, or components soldered to a motherboard.

In one embodiment, a system, comprising: a memory pool comprising at least first and second hosts, wherein each of the first and second hosts comprises at least one CPU having a core-to-memory-channel ratio of no more than 8:1, and each of the at least one CPU being operatively associated with at least 32 GB of dynamic random-access memory (DRAM) components; and a Resource Provisioning Unit (RPU) configured to: communicate with the first and second hosts according to first and second protocols based on Compute Express Link (CXL) that utilize first and second host physical addresses (HPAs) associated with first and second HPA spaces of the first and second hosts, respectively; communicate with an entity according to another protocol that utilizes other physical addresses associated with another physical address space; and perform physical address translations from the other physical addresses to the HPAs; wherein the RPU is capable of exposing, to the entity, a memory capacity that exceeds total capacity of the DRAM components populated in a single host selected from the hosts. The system incorporates CPUs with a core-to-memory-channel ratio that may influence memory access characteristics in a CXL-based memory pooling architecture. The core-to-memory-channel ratio refers to the number of CPU cores divided by the number of memory channels available to that CPU. For example, a CPU with 16 cores and 4 memory channels would have a core-to-memory-channel ratio of 4:1. By maintaining this ratio at no more than 8:1, each core may have access to a greater portion of the available memory bandwidth, which can reduce contention when multiple cores simultaneously attempt to access memory. This architectural approach may result in lower average memory access latency compared to systems using CPUs with higher core-to-memory-channel ratios, wherein more cores must compete for the same memory bandwidth. These memory access characteristics can be beneficial in memory pooling applications wherein efficient access to distributed memory resources affects overall system performance.

Optionally, the core-to-memory-channel ratio is calculated by dividing the number of CPU cores in each CPU by the number of memory channels accessible to that CPU, wherein each memory channel supports simultaneous memory operations to a subset of the DRAM components. The core-to-memory-channel ratio is calculated by dividing the total number of processing cores in a CPU by the number of memory channels that can operate simultaneously. Memory channels are pathways that allow the CPU to perform memory operations (reads or writes) in parallel, without contention between the channels. For example, a CPU with 16 cores and 2 memory channels would have a core-to-memory-channel ratio of 8:1, while the same CPU with 4 memory channels would have a ratio of 4:1. A lower ratio typically indicates better per-core memory bandwidth availability, as fewer cores share each memory channel. The number of memory channels can be determined from CPU specifications or by analyzing the memory controller configuration, and does not necessarily correspond directly to the number of physical DIMM slots, as some memory channels may connect to multiple DIMM slots operating in lockstep.

Each CPU in the hosts may have between 4 and 32 cores, and the limited core count CPUs may provide improved memory bandwidth per core due to reduced contention for memory channels compared to CPUs with higher core counts. When the ratio of CPU cores to memory channels is lower, as is the case with limited core count CPUs, each core effectively has access to a greater portion of the available memory bandwidth. In higher core count CPUs, multiple cores share the same memory channels, leading to contention and potential throttling of memory operations when many cores simultaneously attempt memory access. With fewer cores competing for the same memory resources, each core can utilize a larger fraction of the available memory bandwidth, which may lead to improved performance for memory-intensive operations. This reduced contention is particularly beneficial for applications with memory access patterns that would otherwise cause additional contention in higher core count systems.

The limited core count CPUs may exhibit reduced power consumption and simplified thermal management compared to CPUs with higher core counts, enabling sustained higher performance for memory-intensive operations. CPUs with lower core counts generally consume less total power than their higher core count counterparts, even when the limited core count CPUs are operating at higher frequencies. This reduced power consumption translates to less heat generation, which may simplify the thermal management requirements of the system, and enable the CPUs to maintain their optimal performance states for longer periods without thermal throttling, particularly during memory-intensive operations. This sustained performance capability may improve the performance of memory pooling applications that prefer consistent predictable access to memory resources.

The limited core count CPUs may provide more predictable performance due to reduced resource contention between cores compared to CPUs with higher core counts. In CPUs with high core counts, the sharing of resources such as last-level cache, memory controllers, and internal interconnects can lead to performance variability as cores compete for these shared resources. This contention may cause unpredictable latency spikes and throughput reductions that may be difficult to account for in performance-sensitive applications. Limited core count CPUs, with their reduced internal contention, may exhibit more consistent and predictable performance characteristics, particularly for memory access operations.

In some implementations, the first protocol utilizes CXL-.cache semantics and the second protocol utilizes CXL.mem semantics, and the RPU is further configured to terminate first CXL transactions and initiate second CXL transactions to facilitate communication between the entity and the memory pool.

The RPU may be further configured to: monitor memory access patterns from the entity; identify frequently accessed memory regions; and dynamically allocate most of those frequently accessed memory regions to hosts with lowest memory access latency to optimize overall system performance. The RPU may implement adaptive memory management by continuously monitoring access patterns from the entity to identify "hot" memory regions that are accessed frequently. By tracking these access patterns, the RPU can make intelligent decisions about memory placement, dynamically moving at least some of the frequently accessed data to hosts with the lowest access latency characteristics. This optimization leverages the inherent latency advantages of the limited core count CPUs while further improving performance utilizing intelligent data placement. The dynamic allocation is performed transparently to the entity, which continues to access memory utilizing consistent address translations provided by the RPU.

The RPU may be further configured to aggregate memory capacities, addressable via HPA spaces of at first and second hosts, to a contiguous address range, and to expose the contiguous address range to the entity. In such a case, at least 70% of the DRAM components may be based on single-die package (SDP) technology, whereby the SDP technology provides improved reliability due to reduced thermal stress and simpler structure. The system may also be configured to support hot-swapping of hosts, enabling runtime capacity expansion or replacement of hosts without system downtime.

In one embodiment, a system, comprising: a memory pool comprising at least first and second hosts, wherein each of the first and second hosts comprises at least one CPU having a core-to-memory-channel ratio of no more than 16:1, and each of the at least one CPU being operatively associated with at least 32 GB of dynamic random-access memory (DRAM) components; and a Resource Provisioning Unit (RPU) configured to: communicate with the first and second hosts according to first and second protocols based on Compute Express Link (CXL) which utilize first and second host physical addresses (HPAs) associated with first and second HPA spaces of the first and second hosts, respectively; communicate with an entity according to another protocol that utilizes other physical addresses associated with another physical address space; and perform physical address translations from the other physical addresses to the HPAs; wherein the RPU is capable of exposing, to the entity, a memory capacity that exceeds total capacity of the DRAM components populated in any of the first or second hosts.

In one embodiment, a system comprises: an accelerator; a Resource Provisioning Unit (RPU) coupled to the accelerator via an Ultra Accelerator Link Protocol Level Interface (UPLI) interface; a switch coupled to the RPU via a first Compute Express Link (CXL) interface; one or more hosts coupled to the switch via additional CXL interfaces, wherein each of the hosts is populated with at least 32 GB of DRAM components; and wherein the RPU is configured to: receive a UPLI request from the accelerator via the UPLI interface, translate the UPLI request to at least one CXL message for accessing memory in the DRAM components, and send the at least one CXL message to a host selected from the hosts via the switch.

Optionally, the switch comprises a CXL switch functionality, and the RPU and the one or more hosts communicate with the switch utilizing a protocol based on CXL.cache. In some implementations, the UPLI request comprises a read command selected from: a Read command, an AtomicR command, or a Vendor Defined Command with read data returned over the UPLI Read Response/Data (Rd Rsp/Data) Channel; and wherein the at least one CXL message is at least one CXL.cache message selected from: RdCurr, RdOwn, RdShared, or RdAny. The host may be configured to generate a CXL.cache response message in response to the at least one CXL message; and the RPU may be further configured to: receive the CXL.cache response message from the host via the CXL switch, translate the CXL.cache response message into a UPLI response message, and transmit the UPLI response message to the accelerator via the UPLI interface. In certain aspects, the RPU is configured to communicate with the switch utilizing a first protocol based on CXL.mem, and the one or more hosts are configured to communicate with the switch utilizing a second protocol based on CXL.cache; and wherein the switch is configured to translate between messages conforming to the first and second protocols.

Furthermore, the first protocol may utilize CXL.mem semantics, the second protocol utilizes symmetric CXL.mem semantics, and wherein the switch is configured to translate between messages conforming to the first and second protocols. The RPU and the one or more hosts may also be configured to communicate with the switch utilizing a protocol based on CXL.cache, the first and second protocols utilize CXL.io semantics, the switch comprises a CXL switch functionality, and at least 10% of the CXL messages utilize UIO Transaction Layer Packets (TLPs). The system may further comprise additional accelerators and additional RPUs; wherein the additional accelerators are coupled to respective RPUs via respective UPLI interfaces, and the additional RPUs are coupled to the CXL switch via respective further additional CXL interfaces.

The system may implement scalable architecture supporting multiple accelerators and RPUs. Accelerators may be coupled to respective RPUs through respective UPLI interfaces, or multiple accelerators may be coupled to the same RPU through different UPLI interfaces. The one or more RPUs coupled to a switch, which may be a CXL switch, through CXL interfaces, such as CXL.cache interfaces, may enable access to the memory pool while maintaining possible isolation between different accelerator-RPU pairs, and possibly allowing for system expansion by adding additional accelerator-RPU pairs and/or additional switches. In some implementations, the RPU comprises request buffers and response buffers, and wherein the RPU is configured to implement credit-based flow control with the accelerator by: maintaining a count of available credits for the request buffers and the response buffers, providing initial credits to the accelerator indicating buffer availability, and returning a credit to the accelerator when a buffer entry becomes available. The RPU optionally implement a flow control mechanisms to prevent buffer overflow and provide efficient data transfer by maintaining separate credit counts for request and response buffers. At initialization, the RPU may provide the accelerator with credits corresponding to available buffer space. As the accelerator sends requests, it consumes credits, and when the RPU processes a request and frees a buffer entry, it returns the corresponding credit to the accelerator. The RPU may be configured to: store UPLI requests in a request queue, maintain response queues for respective UPLI interfaces, ensure ordering between UPLI requests accessing a same 256-byte aligned region of memory, and allow reordering between UPLI requests accessing different 256-byte aligned regions of memory. The RPU may implement buffering and ordering mechanisms to manage UPLI requests and responses. The RPU may maintain separate request and response queues, wherein the request queue stores incoming UPLI requests before translation to CXL messages (such as CXL.cache messages), and the response queues store responses before transmission back to the respective accelerators. The RPU may enforce strict ordering for the types of requests (e.g., Read, Write, Atomic) from a given UPLI interface to a given 256-byte aligned region of memory, while allowing requests to different 256-byte aligned regions to proceed essentially independently to maximize performance.

In certain aspects, the RPU comprises a routing table indexed by a portion of a memory address carried in the UPLI request, wherein entries in the routing table identify the hosts, and wherein the RPU is configured to select the host based on a lookup in the routing table using the portion of the memory address. The RPU may implement host selection using a routing table mechanism. The routing table may be indexed using a portion of the memory address specified in the UPLI request, such as certain address bits that determine memory region ownership. Entries in the routing table may identify specific hosts that own or manage corresponding memory regions. The RPU may perform a lookup in this routing table using the relevant address bits to determine which host should receive the translated CXL messages, which allows flexible memory region assignment among hosts while maintaining deterministic routing. The accelerator may comprise an originator configured to generate and transmit the UPLI request, and the RPU comprises a completer configured to receive the UPLI request.

In one embodiment, a system comprises: an accelerator; a Resource Provisioning Unit (RPU) coupled to the accelerator via an Ultra Accelerator Link Protocol Level Interface (UPLI) interface; a CXL switch coupled to the RPU via a CXL.cache interface; hosts coupled to the CXL switch via respective CXL.cache interfaces, wherein each of the hosts is populated with at least 32 GB of DRAM components; and wherein the RPU is configured to: receive a UPLI request from the accelerator via the UPLI interface, translate the UPLI request to at least one CXL.cache message for accessing memory in the DRAM components, and send the CXL-.cache messages to a host selected from the hosts via the CXL switch.

Optionally, the system further comprises additional accelerators and additional RPUs; wherein the additional accelerators are coupled to respective RPUs via respective UPLI interfaces, and the RPUs are coupled to the CXL switch via respective CXL.cache interfaces. The system may implement scalable architecture supporting multiple accelerators and RPUs. Accelerators may be coupled to respective RPUs through respective UPLI interfaces, or multiple accelerators may be coupled to the same RPU through different UPLI interfaces. The one or more RPUs coupled to a switch, which may be a CXL switch, through CXL.cache interfaces, may enable access to the memory pool while maintaining possible isolation between different accelerator-RPU pairs, and possibly allowing for system expansion by adding additional accelerator-RPU pairs and/or additional switches.

In some implementations, the UPLI request comprises a read command selected from: a Read command, an AtomicR command, or a Vendor Defined Command with read data returned over the UPLI Read Response/Data (Rd Rsp/Data) Channel; and wherein the at least one CXL.cache message is selected from: RdCurr, RdOwn, RdShared, or RdAny. The RPU may comprise request buffers and response buffers, and wherein the RPU is configured to implement credit-based flow control with the accelerator by: maintaining a count of available credits for the request buffers and the response buffers, providing initial credits to the accelerator indicating buffer availability, and returning a credit to the accelerator when a buffer entry becomes available. The RPU optionally implement a flow control mechanisms to prevent buffer overflow and provide efficient data transfer by maintaining separate credit counts for request and response buffers. At initialization, the RPU may provide the accelerator with credits corresponding to available buffer space. As the accelerator sends requests, it consumes credits, and when the RPU processes a request and frees a buffer entry, it returns the corresponding credit to the accelerator.

Optionally, the RPU may be configured to: store UPLI requests in a request queue, maintain a response queue for each UPLI interface, ensure ordering between UPLI requests accessing a same 256-byte aligned region of memory, and allow reordering between UPLI requests accessing different 256-byte aligned regions of memory. The RPU may implement buffering and ordering mechanisms to manage UPLI requests and responses. The RPU may maintain separate request and response queues, wherein the request queue stores incoming UPLI requests before translation to CXL.cache messages, and the response queues store responses before transmission back to the respective accelerators. The RPU may enforce strict ordering for the types of requests (e.g., Read, Write, Atomic) from a given UPLI interface to a given 256-byte aligned region of memory, while allowing requests to different 256-byte aligned regions to proceed essentially independently to maximize performance. In certain aspects, the RPU comprises a routing table indexed by a portion of a memory address carried in the UPLI request, wherein each entry in the routing table identifies one of the hosts, and wherein RPU is configured to select the host based on a lookup in the routing table using the portion of the memory address.

The RPU may implement host selection using a routing table mechanism. The routing table may be indexed using a portion of the memory address specified in the UPLI request, such as certain address bits that determine memory region ownership. Each entry in the routing table may identify a specific host that owns or manages the corresponding memory region. The RPU may perform a lookup in this routing table using the relevant address bits to determine which host should receive the translated CXL.cache messages, which allows flexible memory region assignment among hosts while maintaining deterministic routing. The accelerator may comprise an originator configured to generate and transmit the UPLI request, and the RPU comprises a completer configured to receive the UPLI request. Furthermore, the host may be configured to generate a CXL-.cache response message in response to the at least one CXL.cache message; and the RPU is further configured to: receive the CXL.cache response message from the host via the CXL switch, translate the CXL.cache response message into a UPLI response message, and transmit the UPLI response message to the accelerator via the UPLI interface.

In one embodiment, a method comprises: receiving, from an originator, an Ultra Accelerator Link Protocol Level Interface (UPLI) request comprising a read command; translating, by a Resource Provisioning Unit (RPU), the UPLI request to a CXL.cache Device-to-Host (D2H) request comprising a read opcode; sending the CXL.cache D2H request to a CXL host; receiving, from the CXL host, a CXL.cache Host-to-Device (H2D) data message; translating the CXL-.cache H2D data message to a UPLI read response; and sending the UPLI read response to the originator.

The method provides protocol translation between UPLI and CXL.cache domains. The RPU receives UPLI requests containing read commands which may include Read commands, AtomicR commands, Vendor Defined Commands with read data returned over the UPLI Read Response/Data (Rd Rsp/Data) Channel, or other read command types supported by the UPLI. The RPU translates these read commands into corresponding CXL.cache read opcodes such as RdCurr, RdOwn, RdShared, or RdAny. The translation adapts the operation to the requirements and capabilities of the protocol domain. Upon receiving data responses from the CXL host, the RPU performs reverse translation to format the data appropriately for the originator, which enables communication between the UPLI and CXL domains while abstracting the protocol differences from both sides.

Optionally, the UPLI request comprises a source accelerator identifier and a destination accelerator identifier, and the UPLI read response comprises a destination accelerator identifier carrying a value that matches the source accelerator identifier from the UPLI request, and wherein the RPU saves at least the source accelerator identifier from the UPLI request for use in generating the UPLI read response.

In some embodiments, the UPLI request includes identifiers that specify both the source and destination accelerators. The RPU saves at least the source accelerator identifier upon receiving the UPLI request. When generating the UPLI read response, the RPU uses the saved source accelerator identifier from the request as the destination accelerator identifier in the response for proper message routing back to the original requester. In some embodiments, the RPU may also save the destination accelerator identifier from the UPLI request, and include a source accelerator identifier in the UPLI read response, such as for debugging purposes, however such inclusion is not necessary for basic functionality.

In certain embodiments, the UPLI request further comprises a first address and a first tag, wherein the CXL.cache D2H request comprises a second address translated from the first address and a command queue identifier (CQID) associated with the first tag, and wherein the UPLI read response comprises the first tag.

In certain embodiments, the RPU performs address translation between physical addresses within UALink address space and physical addresses within CXL.cache address space while maintaining correlations between requests and responses utilizing tag/CQID mapping. The RPU translates the UALink address to a corresponding CXL.cache address based on configured address mappings. Additionally, the RPU maintains a mapping between UPLI tags and CXL-.cache CQIDs to properly associate responses with their originating requests. This mapping enables the RPU to include the original UPLI tag in the UPLI read response, allowing the originator to correlate responses with its outstanding requests.

The UPLI request may further comprise a length field indicating an amount of data requested, and wherein translating the UPLI request comprises generating multiple CXL-.cache D2H requests when the amount of data requested exceeds a maximum CXL.cache transaction size.

Optionally, the RPU handles UPLI requests that specify data transfers larger than what a single CXL.cache transaction can support. The length field in the UPLI request indicates the amount of data requested, which can be up to 256 bytes, while CXL.cache transactions typically handle up to 64 bytes each. When the requested data size exceeds the CXL.cache transaction size limit, the RPU may segment the request into multiple CXL.cache transactions. For example, a 256-byte UPLI request would be translated into four 64-byte CXL.cache transactions, and the RPU manages these multiple transactions while maintaining the appearance of a single operation to the originator.

In some implementations, the UPLI request comprises a tag, the CXL.cache D2H requests comprise command queue identifiers (CQIDs), and wherein generating the multiple CXL.cache D2H requests comprises associating multiple CQIDs with the tag.

When handling large data transfers that require multiple CXL.cache transactions, the RPU may implements tag-to-CQID mapping. For a single UPLI request with one tag, the RPU may generate and track multiple CQIDs, one for each CXL.cache transaction. For example, if a UPLI request with Tag #1 requires four CXL.cache transactions, the RPU may generate CQIDs #1 through #4, maintaining mappings between the CQIDs and the original Tag #1. This mapping enables the RPU to associate the relevant CXL.cache responses with the original UPLI request and generate a consolidated response.

Additionally, translating the CXL.cache H2D data message further comprises: receiving multiple CXL.cache H2D data messages corresponding to the multiple CXL.cache D2H requests, aggregating data from the multiple CXL-.cache H2D data messages, and including the aggregated data in the UPLI read response.

When handling large data transfers that were split into multiple CXL.cache transactions, the RPU may perform data aggregation before generating the UPLI read response. The RPU receives multiple CXL.cache H2D data messages containing together the requested data, which are collected and optionally reassembled in a predetermined order to form a complete data payload. The RPU may manage this aggregation process while maintaining data integrity and proper ordering, such that the originator receives a single, coherent response containing the requested data.

The read opcode of the CXL.cache D2H request may be RdCurr, and processing the CXL.cache RdCurr request by the RPU does not change existing state in any cache accessible to the RPU.

In some embodiments, the RPU translates the UPLI Read command into a CXL.cache D2H request with an opcode of RdCurr, thereby indicating that the memory read is performed using a current state read function, which means that the RPU either does not issue cache commands, or processing the CXL.cache RdCurr request does not change existing state in a cache accessible to the RPU.

In certain aspects, the read command is selected from a group comprising at least one of: a Read command, an AtomicR command, or a Vendor Defined Command with read data returned over the UPLI Read Response/Data (Rd Rsp/Data) Channel; and wherein the read opcode is selected from a group comprising at least one of: RdCurr, RdOwn, RdShared, or RdAny.

The RPU may support translation between various types of read commands in the UPLI domain and read opcodes in the CXL domain. The UPLI read commands may include one or more of memory reads, atomic operations that provide atomicity guarantees, and/or Vendor Defined read commands for custom functionality. The UPLI read commands are translated to appropriate CXL.cache read opcodes based on the operation's requirements. For example, RdCurr requests the current value without changing cache states, RdOwn obtains exclusive ownership, RdShared enables shared access, and RdAny allows flexible coherency state transitions.

The CXL.cache H2D data message may comprise first data in a first format, and wherein translating the CXL.cache H2D data message comprises transforming the first data to second data in a second format for the UPLI read response. The RPU may need to transform data between different formats as it moves between UPLI and CXL.cache domains, which may involve changes in data organization, alignment, or representation. The RPU can maintain data integrity while performing the necessary format conversions to meet the requirements of the protocol domains. The first format may be optimized for CXL.cache operations, while the second format adheres to UPLI specifications for data transfer. Optionally, a non-transitory computer-readable medium may comprise instructions that, when executed by a processor, cause the processor to perform the method.

In one embodiment, an apparatus comprises: a completer; a Compute Express Link (CXL) interface configured to communicate according to a CXL.cache protocol; a computer, coupled between the completer and the CXL interface, configured to translate between an Ultra Accelerator Link Protocol Level Interface (UPLI) and CXL.cache; wherein the computer is further configured to: translate an UPLI request comprising a read command, received via the completer, to a CXL.cache Device-to-Host (D2H) request comprising a read opcode transmitted via the CXL interface; and translate a CXL.cache Host-to-Device (H2D) data message, received via the CXL interface, to a UPLI read response transmitted via the completer.

Optionally, the UPLI request comprises a source accelerator identifier and a destination accelerator identifier, the UPLI read response comprises a destination accelerator identifier carrying a value that matches the source accelerator identifier from the UPLI request, and wherein the computer is configured to save at least the source accelerator identifier from the UPLI request for use in generating the UPLI read response. In some embodiments, the computer processes identifier information embedded in UPLI messages by saving at least the source accelerator identifiers from incoming UPLI requests, and generating UPLI read responses by using the saved source accelerator identifier as the destination accelerator identifier in the response for proper message routing back to the original requester. Optionally, the computer may also save the destination accelerator identifier from the UPLI request, and include a source accelerator identifier in the UPLI read response, such as for debugging purposes, however such inclusion is not necessary for basic functionality.

In certain embodiments, the UPLI request further comprises a first address and a first tag, wherein the CXL.cache D2H request comprises a second address translated from the first address and a command queue identifier (CQID) associated with the first tag, and wherein the UPLI read response comprises the first tag. In certain embodiments, the computer performs address translation between physical addresses within UALink address space and physical addresses within CXL.cache address space, while maintaining correlations between requests and responses utilizing tag/CQID mapping. The computer translates the UALink address to a corresponding CXL.cache address based on configured address mappings. Additionally, the computer maintains a mapping between UPLI tags and CXL.cache CQIDs to properly associate responses with their originating requests. This mapping enables the computer to include the original UPLI tag in the UPLI read response, allowing the originator to correlate responses with its outstanding requests. The UPLI request may further comprise a length field indicating an amount of data requested, and wherein the computer is further configured to generate multiple CXL-.cache D2H requests when the amount of data requested exceeds a maximum CXL.cache transaction size. Optionally, the computer handles UPLI requests that specify data transfers larger than what a single CXL.cache transaction can support. The length field in the UPLI request indicates the amount of data requested, which can be up to 256 bytes, while CXL.cache transactions typically handle up to 64 bytes each. When the requested data size exceeds the CXL.cache transaction size limit, the computer may segment the request into multiple CXL.cache transactions. For example, a 256-byte UPLI request would be translated into four 64-byte CXL.cache transactions, and the computer manages these multiple transactions while maintaining the appearance of a single operation to the originator.

In some implementations, the UPLI request comprises a tag, the CXL.cache D2H requests comprise command queue identifiers (CQIDs), and wherein the computer is further configured to associate multiple CQIDs with the tag when generating the multiple CXL.cache D2H requests. When handling large data transfers that require multiple CXL- .cache transactions, the computer may implement tag-to-CQID mapping. For a single UPLI request with one tag, the computer may generate and track multiple CQIDs, one for each CXL.cache transaction. This mapping enables the computer to associate the relevant CXL.cache responses with the original UPLI request and generate a consolidated response. The computer may be further configured to: receive multiple CXL.cache H2D data messages corresponding to the multiple CXL.cache D2H requests, aggregate data from the multiple CXL.cache H2D data messages, and include the aggregated data in the UPLI read response. When handling large data transfers that were split into multiple CXL.cache transactions, the computer may perform data aggregation before generating the UPLI read response. The computer receives multiple CXL.cache H2D data messages containing together the requested data, which are collected and optionally reassembled in a predetermined order to form a complete data payload. The computer may manage this aggregation process while maintaining data integrity and proper ordering, such that the originator receives a single, coherent response containing the requested data. In certain aspects, the read opcode of the CXL.cache D2H request is RdCurr, and as a result of processing the CXL.cache RdCurr request the computer is further configured not to change existing state in any cache accessible to the computer.

In some embodiments, the computer translates the UPLI Read command into a CXL.cache D2H request with an opcode of RdCurr, thereby indicating that the memory read is performed using a current state read function. In some embodiments, the apparatus either does not issue cache commands, or when processing the CXL.cache RdCurr request it retrieves data in a manner that does not alter the existing state in a cache accessible to the apparatus. Additionally, the read command is selected from a group comprising at least one of: a Read command, an AtomicR command, or a Vender Defined Command with read data returned over the UPLI Read Response/Data (Rd Rsp/Data) Channel; and wherein the read opcode is selected from a group comprising at least one of: RdCurr, RdOwn, RdShared, or RdAny.

The computer may support translation between various types of read commands in the UPLI domain and read opcodes in the CXL domain. The UPLI read commands may include one or more of memory reads, atomic operations that provide atomicity guarantees, and/or Vendor Defined read commands for custom functionality. The UPLI read commands are translated to appropriate CXL.cache read opcodes based on the operation's requirements. For example, RdCurr requests the current value without changing cache states, RdOwn obtains exclusive ownership, RdShared enables shared access, and RdAny allows flexible coherency state transitions. The CXL.cache H2D data message may comprise first data in a first format, and wherein the computer is further configured to transform the first data to second data in a second format for the UPLI read response.

The computer may need to transform data between different formats as it moves between UPLI and CXL.cache domains, which may involve changes in data organization, alignment, or representation. The computer can maintain data integrity while performing the necessary format conversions to meet the requirements of the protocol domains. The first format may be optimized for CXL.cache operations, while the second format adheres to UPLI specifications for data transfer.

In some implementations, an active cable may comprise: a first pluggable module coupled to a first physical medium, a second pluggable module coupled to a second physical medium, and an apparatus as described herein coupling the first and second physical media.

In one embodiment, a system comprises: an entity configured to communicate according to an Ultra Accelerator Link Protocol Level Interface (UPLI); a host configured to communicate according to a Compute Express Link (CXL) protocol; a resource provisioning unit (RPU) comprising: a completer coupled to the entity and configured to communicate according to UPLI; a CXL interface coupled to the host and configured to communicate according to a CXL-.cache protocol; and a computer, coupled between the completer and the CXL interface, configured to: translate a UPLI request comprising a read command, received from the entity via the completer, to a CXL.cache Device-to-Host (D2H) request comprising a read opcode transmitted to the host via the CXL interface; and translate a CXL.cache Host-to-Device (H2D) data message, received from the host via the CXL interface, to a UPLI read response transmitted to the entity via the completer.

In one embodiment, an active cable comprises: first and second pluggable modules coupled by a physical medium; wherein the first pluggable module comprises a first electrical connector coupled to the physical medium via a resource provisioning unit (RPU) configured to: translate an Ultra Accelerator Link Protocol Level Interface (UPLI) request comprising a read command to a CXL.cache Device-to-Host (D2H) request comprising a read opcode, and translate a CXL.cache Host-to-Device (H2D) data message to a UPLI read response, whereby CXL refers to Compute Express Link; and wherein the second pluggable module comprises a second electrical connector coupled to the physical medium.

In one embodiment, a method for translating between Compute Express Link (CXL) and Cache-Coherent Chip-to-Chip Interconnect (CCCI), comprising: receiving, via a first interface, a CXL.mem Master-to-Subordinate Request (M2S Req) comprising a *Rd* opcode; translating the CXL.mem M2S Req to a CCCI read request comprising a *Rd* command; wherein the CCCI is characterized by maintaining hardware-managed cache-line coherence between two or more processors over a physical chip-to-chip link; sending, via a second interface, the CCCI read request; receiving, via the second interface, CCCI read response comprising *Data*; and sending, via the first interface, a CXL.mem Subordinate-to-Master Data Response (S2M DRS) comprising the *Data*.

Optionally, the CXL.mem M2S Req further comprises a first physical address, the CCCI read request further comprises a second physical address, and further comprising translating the first physical address to the second physical address. Furthermore, the CCCI may be selected from Ultra Path Interconnect (UPI), QuickPath Interconnect (QPI), Coherent Hub Interface chip-to-chip (CHI C2C), External Global Memory Interconnect (xGMI), Infinity Fabric, or NVLink chip-to-chip (NVLink-C2C).

In one embodiment, a method for translating between Compute Express Link (CXL) and Accelerator Fabric Interconnect (AFI), comprising: receiving, via a first interface, a CXL.mem Master-to-Subordinate Request (M2S Req) comprising a *Rd* opcode; translating the CXL.mem M2S Req to an AFI read request comprising a *Rd* command; wherein the AFI is selected from Ultra Accelerator Link (UALink) or NVIDIA's NVLink; sending, via a first interface, the AFI read request; receiving, via the second interface, AFI read response comprising *Data*; and sending, via the first interface, a CXL.mem Subordinate-to-Master Data Response (S2M DRS) comprising the *Data*.

Optionally, the CXL.mem M2S Req further comprises a first physical address, the AFI read request further comprises a second physical address, and further comprising translating the first physical address to the second physical address. In some implementations, the *Rd* opcode is selected from: MemRd, MemRdData, MemRdTEE, or MemRdDataTEE; the AFI read request is UALink Protocol Level Interface (UPLI) Request comprising *Rd* command selected from: Read, AtomicR, or Vendor Defined Command; and the AFI read response is sent over UPLI Read Response/Data Channel.

FIG. 131A illustrates one embodiment of a system capable of utilizing the TFD of FIG. 131B that translates between CXL.mem and UPLL The RPU (which may be integrated into a switch, an active cable, or one or more of the entities) communicates according to CXL.mem semantics with Entity.1 (which may be a CXL Host, CPU, GPU, or CXL switch). The RPU further communicates according to UALink UPLI with Entity.2 (which may be an Accelerator, GPU, CPU, UALink switch, or UALink Memory Pool). In one embodiment, the RPU may translate between (i) CXL.mem transactions such as CXL.mem M2S Req carrying a *Rd* opcode such as MemRd, and (ii) UPLI transactions such as UPLI Read Requests carrying a *Rd* command. The RPU may also translate physical addresses between the CXL.mem transactions and UPLI transactions.

Herein, similarly to the UALink Specification Revision 1.0, the following channel names may be used interchangeably: (i) Read Response/Data, (ii) Rd Rsp/Data, and (iii) RdRsp. The Read Response/Data Channel provides the Read Response and Read Response Data for a specific Read Request. The abbreviation RdRsp may be illustrated in the figures with "*Data*" positioned below it. Alternatively, the channel may be illustrated as "UPLI Read Response/Data (RdRsp)" in various figures or textual descriptions. The interchangeable use of these channel designations does not alter the functional characteristics of the channel being described. In certain aspects, the *Rd* opcode is selected from: MemRd, MemRdData, MemRdTEE, or MemRdDataTEE; the AFI read request is UPLI Request comprising *Rd* command selected from: Read, AtomicR, or Vendor Defined Command; and the AFI read response is sent over UPLI Read Response/Data Channel.

Modern datacenters face unprecedented computational demands driven by generative AI (GenAI), Large Language Models (LLMs), and distributed machine learning workloads that require massive parallelization across heterogeneous computing resources. These evolving workloads, alongside High-Performance Computing (HPC) applications such as real-time analytics, genomics research, and climate modeling, demand flexible architectures that can efficiently share memory and computational resources across multiple processing elements. The convergence of AI training, inference at scale, and memory-intensive applications has created scenarios where traditional boundaries between compute domains limit system efficiency and scalability.

The proliferation of diverse interconnect technologies, including Compute Express Link (CXL), NVLink, PCIe, and Ultra Accelerator Link (UALink), enable high-bandwidth communication between processors, accelerators, and memory devices. Each protocol operates within its own addressing scheme and communication paradigm, with devices utilizing distinct physical address spaces for memory access and resource allocation. As datacenters adopt heterogeneous computing models combining CPUs, GPUs, and domain-specific accelerators, the need for interoperability between different interconnect protocols and address spaces becomes increasingly apparent.

Current interconnect solutions face limitations when attempting to bridge different protocol domains or translate between disparate physical address spaces. Devices operating under one protocol cannot directly access resources managed by another protocol, and the rigid coupling between specific form factors and their associated functionality restricts deployment flexibility, preventing organizations from leveraging existing infrastructure while adopting new interconnect technologies.

These challenges become particularly acute in memory disaggregation scenarios, multi-tenant cloud environments, and edge computing deployments where resources had better be dynamically allocated across different protocol domains. Solutions are needed that can perform protocol translation and address space mapping while maintaining compatibility with existing datacenter infrastructure and standard form factors.

Some of the disclosed embodiments introduce novel solutions that leverage standardized retimer form factors to enable physical address translation and protocol interoperability in datacenter environments. These embodiments implement address translation capabilities within semiconductor devices that utilize the PCIe Retimer Supplemental Features and Standard BGA Footprint Specification, enabling protocol bridging and address space translation in a form factor designed for high-speed signal conditioning. By incorporating computational resources for address translation within retimer-compatible packages, the embodiments enable flexible deployment across existing PCIe infrastructure while providing protocol translation capabilities that extend beyond traditional retimer functionality. The embodiments support various interconnect protocols and address translation scenarios, optionally enabling memory sharing between hosts, protocol conversion for datacenter interconnects, memory expansion and pooling, and accelerator integration across heterogeneous computing environments.

The implementation within a PCIe Retimer BGA footprint provides physical compatibility with existing retimer infrastructure, allowing organizations to deploy protocol translation capabilities essentially without redesigning board layouts or modifying mechanical designs. The standardized high-speed signaling capabilities inherent to the retimer specification enable low-latency protocol translation suitable for memory-intensive workloads. The drop-in replacement capability allows datacenter operators to upgrade existing retimer deployments with intelligent protocol translation and address translation functionality, transforming a secondary signal conditioning infrastructure into intelligent protocol translation resources that enable cross-vendor and cross-architecture scaling of datacenter infrastructures.

In one embodiment, a semiconductor device comprises an integrated circuit (IC) package comprising high speed differential I/O balls positioned according to ball grid array layout defined by a PCIe Retimer Supplemental Features and Standard BGA Footprint Specification. The semiconductor device further comprises a first interface configured to communicate according to a first protocol, and a second interface configured to communicate according to a second protocol. Additionally, the semiconductor device comprises a computer configured to extract physical addresses carried in messages received from the first interface, translate the physical addresses, generate messages that carry the translated physical addresses, and send the messages via the second interface.

In another embodiment, a method of operating a semiconductor device comprises transmitting, according to a first protocol, via a first interface of an integrated circuit (IC) package, wherein the IC package comprises high speed differential I/O balls positioned according to ball grid array layout defined by a PCIe Retimer Supplemental Features and Standard BGA Footprint Specification. The method further comprises transmitting, according to a second protocol, via a second interface of the IC package. Additionally, the method comprises extracting, by a computer located in the IC package, first physical addresses carried in first messages received from the first interface, translating, by the computer, the first physical addresses to second physical addresses, generating second messages that carry the second physical addresses, and sending the second messages via the second interface.

Modern datacenters require flexible interconnect solutions that bridge diverse protocol domains while maintaining compatibility with existing infrastructure. Embodiments herein disclose semiconductor devices that implement protocol translations and physical address translations within IC packages conforming to the PCIe Retimer Supplemental Features and Standard BGA Footprint Specification. The devices comprise first and second interfaces communicating according to first and second protocols respectively, with an embedded computer that extracts physical addresses from messages received via the first interface, translates these addresses, and generates messages carrying the translated addresses for transmission via the second interface. This retimer-compatible form factor essentially enables drop-in deployment within existing PCIe and cabling infrastructures while providing protocol bridging and address translation capabilities. The standardized BGA layout provides high-speed differential signaling suitable for low-latency address translation, optionally supporting memory disaggregation, host-to-host memory sharing, accelerator integration, and protocol conversion between CXL, UALink, NVLink, and/or PCIe domains, addressing interoperability challenges.

The semiconductor device described in the embodiment below performs physical address translation within a standardized PCIe retimer form factor. By extracting physical addresses within messages received from a first interface operating according to a first protocol, translating those addresses, and then generating messages carrying the translated addresses for transmission via a second interface operating according to a second protocol, the device enables communication between otherwise possibly incompatible entities, allowing for memory provisioning from one host to another, creation of shared memory regions between hosts, and/or abstraction of memory device resources, while maintaining compatibility with industry-standard physical packaging specifications.

In one embodiment, a semiconductor device, comprises: an integrated circuit (IC) package comprising high speed differential I/O balls positioned according to ball grid array layout defined by a PCIe Retimer Supplemental Features and Standard BGA Footprint Specification; a first interface configured to communicate according to a first protocol; a second interface configured to communicate according to a second protocol; and a computer configured to extract physical addresses carried in messages received from the first interface, translate the physical addresses, generate messages that carry the translated physical addresses, and send the messages via the second interface.

The IC package houses the functional components of the device, including the first and second interfaces as well as the computer configured to perform the address translation operations. The IC package uses a standardized ball grid array layout as defined by one or the current of future versions of the PCIe Retimer Supplemental Features and Standard BGA Footprint Specification, such as the PCIe 5.0, 6.0, or 7.0 Retimer Supplemental Features and Standard BGA Footprint Specification, which provides a familiar and compatible form factor for system designers. The High-Speed Differential I/Os are positioned according to this standardized ball grid array layout, allowing the semiconductor device to be readily integrated into system designs that conform to the PCIe 5.0, 6.0, or 7.0 specifications. These differential I/Os support the high-speed communication capabilities required for efficient data transfer between the coupled interfaces.

The first interface may be configured to communicate according to various protocols, such as PCIe, CXL-based protocol (that may include CXL.mem, CXL.cache, or CXL.io), or UALink-based protocols, such as UPLI, depending on the specific application requirements. Similarly, the second interface may be configured to communicate according to a different protocol than the first interface, or in some embodiments, the same protocol but with different addressing requirements. The computer within the semiconductor device may be implemented using various processing elements, such as ASICs, FPGAs, microprocessors, or other suitable processing architectures. The computer is configured to extract physical addresses within messages received via the first interface, translate these addresses according to predetermined mapping rules or dynamic translation tables, generate new messages incorporating the translated addresses, and send these translated messages via the second interface. The translation of physical addresses may involve various operations such as address space remapping, offset adjustments, or more complex transformations based on the requirements of the coupled systems. The translation process may be predefined, configurable utilizing management interfaces, or may adapt dynamically based on system conditions.

Optionally, the entire IC package is compatible with the ball grid array layout defined by PCIe 5.0, 6.0, or 7.0 Retimer Supplemental Features and Standard BGA Footprint Specification. The semiconductor device may be fully compatible with the ball grid array layout defined by the PCIe 5.0, 6.0, or 7.0 Retimer Supplemental Features and Standard BGA Footprint Specification. Complete compatibility with this layout specification means that the pin placements, pin functions, and electrical characteristics are in accordance with the specification, allowing system designers to utilize compatible PCB layouts when incorporating the device.

In certain aspects, at least one of Pin Name VD_1 to VD_6 or VD_9 to VD_15 are incompatible with the ball grid array layout defined by PCIe 5.0, 6.0, or 7.0 Retimer Supplemental Features and Standard BGA Footprint Specification. Optionally, these specific pin variations may enable additional functionality not available in standard retimer embodiments, such as specialized signaling for address translation mechanisms, enhanced debugging capabilities, or additional configuration options. This partial deviation from the standard may allow for enhanced functionality while maintaining backward compatibility with system designs in other aspects. Optionally, the messages received from the first interface and sent via the second interface may include additional messages that do not carry physical addresses, wherein such messages may be processed by the computer without performing physical address translations. Additionally or alternatively, the computer may further process additional messages that carry virtual addresses instead of physical addresses, and the messages carrying physical addresses may coexist with other types of messages that may be processed differently by the computer, such that the description of messages carrying physical addresses does not limit the presence or processing of other types of messages that may be communicated between the first interface and the second interface. Furthermore, the computer may apply different processing methods to different types of messages according to their content and/or requirements, which may include forwarding messages without modification, modifying message contents without performing address translations, or performing other types of translations or modifications that may differ from the above described physical address translations. Herein, phrases in the form of "the IC package comprises" are used to indicate that the IC package includes or houses various elements that may have functionalities distinct from the IC package itself. Specifically, while the IC package may serve as a physical housing or enclosure, the elements it comprises, such as interfaces and a computer, may have essentially independent and active operational capabilities. This phrasing allows for the inclusion of components within the IC package that perform tasks beyond mere housing, ensuring the IC package can house elements with a variety of functional characteristics. It is noted that PCIe 5.0 Retimer Supplemental Features and Standard BGA Footprint Specification and PCIe 6.0 Retimer Supplemental Features and Standard BGA Footprint Specification share a comparable ball grid array layout, which are sometimes referred to herein in the context of IC package comprising high speed differential I/O balls positioned according to ball grid array layout defined by the PCIe 5.0 or 6.0 Retimer Supplemental Features and Standard BGA Footprint Specification.

In some implementations, the first protocol comprises CXL.mem, the first interface is configured to expose a CXL type 2 device or a CXL type 3 device, the second protocol comprises CXL.cache, and the second interface is configured to expose a CXL type 1 device or a CXL type 2 device. In this case, the CXL.mem protocol may utilize messages comprising first physical addresses (PAs) from a first Host Physical Address (HPA) space utilized by a first host coupled to the first interface, and wherein the CXL.cache protocol utilizes messages comprising second PAs from a second HPA space utilized by a second host coupled to the second interface. Alternatively, the first protocol may comprise CXL.cache, the first interface is configured to expose a CXL type 1 device or a CXL type 2 device, the second protocol comprises CXL.cache, and the second interface is configured to expose a CXL type 1 device or a CXL type 2 device. In this configuration, the first protocol may utilize messages comprising first physical addresses (PAs) from a first Host Physical Address (HPA) space utilized by a first host coupled to the first interface, and the second protocol utilizes messages comprising second PAs from a second HPA space utilized by a second host coupled to the second interface. In another configuration, the first protocol comprises CXL.mem, the first interface is configured to expose a CXL type 2 device or a CXL type 3 device, the second protocol comprises CXL.mem, and the second interface is configured to expose a CXL Root Port.

Optionally, the first protocol may utilize messages comprising first physical addresses (PAs) from a first physical address space utilized by a first host coupled to the first interface, and the second protocol utilizes messages comprising second PAs from a second physical address space exposed by the Computer over the second interface.

In yet another embodiment, the first protocol comprises PCIe or CXL.io, the first interface is configured to expose an Endpoint, the second protocol comprises PCIe or CXL.io, and the second interface is configured to expose an Endpoint.

Furthermore, the first protocol may utilize TLPs or Protocol Data Units (PDUs) comprising first physical addresses (PAs) from a first Host Physical Address (HPA) space utilized by a first host coupled to the first interface, and the second protocol utilizes TLPs or PDUs comprising second PAs from a second HPA space utilized by a second host coupled to the second interface. Optionally, the semiconductor device implements non-transparent bridging functionality between two CXL.io domains, between a PCIe domain and a CXL.io domain, or between two PCIe domains, wherein both the first and second interfaces expose PCIe or CXL.io Endpoints, effectively creating separate PCIe/CXL.io domains that can communicate utilizing the address translation mechanism provided by the computer. The first interface may be coupled to a first host and expose a PCIe or CXL.io Endpoint to the first host, while the second interface may be coupled to a second host and expose a PCIe or CXL.io Endpoint to the second host. TLPs or Protocol Data Units (PDUs) from the first host containing physical addresses within its Host Physical Address (HPA) space are received by the first interface, processed by the computer to translate the addresses, and then sent through the second interface to the second host using physical addresses within the second host's HPA space. This non-transparent bridging functionality may allow two hosts, each with its own address space, to communicate with each other without requiring either host to have direct visibility into the other host's memory space. The computer may implement address windows or translation regions that map portions of one host's address space to portions of the other host's address space, allowing controlled access to specific memory regions. The address translation mechanism may be configured utilizing various means, such as configuration registers accessible via PCIe configuration space, management interfaces, or other control mechanisms. The translation may be static or may be dynamically updated based on system requirements.

In certain aspects, the first protocol utilizes at least one Unordered IO (UIO) Transaction Layer Packet (TLP) Type and at least 50% of the Memory Requests transmitted by the first interface utilize Flit Mode (FM) TLP formats, and/or wherein the second protocol utilizes at least one of the TLP Types UIOMRd, UIOMWr, UIORdCpl, UIOWrCpl, UIORdCplD. The computer may be configured to translate between Non-Flit Mode (NFM) TLP formats, which may be associated with PCIe or with CXL.io, and may be received on one interface, and Flit-Mode (FM) TLP formats, such as UIO TLPs, which may be associated with PCIe or with CXL.io, and may be transmitted on the other interface, or may perform translations between different UIO TLP formats as required by the coupled hosts or devices. This translation may involve not only address translation but also protocol translation to ensure proper communication between the coupled entities.

The computer may be further configured to translate the physical addresses to enable access to memory regions storing Large Language Model (LLM) parameters distributed across multiple memory domains, whereby the translated physical addresses enable the first interface to access LLM model weights and activation data residing in a physical address space associated with the second interface.

The IC package may be further compatible with power and ground pin distribution defined by PCIe 7.0 Retimer Supplemental Features and Standard BGA Footprint Specification. This compatibility allows the semiconductor device to be physically integrated into system designs that follow the PCIe Retimer specification, possibly minimizing modifications to the PCB layout or mechanical aspects of the system. The package dimensions to be defined in future PCIe Retimer specification (such as the anticipated PCIe 7.0 Retimer Supplemental Features and Standard BGA Footprint Specification) may include specifications for package size, height, ball pitch, and other physical characteristics that affect the mechanical integration of the component into a system. By adhering to these specifications, the semiconductor device may be used as a drop-in replacement for a future standard PCIe retimer in systems designed to accommodate such components. Additionally, the semiconductor device may be compatible with power and ground pin distribution as defined by the PCIe Retimer Specification, enabling proper power delivery and signal integrity when the device is integrated into a system designed according to this specification. The power and ground pin distribution may follow specific patterns designed to minimize noise, crosstalk, or other electrical issues that could affect the performance of high-speed differential signals.

In some implementations, the first and second interfaces are configured to support a ×4 lane configuration, comprising high-speed differential pairs arranged to support two sets of four lanes for data transmission, and wherein the IC package is further compatible with package dimensions defined for the x4 retimer by PCIe 6.0 Retimer Supplemental Features and Standard BGA Footprint Specification. The first and second interfaces may also be configured to support a ×8 lane configuration, comprising high-speed differential pairs arranged to support two sets of eight lanes for data transmission, and wherein the IC package is further compatible with package dimensions defined for the x8 retimer by PCIe 6.0 Retimer Supplemental Features and Standard BGA Footprint Specification.

Furthermore, the IC package may be configured to support a ×16 lane configuration, comprising high-speed differential pairs arranged to support two sets of sixteen lanes for data transmission, and wherein the IC package is further compatible with package dimensions defined for the x16 retimer by PCIe 6.0 Retimer Supplemental Features and Standard BGA Footprint Specification. The semiconductor device may be configured to support different lane configurations to accommodate various system requirements and bandwidths. When configured to support a ×4 lane configuration, the device includes high-speed differential pairs arranged to support two sets of four lanes for data transmission, with the IC package being compatible with package dimensions defined for the x4 retimer by the PCIe Retimer Specification. Similarly, when configured to support a ×8 lane configuration, the device includes high-speed differential pairs arranged to support two sets of eight lanes for data transmission, with the IC package being compatible with package dimensions defined for the x8 retimer by the PCIe Retimer Specification. For higher bandwidth applications, the device may be configured to support a ×16 lane configuration, including high-speed differential pairs arranged to support two sets of sixteen lanes for data transmission, with the IC package being compatible with package dimensions defined for the x16 retimer by the PCIe Retimer Specification. The compatibility with the PCIe 5.0, 6.0, or 7.0 Retimer Specification ensures that each configuration can be integrated into systems designed for the corresponding lane width with minimal or no custom design accommodations.

The first and second interfaces may support operation at data rates of 32.0 GT/s using NRZ signaling as defined in the PCIe 5.0 specification, and support operation at 64.0 GT/s using PAM4 signaling as defined in the PCIe 6.0 specification, thereby providing compatibility with PCIe 5.0 systems and with PCIe 6.0 systems. The semiconductor device may support various data rates and signaling methods to ensure compatibility with different PCIe generations. For example, the first and second interfaces may support operation at data rates of 32.0 GT/s using NRZ signaling as defined in the PCIe 5.0 specification, and support operation at 64.0 GT/s using PAM4 signaling as defined in the PCIe 6.0 specification. This dual capability ensures that the device can operate in systems designed for either PCIe 5.0 or PCIe 6.0, providing backward compatibility while enabling the higher performance of newer systems.

In certain aspects, the first and second interfaces are compatible with PCIe 6.0 Retimer Supplemental Features and Standard BGA Footprint Specification, supporting data rates up to 64.0 GT/s and PAM4 signaling in addition to NRZ signaling, such that the semiconductor device is operable to negotiate data rates and signaling methods for both PCIe 5.0 and PCIe 6.0 systems.

Additionally, the first and second interfaces may further comprise ground pins distributed according to PCIe 6.0 Retimer Supplemental Features and Standard BGA Footprint Specification, enabling improved signal integrity at data rates exceeding 32.0 GT/s. The compatibility with both PCIe 5.0 and PCIe 6.0 specifications may extend beyond data rates and signaling methods to include other aspects of the protocols, such as link training sequences, error handling mechanisms, and power management features. The device may automatically negotiate the appropriate data rate and signaling method based on the capabilities of the coupled components, selecting the highest performance mode that is supported by components in the link. The semiconductor device may include ground pins distributed according to the PCIe 6.0 Retimer Specification, which may include optional pin reassignment updates designed to reduce signal crosstalk and improve signal integrity at data rates exceeding 32.0 GT/s. These pin reassignments may involve placement of ground pins near high-speed differential pairs, or other layout optimizations that help maintain signal quality at the higher frequencies associated with 64.0 GT/s operation.

The IC package may be further compatible with PCIe 4.0 Retimer Supplemental Features and Standard BGA Footprint Specification, supporting data rates up to 16.0 GT/s. This backward compatibility enlarges the device's deployment options, from legacy installations to cutting-edge designs.

The first interface may be coupled to a first host via one or more switches, and/or wherein the second interface is coupled to a second host via one or more switches. The switches may be PCIe switches, CXL switches, or other compatible switching devices that provide connectivity between hosts and devices. The use of switches allows for more complex system topologies, may provide additional functionality such as flow control, quality-of-service, or traffic management that complements the address translation functionality of the semiconductor device. The semiconductor device may be designed to work transparently with these switches, such that the switches are unaware of the address translation occurring within the device. In configurations where both the first and second interfaces are coupled to hosts through switches, the semiconductor device may effectively serve as a bridge between two separate switch domains, allowing communication between hosts that would otherwise be isolated from each other by the switch.

In one embodiment, a method of operating a semiconductor device, comprises: transmitting, according to a first protocol, via a first interface of an integrated circuit (IC) package, wherein the IC package comprises high speed differential I/O balls positioned according to ball grid array layout defined by a PCIe Retimer Supplemental Features and Standard BGA Footprint Specification; transmitting, according to a second protocol, via a second interface of the IC package; extracting, by a computer located in the IC package, first physical addresses carried in first messages received from the first interface; translating, by the computer, the first physical addresses to second physical addresses; generating second messages that carry the second physical addresses; and sending the second messages via the second interface.

Optionally, operating the first interface comprises operating according to CXL.mem semantics utilizing the first messages comprising the first physical addresses within a Host Physical Address (HPA) space utilized by a first host communicating with the first interface; and wherein operating the second interface comprises operating according to CXL.cache semantics utilizing the second messages comprising the second physical addresses within an HPA space utilized by a second host communicating with the second interface.

In other implementations, operating the first interface comprises operating according to CXL.cache semantics utilizing the first messages comprising the first physical addresses within a Host Physical Address (HPA) space utilized by a first host communicating with the first interface; and wherein operating the second interface comprises operating according to CXL.cache semantics utilizing the second messages comprising the second physical addresses within an HPA space utilized by a second host communicating with the second interface.

Alternatively, operating the first interface comprises operating according to CXL.mem semantics utilizing the first messages comprising the first physical addresses within a Host Physical Address (HPA) space utilized by a first host communicating with the first interface; and wherein operating the second interface comprises operating according to CXL.mem semantics utilizing the second messages comprising the second physical addresses within a physical address space exposed by the computer over the second interface.

In certain aspects, operating the first interface comprises operating according to PCIe or CXL.io semantics utilizing the first messages comprising the first physical addresses within a Host Physical Address (HPA) space utilized by a first host communicating with the first interface; and wherein operating the second interface comprises operating according to PCIe or CXL.io semantics utilizing the second messages comprising the second physical addresses within an HPA space utilized by a second host communicating with the second interface.

The method may further comprise operating the first and second interfaces at data rates of 32.0 GT/s using NRZ signaling as defined in the PCIe 5.0 specification, or operating at 64.0 GT/s using PAM4 signaling as defined in the PCIe 6.0 specification, thereby providing compatibility with PCIe 5.0 systems and with PCIe 6.0 systems.

Furthermore, operating the first and second interfaces may comprise operating according to PCIe 6.0 Retimer Supplemental Features and Standard BGA Footprint Specification, supporting data rates up to 64.0 GT/s and PAM4 signaling in addition to NRZ signaling, such that the semiconductor device negotiates data rates and signaling methods for both PCIe 5.0 and PCIe 6.0 systems. And optionally, a non-transitory computer-readable medium may comprise instructions that, when executed by a processor, cause the processor to perform the method.

FIG. 114A illustrates one embodiment of a system comprising a semiconductor device comprising a computer coupled between a first interface (Interface.1) that may be configured to communicate according to CXL.mem semantics and a second interface (Interface.2) that may be configured to communicate according to CXL.cache semantics. The semiconductor device may be implemented in an IC package having high speed differential I/O balls positioned according to ball grid array layout defined by the PCIe 5.0, 6.0, or 7.0 Retimer Supplemental Features and Standard BGA Footprint Specification. The first interface may be configured to expose a CXL type-2 device or a CXL type-3 device and may be further configured to communicate according to CXL.mem semantics with a first host (Host.1) through a first CXL Root Port (CXL RP.1) of the first host. The second interface may be configured to expose a CXL type-1 device or a CXL type-2 device and may be further configured to communicate according to CXL.cache semantics with a second host (Host.2) through a second CXL Root Port (CXL RP.2) of the second host. The computer may be configured to extract physical addresses within messages received via the first interface, wherein these addresses may belong to a first HPA space utilized by the first host, translate these addresses, and generate messages carrying the translated physical addresses for transmission via the second interface, wherein these translated addresses may correspond to a second HPA space utilized by the second host. Optional CXL switch(es) may be positioned between the first interface and the first CXL Root Port (CXL RP.1) of the first host, and/or between the second interface and the second CXL Root Port (CXL RP.2) of the second host.

FIG. 114B illustrates one embodiment of a TFD demonstrating translations, such as address translations, performed by a semiconductor device or by a computer, denoted as SD/C, between physical addresses carried in CXL.mem messages received from a first host (Host.1), and physical addresses carried in CXL.cache messages sent to a second host (Host.2), possibly enabling the first host to access resources mapped to the address space utilized by the second host. The first host may initiate a CXL.mem transaction that includes a CXL.mem M2S Request comprising MemOpcode(MemRd), Tag(p.1.1), and Address(AS.1.1). The SD/C may translate the CXL.mem transaction to a CXL.cache transaction that includes a CXL.cache D2H Request comprising Opcode(RdCurr), Command Queue ID CQID(q.2.1), and Address(AS.2.1), and may send the CXL.cache D2H Request to the second host. Upon receiving a response from the second host, which may include a CXL.cache H2D Data comprising CQID(q.2.1) and Data(*Data.1*), the SD/C may translate the CXL.cache H2D Data to a CXL.mem S2M DRS comprising Opcode(MemData), Tag(p.1.1), and Data(*Data.1*). The SD/C may perform further translations, such as opcode translations, e.g., translating between CXL.mem M2S Request opcodes, such as MemRd*, and CXL.cache D2H Request opcodes, such as RdCurr, RdOwn, RdShared, RdAny, RdOwnNoData, ItoMWr, WrCur, CLFlush, CleanEvict, DirtyEvict, CleanEvictNoData, WOWrInv, WOWrInvF, WrInv, or CacheFlushed. The SD/C may further perform other translations, such as field translations between messages of the CXL.mem protocol and messages of the CXL.cache protocol, such as translations between CXL.mem tag fields and CXL.cache CQID fields, translations between reserved fields, and translations between reserved and non-reserved fields. In some embodiments, the SD/C may act as a protocol endpoint, such as a first CXL device (e.g., a CXL type-3 device or CXL type-2 device), and terminate the CXL.mem transaction. The SD/C may issue the CXL.cache transaction, optionally acting as an independent protocol initiator, such as a second CXL device (e.g., a CXL type-1 device or a CXL type-2 device), and may utilize translated fields from the CXL.mem transaction for constructing the CXL.cache transaction. In other embodiments, the SD/C may be configured to maintain, at least partly, an end-to-end transaction context along the path between the first host and the second host, optionally without terminating the CXL.mem transactions, such as by preserving, at least partly, transaction-related identification fields. In one example, the first host may utilize 12-bit CXL.mem Tags when communicating with the SD/C, wherein the SD/C may reuse the 12-bit CXL.mem Tag values for constructing 12-bit CXL.cache CQIDs when communicating with the second host, hence optionally preserving, at least partly, a 12-bit transaction identifier over the path between the first host and the second host, for maintaining, at least partly, an end-to-end transaction context along that path.

FIG. 114C illustrates one embodiment of a TFD demonstrating translations, such as address translations, performed by a semiconductor device or by a computer, denoted as SD/C, between physical addresses carried in CXL.mem messages received from a first host (Host.1), and physical addresses carried in CXL.cache messages sent to a second host (Host.2), possibly enabling the first host to access resources mapped to the address space utilized by the second host, wherein such accesses from the first host may affect cacheline states maintained in the second host, such as by marking cachelines in shared state. The first host may initiate a CXL.mem transaction that may include a CXL.mem M2S Request comprising MemOpcode (MemRd*), Tag(p.4.1), and Address(AS.4.1). The SD/C may translate the CXL.mem transaction to a CXL.cache transaction that may include a CXL.cache D2H Request comprising Opcode(RdShared), Command Queue ID CQID (q.3.1), and Address(AS.3.1), wherein the SD/C may send the CXL.cache D2H Request to the second host. Upon receiving a response (or responses) from the second host, which may include a CXL.cache H2D Data comprising CQID(q.3.1) and Data(*Data.2*), and may further include a CXL.cache H2D Response comprising CQID(q.3.1) and GO-S, the SD/C may translate the response (or responses) from the second host, to a CXL.mem S2M DRS comprising Opcode(MemData), Tag(p.4.1), and Data(*Data.2*). The SD/C may perform further translations, such as opcode translations, e.g., translating between CXL.memM2S Request opcodes, such as MemRd*, and CXL.cache D2H Request opcodes, such as RdCurr, RdOwn, RdShared, RdAny, RdOwnNoData, ItoMWr, WrCur, CLFlush, CleanEvict, DirtyEvict, CleanEvictNoData, WOWrInv, WOWrInvF, WrInv, or CacheFlushed. The SD/C may further perform other translations, such as field translations between messages of the CXL.mem protocol and messages of the CXL.cache protocol, such as translations between CXL.mem tag fields and CXL.cache CQID fields, translations between reserved fields, and translations between reserved and non-reserved fields.

FIG. 115A illustrates one embodiment of a system comprising a semiconductor device comprising a computer coupled between a first interface (Interface.1) and a second interface (Interface.2), wherein both the first interface and the second interface may be configured to communicate according to CXL.cache semantics. The first interface may be configured to expose a CXL type-1 device or a CXL type-2 device and may be further configured to communicate according to CXL.cache semantics with a first host (Host.1) through a first CXL Root Port (CXL RP.1) of the first host. Similarly, the second interface may be configured to expose a CXL type-1 device or a CXL type-2 device and may be further configured to communicate according to CXL.cache semantics with a second host (Host.2) through a second CXL Root Port (CXL RP.2) of the second host. The computer may be configured to extract physical addresses within messages received via the first interface, wherein these addresses are from the first HPA space utilized by the first host, translate these addresses, and generate messages carrying the translated physical addresses for transmission via the second interface, wherein these translated addresses correspond to the second HPA space utilized by the second host.

FIG. 115B illustrates one embodiment of a TFD demonstrating translations, such as address translations, performed by a semiconductor device or by a computer, denoted as SD/C, between physical addresses carried in a first CXL.cache messages received from a first host (Host.1), and physical addresses carried in second CXL.cache messages sent to a second host (Host.2), possibly enabling the first host to maintain, at least partly, memory sharing and/or memory coherency with the second host, such as by enabling the first host to invalidate cachelines in the second host. The first host may initiate a first CXL.cache transaction that includes a CXL.cache H2D Request comprising Opcode (SnpInv), UQID(t.1.1), and Address(AS.1.1). The SD/C may translate the first CXL.cache transaction to a second CXL.cache transaction that includes a CXL.cache D2H Request comprising Opcode(CLFlush), CQID(q.2.1), and Address(AS.2.1), and may send the CXL.cache D2H Request to the second host. Upon receiving a response from the second host, which may include a CXL.cache H2D Response comprising Opcode(GO-I) and CQID(q.2.1), the SD/C may translate the CXL.cache H2D Response to a CXL.cache D2H Response comprising Opcode(RspIHitI), and UQID(t.1.1).

The SD/C may perform further translations, such as opcode translations, e.g., translating between CXL.cache H2D Request opcodes, such as Snp* (e.g., SnpData, SnpInv, and SnpCur), and CXL.cache D2H Request opcodes, such as RdCurr, RdOwn, RdShared, RdAny, RdOwnNoData, ItoMWr, WrCur, CLFlush, CleanEvict, DirtyEvict, CleanEvictNoData, WOWrInv, WOWrInvF, WrInv, or CacheFlushed. The SD/C may further perform other translations, such as field translations between messages of the first CXL.cache transaction and messages of the second CXL-.cache transaction, such as translations between UQID and CQID fields, translations between reserved fields, and translations between reserved and non-reserved fields.

FIG. 116A illustrates one embodiment of a system comprising a semiconductor device comprising a computer coupled between a first interface (Interface.1) and a second interface (Interface.2), wherein both the first interface and the second interface may be configured to communicate according to CXL.mem semantics. The first interface may be configured to expose a CXL type-2 device or a CXL type-3 device and may be further configured to communicate according to CXL.mem semantics with a CXL host through a first CXL Root Port (CXL RP.1) of the CXL host. The second interface may be configured to expose a second CXL Root Port (CXL RP.2) and may be further configured to communicate according to CXL.mem semantics with a CXL device, that may include a CXL Endpoint (CXL EP). Additionally or alternatively, the CXL device may comprise a Global Fabric-Attached Memory (G-FAM) Device (GFD). The computer may be configured to extract physical addresses from messages received via the first interface, wherein these addresses are from the first HPA space utilized by the CXL host, translate these addresses, and generate messages carrying the translated physical addresses for transmission via the second interface, wherein these translated addresses correspond to a physical address space exposed by the Computer over Interface.2. Optional CXL switch(es) may be positioned between the first interface and the first CXL Root Port (CXL RP.1), and/or between the second interface and the CXL Endpoint (CXL EP). In some embodiments, the computer and at least one of the first entity (Entity.1) and the second entity (Entity.2) may be included within the same IC package, optionally coupled via one or more UCIe links.

FIG. 116B illustrates one embodiment of a TFD demonstrating translations, such as address translations, performed by a semiconductor device or by a computer, denoted as SD/C, between physical addresses carried in first CXL.mem messages received from a CXL host, that may utilize a first CXL.mem protocol, and physical addresses carried in second CXL.mem messages, sent to a CXL device, that may utilize a second CXL.mem protocol, possibly enabling the SD/C to abstract resources of the CXL device, and possibly enabling the CXL host to access resources of the CXL device utilizing different memory flow types, such as utilizing optimized type-3 memory flows, instead of elaborated type-2 memory flows that may be utilized by the CXL device. Additionally or alternatively, the SD/C may further initiate speculative memory reads targeting the CXL device, and may handle memory prefetching on behalf of the CXL host, possibly acting as a proxy of the CXL host when communicating with the CXL device. The CXL host may initiate a first CXL.mem transaction that includes a first CXL.mem M2S Req comprising MemOpcode(MemRd-Data), Tag(p.2.1), and Address(AS.2.1). The SD/C may translate the first CXL.mem transaction to a second CXL.mem transaction that includes a second CXL.mem M2S Req comprising MemOpcode(MemRd), SnpType (SnpCur), MetaField(MSO), MetaValue(I), Tag(p.1.1), and Address(AS.1.1), and may send the second CXL.mem M2S Req to the CXL device. Upon receiving a response (or responses) from the CXL device, that may include a CXL.mem S2M NDR comprising Opcode(Cmp), MetaField (No-Op), MetaValue(NA), and Tag(p.1.1), and may further include a first CXL.mem S2M DRS comprising Opcode (MemData), MetaField(No-Op), MetaValue(NA), Tag (p.1.1), and Data(*Data*), the SD/C may translate the response (or responses) from the CXL device to a second CXL.mem S2M DRS comprising Opcode(MemData), Tag (p.2.1), and Data(*Data*), and may send the second CXL.mem S2M DRS to the CXL host.

Examples of a speculative memory read targeting the device includes a CXL.mem M2S Req comprising MemOpcode(MemSpecRd), Tag(p.1.2), and Address(AS.1.2), which may utilize the speculative memory reads, optionally on behalf of the CXL host, to facilitate data prefetches and potentially reduce read latency from the CXL device. The SD/C may perform further translations, such as opcode translations, e.g., translating between a first CXL.mem M2S Req opcode, such as MemRdData, and a second CXL.mem M2S Req opcode, such as MemRd. The SD/C may further perform other translations, such as field translations between messages of the first CXL.mem protocol and messages of the second CXL.mem protocol, such as translations between CXL.mem tag fields of the two protocols, translations between reserved fields of the two protocols, and translations between reserved and non-reserved fields pf the two protocols. In some embodiments, the SD/C may perform translations between protocols belonging to different CXL protocol revisions, such as translating between transactions of the first CXL.mem protocol conforming to CXL 1.1, which may be utilized by the CXL host, and transactions of the second CXL.mem protocol conforming to CXL 2.0, which may be utilized by the CXL device.

In still some embodiments, the SD/C may be configured to act as a protocol endpoint, such as a first CXL device (e.g., a CXL type-3 device or CXL type-2 device), and terminate the first CXL.mem transaction. The SD/C may then issue the second CXL.mem transaction, optionally acting as an independent protocol initiator, such as a second CXL host utilizing a second CXL RP (CXL RP.2), and may utilize translated fields from the first CXL.mem transaction for constructing the second CXL.mem transaction. In other embodiments, the SD/C may be configured to maintain, at least partly, an end-to-end transaction context along the path between the CXL host and the CXL device, optionally without terminating CXL.mem transactions received from the CXL host, such as by preserving, at least partly, transaction-related identification fields. In one example, the SD/C may reuse CXL.mem tag values received from the CXL host for constructing CXL.mem tag values sent to the CXL device, hence optionally preserving, at least partly, a unified transaction identifier over the path between the CXL host and the CXL device, for maintaining, at least partly, an end-to-end transaction context along that path.

FIG. 117A illustrates one embodiment of a system comprising a semiconductor device comprising a computer coupled between a first interface (Interface.1) that may be configured to communicate according to a CXL-based protocol, such as CXL.io, CXL.mem, or CXL.cache, and a second interface (Interface.2) that may be configured to communicate according to a PCIe-based protocol, such as a protocol conforming to PCI Express Base Specification Revision 6.2. The semiconductor device may be implemented in an IC package having high speed differential I/O balls positioned according to ball grid array layout defined by the PCIe Retimer Supplemental Features and Standard BGA Footprint Specification. The first interface may be configured to expose a first endpoint (EP.1) and may be further configured to communicate according to a CXL-based protocol with a first entity (Entity.1), which may be a first host (Host.1) or a CXL device. The second interface may be configured to expose a second endpoint (EP.2) and may be further configured to communicate according to a PCIe-based protocol, with a second entity (Entity.2), which may be a second host (Host.2) or a PCIe device. The computer may be configured to extract physical addresses from TLPs, PDUs, or messages, received via the first interface, wherein these addresses may belong to a first HPA space utilized by the first entity, translate these addresses, and generate TLPs, PDUs, or messages carrying the translated physical addresses for transmission via the second interface, wherein these translated addresses may correspond to a second HPA space utilized by the second entity. Optional switch(es), such as CXL switches, may be positioned between the first interface and the first entity. Additionally or alternatively, optional switch(es), such as PCIe switches, may be positioned between the second interface and the second entity.

FIG. 117B illustrates one embodiment of a TFD demonstrating translations, such as address translations, performed by a semiconductor device or by a computer, denoted as SD/C, between physical addresses carried in CXL-based protocol data units (PDUs), such as CXL.io TLPs, received from a first entity (Entity.1), which may be a first host (Host.1) or a CXL device, and physical addresses carried in PCIe TLPs, sent to a second entity (Entity.2), which may be a second host (Host.2) or a PCIe device, possibly enabling the first entity to access resources mapped to an address space utilized by the second entity. The first entity may initiate a CXL.io transaction that includes a CXL.io UIO Memory Read Request (UIOMRd) comprising Address (AS.2.1), Tag(w.2.1), and Length(d.2.1). The SD/C may translate the CXL.io transaction to a PCIe transaction that includes a PCIe UIO Memory Read Request (UIOMRd) comprising Address(AS.1.1), Tag(w.1.1), and Length(d.1.1), wherein the SD/C may send the PCIe UIO Memory Read Request (UIOMRd) to the second entity. Upon receiving a completion from the second entity, which may include a PCIe UIO Read Completion with Data (UIORdCplD) comprising Tag(w.1.1) and DataPayload(*Data.1*), the SD/C may translate the PCIe UIO Read Completion with Data (UIORdCplD) to a CXL.io UIO Read Completion with Data (UIORdCplD) comprising CDL(cdl.2.1), Tag(w.2.1), and DataPayload(*Data.1*), wherein the CDL field may denote a CXL DevLoad (CDL) field in CXL.io UIO completions, and may be populated by the SD/C with information related to Quality-of-Service (QoS), such as QoS telemetry value or values. The SD/C may perform further translations, such as protocol translations, opcode translations, command translations, or TLP type translations, e.g., translating between CXL.io UIO TLPs, such as CXL.io UIOMRd TLP, and PCIe non-UIO TLPs, such as PCIe MRd.

Recent PCIe hosts and devices may leverage the PCIe Unordered IO (UIO) optional capability, originally introduced as ECN, and later rolled on into PCIe Base Specification Revision 6.2. PCIe UIO defines a new wire semantic and related capabilities that address limitations of the PCI/PCIe fabric-enforced ordering rules, enabling improved performance and efficiency, such as by utilizing multi-path routing. The SD/C may further perform other translations, such as field translations between TLPs of the CXL.io protocol and TLPs of the PCIe protocol, such as translations between CXL.io tag fields and PCIe tag fields, translations between reserved fields, and translations between reserved and non-reserved fields.

FIG. 117C illustrates one embodiment of a TFD demonstrating translations performed by a semiconductor device or by a computer, denoted as SD/C, between physical addresses carried in CXL.io TLPs, received from a first entity (Entity.1), and physical addresses carried in PCIe TLPs, sent to a second entity (Entity.2), possibly enabling the first entity to access resources mapped to an address space utilized by the second entity. The SD/C may perform further translations, such as protocol translations, opcode translations, command translations, TLP type translations, or field translations, between CXL.io TLPs and PCIe TLPs. The first entity may initiate a CXL.io transaction that includes a CXL.io UIO Memory Read Request (UIOMRd) comprising Address(AS.4.1), Tag(w.4.1), and Length(d.4.1). The SD/C may translate the CXL.io transaction to a PCIe transaction that includes a PCIe Memory Read Request (MRd) comprising Address(AS.3.1), Tag(w.3.1), and Length(d.3.1), wherein the SD/C may send the PCIe Memory Read Request (MRd) to the second entity. Upon receiving a completion from the second entity, which may include a PCIe Completion with Data (CplD) comprising Tag(w.3.1) and DataPayload(*Data.2*), the SD/C may translate the PCIe Completion with Data (CplD) to a CXL.io UIO Read Completion with Data (UIORdCplD) comprising CDL(cdl.4.1), Tag (w.4.1), and DataPayload(*Data.2*), wherein the CDL field may denote a CXL DevLoad (CDL) field in CXL.io UIO completions, and may be populated by the SD/C with information related to Quality-of-Service (QoS).

The translations performed by the SD/C may further enable communication between the first entity and the second entity over a split flit/non-flit path, wherein the CXL.io UIO portion of the path may utilize CXL protocol flits, whereas the PCIe non-UIO portion of the path may utilize Non-Flit Mode (NFM). Such split flit/non-flit path setup is not allowed in standard PCIe Revision 6.2 environments when the whole path utilizes a PCIe protocol. In the context of PCIe, Flit Mode (FM) and Non-Flit Mode (NFM) may use different header formats, wherein routing elements may typically be required to translate between the FM TLP and NFM TLP formats when the Ingress Port and Egress Port are in different modes. The PCIe specifications may define PCIe UIO only for FM, wherein no translations of UIO TLPs to NFM are permitted.

FIG. 118A illustrates one embodiment of a system comprising a semiconductor device comprising a computer coupled between a first interface (Interface.1) that may be configured to communicate according to a first PCIe-based protocol, such as a PCIe protocol conforming to PCI Express Base Specification Revision 5.0, and a second interface (Interface.2) that may be configured to communicate according to a second PCIe-based protocol, such as a PCIe protocol conforming to PCI Express Base Specification Revision 6.2. The semiconductor device may be implemented in an IC package having high speed differential I/O balls positioned according to ball grid array layout defined by PCIe Retimer Supplemental Features and Standard BGA Footprint Specification. The first interface may be configured to expose a first endpoint (EP.1) and may be further configured to communicate according to the first PCIe-based protocol with a first entity (Entity.1), which may be a first host (Host.1) or a first PCIe device (PCIe Device.1). The second interface may be configured to expose a second endpoint (EP.2) and may be further configured to communicate according to the second PCIe-based protocol, with a second entity (Entity.2), which may be a second host (Host.2) or a second PCIe device (PCIe Device.2). The computer may be configured to extract physical addresses from first PDUs, such as first TLPs, received via the first interface, wherein these addresses may belong to a first physical address space utilized by the first entity, translate these addresses, and generate second PDUs, such as second TLPs, carrying the translated physical addresses for transmission via the second interface, wherein these translated addresses may correspond to a second physical address space utilized by the second entity.

FIG. 118B illustrates one embodiment of a TFD demonstrating translations, such as address translations, performed by a semiconductor device or by a computer, denoted as SD/C, between physical addresses carried in TLPs associated with a first PCIe protocol, received from a first entity (Entity.1), which may be a first host (Host.1) or a first PCIe device (PCIe Device.1), and physical addresses carried in UIO TLPs associated with a second PCIe protocol, sent to a second entity (Entity.2), which may be a second host (Host.2) or a second PCIe device (PCIe Device.2), possibly enabling the first entity to access resources mapped to an address space utilized by the second entity. The first entity may initiate a PCIe transaction that includes a PCIe Memory Read Request (MRd) comprising Address(AS.3.1) and Tag (w.3.1). The SD/C may translate the PCIe transaction to a PCIe UIO transaction that includes a PCIe UIO Memory Read Request (UIOMRd) comprising Address(AS.1.1) and Tag(w.1.1), wherein the SD/C may send the PCIe UIO Memory Read Request (UIOMRd) to the second entity. Upon receiving a completion from the second entity, which may include a PCIe UIO Read Completion with Data (UIORdCplD) comprising Tag(w.1.1), and DataPayload (*Data.1*), the SD/C may translate the PCIe UIO Read Completion with Data (UIORdCplD) to a PCIe Completion with Data (CplD) comprising Tag(w.3.1) and DataPayload (*Data.1*), and send the PCIe Completion with Data (CplD) to the first entity.

The SD/C may perform further translations, such as protocol translations, opcode translations, command translations, TLP type translations, tag translations, length translations, or field translations. Recent PCIe hosts and devices may utilize the PCIe Unordered IO (UIO) optional capability, originally introduced as ECN, and later rolled on into PCIe Base Specification Revision 6.2. PCIe UIO defines a new wire semantic and related capabilities that address limitations of the PCI/PCIe fabric-enforced ordering rules, enabling improved performance and efficiency, such as by utilizing multi-path routing. Some PCIe revisions, such as PCIe Revision 6.2, may use two Data Stream modes: Flit Mode (FM), and Non-Flit Mode (NFM). Support of Data Stream in NFM may be mandatory, while support of Data Stream in FM may be mandatory for example only if a data rate that exceeds 32.0 GT/s is supported. The Data Stream mode may be determined during initial Link training, wherein each PCIe Link is set up following a negotiation of Link width, data rate, and Flit mode by the two agents at each end of the Link. If FM is not disabled, and if both the Ports (and all Pseudo-Ports, if any) support it, FM may be chosen. Otherwise, NFM may be chosen. The PCIe specifications may define PCIe UIO only for FM, wherein no translations of UIO TLPs to NFM are permitted. According to PCIe Revision 6.2 specifications, UJO may be used only when the entire path from Requester to Completer uses FM, supports UIO, and has UJO enabled. The translations performed by the SD/C may further enable communication between the first entity and the second entity utilizing UIO over a split FM/NFM path, wherein the UIO TLPs may traverse a path that may utilize FM, whereas the non-UJO TLPs may traverse a path that may utilize NFM. Such split FM/NFM path setup is not allowed in standard PCIe Revision 6.2 environments, and may be enabled by the translation capabilities of the SD/C.

FIG. 118C illustrates one embodiment of a TFD demonstrating translations, such as address translations, performed by a semiconductor device or by a computer, denoted as SD/C, between physical addresses carried in UIO TLPs associated with a first PCIe protocol, received from a first entity (Entity.1), which may be a first host (Host.1) or a first PCIe device (PCIe Device.1), and physical addresses carried in TLPs associated with a second PCIe protocol, sent to a second entity (Entity.2), which may be a second host (Host.2) or a second PCIe device (PCIe Device.2), possibly enabling the first entity to access resources mapped to an address space utilized by the second entity. The first entity may initiate a PCIe UIO transaction that includes a PCIe UIO Memory Read Request (UIOMRd) comprising Address (AS.4.1) and Tag(w.4.1). The SD/C may translate the PCIe UIO transaction to a PCIe transaction that includes a PCIe Memory Read Request (MRd) comprising Address(AS.3.1) and Tag(w.3.1), wherein the SD/C may send the PCIe Memory Read Request (MRd) to the second entity. Upon receiving a completion from the second entity, which may include a PCIe Completion with Data (CplD) comprising Tag(w.3.1) and DataPayload(*Data.2*), the SD/C may translate the PCIe Completion with Data (CplD) to a PCIe UIO Read Completion with Data (UIORdCplD) comprising Tag(w.4.1), and DataPayload(*Data.2), and send the PCIe UIO Read Completion with Data (UIORdCplD) to the first entity. The SD/C may perform further translations, such as protocol translations, opcode translations, command translations, TLP type translations, tag translations, length translations, or field translations.

The PCIe specification Revision 6.2 defines PCIe UIO only for FM, wherein no translations of UIO TLPs to NFM are permitted, and UIO may be used only when the entire path from Requester to Completer uses FM, supports UIO, and has UIO enabled. The translations performed by the SD/C may further enable communication between the first entity and the second entity utilizing UIO over a split FM/NFM path, wherein the UIO TLPs may traverse a path that may utilize FM, whereas the non-UJO TLPs may traverse a path that may utilize NFM. Such split FM/NFM path setup is not allowed in standard PCIe Revision 6.2 environments, and may be enabled by the translation capabilities of the SD/C.

FIG. 119A illustrates one embodiment of a system comprising a semiconductor device, such as a switch (e.g., a CXL switch), a processor, or a bridge, comprising a computer coupled between a first interface (Interface.1) and a second interface (Interface.2). The first interface may be configured to communicate according to a PCIe protocol with a first entity (Entity.1), such as a GPU. The second interface may be configured to communicate according to a CXL protocol, such as CXL.mem, with a second entity (Entity.2), such as a CXL device, which may be a CXL memory expander, a CXL memory pool, or a GFD. The computer may be configured to extract physical addresses from messages received via the first interface, wherein these addresses may belong to a first Physical Address (PA) space utilized by the first entity, translate these addresses, and generate messages carrying the translated physical addresses for transmission via the second interface, wherein these translated addresses may belong to a second PA space utilized by the second entity. In some embodiments, the first PA space and the second PA space may be the same PA space, wherein the computer may perform address translations between addresses within the same PA space. The computer may perform further translations between the PCIe protocol domain and the CXL protocol domain, such as translating between PCIe TLP types (e.g., MRd, UIOMRd) and CXL.mem opcodes (e.g., MemRd, MemRdData, MemRdTEE). The semiconductor device may be implemented as a monolithic die, as one or more chiplets within an IC package, or as one or more components on a board. In some embodiments, the semiconductor device, and at least one of the first entity and the second entity may be included within the same IC package, optionally coupled by one more UCIe links.

FIG. 119B illustrates one embodiment of a TFD demonstrating translations, such as address translations, performed by a semiconductor device or by a computer, denoted as SD/C, between physical addresses carried in PCIe TLPs received from a first entity (Entity.1), which may be a GPU, and physical addresses carried in CXL.mem messages sent to a second entity (Entity.2), which may be a CXL device, possibly enabling the first entity to access resources mapped to an address space utilized by the second entity. The first entity may initiate a PCIe transaction that includes a PCIe Memory Read Request (MRd) comprising Address(AS.3.1) and Tag(w.3.1). The SD/C may translate the PCIe transaction to a CXL.mem transaction that includes a CXL.mem M2S Request comprising MemOpcode(MemRd*), Tag (p.2.1), and Address(AS.2.1), wherein the SD/C may send the CXL.mem M2S Request to the second entity. Upon receiving a response (or responses) from the second entity, which may include a CXL.mem S2M DRS comprising Opcode(MemData), Tag(p.2.1), and Data(*Data.1*), the SD/C may translate the response (or responses) such as translating the CXL.mem S2M DRS to a PCIe Completion with Data (CplD) comprising Tag(w.3.1) and DataPayload (*Data.1*), wherein the SD/C may send the CplD to the first entity. The SD/C may perform further translations, such as protocol translations, opcode translations, command translations, or TLP translations, e.g., translating between PCIe TLPs and CXL.mem messages, wherein these translations may include field translations, such as translating between PCIe tag fields and CXL.mem tag fields, translating between reserved fields, and translating between reserved and non-reserved fields. The SD/C may further initiate speculative memory reads targeting the second entity, wherein the speculative memory reads may include a CXL.mem M2S Req comprising MemOpcode(MemSpecRd), Tag(p.2.2), and Address(AS.2.2), and wherein the SD/C may utilize the speculative memory reads, optionally on behalf of the first entity, to facilitate data prefetches and potentially reduce read latency from the second entity.

FIG. 119C illustrates one embodiment of a TFD demonstrating translations, such as address translations, performed by a semiconductor device or by a computer, denoted as SD/C, between physical addresses carried in PCIe UIO TLPs received from a first entity (Entity.1), which may be a GPU, and physical addresses carried in CXL.mem messages sent to a second entity (Entity.2 which that may be a CXL device, possibly enabling the first entity to access resources mapped to an address space utilized by the second entity (Entity.2). The first entity may initiate a PCIe UIO transaction that may include a PCIe UIO Memory Read Request (UIOMRd) comprising Address(AS.4.1) and Tag(w.4.1). The SD/C may translate the PCIe UIO transaction to a CXL.mem transaction that may include a CXL.mem M2S Request comprising MemOpcode(MemRd*), Tag(p.1.1), and Address(AS.1.1), wherein the SD/C may send the CXL.mem M2S Request to the second entity. Upon receiving a response (or responses) from the second entity, which may include a CXL.mem S2M DRS comprising Opcode (MemData), Tag(p.1.1), and Data(*Data.2*), the SD/C may translate the response (or responses) such as translating the CXL.mem S2M DRS to a PCIe UIO Read Completion with Data (UIORdCplD) comprising Tag(w.4.1) and DataPayload(*Data.2*), wherein the SD/C may send the UIORdCplD to the first entity. The SD/C may perform further translations, such as protocol translations, opcode translations, command translations, or TLP translations, e.g., translating between PCIe UIO TLPs and CXL.mem messages, wherein these translations may include field translations. The SD/C may further initiate speculative memory reads targeting the second entity, wherein the speculative memory reads may include a CXL.mem M2S Req comprising MemOpcode(MemSpecRd), Tag(p.1.2), and Address (AS.1.2), and wherein the SD/C may utilize the speculative memory reads, optionally on behalf of the first entity, to facilitate data prefetches and potentially reduce read latency from the second entity.

FIG. 120A illustrates one embodiment of a system comprising a semiconductor device comprising a computer coupled between a first interface (Interface.1) that may be configured to communicate according to a UALink-based protocol, such as UPLI, with a first entity (Entity.1), which may be an accelerator, and a second interface (Interface.2) that may be configured to communicate according to a PCIe-based protocol, such as a protocol conforming to PCI Express Base Specification Revision 6.2, with a second entity (Entity.2), which may be a PCIe host or a PCIe device. The semiconductor device may be implemented in an IC package having high speed differential I/O balls positioned according to ball grid array layout defined by a retimer specification, such as the PCIe 5.0, 6.0, or 7.0 Retimer Supplemental Features and Standard BGA Footprint Specification.

The computer may be configured to extract physical addresses from requests received via the first interface, wherein these addresses may belong to a Network Physical Address (NPA) space utilized by the first entity. The computer may be further configured to translate these addresses, and generate requests carrying the translated physical addresses for transmission via the second interface, wherein these translated addresses may correspond to a Host Physical Address (HPA) space utilized by the second entity. Optional UALink switch(es) may be positioned between the first interface and the first entity. Similarly, optional PCIe switch(es) may be positioned between the second interface and the second entity.

FIG. 120B illustrates one embodiment of a TFD demonstrating translations, such as address translations, performed by a semiconductor device or by a computer, denoted as SD/C, between physical addresses, such as Network Physical Addresses (NPAs), carried in UALink-based requests, such as UPLI requests, received from a first entity (Entity.1), such as an accelerator, and physical addresses, such as Host Physical Addresses (HPAs), carried in PCIe TLPs sent to a second entity (Entity.2), such as a PCIe host or a PCIe device, possibly enabling the first entity to access resources mapped to an address space utilized by the second entity. The first entity may initiate a UPLI transaction that includes a UPLI Request (Req) comprising Request Command (e.g. ReqCmd(Read)), Request Source Physical Accelerator ID (e.g., ReqSrcPhysAccID(a.1)), Request Destination Physical Accelerator ID (e.g., ReqDstPhysAccID(b.1)), Request Address (e.g., ReqAddr(AS.1.1)), Request Tag (e.g., ReqTag(c.1.1)), and Request Length (e.g., ReqLen(d.1.1)). The SD/C may translate the UPLI transaction to a PCIe transaction that includes a PCIe Memory Read Request (MRd) comprising Address(AS.3.1), Tag(w.3.1), and Length (d.3.1), and may send the PCIe Memory Read Request (MRd) to the second entity. Upon receiving a completion from the second entity, which may include a PCIe Completion with Data (CplD) comprising Tag(w.3.1) and DataPayload(*Data.1*), the SD/C may translate the PCIe Completion with Data (CplD) to a UPLI Read Response/Data (RdRsp) comprising Read Response Source Physical Accelerator ID (e.g., RdRspSrcPhysAccID(b.1)), Read Response Destination Physical Accelerator ID (e.g., RdRspDstPhysAccID(a.1)), Read Response Transaction Tag (e.g., RdRspTag(c.1.1)), and Read Response Data (e.g., RdRspData (*Data.1*)), and send the UPLI Read Response/Data (RdRsp) to the first entity.

The SD/C may perform further translations, such as protocol translations, opcode translations, command translations, TLP type translations, and field translations between messages of the UALink-based protocol (e.g., UPLI messages), and protocol data units (PDUs) of the PCIe-based Protocol (e.g., PCIe TLPs), such as tag translations, traffic class (TC) translations, or cross-field translations, wherein the SD/C may maintain tracking between tags of the UALink-based protocol domain and tags of the PCIe-based protocol domain, such as in order to associate responses with their corresponding requests. In some embodiments, the SD/C may issue more than one PCIe transaction in response to receiving a UPLI request from the first entity, such as when splitting a UPLI read request for a large block of data to multiple smaller PCIe memory read requests, or when prefetching data from the second entity.

In one embodiment, PCIe Memory Read Request (MRd) and PCIe Completion with Data (CplD) TLPs may be utilized by legacy PCIe hosts or devices, whereas recent PCIe hosts or PCIe devices may utilize PCIe UIO Memory Read Request (UIOMRd) and PCIe UIO Read Completion with Data (UIORdCplD) TLPs, leveraging the PCIe Unordered IO (UIO) optional capability, that is intended to address the limitations of the PCI/PCIe fabric-enforced ordering rules, and enables fabrics with multiple paths between a source and destination to be supported, optionally enabling higher-bandwidth communication. The SD/C may be configured to perform translations of requests or transactions initiated from the UALink-based domain to the PCIe domain, may be configured to perform additional translations of requests or transactions initiated from the PCIe domain to the UALink-based domain, or may be configured to perform translations of requests or transactions initiated from both the UALink-based domain and the PCI domain.

FIG. 120C illustrates one embodiment of a TFD demonstrating translations performed by a semiconductor device or by a computer, denoted as SD/C, between physical addresses carried in UALink-based requests, such as UPLI requests, received from a first entity (Entity.1), and physical addresses carried in PCIe UIO TLPs sent to a second entity (Entity.2), possibly enabling the first entity to access resources mapped to an address space utilized by the second entity. The first entity may initiate a UPLI transaction that includes a UPLI Request (Req) comprising ReqCmd(Read), ReqSrcPhysAccID(a.1), ReqDstPhysAccID(b.1), ReqAddr(AS.2.1), ReqTag(c.2.1), and ReqLen(d.2.1). The SD/C may translate the UPLI transaction to a PCIe UIO transaction that includes a PCIe UIO Memory Read Request (UIOMRd) comprising Address(AS.4.1), Tag(w.4.1), and Length(d.4.1), wherein the SD/C may send the PCIe UIO Memory Read Request (UIOMRd) to the second entity. Upon receiving a completion from the second entity, which may include a PCIe UIO Read Completion with Data (UIORdCplD) comprising Tag (w.4.1) and DataPayload(*Data.2*), the SD/C may translate the PCIe UIO Read Completion with Data (UIORdCplD) to a UPLI Read Response/Data (RdRsp) comprising RdRspSrcPhysAccID(b.1), RdRspDstPhysAccID(a.1), RdRspTag(c.2.1), and RdRspData(*Data.2*), wherein the SD/C may send the UPLI Read Response/Data (RdRsp) to the first entity.

In some embodiments, the SD/C may issue more than one PCIe UIO transaction in response to receiving a UPLI request from the first entity, such as when splitting a UPLI read request for a large block of data to multiple smaller PCIe UIO memory read requests, or when prefetching data from the second entity. The SD/C may be configured to perform translations of requests or transactions initiated from the UALink-based domain to the PCIe domain, may be configured to perform additional translations of requests or transactions initiated from the PCIe domain to the UALink-based domain, or may be configured to perform translations of requests or transactions initiated from both the UALink-based domain and the PCI domain.

FIG. 121A illustrates one embodiment of a system comprising a semiconductor device, such as a processor, a switch (e.g., a UALink switch or a CXL switch), or a bridge. The semiconductor device includes a computer coupled between a first interface (Interface.1) and a second interface (Interface.2). The first interface may be configured to communicate according to a UALink-based protocol, such as UPLI, with a first entity (Entity.1), which may be a CPU or an accelerator. The second interface may be configured to communicate according to a CXL protocol, with a second entity (Entity.2), such as a CXL host, or a CXL device which may be a CXL memory expander, a CXL memory pool, a GFD, or a CXL accelerator. The computer may be configured to extract addresses from requests received via the first interface, wherein these addresses may belong to a first address space, such as a Network Physical Address (NPA) space utilized by the first entity. The computer may be further configured to translate these addresses, and generate requests carrying the translated addresses for transmission via the second interface, wherein these translated addresses may belong to a second address space utilized by the second entity. In other embodiments, the first address space and the second address space may be associated with the same address space, such as a common address space, a global address space, a pod address space, or a fabric address space, wherein the computer may perform address translations between addresses within the same common address space. The semiconductor device may be implemented in an IC package having high speed differential I/O balls positioned according to ball grid array layout defined by a retimer specification.

FIG. 121B illustrates one embodiment of a TFD demonstrating translations, such as address translations, performed by a semiconductor device or by a computer, denoted as SD/C, between: (1) first physical addresses, such as Network Physical Addresses (NPAs), carried in UALink-based requests, such as UPLI requests, received from a first entity (Entity.1), which may be a CPU or an accelerator; and (2) second physical addresses, such as Host Physical Addresses (HPAs), carried in CXL requests, such as CXL.mem requests, sent to a second entity (Entity.2), which may be a CXL device, possibly enabling the first entity to access resources mapped to an address space utilized by the second entity. The first entity may initiate a UPLI transaction that may include a UPLI Request (Req) comprising ReqCmd (Read), ReqAddr(AS.3.1), and ReqTag(c.3.1). The SD/C may translate the UPLI transaction to a CXL transaction that may include a CXL.mem M2S Request comprising MemOpcode(MemRd*), Tag(p.2.1), and Address(AS.2.1), wherein the SD/C may send the CXL.mem M2S Request to the second entity. Upon receiving a response (or responses) from the second entity, which may include a CXL.mem S2M DRS comprising Opcode(MemData), Tag(p.2.1), and Data (*Data.1*), the SD/C may translate the response (or responses) such as translating the CXL.mem S2M DRS to a UPLI Read Response/Data (RdRsp) comprising RdRspTag (c.3.1) and RdRspData(*Data.1*), wherein the SD/C may send the UPLI Read Response/Data (RdRsp) to the first entity.

The SD/C may further initiate speculative memory reads targeting the second entity, wherein the speculative memory reads may include a CXL.mem M2S Request comprising MemOpcode(MemSpecRd), Tag(p.2.2), and Address (AS.2.2), and wherein the SD/C may utilize the speculative memory reads, optionally on behalf of the first entity, to facilitate data prefetches and potentially reduce read latency from the second entity. The SD/C may perform further translations, such as protocol translations, opcode translations, command translations, TLP type translations, and field translations between the UALink-based domain and the CXL domain. In some embodiments, the SD/C may issue more than one CXL.mem demand read in response to receiving a UPLI Request (Req) from the first entity. For example, the SD/C may issue more than one CXL.mem M2S Request comprising MemRd or MemRdData, such as when splitting a UPLI Request (Req) for a large block of data (e.g., 256B) to multiple smaller CXL.mem demand reads (e.g., 64B each), or when prefetching data from the second entity utilizing CXL.mem demand reads. The SD/C may be configured to perform translations of requests or transactions initiated from the UALink-based domain to the CXL domain, may be configured to perform additional translations of requests or transactions initiated from the CXL domain to the UALink-based domain, or may be configured to perform translations of requests or transactions initiated from any of the domains.

FIG. 121C illustrates one embodiment of a TFD demonstrating translations, such as address translations, performed by a semiconductor device or by a computer, denoted as SD/C, between: (1) first physical addresses, such as Network Physical Addresses (NPAs), carried in UALink-based requests, such as UPLI requests, received from a first entity (Entity.1), which may be a CPU or an accelerator; and (2) second physical addresses, such as Host Physical Addresses (HPAs), carried in CXL requests, such as CXL.cache requests, sent to a second entity (Entity.2), which may be a CXL host, possibly enabling the first entity to access resources mapped to an address space utilized by the second entity. The first entity may initiate a UPLI transaction that may include a UPLI Request (Req) comprising ReqCmd (Read), ReqAddr(AS.4.1), and ReqTag(c.4.1). The SD/C may translate the UPLI transaction to a CXL transaction that may include a CXL.cache D2H Request comprising Opcode (RdCurr), CQID(q.2.1), and Address(AS.2.1), wherein the SD/C may send the CXL.cache D2H Request to the second entity. Upon receiving a response (or responses) from the second entity, which may include a CXL.cache H2D Data comprising CQID(q.2.1) and Data(*Data.2*), the SD/C may translate the response (or responses) such as translating the CXL.cache H2D Data to a UPLI Read Response/Data (RdRsp) comprising RdRspTag(c.4.1) and RdRspData (*Data.2*), wherein the SD/C may send the UPLI Read Response/Data (RdRsp) to the first entity.

The SD/C may perform further translations, such as protocol translations, opcode translations, command translations, TLP type translations, and field translations between the UALink-based domain and the CXL domain. In some embodiments, the SD/C may issue more than one CXL.cache D2H Request in response to receiving a UPLI Request (Req) from the first entity, such as when splitting an UPLI Request (Req) for a large block of data (e.g., 256B) to multiple smaller CXL.cache D2H Requests (e.g., 64B each), or when prefetching data from the second entity utilizing CXL.cache reads. The SD/C may be configured to perform translations of requests or transactions initiated from the UALink-based domain to the CXL domain, may be configured to perform additional translations of requests or transactions initiated from the CXL domain to the UALink-based domain, or may be configured to perform translations of requests or transactions initiated from any of the domains.

FIG. 122A illustrates one embodiment of a system comprising a semiconductor device comprising a computer coupled between a first interface (Interface.1) and a second interface (Interface.2). The a first interface may be configured to communicate according to a UALink-based protocol, such as UPLI, with a first entity (Entity.1), which may be an accelerator. The second interface may be configured to communicate according to a CXL-based protocol, such as CXL.io, with a second entity (Entity.2), which may be a CXL host or a CXL device. The semiconductor device may be implemented in an IC package having high speed differential I/O balls positioned according to ball grid array layout defined by a retimer specification, such as the PCIe 5.0, 6.0, or 7.0 Retimer Supplemental Features and Standard BGA Footprint Specification.

The computer may be configured to extract physical addresses from requests received via the first interface, wherein these addresses may belong to a Network Physical Address (NPA) space utilized by the first entity. The computer may be further configured to translate these addresses, and generate requests carrying the translated physical addresses for transmission via the second interface, wherein these translated addresses may correspond to a Host Physical Address (HPA) space utilized by the second entity. Optional UALink switch(es) may be positioned between the first interface and the first entity. Similarly, optional CXL switch(es) may be positioned between the second interface and the second entity.

FIG. 122B illustrates one embodiment of a TFD demonstrating translations performed by a semiconductor device or by a computer, denoted as SD/C, between physical addresses carried in UALink-based requests, such as UPLI requests, received from a first entity (Entity.1), and physical addresses carried in CXL.io UIO TLPs sent to a second entity (Entity.2), possibly enabling the first entity to access resources mapped to an address space utilized by the second entity. The first entity may initiate a UPLI transaction that includes a UPLI Request (Req) comprising ReqCmd(Read), ReqAddr(AS.1.1), and ReqTag(c.1.1). The SD/C may translate the UPLI transaction to a CXL.io UIO transaction that includes a CXL.io UIO Memory Read Request (UIOMRd) comprising Address(AS.2.1) and Tag(w.2.1), wherein the SD/C may send the CXL.io UIO Memory Read Request (UIOMRd) to the second entity. Upon receiving a completion from the second entity, which may include a CXL.io UIO Read Completion with Data (UIORdCplD) comprising CDL (cdl.2.1), Tag(w.2.1), and DataPayload(*Data.1*), wherein the CDL field may denote a CXL DevLoad (CDL) field in CXL.io UIO completions, and may be populated by the CXL device (or alternatively by the CXL host) with information related to Quality-of-Service (QoS), such as QoS telemetry value or values. The SD/C may translate the CXL.io UIO Read Completion with Data (UIORdCplD) to a UPLI Read Response/Data (RdRsp) comprising RdRspTag(c.1.1) and RdRspData(*Data.1*), wherein the SD/C may send the UPLI Read Response/Data (RdRsp) to the first entity.

In some embodiments, the SD/C may issue more than one CXL.io UIO transaction in response to receiving a UPLI request from the first entity, such as when splitting a UPLI read request for a large block of data to multiple smaller CXL.io UIO memory read requests, or when prefetching data from the second entity. The SD/C may be configured to perform translations of requests or transactions initiated from the UALink-based domain to the CXL domain, may be configured to perform additional translations of requests or transactions initiated from the CXL domain to the UALink-based domain, or may be configured to perform translations of requests or transactions initiated from both the UALink-based domain and the CXL domain.

FIG. 122C illustrates one embodiment of a TFD demonstrating translations, such as address translations, performed by a semiconductor device or by a computer, denoted as SD/C, between physical addresses, such as Network Physical Addresses (NPAs), carried in UALink-based requests, such as UPLI requests, received from a first entity (Entity.1), such as an accelerator, and physical addresses, such as Host Physical Addresses (HPAs), carried in CXL.io TLPs sent to a second entity (Entity.2), such as a CXL host or a CXL device, possibly enabling the first entity to access resources mapped to an address space utilized by the second entity. The first entity may initiate a UPLI transaction that includes a UPLI Request (Req) comprising Request Command (e.g. ReqCmd(Read)), Request Address (e.g., ReqAddr(AS.4.1)), and Request Tag (e.g., ReqTag(c.4.1)). The SD/C may translate the UPLI transaction to a CXL transaction that includes a CXL.io Memory Read Request (MRd) comprising Address(AS.3.1) and Tag(w.3.1), and may send the CXL.io Memory Read Request (MRd) to the second entity. Upon receiving a completion from the second entity, which may include a CXL.io Completion with Data (CplD) comprising Tag(w.3.1) and DataPayload(*Data.2*), the SD/C may translate the CXL.io Completion with Data (CplD) to a UPLI Read Response/Data (RdRsp) comprising Read Response Transaction Tag (e.g., RdRspTag(c.4.1)) and Read Response Data (e.g., RdRspData(*Data.2*)), and send the UPLI Read Response/Data (RdRsp) to the first entity.

The SD/C may perform further translations, such as protocol translations, opcode translations, command translations, TLP type translations, and field translations between messages of the UALink-based protocol (e.g., UPLI messages), and protocol data units (PDUs) of the CXL-based Protocol (e.g., CXL.io TLPs), such as tag translations, traffic class (TC) translations, or cross-field translations, wherein the SD/C may maintain tracking between tags of the UALink-based protocol domain and tags of the CXL-based protocol domain, such as in order to associate responses with their corresponding requests. In some embodiments, the SD/C may issue more than one CXL transaction in response to receiving a UPLI request from the first entity, such as when splitting a UPLI read request for a large block of data to multiple smaller CXL.io memory read requests, or when prefetching data from the second entity. Moreover, the SD/C may be configured to perform translations of requests or transactions initiated from the UALink-based domain to the CXL domain, may be configured to perform additional translations of requests or transactions initiated from the CXL domain to the UALink-based domain, or may be configured to perform translations of requests or transactions initiated from both the UALink-based domain and the CXL domain.

FIG. 123A illustrates one embodiment of a system comprising a semiconductor device comprising a computer coupled between: (1) First interface (Interface.1) that may be configured to communicate according to an NVLink-based protocol, such as a protocol utilizing an NVLink interconnect, with a first entity (Entity.1), which may be a CPU or a GPU, and (2) Second interface (Interface.2) that may be configured to communicate according to a PCIe-based protocol, such as a PCIe protocol conforming to PCI Express Base Specification Revision 6.2, with a second entity (Entity.2), which may be a PCIe host or a PCIe device. The semiconductor device may be implemented in an IC package having high speed differential I/O balls positioned according to ball grid array layout defined by a retimer specification, such as the PCIe 5.0, 6.0, or 7.0 Retimer Supplemental Features and Standard BGA Footprint Specification. The computer may be configured to extract physical addresses from requests received via the first interface, wherein these addresses may belong to an NVLink-based network address space utilized by the first entity. The computer may be further configured to translate these addresses, and generate requests carrying the translated physical addresses for transmission via the second interface, wherein these translated addresses may correspond to a Host Physical Address (HPA) space utilized by the second entity. Optional switch(es) may be positioned between the first interface and the first entity. Similarly, optional switch(es) may be positioned between the second interface and the second entity.

FIG. 123B illustrates one embodiment of a TFD demonstrating translations, such as address translations, performed by a semiconductor device or by a computer, denoted as SD/C, between physical addresses, such as GPU physical addresses or NVLink-based network addresses, carried in NVLink-based requests, such as NVLink read requests, received from a first entity (Entity.1), which may be a CPU or a GPU, and physical addresses, such as Host Physical Addresses (HPAs), carried in PCIe UIO TLPs sent to a second entity (Entity.2), which may be a PCIe host or a PCIe device, possibly enabling the first entity to access resources mapped to an address space utilized by the second entity. The first entity may initiate an NVLink request, which may be an NVLink read request, comprising Address(AS.1.1) and Tag/TransactionID(c.1.1), wherein Tag/TransactionID may denote a tag, a transaction tag, a transaction identifier, or another field or set of fields carried in NVLink requests and/or NVLink Responses, which may serve for associating the NVLink responses with the NVLink requests. The SD/C may translate the NVLink request to a PCIe request, such as PCIe UIO Memory Read Request (UIOMRd) comprising Address(AS.2.1), and Tag(w.2.1), wherein the SD/C may send the PCIe UIO Memory Read Request (UIOMRd) to the second entity. Upon receiving a completion from the second entity, which may include a PCIe UIO Read Completion with Data (UIORdCplD) comprising Tag(w.2.1) and DataPayload(*Data.1*), the SD/C may translate the PCIe UIO Read Completion with Data (UIORdCplD) to an NVLink Response comprising Tag/TransactionID(c.1.1) and *Data.1*, wherein the SD/C may send the NVLink Response to the first entity.

The SD/C may perform further translations, such as protocol translations, opcode translations, command translations, TLP type translations, and field translations between the NVLink-based domain and the PCIe domain. In some embodiments, the SD/C may issue more than one PCIe UIO memory read requests in response to receiving an NVLink request from the first entity, such as when splitting an NVLink request for a large block of data to multiple smaller PCIe UIO memory read requests, or when prefetching data from the second entity. The SD/C may be configured to perform translations of requests or transactions initiated from the NVLink-based domain to the PCIe domain, may be configured to perform additional translations of requests or transactions initiated from the PCIe domain to the NVLink-based domain, or may be configured to perform translations of requests or transactions initiated from any of the domains.

FIG. 123C illustrates one embodiment of a TFD demonstrating translations, such as address translations, performed by a semiconductor device or by a computer, denoted as SD/C, between physical addresses, such as GPU physical addresses or NVLink-based network addresses, carried in NVLink-based requests, such as NVLink read requests, received from a first entity (Entity.1), which may be a CPU or a GPU, and physical addresses, such as Host Physical Addresses (HPAs), carried in PCIe TLPs sent to a second entity (Entity.2), which may be a PCIe host or a PCIe device, possibly enabling the first entity to access resources mapped to an address space utilized by the second entity. The first entity may initiate an NVLink request, which may be an NVLink read request, comprising Address(AS.4.1) and Tag/TransactionID(c.4.1), wherein Tag/TransactionID may denote a tag, a transaction tag, a transaction identifier, or another field or set of fields carried in NVLink requests and/or NVLink Responses, which may serve for associating the NVLink responses with the NVLink requests. The SD/C may translate the NVLink request to a PCIe request, such as PCIe Memory Read Request (MRd) comprising Address (AS.3.1), and Tag(w.3.1), wherein the SD/C may send the PCIe Memory Read Request (MRd) to the second entity. Upon receiving a completion from the second entity, which may include a PCIe Completion with Data (CplD) comprising Tag(w.3.1) and DataPayload(*Data.2*), the SD/C may translate the PCIe Completion with Data (CplD) to an NVLink Response comprising Tag/TransactionID(c.4.1) and *Data.2*, wherein the SD/C may send the NVLink Response to the first entity.

The SD/C may perform further translations, such as protocol translations, opcode translations, command translations, TLP type translations, and field translations between the NVLink-based domain and the PCIe domain. In some embodiments, the SD/C may issue more than one PCIe memory read request in response to receiving an NVLink request from the first entity, such as when splitting an NVLink request for a large block of data to multiple smaller PCIe memory read requests, or when prefetching data from the second entity. The SD/C may be configured to perform translations of requests or transactions initiated from the NVLink-based domain to the PCIe domain, may be configured to perform additional translations of requests or transactions initiated from the PCIe domain to the NVLink-based domain, or may be configured to perform translations of requests or transactions initiated from any of the domains.

FIG. 124A illustrates one embodiment of a system comprising a semiconductor device, such as a processor, a switch (e.g., an NVLink switch or a CXL switch), or a bridge, comprising a computer coupled between a first interface (Interface.1) and a second interface (Interface.2). The first interface may be configured to communicate according to an NVLink-based protocol, such as a protocol utilizing an NVLink interconnect, with a first entity (Entity.1), which may be a CPU or a GPU. The second interface may be configured to communicate according to a CXL protocol, with a second entity (Entity.2), such as a CXL host, or a CXL device which may be a CXL memory expander, a CXL memory pool, a GFD, or a CXL accelerator. The computer may be configured to extract addresses from requests received via the first interface, wherein these addresses may belong to a first address space, such as an NVLink-based address space, an NVLink-based network address space, or a GPU address space utilized by the first entity. The computer may be further configured to translate these addresses, and generate requests carrying the translated addresses for transmission via the second interface, wherein these translated addresses may belong to a second address space utilized by the second entity. In other embodiments, the first address space and the second address space may be associated with the same address space, such as a common address space, a global address space, a pod address space, or a fabric address space, wherein the computer may perform address translations between addresses within the same common address space. The semiconductor device may be implemented in an IC package having high speed differential I/O balls positioned according to ball grid array layout defined by a retimer specification.

FIG. 124B illustrates one embodiment of a TFD demonstrating translations, such as address translations, performed by a semiconductor device or by a computer, denoted as SD/C, between: (1) first physical addresses, such as GPU physical addresses or NVLink-based network addresses, carried in NVLink-based requests, such as NVLink read requests, received from a first entity (Entity.1), which may be a CPU or a GPU; and (2) second physical addresses, such as Host Physical Addresses (HPAs), carried in CXL requests, such as CXL.mem requests, sent to a second entity (Entity.2), which may be a CXL device, possibly enabling the first entity to access resources mapped to an address space utilized by the second entity. The first entity may initiate an NVLink request, which may be an NVLink read request, comprising Address(AS.3.1) and Tag/TransactionID(c.3.1), wherein Tag/TransactionID may denote a tag, a transaction tag, a transaction identifier, or another field or set of fields carried in NVLink requests and/or NVLink Responses, which may serve for associating the NVLink responses with the NVLink requests. The SD/C may translate the NVLink request to a CXL request, such as CXL.mem M2S Request comprising MemOpcode (MemRd*), Tag(p.2.1), and Address(AS.2.1), wherein the SD/C may send the CXL.mem M2S Request to the second entity.

Upon receiving a response (or responses) from the second entity, which may include a CXL.mem S2M DRS comprising Opcode(MemData), Tag(p.2.1), and Data(*Data.1*), the SD/C may translate the response (or responses) such as translating the CXL.mem S2M DRS to an NVLink Response comprising Tag/TransactionID(c.3.1) and *Data.1*, wherein the SD/C may send the NVLink Response to the first entity. The SD/C may further initiate speculative memory reads targeting the second entity, wherein the speculative memory reads may include a CXL.mem M2S Request comprising MemOpcode (MemSpecRd), Tag(p.2.2), and Address(AS.2.2), and wherein the SD/C may utilize the speculative memory reads, optionally on behalf of the first entity, to facilitate data prefetches and potentially reduce read latency from the second entity.

The SD/C may perform further translations, such as protocol translations, opcode translations, command translations, TLP type translations, and field translations between the NVLink-based domain and the CXL domain. In some embodiments, the SD/C may issue more than one CXL.mem demand read in response to receiving an NVLink request from the first entity. For example, the SD/C may issue more than one CXL.mem M2S Request comprising MemRd or MemRdData, such as when splitting an NVLink request for a large block of data (e.g., 256B) to multiple smaller CXL.mem demand reads (e.g., 64B each), or when prefetching data from the second entity utilizing CXL.mem demand reads. The SD/C may be configured to perform translations of requests or transactions initiated from the NVLink-based domain to the CXL domain, may be configured to perform additional translations of requests or transactions initiated from the CXL domain to the NVLink-based domain, or may be configured to perform translations of requests or transactions initiated from any of the domains.

FIG. 124C illustrates one embodiment of a TFD demonstrating translations, such as address translations, performed by a semiconductor device or by a computer, denoted as SD/C, between: (1) first physical addresses, such as GPU physical addresses or NVLink-based network addresses, carried in NVLink-based requests, such as NVLink read requests, received from a first entity (Entity.1), which may be a CPU or a GPU; and (2) second physical addresses, such as Host Physical Addresses (HPAs), carried in CXL requests, such as CXL.cache requests, sent to a second entity (Entity.2), which may be a CXL host, possibly enabling the first entity to access resources mapped to an address space utilized by the second entity. The first entity may initiate an NVLink request, which may be an NVLink read request, comprising Address(AS.4.1) and Tag/TransactionID(c.4.1), wherein Tag/TransactionID may denote a tag, a transaction tag, a transaction identifier, or another field or set of fields carried in NVLink requests and/or NVLink Responses, which may serve for associating the NVLink responses with the NVLink requests. The SD/C may translate the NVLink request to a CXL request, such as CXL.cache D2H Request comprising Opcode(RdCurr), CQID(q.2.1), and Address (AS.2.1), wherein the SD/C may send the CXL.cache D2H Request to the second entity. Upon receiving a response (or responses) from the second entity, which may include a CXL.cache H2D Data comprising CQID(q.2.1) and Data (*Data.2*), the SD/C may translate the response (or responses) such as translating the CXL.cache H2D Data to an NVLink Response comprising Tag/TransactionID(c.4.1) and *Data.2*, wherein the SD/C may send the NVLink Response to the first entity.

The SD/C may perform further translations, such as protocol translations, opcode translations, command translations, TLP type translations, and field translations between the NVLink-based domain and the CXL domain. Optionally, the SD/C may issue more than one CXL.cache D2H Request in response to receiving an NVLink request from the first entity, such as when splitting an NVLink request for a large block of data (e.g., 256B) to multiple smaller CXL.cache D2H Requests (e.g., 64B each), or when prefetching data from the second entity utilizing CXL.cache reads. The SD/C may be configured to perform translations of requests or transactions initiated from the NVLink-based domain to the CXL domain, may be configured to perform additional translations of requests or transactions initiated from the CXL domain to the NVLink-based domain, or may be configured to perform translations of requests or transactions initiated from any of the domains.

FIG. 125A illustrates one embodiment of a system comprising a semiconductor device, such as a processor, a switch, or a bridge, comprising a computer coupled between: (1) First interface (Interface.1) that may be configured to communicate according to an NVLink-based protocol, such as a protocol utilizing an NVLink interconnect, with a first entity (Entity.1), which may be a CPU or a GPU, and (2) Second interface (Interface.2) that may be configured to communicate according to a CXL-based protocol, such as CXL.io, with a second entity (Entity.2), which may be a CXL host or a CXL device. The computer may be configured to extract physical addresses from requests received via the first interface, wherein these addresses may belong to an NVLink-based address space, an NVLink-based network address space, or a GPU address space utilized by the first entity. The computer may be further configured to translate these addresses, and generate requests carrying the translated physical addresses for transmission via the second interface, wherein these translated addresses may correspond to a Host Physical Address (HPA) space utilized by the second entity. Optional switch(es), such as NVLink Switches, may be positioned between the first interface and the first entity. Similarly, optional switch(es), such as CXL switches, may be positioned between the second interface and the second entity. In some embodiments, the semiconductor device may be implemented in an IC package having high speed differential I/O balls positioned according to ball grid array layout defined by a retimer specification, such as the PCIe 5.0, 6.0, or 7.0 Retimer Supplemental Features and Standard BGA Footprint Specification.

FIG. 125B illustrates one embodiment of a TFD demonstrating translations, such as address translations, performed by a semiconductor device or by a computer, denoted as SD/C, between physical addresses, such as GPU physical addresses or NVLink-based network addresses, carried in NVLink-based requests, such as NVLink read requests, received from a first entity (Entity.1), which may be a CPU or a GPU, and physical addresses, such as Host Physical Addresses (HPAs), carried in CXL.io UIO TLPs sent to a second entity (Entity.2), which may be a CXL host or a CXL device, possibly enabling the first entity to access resources mapped to an address space utilized by the second entity. The first entity may initiate an NVLink request, which may be an NVLink read request, comprising Address(AS.1.1) and Tag/TransactionID(c.1.1), wherein Tag/TransactionID may denote a tag, a transaction tag, a transaction identifier, or another field or set of fields carried in NVLink requests and/or NVLink Responses, which may serve for associating the NVLink responses with the NVLink requests. The SD/C may translate the NVLink request to a CXL request, such as CXL.io UIO Memory Read Request (UIOMRd) comprising Address(AS.2.1), and Tag(w.2.1), wherein the SD/C may send the CXL.io UIO Memory Read Request (UIOMRd) to the second entity. Upon receiving the CXL.io UIO Memory Read Request (UIOMRd), the second entity may respond with completion, which may include a CXL.io UIO Read Completion with Data (UIORdCplD) comprising CDL (cdl.2.1), Tag(w.2.1) and DataPayload(*Data.1*), wherein the CDL field may denote a CXL DevLoad (CDL) field in CXL.io UIO completions, and may be populated by the CXL device (or alternatively by the CXL host) with information related to Quality-of-Service (QoS), such as QoS telemetry value or values. The SD/C may translate the CXL.io UIO Read Completion with Data (UIORdCplD) to an NVLink Response comprising Tag/TransactionID(c.1.1) and *Data.1*, wherein the SD/C may send the NVLink Response to the first entity.

The SD/C may perform further translations, such as protocol translations, opcode translations, command translations, TLP type translations, and field translations between the NVLink-based domain and the CXL domain. In some embodiments, the SD/C may issue more than one CXL.io UIO memory read requests in response to receiving an NVLink request from the first entity, such as when splitting an NVLink request for a large block of data to multiple smaller CXL.io UIO memory read requests, or when prefetching data from the second entity. The SD/C may be configured to perform translations of requests or transactions initiated from the NVLink-based domain to the CXL domain, may be configured to perform additional transla-
tions of requests or transactions initiated from the CXL
domain to the NVLink-based domain, or may be configured
to perform translations of requests or transactions initiated
from any of the domains.

FIG. 125C illustrates one embodiment of a TFD demon-
strating translations, such as address translations, performed
by a semiconductor device or by a computer, denoted as
SD/C, between physical addresses, such as GPU physical
addresses or NVLink-based network addresses, carried in
NVLink-based requests, such as NVLink read requests,
received from a first entity (Entity.1), which may be a CPU
or a GPU, and physical addresses, such as Host Physical
Addresses (HPAs), carried in CXL.io TLPs sent to a second
entity (Entity.2), which may be a CXL host or a CXL device,
possibly enabling the first entity to access resources mapped
to an address space utilized by the second entity. The first
entity may initiate an NVLink request, which may be an
NVLink read request, comprising Address(AS.4.1) and Tag/
TransactionID(c.4.1), wherein Tag/TransactionID may
denote a tag, a transaction tag, a transaction identifier, or
another field or set of fields carried in NVLink requests
and/or NVLink Responses, which may serve for associating
the NVLink responses with the NVLink requests. The SD/C
may translate the NVLink request to a CXL.io request, such
as CXL.io Memory Read Request (MRd) comprising
Address(AS.3.1), and Tag(w.3.1), wherein the SD/C may
send the CXL.io Memory Read Request (MRd) to the
second entity. Upon receiving a completion from the second
entity, which may include a CXL.io Completion with Data
(CplD) comprising Tag(w.3.1) and DataPayload(*Data.2*),
the SD/C may translate the CXL.io Completion with Data
(CplD) to an NVLink Response comprising Tag/Transac-
tionID(c.4.1) and *Data.2*, wherein the SD/C may send the
NVLink Response to the first entity.

The SD/C may perform further translations, such as
protocol translations, opcode translations, command trans-
lations, TLP type translations, and field translations between
the NVLink-based domain and the CXL domain. In some
embodiments, the SD/C may issue more than one CXL.io
memory read request in response to receiving an NVLink
request from the first entity, such as when splitting an
NVLink request for a large block of data (e.g., 256B) to
multiple smaller CXL.io memory read requests, or when
prefetching data from the second entity.

When claims or descriptions herein refer to a protocol
"based on" a specific standard or an industry standard (such
as a "protocol based on CXL", a "CXL-based protocol", a
"protocol based on UALink", a "UALink-based protocol", a
"protocol based on NVLink", an "NVLink-based protocol",
a "protocol based on CHI", a "CHI-based protocol", a
"protocol based on Ethernet", an "Ethernet-based protocol",
a "protocol based on PCIe", or a "PCIe-based protocol"),
such language is intended to encompass protocols that
conform to the referenced standard (such as a "CXL proto-
col", a "UPLI protocol", a "CHI protocol", or a "PCIe
protocol"), as well as protocols that maintain the fundamen-
tal communication mechanisms and essential functional
characteristics of the referenced standard while potentially
incorporating modifications, extensions, or variations. A
protocol based on a specific standard may include protocols
that utilize the same or similar message formats with
renamed, reordered, or slightly modified fields; protocols
that implement essentially the same logical operations uti-
lizing equivalent command sequences or opcodes having
essentially the same performances; protocols that maintain
compatibility with the data transfer patterns and transaction flows of the original standard; protocols that preserve the
essential addressing schemes, routing mechanisms, and
coherency models while potentially using different termi-
nology or encoding; vendor-specific implementations that
add proprietary extensions while maintaining core function-
ality; protocols that implement subsets of the full standard
specification while preserving the fundamental communica-
tion model; or protocols that adapt the standard for different
physical layers or transport mechanisms while maintaining
the essential protocol semantics. For example, a protocol
based on CXL may include implementations that rename
CXL.mem opcodes but preserve their memory access
semantics, add vendor-defined fields to CXL message for-
mats while maintaining backward compatibility, or imple-
ment CXL transaction flows over alternative physical layers.
Similarly, a PCIe-based protocol may include a PCIe pro-
tocol that conforms to a PCI Express Base Specification, as
well as implementations that utilize non-PCIe physical lay-
ers or utilize carrier protocols, such as Ethernet or TCP/IP,
for transferring PCIe TLPs, PCIe transactions, or protocol
data units (PDUs) associated with a PCIe protocol. A
UALink-based protocol may include implementations that
may add vendor-defined fields, vendor-defined packets, ven-
dor-defined operations, or vendor-defined commands, such
as vendor-defined read class commands, vendor-defined
write class requests, vendor defined atomic class requests,
vendor-defined UPLI write message requests, variations that
modify UPLI message formats while preserving the essen-
tial accelerator-to-accelerator communication model, imple-
mentations that utilize different Physical Accelerator ID
encoding schemes while maintaining the UALink routing
architecture, or adaptations that implement UALink's credit-
based flow control using alternative credit accounting
mechanisms. An NVLink-based protocol may include
implementations that extend or modify the command encod-
ing while maintaining the fundamental GPU interconnect
functionality, or variations that adapt NVLink's high-band-
width communication patterns for different switch topolo-
gies.

When claims or descriptions herein refer to a "protocol-
based port" (such as "CXL-based port", "UALink-based
port", "NVLink-based port", or "PCIe-based port"), such
language is intended to encompass ports that communicate
according to the referenced protocol or according to a
protocol based on the referenced protocol, which may fea-
ture different physical layer, link layer, data link layer,
protocol layer, transaction layer, or transport layer imple-
mentations. A protocol-based port may include ports that
communicate according to a standard referenced protocol
specification over its native physical layer; ports that com-
municate according to the referenced protocol over alterna-
tive physical and/or transport layers while maintaining the
protocol's essential communication semantics; ports that
communicate according to vendor-specific implementations
or variations of the protocol that incorporate proprietary
extensions, modified fields, or subset implementations while
preserving core protocol functionality; or ports that com-
municate according to the protocol encapsulated within,
tunneled over, or transported over other protocols or inter-
connect technologies. For example, a CXL-based port may
refer to a standard CXL port communicating over PCIe
physical layer, a port communicating according to CXL over
a physical layer based on IEEE 802.3 PMA, or a port
communicating according to CXL over UCIe. A UALink-
based port may refer to a standard UALink port, a port
communicating according to a UALink protocol variation
that incorporates vendor-defined fields or modifies subset of UALink fields while maintaining UALink's essential communication model, a port communicating according to UALink over UCIe, or a port communicating according to UALink over SUE. An NVLink-based port may refer to a standard NVLink port, a port communicating according to an NVLink protocol variation that incorporates vendor-defined fields or modifies subset of the NVLink fields, a port communicating according to NVLink over UCIe, or a port communicating according to NVLink over SUE. A PCIe-based port may refer to a standard PCIe port or a port communicating according to PCIe over Ethernet or other network fabrics.

References throughout this disclosure and claims to specific opcodes, TLP types, commands, request types, transaction types, or message identifiers (such as ReadOnce, ReadShared, RdCur, MemRd, UIOMRd, ReadNoSnp, CompData, or other named operations) are intended to encompass functionally equivalent operations that achieve substantially the same result, regardless of their specific naming, encoding, or implementation details. Functionally equivalent opcodes may include operations that perform the same type of memory access (read, write, atomics, or read-modify-write) with the same coherency semantics; operations that implement the same cache state transitions or snoop behaviors under different names; operations that achieve the same data transfer granularity and ordering guarantees utilizing alternative command sequences; operations that provide equivalent completion or response mechanisms whether utilizing single or multiple message exchanges; operations that implement the same access permissions, security attributes, or quality-of-service characteristics utilizing different field encodings; or operations that achieve the same end result utilizing decomposition into sub-operations or utilizing aggregation of operations. For example, a ReadOnce opcode that obtains a snapshot of the coherent data may be functionally equivalent to an operation illustratively named ReadCurrent that similarly retrieves the most current data without changing cache states, establishing cache residency or triggering coherency actions; a UIOMRd operation for unordered I/O memory reads may be functionally equivalent to an operation illustratively named RelaxedMRd that similarly performs memory reads without strict ordering requirements; and a CompData response that delivers data with completion indication may be functionally equivalent to an operation illustratively named DataResponse that similarly provides requested data along with transaction completion status.

References to specific protocols, standards, or specifications throughout this disclosure and claims (including but not limited to CXL, UALink, UPLI, NVLink, CHI, PCIe, UCIe, Ethernet, IEEE 802.3, Infinity Fabric, UPI, and other communication protocols) are intended to encompass, depending on the context and technical requirements of specific embodiments, current and future versions, revisions, variations, and compatible implementations of such protocols. This includes, where technically applicable to the specific embodiment, present and future major and minor version releases (such as CXL 1.x, 2.x, 3.x and beyond, UALink_200 and subsequent releases, NVLink generations 1 through 5 and beyond, CHI Issues A through G and subsequent releases), intermediate draft specifications and release candidates that maintain compatibility with the embodiment's requirements, vendor-specific implementations and extensions that maintain essential compatibility with the features utilized by the embodiment, subset implementations that implement the portions of the full specification required by the embodiment, superset implementations that extend the specification with additional capabilities while maintaining backward compatibility, adaptations for different physical layers or transport mechanisms that preserve the protocol functionality required by the embodiment, and protocols that maintain functional compatibility with the specific features and operations described in each embodiment while potentially using different terminology, encoding schemes, or packet formats. The scope of each protocol reference is intended to cover the broadest reasonable interpretation that would be understood by those skilled in the art as maintaining the essential characteristics and functionality required by the specific embodiment at the time of implementation.

The protocols referenced throughout this disclosure and claims are intended to encompass, depending on the context and specific technical requirements of each embodiment, broad categories of current and future implementations. References to CXL encompass, where technically compatible with the described embodiment, CXL specifications including CXL 1.1, 2.0, 3.0, 3.1, 3.2 and future revisions that support the features utilized by the embodiment, applicable CXL protocol layers (CXL.io, CXL.cache, CXL.mem) and future protocol layers that may be added while maintaining compatibility with the embodiment's operations, and compatible or derived protocols that maintain the CXL memory expansion and coherency capabilities required by the specific implementation. References to Ultra Accelerator Link (UALink) encompass, where applicable to the embodiment, UALink_200 Rev 1.0 and future UALink specifications that maintain the required functionality, protocols utilizing UALink Protocol Level Interface (UPLI) in a manner compatible with the described operations, and protocols designed for accelerator interconnection that maintain compatibility with the UALink communication model utilized by the embodiment. References to NVLink encompass, depending on the specific implementation requirements, applicable NVIDIA NVLink generations including NVLink 1.x through 5.x and future versions that support the described functionality, NVLink-C2C for chip-to-chip communication where utilized, coherent NVLink (cNVLink) where applicable, and compatible protocols that maintain the NVLink high-bandwidth GPU interconnect capabilities required by the embodiment. References to Coherent Hub Interface (CHI) encompass, where compatible with the described architecture, applicable ARM AMBA CHI specifications including Issues A through G and future issues that maintain the required coherency features, CHI-based protocols including CHI C2C where utilized, and ARM coherent interconnect protocols that maintain the CHI coherency and routing mechanisms required by the specific implementation. References to Peripheral Component Interconnect Express (PCIe) encompass, depending on the embodiment's requirements, applicable PCIe specifications from 1.0 through 6.x and beyond that support the described features, including relevant PHY specifications, transaction layer packet formats utilized by the embodiment, and compatible protocols that maintain the PCIe peripheral interconnect model required for the implementation. References to UCIe encompass, where technically compatible with the described embodiment, UCIe specifications including UCIe 1.0, 1.1, 2.0, 3.0, and future revisions that support the features utilized by the embodiment, applicable UCIe layers (Protocol Layer, Die-to-Die (D2D) Adapter, Physical Layer), applicable mapped protocols (PCIe, CXL, Streaming, or other protocols utilizing the Raw format), future mapped protocols and future layers of the UCIe stack that may be added while maintaining compatibility with the embodiment's operations, and compatible or derived protocols that maintain the UCIe die-to-die capabilities required by the specific implementation. References to Ethernet and IEEE 802.3 encompass, where applicable to the specific embodiment, current and future Ethernet standards that maintain compatibility with the described operations, relevant IEEE 802.3 specifications including the physical layer specifications utilized by the embodiment, and protocols that utilize Ethernet framing or IEEE 802.3 physical medium attachment (PMA) layers in a manner compatible with the described implementation while potentially utilizing different upper layer protocols.

It is noted that all drawings presented herein, including but not limited to transaction flow diagrams (TFDs), flowcharts, block diagrams, circuit schematics, timing diagrams, state machine diagrams, and logic diagrams, are schematic representations. This means that the number, order, timings, dimensions, connections, and other properties of the elements illustrated in the drawings are non-limiting examples. Depending on the context, elements (such as lines, arrows, boxes, blocks, symbols, or labels) illustrated in the drawings may represent one or more actual elements. For example, a single box in a block diagram may represent multiple hardware components or software modules, a single arrow in a flowchart may represent multiple process steps or data transfers, and a single line in a circuit diagram may represent multiple electrical connections.

Every modification, variation, or alternative allowed by current or future relevant specifications, standards, or common practices in the field is intended to be included within the scope of said drawings. Furthermore, the scope of the drawings extends to encompass embodiments that may deviate from strict specifications due to factors such as hardware bugs, relaxed designs, implementation-specific optimizations, or practical constraints; this includes, but is not limited to, cases wherein the actual behavior of compliant or compatible devices, components, systems, or software differs from the specification in ways that do not fundamentally alter the underlying principles of the embodiment. For instance, in the context of CXL technology, which serves as a non-limiting example, (i) Data transfers may vary in size and timing, such as 1×(64B) or 2×(32B) messages in CXL-.cache H2D Data, (ii) The order of response messages (e.g., NDR and DRS in CXL.mem) may vary for certain operations, (iii) The presence and positioning of metadata in responses may differ based on device capabilities and configurations, (iv) Timing and presence of credit return messages may vary based on implementation-specific flow control mechanisms, (v) The use and positioning of Vendor Defined Messages may differ across implementations, and (vi) An "Enhanced Retimer", "Smart Retimer", or even a slightly modified spec-based Retimer, may to some extent alter the behavior of messages on the link. These examples are not exhaustive and similar principles apply to other technologies and protocols illustrated in the drawings.

Additionally, depending on the context, various nuances, modifications, flexibilities, and/or alternatives permitted by relevant specifications, standards, or common practices may be applied to certain relevant elements of the drawings herein. This includes, but is not limited to, variations in formats, optional features, and implementation-specific optimizations allowed within the bounds of the relevant specifications or reasonable practical extensions beyond them.

As technology evolves, new features, message types, components, or modifications may be introduced in future revisions of relevant specifications, or implemented in hardware or software before being formally specified. The scope of the drawings herein is intended to encompass such future developments and practical embodiments to the extent that they are logical extensions or modifications of the illustrated concepts and do not fundamentally alter the underlying principles of the embodiments, even if they deviate from the strict letter of the current specifications in non-essential ways. Moreover, the claimed methods and systems are also intended to cover embodiments that may deviate from the current specifications due to practical considerations such as bugs, relaxed design choices, or other deviations that do not fundamentally alter the principles of the embodiments.

A computer program (which may also be referred to as software, application, script, program code, or firmware) may encompass any form of instructions or expressions executable by or interpretable on a computing device, including but not limited to compiled, interpreted, declarative, procedural, functional, object-oriented, and/or markup languages. It may be deployed in various formats, such as a standalone application, library, module, component, subroutine, function, object, service, container, or other units suitable for any computing environment. A computer program may be represented as one or more files or parts of files within a file system, possibly coexisting with other computer programs or data, and/or distributed across multiple files, directories, and/or storage locations allocated for the program. It may include source code, object code, bytecode, machine code, intermediate code, or any other form of code representation. Furthermore, a computer program may be stored locally on a device, in a network, and/or in the cloud, and may be designed to be executed on one or more computers located at single or multiple locations, optionally coupled via one or more communication networks. The computer program may be static or dynamic, may include self-modifying code, and may be designed to run continuously, on-demand, or at scheduled intervals. It may interact with other programs, services, or systems, and may be updated, patched, or modified during its lifecycle.

As used herein, the term "non-transitory computer-readable medium" refers to any medium capable of storing, encoding, or carrying instructions, computer program code, and/or data for access or processing by a computing device, and that does not include transitory signals per se. A non-transitory computer-readable medium may be a single medium or may include multiple media (e.g., a centralized or distributed database, and/or associated caches and servers). It may take many forms, including but not limited to, non-volatile media and volatile media. Non-volatile media may include optical disks, magnetic disks, solid-state drives, and flash drives. Volatile media may include dynamic memory, such as main memory. The non-transitory computer-readable medium may be a machine-readable storage device, a machine-readable storage substrate, a memory device, or a combination of one or more of them, and may be non-removable or removable. It may store one or more sets of instructions, computer program code, data structures, program modules, and/or portions of a computer program, regardless of whether these are currently being executed or are intended for future execution. The stored content may be updated on the non-transitory computer-readable medium and/or downloaded to it via a communication network, such as the Internet. The stored content may be obtained from various sources, including but not limited to, a central repository (e.g., an application store) or an open source and/or community run repository (e.g., GitHub). A computer program product may include a non-transitory computer-readable medium containing such stored content, which, when accessed and executed by one or more processing units, may perform one or more of the methods or operations disclosed herein. The term "non-transitory computer-readable medium" encompasses any manner of storing the relevant content, whether used immediately, stored for future use, distributed for installation, or archived.

At least some of the methods described herein are "computer-implemented methods", which are executed on one or more computing devices, involving performing specific operations by running program instructions on one or more processors within these devices. A computer-implemented method typically requires the interaction of software and hardware components, wherein the software component is composed of a series of instructions designed to perform a set of tasks or functions. These instructions, when executed by the processor(s), enable the computing device to carry out the method's operations. The execution environment for these methods can vary, encompassing standalone computers, networked systems, cloud-based platforms, edge computing devices, mobile devices, embedded systems, virtualized environments, containerized environments, or any combination thereof. Additionally, at least some of these instructions may be stored on a non-transitory computer-readable medium.

The methods, algorithms, logics, processes, operations, and system functions described throughout this disclosure are not limited by a particular order, timing, sequence, grouping, or a specific embodiment described or illustrated unless expressly stated otherwise. Steps, operations, and functions may be performed in any reasonable order, simultaneously or sequentially, in parallel or series, and may be combined, separated, modified, rearranged, omitted, or supplemented based on particular embodiment requirements. Any process descriptions, steps, or blocks in flowcharts or other illustrations should be understood as potentially representing modules, segments, portions of code, or operations that may be executed in any reasonable order, combination, or concurrently, and are not necessarily limited to the particular sequence depicted. Alternative embodiments and variations are contemplated wherein functional operations may be executed in different orders, segmented differently, combined, distributed across multiple systems or components, or modified according to implementation-specific requirements. The disclosed embodiments can be implemented using various hardware configurations, software architectures, programming languages, data structures, communication protocols, and storage mechanisms, and substitutions, modifications, and alternatives will be apparent to those skilled in the art.

References to "one embodiment", along with its variations like "aspect" or "case", indicate that the described features may be present in one or more embodiments. Additionally, distinct references to embodiments, including terms like "one embodiment", "another embodiment", or "some embodiments", do not necessarily denote separate embodiments. They may describe the same embodiment from different perspectives, highlight various aspects of a single embodiment, or pertain to distinct embodiments. Moreover, references to 'example' or 'instance' are to be understood as non-limiting examples and non-limiting instances. Furthermore, uses of "herein" in the context of term definitions shall be understood to mean throughout this disclosure, including the embodiments, examples, and claims.

Sentences in the form of "X is indicative of Y" mean that X includes information correlated with Y and/or describing Y, up to the case wherein X equals Y. Sentences in the form of "provide/receive an indication (of whether X happened)"

may refer to any indication method. The word "most" of something is defined as above 51% of the something (including 100% of the something). The words "portion", "subset", "region", and "area" of something refer to a value between a non-zero fraction of the something and 100% of the something, inclusive; they indicate an open-ended claim language, thus, for example, sentences in the form of "a portion of the memory" or "a subset of the memory" encompass anything from just a small part of the memory to the entire memory, optionally together with additional memory region(s). "Coupled" indicates direct or indirect cooperation and/or interaction, such as direct or indirect physical contact, electrical connection, and/or software and/or hardware interface. The use of "a" or "an" refers to one or more things. The phrase "based on" indicates an open-ended claim language, and is to be interpreted as "based, at least in part, on". Additionally, stating that a value is calculated "based on X" and following that, in a certain embodiment, that the value is calculated "also based on Y", means that in the certain embodiment, the value is calculated based on X and Y. Variations of the terms "utilize" and "use" indicate an open-ended claim language, such that sentences in the form of "detecting X utilizing Y" are intended to mean "detecting X utilizing at least Y", and sentences in the form of "use X to calculate Y" are intended to mean "calculate Y based on X".

The terms "first", "second" and so forth are to be interpreted merely as ordinal designations, and shall not be limited in themselves. A predetermined, predefined, or preselected value is a fixed value and/or a value determined any time before performing a calculation that utilizes the predetermined value. When appropriate, the word "value" may indicate a "predetermined value". The word "threshold" indicates a "predetermined threshold", which means that the value of the threshold, and/or the logic used to determine whether the threshold is reached, is known before start performing computations to determine whether the threshold is reached.

Herein, the terms "send", "sending", "receive", "receiving", "communicate", "communication", "communicating", "exchange", and "exchanging", when used to describe elements (e.g., port, interface, computer, RPU, MxPU, processor, semiconductor device, switch) involved in data, message, packet, or other information exchanges, may refer to any direct or indirect operation(s) that facilitate information transfer to/from/between elements. The sending element is not required to directly transmit the information, nor is the receiving element required to directly obtain the information; instead, they may initiate, cause, control, direct, participate in, or otherwise facilitate the transfer. Such information transfer may occur directly or indirectly through one or more intermediary components, and may include routing, forwarding, or other data transfer mechanisms over any suitable communication path and/or connection.

The embodiments of an invention may include any variety of combinations and/or integrations of the features of the embodiments described herein. Although some embodiments may describe serial operations, the embodiments may perform certain operations in parallel and/or in different orders from those described. Moreover, the use of repeated reference numerals and/or letters in the text and/or drawings is for the purpose of simplicity and clarity and does not in itself dictate a relationship between the various embodiments and/or configurations discussed. Components and/or modules referred to by different reference numerals may or may not perform the same (or similar) functionality, and the fact they are referred to by different reference numerals and/or letters does not mean that they may not have same or similar functionalities.

Certain features of the embodiments, which may have been, for clarity, described in the context of separate embodiments, may also be provided in various combinations in a single embodiment. Conversely, various features of the embodiments, which may have been, for brevity, described in the context of a single embodiment, may also be provided separately or in any suitable sub-combination. Embodiments described in conjunction with specific examples are presented by way of example, and not limitation. Moreover, it is evident that many alternatives, modifications, and variations will be apparent to those skilled in the art. It is to be understood that other embodiments may be utilized and structural changes may be made without departing from the scope of the embodiments.

The drawings depict some, but not necessarily all, the couplings between elements. The depiction of elements as separate entities may be done to emphasize different functionalities of elements that may be implemented by the same software and/or hardware. Programs and/or elements illustrated and/or described as being single may be implemented via multiple programs and/or involve multiple hardware elements possibly in different locations. The embodiments are not limited in their applications to the details of order, or sequence of method steps, or to details of implementation of the devices, set in the description, drawings, or examples. Individual blocks illustrated in the drawings may be functional in nature and therefore may not necessarily correspond to discrete hardware elements. Moreover, the organization of this disclosure into sections, potentially titled, aims to enhance readability without constraining the scope, allowing for the integration of elements, features, components, and steps across various sections.

Accordingly, this disclosure is intended to embrace all such alternatives, modifications, and variations that fall within the spirit and scope of the appended claims and their equivalents.

We claim:

1. A semiconductor device, comprising:
an integrated circuit (IC) package comprising high speed differential I/O balls positioned according to ball grid array layout defined by a PCIe Retimer Supplemental Features and Standard BGA Footprint Specification; wherein PCIe denotes Peripheral Component Interconnect Express, and BGA denotes ball grid array: wherein the IC package comprises:
a first interface configured to communicate according to a first protocol;
a second interface configured to communicate according to a second protocol; and
a computer configured to extract physical addresses carried in messages received from the first interface, translate the physical addresses, generate messages that carry the translated physical addresses, and send the messages via the second interface.

2. The semiconductor device of claim 1, wherein the entire IC package is compatible with the ball grid array layout defined by PCIe 5.0, 6.0, or 7.0 Retimer Supplemental Features and Standard BGA Footprint Specification.

3. The semiconductor device of claim 1, wherein at least one of Pin Name VD_1 to VD_6 or VD_9 to VD_15 are incompatible with the ball grid array layout defined by PCIe 5.0, 6.0, or 7.0 Retimer Supplemental Features and Standard BGA Footprint Specification.

4. The semiconductor device of claim 1, wherein the first protocol comprises CXL.mem, the first interface is configured to expose a Compute Express Link (CXL) type 2 device or a CXL type 3 device, the second protocol comprises CXL.cache, and the second interface is configured to expose a CXL type 1 device or a CXL type 2 device.

5. The semiconductor device of claim 4, wherein the CXL.mem protocol utilizes messages comprising first physical addresses (PAs) from a first Host Physical Address (HPA) space utilized by a first host coupled to the first interface, and wherein the CXL.cache protocol utilizes messages comprising second PAs from a second HPA space utilized by a second host coupled to the second interface.

6. The semiconductor device of claim 1, wherein the first protocol comprises CXL.cache, the first interface is configured to expose a Compute Express Link (CXL) type 1 device or a CXL type 2 device, the second protocol comprises CXL.cache, and the second interface is configured to expose a CXL type 1 device or a CXL type 2 device.

7. The semiconductor device of claim 6, wherein the first protocol utilizes messages comprising first physical addresses (PAs) from a first Host Physical Address (HPA) space utilized by a first host coupled to the first interface, and the second protocol utilizes messages comprising second PAs from a second HPA space utilized by a second host coupled to the second interface.

8. The semiconductor device of claim 1, wherein the first protocol comprises CXL.mem, the first interface is configured to expose a Compute Express Link (CXL) type 2 device or a CXL type 3 device, the second protocol comprises CXL.mem, and the second interface is configured to expose a CXL Root Port.

9. The semiconductor device of claim 8, wherein the first protocol utilizes messages comprising first physical addresses (PAs) from a first physical address space utilized by a first host coupled to the first interface, and the second protocol utilizes messages comprising second PAs from a second physical address space exposed by the Computer over the second interface.

10. The semiconductor device of claim 1, wherein the first protocol comprises PCIe or CXL.io, the first interface is configured to expose an Endpoint, the second protocol comprises PCIe or CXL.io, and the second interface is configured to expose an Endpoint.

11. The semiconductor device of claim 10, wherein the first protocol utilizes Transaction layer Packets (TLPs) or Protocol Data Units (PDUs) comprising first physical addresses (PAs) from a first Host Physical Address (HPA) space utilized by a first host coupled to the first interface, and the second protocol utilizes TLPs or PDUs comprising second PAs from a second HPA space utilized by a second host coupled to the second interface.

12. The semiconductor device of claim 10, wherein the first protocol utilizes at least one Unordered IO (UIO) Transaction Layer Packet (TLP) Type and at least 50% of Memory Requests transmitted by the first interface utilize Flit Mode (FM) TLP formats, and/or wherein the second protocol utilizes at least one of the TLP Types UIOMRd, UIOMWr, UIORdCpl, UIOWrCpl, UIORdCplD.

13. The semiconductor device of claim 1, wherein the computer is further configured to translate the physical addresses to enable access to memory regions storing Large Language Model (LLM) parameters distributed across multiple memory domains, whereby the translated physical addresses enable the first interface to access LLM model weights and activation data residing in a physical address space associated with the second interface.

14. The semiconductor device of claim 1, wherein the IC package is further compatible with power and ground pin distribution defined by PCIe 7.0 Retimer Supplemental Features and Standard BGA Footprint Specification.

15. The semiconductor device of claim 1, wherein the first and second interfaces are configured to support a x4 lane configuration, comprising high-speed differential pairs arranged to support two sets of four lanes for data transmission, and wherein the IC package is further compatible with package dimensions defined for the x4 retimer by PCIe 6.0 Retimer Supplemental Features and Standard BGA Footprint Specification.

16. The semiconductor device of claim 1, wherein the first and second interfaces are configured to support a x8 lane configuration, comprising high-speed differential pairs arranged to support two sets of eight lanes for data transmission, and wherein the IC package is further compatible with package dimensions defined for the x8 retimer by PCIe 6.0 Retimer Supplemental Features and Standard BGA Footprint Specification.

17. The semiconductor device of claim 1, wherein the IC package is configured to support a x16 lane configuration, comprising high-speed differential pairs arranged to support two sets of sixteen lanes for data transmission, and wherein the IC package is further compatible with package dimensions defined for the x16 retimer by PCIe 6.0 Retimer Supplemental Features and Standard BGA Footprint Specification.

18. The semiconductor device of claim 1, wherein the first and second interfaces support operation at data rates of 32.0 GT/s using non-return-to-zero (NRZ) signaling as defined in PCIe 5.0 specification, and support operation at 64.0 GT/s using four-level pulse amplitude modulation (PAM4) signaling as defined in PCIe 6.0 specification, thereby providing compatibility with PCIe 5.0 systems and with PCIe 6.0 systems.

19. The semiconductor device of claim 1, wherein the first and second interfaces are compatible with PCIe 6.0 Retimer Supplemental Features and Standard BGA Footprint Specification, supporting data rates up to 64.0 GT/s and four-level pulse amplitude modulation (PAM4) signaling in addition to non-return-to-zero (NRZ) signaling, such that the semiconductor device is operable to negotiate data rates and signaling methods for both PCIe 5.0 and PCIe 6.0 systems.

20. The semiconductor device of claim 1, wherein the first and second interfaces further comprises ground pins distributed according to PCIe 6.0 Retimer Supplemental Features and Standard BGA Footprint Specification, enabling improved signal integrity at data rates exceeding 32.0 GT/s.

21. The semiconductor device of claim 1, wherein the IC package is further compatible with PCIe 4.0 Retimer Supplemental Features and Standard BGA Footprint Specification, supporting data rates up to 16.0 GT/s.

22. The semiconductor device of claim 1, wherein the first interface is coupled to a first host via one or more switches, and/or wherein the second interface is coupled to a second host via one or more switches.

23. A method of operating a semiconductor device, comprising:

transmitting, according to a first protocol, via a first interface of an integrated circuit (IC) package, wherein the IC package comprises high speed differential I/O balls positioned according to ball grid array layout defined by a PCIe Retimer Supplemental Features and Standard BGA Footprint Specification; wherein PCIe denotes Peripheral Component Interconnect Express, and BGA denotes ball grid array;

transmitting, according to a second protocol, via a second interface of the IC package;

extracting, by a computer located in the IC package, first physical addresses carried in first messages received from the first interface;

translating, by the computer, the first physical addresses to second physical addresses;

generating second messages that carry the second physical addresses; and sending the second messages via the second interface.

24. The method of claim 23, wherein operating the first interface comprises operating according to CXL.mem semantics utilizing the first messages comprising the first physical addresses within a Host Physical Address (HPA) space utilized by a first host communicating with the first interface; and wherein operating the second interface comprises operating according to CXL.cache semantics utilizing the second messages comprising the second physical addresses within an HPA space utilized by a second host communicating with the second interface.

25. The method of claim 23, wherein operating the first interface comprises operating according to CXL.cache semantics utilizing the first messages comprising the first physical addresses within a Host Physical Address (HPA) space utilized by a first host communicating with the first interface; and wherein operating the second interface comprises operating according to CXL.cache semantics utilizing the second messages comprising the second physical addresses within an HPA space utilized by a second host communicating with the second interface.

26. The method of claim 23, wherein operating the first interface comprises operating according to CXL.mem semantics utilizing the first messages comprising the first physical addresses within a Host Physical Address (HPA) space utilized by a first host communicating with the first interface; and wherein operating the second interface comprises operating according to CXL.mem semantics utilizing the second messages comprising the second physical addresses within a physical address space exposed by the computer over the second interface.

27. The method of claim 23, wherein operating the first interface comprises operating according to PCIe or CXL.io semantics utilizing the first messages comprising the first physical addresses within a Host Physical Address (HPA) space utilized by a first host communicating with the first interface; and wherein operating the second interface comprises operating according to PCIe or CXL.io semantics utilizing the second messages comprising the second physical addresses within an HPA space utilized by a second host communicating with the second interface.

28. The method of claim 23, wherein operating the first and second interfaces comprises operating at data rates of 32.0 GT/s using non-return-to-zero (NRZ) signaling as defined in PCIe 5.0 specification, or operating at 64.0 GT/s using four-level pulse amplitude modulation (PAM4) signaling as defined in PCIe 6.0 specification, thereby providing compatibility with PCIe 5.0 systems and with PCIe 6.0 systems.

29. The method of claim 23, wherein operating the first and second interfaces comprises operating according to PCIe 6.0 Retimer Supplemental Features and Standard BGA Footprint Specification, supporting data rates up to 64.0 GT/s and four-level pulse amplitude modulation (PAM4) signaling in addition to non-return-to-zero (NRZ) signaling, such that the semiconductor device negotiates data rates and signaling methods for both PCIe 5.0 and PCIe 6.0 systems.

30. A non-transitory computer-readable medium comprising instructions that, when executed by a processor, cause the processor to perform the method of claim 23.

* * * * *